US008126794B2

(12) United States Patent
Lange et al.

(10) Patent No.: US 8,126,794 B2
(45) Date of Patent: Feb. 28, 2012

(54) REPLICATED DERIVATIVES HAVING DEMAND-BASED, ADJUSTABLE RETURNS, AND TRADING EXCHANGE THEREFOR

(75) Inventors: Jeffrey Lange, New York, NY (US); Kenneth Charles Baron, New York, NY (US); Charles Walden, Montclair, NJ (US); Marcus Harte, Bridgewater, NJ (US)

(73) Assignee: Longitude LLC, New York, NY (US)

( * ) Notice: Subject to any disclaimer, the term of this patent is extended or adjusted under 35 U.S.C. 154(b) by 1734 days.

(21) Appl. No.: 10/365,033

(22) Filed: Feb. 11, 2003

(65) Prior Publication Data

US 2003/0236738 A1 Dec. 25, 2003

Related U.S. Application Data

(63) Continuation-in-part of application No. 10/115,505, filed on Apr. 2, 2002, which is a continuation-in-part of application No. 09/950,498, filed on Sep. 10, 2001, now Pat. No. 7,996,296, which is a continuation-in-part of application No. 09/809,025, filed on Mar. 16, 2001, now Pat. No. 7,225,153, which is a continuation-in-part of application No. 09/774,816, filed on Apr. 3, 2001, now Pat. No. 7,389,262, which is a continuation-in-part of application No. 09/448,822, filed on Nov. 24, 1999, now Pat. No. 6,321,212, and a continuation of application No. 09/448,822, filed on Nov. 24, 1999.

(60) Provisional application No. 60/144,890, filed on Jul. 21, 1999.

(51) Int. Cl.
*G06Q 40/00* (2006.01)

(52) U.S. Cl. .................................................... 705/36 R

(58) Field of Classification Search ........................ None
See application file for complete search history.

(56) References Cited

U.S. PATENT DOCUMENTS 4,903,201 A 2/1990 Wagner
(Continued)

FOREIGN PATENT DOCUMENTS

JP 01-019496 1/1989
(Continued)

OTHER PUBLICATIONS

Smithson, Charles W. Managing Financial Risk. 3rd Edition. McGraw-Hill Professional. 1998. pp. 34-38, 270-271 and 305-307.*

(Continued)

*Primary Examiner* — Jason M Borlinghaus
(74) *Attorney, Agent, or Firm* — Kenyon & Kenyon LLP

(57) ABSTRACT

Methods and systems for trading and replicating contingent claims, such as derivatives strategies, in a demand-based auction are described. In one embodiment, a set of demand-based claims, each of which can be a vanilla option or a digital option, approximate or replicate the contingent claim into a vanilla replicating basis or a digital replicating basis, and the order for the contingent claim is then evaluated or processed in the demand-based auction. In another embodiment, a plurality of strikes and a plurality of replicating claims are established for a demand-based auction on an event, one or more replicating claims striking at each of the strikes in the auction. A contingent claim, such as a derivatives strategy, is replicated with a replication set that includes one or more of the replicating claims in the auction. The equilibrium price and/or the payout for the derivatives strategy is determined as a function of the demand-based valuation of each of the replicating claims in the replication set. For a customer order requesting a number of a certain derivatives strategy in the demand-based auction and a limit price per derivatives strategy, the premium of the customer order is determined as a product of the equilibrium price for the derivatives strategy and a filled number of derivatives strategies for the order, each determined as a function of the demand-based valuation of each of the replicating claims in the demand-based auction.

7 Claims, 74 Drawing Sheets

U.S. PATENT DOCUMENTS

| | | | | |
|---|---|---|---|---|
| 5,148,365 | A * | 9/1992 | Dembo | 705/36 R |
| 5,275,400 | A | 1/1994 | Weingardt et al. | |
| 5,749,785 | A | 5/1998 | Rossides | |
| 5,794,207 | A | 8/1998 | Walker et al. | |
| 5,806,048 | A | 9/1998 | Kiron et al. | |
| 5,819,237 | A | 10/1998 | Garman | |
| 5,842,921 | A | 12/1998 | Mindes et al. | |
| 5,845,266 | A | 12/1998 | Lupien et al. | |
| 5,873,782 | A | 2/1999 | Hall | |
| 5,911,136 | A | 6/1999 | Atkins | |
| 5,970,479 | A | 10/1999 | Shepherd | |
| 6,085,175 | A | 7/2000 | Gugel et al. | |
| 6,134,536 | A | 10/2000 | Shepherd | |
| 6,321,212 | B1 | 11/2001 | Lange | |
| 6,336,103 | B1 | 1/2002 | Baker | |
| 6,456,982 | B1 | 9/2002 | Phlipovic | |
| 2001/0044767 | A1 * | 11/2001 | Madoff et al. | 705/37 |
| 2001/0051540 | A1 | 12/2001 | Hindman et al. | |
| 2002/0032644 | A1 | 3/2002 | Corby et al. | |
| 2002/0073018 | A1 | 6/2002 | Mulinder et al. | |
| 2002/0123954 | A1 | 9/2002 | Hito | |
| 2004/0006528 | A1 | 1/2004 | Fung | |
| 2004/0006529 | A1 | 1/2004 | Fung | |
| 2004/0006534 | A1 | 1/2004 | Fung | |
| 2004/0039670 | A1 | 2/2004 | Fung | |
| 2004/0054617 | A1 | 3/2004 | Fung | |
| 2004/0153375 | A1 | 8/2004 | Mukunya et al. | |

FOREIGN PATENT DOCUMENTS

| | | |
|---|---|---|
| JP | 11-501423 | 2/1999 |
| WO | WO 96/18162 | 6/1996 |
| WO | 01-08063 | 2/2001 |

OTHER PUBLICATIONS

Haug, Espen Gaarder. The Complete Guide to Options Pricing Formulas. McGraw-Hill. 1997. p. 1.*

Smithson, Charles W. Managing Financial Risk, 3rd Edition. McGraw Hill Professional. 1998. p. 286.*

U.S. Appl. No. 60/389,956, filed Jun. 20, 2002—application, including specification and drawings.

U.S. Appl. No. 60/442,462, filed Jan. 25, 2003—application, including specification, claims and abstract.

S. Athanasoulis, et al, "Macro Markets and Financial Security", *FRBNY Economic Policy Review*, Apr. 1999, pp. 21-39.

B. Bahra, "Implied Risk-Neutral Probability Density Functions From Option Prices: Theory and Application", 1997, ISSN 1368-5562, Bank of England.

K. Baron, et al, "From Horses to Hedging", *Risk Magazine*, Feb. 2003, pp. 73-77, vol. 16—No. 2, Risk Waters Group, Ltd., United Kingdom.

P. Billingsley, *Probability and Measure*, 1986, pp. 16-26, 2nd Edition, John Wiley and Sons, New York.

A. Bruce, et al, "Investigating the Roots of the Favourite-Longshot Bias: An Analysis of Decision Making by Supply- and Demand-Side Agents in Parallel Betting Markets", *Journal of Behavioral Decision Making*, 2000, pp. 413-430, vol. 13—No. 4, John Wiley & Sons, Ltd.

A. Bruce, et al, "Market Efficiency Analysis Requires a Sensitivity to Market Characteristics: Some Observations on a Recent Study of Betting Market Efficiency" *Applied Economics Letters*, 2000, pp. 199-202, No. 7, Taylor and Francis Ltd.

Burton, U.S. Patent Publication, published May 2, 2002/filed Aug. 24, 2001, No. 2002/0052819.

K. Busche, et al, "Decision Costs and Betting Market Efficiency", *Rationality and Society*, 2000, pp. 477-492, vol. 12-No. 4, Sage Publications, Thousand Oaks, CA.

M. Cain, et al, "The Incidence of Insider Trading in Betting Markets and the Gabriel and Marsden Anomaly", *The Manchester School*, Mar. 2001, pp. 197-207, vol. 2—No. 69, Blackwell Publishers Ltd., Malden, MA.

M. Cain, et al, "Relationship between Two Indicators of Insider Trading in British Racetrack Betting", *Economica*, 2001, pp. 97-104, No. 68, The London School of Economics and Political Science.

N. Economides, et al., "Electronic Call Market Trading", *Journal of Portfolio Management*, Spring 1995, pp. 10-18.

D.C. Edelman, et al, "Tote Arbitrage and Lock Opportunities in Racetrack Betting", Working Paper, Oct. 17, 2001, pp. 1-8, Department of Accounting and Finance, University of Wollongong, Australia.

E. Eisenberg, "Consensus of Subjective Probabilities: The Pari-Mutuel Method", *Annals of Mathematical Statistics*, Mar. 1959, pp. 165-168, vol. 30-No. 1, Institute of Mathematical Statistics.

M. Evans, et al, *Statistical Distributions*, pp. 140-141, 2nd Edition, John Wiley & Sons, Inc., New York.

J. Fingleton, et al, "Optimal Determination of Bookmakers' Betting Odds: Theory and Tests", Jun. 1, 2001, pp. 1-36, Technical Paper No. 96/9.

Garahi, et al, U.S. Patent Publication, published Nov. 29, 2001/filed Apr. 2, 2001, No. 2001/0047291.

K. Garbade, et al., "Structural Organization of Secondary Markets: Clearing Frequency, Dealer Activity, and Liquidity Risk", *Journal of Finance*, 1979, pp. 577-593, No. 34.

S. Gu, et al, "Exchange Market Model for Over-the-Counter Equity Derivatives Trading", Working Paper, Oct. 9, 2001, pp. 1-29, Center for Research on Electronic Commerce, The University of Texas at Austin.

N. Hakansson, "Welfare Aspects of Options and Supershares", *Journal of Finance*, Jun. 1978, pp. 759-776, vol. 33—No. 3.

R. Hanson, "Logarithmic Market Scoring Rules for Modular Combinatorial Information Aggregation", Working Paper, Jan. 2002, pp. 1-12, Department of Economics, George Mason University.

D. Hausch, et al, *Efficiency of Racetrack Betting Markets*, 1994, Academic Press, New York, NY.

T. Helenius, "Real Bonds, Real-time, Real Fast", *Wall Street & Technology*, Apr. 1998, pp. 1-4.

J. Ingersoll, Jr., "Digital Contracts: Simple Tools for Pricing Complex Derivatives", *Journal of Business*, 2000, pp. 67-87, vol. 73—No. 1, The University of Chicago, IL.

S. Hong, *Japanese Investment Posts Strong Momentum*, Feb. 1997, pp. 1-2.

W. J. Hurley, *On the use of Martingales in Monte Carlo Approaches to Multiperiod Parameter Uncertainty in Capital Investment Risk Analysis*, Jan. 1998, pp. 1-6.

J. Johnson, "An Empirical Study of the Impact of Complexity on Participation in Horserace Betting", *Journal of Gambling Studies*, Summer 1997, pp. 159-172, vol. 13—No. 2, Human Sciences Press, Inc.

J. Karp, *River Runs Dry*, Nov. 1992, pp. 1-2.

D. F. Kocaoglu, et al, *Constrained Moments Simulation in Healthcare Capital Acquisitions*, Jan. 1997, p. 1.

"Lack of Debt Trades Stunts Market—HSBC", *Businessworld*, Sep. 1998, pp. 1-2, Manila.

J. Lange, et al, "A Parimutuel Market Microstructure for Contingent Claims Trading", Working Paper, Nov. 21, 2001, pp. 1-47, New York University Stern School of Business, New York, NY.

G. Owen, "Parimutuel as a System of Aggregation of Information", *Game Theoretical Applications to Economics and Operations Research*, 1997, pp. 183-195, Kluwer Academic Publishers, The Netherlands.

A. Madhavan, "Trading Mechanisms in Securities Market", *Journal of Finance*, 1992, No. 47, pp. 607-641.

R. Merton, *Continuous-Time Finance*, 1990, pp. 441-457.

S.L. Mintz, *Measuring up: What CEOs Look for in their Chief Financial Officers*, Feb. 1994, pp. 1-5.

C. S. Pedersen, "Derivatives and Downside Risk", *Derivatives Use, Trading & Regulation*, 2001, pp. 251-268, vol. 7—No.3, London.

D. Peel, et al, "Product Bundling and a Rule of Thumb versus the Harville Formulae: Can Each Way Bets with UK Bookmakers Generate Abnormal Returns", *Applied Economics*, 2000, pp. 1737-1744, No. 32, Taylor & Francis Ltd.

R. Phatarfod, "Betting Strategies in Horse Races", *Asia-Pacific Journal of Operational Research*, 1999, pp. 87-98, No. 16.

C.R. Plott, et al, "Parimutuel Betting Markets as Information Aggregation Devices: Experimental Results", *Caltech Social Science Working Paper 986*, Apr. 1997.

Randhawa, et al, *Financial Risk Analysis Using Financial Risk Simulation Prog*, Sep. 1993, pp. 1-4.
K. Rhoda, et al, "Risk Preferences and Information Flows in Racetrack Betting Markets", *The Journal of Financial Research*, Fall 1999, pp. 265-285, vol. 22—No. 3.
M. Rubinstein, "Supershares", *Handbook of Equity Derivatives*, 1994, pp. 1-14, 1994, Irwin.
K. Saatcioglu, et al, "Design of a Financial Portal", *Communications of the ACM*, Jun. 2001, pp. 33-38, vol. 44—No. 6.
C. Schnitzlein, "Call and Continuous Trading Mechanisms Under Asymmetric Information", *Journal of Finance*, 1996, No. 51, pp. 613-636.
R. A. Schwartz, "Integrating Call and Continuous Markets", *Securities Traders' Monthly*, Sep. 1991, pp. 14-16.
L. Shapley, et al, "Trade Using One Commodity as a Means of Payment", *Journal of Political Economy*, 1977, pp. 937-968, No. 85.
H. Shin, "Measuring the Incidence of Insider Trading in a Market for State-Contingent Claims", *The Economic Journal*, Sep. 1993, pp. 1141-1153, vol. 103—No. 402, The Royal Economic Society.
H. Shin, "Optimal Betting Odds Against Insider Traders", *The Economic Journal*, Sep. 1991, pp. 1179-1185, vol. 101—No. 408, Royal Economic Society.
Smith, et al, *A Statistical Model for Characterizing Price Variability with Application to Dairy Investment Analysis*, Jan. 1980, pp. 1-2.
W. Takahiro, "A Parimutuel System with Two Horses and a Continuum of Bettors", *Journal of Mathematical Economics*, 1997, pp. 85-100, No. 28.
D. Tek, et al, "Optimal Betting and Efficiency in Parimutuel Betting Markets with Information Costs", *The Economic Journal*, Jul. 1996, pp. 1-18, vol. 106—No. 437, Blackwell Publishers, Malden, MA.
T. Watanabe, et al., "A Model of a General Parimutuel System: Characterizations and Equilibrium Selection", *International Journal of Game Theory*, 1994, pp. 237-260, No. 23.
E. Weigel, "SuperUnits and SuperShares", *Interfaces*, May-Jun. 1994, pp. 62-79, vol. 24-No. 3, The Institute of Management Sciences.
L. Williams, "Information Efficiency in Betting Markets: A Survey", *Bulletin of Economic Research*, 1999, pp. 1-30, vol. 51-No. 1, Blackwell Publishers, Malden, MA.
M. Pagano, et al., "Transparency and Liquidity: A Comparison of Auction and Dealer Markets with Informed Trading", *Journal of Finance*, 51, pp. 579-611, 1996.
International Search Report dated May 16, 2008 issued in corresponding PCT Application No. PCT/US04/04553.
International Preliminary Report on Patentability dated Aug. 28, 2008 issued in corresponding PCT Application No. PCT/US04/04553.
Tom Ainslie, 1975, Barnes and Noble Books by Simon and Schuster, Inc., p. 251.

* cited by examiner

501

| | |
|---|---|
| TRADE DATE | 7/30/99 11:00 |
| TRADE PERIOD CLOSE | 8/2/99 16:15 |
| CLAIM TYPE | DBAR RO |
| EVENT | IBM COMMON STOCK CLOSING PRICE |
| EVENT EXPIRATION | 8/3/99 16:15 PM CLOSE PRICE |
| CURRENT PRICE | 136.25 |
| IMPLIED VOLATILITY | 40% |
| TOTAL VOLUME | $ 100,000,000.00 |

502

CURRENT POOL

| RANGE | STATE VOLUME | RETURNS | |
|---|---|---|---|
| <=125 | 2,018 | 49564.3 | 2.01784E-05 |
| >125-126 | 7,751 | 12901.0 | 7.75076E-05 |
| 126-127 | 31,018 | 3222.9 | 0.000310183 |
| 127-128 | 106,755 | 935.7 | 0.001067547 |
| 128-129 | 317,042 | 314.4 | 0.003170415 |
| 129-130 | 815,133 | 121.7 | 0.008151328 |
| 130-131 | 1,820,152 | 53.9 | 0.018201518 |
| 131-132 | 3,540,803 | 27.2 | 0.035408028 |
| 132-133 | 6,019,015 | 15.6 | 0.060190147 |
| 133-134 | 8,967,266 | 10.2 | 0.089672657 |
| 134-135 | 11,742,241 | 7.5 | 0.117422412 |
| 135-136 | 13,552,054 | 6.4 | 0.135520642 |
| 136-137 | 13,823,018 | 6.2 | 0.138230184 |
| 137-138 | 12,493,664 | 7.0 | 0.124936643 |
| 138-139 | 10,031,858 | 9.0 | 0.100318582 |
| 139-140 | 7,174,084 | 12.9 | 0.071740836 |
| 140-141 | 4,580,421 | 20.8 | 0.045804213 |
| 141-142 | 2,617,148 | 37.2 | 0.026171478 |
| 142-143 | 1,341,343 | 73.6 | 0.013413428 |
| 143-144 | 618,049 | 160.3 | 0.006180487 |
| 144-145 | 256,588 | 388.7 | 0.002565889 |
| >145 | 142,580 | 700.4 | 0.001425802 |

TRADE 504

HISTORICAL DATA 505

ANALYZE 506

INTRADAY RETURNS 507

500 DISPLAY

IMPLIED LIQUIDITY EFFECTS: PERCENTAGE CHANGES TO IMPLIED STATE PROBABILITIES BETWEEN "OFFER" AND "BID" AS A FUNCTION OF PROPOSED INVESTMENT AMOUNT (AS A PERCENTAGE, p, OF EXISTING INVESTMENT)

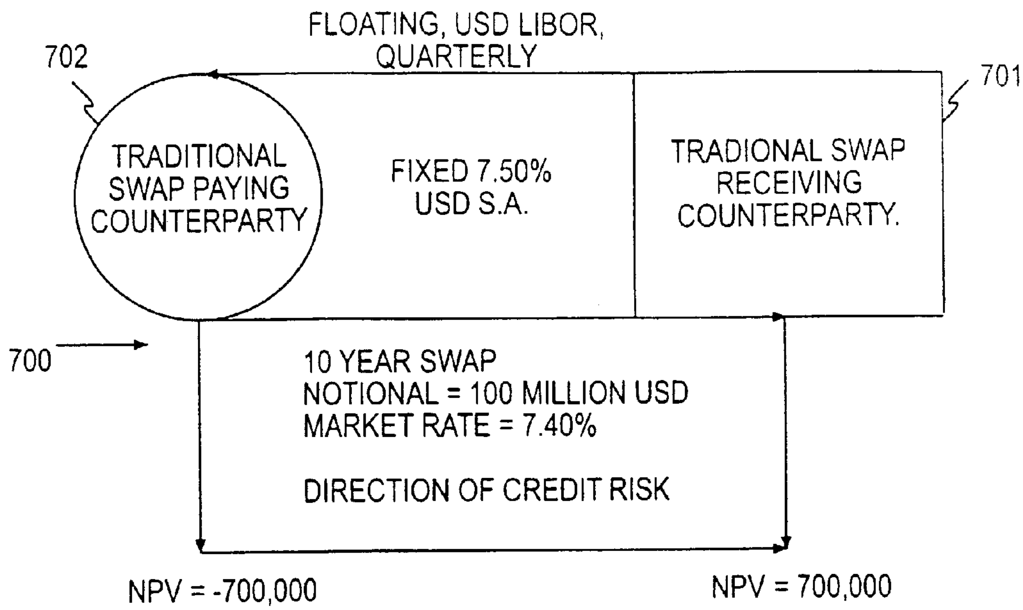
*FIG. 9A* TRADITIONAL SWAP COUNTERPARTIES
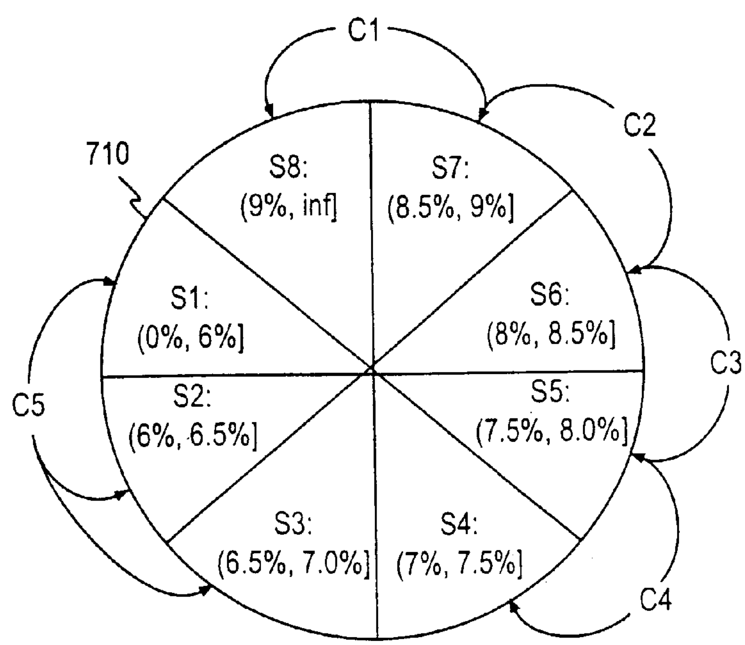
ILLUSTRATIVE TRADER RELATIONSHIPS IN DBAR CONTINGENT CLAIMS
*FIG. 9B*

720

STATUS FOR SWAP RATE

| | S1 | S2 | S3 | S4 | S5 | S6 | S7 | S8 |
|---|---|---|---|---|---|---|---|---|
| C1, AAA | | | | | | | 50,000 | 100,000 |
| C2, AA | | | | | | 40,000 | 25,000 | |
| C3, AA | | | | | 100,000 | 60,000 | | |
| C4, A+ | | | | 150,000 | 100,000 | | | |
| C5, A | 100,000 | 50,000 | 80,000 | | | | | |

MARGIN LOANS BY TRADER, CREDIT RATING, AND DEFINED STATE

*FIG. 9C*

```
struct {
    int      numStates;        // Number of states in contract
    double   totalInvested;    // Total amount invested in contract
    double   poTrade[];        // Profile trade investments per state
    double   poReturn[];       // Profile pay out per state
    double   stateTotal[];     // Aggregated investment per state
    int      numOrders         // Number of submitted orders in contract
    ORDER    orders[];         // List of composite orders
} contract;
```

1101 1102

```
struct {
    double orderAmount;                         // Amount of trade to transact. Represents
                                                amount to be invested for buys and amount
                                                of payout to be sold for sells
    double invest[contract.numStates];          // Calculated amount to invest per
                                                 state
    int    buySell                              //Indicates whether order is a buy (=1) or a
                                                "sell" (=-1)
    int    marketLimit                          // Indicates whether order is market order (=1)
                                                or a limit order (=0)
    double limitPrice                           // Price below (above) which buy (sale) should
                                                be executed
    double price                                // the current equilibrium price for the digital
                                                option, spread or strip specified in the order
    int    ratio[contract.numStates]            // the relative payout ratio requested should
                                                each constituent state of the order occur
    double filled                               // the amount of the order filled in equilibrium
    double fee                                  // the total transaction fee charged for the
                                                order
    double payout                               // the payout of the order net of fees after the
                                                event has occurred and the realized state is
                                                known
    double profilePayout[contract.numStates]    // for a profile type order, the amount of
                                                desired payout should state i occur
} order;
```

```
struct {
        int             numStates;        // Number of states in contract
        int             numOrders;        // Number of orders in contract
        double          totalInvested;    // Total premium invested in contract
        ORDER           orders[];         // List of composite orders
        STATE           states[];         // List of states
} contract;
```

1901

```
struct {
        double          stateTotal;       // Total premium invested in state
        double          poReturn[];       // Executed notional payout per state
        double          statePrice;       // Price/probability for each state
        int             initial State;    // Initial invested premium for each
                                             state to initialize contract
} state;
```

1902

```
struct {
        double          limitPrice;       // Limit price for each order
        double          executedPayout;   // Executed notional payout for order
                                             net of fees
        double          orderPrice;       // Equilibrium price/probability for order
        double          ratio[];          // Payout profile for order
        double          fee;              // Transaction fee for order
        double          requestedPayout;  // Requested notional payout per order
        int             marketLimit;      // Indicates whether order is market
                                             order (=1) or limit order (=0)
        int             buySell;          // Indicates whether order is a buy (=1)
                                             or a "sell" (=-1)
        double          priceGap;         // Difference between market price and
                                             limit price per order
} order;
```

1903

Figures 27A, 27B, 27C: Replicating a Vanilla Call with a Strike of -325

Figures 28A, 28B, 28C: Replicating a Call Spread with Strikes -375 &-225

Figure 30: The payouts on the digital replicating claims
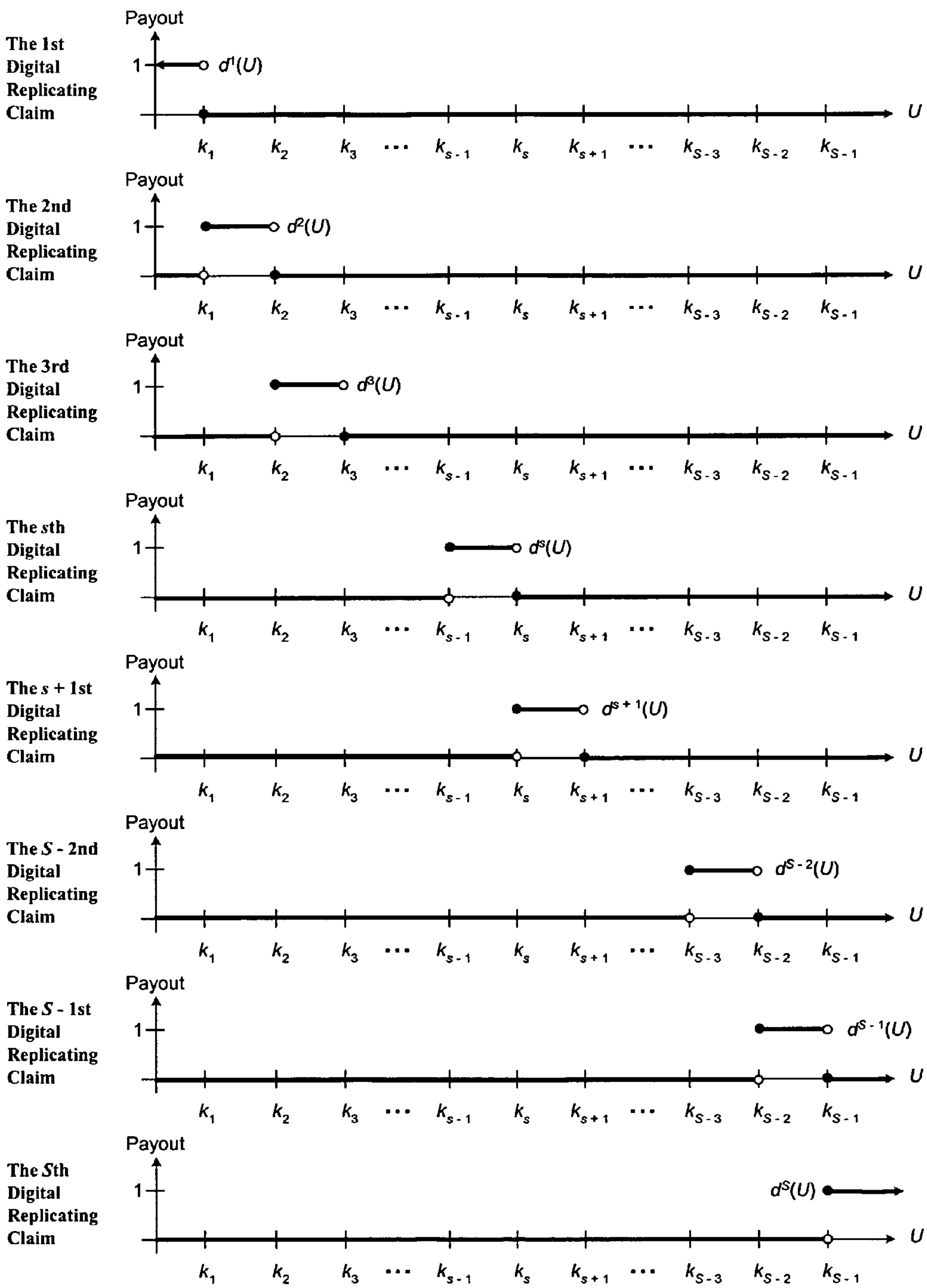

Figure 31: The payouts on the vanilla replicating claims
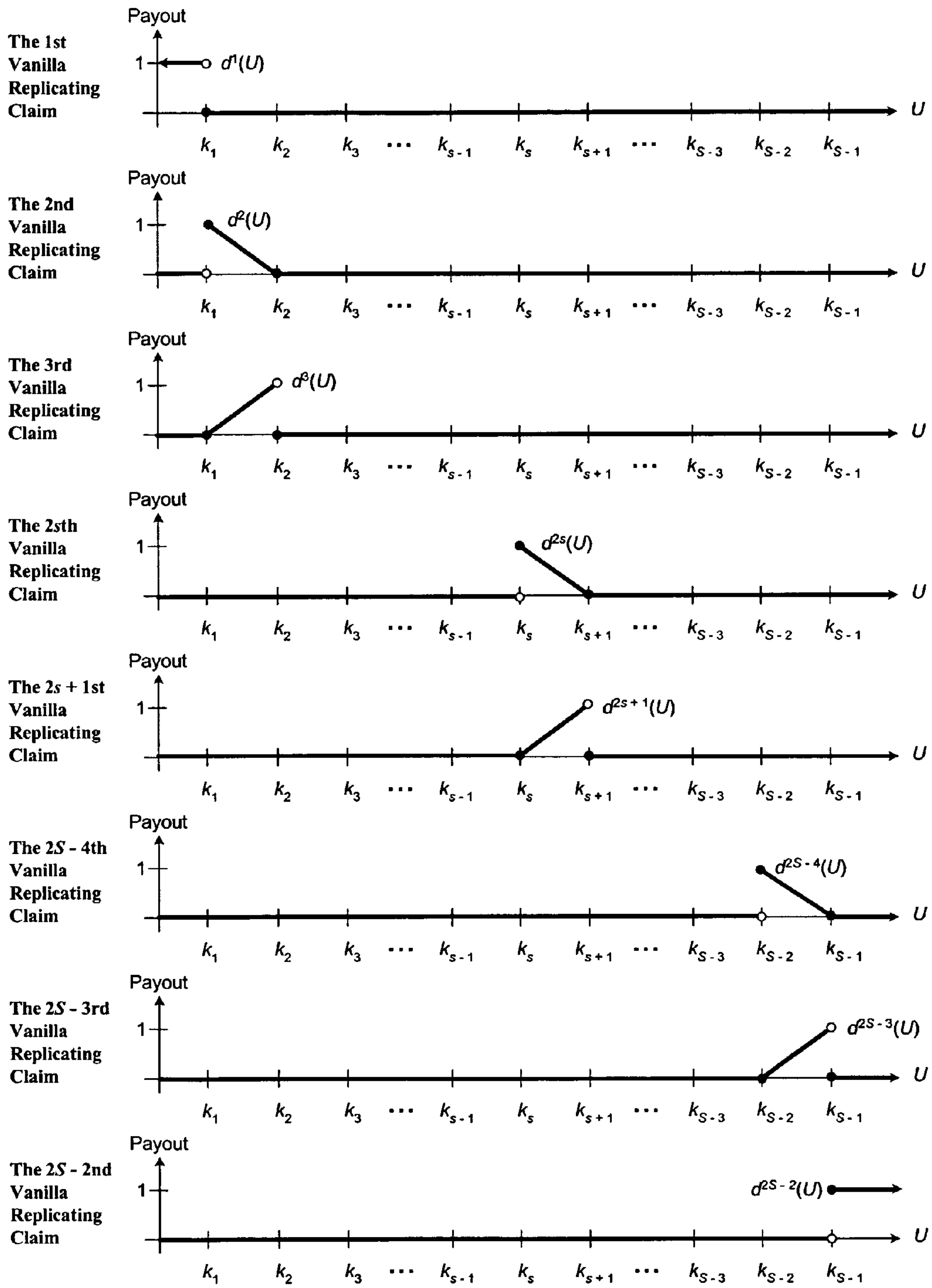

Figure 32. Application Architecture
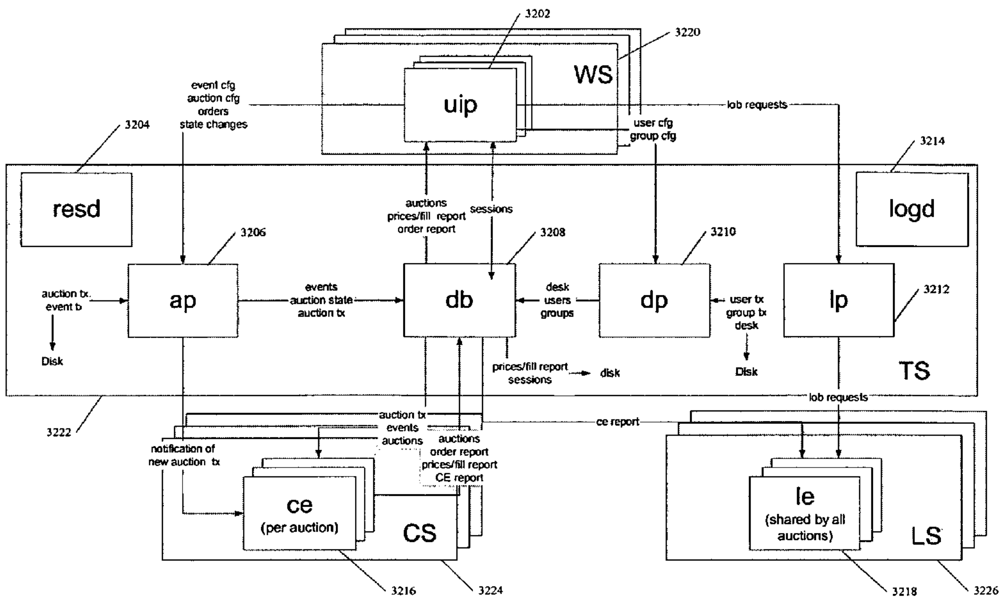
All white boxes are processes.
All gray boxes are the servers on which the processes are running.

Legend

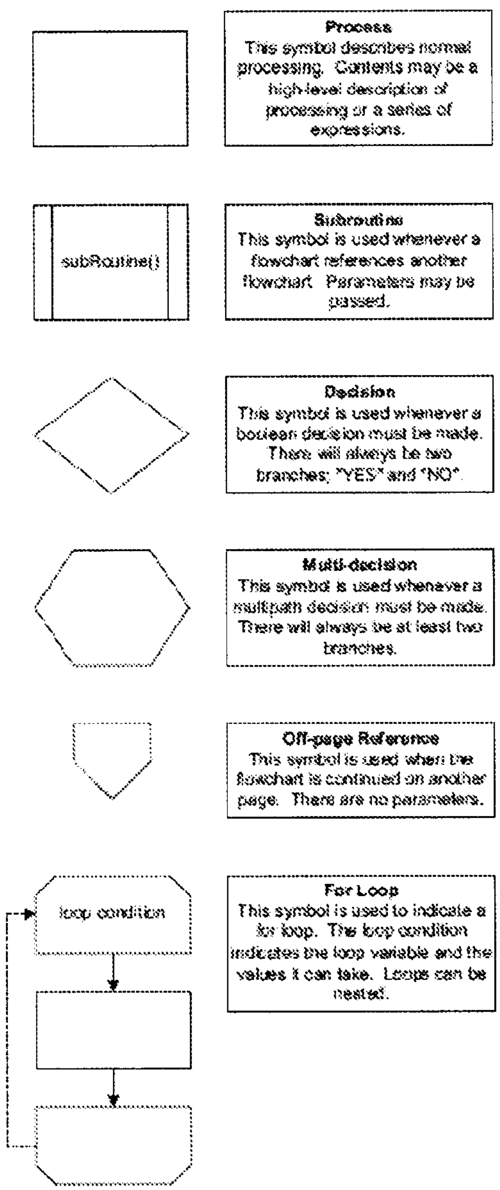

Mathematical and Logical Symbols

< less than
> greater than
= is equal to
<= less than or equal to
>= greater than or equal to

|| boolean OR
&& boolean AND

++ auto-increment
-- auto-decrement

\+ addition
\- subtraction
* multiplication
/ division

:= assignment

+= addition and assignment
-= subtraction and assignment
*= multiplication and assignment
/= division and assignment . object entity accessor
[] array element accessor

Fig. 32A

Application Architecture

All white boxes are processes.

All gray boxes are the servers on which the processes are running.

Figure 33. State Transitions
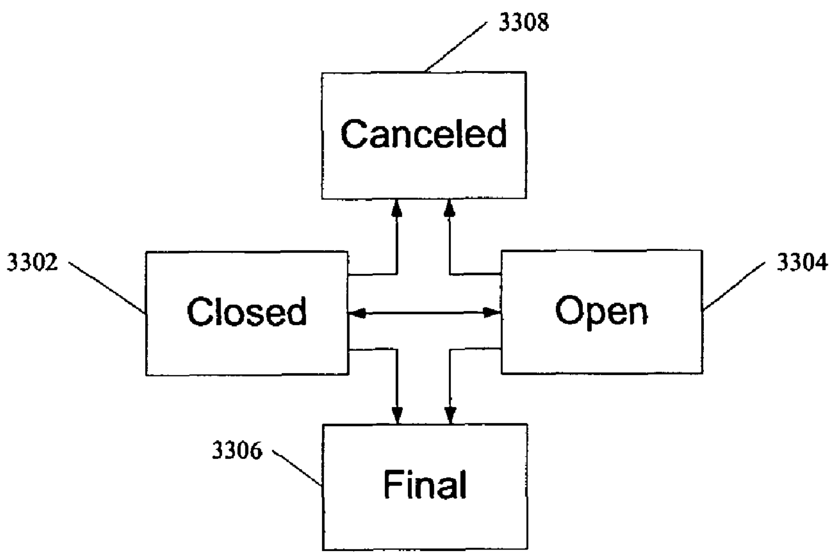

Figure 34. ce 3216 Implementation
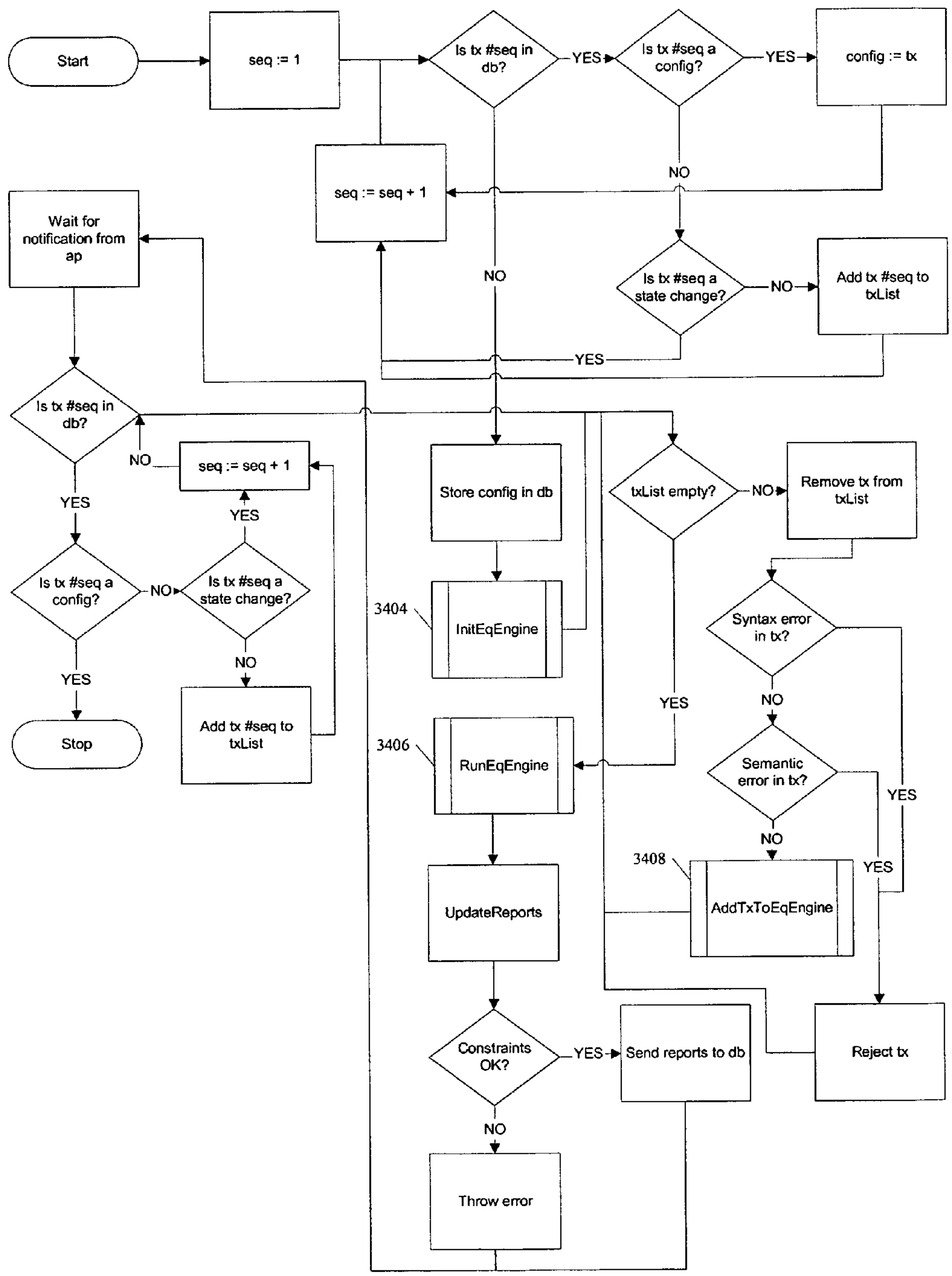

Figure 35. RunEqEngine 3406
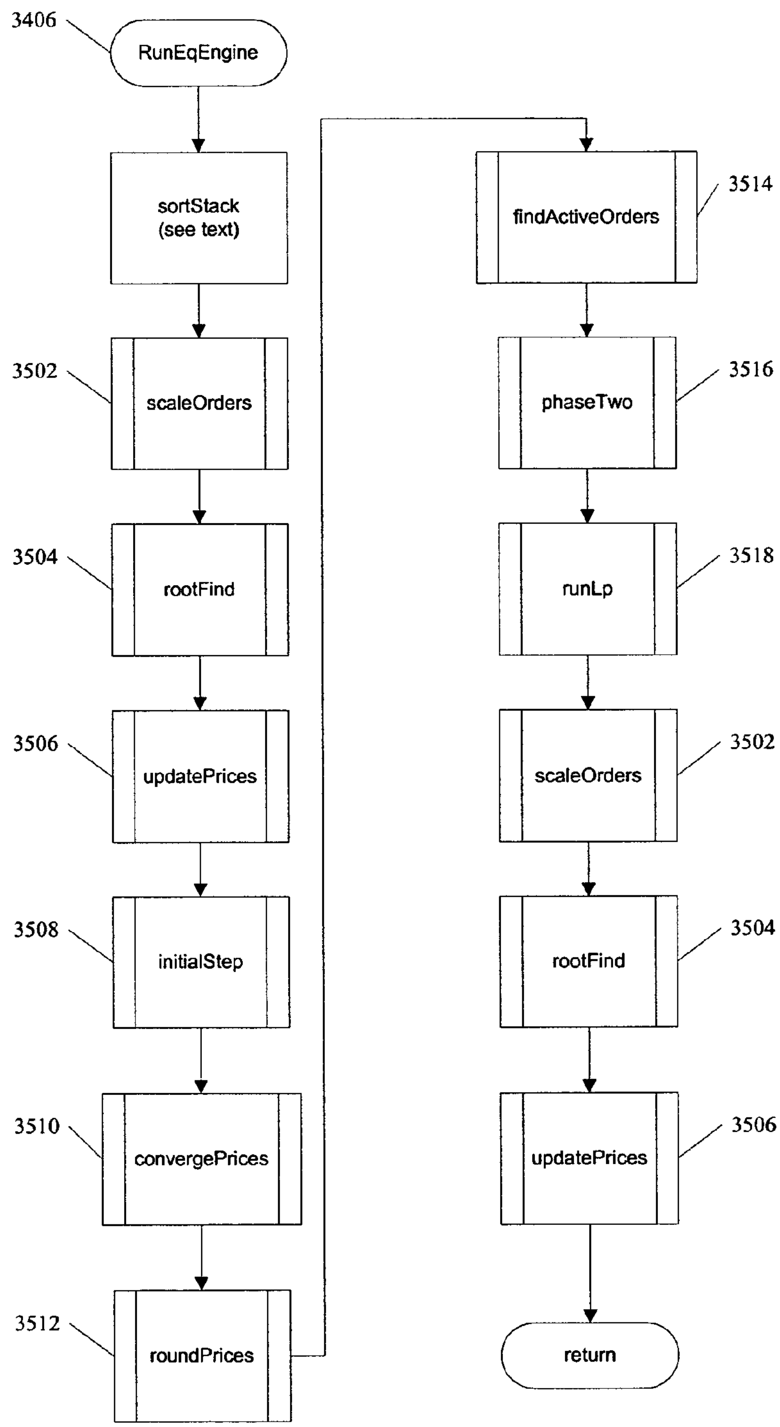

Figure 36. convergePrices 3510
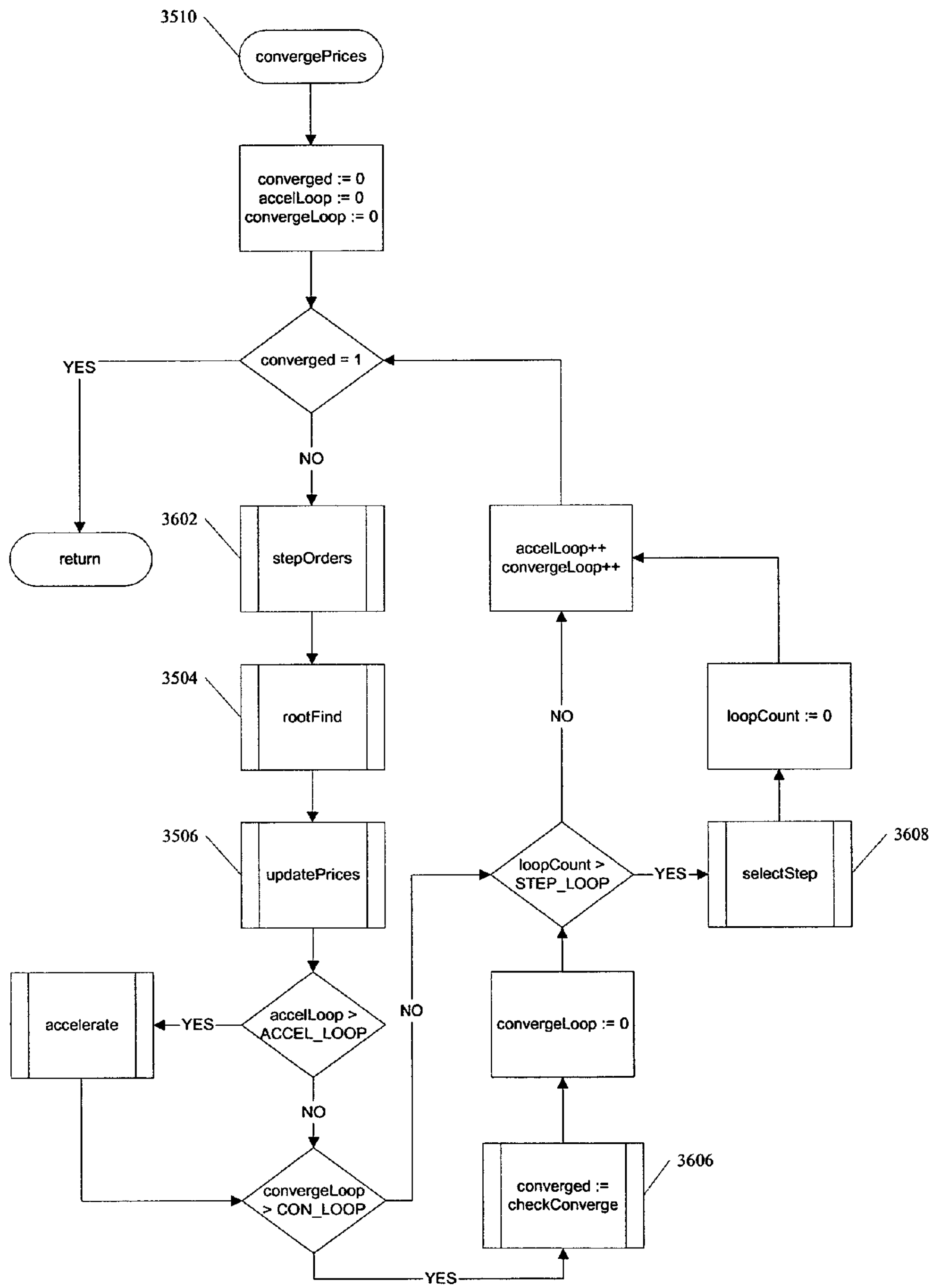

Figure 37. updatePrices 3506
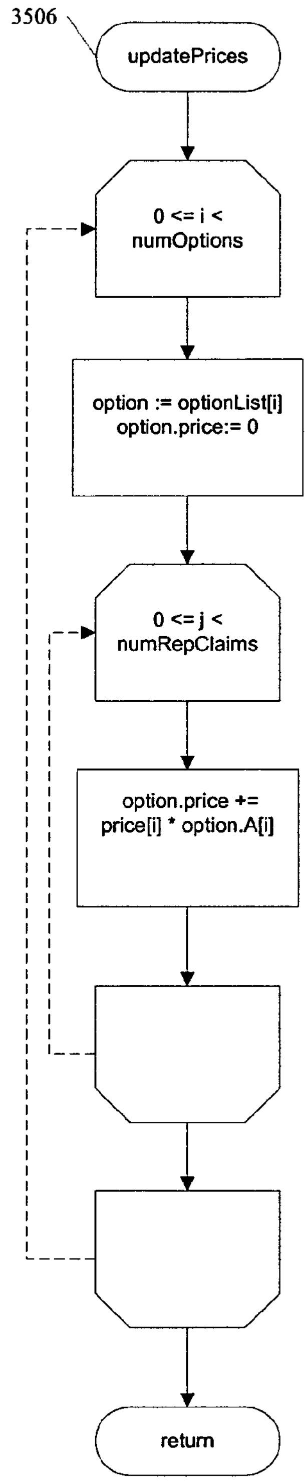

Figure 38. rootFind 3504
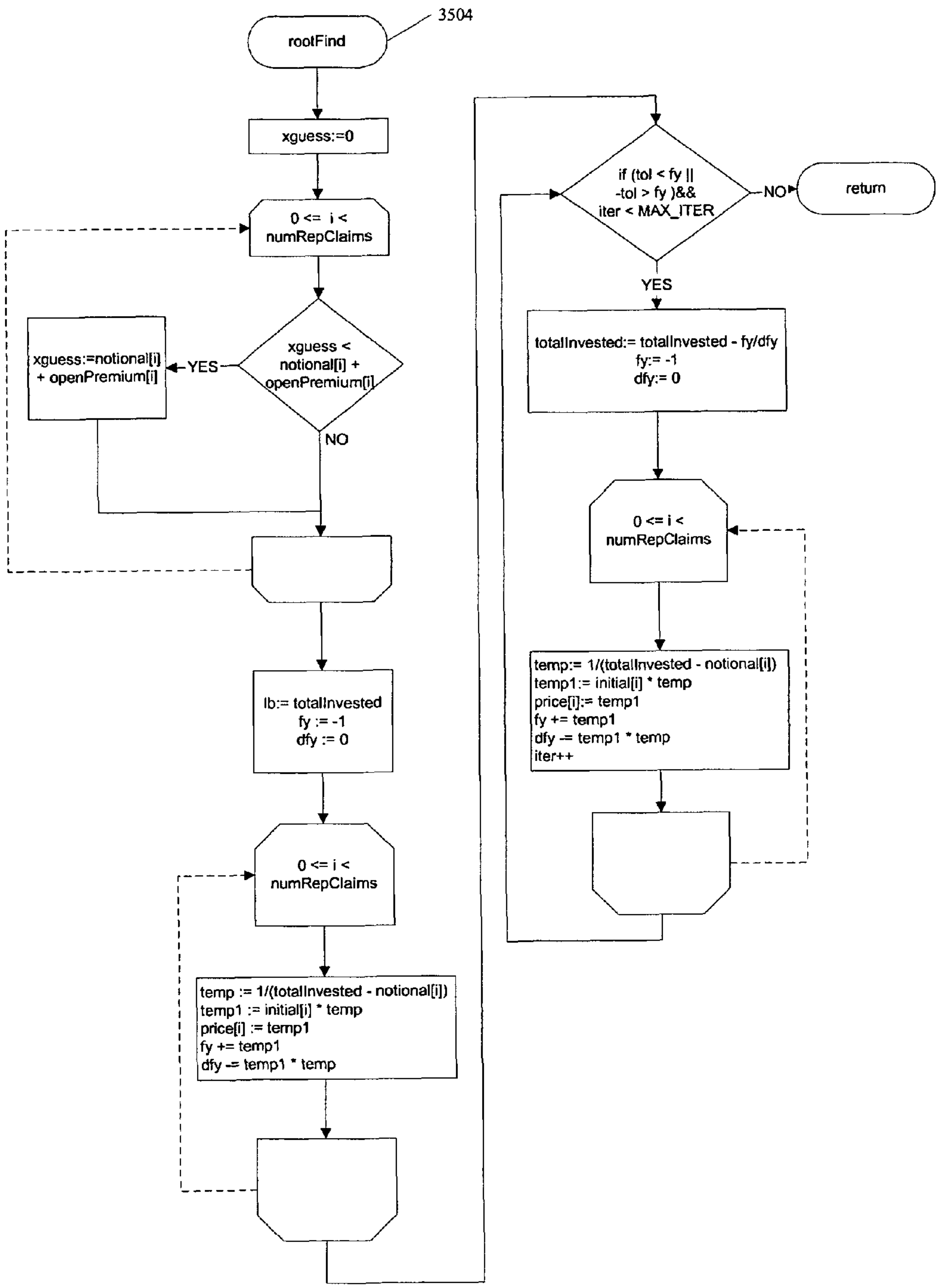

Figure 39. initialStep 3508
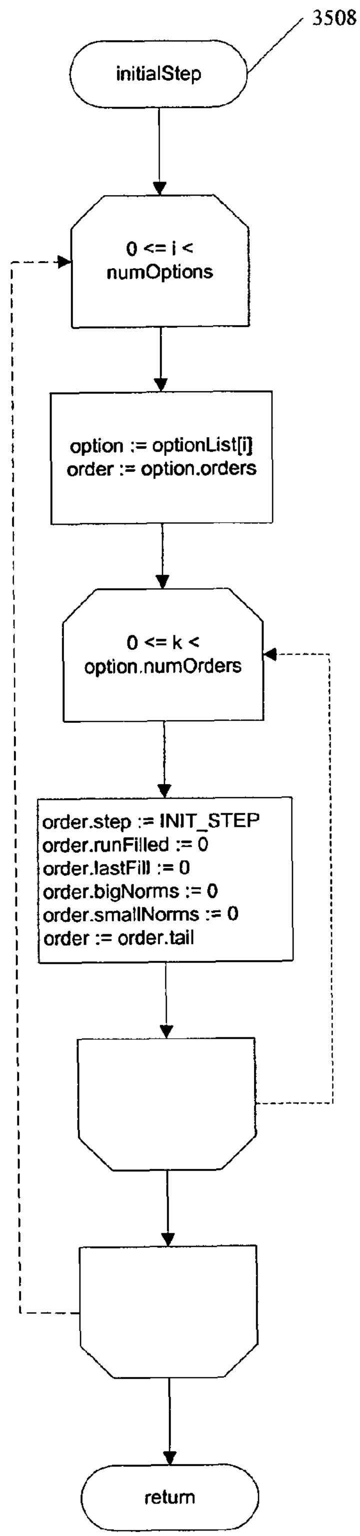

Figure 40. stepOrders 3602
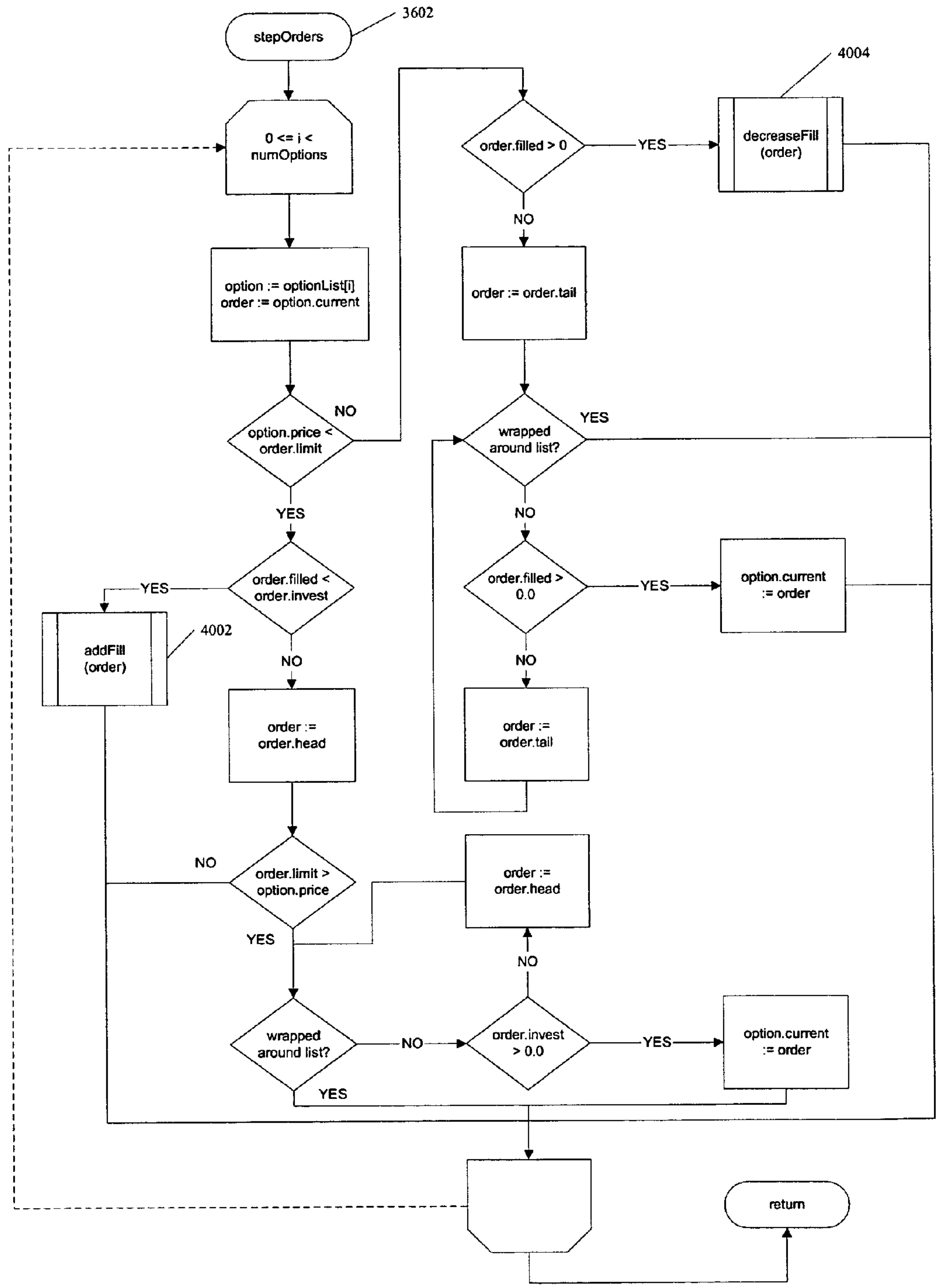

Figure 41. selectStep 3608
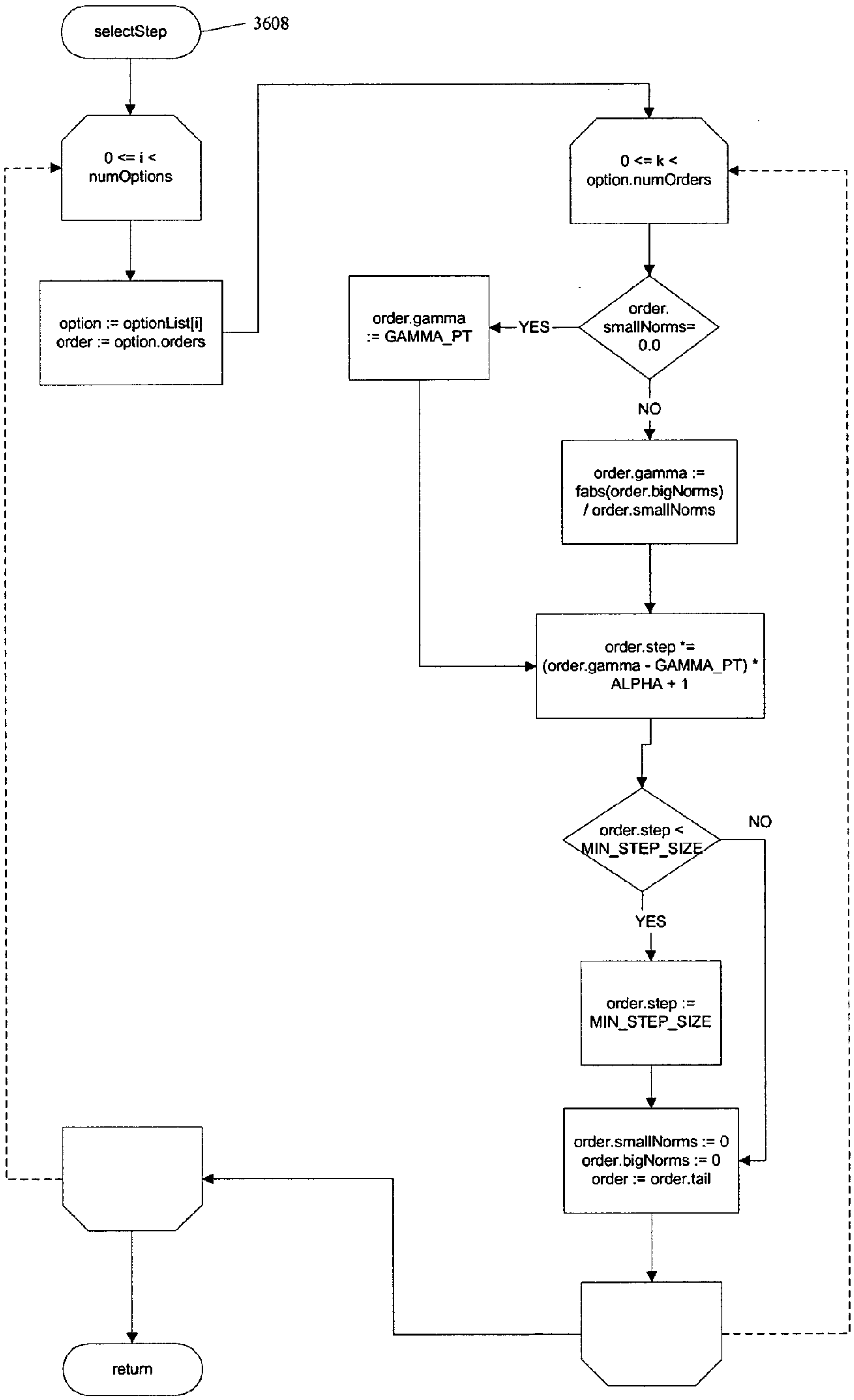

Figure 42. accelerate 3604
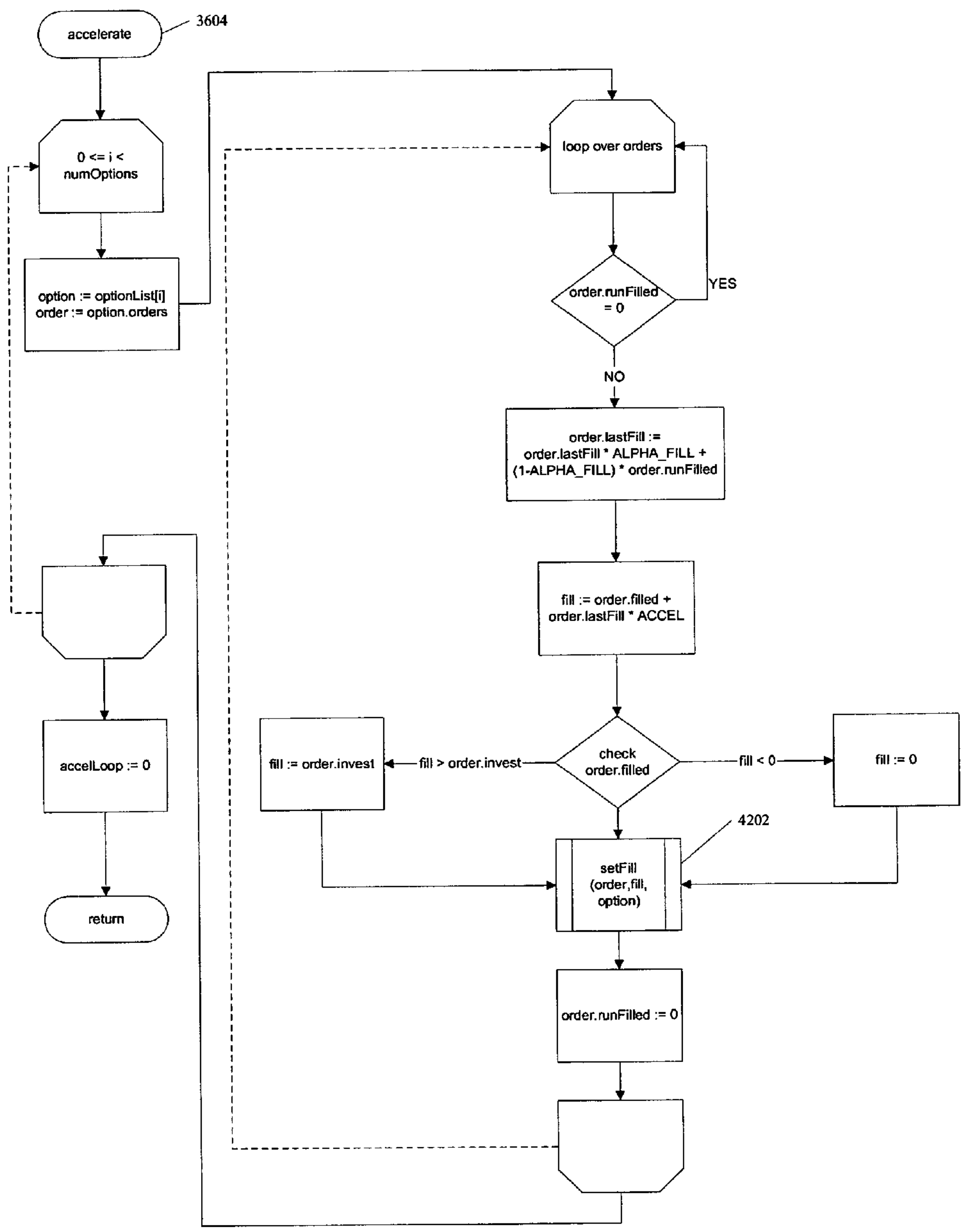

Figure 43. setFill 4202
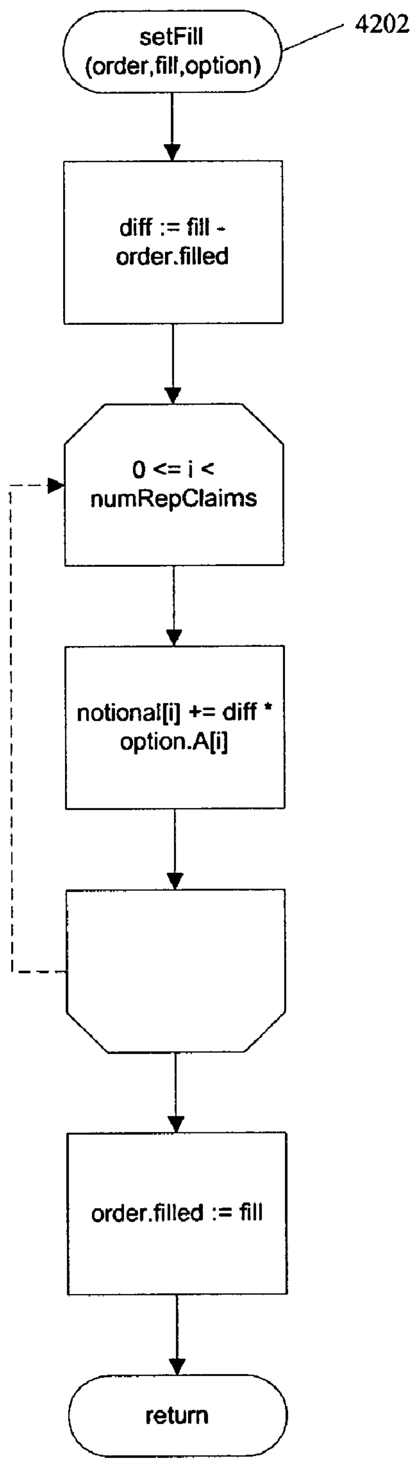

Figure 44. checkConverge 3606
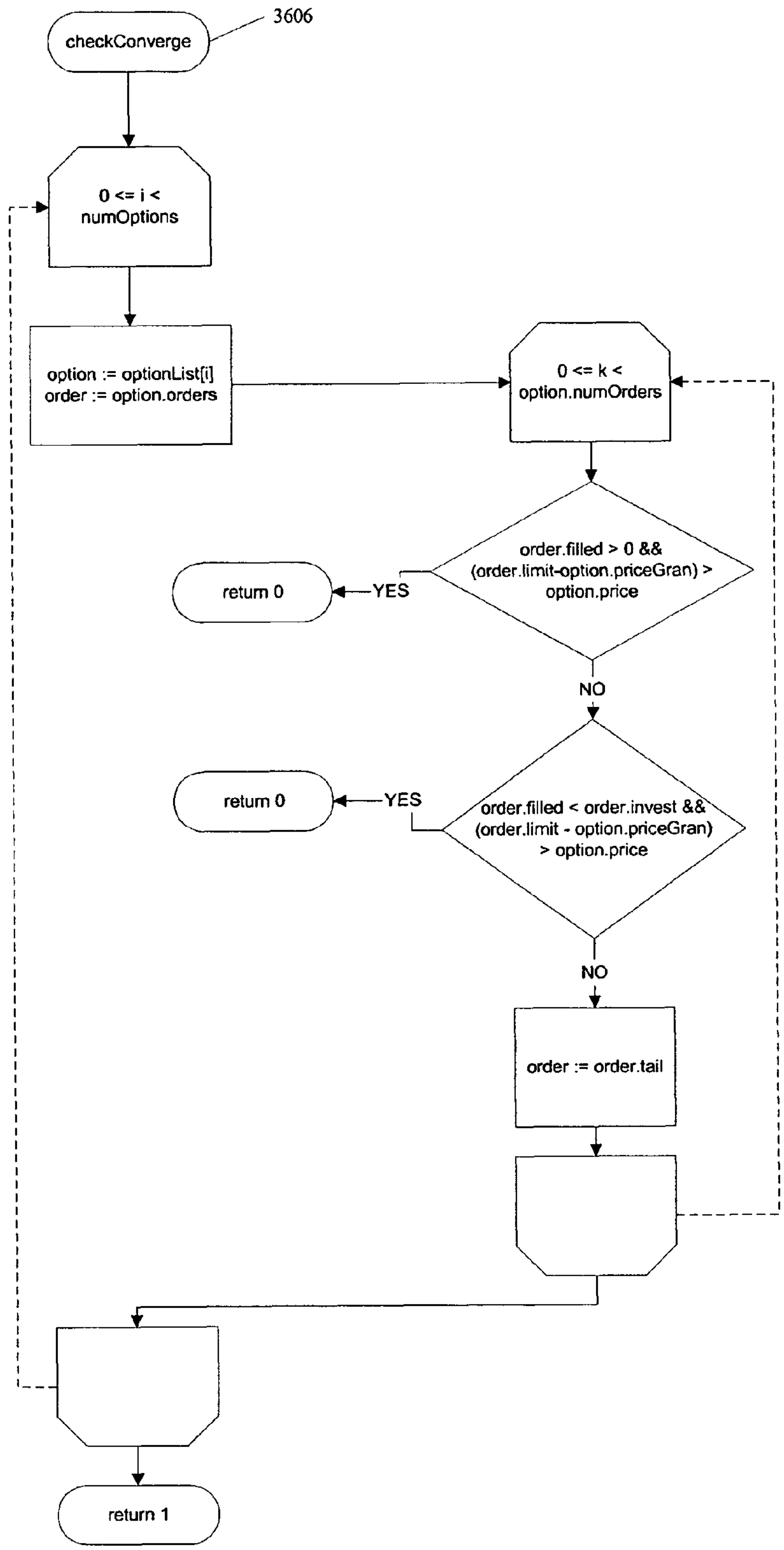

Figure 45. addFill 4002
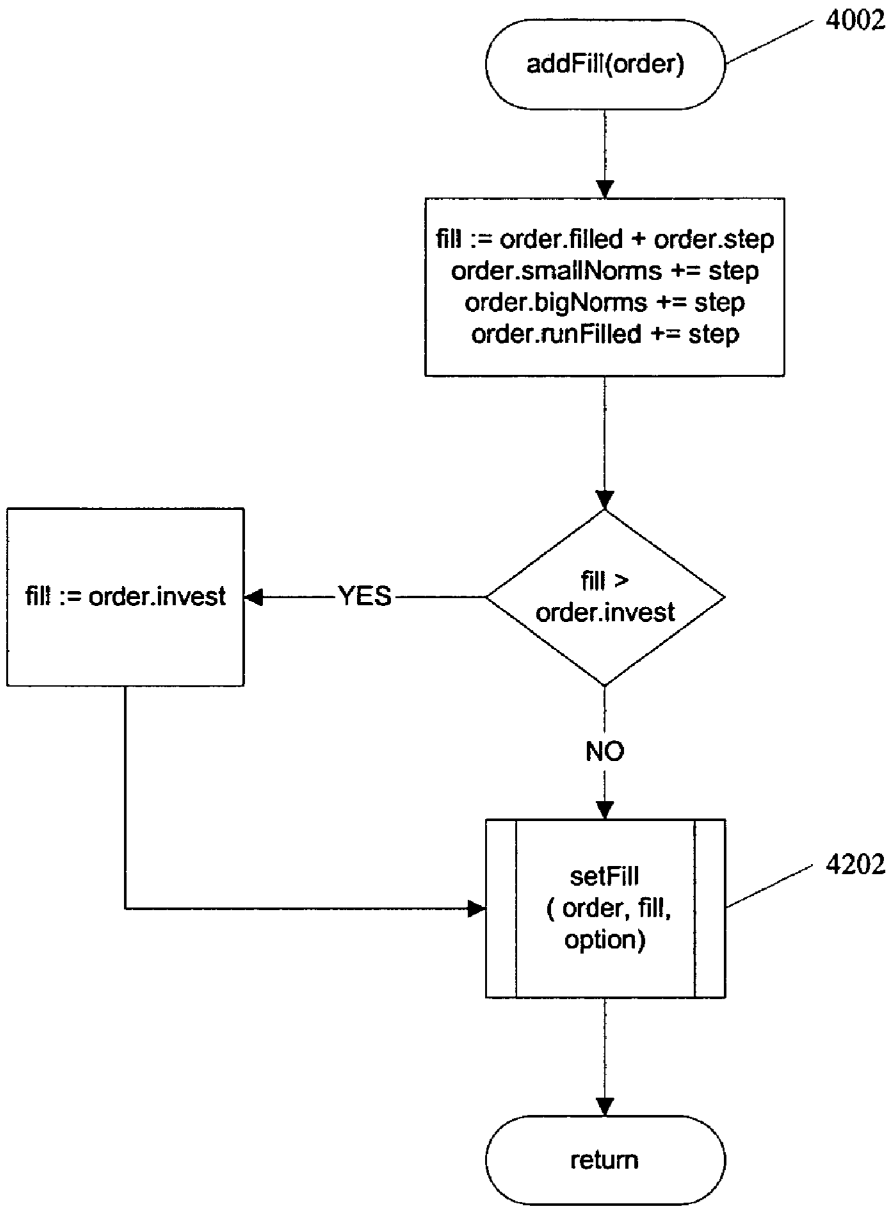

Figure 46. decreaseFill 4004
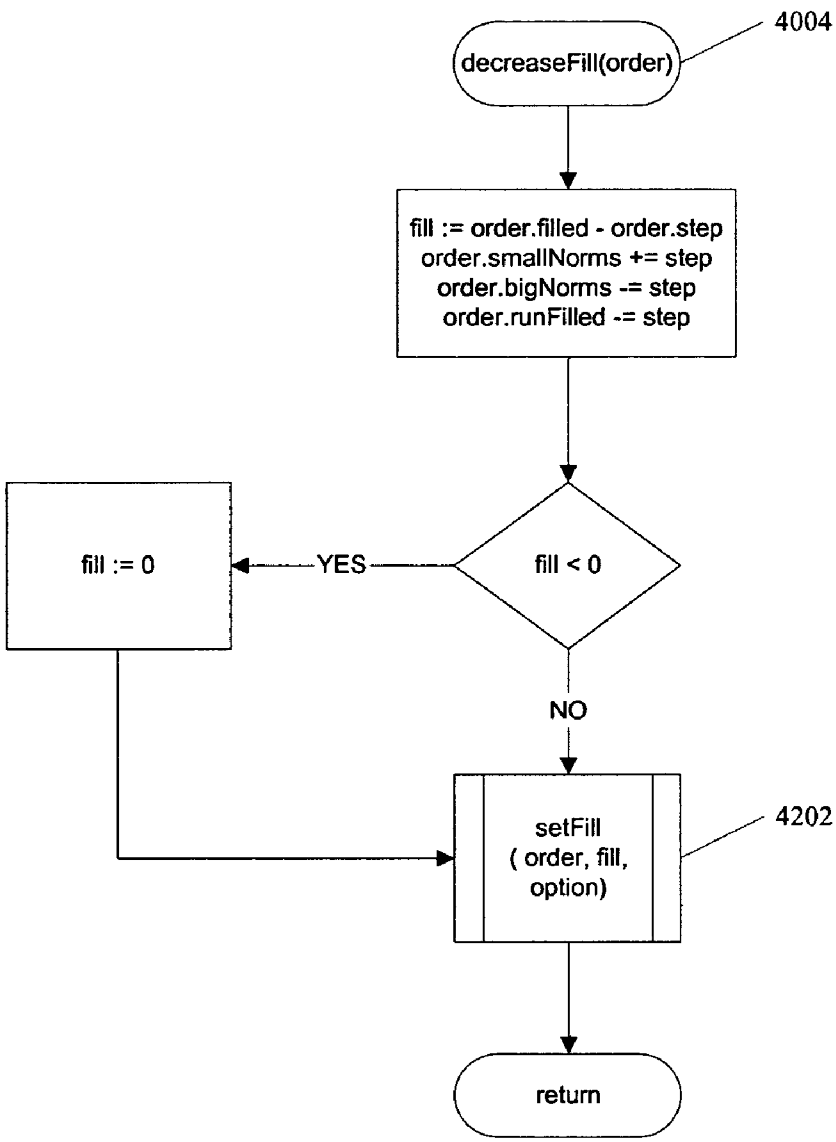

Figure 47. scaleOrders 3502
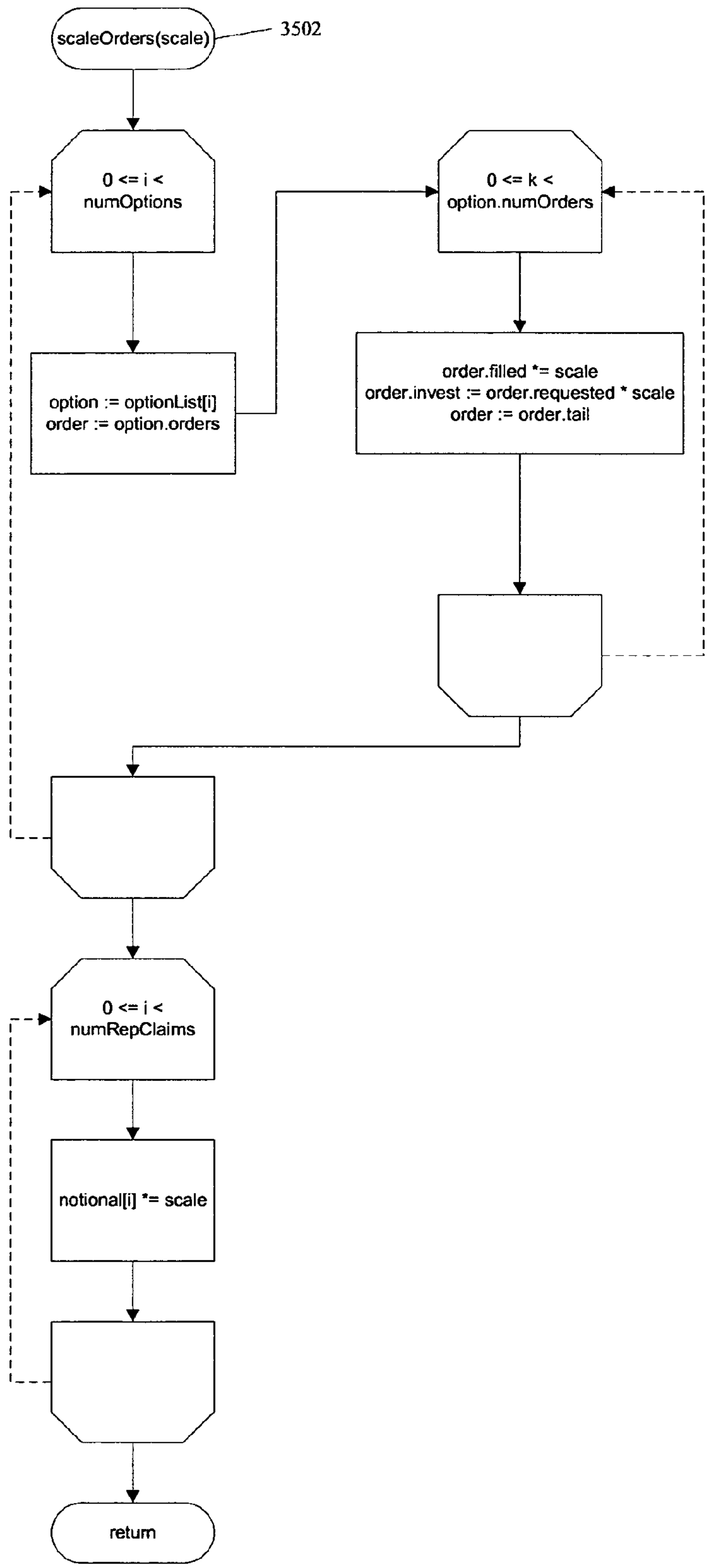

Figure 48. phaseTwo 3516
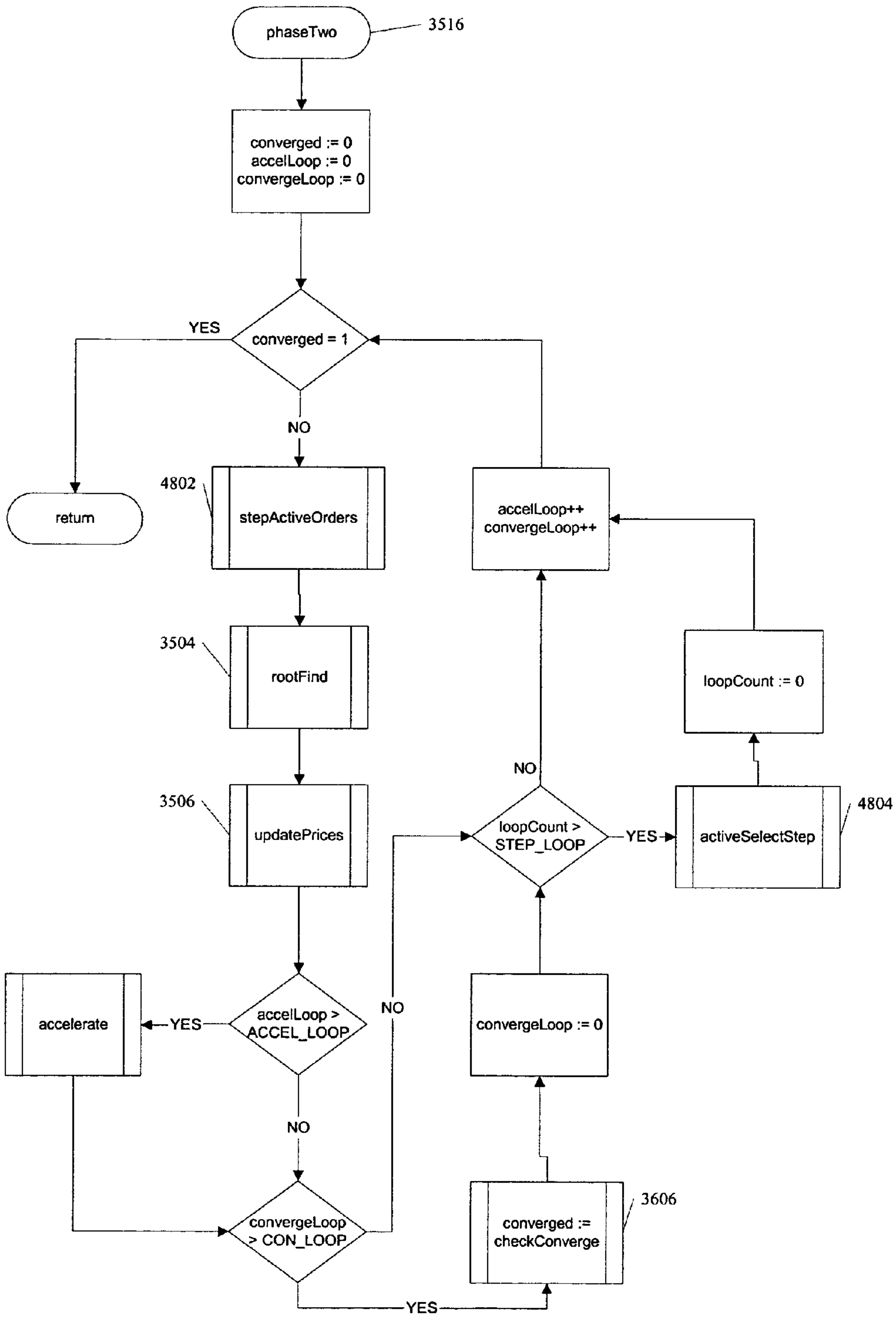

Figure 49. runLp 3518
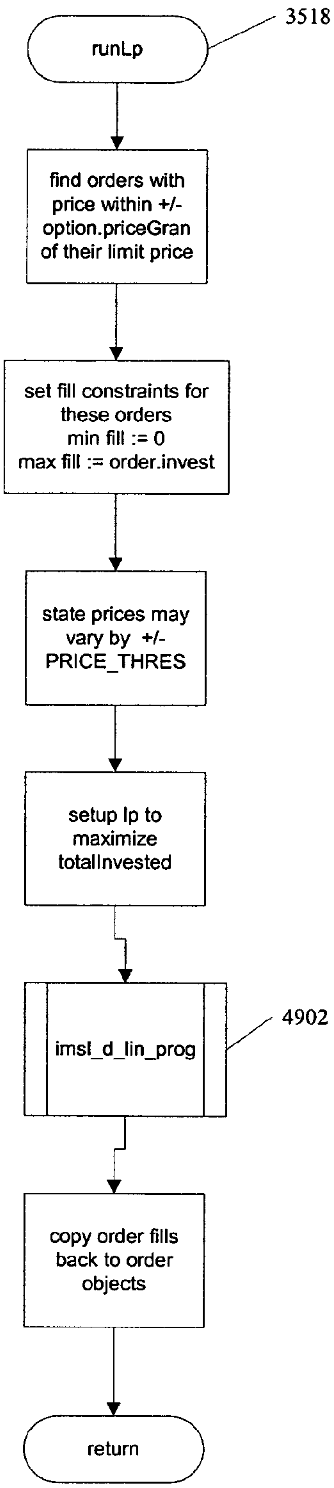

Figure 50. roundPrices 3512
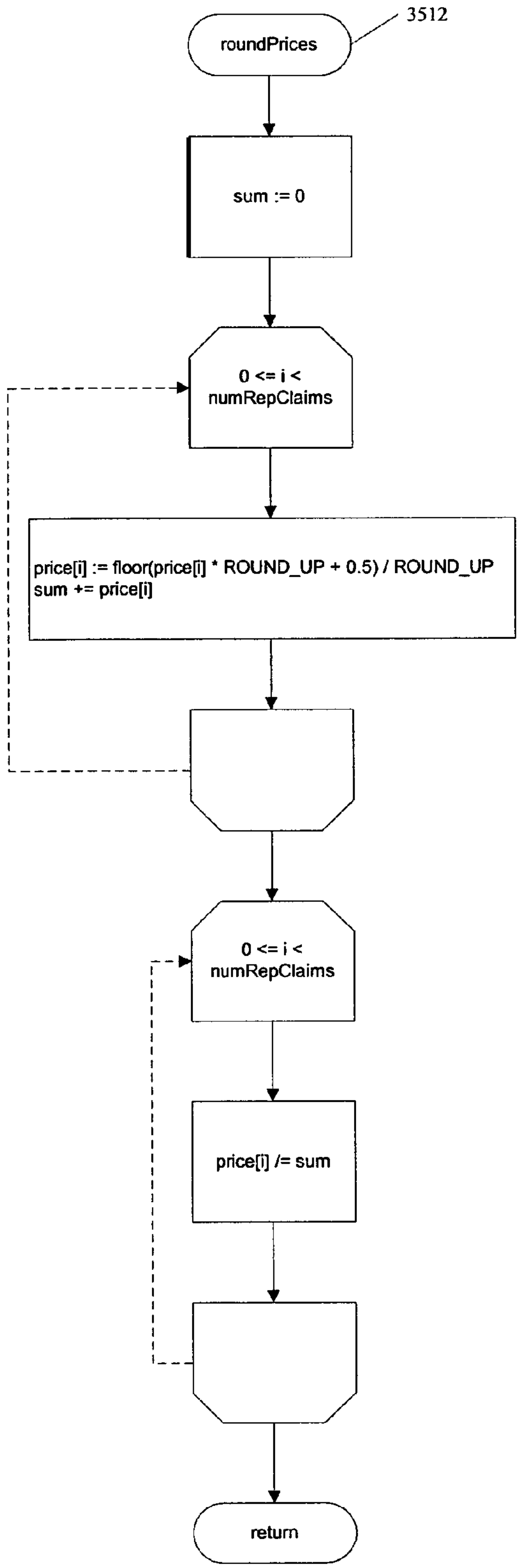

Figure 51. findActiveOrders 3514
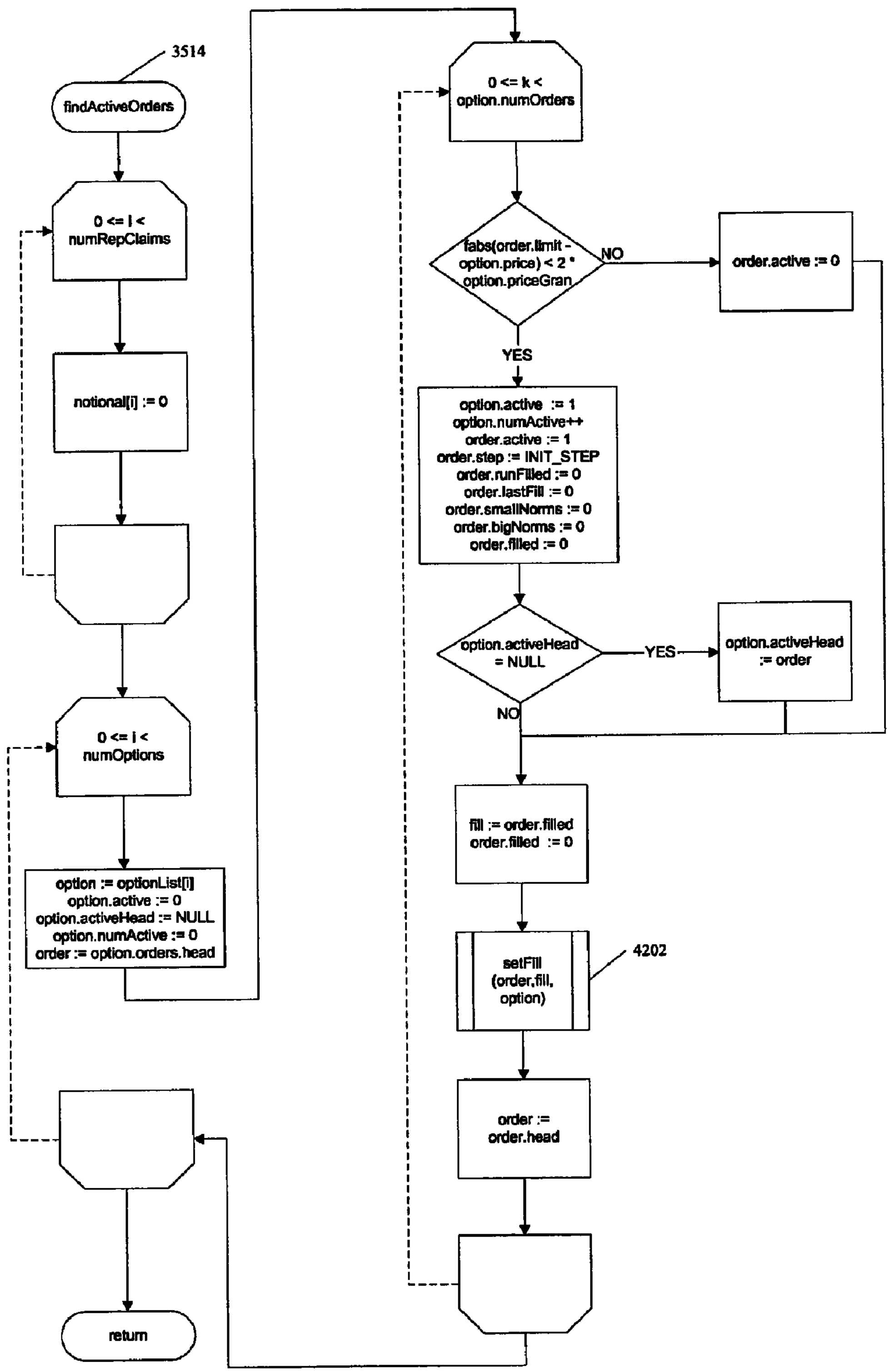

Figure 52. activeSelectStep 4804
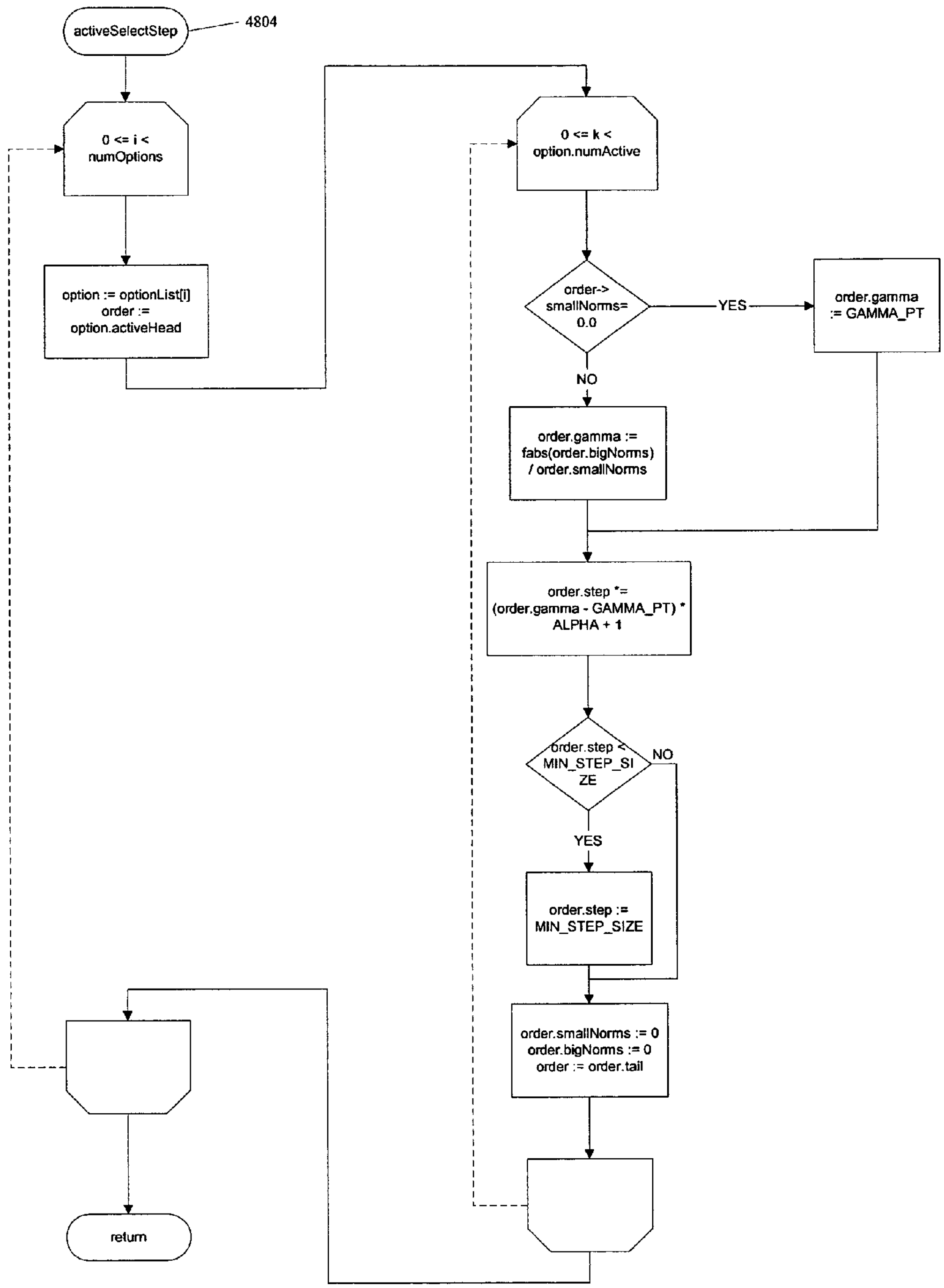

Figure 53. stepActiveOrders 4802
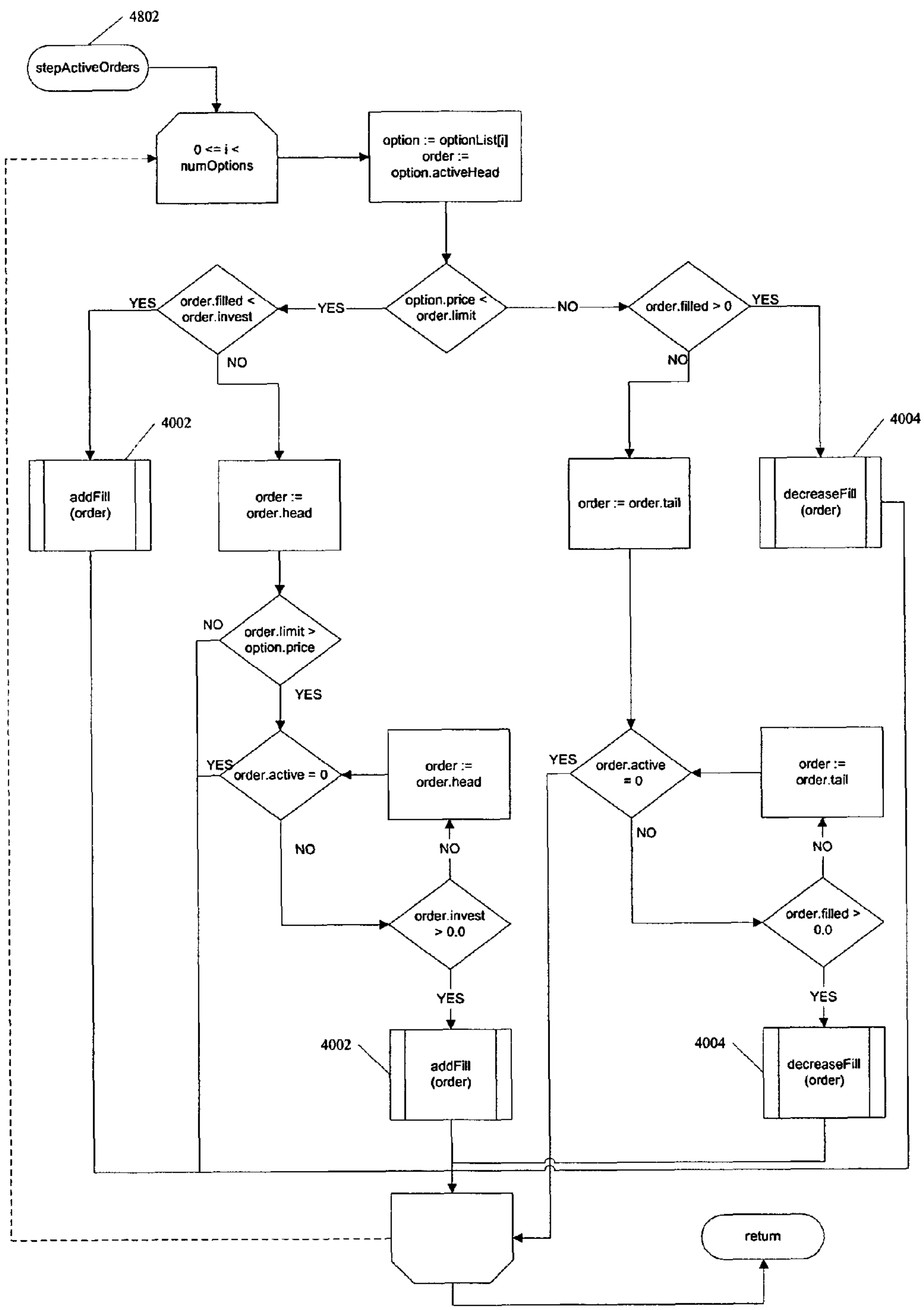

Figure 54. addTxToEqEngine 3408
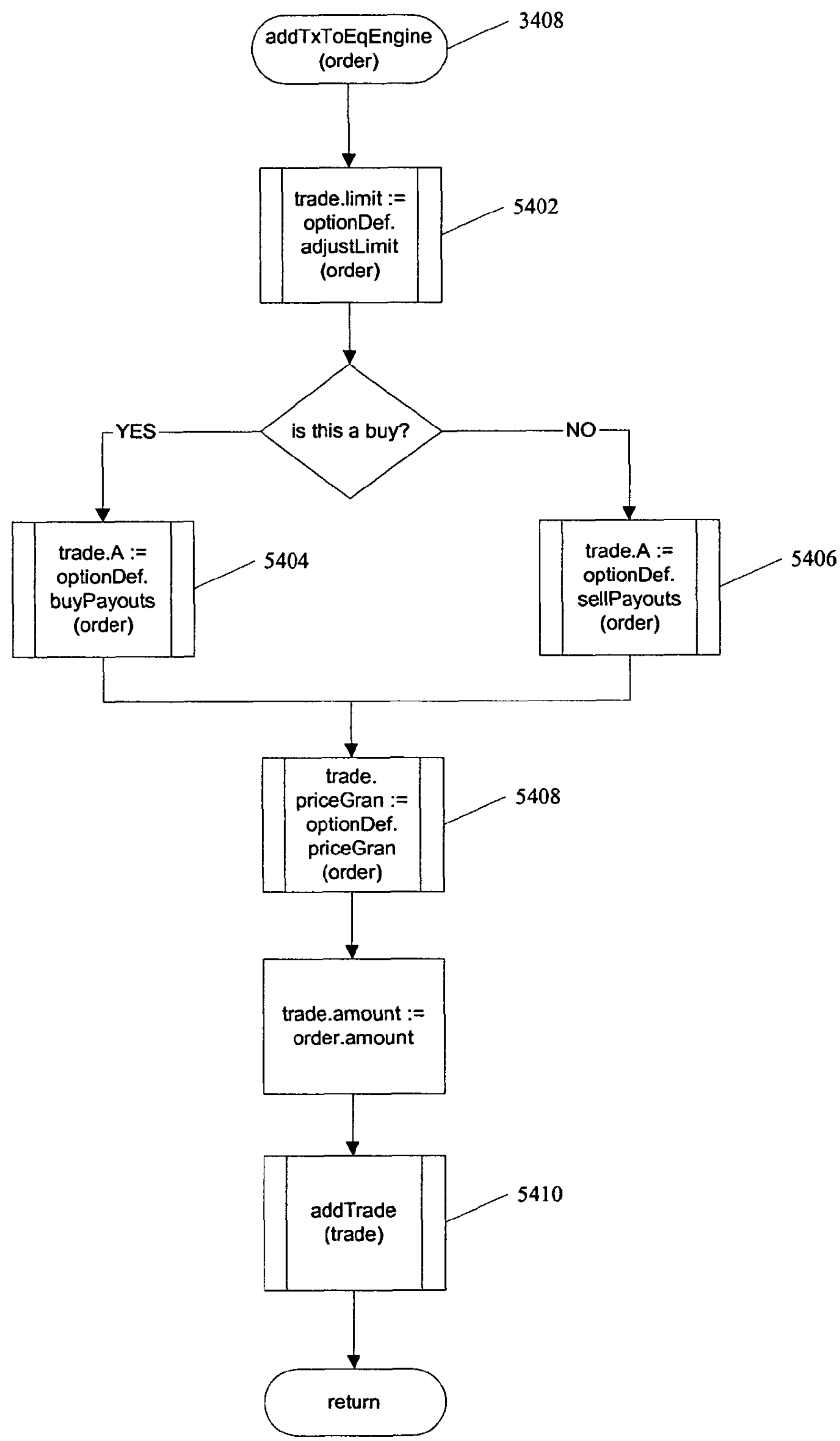

Figure 55. addTrade 5410
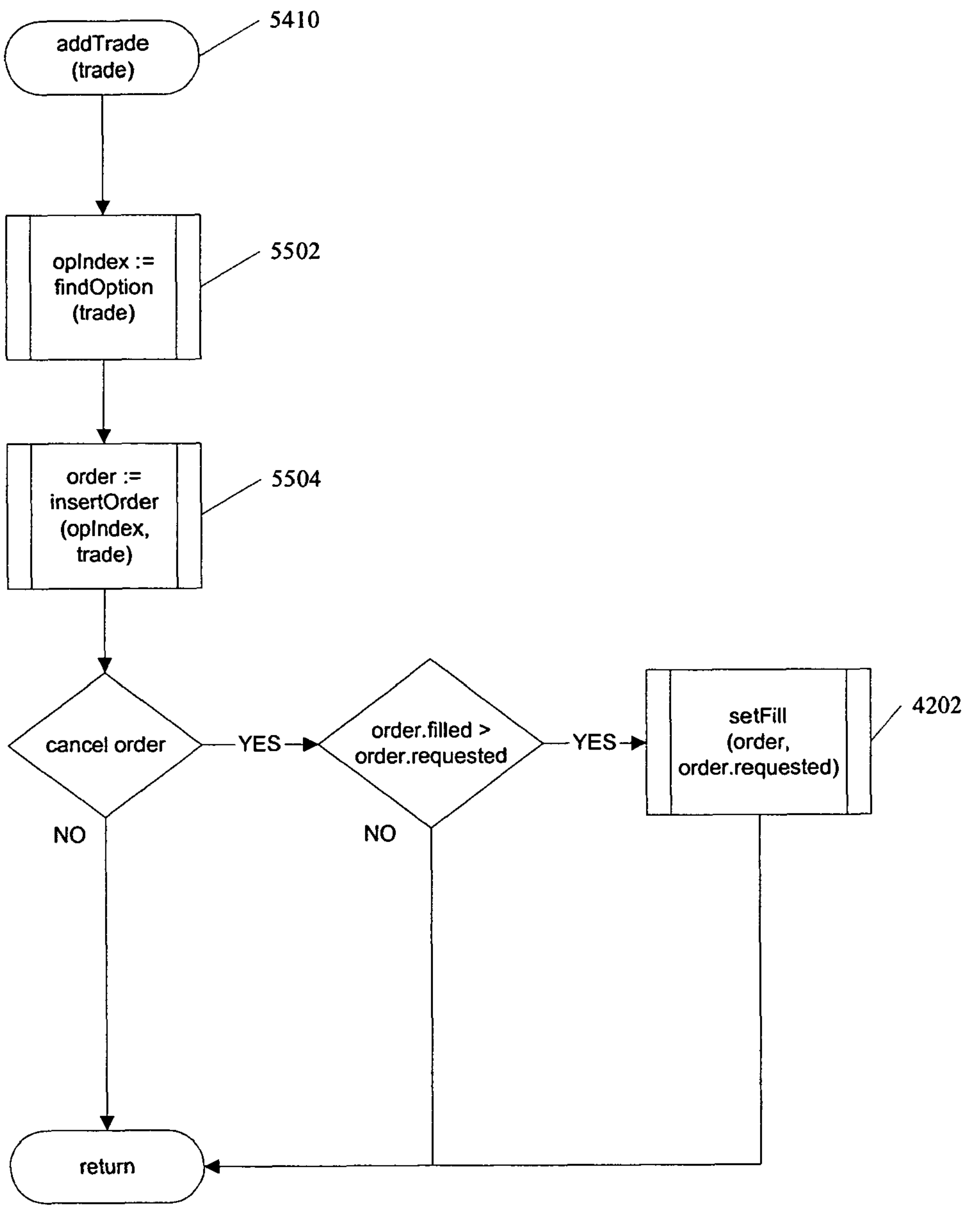

Figure 56. findOption 5600
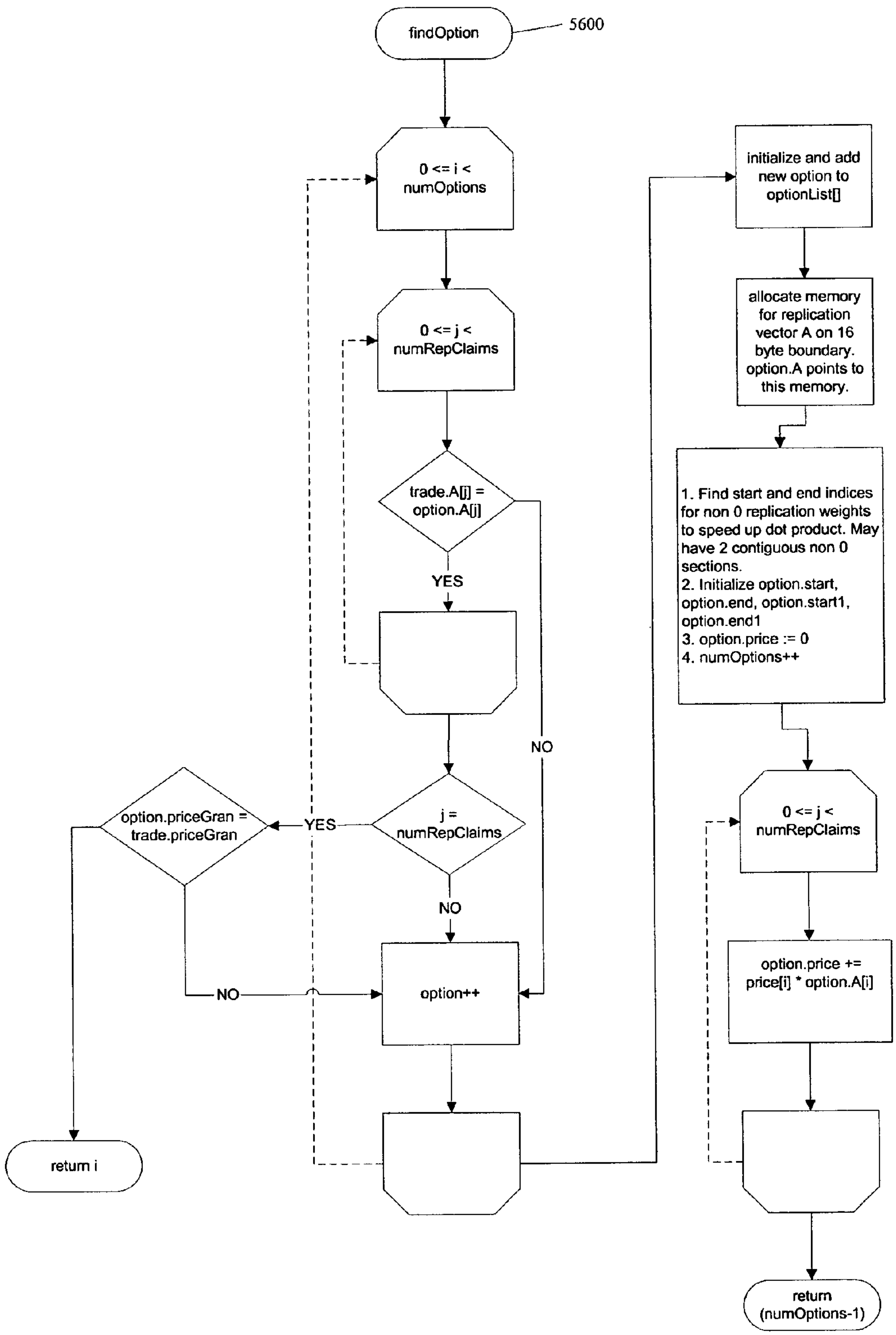

Figure 57. insertOrder 5700
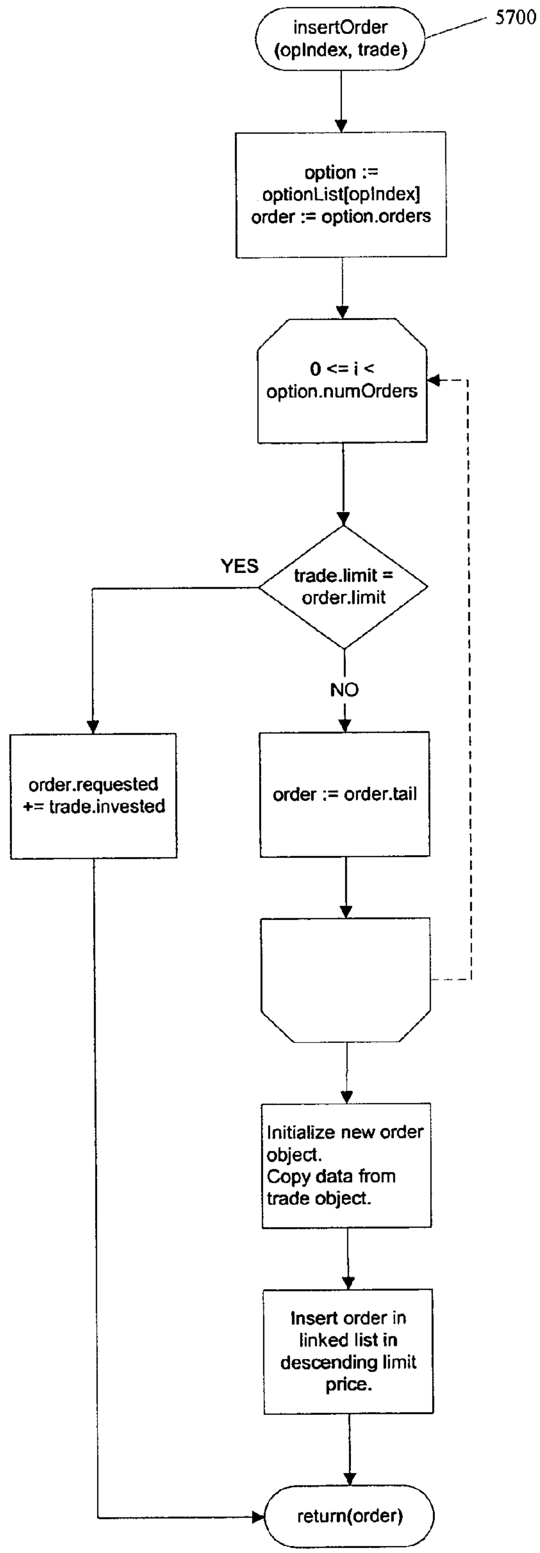

Figure 58. InitEqEngine 3404
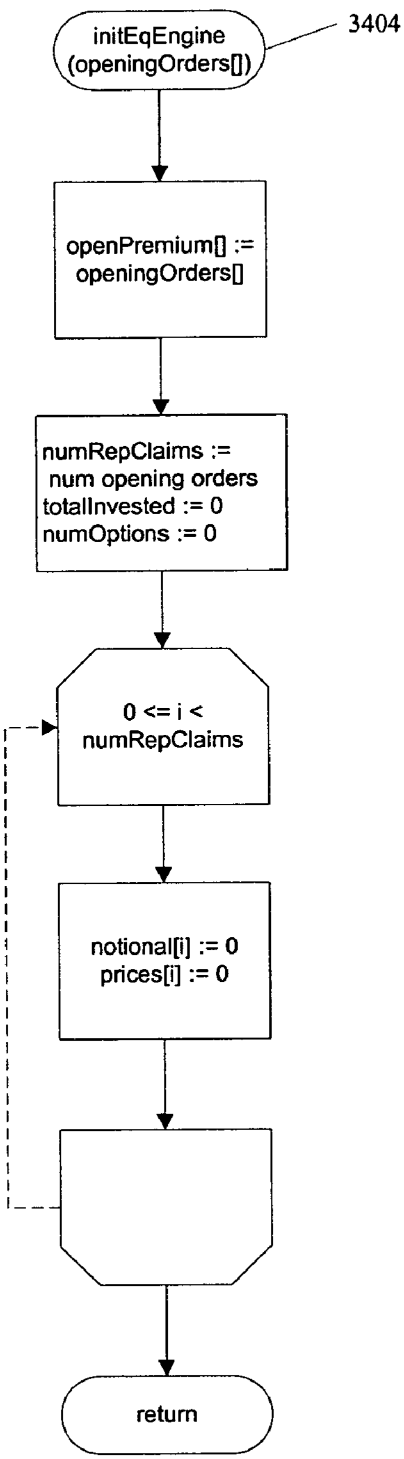

Figure 59. optionDef.computePayouts 5900
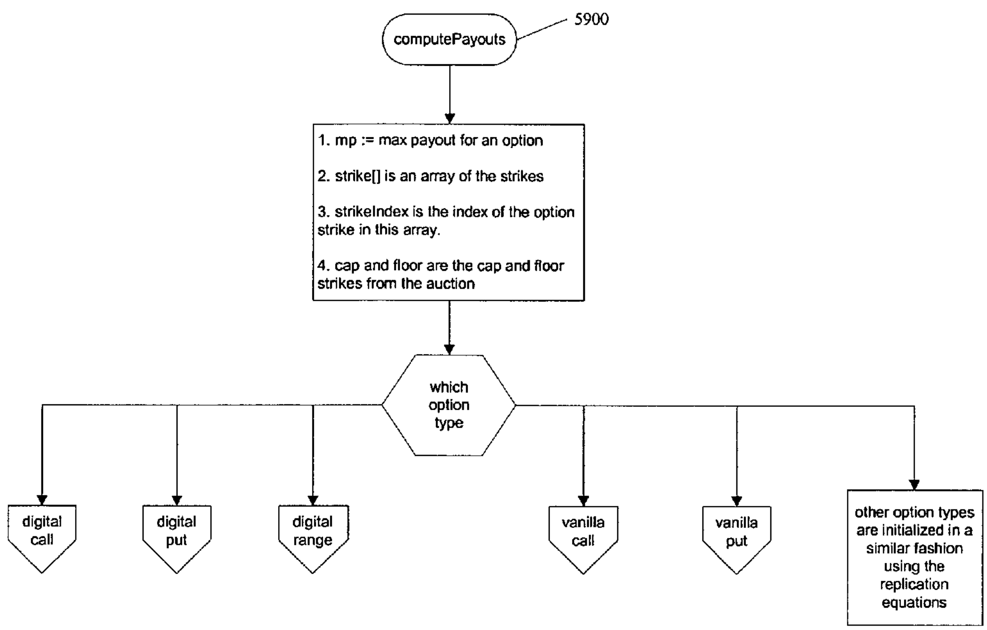

Figure 60. digital
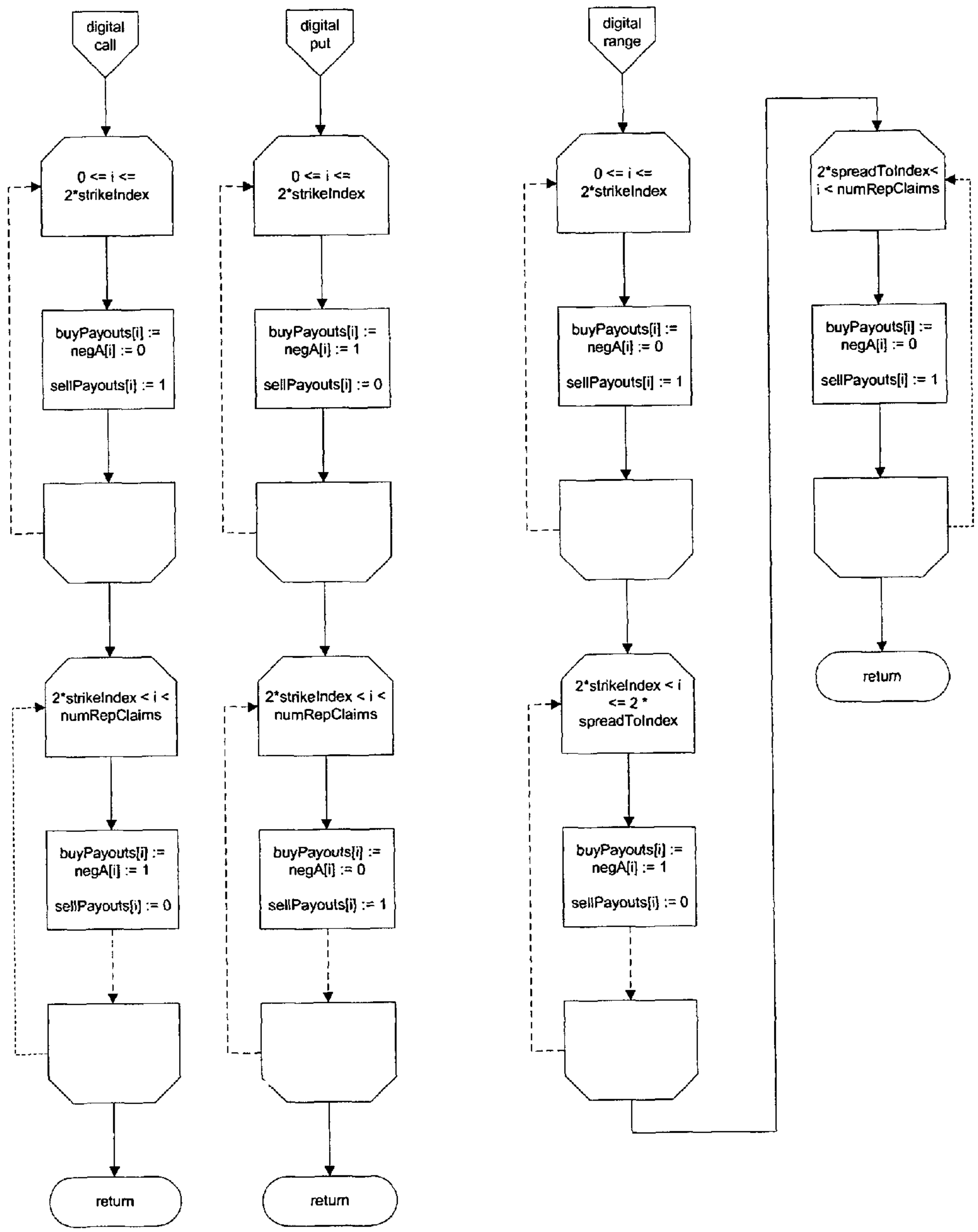

Figure 61. vanillaPutCall
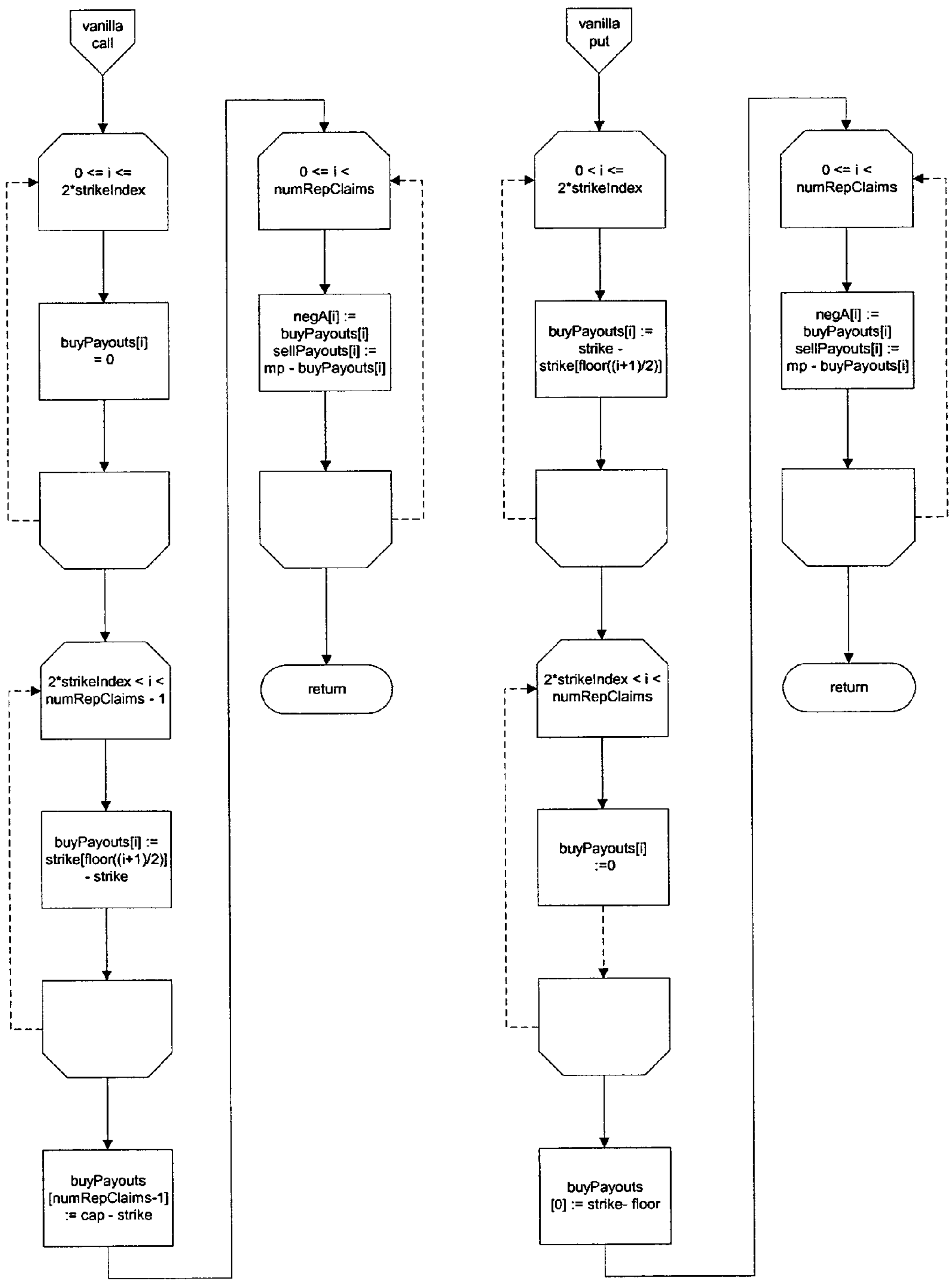

Figure 62. Ie 3218 Implementation
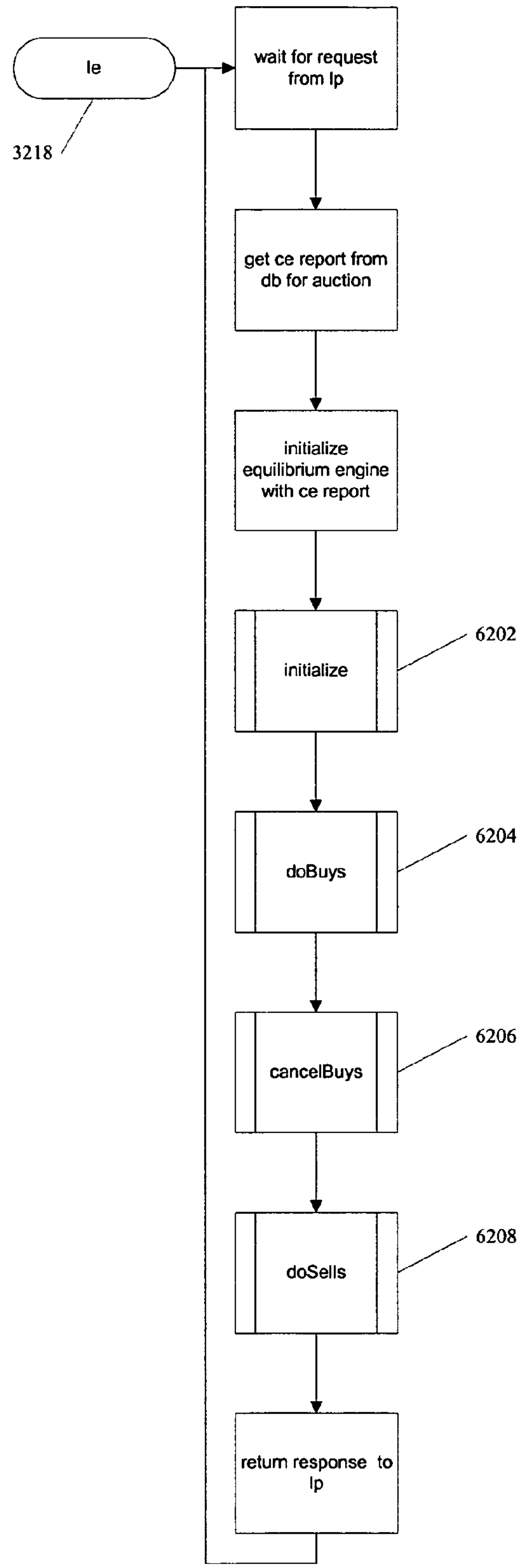

Figure 63. initialize 6202
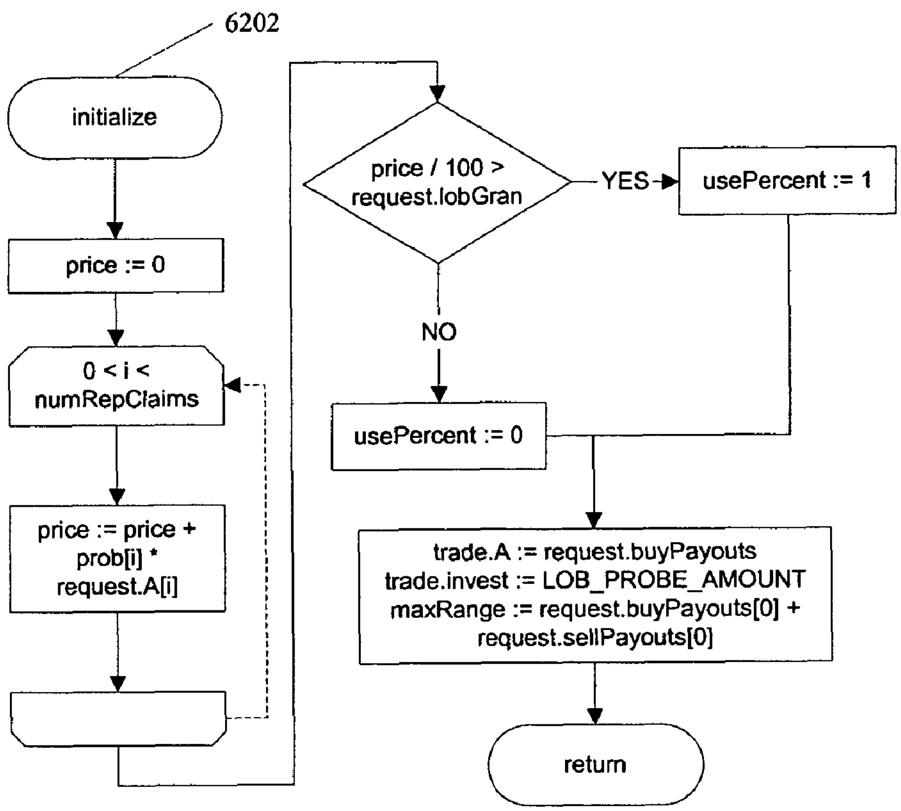

Figure 64. doBuys 6204
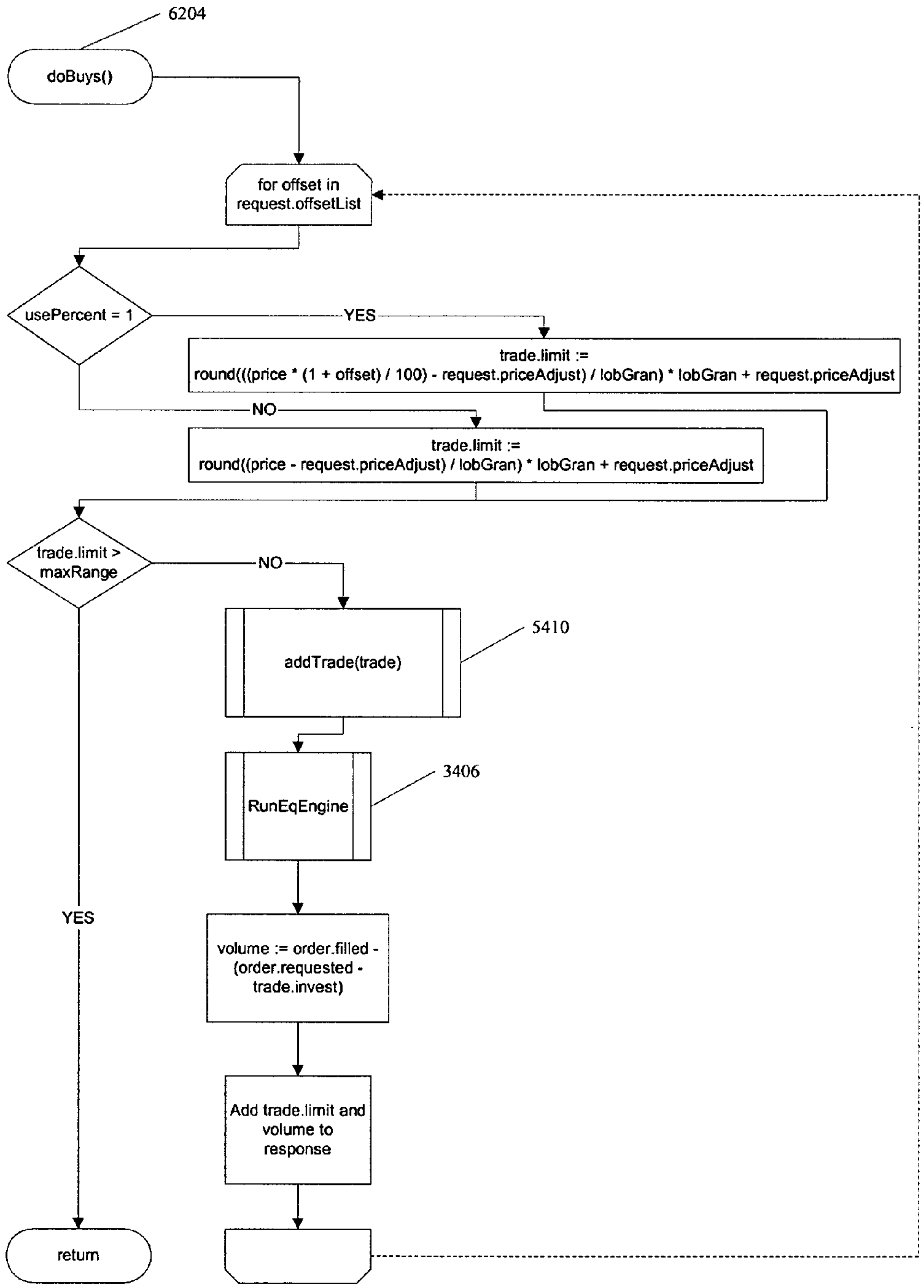

Figure 65. cancelBuys 6206
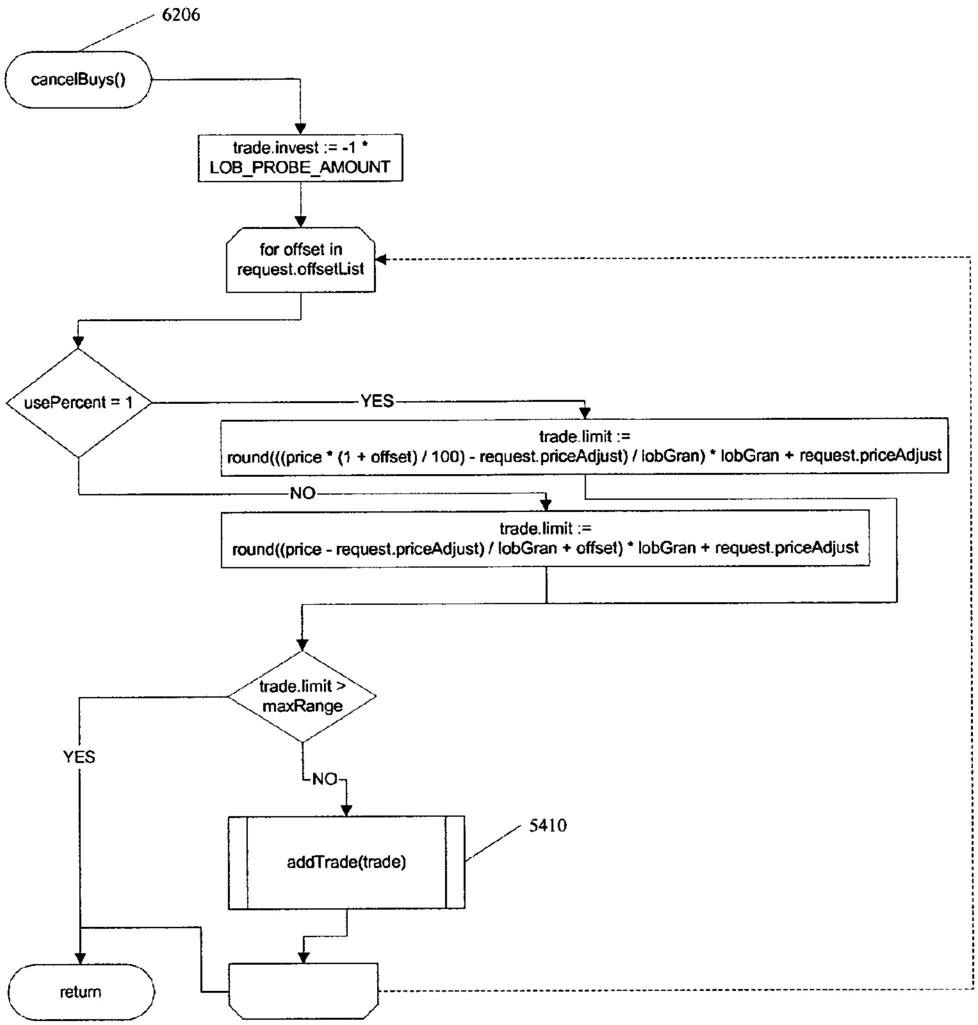

Figure 66. doSells 6208
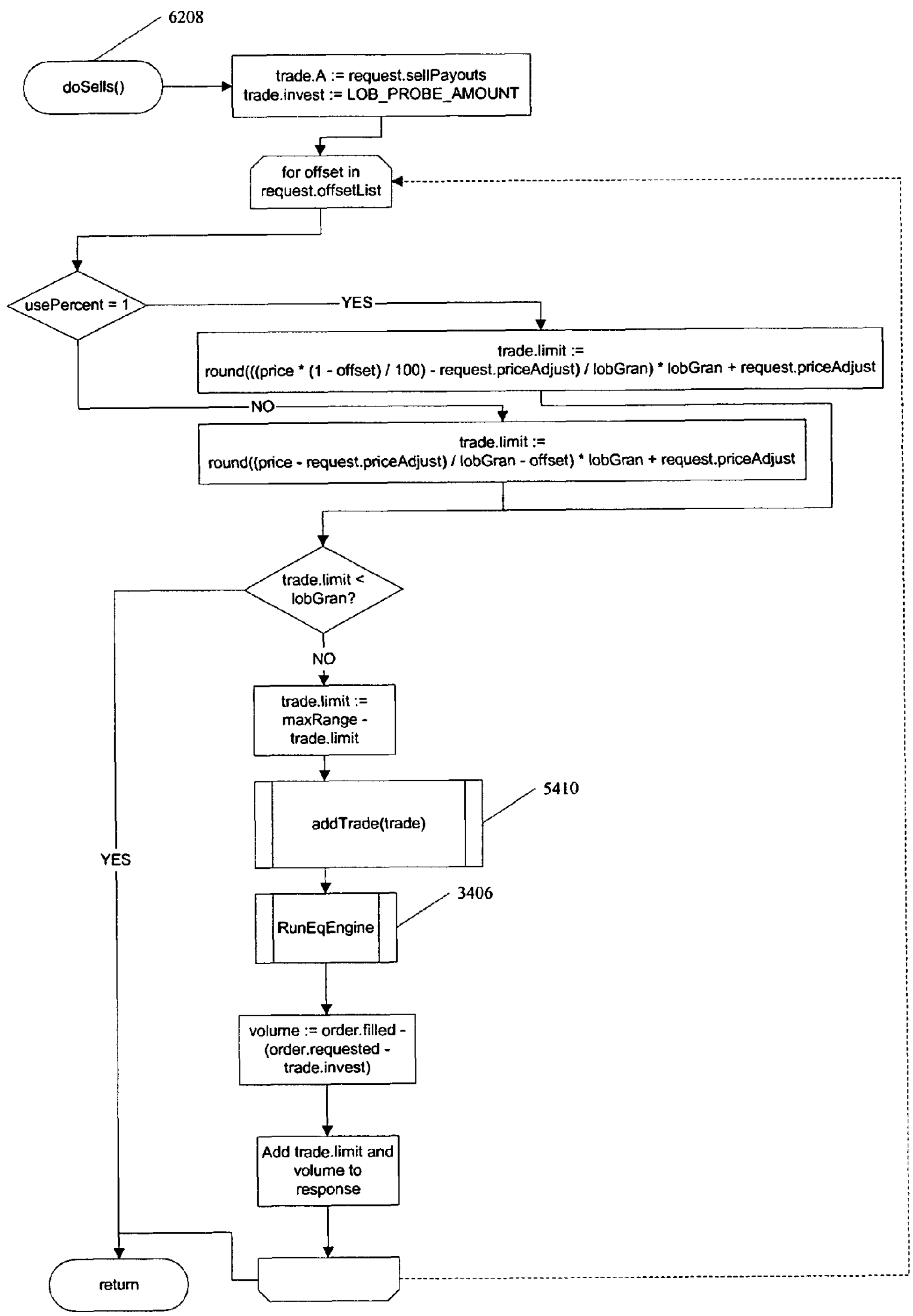

Figure 67. Network Architecture
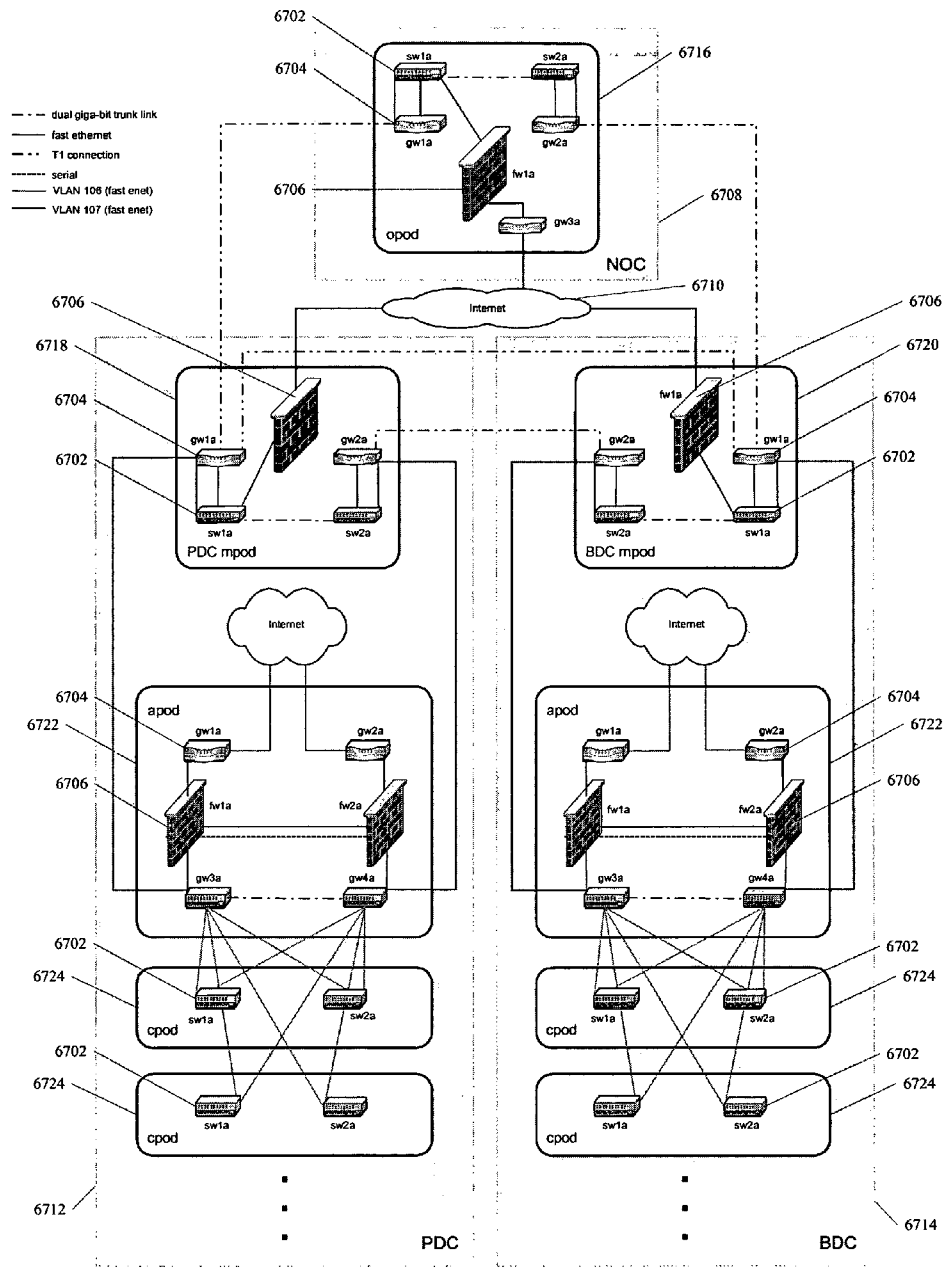

Figure 68. CPOD 6724
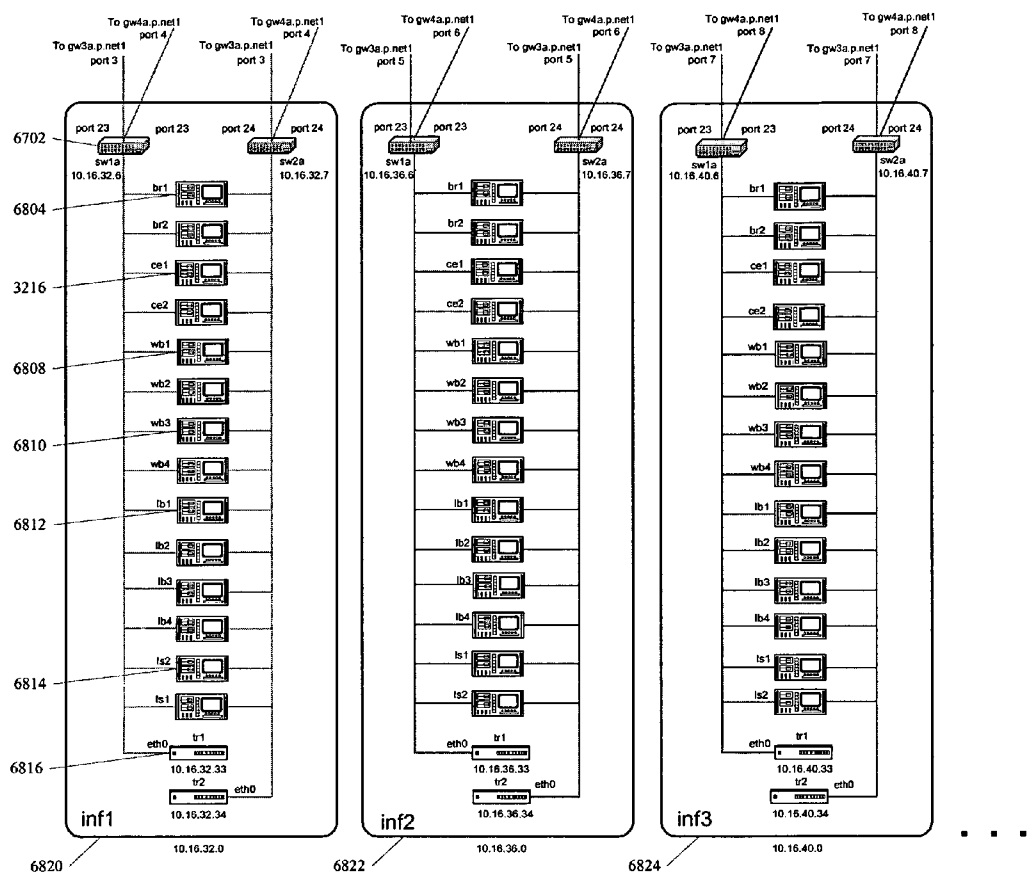

Fig. 69
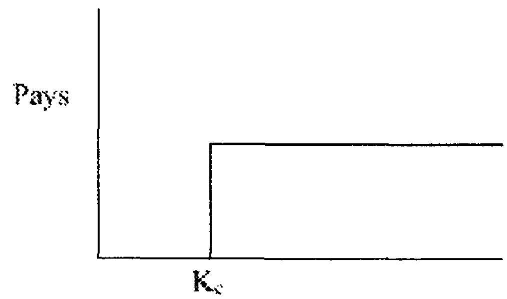
Graph 6.0.1 - Digital Call
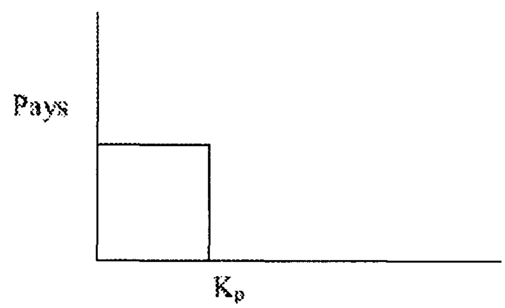
Graph 6.0.2 - Digital Put
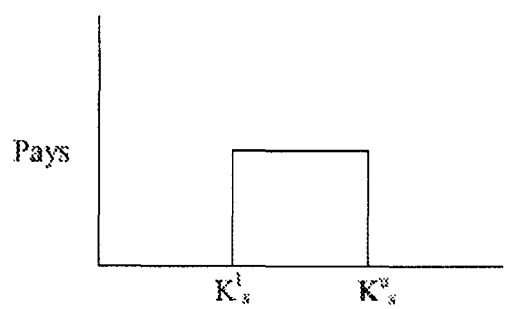
Graph 6.0.3 - Digital Spread
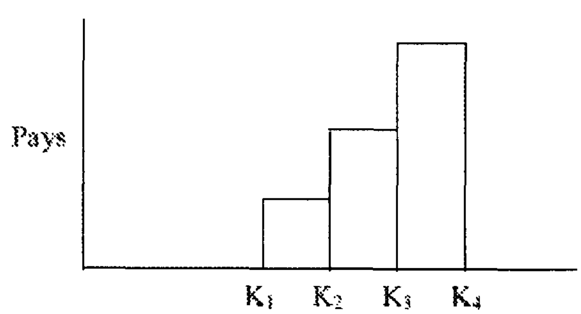
Graph 6.0.4 - Digital Strip Graph 13.1: Fixed Point Iteration for General Function g(x)

REPLICATED DERIVATIVES HAVING DEMAND-BASED, ADJUSTABLE RETURNS, AND TRADING EXCHANGE THEREFOR

RELATED APPLICATIONS

This application is a continuation-in-part of U.S. application Ser. No. 10/115,505, filed Apr. 2, 2002, which is a continuation-in-part of U.S. application Ser. No. 09/950,498, filed Sep. 10, 2001, which issued as U.S. Pat. No. 7,996,296; which is a continuation-in-part of U.S. application Ser. No. 09/809,025, filed Mar. 16, 2001, which issued as U.S. Pat. No. 7,225,153; which is a continuation-in-part of U.S. application Ser. No. 09/774,816, initially filed Jan. 30, 2001 and attributed a filing date of Apr. 3, 2001, which issued as U.S. Pat. No. 7,389,262, and which is the United States national stage application under 35 U.S.C. §371 of Patent Cooperation Treaty Application Serial No. PCT/US00/19447, filed Jul. 18, 2000; which is a continuation of U.S. application Ser. No. 09/448,822, filed Nov. 24, 1999, which issued as U.S. Pat. No. 6,321,212; which claims the benefit, under 35 U.S.C. §119 (e), of United States Provisional Patent Application Ser. No. 60/144,890, filed Jul. 21, 1999. Each of the applications referred to in this paragraph is incorporated herein by reference in its entirety.

COPYRIGHT NOTICE

This document contains material that is subject to copyright protection. The applicant has no objection to the facsimile reproduction of this patent document, as it appears in the U.S. Patent and Trademark Office (PTO) patent file or records or in any publication by the PTO or counterpart foreign or international instrumentalities. The applicant otherwise reserves all copyright rights whatsoever.

FIELD OF THE INVENTION

This invention relates to systems and methods for demand-based trading. More specifically, this invention relates to methods and systems for trading financial products and derivatives strategies, including digital options and other derivatives, replicating them with replicating claims having demand-based adjustable returns, and determining the returns and the pricing of the replicated financial products and derivatives strategies.

BACKGROUND OF THE INVENTION

With the rapid increase in usage and popularity of the public Internet, the growth of electronic Internet-based trading of securities has been dramatic. In the first part of 1999, online trading via the Internet was estimated to make up approximately 15% of all stock trades. This volume has been growing at an annual rate of approximately 50%. High growth rates are projected to continue for the next few years, as increasing volumes of Internet users use online trading accounts.

Online trading firms such as E-Trade Group, Charles Schwab, and Ameritrade have all experienced significant growth in revenues due to increases in online trading activity. These companies currently offer Internet-based stock trading services, which provide greater convenience and lower commission rates for many retail investors, compared to traditional securities brokerage services. Many expect online trading to expand to financial products other than equities, such as bonds, foreign exchange, and financial instrument derivatives.

Financial products such as stocks, bonds, foreign exchange contracts, exchange traded futures and options, as well as contractual assets or liabilities such as reinsurance contracts or interest-rate swaps, all involve some measure of risk. The risks inherent in such products are a function of many factors, including the uncertainty of events, such as the Federal Reserve's determination to increase the discount rate, a sudden increase in commodity prices, the change in value of an underlying index such as the Dow Jones Industrial Average, or an overall increase in investor risk aversion. In order to better analyze the nature of such risks, financial economists often treat the real-world financial products as if they were combinations of simpler, hypothetical financial products. These hypothetical financial products typically are designed to pay one unit of currency, say one dollar, to the trader or investor if a particular outcome among a set of possible outcomes occurs. Possible outcomes may be said to fall within "states," which are typically constructed from a distribution of possible outcomes (e.g., the magnitude of the change in the Federal Reserve discount rate) owing to some real-world event (e.g., a decision of the Federal Reserve regarding the discount rate). In such hypothetical financial products, a set of states is typically chosen so that the states are mutually exclusive and the set collectively covers or exhausts all possible outcomes for the event. This arrangement entails that, by design, exactly one state always occurs based on the event outcome.

These hypothetical financial products (also known as Arrow-Debreu securities, state securities, or pure securities) are designed to isolate and break-down complex risks into distinct sources, namely, the risk that a distinct state will occur. Such hypothetical financial products are useful since the returns from more complicated securities, including real-world financial products, can be modeled as a linear combination of the returns of the hypothetical financial products. See, e.g., R. Merton, *Continuous-Time Finance* (1990), pp. 441 ff. Thus, such hypothetical financial products are frequently used today to provide the fundamental building blocks for analyzing more complex financial products.

In recent years, the growth in derivatives trading has also been enormous. According to the Federal Reserve, the annualized growth rate in foreign exchange and interest rate derivatives turnover alone is running at about 20%. Corporations, financial institutions, farmers, and even national governments and agencies are all active in the derivatives markets, typically to better manage asset and liability portfolios, hedge financial market risk, and minimize costs of capital funding. Money managers also frequently use derivatives to hedge and undertake economic exposure where there are inherent risks, such as risks of fluctuation in interest rates, foreign exchange rates, convertibility into other securities or outstanding purchase offers for cash or exchange offers for cash or securities.

Derivatives are traded on exchanges, such as the option and futures contracts traded on the Chicago Board of Trade ("CBOT"), as well as off-exchange or over-the-counter ("OTC") between two or more derivative counterparties. On the major exchanges that operate trading activity in derivatives, orders are typically either transmitted electronically or via open outcry in pits to member brokers who then execute the orders. These member brokers then usually balance or hedge their own portfolio of derivatives to suit their own risk and return criteria. Hedging is customarily accomplished by trading in the derivatives' underlying securities or contracts (e.g., a futures contract in the case of an option on that future) or in similar derivatives (e.g., futures expiring in different calendar months). For OTC derivatives, brokers or dealers customarily seek to balance their active portfolios of derivatives in accordance with the trader's risk management guidelines and profitability criteria.

Broadly speaking then, there are two widely utilized means by which derivatives are currently traded: (1) order-matching and (2) principal market making. Order matching is a model followed by exchanges such as the CBOT or the Chicago Mercantile Exchange and some newer online exchanges. In order matching, the exchange coordinates the activities of buyers and sellers so that "bids" to buy (i.e., demand) can be paired off with "offers" to sell (i.e., supply). Orders may be matched both electronically and through the primary market making activities of the exchange members. Typically, the exchange itself takes no market risk and covers its own cost of operation by selling memberships to brokers. Member brokers may take principal positions, which are often hedged across their portfolios.

In principal market making, a bank or brokerage firm, for example, establishes a derivatives trading operation, capitalizes it, and makes a market by maintaining a portfolio of derivatives and underlying positions. The market maker usually hedges the portfolio on a dynamic basis by continually changing the composition of the portfolio as market conditions change. In general, the market maker strives to cover its cost of operation by collecting a bid-offer spread and through the scale economies obtained by simultaneously hedging a portfolio of positions. As the market maker takes significant market risk, its counterparties are exposed to the risk that it may go bankrupt. Additionally, while in theory the principal market making activity could be done over a wide area network, in practice derivatives trading is today usually accomplished via the telephone. Often, trades are processed laboriously, with many manual steps required from the front office transaction to the back office processing and clearing.

In theory—that is, ignoring very real transaction costs (described below)—derivatives trading is, in the language of game theory, a "zero sum" game. One counterparty's gain on a transaction should be exactly offset by the corresponding counterparty's loss, assuming there are no transaction costs. In fact, it is the zero sum nature of the derivatives market which first allowed the well-known Black-Scholes pricing model to be formulated by noting that a derivative such as an option could be paired with an exactly offsetting position in the underlying security so as to eliminate market risk over short periods of time. It is this "no arbitrage" feature that allows market participants using sophisticated valuation models to mitigate market risk by continually adjusting their portfolios. Stock markets, by contrast, do not have this zero sum feature, as the total stock or value of the market fluctuates due to factors such as interest rates and expected corporate earnings, which are "external" to the market in the sense that they cannot readily be hedged.

The return to a trader of a traditional derivative product is, in most cases, largely determined by the value of the underlying security, asset, liability or claim on which the derivative is based. For example, the value of a call option on a stock, which gives the holder the right to buy the stock at some future date at a fixed strike price, varies directly with the price of the underlying stock. In the case of non-financial derivatives such as reinsurance contracts, the value of the reinsurance contract is affected by the loss experience on the underlying portfolio of insured claims. The prices of traditional derivative products are usually determined by supply and demand for the derivative based on the value of the underlying security (which is itself usually determined by supply and demand, or, as in the case of insurance, by events insured by the insurance or reinsurance contract).

At present, market-makers can offer derivatives products to their customers in markets where:

Sufficient natural supply and demand exist
Risks are measurable and manageable
Sufficient capital has been allocated A failure to satisfy one or more of these conditions in certain capital markets may inhibit new product development, resulting in unsatisfied customer demand.

Currently, the costs of trading derivative securities (both on and off the exchanges) and transferring insurance risk are considered to be high for a number of reasons, including:

(1) Credit Risk: A counterparty to a derivatives (or insurance contract) transaction typically assumes the risk that its counterparty will go bankrupt during the life of the derivatives (or insurance) contract. Margin requirements, credit monitoring, and other contractual devices, which may be costly, are customarily employed to manage derivatives and insurance counterparty credit risk.

(2) Regulatory Requirements: Regulatory bodies, such as the Federal Reserve, Comptroller of the Currency, the Commodities Futures Trading Commission, and international bodies that promulgate regulations affecting global money center banks (e.g., Basle Committee guidelines) generally require institutions dealing in derivatives to meet capital requirements and maintain risk management systems. These requirements are considered by many to increase the cost of capital and barriers to entry for some entrants into the derivatives trading business, and thus to increase the cost of derivatives transactions for both dealers and end users. In the United States, state insurance regulations also impose requirements on the operations of insurers, especially in the property-casualty lines where capital demands may be increased by the requirement that insurers reserve for future losses without regard to interest rate discount factors.

(3) Liquidity: Derivatives traders typically hedge their exposures throughout the life of the derivatives contract. Effective hedging usually requires that an active or liquid market exist, throughout the life of the derivative contract, for both the underlying security and the derivative. Frequently, especially in periods of financial market shocks and disequilibria, liquid markets do not exist to support a well-functioning derivatives market.

(4) Transaction Costs: Dynamic hedging of derivatives often requires continual transactions in the market over the life of the derivative in order to reduce, eliminate, and manage risk for a derivative or portfolio of derivative securities. This usually means paying bid-offers spreads for each hedging transaction, which can add significantly to the price of the derivative security at inception compared to its theoretical price in absence of the need to pay for such spreads and similar transaction costs.

(5) Settlement and Clearing Costs: The costs of executing, electronically booking, clearing, and settling derivatives transactions can be large, sometimes requiring analytical and database software systems and personnel knowledgeable in such transactions. While a goal of many in the securities processing industry is to achieve "straight-through-processing" of derivatives transactions, many derivatives counterparties continue to manage the processing of these transactions using a combination of electronic and manual steps which are not particularly integrated or automated and therefore add to costs.

(6) Event Risk: Most traders understand effective hedging of derivatives transactions to require markets to be liquid and to exhibit continuously fluctuating prices without sudden and dramatic "gaps." During periods of financial crises and disequilibria, it is not uncommon to observe dramatic repricing of underlying securities by 50% or more in a period of hours. The event risk of such crises and disequilibria are therefore customarily factored into derivatives prices by dealers, which increases the cost of derivatives in excess of the theoretical prices indicated by derivatives valuation models. These costs are usually spread across all derivatives users.

(7) Model Risk: Derivatives contracts can be quite difficult to value, especially those involving interest rates or features which allow a counterparty to make decisions throughout the life of the derivative (e.g., American options allow a counterparty to realize the value of the derivative at any time during its life). Derivatives dealers will typically add a premium to derivatives prices to insure against the possibility that the valuation models may not adequately reflect market factors or other conditions throughout the life of the contract. In addition, risk management guidelines may require firms to maintain additional capital supporting a derivatives dealing operation where model risk is determined to be a significant factor. Model risk has also been a large factor in well-known cases where complicated securities risk management systems have provided incorrect or incomplete information, such as the Joe Jett/Kidder Peabody losses of 1994.

(8) Asymmetric Information: Derivatives dealers and market makers customarily seek to protect themselves from counterparties with superior information. Bid-offer spreads for derivatives therefore usually reflect a built-in insurance premium for the dealer for transactions with counterparties with superior information, which can lead to unprofitable transactions. Traditional insurance markets also incur costs due to asymmetric information. In property-casualty lines, the direct writer of the insurance almost always has superior information regarding the book of risks than does the assuming reinsurer. Much like the market maker in capital markets, the reinsurer typically prices its informational disadvantage into the reinsurance premiums.

(9) Incomplete Markets: Traditional capital and insurance markets are often viewed as incomplete in the sense that the span of contingent claims is limited, i.e., the markets may not provide opportunities to hedge all of the risks for which hedging opportunities are sought. As a consequence, participants typically either bear risk inefficiently or use less than optimal means to transfer or hedge against risk. For example, the demand by some investors to hedge inflation risk has resulted in the issuance by some governments of inflation-linked bonds which have coupons and principal amounts linked to Consumer Price Index (CPI) levels. This provides a degree of insurance against inflation risk. However, holders of such bonds frequently make assumptions as to the future relationship between real and nominal interest rates. An imperfect correlation between the contingent claim (in this case, inflation-linked bond) and the contingent event (inflation) gives rise to what traders call "basis risk," which is risk that, in today's markets, cannot be perfectly insured or hedged.

Currently, transaction costs are also considerable in traditional insurance and reinsurance markets. In recent years, considerable effort has been expended in attempting to securitize insurance risk such as property-casualty catastrophe risk. Traditional insurance and reinsurance markets in many respects resemble principal market-maker securities markets and suffer from many of the same shortcomings and incur similar costs of operation. Typically, risk is physically transferred contractually, credit status of counterparties is monitored, and sophisticated risk management systems are deployed and maintained. Capitalization levels to support insurance portfolios of risky assets and liabilities may be dramatically out of equilibrium at any given time due to price stickiness, informational asymmetries and costs, and regulatory constraints. In short, the insurance and reinsurance markets tend to operate according to the same market mechanisms that have prevailed for decades, despite large market shocks such as the Lloyds crisis in the late 1980's and early 1990's.

Accordingly, a driving force behind all the contributors to the costs of derivatives and insurance contracts is the necessity or desirability of risk management through dynamic hedging or contingent claim replication in continuous, liquid, and informationally fair markets. Hedging is used by derivatives dealers to reduce their exposure to excessive market risk while making transaction fees to cover their cost of capital and ongoing operations; and effective hedging requires liquidity.

Recent patents have addressed the problem of financial market liquidity in the context of an electronic order-matching systems (e.g., U.S. Pat. No. 5,845,266). The principal techniques disclosed to enhance liquidity are to increase participation and traded volume in the system and to solicit trader preferences about combinations of price and quantity for a particular trade of a security. There are shortcomings to these techniques, however. First, these techniques implement order-matching and limit order book algorithms, which can be and are effectively employed in traditional "brick and mortar" exchanges. Their electronic implementation, however, primarily serves to save on transportation and telecommunication charges. No fundamental change is contemplated to market structure for which an electronic network may be essential. Second, the disclosed techniques appear to enhance liquidity at the expense of placing large informational burdens on the traders (by soliciting preferences, for example, over an entire price-quantity demand curve) and by introducing uncertainty as to the exact price at which a trade has been transacted or is "filled." Finally, these electronic order matching systems contemplate a traditional counterparty pairing, which means physical securities are frequently transferred, cleared, and settled after the counterparties are identified and matched. In other words, techniques disclosed in the context of electronic order-matching systems are technical elaborations to the basic problem of how to optimize the process of matching arrays of bids and offers.

Patents relating to derivatives, such as U.S. Pat. No. 4,903,201, disclose an electronic adaptation of current open-outcry or order matching exchanges for the trading of futures is disclosed. Another recent patent, U.S. Pat. No. 5,806,048, relates to the creation of open-end mutual fund derivative securities to provide enhanced liquidity and improved availability of information affecting pricing. This patent, however, does not contemplate an electronic derivatives exchange which requires the traditional hedging or replicating portfolio approach to synthesizing the financial derivatives. Similarly, U.S. Pat. No. 5,794,207 proposes an electronic means of matching buyers' bids and sellers' offers, without explaining the nature of the economic price equilibria achieved through such a market process.

SUMMARY OF THE INVENTION

The present invention is directed to systems and methods of trading, and financial products, having a goal of reducing transaction costs for market participants who hedge against or otherwise make investments in contingent claims relating to events of economic significance. The claims are contingent in that their payout or return depends on the outcome of an observable event with more than one possible outcome. An example of such a contingent claim is a digital option, such as a digital call option, where the investor receives a payout if the underlying asset, stock or index expires at or above a specified strike price and receives no payout if the underlying asset, stock or other index expires below the strike price. Digital options can also be referred to as, for example, "binary options" and "all or nothing options." The contingent claims relate to events of economic significance in that an investor or trader in a contingent claim typically is not economically indifferent to the outcome of the event, even if the investor or trader has not invested in or traded a contingent claim relating to the event.

Intended users of preferred and other embodiments of the present invention are typically institutional investors, such as financial institutions including banks, investment banks, primary insurers and reinsurers, and corporate treasurers, hedge funds and pension funds. Users can also include any individual or entity with a need for risk allocation services. As used in this specification, the terms "user," "trader" and "investor" are used interchangeably to mean any institution, individual or entity that desires to trade or invest in contingent claims or other financial products described in this specification.

The contingent claims pertaining to an event have a trading period or an auction period in order to finalize a return for each defined state, each defined state corresponding to an outcome or set of outcomes for the event, and another period for observing the event upon which the contingent claim is based. When the contingent claim is a digital option, the price or investment amount for each digital option is finalized at the end of the trading period, along with the return for each defined state. The entirety of trades or orders placed and accepted with respect to a certain trading period are processed in a demand-based market or auction. The organization or institution, individual or other entity sponsoring, running, maintaining or operating the demand-based market or auction, can be referred to, for example, as an "exchange," "auction sponsor" and/or "market sponsor."

In each market or auction, the returns to the contingent claims adjust during the trading period of the market or auction with changes in the distribution of amounts invested in each of the states. The investment amounts for the contingent claims can either be provided up front or determined during the trading period with changes in the distribution of desired returns and selected outcomes for each claim. The returns payable for each of the states are finalized after the conclusion of each relevant trading period. In a preferred embodiment, the total amount invested, less a transaction fee to an exchange, or a market or auction sponsor, is equal to the total amount of the payouts. In other words, in theory, the returns on all of the contingent claims established during a particular trading period and pertaining to a particular event are essentially zero sum, as are the traditional derivatives markets. In one embodiment, the investment amounts or prices for each contingent claim are finalized after the conclusion of each relevant trading period, along with the returns payable for each of the states. Since the total amount invested, less a transaction fee to an exchange, or a market or auction sponsor, is equal to the total amount of payouts, an optimization solution using an iteration algorithm described below can be used to determine the equilibrium investment amounts or prices for each contingent claim along with establishing the returns on all of the contingent claims, given the desired or requested return for each claim, the selection of outcomes for each claim and the limit (if any) on the investment amount for each claim.

The process by which returns and investment amounts for each contingent claim are finalized in the present invention is demand-based, and does not in any substantial way depend on supply. By contrast, traditional markets set prices through the interaction of supply and demand by crossing bids to buy and offers to sell ("bid/offer"). The demand-based contingent claim mechanism of the present invention sets returns by financing returns to successful investments with losses from unsuccessful investments. Thus, in a preferred embodiment, the returns to successful investments (as well as the prices or investment amounts for investments in digital options) are determined by the total and relative amounts of all investments placed on each of the defined states for the specified observable event.

As used in this specification, the term "contingent claim" shall have the meaning customarily ascribed to it in the securities, trading, insurance and economics communities. "Contingent claims" thus include, for example, stocks, bonds and other such securities, derivative securities, insurance contracts and reinsurance agreements, and any other financial products, instruments, contracts, assets, or liabilities whose value depends upon or reflects economic risk due to the occurrence of future, real-world events. These events may be financial-related events, such as changes in interest rates, or non-financial-related events such as changes in weather conditions, demand for electricity, and fluctuations in real estate prices. Contingent claims also include all economic or financial interests, whether already traded or not yet traded, which have or reflect inherent risk or uncertainty due to the occurrence of future real-world events. Examples of contingent claims of economic or financial interest which are not yet traded on traditional markets are financial products having values that vary with the fluctuations in corporate earnings or changes in real estate values and rentals. The term "contingent claim" as used in this specification encompasses both hypothetical financial products of the Arrow-Debreu variety, as well as any risky asset, contract or product which can be expressed as a combination or portfolio of the hypothetical financial products.

For the purposes of this specification, an "investment" in or "trade" or an "order" of a contingent claim is the act of putting an amount (in the units of value defined by the contingent claim) at risk, with a financial return depending on the outcome of an event of economic significance underlying the group of contingent claims pertaining to that event.

"Derivative security" (used interchangeably with "derivative") also has a meaning customarily ascribed to it in the securities, trading, insurance and economics communities. This includes a security or contract whose value depends on such factors as the value of an underlying security, index, asset or liability, or on a feature of such an underlying security, such as interest rates or convertibility into some other security. A derivative security is one example of a contingent claim as defined above. Financial futures on stock indices such as the S&P 500 or options to buy and sell such futures contracts are highly popular exchange-traded financial derivatives. An interest-rate swap, which is an example of an off-exchange derivative, is an agreement between two counterparties to exchange series of cashflows based on underlying factors, such as the London Interbank Offered Rate (LIBOR) quoted daily in London for a large number of foreign currencies. Like the exchange-traded futures and options, off-exchange agreements can fluctuate in value with the underlying factors to which they are linked or derived. Derivatives may also be traded on commodities, insurance events, and other events, such as the weather.

In this specification, the function for computing and allocating returns to contingent claims is termed the Demand Reallocation Function (DRF). A DRF is demand-based and involves reallocating returns to investments in each state after the outcome of the observable event is known in order to compensate successful investments from losses on unsuccessful investments (after any transaction or exchange fee). Since an adjustable return based on variations in amounts invested is a key aspect of the invention, contingent claims implemented using a DRF will be referred to as demand-based adjustable return (DBAR) contingent claims.

In accordance with embodiments of the present invention, an Order Price Function (OPF) is a function for computing the investment amounts or prices for contingent claims which are digital options. An OPF, which includes the DRF, is also demand-based and involves determining the prices for each digital option at the end of the trading period, but before the outcome of the observable event is known. The OPF determines the prices as a function of the outcomes selected in each digital option (corresponding to the states selected by a trader for the digital option to be in-the-money), the requested payout for the digital option if the option expires in-the money, and the limit placed on the price (if any) when the order for the option is placed in the market or auction.

"Demand-based market," "demand-based auction" may include, for example, a market or auction which is run or executed according to the principles set forth in the embodiments of the present invention. "Demand-based technology" may include, for example, technology used to run or execute orders in a demand-based market or auction in accordance with the principles set forth in the embodiments of the present invention. "Contingent claims" or "DBAR contingent claims" may include, for example, contingent claims that are processed in a demand-based market or auction. "Contingent claims" or "DBAR contingent claims" may include, for example, digital options or DBAR digital options, discussed in this specification. With respect to digital options, demand-based markets may include, for example, DBAR DOEs (DBAR Digital Option Exchanges), or exchanges in which orders for digital options or DBAR digital options are placed and processed. "Contingent claims" or "DBAR contingent claims" may also include, for example, DBAR-enabled products or DBAR-enabled financial products, discussed in this specification.

Preferred features of a trading system for a group of DBAR contingent claims (i.e., group of claims pertaining to the same event) include the following: (1) an entire distribution of states is open for investment, not just a single price as in the traditional markets; (2) returns are adjustable and determined mathematically based on invested amounts in each of the states available for investment, (3) invested amounts are preferably non-decreasing (as explained below), providing a commitment of offered liquidity to the market over the distribution of states, and in one embodiment of the present invention, adjustable and determined mathematically based on requested returns per order, selection of outcomes for the option to expire in-the-money, and limit amounts (if any), and (4) information is available in real-time across the distribution of states, including, in particular, information on the amounts invested across the distribution of all states (commonly known as a "limit order book"). Other consequences of preferred embodiments of the present invention include (1) elimination of order-matching or crossing of the bid and offer sides of the market; (2) reduction of the need for a market maker to conduct dynamic hedging and risk management; (3) more opportunities for hedging and insuring events of economic significance (i.e., greater market "completeness"); and (4) the ability to offer investments in contingent claims whose profit and loss scenarios are comparable to these for digital options or other derivatives in traditional markets, but can be implemented using the DBAR systems and methods of the present invention, for example without the need for sellers of such options or derivatives as they function in conventional markets.

Other preferred embodiments of the present invention can accommodate realization of profits and losses by traders at multiple points before all of the criteria for terminating a group of contingent claims are known. This is accomplished by arranging a plurality of trading periods, each having its own set of finalized returns. Profit or loss can be realized or "locked-in" at the end of each trading period, as opposed to waiting for the final outcome of the event on which the relevant contingent claims are based. Such lock-in can be achieved by placing hedging investments in successive trading periods as the returns change, or adjust, from period to period. In this way, profit and loss can be realized on an evolving basis (limited only by the frequency and length of the periods), enabling traders to achieve the same or perhaps higher frequency of trading and hedging than available in traditional markets.

If desired, an issuer such as a corporation, investment bank, underwriter or other financial intermediary can create a security having returns that are driven in a comparable manner to the DBAR contingent claims of the present invention. For example, a corporation may issue a bond with returns that are linked to insurance risk. The issuer can solicit trading and calculate the returns based on the amounts invested in contingent claims corresponding to each level or state of insurance risks.

In a preferred embodiment of the present invention, changes in the return for investments in one state will affect the return on investments in another state in the same distribution of states for a group of contingent claims. Thus, traders' returns will depend not only on the actual outcome of a real-world, observable event but also on trading choices from among the distribution of states made by other traders. This aspect of DBAR markets, in which returns for one state are affected by changes in investments in another state in the same distribution, allows for the elimination of order-crossing and dynamic market maker hedging. Price-discovery in preferred embodiments of the present invention can be supported by a one-way market (i.e., demand, not supply) for DBAR contingent claims. By structuring derivatives and insurance trading according to DBAR principles, the high costs of traditional order matching and principal market making market structures can be reduced substantially. Additionally, a market implemented by systems and methods of the present invention is especially amenable to electronic operation over a wide network, such as the Internet.

In its preferred embodiments, the present invention mitigates derivatives transaction costs found in traditional markets due to dynamic hedging and order matching. A preferred embodiment of the present invention provides a system for trading contingent claims structured under DBAR principles, in which amounts invested in on each state in a group of DBAR contingent claims are reallocated from unsuccessful investments, under defined rules, to successful investments after the deduction of exchange transaction fees. In particular, the operator of such a system or exchange provides the physical plant and electronic infrastructure for trading to be conducted, collects and aggregates investments (or in one embodiment, first collects and aggregates investment information to determine investment amounts per trade or order and then collects and aggregates the investment amounts), calculates the returns that result from such investments, and then allocates to the successful investments returns that are financed by the unsuccessful investments, after deducting a transaction fee for the operation of the system.

In preferred embodiments, where the successful investments are financed with the losses from unsuccessful investments, returns on all trades are correlated, and traders make investments against each other as well as assuming the risk of chance outcomes. All traders for a group of DBAR contingent claims depending on a given event become counterparties to each other, leading to a mutualization of financial interests. Furthermore, in preferred embodiments of the present invention, projected returns prevailing at the time an investment is made may not be the same as the final payouts or returns after the outcome of the relevant event is known.

Traditional derivatives markets by contrast, operate largely under a house "banking" system. In this system, the market-maker, which typically has the function of matching buyers and sellers, customarily quotes a price at which an investor may buy or sell. If a given investor buys or sells at the price, the investor's ultimate return is based upon this price, i.e., the price at which the investor later sells or buys the original position, along with the original price at which the position was traded, will determine the investor's return. As the market-maker may not be able perfectly to offset buy and sell orders at all times or may desire to maintain a degree of risk in the expectation of returns, it will frequently be subject to varying degrees of market risk (as well as credit risk, in some cases). In a traditional derivatives market, market-makers which match buy and sell orders typically rely upon actuarial advantage, bid-offer spreads, a large capital base, and "coppering" or hedging (risk management) to minimize the chance of bankruptcy due to such market risk exposures.

Each trader in a house banking system typically has only a single counterparty—the market-maker, exchange, or trading counterparty (in the case, for example, of over-the-counter derivatives). By contrast, because a market in DBAR contingent claims may operate according to principles whereby unsuccessful investments finance the returns on successful investments, the exchange itself is exposed to reduced risk of loss and therefore has reduced need to transact in the market to hedge itself. In preferred embodiments of DBAR contingent claims of the present invention, dynamic hedging or bid-offer crossing by the exchange is generally not required, and the probability of the exchange or market-maker going bankrupt may be reduced essentially to zero. Such a system distributes the risk of bankruptcy away from the exchange or market-maker and among all the traders in the system. The system as a whole provides a great degree of self-hedging and substantial reduction of the risk of market failure for reasons related to market risk. A DBAR contingent claim exchange or market or auction may also be "self-clearing" and require little clearing infrastructure (such as clearing agents, custodians, nostro/vostro bank accounts, and transfer and register agents). A derivatives trading system or exchange or market or auction structured according to DBAR contingent claim principles therefore offers many advantages over current derivatives markets governed by house banking principles.

The present invention also differs from electronic or parimutuel betting systems disclosed in the prior art (e.g., U.S. Pat. Nos. 5,873,782 and 5,749,785). In betting systems or games of chance, in the absence of a wager the bettor is economically indifferent to the outcome (assuming the bettor does not own the casino or the racetrack or breed the racing horses, for example). The difference between games of chance and events of economic significance is well known and understood in financial markets.

In summary, the present invention provides systems and methods for conducting demand-based trading. A preferred embodiment of a method of the present invention for conducting demand-based trading includes the steps of (a) establishing a plurality of defined states and a plurality of predetermined termination criteria, wherein each of the defined states corresponds to at least one possible outcome of an event of economic significance; (b) accepting investments of value units by a plurality of traders in the defined states; and (c) allocating a payout to each investment. The allocating step is responsive to the total number of value units invested in the defined states, the relative number of value units invested in each of the defined states, and the identification of the defined state that occurred upon fulfillment of all of the termination criteria.

An additional preferred embodiment of a method for conducting demand-based trading also includes establishing, accepting, and allocating steps. The establishing step in this embodiment includes establishing a plurality of defined states and a plurality of predetermined termination criteria. Each of the defined states corresponds to a possible state of a selected financial product when each of the termination criteria is fulfilled. The accepting step includes accepting investments of value units by multiple traders in the defined states. The allocating step includes allocating a payout to each investment. This allocating step is responsive to the total number of value units invested in the defined states, the relative number of value units invested in each of the defined states, and the identification of the defined state that occurred upon fulfillment of all of the termination criteria.

In preferred embodiments of a method for conducting demand-based trading of the present invention, the payout to each investment in each of the defined states that did not occur upon fulfillment of all of the termination criteria is zero, and the sum of the payouts to all of the investments is not greater than the value of the total number of the value units invested in the defined states. In a further preferred embodiment, the sum of the values of the payouts to all of the investments is equal to the value of all of the value units invested in defined states, less a fee.

In preferred embodiments of a method for conducting demand-based trading, at least one investment of value units designates a set of defined states and a desired return-on-investment from the designated set of defined states. In these preferred embodiments, the allocating step is further responsive to the desired return-on-investment from the designated set of defined states.

In another preferred embodiment of a method for conducting demand-based trading, the method further includes the step of calculating Capital-At-Risk for at least one investment of value units by at least one trader. In alternative further preferred embodiments, the step of calculating Capital-At-Risk includes the use of the Capital-At-Risk Value-At-Risk method, the Capital-At-Risk Monte Carlo Simulation method, or the Capital-At-Risk Historical Simulation method.

In preferred embodiments of a method for conducting demand-based trading, the method further includes the step of calculating Credit-Capital-At-Risk for at least one investment of value units by at least one trader. In alternative further preferred embodiments, the step of calculating Credit-Capital-At-Risk includes the use of the Credit-Capital-At-Risk Value-At-Risk method, the Credit-Capital-At-Risk Monte Carlo Simulation method, or the Credit-Capital-At-Risk Historical Simulation method.

In preferred embodiments of a method for conducting demand-based trading of the present invention, at least one investment of value units is a multi-state investment that designates a set of defined states. In a further preferred embodiment, at least one multi-state investment designates a set of desired returns that is responsive to the designated set of defined states, and the allocating step is further responsive to the set of desired returns. In a further preferred embodiment, each desired return of the set of desired returns is responsive to a subset of the designated set of defined states. In an alternative preferred embodiment, the set of desired returns approximately corresponds to expected returns from a set of defined states of a prespecified investment vehicle such as, for example, a particular call option.

In preferred embodiments of a method for conducting demand-based trading of the present invention, the allocating step includes the steps of (a) calculating the required number of value units of the multi-state investment that designates a set of desired returns, and (b) distributing the value units of the multi-state investment that designates a set of desired returns to the plurality of defined states. In a further preferred embodiment, the allocating step includes the step of solving a set of simultaneous equations that relate traded amounts to unit payouts and payout distributions; and the calculating step and the distributing step are responsive to the solving step.

In preferred embodiments of a method for conducting demand-based trading of the present invention, the solving step includes the step of fixed point iteration. In further preferred embodiments, the step of fixed point iteration includes the steps of (a) selecting an equation of the set of simultaneous equations described above, the equation having an independent variable and at least one dependent variable; (b) assigning arbitrary values to each of the dependent variables in the selected equation; (c) calculating the value of the independent variable in the selected equation responsive to the currently assigned values of each the dependent variables; (d) assigning the calculated value of the independent variable to the independent variable; (e) designating an equation of the set of simultaneous equations as the selected equation; and (f) sequentially performing the calculating the value step, the assigning the calculated value step, and the designating an equation step until the value of each of the variables converges.

A preferred embodiment of a method for estimating state probabilities in a demand-based trading method of the present invention includes the steps of: (a) performing a demand-based trading method having a plurality of defined states and a plurality of predetermined termination criteria, wherein an investment of value units by each of a plurality of traders is accepted in at least one of the defined states, and at least one of these defined states corresponds to at least one possible outcome of an event of economic significance; (b) monitoring the relative number of value units invested in each of the defined states; and (c) estimating, responsive to the monitoring step, the probability that a selected defined state will be the defined state that occurs upon fulfillment of all of the termination criteria.

An additional preferred embodiment of a method for estimating state probabilities in a demand-based trading method also includes performing, monitoring, and estimating steps. The performing step includes performing a demand-based trading method having a plurality of defined states and a plurality of predetermined termination criteria, wherein an investment of value units by each of a plurality of traders is accepted in at least one of the defined states; and wherein each of the defined states corresponds to a possible state of a selected financial product when each of the termination criteria is fulfilled. The monitoring step includes monitoring the relative number of value units invested in each of the defined states. The estimating step includes estimating, responsive to the monitoring step, the probability that a selected defined state will be the defined state that occurs upon fulfillment of all of the termination criteria.

A preferred embodiment of a method for promoting liquidity in a demand-based trading method of the present invention includes the step of performing a demand-based trading method having a plurality of defined states and a plurality of predetermined termination criteria, wherein an investment of value units by each of a plurality of traders is accepted in at least one of the defined states and wherein any investment of value units cannot be withdrawn after acceptance. Each of the defined states corresponds to at least one possible outcome of an event of economic significance. A further preferred embodiment of a method for promoting liquidity in a demand-based trading method includes the step of hedging. The hedging step includes the hedging of a trader's previous investment of value units by making a new investment of value units in one or more of the defined states not invested in by the previous investment.

An additional preferred embodiment of a method for promoting liquidity in a demand-based trading method includes the step of performing a demand-based trading method having a plurality of defined states and a plurality of predetermined termination criteria, wherein an investment of value units by each of a plurality of traders is accepted in at least one of the defined states and wherein any investment of value units cannot be withdrawn after acceptance, and each of the defined states corresponds to a possible state of a selected financial product when each of the termination criteria is fulfilled. A further preferred embodiment of such a method for promoting liquidity in a demand-based trading method includes the step of hedging. The hedging step includes the hedging of a trader's previous investment of value units by making a new investment of value units in one or more of the defined states not invested in by the previous investment.

A preferred embodiment of a method for conducting quasi-continuous demand-based trading includes the steps of: (a) establishing a plurality of defined states and a plurality of predetermined termination criteria, wherein each of the defined states corresponds to at least one possible outcome of an event; (b) conducting a plurality of trading cycles, wherein each trading cycle includes the step of accepting, during a predefined trading period and prior to the fulfillment of all of the termination criteria, an investment of value units by each of a plurality of traders in at least one of the defined states; and (c) allocating a payout to each investment. The allocating step is responsive to the total number of the value units invested in the defined states during each of the trading periods, the relative number of the value units invested in each of the defined states during each of the trading periods, and an identification of the defined state that occurred upon fulfillment of all of the termination criteria. In a further preferred embodiment of a method for conducting quasi-continuous demand-based trading, the predefined trading periods are sequential and do not overlap.

Another preferred embodiment of a method for conducting demand-based trading includes the steps of: (a) establishing a plurality of defined states and a plurality of predetermined termination criteria, wherein each of the defined states corresponds to one possible outcome of an event of economic significance (or a financial instrument); (b) accepting, prior to fulfillment of all of the termination criteria, an investment of value units by each of a plurality of traders in at least one of the plurality of defined states, with at least one investment designating a range of possible outcomes corresponding to a set of defined states; and (c) allocating a payout to each investment. In such a preferred embodiment, the allocating step is responsive to the total number of value units in the plurality of defined states, the relative number of value units invested in each of the defined states, and an identification of the defined state that occurred upon the fulfillment of all of the termination criteria. Also in such a preferred embodiment, the allocation is done so that substantially the same payout is allocated to each state of the set of defined states. This embodiment contemplates, among other implementations, a market or exchange for contingent claims of the present invention that provides—without traditional sellers—profit and loss scenarios comparable to those expected by traders in derivative securities known as digital options, where payout is the same if the option expires anywhere in the money, and where there is no payout if the option expires out of the money.

Another preferred embodiment of the present invention provides a method for conducting demand-based trading including: (a) establishing a plurality of defined states and a plurality of predetermined termination criteria, wherein each of the defined states corresponds to one possible outcome of an event of economic significance (or a financial instrument); (b) accepting, prior to fulfillment of all of the termination criteria, a conditional investment order by a trader in at least one of the plurality of defined states; (c) computing, prior to fulfillment of all of the termination criteria a probability corresponding to each defined state; and (d) executing or withdrawing, prior to the fulfillment of all of the termination criteria, the conditional investment responsive to the computing step. In such embodiments, the computing step is responsive to the total number of value units invested in the plurality of defined states and the relative number of value units invested in each of the plurality of defined states. Such embodiments contemplate, among other implementations, a market or exchange (again without traditional sellers) in which investors can make and execute conditional or limit orders, where an order is executed or withdrawn in response to a calculation of a probability of the occurrence of one or more of the defined states. Preferred embodiments of the system of the present invention involve the use of electronic technologies, such as computers, computerized databases and telecommunications systems, to implement methods for conducting demand-based trading of the present invention.

A preferred embodiment of a system of the present invention for conducting demand-based trading includes (a) means for accepting, prior to the fulfillment of all predetermined termination criteria, investments of value units by a plurality of traders in at least one of a plurality of defined states, wherein each of the defined states corresponds to at least one possible outcome of an event of economic significance; and (b) means for allocating a payout to each investment. This allocation is responsive to the total number of value units invested in the defined states, the relative number of value units invested in each of the defined states, and the identification of the defined state that occurred upon fulfillment of all of the termination criteria.

An additional preferred embodiment of a system of the present invention for conducting demand-based trading includes (a) means for accepting, prior to the fulfillment of all predetermined termination criteria, investments of value units by a plurality of traders in at least one of a plurality of defined states, wherein each of the defined states corresponds to a possible state of a selected financial product when each of the termination criteria is fulfilled; and (b) means for allocating a payout to each investment. This allocation is responsive to the total number of value units invested in the defined states, the relative number of value units invested in each of the defined states, and the identification of the defined state that occurred upon fulfillment of all of the termination criteria.

A preferred embodiment of a demand-based trading apparatus of the present invention includes (a) an interface processor communicating with a plurality of traders and a market data system; and (b) a demand-based transaction processor, communicating with the interface processor and having a trade status database. The demand-based transaction processor maintains, responsive to the market data system and to a demand-based transaction with one of the plurality of traders, the trade status database, and processes, responsive to the trade status database, the demand-based transaction.

In further preferred embodiments of a demand-based trading apparatus of the present invention, maintaining the trade status database includes (a) establishing a contingent claim having a plurality of defined states, a plurality of predetermined termination criteria, and at least one trading period, wherein each of the defined states corresponds to at least one possible outcome of an event of economic significance; (b) recording, responsive to the demand-based transaction, an investment of value units by one of the plurality of traders in at least one of the plurality of defined states; (c) calculating, responsive to the total number of the value units invested in the plurality of defined states during each trading period and responsive to the relative number of the value units invested in each of the plurality of defined states during each trading period, finalized returns at the end of each trading period; and (d) determining, responsive to an identification of the defined state that occurred upon the fulfillment of all of the termination criteria and to the finalized returns, payouts to each of the plurality of traders; and processing the demand-based transaction includes accepting, during the trading period, the investment of value units by one of the plurality of traders in at least one of the plurality of defined states;

In an alternative further preferred embodiment of a demand-based trading apparatus of the present invention, maintaining the trade status database includes (a) establishing a contingent claim having a plurality of defined states, a plurality of predetermined termination criteria, and at least one trading period, wherein each of the defined states corresponds to a possible state of a selected financial product when each of the termination criteria is fulfilled; (b) recording, responsive to the demand-based transaction, an investment of value units by one of the plurality of traders in at least one of the plurality of defined states; (c) calculating, responsive to the total number of the value units invested in the plurality of defined states during each trading period and responsive to the relative number of the value units invested in each of the plurality of defined states during each trading period, finalized returns at the end of each trading period; and (d) determining, responsive to an identification of the defined state that occurred upon the fulfillment of all of the termination criteria and to the finalized returns, payouts to each of the plurality of traders; and processing the demand-based transaction includes accepting, during the trading period, the investment of value units by one of the plurality of traders in at least one of the plurality of defined states;

In further preferred embodiments of a demand-based trading apparatus of the present invention, maintaining the trade status database includes calculating return estimates; and processing the demand-based transaction includes providing, responsive to the demand-based transaction, the return estimates.

In further preferred embodiments of a demand-based trading apparatus of the present invention, maintaining the trade status database includes calculating risk estimates; and processing the demand-based transaction includes providing, responsive to the demand-based transaction, the risk estimates.

In further preferred embodiments of a demand-based trading apparatus of the present invention, the demand-based transaction includes a multi-state investment that specifies a desired payout distribution and a set of constituent states; and maintaining the trade status database includes allocating, responsive to the multi-state investment, value units to the set of constituent states to create the desired payout distribution. Such demand-based transactions may also include multi-state investments that specify the same payout if any of a designated set of states occurs upon fulfillment of the termination criteria. Other demand-based transactions executed by the demand-based trading apparatus of the present invention include conditional investments in one or more states, where the investment is executed or withdrawn in response to a calculation of a probability of the occurrence of one or more states upon the fulfillment of the termination criteria.

In an additional embodiment, systems and methods for conducting demand-based trading includes the steps of (a) establishing a plurality of states, each state corresponding to at least one possible outcome of an event of economic significance; (b) receiving an indication of a desired payout and an indication of a selected outcome, the selected outcome corresponding to at least one of the plurality of states; and (c) determining an investment amount as a function of the selected outcome, the desired payout and a total amount invested in the plurality of states.

In another additional embodiment, systems and methods for conducting demand-based trading includes the steps of (a) establishing a plurality of states, each state corresponding to at least one possible outcome of an event (whether or not such event is an economic event); (b) receiving an indication of a desired payout and an indication of a selected outcome, the selected outcome corresponding to at least one of the plurality of states; and (c) determining an investment amount as a function of the selected outcome, the desired payout and a total amount invested in the plurality of states.

In another additional embodiment, systems and methods for conducting demand-based trading includes the steps of (a) establishing a plurality of states, each state corresponding to at least one possible outcome of an event of economic significance; (b) receiving an indication of an investment amount and a selected outcome, the selected outcome corresponding to at least one of the plurality of states; and (c) determining a payout as a function of the investment amount, the selected outcome, a total amount invested in the plurality of states, and an identification of at least one state corresponding to an observed outcome of the event.

In another additional embodiment, systems and methods for conducting demand-based trading include the steps of: (a) receiving an indication of one or more parameters of a financial product or derivatives strategy; and (b) determining one or more of a selected outcome, a desired payout, an investment amount, and a limit on the investment amount for each contingent claim in a set of one or more contingent claims as a function of the one or more financial product or derivatives strategy parameters.

In another additional embodiment, systems and methods for conducting demand-based trading include the steps of: (a) receiving an indication of one or more parameters of a financial product or derivatives strategy; and (b) determining an investment amount and a selected outcome for each contingent claim in a set of one or more contingent claims as a function of the one or more financial product or derivatives strategy parameters.

In another additional embodiment, a demand-enabled financial product for trading in a demand-based auction includes a set of one or more contingent claims, the set approximating or replicating a financial product or derivatives strategy, each contingent claim in the set having an investment amount and a selected outcome, each investment amount being dependent upon one or more parameters of a financial product or derivatives strategy and a total amount invested in the auction.

In another additional embodiment, methods for conducting demand-based trading on at least one event includes the steps of: (a) determining one or more parameters of a contingent claim, in a replication set of one or more contingent claims, as a function of one or more parameters of a derivatives strategy and an outcome of the event; and (b) determining an investment amount for a contingent claim in the replication set as a function of one or more parameters of the derivatives strategy and an outcome of the event.

In another additional embodiment, methods for conducting demand based trading include the steps of: enabling one or more derivatives strategies and/or financial products to be traded in a demand-based auction; and offering and/or trading one or more of the enabled derivatives strategies and enabled financial products to customers.

In another additional embodiment, methods for conducting derivatives trading include the steps of: receiving an indication of one or more parameters of a derivatives strategy on one or more events of economic significance; and determining one or more parameters of each digital in a replication set made up of one or more digitals as a function of one or more parameters of the derivatives strategy.

In another additional embodiment, methods for trading contingent claims in a demand-based auction, includes the step of approximating or replicating a contingent claim with a set of demand-based claims. The set of demand-based claims includes at least one vanilla option, thus defining a vanilla replicating basis.

In another additional embodiment, methods for trading contingent claims in a demand-based auction on an event, includes the step of: determining a value of a contingent claim as a function of a demand-based valuation of each vanilla option in a replication set for the contingent claim. The replication set includes at least one vanilla option, thus defining another vanilla replicating basis.

In another additional embodiment, methods for conducting a demand-based auction on an event, includes the steps of: establishing a plurality of strikes for the auction, each strike corresponding to a possible outcome of the event; establishing a plurality of replicating claims for the auction, one or more replicating claims striking at each strike in the plurality of strikes; replicating a contingent claim with a replication set including one or more of the replicating claims; and determining the price and/or payout of the contingent claim as a function of a demand-based valuation of each of the replicating claims in the replication set.

In another additional embodiment, methods for processing a customer order for one or more derivatives strategies, in a demand-based auction on an event, where the auction includes one or more customer orders are described as including the steps of: establishing strikes for the auction, each one of the strikes corresponding to a possible outcome of the event; establishing replicating claims for the auction, one or more replicating claims striking at each strike in the auction; replicating each derivatives strategy in the customer order with a replication set including one or more of the replicating claims in the auction; and determining a premium for the customer order by engaging in a demand-based valuation of each one of the replicating claims in the replication set for each one of the derivatives strategies in the customer order.

In another additional embodiment, a method for investing in a demand-based auction on an event, includes the steps of: providing an indication of one or more selected strikes and a payout profile for one or more derivatives strategies, each of the selected strikes corresponding to a selected outcome of the event, and each of the selected strikes being selected from a plurality of strikes established for the auction, each of the strikes corresponding to a possible outcome of the event; receiving an indication of a price for each of the derivatives strategies, the price being determined by engaging in a demand-based valuation of a replication set replicating the derivatives strategy, the replication set including one or more replicating claims from a plurality of replicating claims established for the auction, at least one of each of the replicating claims in the auction striking at one of the strikes.

In another additional embodiment, a computer system for processing a customer order for one or more derivatives strategy, in a demand-based auction on an event, the auction including one or more customer orders, the computer system including one or more processors that are configured to: establish strikes for the auction, each one of the strikes corresponding to a possible outcome of the event; establish replicating claims for the auction, one or more replicating claims striking at each one of the strikes; and replicate each of the derivatives strategies in the customer order with a replication set including one or more of the replicating claims in the auction; and determine a premium for the customer order by engaging in a demand-based valuation of each one of the replicating claims in the replication set for each one of the derivatives strategies in the customer order.

In another additional embodiment, a computer system for placing an order to invest in a demand-based auction on an event, the order including one or more derivatives strategies, the computer system including one or more processors configured to: provide an indication of one or more selected strikes and a payout profile for each derivatives strategy, each selected strike corresponding to a selected outcome of the event, and each selected strike being selected from a plurality of strikes established for the auction, each of the strikes corresponding to a possible outcome of the event; receive an indication of a premium for the order, the premium of the order being determined by engaging in a demand-based valuation of a replication set replicating each derivatives strategy in the order, the replication set including one or more replicating claims from a plurality of replicating claims established for the auction, with one or more of the replicating claims in the auction striking at each of the strikes.

In another additional embodiment, a method for executing a trade includes the steps of: receiving a request for an order, the request indicating one or more selected strikes and a payout profile for one or more derivatives strategies in the order, each selected strike corresponding to a selected outcome of the event, and each selected strike being selected from a plurality of strikes established for the auction, each of the strikes corresponding to a possible outcome of the event; providing an indication of a premium for the order, the premium being determined by engaging in a demand-based valuation of a replication set replicating each derivatives strategy in the order, the replication set including one or more replicating claims from a plurality of replicating claims established for the auction, one or more of each of the replicating claims in the auction striking at each of the strikes; and receiving an indication of a decision to place the order for the determined premium.

In another additional embodiment, a method for providing financial advice, includes the steps of: providing a person with advice about investing in one or more of a type of derivatives strategy in a demand-based auction, an order for the one or more derivatives strategies indicating one or more selected strikes and a payout profile for the derivatives strategy, each selected strike corresponding to a selected outcome of the event, and each selected strike being selected from a plurality of strikes established for the auction, each of the strikes corresponding to a possible outcome of the event, wherein the premium for the order is determined by engaging in a demand-based valuation of a replication set replicating each of the derivatives strategies in the order, the replication set including at least one replicating claim from a plurality of replicating claims established for the auction, one or more of the replicating claims in the auction striking at one of the strikes.

In another additional embodiment, a method of hedging, includes the steps of: determining an investment risk in one or more investments; and offsetting the investment risk by taking a position in one or more derivatives strategies in a demand-based auction with an opposing risk, an order for the one or more derivatives strategies indicating one or more selected strikes and a payout profile for the derivatives strategy in the order, each selected strike corresponding to a selected outcome of the event, and each selected strike being selected from a plurality of strikes established for the auction, each of the strikes corresponding to a possible outcome of the event, wherein the premium for the order is determined by engaging in a demand-based valuation of a replication set replicating each of the derivatives strategies in the order, the replication set including at least one replicating claim from a plurality of replicating claims established for the auction, one or more of each of the replicating claims in the auction striking at one of the strikes.

In another additional embodiment, a method of speculating, includes the steps of: determining an investment risk in at least one investment; and increasing the investment risk by taking a position in one or more derivatives strategies in a demand-based auction with a similar risk, an order for the one or more derivatives strategies. The order specifies one or more selected strikes and a payout profile for the derivatives strategy, and can also specify a requested number of the derivatives strategy. Each selected strike corresponds to a selected outcome of the event, each selected strike is selected from a plurality of strikes established for the auction, and each of the strikes corresponds to a possible outcome of the event. The premium for the order is determined by engaging in a demand-based valuation of a replication set replicating each of the derivatives strategies in the order, the replication set including one or more replicating claims from a plurality of replicating claims established for the auction, one or more of the replicating claims in the auction striking at each one of the strikes.

In another additional embodiment, a computer program product capable of processing a customer order including one or more derivatives strategies, in a demand-based auction including one or more customer orders, the computer program product including a computer usable medium having computer readable program code embodied in the medium for causing a computer to: establish strikes for the auction, each one of the strikes corresponding to a possible outcome of the event; establish replicating claims for the auction, one or more of the replicating claims striking at one of the strikes; and replicate each derivatives strategy in the customer order with a replication set including at least one of the replicating claims in the auction; and determine a premium for the customer order by engaging in a demand-based valuation of each of the replicating claims in the replication set for each of the derivatives strategies in the customer order.

In another additional embodiment, an article of manufacture comprising an information storage medium encoded with a computer-readable data structure adapted for use in placing a customer order in a demand-based auction over the Internet, the auction including at least one customer order, said data structure including: at least one data field with information identifying one or more selected strikes and a payout profile for each of the derivatives strategies in the customer order, each selected strike corresponding to a selected outcome of the event, and each, selected strike being selected from a plurality of strikes established for the auction, each strike in the auction corresponding to a possible outcome of the event; and one or more data fields with information identifying a premium for the order, the premium being determined as a result of a demand-based valuation of a replication set replicating each of the derivatives strategies in the order, the replication set including at least one replicating claim from a plurality of replicating claims established for the auction, one or more of each of the replicating claims in the auction striking at one of the strikes.

In another additional embodiment, a derivatives strategy for a demand-based market, includes: a first designation of at least one selected strike for the derivatives strategy, each selected strike being selected from a plurality of strikes established for auction, each strike in the auction corresponding to a possible outcome of the event; a second designation of a payout profile for the derivatives strategy; and a price for the derivatives strategy, the price being determined by engaging in a demand-based valuation of a replication set replicating the first designation and the second designation of the derivatives strategy, the replication set including one or more replicating claims from a plurality of replicating claims established for the auction, one or more of the replicating claims in the auction striking at each strike in the auction.

In another additional embodiment, an investment vehicle for a demand-based auction, includes: a demand-based derivatives strategy providing investment capital to the auction, an amount of the provided investment capital being dependent upon a demand-based valuation of a replication set replicating the derivatives strategy, the replicating set including one or more of the replicating claims from a plurality of replicating claims established for the auction, one or more of the replicating claims in the auction striking at each one of the strikes in the auction.

In another additional embodiment, an article of manufacture comprising a propagated signal adapted for use in the performance of a method for trading a customer order including at least one of a derivatives strategy, in a demand-based auction including one or more customer orders, wherein the method includes the steps of: establishing strikes for the auction, each one of the strikes corresponding to a possible outcome of the event; establishing replicating claims for the auction, one or more of the replicating claims striking at one of the strikes; replicating each one of the derivatives strategies in the customer order with a replication set including one or more of the replicating claims in the auction; and determining a premium for the customer order by engaging in a demand-based valuation of each one of the replicating claims in the replication set for the derivatives strategy in the customer order; wherein the propagated signal is encoded with machine-readable information relating to the trade.

In another additional embodiment, a computer system for conducting demand-based auctions on an event, includes one or more user interface processors, a database unit, an auction processor and a calculation engine. The one or more interface processors are configured to communicate with a plurality of terminals which are adapted to enter demand-based order data for an auction. The database unit is configured to maintain an auction information database. The auction processor is configured to process at least one demand-based auction and to communicate with the user interface processor and the database unit, wherein the auction processor is configured to generate auction transaction data based on auction order data received from the user interface processor and to send the auction transaction data for storing to the database unit, and wherein the auction processor is further configured to establish a plurality of strikes for the auction, each strike corresponding to a possible outcome of the event, to establish a plurality of replicating claims for the auction, at least one replicating claim striking at a strike in the plurality of strikes, to replicate a contingent claim with a replication set including at least one of the plurality of replicating claims, and to send the replication set for storing to the database unit. The calculation engine is configured to determine at least one of an equilibrium price and a payout for the contingent claim as a function of a demand-based valuation of each of the replicating claims in the replication set stored in the database unit. An object of the present invention is to provide systems and methods to support and facilitate a market structure for contingent claims related to observable events of economic significance, which includes one or more of the following advantages, in addition to those described above:

1. ready implementation and support using electronic computing and networking technologies;
2. reduction or elimination of the need to match bids to buy with offers to sell in order to create a market for derivatives;
3. reduction or elimination of the need for a derivatives intermediary to match bids and offers;
4. mathematical and consistent calculation of returns based on demand for contingent claims;
5. increased liquidity and liquidity incentives;
6. statistical diversification of credit risk through the mutualization of multiple derivatives counterparties;
7. improved scalability by reducing the traditional linkage between the method of pricing for contingent claims and the quantity of the underlying claims available for investment;
8. increased price transparency;
9. improved efficiency of information aggregation mechanisms;
10. reduction of event risk, such as the risk of discontinuous market events such as crashes;
11. opportunities for binding offers of liquidity to the market;
12. reduced incentives for strategic behavior by traders;
13. increased market for contingent claims;
14. improved price discovery;
15. improved self-consistency;
16. reduced influence by market makers;
17. ability to accommodate virtually unlimited demand;
18. ability to isolate risk exposures;
19. increased trading precision, transaction certainty and flexibility;
20. ability to create valuable new markets with a sustainable competitive advantage;
21. new source of fee revenue without putting capital at risk; and 22. increased capital efficiency.

A further object of the present invention is to provide systems and methods for the electronic exchange of contingent claims related to observable events of economic significance, which includes one or more of the following advantages:

1. reduced transaction costs, including settlement and clearing costs, associated with derivatives transactions and insurable claims;
2. reduced dependence on complicated valuation models for trading and risk management of derivatives;
3. reduced need for an exchange or market maker to manage market risk by hedging;
4. increased availability to traders of accurate and up-to-date information on the trading of contingent claims, including information regarding the aggregate amounts invested across all states of events of economic significance, and including over varying time periods;
5. reduced exposure of the exchange to credit risk;
6. increased availability of information on credit risk and market risk borne by traders of contingent claims;
7. increased availability of information on marginal returns from trades and investments that can be displayed instantaneously after the returns adjust during a trading period;
8. reduced need for a derivatives intermediary or exchange to match bids and offers;
9. increased ability to customize demand-based adjustable return (DBAR) payouts to permit replication of traditional financial products and their derivatives;
10. comparability of profit and loss scenarios to those expected by traders for purchases and sales of digital options and other derivatives, without conventional sellers;
11. increased data generation; and
12. reduced exposure of the exchange to market risk.

Additional objects and advantages of the invention are set forth in part in the description which follows, and in part are obvious from the description, or may be learned by practice of the invention. The objects and advantages of the invention may also be realized and attained by means of the instrumentalities, systems, methods and steps set forth in the appended claims.

BRIEF DESCRIPTION OF THE DRAWINGS

The accompanying drawings, which are incorporated in and from a part of the specification, illustrate embodiments of the present invention and, together with the description, serve to explain the principles of the invention.

FIG. 9*a* is a schematic representation of a traditional interest rate swap transaction.

FIG. 9*b* is a schematic of investor relationships for an illustrative group of DBAR contingent claims.

FIG. 9*c* shows a tabulation of credit ratings and margin trades for each investor in to an illustrative group of DBAR contingent claims.

FIG. 11 depicts illustrative DBAR data structures for use in a preferred embodiment of a Demand-Based Adjustable Return Digital Options Exchange of the present invention.

FIG. 19 depicts illustrative DBAR data structures used in another embodiment of a Demand-Based Adjustable Return Digital Options Exchange of the present invention.

FIG. 30 illustrates the components of a digital replicating basis for an example embodiment in which derivatives strategies are DBAR-enabled by replicating them into the digital replicating basis.

FIG. 31 illustrates the components of the vanilla replicating basis referenced in FIG. 29.

FIGS. 32 to 68 illustrates a DBAR System Architecture that implements the example embodiment depicted in FIGS. 29 and 31.

DETAILED DESCRIPTION OF PREFERRED EMBODIMENTS

Figure 1:
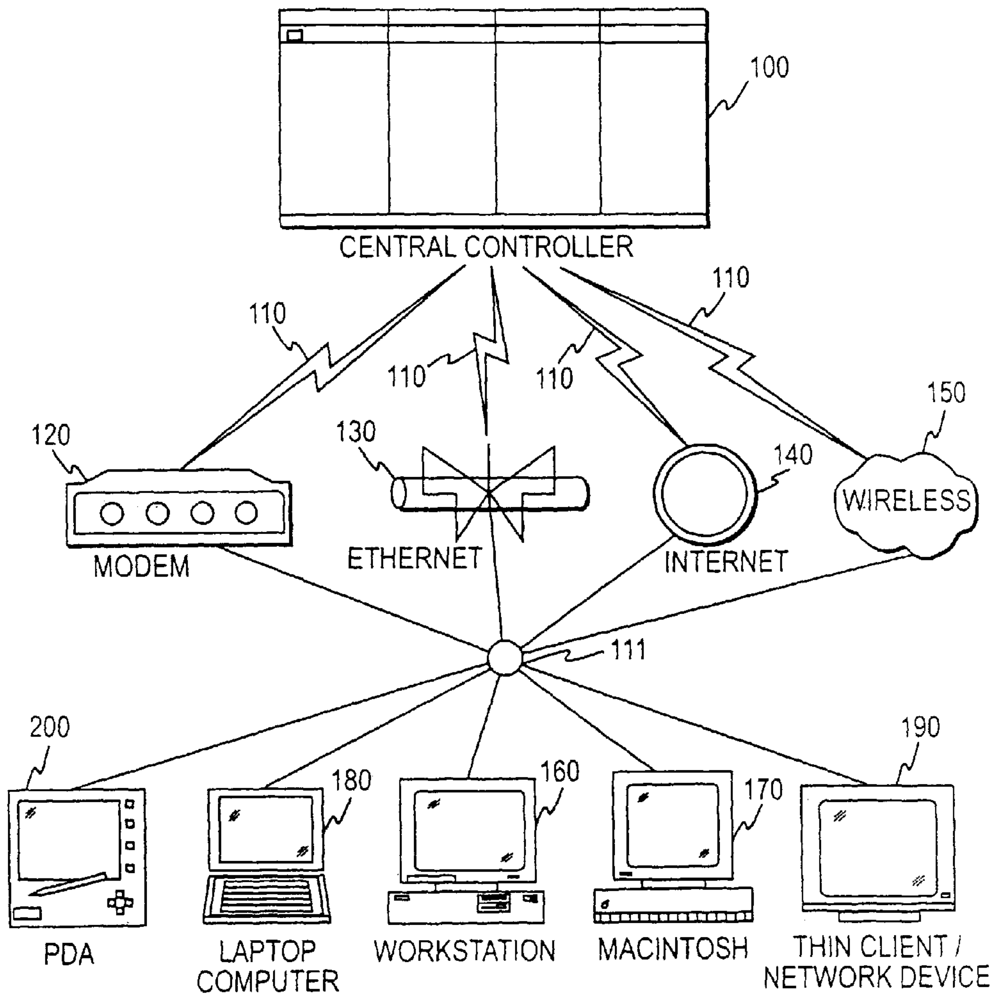
FIG. 1 is a schematic view of various forms of telecommunications between DBAR trader clients and a preferred embodiment of a DBAR contingent claims exchange implementing the present invention.

This Detailed Description of Preferred Embodiments is organized into sixteen sections. The first section provides an overview of systems and methods for trading or investing in groups of DBAR contingent claims. The second section describes in detail some of the important features of systems and methods for trading or investing in groups of DBAR contingent claims. The third section of this Detailed Description of Preferred Embodiments provides detailed descriptions of two preferred embodiments of the present invention: investments in a group of DBAR contingent claims, and investments in a portfolio of groups of such claims. The fourth section discusses methods for calculating risks attendant on investments in groups and portfolios of groups of DBAR contingent claims. The fifth section of this Detailed Description addresses liquidity and price/quantity relationships in preferred embodiments of systems and methods of the present invention. The sixth section provides a detailed description of a DBAR Digital Options Exchange. The seventh section provides a detailed description of another embodiment of a DBAR Digital Options Exchange. The eighth section presents a network implementation of this DBAR Digital Options Exchange. The ninth section presents a structured instrument implementation of a demand-based market or auction. The tenth section presents systems and methods for replicating derivatives strategies using contingent claims such as digitals or digital options, and trading such replicated derivatives strategies in a demand-based market. The eleventh section presents systems and methods for replicating derivatives strategies and other contingent claims (e.g., structured instruments), into a vanilla replicating basis (a basis including vanilla replicating claims, and sometimes also digital replicating claims), and trading such replicated derivatives strategies in a demand-based market or auction, pricing such derivatives strategies in the vanilla replicating basis. The twelfth section presents a detailed description of FIGS. 1 to 28 accompanying this specification. The thirteenth section presents a description of the DBAR system architecture, including additional detailed descriptions of figures accompanying the specification, with particular detail directed to the embodiments described in the eleventh section, and as illustrated in FIGS. 32 to 68. The fourteenth section of the Detailed Description discusses some of the salient advantages of the methods and systems of the present invention. The fifteenth section is a Technical Appendix providing additional information on the multistate allocation method of the present invention. The last section is a conclusion of the Detailed Description.

More specifically, this Detailed Description of the Preferred Embodiments is organized as follows:

1 Overview: Exchanges and Markets for as DBAR Contingent Claims
- 1.1 Exchange Design
- 1.2 Market Operation
- 1.3 Network Implementation 2 Features of DBAR Contingent Claims
- 2.1 DBAR Contingent Claim Notation
- 2.2 Units of Investment and Payouts
- 2.3 Canonical Demand Reallocation Functions
- 2.4 Computing Investment Amounts to Achieye Desired Payouts
- 2.5 A Canonical DRF Example
- 2.6 Interest Considerations
- 2.7 Returns and Probabilities
- 2.8 Computations When Invested Amounts are Large 3 Examples of Groups of DBAR Contingent Claims
- 3.1 DBAR Range Derivatives
- 3.2 DBAR Portfolios 4 Risk Calculations in Groups of DBAR Contingent Claims
- 4.1 Market Risk
  - 4.1.1 Capital-At-Risk Determinations
  - 4.1.2 Capital-At-Risk Determinations Using Monte Carlo Simulation Techniques
  - 4.1.3 Capital-At-Risk Deterniinations Using Historical Simulation Techniques
- 4.2 Credit Risk
  - 4.2.1 Credit-Capital-At-Risk Determinations
  - 4.2.2 Credit-Capital-At-Risk Determinations using Monte Carlo Simulation Techniques
  - 4.2.3 Credit-Capital-At-Risk Historical Simulation Techniques 5 Liquidity and Price/Quantity Relationships 6 DBAR Digital Options Exchange
- 6.1 Representation of Digital Options as DBAR Contingent Claims
- 6.2 Construction of Digital Options Using DBAR Methods and Systems
- 6.3 Digital Option Spreads
- 6.4 Digital Option Strips
- 6.5 Multistate Allocation Algorithm for Replicating "Sell" Trades
- 6.6 Clearing and Settlement
- 6.7 Contract Initialization
- 6.8 Conditional Investments, or Limit Orders
- 6.9 Sensitivity Analysis and Depth of Limit Order Book
- 6.10 Networking of DBAR Digital Options Exchanges 7 DBAR DOE: Another Embodiment
- 7.1 Special Notation
- 7.2 Elements of Example DBAR DOE Embodiment
- 7.3 Mathematical Principles
- 7.4 Equilibrium Algorithm
- 7.5 Sell Orders
- 7.6 Arbitrary Payout Options
- 7.7 Limit Order Book Optimization
- 7.8 Transaction Fees
- 7.9 An Embodiment of the Algorithm to Solve the Limit Order BookOptimization
- 7.10 Limit Order Book Display
- 7.11 Unique Price Equilibrium Proof 8 Network Implementation 9 Structured Instrument Trading
- 9.1 Overview: Customer Oriented DBAR-enabled Products
- 9.2 Overview: FRNs and swaps
- 9.3 Parameters: FRNs and swaps vs. digital options
- 9.4 Mechanics: DBAR-enabling FRNs and swaps
- 9.5 Example: Mapping FRNs into Digital Option Space
- 9.6 Conclusion -continued 10 Replicating Derivatives Strategies Using Digital Options
10.1 The General Approach to Replicating Derivatives Strategies With Digital Options
10.2 Application of General Results to Special Cases
10.3 Estimating the Distribution of the Underlying U
10.4 Replication P&L for a Set of Orders
Appendix 10A: Notation Used in Section 10
Appendix 10B: The General Replication Theorem
Appendix 10C: Derivations from Section 10.3
11 Replicating and Pricing Derivatives Strategies using Vanilla Options
11.1 Replicating Derivatives Strategies Using Digital Options
11.2 Replicating Claims Using a Vanilla Replicating Basis
11.3 Extensions to the General Replication Theorem
11.4 Mathematical Restrictions for the Equilibrium
11.5 Examples of DBAR Equilibria with the Digital Replicating Basis and the Vanilla Replicating Basis
Appendix 11A: Proof of General Replication Theorem in Section 11.2.3
Appendix 11B: Derivatives of the Self-Hedging Theorem of Section 11.4.5
Appendix 11C: Probability Weighted Statistics from Sections 11.5.2 and 11.5.3
Appendix 11D: Notation Used in the Body of Text
12 Detailed Description of the Drawings in FIGS. 1 to 28
13 DBAR System Architecture (and Description of the Drawings in FIGS. 32 to 68)
13.1 Terminology and Notation
13.2 Overview
13.3 Application Architecture
13.4 Data
13.5 Auction and Event Configuration
13.6 Order Processing
13.7 Auction State
13.8 Startup
13.9 CE (calculation engine) implementation
13.10 LE (limit order book engine) implementation
13.11 Network Architecture
13.12 FIGS. 32-68 Legend
Appendix 13A: Descriptions of Element Names in DBAR System Architecture
14 Advantages of Preferred Embodiments
15 Technical Appendix
16 Conclusion In this specification, including the description of preferred or example embodiments of the present invention, specific terminology will be used for the sake of clarity. However, the invention is not intended to be limited to the specific terms so used, and it is to be understood that each specific term includes all equivalents.

1. OVERVIEW

Exchanges and Markets for DBAR Contingent Claims

1.1 Exchange Design

This section describes preferred methods for structuring DBAR contingent claims and for designing exchanges for the trading of such claims. The design of the exchange is important for effective contingent claims investment in accordance with the present invention. Preferred embodiments of such systems include processes for establishing defined states and allocating returns, as described below.

(a) Establishing Defined States and Strikes: In preferred embodiments, a distribution of possible outcomes for an observable event is partitioned into defined ranges or states, and strikes can be established corresponding to measurable outcomes which occur at one of an upper and/or a lower end of each defined range or state. In certain preferred embodiments, one state always occurs because the states are mutually exclusive and collectively exhaustive. Traders in such an embodiment invest on their expectation of a return resulting from the occurrence of a particular outcome within a selected state. Such investments allow traders to hedge the possible outcomes of real-world events of economic significance represented by the states. In preferred embodiments of a group of DBAR contingent claims, unsuccessful trades or investments finance the successful trades or investments. In such embodiments the states for a given contingent claim preferably are defined in such a way that the states are mutually exclusive and form the basis of a probability distribution, namely, the sum of the probabilities of all the uncertain outcomes is unity. For example, states corresponding to stock price closing values can be established to support a group of DBAR contingent claims by partitioning the distribution of possible closing values for the stock on a given future date into ranges. The distribution of future stock prices, discretized in this way into defined states, forms a probability distribution in the sense that each state is mutually exclusive, and the sum of the probabilities of the stock closing within each defined state or between two strikes surrounding the defined state, at the given date is unity. In preferred embodiments, traders can simultaneously invest in selected multiple states or strikes within a given distribution, without immediately breaking up their investment to fit into each defined states or strikes selected for investment. Traders thus may place multi-state or multi-strike investments in order to replicate a desired distribution of returns from a group of contingent claims. This may be accomplished in a preferred embodiment of a DBAR exchange through the use of suspense accounts in which multi-state or multi-strike investments are tracked and reallocated periodically as returns adjust in response to amounts invested during a trading period. At the end of a given trading period, a multi-state or multi-strike investment may be reallocated to achieve the desired distribution of payouts based upon the final invested amounts across the distribution of states or strikes. Thus, in such a preferred embodiment, the invested amount allocated to each of the selected states or strikes, and the corresponding respective returns, are finalized only at the closing of the trading period. An example of a multi-state investment illustrating the use of such a suspense account is provided in Example 3.1.2, below. Other examples of multi-state investments are provided in Section 6, below, which describes embodiments of the present invention that implement DBAR Digital Options Exchanges. Other examples of investments in derivatives strategies with multiple strikes are shown and discussed below, including, inter alia, in Sections 10 and 11.

(b) Allocating Returns: In a preferred embodiment of a group of DBAR contingent claims according to the present invention, returns for each state are specified. In such an embodiment, while the amount invested for a given trade may be fixed, the return is adjustable. Determination of the returns for a particular state can be a simple function of the amount invested in that state and the total amount invested for all of the defined states for a group of contingent claims. However, alternate preferred embodiments can also accommodate methods of return determination that include other factors in addition to the invested amounts. For example, in a group of DBAR contingent claims where unsuccessful investments fund returns to successful investments, the returns can be allocated based on the relative amounts invested in each state and also on properties of the outcome, such as the magnitude of the price changes in underlying securities. An example in section 3.2 below illustrates such an embodiment in the context of a securities portfolio.

(c) Determining Investment Amounts: In other embodiments, a group of DBAR contingent claims can be modeled as digital options, providing a predetermined or defined payout if they expire in-the-money, and providing no payout if they expire out-of-the-money. In this embodiment, the investor or trader specifies a requested payout for a DBAR digital option, and selects the outcomes for which the digital option will expire "in the money," and can specify a limit on the amount they wish to invest in such a digital option. Since the payout amount per digital option (or per an order for a digital option) is predetermined or defined, investment amounts for each digital option are determined at the end of the trading period along with the allocation of payouts per digital option as a function of the requested payouts, selected outcomes (and limits on investment amounts, if any) for each of the digital options ordered during the trading period, and the total amount invested in the auction or market. This embodiment is described in Section 7 below, along with another embodiment of demand-based markets or auctions for digital options described in Section 6 below. In additional embodiments, a variety of contingent claims, including derivatives strategies and financial products and structured instruments can be replicated or approximated with a set of DBAR contingent claims (sometimes called, "replicating claims,") otherwise regarded as mapping the contingent claims into a DBAR contingent claim space or basis. The DBAR contingent claims or replicating claims, can include replicating digital options or, in a vanilla replicating basis, include replicating vanilla options alone, or together with replicating digital options. The price of such replicated contingent claims is determined by engaging in the demand-based or DBAR valuation of each of the replicating digital options and/or vanilla options in the replication set. These embodiments are described in Sections 10 and 11, as well as a system architecture described in Section 13 to accomplish a technical implementation of the entire process.

1.2 Market Operation (a) Termination Criteria: In a preferred embodiment of a method of the present invention, returns to investments in the plurality of defined states are allocated (and in another embodiment for DBAR digital options, investment amounts are determined) after the fulfillment of one or more predetermined termination criteria. In preferred embodiments, these criteria include the expiration of a "trading period" and the determination of the outcome of the relevant event after an "observation period." In the trading period, traders invest on their expectation of a return resulting from the occurrence of a particular outcome within a selected defined state, such as the state that IBM stock will close between 120 and 125 on Jul. 6, 1999. In a preferred embodiment, the duration of the trading period is known to all participants; returns associated with each state vary during the trading period with changes in invested amounts; and returns are allocated based on the total amount invested in all states relative to the amounts invested in each of the states as at the end of the trading period.

Alternatively, the duration of the trading period can be unknown to the participants. The trading period can end, for example, at a randomly selected time. Additionally, the trading period could end depending upon the occurrence of some event associated or related to the event of economic significance, or upon the fulfillment of some criterion. For example, for DBAR contingent claims traded on reinsurance risk (discussed in Section 3 below), the trading period could close after an nth catastrophic natural event (e.g., a fourth hurricane), or after a catastrophic event of a certain magnitude (e.g., an earthquake of a magnitude of 5.5 or higher on the Richter scale). The trading period could also close after a certain volume, amount, or frequency of trading is reached in a respective auction or market.

The observation period can be provided as a time period during which the contingent events are observed and the relevant outcomes determined for the purpose of allocating returns. In a preferred embodiment, no trading occurs during the observation period.

The expiration date, or "expiration," of a group of DBAR contingent claims as used in this specification occurs when the termination criteria are fulfilled for that group of DBAR contingent claims. In a preferred embodiment, the expiration is the date, on or after the occurrence of the relevant event, when the outcome is ascertained or observed. This expiration is similar to well-known expiration features in traditional options or futures in which a future date, i.e., the expiration date, is specified as the date upon which the value of the option or future will be determined by reference to the value of the underlying financial product on the expiration date.

The duration of a contingent claim as defined for purposes of this specification is simply the amount of time remaining until expiration from any given reference date. A trading start date ("TSD") and a trading end date ("TED"), as used in the specification, refer to the beginning and end of a time period ("trading period") during which traders can make investments in a group of DBAR contingent claims. Thus, the time during which a group of DBAR contingent claims is open for investment or trading, i.e., the difference between the TSD and TED, may be referred to as the trading period. In preferred embodiments, there can be one or many trading periods for a given expiration date, opening successively through time. For example, one trading period's TED may coincide exactly with the subsequent trading period's TSD, or in other examples, trading periods may overlap.

The relationship between the duration of a contingent claim, the number of trading periods employed for a given event, and the length and timing of the trading periods, can be arranged in a variety of ways to maximize trading or achieve other goals. In preferred embodiments at least one trading period occurs—that is, starts and ends—prior in time to the identification of the outcome of the relevant event. In other words, in preferred embodiments, the trading period will most likely temporally precede the event defining the claim. This need not always be so, since the outcome of an event may not be known for some time thereby enabling trading periods to end (or even start) subsequent to the occurrence of the event, but before its outcome is known.

A nearly continuous or "quasi-continuous" market can be made available by creating multiple trading periods for the same event, each having its own closing returns. Traders can make investments during successive trading periods as the returns change. In this way, profits-and-losses can be realized at least as frequently as in current derivatives markets. This is how derivatives traders currently are able to hedge options, futures, and other derivatives trades. In preferred embodiments of the present invention, traders may be able to realize profits and at varying frequencies, including more frequently than daily.

(b) Market Efficiency and Fairness: Market prices reflect, among other things, the distribution of information available to segments of the participants transacting in the market. In most markets, some participants will be better informed than others. In house-banking or traditional markets, market makers protect themselves from more informed counterparties by increasing their bid-offer spreads.

In preferred embodiments of DBAR contingent claim markets, there may be no market makers as such who need to protect themselves. It may nevertheless be necessary to put in place methods of operation in such markets in order to prevent manipulation of the outcomes underlying groups of DBAR contingent claims or the returns payable for various outcomes. One such mechanism is to introduce an element of randomness as to the time at which a trading period closes. Another mechanism to minimize the likelihood and effects of market manipulation is to introduce an element of randomness to the duration of the observation period. For example, a DBAR contingent claim might settle against an average of market closing prices during a time interval that is partially randomly determined, as opposed to a market closing price on a specific day.

Additionally, in preferred embodiments incentives can be employed in order to induce traders to invest earlier in a trading period rather than later. For example, a DRF may be used which allocates slightly higher returns to earlier investments in a successful state than later investments in that state. For DBAR digital options; an OPF may be used which determines slightly lower (discounted) prices for earlier investments than later investments. Earlier investments may be valuable in preferred embodiments since they work to enhance liquidity and promote more uniformly meaningful price information during the trading period.

(c) Credit Risk: In preferred embodiments of a DBAR contingent claims market, the dealer or exchange is substantially protected from primary market risk by the fundamental principle underlying the operation of the system—that returns to successful investments are funded by losses from unsuccessful investments. The credit risk in such preferred embodiments is distributed among all the market participants. If, for example, leveraged investments are permitted within a group of DBAR contingent claims, it may not be possible to collect the leveraged unsuccessful investments in order to distribute these amounts among the successful investments.

In almost all such cases there exists, for any given trader within a group of DBAR contingent claims, a non-zero possibility of default, or credit risk. Such credit risk is, of course, ubiquitous to all financial transactions facilitated with credit.

One way to address this risk is to not allow leveraged investments within the group of DBAR contingent claims, which is a preferred embodiment of the system and methods of the present invention. In other preferred embodiments, traders in a DBAR exchange may be allowed to use limited leverage, subject to real-time margin monitoring, including calculation of a trader's impact on the overall level of credit risk in the DBAR system and the particular group of contingent claims. These risk management calculations should be significantly more tractable and transparent than the types of analyses credit risk managers typically perform in conventional derivatives markets in order to monitor counterparty credit risk.

An important feature of preferred embodiments of the present invention is the ability to provide diversification of credit risk among all the traders who invest in a group of DBAR contingent claims. In such embodiments, traders make investments (in the units of value as defined for the group) in a common distribution of states in the expectation of receiving a return if a given state is determined to have occurred. In preferred embodiments, all traders, through their investments in defined states for a group of contingent claims, place these invested amounts with a central exchange or intermediary which, for each trading period, pays the returns to successful investments from the losses on unsuccessful investments. In such embodiments, a given trader has all the other traders in the exchange as counterparties, effecting a mutualization of counterparties and counterparty credit risk exposure. Each trader therefore assumes credit risk to a portfolio of counterparties rather than to a single counterparty.

Preferred embodiments of the DBAR contingent claim and exchange of the present invention present four principal advantages in managing the credit risk inherent in leveraged transactions. First, a preferred form of DBAR contingent claim entails limited liability investing. Investment liability is limited in these embodiments in the sense that the maximum amount a trader can lose is the amount invested. In this respect, the limited liability feature is similar to that of a long option position in the traditional markets. By contrast, a short option position in traditional markets represents a potentially unlimited liability investment since the downside exposure can readily exceed the option premium and is, in theory, unbounded. Importantly, a group of DBAR contingent claims of the present invention can easily replicate returns of a traditional short option position while maintaining limited liability. The limited liability feature of a group of DBAR contingent claims is a direct consequence of the demand-side nature of the market. More specifically, in preferred embodiments there are no sales or short positions as there are in the traditional markets, even though traders in a group of DBAR contingent claims may be able to attain the return profiles of traditional short positions.

Second, in preferred embodiments, a trader within a group of DBAR contingent claims should have a portfolio of counterparties as described above. As a consequence, there should be a statistical diversification of the credit risk such that the amount of credit risk borne by any one trader is, on average (and in all but exceptionally rare cases), less than if there were an exposure to a single counterparty as is frequently the case in traditional markets. In other words, in preferred embodiments of the system and methods of the present invention, each trader is able to take advantage of the diversification effect that is well known in portfolio analysis.

Third, in preferred embodiments of the present invention, the entire distribution of margin loans, and the aggregate amount of leverage and credit risk existing for a group of DBAR contingent claims, can be readily calculated and displayed to traders at any time before the fulfillment of all of the termination criteria for the group of claims. Thus, traders themselves may have access to important information regarding credit risk. In traditional markets such information is not readily available.

Fourth, preferred embodiments of a DBAR contingent claim exchange provide more information about the distribution of possible outcomes than do traditional market exchanges. Thus, as a byproduct of DBAR contingent claim trading according to preferred embodiments, traders have more information about the distribution of future possible outcomes for real-world events, which they can use to manage risk more effectively. For many traders, a significant part of credit risk is likely to be caused by market risk. Thus, in preferred embodiments of the present invention, the ability through an exchange or otherwise to control or at least provide information about market risk should have positive feedback effects for the management of credit risk.

A simple example of a group of DBAR contingent claims with the following assumptions, illustrates some of these features. The example uses the following basic assumptions:

two defined states (with predetermined termination criteria): (i) stock price appreciates in one month; (ii) stock price depreciates in one month; and $100 has been invested in the appreciate state, and $95 in the depreciate state.

If a trader then invests $1 in the appreciate state, if the stock in fact appreciates in the month, then the trader will be allocated a payout of $1.9406 (=196/101)—a return of $0.9406 plus the original $1 investment (ignoring, for the purpose of simplicity in this illustration, a transaction fee). If, before the close of the trading period the trader desires effectively to "sell" his investment in the appreciate state, he has two choices. He could sell the investment to a third party, which would necessitate crossing of a bid and an offer in a two-way order crossing network. Or, in a preferred embodiment of the method of the present invention, the trader can invest in the depreciate state, in proportion to the amount that had been invested in that state not counting the trader's "new" investments. In this example, in order to fully hedge his investment in the appreciate state, the trader can invest $0.95 (95/100) in the depreciate state. Under either possible outcome, therefore, the trader will receive a payout of $1.95, i.e., if the stock appreciates the trader will receive 196.95/101=$1.95 and if the stock depreciates the trader will receive (196.95/95.95) *95=$1.95.

1.3 Network Implementation

A market or exchange for groups of DBAR contingent claims market according to the invention is not designed to establish a counterparty-driven or order-matched market. Buyers' bids and sellers' offers do not need to be "crossed." As a consequence of the absence of a need for an order crossing network, preferred embodiments of the present invention are particularly amenable to large-scale electronic network implementation on a wide area network or a private network (with, e.g., dedicated circuits) or the public Internet, for example. Additionally, a network implementation of the embodiments in which contingent claims are mapped or replicated into a vanilla replicating basis, in order to be subject to a demand-based or DBAR valuation, is described in more detail in Section 13 below.

Preferred embodiments of an electronic network-based embodiment of the method of trading in accordance with the invention include one or more of the following features.

(a) User Accounts: DBAR contingent claims investment accounts are established using electronic methods.

(b) Interest and Margin Accounts: Trader accounts are maintained using electronic methods to record interest paid to traders on open DBAR contingent claim balances and to debit trader balances for margin loan interest. Interest is typically paid on outstanding investment balances for a group of DBAR contingent claims until the fulfillment of the termination criteria. Interest is typically charged on outstanding margin loans while such loans are outstanding. For some contingent claims, trade balance interest can be imputed into the closing returns of a trading period.

(c) Suspense Accounts: These accounts relate specifically to investments which have been made by traders, during trading periods, simultaneously in multiple states for the same event. Multi-state trades are those in which amounts are invested over a range of states so that, if any of the states occurs, a return is allocated to the trader based on the closing return for the state which in fact occurred. DBAR digital options of the present invention, described in Section 6, provide other examples of multi-state trades.

A trader can, of course, simply break-up or divide the multi-state investment into many separate, single-state investments, although this approach might require the trader to keep rebalancing his portfolio of single state investments as returns adjust throughout the trading period as amounts invested in each state change.

Multi-state trades can be used in order to replicate any arbitrary distribution of payouts that a trader may desire. For example, a trader might want to invest in all states in excess of a given value or price for a security underlying a contingent claim, e.g., the occurrence that a given stock price exceeds 100 at some future date. The trader might also want to receive an identical payout no matter what state occurs among those states. For a group of DBAR contingent claims there may well be many states for outcomes in which the stock price exceeds 100 (e.g., greater than 100 and less than or equal to 101; greater than 101 and less than or equal to 102, etc.). In order to replicate a multi-state investment using single state investments, a trader would need continually to rebalance the portfolio of single-state investments so that the amount invested in the selected multi-states is divided among the states in proportion to the existing amount invested in those states. Suspense accounts can be employed so that the exchange, rather than the trader, is responsible for rebalancing the portfolio of single-state investments so that, at the end of the trading period, the amount of the multi-state investment is allocated among the constituent states in such a way so as to replicate the trader's desired distribution of payouts. Example 3.1.2 below illustrates the use of suspense accounts for multi-state investments.

(d) Authentication: Each trader may have an account that may be authenticated using authenticating data.

(e) Data Security: The security of contingent claims transactions over the network may be ensured, using for example strong forms of public and private key encryption.

(f) Real-Time Market Data Server: Real-time market data may be provided to support frequent calculation of returns and to ascertain the outcomes during the observation periods.

(g) Real-Time Calculation Engine Server: Frequent calculation of market returns may increase the efficient functioning of the market. Data on coupons, dividends, market interest rates, spot prices, and other market data can be used to calculate opening returns at the beginning of a trading period and to ascertain observable events during the observation period. Sophisticated simulation methods may be required for some groups of DBAR contingent claims in order to estimate expected returns, at least at the start of a trading period.

(h) Real-Time Risk Management Server: In order to compute trader margin requirements, expected returns for each trader should be computed frequently. Calculations of "value-at-risk" in traditional markets can involve onerous matrix calculations and Monte Carlo simulations. Risk calculations in preferred embodiments of the present invention are simpler, due to the existence of information on the expected returns for each state. Such information is typically unavailable in traditional capital and reinsurance markets.

(i) Market Data Storage: A DBAR contingent claims exchange in accordance with the invention may generate valuable data as a byproduct of its operation. These data are not readily available in traditional capital or insurance markets. In a preferred embodiment of the present invention, investments may be solicited over ranges of outcomes for market events, such as the event that the 30-year U.S. Treasury bond will close on a given date with a yield between 6.10% and 6.20%. Investment in the entire distribution of states generates data that reflect the expectations of traders over the entire distribution of possible outcomes. The network implementation disclosed in this specification may be used to capture, store and retrieve these data.

(j) Market Evaluation Server: Preferred embodiments of the method of the present invention include the ability to improve the market's efficiency on an ongoing basis. This may readily be accomplished, for example, by comparing the predicted returns on a group of DBAR contingent claims returns with actual realized outcomes. If investors have rational expectations, then DBAR contingent claim returns will, on average, reflect trader expectations, and these expectations will themselves be realized on average. In preferred embodiments, efficiency measurements are made on defined states and investments over the entire distribution of possible outcomes, which can then be used for statistical time series analysis with realized outcomes. The network implementation of the present invention may therefore include analytic servers to perform these analyses for the purpose of continually improving the efficiency of the market.

2. FEATURES OF DBAR CONTINGENT CLAIMS

In a preferred embodiment, a group of a DBAR contingent claims related to an observable event includes one or more of the following features:

(1) A defined set of collectively exhaustive states representing possible real-world outcomes related to an observable event. In preferred embodiments, the events are events of economic significance. The possible outcomes can typically be units of measurement associated with the event, e.g., an event of economic interest can be the closing index level of the S&P 500 one month in the future, and the possible outcomes can be entire range of index levels that are possible in one month. In a preferred embodiment, the states are defined to correspond to one or more of the possible outcomes over the entire range of possible outcomes, so that defined states for an event form a countable and discrete number of ranges of possible outcomes, and are collectively exhaustive in the sense of spanning the entire range of possible outcomes. For example, in a preferred embodiment, possible outcomes for the S&P 500 can range from greater than 0 to infinity (theoretically), and a defined state could be those index values greater than 1000 and less than or equal to 1100. In such preferred embodiments, exactly one state occurs when the outcome of the relevant event becomes known.

(2) The ability for traders to place trades on the designated states during one or more trading periods for each event. In a preferred embodiment, a DBAR contingent claim group defines the acceptable units of trade or value for the respective claim. Such units may be dollars, barrels of oil, number of shares of stock, or any other unit or combination of units accepted by traders and the exchange for value.

(3) An accepted determination of the outcome of the event for determining which state or states have occurred. In a preferred embodiment, a group of DBAR contingent claims defines the means by which the outcome of the relevant events is determined. For example, the level that the S&P 500 Index actually closed on a predetermined date would be an outcome observation which would enable the determination of the occurrence of one of the defined states. A closing value of 1050 on that date, for instance, would allow the determination that the state between 1000 and 1100 occurred.

(4) The specification of a DRF which takes the traded amount for each trader for each state across the distribution of states as that distribution exists at the end of each trading period and calculates payouts for each investments in each state conditioned upon the occurrence of each state. In preferred embodiments, this is done so that the total amount of payouts does not exceed the total amount invested by all the traders in all the states. The DRF can be used to show payouts should each state occur during the trading period, thereby providing to traders information as to the collective level of interest of all traders in each state.

(5) For DBAR digital options, the specification of an OPF which takes the requested payout and selection of outcomes and limits on investment amounts (if any) per digital option at the end of each trading period and calculates the investment amounts per digital option, along with the payouts for each digital option in each state conditioned upon the occurrence of each state. In this other embodiment, this is done by solving a nonlinear optimization problem which uses the DRF along with a series of other parameters to determine an optimal investment amount per digital option while maximizing the possible payout per digital option.

(6) Payouts to traders for successful investments based on the total amount of the unsuccessful investments after deduction of the transaction fee and after fulfillment of the termination criteria.

(7) For DBAR digital options, investment amounts per digital option after factoring in the transaction fee and after fulfillment of the termination criteria.

The states corresponding to the range of possible event outcomes are referred to as the "distribution" or "distribution of states." Each DBAR contingent claim group or "contract" is typically associated with one distribution of states. The distribution will typically be defined for events of economic interest for investment by traders having the expectation of a return for a reduction of risk ("hedging"), or for an increase of risk ("speculation"). For example, the distribution can be based upon the values of stocks, bonds, futures, and foreign exchange rates. It can also be based upon the values of commodity indices, economic statistics (e.g., consumer price inflation monthly reports), property-casualty losses, weather patterns for a certain geographical region, and any other measurable or observable occurrence or any other event in which traders would not be economically indifferent even in the absence of a trade on the outcome of the event.

2.1 DBAR Claim Notation

The following notation is used in this specification to facilitate further description of DBAR contingent claims:

| | |
|---|---|
| m | represents the number of traders for a given group of DBAR contingent claims |
| n | represents the number of states for a given distribution associated with a given group of DBAR contingent claims |
| A | represents a matrix with m rows and n columns, where the element at the i-th row and j-th column, $\alpha_{i,j}$, is the amount that trader i has invested in state j in the expectation of a return should state j occur |
| Π | represents a matrix with n rows and n columns where element $\pi_{i,j}$ is the payout per unit of investment in state i should state j occur ("unit payouts") |
| R | represents a matrix with n rows and n columns where element $r_{i,j}$ is the return per unit of investment in state i should state j occur, i.e., $r_{i,j} = \pi_{i,j} - 1$ ("unit returns") |
| P | represents a matrix with m rows and n columns, where the element at the i-th row and j-th column, $p_{i,j}$ is the payout to be made to trader i should state j occur, i.e., P is equal to the matrix product A * Π. |
| $P*_j$ | represents the j-th column of P, for j = 1 . . . n, which contains the payouts to each investment should state j occur |
| $P_i,*$ | represents the i-th row of P, for i = 1 . . . m, which contains the payouts to trader i |
| $s_i$ | where i = 1 . . . n, represents a state representing a range of possible outcomes of an observable event. |
| $T_i$ | where i = 1 . . . n, represents the total amount traded in the expectation of the occurrence of state i |
| T | represents the total traded amount over the entire distribution of states, i.e., $T = \sum_{i=1 \ldots n} T_i$ |
| f(A, X) | represents the exchange's transaction fee, which can depend on the entire distribution of traded amounts placed across all the states as well as other factors, X, some of which are identified below. For reasons of brevity, for the remainder of this specification unless otherwise stated, the transaction fee is assumed to be a fixed percentage of the total amount traded over all the states. |
| $c_p$ | represents the interest rate charged on margin loans. |
| $c_r$ | represents the interest rate paid on trade balances. |
| t | represents time from the acceptance of a trade or investment to the fulfillment of all of the termination criteria for the group of DBAR contingent claims, typically expressed in years or fractions thereof. |
| X | represents other information upon which the DRF or transaction fee can depend such as information specific to an investment or a trader, including for example the time or size of a trade. |

In preferred embodiments, a DRF is a function that takes the traded amounts over the distribution of states for a given group of DBAR contingent claims, the transaction fee schedule, and, conditional upon the occurrence of each state, computes the payouts to each trade or investment placed over the distribution of states. In notation, such a DRF is:

$$P=\mathrm{DRF}(A,f(A,X),X|s=s_i)=A*\Pi(A,f(A,X),X) \qquad \text{(DRF)}$$

In other words, the m traders who have placed trades across the n states, as represented in matrix A, will receive payouts as represented in matrix P should state i occur, also, taking into account the transaction fee f and other factors X. The payouts identified in matrix P can be represented as the product of (a) the payouts per unit traded for each state should each state occur, as identified in the matrix Π, and (b) the matrix A which identifies the amounts traded or invested by each trader in each state. The following notation may be used to indicate that, in preferred embodiments, payouts should not exceed the total amounts invested less the transaction fee, irrespective of which state occurs:

$$1_m^T*P_{*,j}+f(A,X)<=1_m^T*A*1_n \text{ for } j=1 \ldots n \qquad \text{(DRF Constraint)}$$

where the 1 represents a column vector with dimension indicated by the subscript, the superscript T represents the standard transpose operator and $P_{*,j}$ is the j-th column of the matrix P representing the payouts to be made to each trader should state j occur. Thus, in preferred embodiments, the unsuccessful investments finance the successful investments. In addition, absent credit-related risks discussed below, in such embodiments there is no risk that payouts will exceed the total amount invested in the distribution of states, no matter what state occurs. In short, a preferred embodiment of a group of DBAR contingent claims of the present invention is self-financing in the sense that for any state, the payouts plus the transaction fee do not exceed the inputs (i.e., the invested amounts).

The DRF may depend on factors other than the amount of the investment and the state in which the investment was made. For example, a payout may depend upon the magnitude of a change in the observed outcome for an underlying event between two dates (e.g., the change in price of a security between two dates). As another example, the DRF may allocate higher payouts to traders who initiated investments earlier in the trading period than traders who invested later in the trading period, thereby providing incentives for liquidity earlier in the trading period. Alternatively, the DRF may allocate higher payouts to larger amounts invested in a given state than to smaller amounts invested for that state, thereby providing another liquidity incentive.

In any event, there are many possible functional forms for a DRF that could be used. To illustrate, one trivial form of a DRF is the case in which the traded amounts, A, are not reallocated at all upon the occurrence of any state, i.e., each trader receives his traded amount back in the event that any state occurs, as indicated by the following notation:

$$P=A \text{ if } s=s_i, \text{ for } i=1 \ldots n$$

This trivial DRF is not useful in allocating and exchanging risk among hedgers.

For a meaningful risk exchange to occur, a preferred embodiment of a DRF should effect a meaningful reallocation of amounts invested across the distribution of states upon the occurrence of at least one state. Groups of DBAR contingent claims of the present invention are discussed in the context of a canonical DRF, which is a preferred embodiment in which the amounts invested in states which did not occur are completely reallocated to the state which did occur (less any transaction fee). The present invention is not limited to a canonical DRF, and many other types of DRFs can be used and may be preferred to implement a group of DBAR contingent claims. For example, another DRF preferred embodiment allocates half the total amount invested to the outcome state and rebates the remainder of the total amount invested to the states which did not occur. In another preferred embodiment, a DRF would allocate some percentage to an occurring state, and some other percentage to one or more "nearby" or "adjacent" states with the bulk of the non-occurring states receiving zero payouts. Section 7 describes an OPF for DBAR digital options which includes a DRF and determines investment amounts per investment or order along with allocating returns. Other DRFs will be apparent to those of skill in the art from review of this specification and practice of the present invention.

2.2 Units of Investments and Payouts

The units of investments and payouts in systems and methods of the present invention may be units of currency, quantities of commodities, numbers of shares of common stock, amount of a swap transaction or any other units representing economic value. Thus, there is no limitation that the investments or payouts be in units of currency or money (e.g., U.S. dollars) or that the payouts resulting from the DRF be in the same units as the investments. Preferably, the same unit of value is used to represent the value of each investment, the total amount of all investments in a group of DBAR contingent claims, and the amounts invested in each state.

It is possible, for example, for traders to make investments in a group of DBAR contingent claims in numbers of shares of common stock and for the applicable DRF (or OPF) to allocate payouts to traders in Japanese Yen or barrels of oil. Furthermore, it is possible for traded amounts and payouts to be some combination of units, such as, for example, a combination of commodities, currencies, and number of shares. In preferred embodiments traders need not physically deposit or receive delivery of the value units, and can rely upon the DBAR contingent claim exchange to convert between units for the purposes of facilitating efficient trading and payout transactions. For example, a DBAR contingent claim might be defined in such a way so that investments and payouts are to be made in ounces of gold. A trader can still deposit currency, e.g., U.S. dollars, with the exchange and the exchange can be responsible for converting the amount invested in dollars into the correct units, e.g., gold, for the purposes of investing in a given state or receiving a payout. In this specification, a U.S. dollar is typically used as the unit of value for investments and payouts. This invention is not limited to investments or payouts in that value unit. In situations where investments and payouts are made in different units or combinations of units, for purpose of allocating returns to each investment the exchange preferably converts the amount of each investment, and thus the total of the investments in a group of DBAR contingent claims, into a single unit of value (e.g., dollars). Example 3.1.20 below illustrates a group of DBAR contingent claims in which investments and payouts are in units of quantities of common stock shares.

2.3 Canonical Demand Reallocation Function

A preferred embodiment of a DRF that can be used to implement a group of DBAR contingent claims is termed a "canonical" DRF. A canonical DRF is a type of DRF which has the following property: upon the occurrence of a given state i, investors who have invested in that state receive a payout per unit invested equal to (a) the total amount traded for all the states less the transaction fee, divided by (b) the total amount invested in the occurring state. A canonical DRF may employ a transaction fee which may be a fixed percentage of the total amount traded, T, although other transaction fees are possible. Traders who made investments in states which not did occur receive zero payout. Using the notation developed above:

$$\pi_{i,j} = \frac{(1-f)*T}{T_i}$$

if i=j, i.e., the unit payout to an investment in state i if state i occurs $\pi_{i,j}=0$ otherwise, i.e., if i≠j, so that the payout is zero to investments in state i if state j occurs.

In a preferred embodiment of a canonical DRF, the unit payout matrix Π as defined above is therefore a diagonal matrix with entries equal to $\pi_{i,j}$ for i=j along the diagonal, and zeroes for all off-diagonal entries. For example, in a preferred embodiment for n=5 states, the unit payout matrix is:

$$\Pi = \begin{bmatrix} \frac{T}{T_1} & 0 & 0 & 0 & 0 \\ 0 & \frac{T}{T_2} & 0 & 0 & 0 \\ 0 & 0 & \frac{T}{T_3} & 0 & 0 \\ 0 & 0 & 0 & \frac{T}{T_4} & 0 \\ 0 & 0 & 0 & 0 & \frac{T}{T_5} \end{bmatrix} * (1-f) = \begin{bmatrix} \frac{1}{T_1} & 0 & 0 & 0 & 0 \\ 0 & \frac{1}{T_2} & 0 & 0 & 0 \\ 0 & 0 & \frac{1}{T_3} & 0 & 0 \\ 0 & 0 & 0 & \frac{1}{T_4} & 0 \\ 0 & 0 & 0 & 0 & \frac{1}{T_5} \end{bmatrix} * T * (1-f)$$

For this embodiment of a canonical DRF, the payout matrix is the total amount invested less the transaction fee, multiplied by a diagonal matrix which contains the inverse of the total amount invested in each state along the diagonal, respectively, and zeroes elsewhere. Both T, the total amount invested by all m traders across all n states, and $T_i$, the total amount invested in state i, are functions of the matrix A, which contains the amount each trader has invested in each state:

$$T_i = 1_m^T * A * B_n(i)$$

$$T = 1_m^T * A * 1_n$$

where $B_n(i)$ is a column vector of dimension n which has a 1 at the i-th row and zeroes elsewhere. Thus, with n=5 as an example, the canonical DRF described above has a unit payout matrix which is a function of the amounts traded across the states and the transaction fee:

$$\Pi = \begin{bmatrix} \frac{1}{1_m^T * A * B_n(1)} & 0 & 0 & 0 & 0 \\ 0 & \frac{1}{1_m^T * A * B_n(2)} & 0 & 0 & 0 \\ 0 & 0 & \frac{1}{1_m^T * A * B_n(3)} & 0 & 0 \\ 0 & 0 & 0 & \frac{1}{1_m^T * A * B_n(4)} & 0 \\ 0 & 0 & 0 & 0 & \frac{1}{1_m^T * A * B_n(5)} \end{bmatrix} * 1_m^T * A * 1_n * (1-f)$$

which can be generalized for any arbitrary number of states. The actual payout matrix, in the defined units of value for the group of DBAR contingent claims (e.g., dollars), is the product of the m×n traded amount matrix A and the n×n unit payout matrix Π, as defined above:

$$P = A * \Pi(A, f) \qquad \text{(CDRF)}$$

This provides that the payout matrix as defined above is the matrix product of the amounts traded as contained in the matrix A and the unit payout matrix Π, which is itself a function of the matrix A and the transaction fee, f. The expression is labeled CDRF for "Canonical Demand Reallocation Function."

It should be noted that, in this preferred embodiment, any change to the matrix A will generally have an effect on any given trader's payout, both due to changes in the amount invested, i.e., a direct effect through the matrix A in the CDRF, and changes in the unit payouts, i.e., an indirect effect since the unit payout matrix Π is itself a function of the traded amount matrix A.

2.4 Computing Investment Amounts to Achieve Desired Payouts

In preferred embodiments of a group of DBAR contingent claims of the present invention, some traders make investments in states during the trading period in the expectation of a payout upon the occurrence of a given state, as expressed in the CDRF above. Alternatively, a trader may have a preference for a desired payout distribution should a given state occur. DBAR digital options, described in Section 6, are an example of an investment with a desired payout distribution should one or more specified states occur. Such a payout distribution could be denoted $P_{i,*}$, which is a row corresponding to trader i in payout matrix P. Such a trader may want to know how much to invest in contingent claims corresponding to a given state or states in order to achieve this payout distribution. In a preferred embodiment, the amount or amounts to be invested across the distribution of states for the CDRF, given a payout distribution, can be obtained by inverting the expression for the CDRF and solving for the traded amount matrix A:

$$A=P*\Pi(A,f)^{-1} \quad \text{(CDRF 2)}$$

In this notation, the −1 superscript on the unit payout matrix denotes a matrix inverse.

Expression CDRF 2 does not provide an explicit solution for the traded amount matrix A, since the unit payout matrix Π is itself a function of the traded amount matrix. CDRF 2 typically involves the use of numerical methods to solve m simultaneous quadratic equations. For example, consider a trader who would like to know what amount, α, should be traded for a given state i in order to achieve a desired payout of p. Using the “forward” expression to compute payouts from traded amounts as in CDRF above yields the following equation:

$$p=\left(\frac{T+\alpha}{T_i+\alpha}\right)*\alpha$$

This represents a given row and column of the matrix equation CDRF after α has been traded for state i (assuming no transaction fee). This expression is quadratic in the traded amount α, and can be solved for the positive quadratic root as follows:

$$\alpha=\frac{(p-T)+\sqrt{(p-T)^2+4*p*T_i}}{2} \quad \text{(CDRF 3)}$$

2.5 A Canonical DRF Example

A simplified example illustrates the use of the CDRF with a group of DBAR contingent claims defined over two states (e.g., states “1” and “2”) in which four traders make investments. For the example, the following assumptions are made: (1) the transaction fee, f, is zero; (2) the investment and payout units are both dollars; (3) trader 1 has made investments in the amount of $5 in state 1 and $10 state 2; and (4) trader 2 has made an investment in the amount of $7 for state 1 only. With the investment activity so far described, the traded amount matrix A, which as 4 rows and 2 columns, and the unit payout matrix Π which has 2 rows and 2 columns, would be denoted as follows:

$$A=\begin{matrix}5 & 10\\ 7 & 0\\ 0 & 0\\ 0 & 0\end{matrix}$$

$$\Pi=\begin{bmatrix}\frac{1}{12} & 0\\ 0 & \frac{1}{10}\end{bmatrix}*22$$

The payout matrix P, which contains the payouts in dollars for each trader should each state occur is, the product of A and Π:

$$P=\begin{matrix}9.167 & 22\\ 12.833 & 0\\ 0 & 0\\ 0 & 0\end{matrix}$$

The first row of P corresponds to payouts to trader 1 based on his investments and the unit payout matrix. Should state 1 occur, trader 1 will receive a payout of $9.167 and will receive $22 should state 2 occur. Similarly, trader 2 will receive $12.833 should state 1 occur and $0 should state 2 occur (since trader 2 did not make any investment in state 2). In this illustration, traders 3 and 4 have $0 payouts since they have made no investments.

In accordance with the expression above labeled “DRF Constraint,” the total payouts to be made upon the occurrence of either state is less than or equal to the total amounts invested. In other words, the CDRF in this example is self-financing so that total payouts plus the transaction fee (assumed to be zero in this example) do not exceed the total amounts invested, irrespective of which state occurs. This is indicated by the following notation:

$$1_m^T*P_{*,1}=22\leqq 1_m^T*A*1_n=22$$

$$1_m^T*P_{*,2}=22\leqq 1_m^T*A*1_n=22$$

Continuing with this example, it is now assumed that traders 3 and 4 each would like to make investments that generate a desired payout distribution. For example, it is assumed that trader 3 would like to receive a payout of $2 should state 1 occur and $4 should state 2 occur, while trader 4 would like to receive a payout of $5 should state 1 occur and $0 should state 2 occur. In the CDRF notation:

$$P_{3,*}=[24]$$

$$P_{4,*}=[50]$$

In a preferred embodiment and this example, payouts are made based upon the invested amounts A, and therefore are also based on the unit payout matrix Π(A,f(A)), given the distribution of traded amounts as they exist at the end of the trading period. For purposes of this example, it is now further assumed (a) that at the end of the trading period traders 1 and 2 have made investments as indicated above, and (b) that the desired payout distributions for traders 3 and 4 have been recorded in a suspense account which is used to determine the allocation of multi-state investments to each state in order to achieve the desired payout distributions for each trader, given the investments by the other traders as they exist at the end of the trading period. In order to determine the proper allocation, the suspense account can be used to solve CDRF 2, for example:

$$\begin{bmatrix}5 & 10\\ 7 & 0\\ \alpha_{3,1} & \alpha_{3,2}\\ \alpha_{4,1} & \alpha_{4,2}\end{bmatrix}=\begin{bmatrix}p_{1,1} & p_{1,2}\\ p_{2,1} & p_{2,2}\\ 2 & 4\\ 5 & 0\end{bmatrix}*$$

-continued $$\begin{bmatrix} \frac{1}{(5+7+\alpha_{3,1}+\alpha_{4,1})} & 0 \\ 0 & \frac{1}{(10+0+\alpha_{3,2}+\alpha_{4,2})} \end{bmatrix} * (5+10+7+0+\alpha_{3,1}+\alpha_{4,1}+\alpha_{3,2}+\alpha_{4,2})$$

The solution of this expression will yield the amounts that traders 3 and 4 need to invest in for contingent claims corresponding to states 1 and 2 to in order to achieve their desired payout distributions, respectively. This solution will also finalize the total investment amount so that traders 1 and 2 will be able to determine their payouts should either state occur. This solution can be achieved using a computer program that computes an investment amount for each state for each trader in order to generate the desired payout for that trader for that state. In a preferred embodiment, the computer program repeats the process iteratively until the calculated investment amounts converge, i.e., so that the amounts to be invested by traders 3 and 4 no longer materially change with each successive iteration of the computational process. This method is known in the art as fixed point iteration and is explained in more detail in the Technical Appendix. The following table contains a computer code listing of two functions written in Microsoft's Visual Basic which can be used to perform the iterative calculations to compute the final allocations of the invested amounts in this example of a group of DBAR contingent claims with a Canonical Demand Reallocation Function:

TABLE 1

Illustrative Visual Basic Computer Code for Solving CDRF 2

```
Function allocatetrades(A_mat, P_mat) As Variant
DimA_final
Dim trades As Long
Dim states As Long
trades = P_mat.Rows.Count
states = P_mat.Columns.Count
ReDim A_final(1 To trades, 1 To states)
ReDim statedem(1 To states)
Dim i As Long
Dim totaldemand As Double
Dim total desired As Double
Dim iterations As Long
iterations = 10
For i = 1 To trades
    For j = 1 To states
        statedem(j) = A_mat(i, j) + statedem(j)
        A__ final(i, j) = A_mat(i,j)
    Next j
Next i
For i = 1 To states
    totaldemand = totaldemand + statedem(i)
Next i
For i = 1 To iterations
    For j = 1 To trades
        For z = 1 To states
            If A_mat(j, z) = 0 Then
            totaldemand = totaldemand − A_final(j, z)
            statedem(z) = statedem(z) − A_final(j, z)
            tempalloc = A_final(j, z)
            A_final(j, z) = stateall(totaldemand,
            P_mat(j, z), statedem(z))
            totaldemand = A_final(j, z) + totaldemand
            statedem(z) = A_finai(j, z) + statedem(z)
        End If
        Next z
    Next j
Next i
allocatetrades = A_final
```

TABLE 1-continued

Illustrative Visual Basic Computer Code for Solving CDRF 2

```
End Function
Function stateall(totdemex, despaystate, totstateex)
    Dim soll As Double
    soll = (−(totdemex − despaystate) + ((totdemex −
    despaystate) ^ 2 + 4 * despaystate * totstateex) ^ 0.5)/2
    stateall = soll
End Function
```

For this example involving two states and four traders, use of the computer code represented in Table 1 produces an investment amount matrix A, as follows:

$$A = \begin{matrix} 5 & 10 \\ 7 & 0 \\ 1.1574 & 1.6852 \\ 2.8935 & 0 \end{matrix}$$

The matrix of unit payouts, Π, can be computed from A as described above and is equal to:

$$\Pi = \begin{matrix} 1.728 & 0 \\ 0 & 2.3736 \end{matrix}$$

The resulting payout matrix P is the product of A and Π and is equal to:

$$P = \begin{matrix} 8.64 & 23.7361 \\ 12.0961 & 0 \\ 2 & 4 \\ 5 & 0 \end{matrix}$$

It can be noted that the sum of each column of P, above is equal to 27.7361, which is equal (in dollars) to the total amount invested so, as desired in this example, the group of DBAR contingent claims is self-financing. The allocation is said to be in equilibrium, since the amounts invested by traders 1 and 2 are undisturbed, and traders 3 and 4 receive their desired payouts, as specified above, should each state occur.

2.6 Interest Considerations

When investing in a group of DBAR contingent claims, traders will typically have outstanding balances invested for periods of time and may also have outstanding loans or margin balances from the exchange for periods of time. Traders will typically be paid interest on outstanding investment balances and typically will pay interest on outstanding margin loans. In preferred embodiments, the effect of trade balance interest and margin loan interest can be made explicit in the payouts, although in alternate preferred embodiments these items can be handled outside of the payout structure, for example, by debiting and crediting user accounts. So, if a fraction β of a trade of one value unit is made with cash and the rest on margin, the unit payout $\pi_i$ in the event that state i occurs can be expressed as follows:

$$\pi_i = \frac{(1-f)*T}{T_i} + \beta*(c_r)*t_b - (1-\beta)*(c_p)*t_l$$

where the last two terms express the respective credit for trade balances per unit invested for time $t_b$ and debit for margin loans per unit invested for time $t_1$.

2.7 Returns and Probabilities

In a preferred embodiment of a group of DBAR contingent claims with a canonical DRF, returns which represent the percentage return per unit of investment are closely related to payouts. Such returns are also closely related to the notion of a financial return familiar to investors. For example, if an investor has purchased a stock for $100 and sells it for $110, then this investor has realized a return of 10% (and a payout of $110).

In a preferred embodiment of a group of DBAR contingent claims with a canonical DRF, the unit return, $r_i$, should state i occur may be expressed as follows:

$$r_i = \frac{(1-f)*\sum_{i=1\ldots n} T_i - T_i}{T_i}$$

if state i occurs $r_i = -1$ otherwise, i.e., if state i does not occur

In such an embodiment, the return per unit investment in a state that occurs is a function of the amount invested in that state, the amount invested in all the other states and the exchange fee. The unit return is −100% for a state that does not occur, i.e., the entire amount invested in the expectation of receiving a return if a state occurs is forfeited if that state fails to occur. A −100% return in such an event has the same return profile as, for example, a traditional option expiring "out of the money." When a traditional option expires out of the money, the premium decays to zero, and the entire amount invested in the option is lost.

For purposes of this specification, a payout is defined as one plus the return per unit invested in a given state multiplied by the amount that has been invested in that state. The sum of all payouts $P_s$, for a group of DBAR contingent claims corresponding to all n possible states can be expressed as follows:

$$P_S = (1+r_i)*T_i + \sum_{j,j\neq i}(1+r_j)*T_j$$

i, j=1 . . . n

In a preferred embodiment employing a canonical DRF, the payout $P_S$ may be found for the occurrence of state i by substituting the above expressions for the unit return in any state:

$$P_S = \left(\frac{(1-f)*\sum_{i=1\ldots n} T_i - T_i}{T_i} + 1\right)*T_i + \sum_{j,j\neq i}(-1+1)*T_j = (1-f)*\sum_{i=1\ldots n} T_i$$

Accordingly, in such a preferred embodiment, for the occurrence of any given state, no matter what state, the aggregate payout to all of the traders as a whole is one minus the transaction fee paid to the exchange (expressed in this preferred embodiment as a percentage of total investment across all the states), multiplied by the total amount invested across all the states for the group of DBAR contingent claims. This means that in a preferred embodiment of a group of the DBAR contingent claims, and assuming no credit or similar risks to the exchange, (1) the exchange has zero probability of loss in any given state; (2) for the occurrence of any given state, the exchange receives an exchange fee and is not exposed to any risk; (3) payouts and returns are a function of demand flow, i.e., amounts invested; and (4) transaction fees or exchange fees can be a simple function of aggregate amount invested.

Other transaction fees can be implemented. For example, the transaction fee might have a fixed component for some level of aggregate amount invested and then have either a sliding or fixed percentage applied to the amount of the investment in excess of this level. Other methods for determining the transaction fee are apparent to those of skill in the art, from this specification or based on practice of the present invention.

In a preferred embodiment, the total distribution of amounts invested in the various states also implies an assessment by all traders collectively of the probabilities of occurrence of each state. In a preferred embodiment of a group of DBAR contingent claims with a canonical DRF, the expected return $E(r_i)$ for an investment in a given state i (as opposed to the return actually received once outcomes are known) may be expressed as the probability weighted sum of the returns:

$$E(r_i) = q_i*r_i + (1-q_i)*-1 = q_i*(1+r_i) - 1$$

Where $q_i$ is the probability of the occurrence of state i implied by the matrix A (which contains all of the invested amounts for all states in the group of DBAR contingent claims). Substituting the expression for $r_i$ from above yields:

$$E(r_i) = q_i*\left(\frac{(1-f)*\sum_i T_i}{T_i}\right) - 1$$

In an efficient market, the expected return $E(r_i)$ across all states is equal to the transaction costs of trading, i.e., on average, all traders collectively earn returns that do not exceed the costs of trading. Thus, in an efficient market for a group of DBAR contingent claims using a canonical, where $E(r_i)$ equals the transaction fee, −f, the probability of the occurrence of state i implied by matrix A is computed to be:

$$q_i = \frac{T_i}{\sum_i T_i}$$

Thus, in such a group of DBAR contingent claims, the implied probability of a given state is the ratio of the amount invested in that state divided by the total amount invested in all states. This relationship allows traders in the group of DBAR contingent claims (with a canonical DRF) readily to calculate the implied probability which traders attach to the various states.

Information of interest to a trader typically includes the amounts invested per state, the unit return per state, and implied state probabilities. An advantage of the DBAR exchange of the present invention is the relationship among these quantities. In a preferred embodiment, if the trader knows one, the other two can be readily determined. For example, the relationship of unit returns to the occurrence of a state and the probability of the occurrence of that state implied by A can be expressed as follows:

$$q_i = \frac{(1-f)}{(1+r_i)}$$

The expressions derived above show that returns and implied state probabilities may be calculated from the distribution of the invested amounts, $T_i$, for all states, i=1 . . . n. In the traditional markets, the amount traded across the distribution of states (limit order book), is not readily available. Furthermore, in traditional markets there are no such ready mathematical calculations that relate with any precision invested amounts or the limit order book to returns or prices which clear the market, i.e., prices at which the supply equals the demand. Rather, in the traditional markets, specialist brokers and market makers typically have privileged access to the distribution of bids and offers, or the limit order book, and frequently use this privileged information in order to set market prices that balance supply and demand at any given time in the judgment of the market maker.

2.8 Computations when Invested Amounts are Large

In a preferred embodiment of a group of DBAR contingent claims using a canonical DRF, when large amounts are invested across the distribution of states, it may be possible to perform approximate investment allocation calculations in order to generate desired payout distributions. The payout, p, should state i occur for a trader who considers making an investment of size α in state i has been shown above to be:

$$p = \left(\frac{T+\alpha}{T_i+\alpha}\right) * \alpha$$

If α is small compared to both the total invested in state i and the total amount invested in all the states, then adding α to state i will not have a material effect on the ratio of the total amount invested in all the states to the total amount invested in state i. In these circumstances, $$\frac{T+\alpha}{T_i+\alpha} \approx \frac{T}{T_i}$$

Thus, in preferred embodiments where an approximation is acceptable, the payout to state i may be expressed as:

$$p \approx \frac{T}{T_i} * \alpha$$

In these circumstances, the investment needed to generate the payout p is:

$$\alpha \approx \frac{T_i}{T} * p = q_i * p$$

These expressions indicate that in preferred embodiments, the amount to be invested to generate a desired payout is approximately equal to the ratio of the total amount invested in state i to the total amount invested in all states, multiplied by the desired payout. This is equivalent to the implied probability multiplied by the desired payout. Applying this approximation to the expression CDRF 2, above, yields the following:

$$A \approx P * \Pi^{-1} = P * Q$$

where the matrix Q, of dimension n×n, is equal to the inverse of unit payouts Π, and has along the diagonals $q_i$ for i=1 . . . n. This expression provides an approximate but more readily calculable solution to CDRF 2 as the expression implicitly assumes that an amount invested by a trader has approximately no effect on the existing unit payouts or implied probabilities. This approximate solution, which is linear and not quadratic, will sometimes be used in the following examples where it can be assumed that the total amounts invested are large in relation to any given trader's particular investment.

3. EXAMPLES OF GROUPS OF DBAR CONTINGENT CLAIMS 3.1 DBAR Range Derivatives

A DBAR Range Derivative (DBAR RD) is a type of group of DBAR contingent claims implemented using a canonical DRF described above (although a DBAR range derivative can also be implemented, for example, for a group of DBAR contingent claims, including DBAR digital options, based on the same ranges and economic events established below using, e.g., a non-canonical DRF and an OPF). In a DBAR RD, a range of possible outcomes associated with an observable event of economic significance is partitioned into defined states. In a preferred embodiment, the states are defined as discrete ranges of possible outcomes so that the entire distribution of states covers all the possible outcomes—that is, the states are collectively exhaustive. Furthermore, in a DBAR RD, states are preferably defined so as to be mutually exclusive as well, meaning that the states are defined in such a way so that exactly one state occurs. If the states are defined to be both mutually exclusive and collectively exhaustive, the states form the basis of a probability distribution defined over discrete outcome ranges. Defining the states in this way has many advantages as described below, including the advantage that the amount which traders invest across the states can be readily converted into implied probabilities representing the collective assessment of traders as to the likelihood of the occurrence of each state.

The system and methods of the present invention may also be applied to determine projected DBAR RD returns for various states at the beginning of a trading period. Such a determination can be, but need not be, made by an exchange. In preferred embodiments of a group of DBAR contingent claims the distribution of invested amounts at the end of a trading period determines the returns for each state, and the amount invested in each state is a function of trader preferences and probability assessments of each state. Accordingly, some assumptions typically need to be made in order to determine preliminary or projected returns for each state at the beginning of a trading period.

An illustration is provided to explain further the operation of DBAR RDs. In the following illustration, it is assumed that all traders are risk neutral, so that implied probabilities for a state are equal to the actual probabilities, and so that all traders have identical probability assessments of the possible outcomes for the event defining the contingent claim. For convenience in this illustration, the event forming the basis for the contingent claims is taken to be a closing price of a security, such as a common stock, at some future date; and the states, which represent the possible outcomes of the level of the closing price, are defined to be distinct, mutually exclusive and collectively exhaustive of the range of (possible) closing prices for the security. In this illustration, the following notation is used:

| | |
|---|---|
| $\tau$ | represents a given time during the trading period at which traders are making investment decisions |
| $\theta$ | represents the time corresponding to the expiration of the contingent claim |
| $V_\tau$ | represents the price of underlying security at time $\tau$ |
| $V_\theta$ | represents the price of underlying security at time $\theta$ |
| $Z(\tau, \theta)$ | represents the present value of one unit of value payable at time $\theta$ evaluated at time $\tau$ |
| $D(\tau, \theta)$ | represents dividends or coupons payable between time $\tau$ and $\theta$ |
| $\sigma_\tau$ | represents annualized volatility of natural logarithm returns of the underlying security |
| dz | represents the standard normal variate |

Traders make choices at a representative time, $\tau$, during a trading period which is open, so that time $\tau$ is temporally subsequent to the current trading period's TSD.

In this illustration, and in preferred embodiments, the defined states for the group of contingent claims for the final closing price $V_\theta$ are constructed by discretizing the full range of possible prices into possible mutually exclusive and collectively exhaustive states. The technique is similar to forming a histogram for discrete countable data. The endpoints of each state can be chosen, for example, to be equally spaced, or of varying spacing to reflect the reduced likehood of extreme outcomes compared to outcomes near the mean or median of the distribution. States may also be defined in other manners apparent to one of skill in the art. The lower endpoint of a state can be included and the upper endpoint excluded, or vice versa. In any event, in preferred embodiments, the states are defined (as explained below) to maximize the attractiveness of investment in the group of DBAR contingent claims, since it is the invested amounts that ultimately determine the returns that are associated with each defined state.

The procedure of defining states, for example for a stock price, can be accomplished by assuming lognormality, by using statistical estimation techniques based on historical time series data and cross-section market data from options prices, by using other statistical distributions, or according to other procedures known to one of skill in the art or learned from this specification or through practice of the present invention. For example, it is quite common among derivatives traders to estimate volatility parameters for the purpose of pricing options by using the econometric techniques such as GARCH. Using these parameters and the known dividend or coupons over the time period from $\tau$ to $\theta$, for example, the states for a DBAR RD can be defined.

A lognormal distribution is chosen for this illustration since it is commonly employed by derivatives traders as a distributional assumption for the purpose of evaluating the prices of options and other derivative securities. Accordingly, for purposes of this illustration it is assumed that all traders agree that the underlying distribution of states for the security are lognormally distributed such that:

$$\tilde{V}_\theta = \left(\frac{V_\tau}{Z(\tau,\theta)} - \frac{D(\tau,\theta)}{Z(\tau,\theta)}\right) * e^{-\sigma^2/2*(\theta-\tau)} * e^{\sigma*\sqrt{\theta-\tau}*dz}$$

where the "tilde" on the left-hand side of the expression indicates that the final closing price of the value of the security at time $\theta$ is yet to be known. Inversion of the expression for dz and discretization of ranges yields the following expressions:

$$dz = \ln\left(\frac{V_\theta * e^{\frac{\sigma^2}{2}*(\theta-\tau)}}{\left(\frac{V_\tau}{Z(\tau,\theta)} - \frac{D(\tau,\theta)}{Z(\tau,\theta)}\right)}\right) \Big/ \left(\sigma * \sqrt{\theta-\tau}\right)$$

$$q_i(V_i <= V_\theta < V_{i+1}) = cdf(dz_{i+1}) - cdf(dz_i)$$

$$r_i(V_i <= V_\theta < V_{i+1}) = \frac{(1-f)}{q_i(V_i <= V_\theta < V_{i+1})} - 1$$

where cdf(dz) is the cumulative standard normal function.

The assumptions and calculations reflected in the expressions presented above can also be used to calculate indicative returns ("opening returns"), $r_i$ at a beginning of the trading period for a given group of DBAR contingent claims. In a preferred embodiment, the calculated opening returns are based on the exchange's best estimate of the probabilities for the states defining the claim and therefore may provide good indications to traders of likely returns once trading is underway. In another preferred embodiment, described with respect to DBAR digital options in Section 6 and another embodiment described in Section 7, a very small number of value units may be used in each state to initialize the contract or group of contingent claims. Of course, opening returns need not be provided at all, as traded amounts placed throughout the trading period allows the calculation of actual expected returns at any time during the trading period.

The following examples of DBAR range derivatives and other contingent claims serve to illustrate their operation, their usefulness in connection with a variety of events of economic significance involving inherent risk or uncertainty, the advantages of exchanges for groups of DBAR contingent claims, and, more generally, systems and methods of the present invention. Sections 6 and 7 also provide examples' of DBAR contingent claims of the present invention that provide profit and loss scenarios comparable to those provided by digital options in conventional options markets, and that can be based on any of the variety of events of economic significance described in the following examples of DBAR RDs.

In each of the examples in this Section, a state is defined to include a range of possible outcomes of an event of economic significance. The event of economic significance for any DBAR auction or market (including any market or auction for DBAR digital options) can be, for example, an underlying economic event (e.g., price of stock) or a measured parameter related to the underlying economic event (e.g., a measured volatility of the price of stock). A curved brace "(" or")" denotes strict inequality (e.g., "greater than" or "less than," respectively) and a square brace "]" or "[" shall denote weak inequality (e.g., "less than or equal to" or "greater than or equal to," respectively). For simplicity, and unless otherwise stated, the following examples also assume that the exchange transaction fee, f, is zero.

Example 3.1.1

DBAR Contingent Claim on Underlying Common Stock

Underlying Security: Microsoft Corporation Common Stock ("MSFT")

Date: Aug. 18, 1999

Spot Price: 85

Market Volatility: 50% annualized

Trading Start Date: Aug. 18, 1999, Market Open
Trading End Date: Aug. 18, 1999, Market Close
Expiration: Aug. 19, 1999, Market Close
Event: MSFT Closing Price at Expiration
Trading Time: 1 day
Duration to TED: 1 day
Dividends Payable to Expiration: 0
Interbank short-term interest rate to Expiration: 5.5% (Actual/360 daycount)
Present Value factor to Expiration: 0.999847
Investment and Payout Units: U.S. Dollars ("USD")

In this Example 3.1.1, the predetermined termination criteria are the investment in a contingent claim during the trading period and the closing of the market for Microsoft common stock on Aug. 19, 1999.

If all traders agree that the underlying distribution of closing prices is lognormally distributed with volatility of 50%, then an illustrative "snapshot" distribution of invested amounts and returns for $100 million of aggregate investment can be readily calculated to yield the following table.

TABLE 3.1.1-1

| States | Investment in State ('000) | Return Per Unit if State Occurs |
|---|---|---|
| (0, 80] | 1,046.58 | 94.55 |
| (80, 80.5] | 870.67 | 113.85 |
| (80.5, 81] | 1,411.35 | 69.85 |
| (81, 81.5] | 2,157.85 | 45.34 |
| (81.5, 82] | 3,115.03 | 31.1 |
| (82, 82.5] | 4,250.18 | 22.53 |
| (82.5, 83] | 5,486.44 | 17.23 |
| (83, 83.5] | 6,707.18 | 13.91 |
| (83.5, 84] | 7,772.68 | 11.87 |
| (84, 84.5] | 8,546.50 | 10.7 |
| (84.5, 85] | 8,924.71 | 10.2 |
| (85, 85.5] | 8,858.85 | 10.29 |
| (85.5, 86] | 8,366.06 | 10.95 |
| (86, 86.5] | 7,523.13 | 12.29 |
| (86.5, 87] | 6,447.26 | 14.51 |
| (87, 87.5] | 5,270.01 | 17.98 |
| (87.5, 88] | 4,112.05 | 23.31 |
| (88, 88.5] | 3,065.21 | 31.62 |
| (88.5, 89] | 2,184.5 | 44.78 |
| (89, 89.5] | 1,489.58 | 66.13 |
| (89.5, 90] | 972.56 | 101.82 |
| (90, ∞] | 1,421.61 | 69.34 |

Consistent with the design of a preferred embodiment of a group of DBAR contingent claims, the amount invested for any given state is inversely related to the unit return for that state.

In preferred embodiments of groups of DBAR contingent claims, traders can invest in none, one or many states. It may be possible in preferred embodiments to allow traders efficiently to invest in a set, subset or combination of states for the purposes of generating desired distributions of payouts across the states. In particular, traders may be interested in replicating payout distributions which are common in the traditional markets, such as payouts corresponding to a long stock position, a short futures position, a long option straddle position, a digital put or digital call option.

If in this Example 3.1.1 a trader desired to hedge his exposure to extreme outcomes in MSFT stock, then the trader could invest in states at each end of the distribution of possible outcomes. For instance, a trader might decide to invest $100,000 in states encompassing prices from $0 up to and including $83 (i.e., (0,83]) and another $100,000 in states encompassing prices greater than $86.50 (i.e., (86.5,∞]). The trader may further desire that no matter what state actually occurs within these ranges (should the state occur in either range) upon the fulfillment of the predetermined termination criteria, an identical payout will result. In this Example 3.1.1, a multi-state investment is effectively a group of single state investments over each multi-state range, where an amount is invested in each state in the range in proportion to the amount previously invested in that state. If, for example, the returns provided in Table 3.1.1-1 represent finalized projected returns at the end of the trading period, then each multi-state investment may be allocated to its constituent states on a pro-rata or proportional basis according to the relative amounts invested in the constituent states at the close of trading. In this way, more of the multi-state investment is allocated to states with larger investments and less allocated to the states with smaller investments.

Other desired payout distributions across the states can be generated by allocating the amount invested among the constituent states in different ways so as achieve a trader's desired payout distribution. A trader may select, for example, both the magnitude of the payouts and how those payouts are to be distributed should each state occur and let the DBAR exchange's multi-state allocation methods determine (1) the size of the amount invested in each particular constituent state; (2) the states in which investments will be made, and (3) how much of the total amount to be invested will be invested in each of the states so determined. Other examples below demonstrate how such selections may be implemented.

Since in preferred embodiments the final projected returns are not known until the end of a given trading period, in such embodiments a previous multi-state investment is reallocated to its constituent states periodically as the amounts invested in each state (and therefore returns) change during the trading period. At the end of the trading period when trading ceases and projected returns are finalized, in a preferred embodiment a final reallocation is made of all the multi-state investments. In preferred embodiments, a suspense account is used to record and reallocate multi-state investments during the course of trading and at the end of the trading period.

Referring back to the illustration assuming two multi-state trades over the ranges (0,83] and (86.5,∞] for MSFT stock, Table 3.1.1-2 shows how the multi-state investments in the amount of $100,000 each could be allocated according to a preferred embodiment to the individual states over each range in order to achieve a payout for each multi-state range which is identical regardless of which state occurs within each range. In particular, in this illustration the multi-state investments are allocated in proportion to the previously invested amount in each state, and the multi-state investments marginally lower returns over (0,83] and (86.5,∞], but marginally increase returns over the range (83, 86.5], as expected.

To show that the allocation in this example has achieved its goal of delivering the desired payouts to the trader, two payouts for the (0, 83] range are considered. The payout, if constituent state (80.5, 81] occurs, is the amount invested in that state ($7.696) multiplied by one plus the return per unit if that state occurs, or (1+69.61)*7.696=$543.40. A similar analysis for the state (82.5, 83] shows that, if it occurs, the payout is equal to (1+17.162)*29.918=$543.40. Thus, in this illustration, the trader receives the same payout no matter which constituent state occurs within the multi-state investment. Similar calculations can be performed for the range [86.5,∞]. For example, under the same assumptions, the payout for the constituent state [86.5,87] would receive a payout of $399.80 if the stock price fill in that range after the fulfillment of all of the predetermined termination criteria. In this illustration, each constituent state over the range [86.5, ∞] would receive a payout of $399.80, no matter which of those states occurs.

TABLE 3.1.1-2

| States | Traded Amount in State ('000) | Return Per Unit if State Occurs | Multi-State Allocation ('000) |
|---|---|---|---|
| (0, 80] | 1052.29 | 94.22 | 5.707 |
| (80, 80.5] | 875.42 | 113.46 | 4.748 |
| (80.5, 81] | 1,419.05 | 69.61 | 7.696 |
| (81, 81.5] | 2,169.61 | 45.18 | 11.767 |
| (81.5, 82] | 3,132.02 | 30.99 | 16.987 |
| (82, 82.5] | 4,273.35 | 22.45 | 23.177 |
| (82.5, 83] | 5,516.36 | 17.16 | 29.918 |
| (83, 83.5] | 6,707.18 | 13.94 | |
| (83.5, 84] | 7,772.68 | 11.89 | |
| (84, 84.5] | 8,546.50 | 10.72 | |
| (84.5, 85] | 8,924.71 | 10.23 | |
| (85, 85.5] | 8,858.85 | 10.31 | |
| (85.5, 86] | 8,366.06 | 10.98 | |
| (86, 86.5] | 7,523.13 | 12.32 | |
| (86.5, 87] | 6,473.09 | 14.48 | 25.828 |
| (87, 87.5] | 5,291.12 | 17.94 | 21.111 |
| (87.5, 88] | 4,128.52 | 23.27 | 16.473 |
| (88, 88.5] | 3,077.49 | 31.56 | 12.279 |
| (88.5, 89] | 2,193.25 | 44.69 | 8.751 |
| (89, 89.5] | 1,495.55 | 66.00 | 5.967 |
| (89.5, 90] | 976.46 | 101.62 | 3.896 |
| (90, ∞] | 1,427.31 | 69.20 | 5.695 |

Options on equities and equity indices have been one of the more successful innovations in the capital markets. Currently, listed options products exist for various underlying equity securities and indices and for various individual option series. Unfortunately, certain markets lack liquidity. Specifically, liquidity is usually limited to only a handful of the most widely recognized names. Most option markets are essentially dealer-based. Even for options listed on an exchange, market-makers who stand ready to buy or sell options across all strikes and maturities are a necessity. Although market participants trading a particular option share an interest in only one underlying equity, the existence of numerous strike prices scatters liquidity coming into the market thereby making dealer support essential. In all but the most liquid and active exchange-traded options, chances are rare that two option orders will meet for the same strike, at the same price, at the same time, and for the same volume. Moreover, market-makers in listed and over-the-counter (OTC) equities must allocate capital and manage risk for all their positions. Consequently, the absolute amount of capital that any one market-maker has on hand is naturally constrained and may be insufficient to meet the volume of institutional demand.

The utility of equity and equity-index options is further constrained by a lack of transparency in the OTC markets. Investment banks typically offer customized option structures to satisfy their customers. Customers, however, are sometimes hesitant to trade in environments where they have no means of viewing the market and so are uncertain about getting the best prevailing price.

Groups of DBAR contingent claims can be structured using the system and methods of the present invention to provide market participants with a fuller, more precise view of the price for risks associated with a particular equity.

Example 3.1.2

Multiple Multi-State Investments

If numerous multi-state investments are made for a group of DBAR contingent claims, then in a preferred embodiment an iterative procedure can be employed to allocate all of the multi-state investments to their respective constituent states. In preferred embodiments, the goal would be to allocate each multi-state investment in response to changes in amounts invested during the trading period, and to make a final allocation at the end of the trading period so that each multi-state investment generates the payouts desired by the respective trader. In preferred embodiments, the process of allocating multi-state investments can be iterative, since allocations depend upon the amounts traded across the distribution of states at any point in time. As a consequence, in preferred embodiments, a given distribution of invested amounts will result in a certain allocation of a multi-state investment. When another multi-state investment is allocated, the distribution of invested amounts across the defined states may change and therefore necessitate the reallocation of any previously allocated multi-state investments. In such preferred embodiments, each multi-state allocation is re-performed so that, after a number of iterations through all of the pending multi-state investments, both the amounts invested and their allocations among constituent states in the multi-state investments no longer change with each successive iteration and a convergence is achieved. In preferred embodiments, when convergence is achieved, further iteration and reallocation among the multi-state investments do not change any multi-state allocation, and the entire distribution of amounts invested across the states remains stable and is said to be in equilibrium. Computer code, as illustrated in Table 1 above or related code readily apparent to one of skill in the art, can be used to implement this iterative procedure.

A simple example demonstrates a preferred embodiment of an iterative procedure that may be employed. For purposes of this example, a preferred embodiment of the following assumptions are made: (i) there are four defined states for the group of DBAR contingent claims; (ii) prior to the allocation of any multi-state investments, $100 has been invested in each state so that the unit return for each of the four states is 3; (iii) each desires that each constituent state in a multi-state investment provides the same payout regardless of which constituent state actually occurs; and (iv) that the following other multi-state investments have been made:

TABLE 3.1.2-1

| Investment Number | State 1 | State 2 | State 3 | State 4 | Invested Amount, $ |
|---|---|---|---|---|---|
| 1001 | X | X | O | O | 100 |
| 1002 | X | O | X | X | 50 |
| 1003 | X | X | O | O | 120 |
| 1004 | X | X | X | O | 160 |
| 1005 | X | X | X | O | 180 |
| 1006 | O | O | X | X | 210 |
| 1007 | X | X | X | O | 80 |
| 10O8 | X | O | X | X | 950 |
| 1009 | X | X | X | O | 1000 |
| 1010 | X | X | O | X | 500 |
| 1011 | X | O | O | X | 250 |
| 1012 | X | X | O | O | 100 |
| 1013 | X | O | X | O | 500 |
| 1014 | O | X | O | X | 1000 |
| 1015 | O | X | X | O | 170 |
| 1016 | O | X | O | X | 120 |
| 1017 | X | O | X | O | 1000 |
| 1018 | O | O | X | X | 200 |
| 1019 | X | X | X | O | 250 |
| 1020 | X | X | O | X | 300 |
| 1021 | O | X | X | X | 100 |
| 1022 | X | O | X | X | 400 |

where an "X" in each state represents a constituent state of the multi-state trade. Thus, as depicted in Table 3.1.2-1, trade number 1001 in the first row is a multi-state investment of $100 to be allocated among constituent states 1 and 2, trade number 1002 in the second row is another multi-state investment in the amount of $50 to be allocated among constituent states 1, 3, and 4; etc.

Applied to the illustrative multi-state investment described above, the iterative procedure described above and embodied in the illustrative computer code in Table 1, results in the following allocations:

TABLE 3.1.2-2

| Investment Number | State 1 ($) | State 2 ($) | State 3 ($) | State 4 ($) |
|---|---|---|---|---|
| 1001 | 73.8396 | 26.1604 | 0 | 0 |
| 1002 | 26.66782 | 0 | 12.53362 | 10.79856 |
| 1003 | 88.60752 | 31.39248 | 0 | 0 |
| 1004 | 87.70597 | 31.07308 | 41.22096 | 0 |
| 1005 | 98.66921 | 34.95721 | 46.3735 | 0 |
| 1006 | 0 | 0 | 112.8081 | 97.19185 |
| 1007 | 43.85298 | 15.53654 | 20.61048 | 0 |
| 1008 | 506.6886 | 0 | 238.1387 | 205.1726 |
| 1009 | 548.1623 | 194.2067 | 257.631 | 0 |
| 1010 | 284.2176 | 100.6946 | 0 | 115.0878 |
| 1011 | 177.945 | 0 | 0 | 72.055 |
| 1012 | 73.8396 | 26.1604 | 0 | 0 |
| 1013 | 340.1383 | 0 | 159.8617 | 0 |
| 1014 | 0 | 466.6488 | 0 | 533.3512 |
| 1015 | 0 | 73.06859 | 96.93141 | 0 |
| 1016 | 0 | 55.99785 | 0 | 64.00215 |
| 1017 | 680.2766 | 0 | 319.7234 | 0 |
| 1018 | 0 | 0 | 107.4363 | 92.56367 |
| 1019 | 137.0406 | 48.55168 | 64.40774 | 0 |
| 1020 | 170.5306 | 60.41675 | 0 | 69.05268 |
| 1021 | 0 | 28.82243 | 38.23529 | 32.94229 |
| 1022 | 213.3426 | 0 | 100.2689 | 86.38848 |

In Table 3.1.2-2 each row shows the allocation among the constituent states of the multi-state investment entered into the corresponding row of Table 3.1.2-1, the first row of Table 3.1.2-2 that investment number 1001 in the amount of $100 has been allocated $73.8396 to state 1 and the remainder to state 2.

It may be shown that the multi-state allocations identified above result in payouts to traders which are desired by the traders—that is, in this example the desired payouts are the same regardless of which state occurs among the constituent states of a given multi-state investment. Based on the total amount invested as reflected in Table 3.1.2-2 and assuming a zero transaction fee, the unit returns for each state are:

| | State 1 | State 2 | State 3 | State 4 |
|---|---|---|---|---|
| Return Per Dollar Invested | 1.2292 | 5.2921 | 3.7431 | 4.5052 |

Consideration of Investment 1022 in this example, illustrates the uniformity of payouts for each state in which an investment is made (i.e., states 1, 3 and 4). If state 1 occurs, the total payout to the trader is the unit return for state 1—1.2292—multiplied by the amount traded for state 1 in trade 1022—$213.3426—plus the initial trade—$213.3426. This equals 1.2292*213.3426+213.3426=$475.58. If state 3 occurs, the payout is equal to 3.7431*100.2689+100.2689=$475.58. Finally, if state 4 occurs, the payout is equal to 4.5052*86.38848+86.38848=$475.58. So a preferred embodiment of a multi-state allocation in this example has effected an allocation among the constituent states so that (1) the desired payout distributions in this example are achieved, i.e., payouts to constituent states are the same no matter which constituent state occurs, and (2) further reallocation iterations of multi-state investments do not change the relative amounts invested across the distribution of states for all the multi-state trades.

Example 3.1.3

Alternate Price Distributions

Assumptions regarding the likely distribution of traded amounts for a group of DBAR contingent claims may be used, for example, to compute returns for each defined state per unit of amount invested at the beginning of a trading period ("opening returns"). For various reasons, the amount actually invested in each defined state may not reflect the assumptions used to calculate the opening returns. For instance, investors may speculate that the empirical distribution of returns over the time horizon may differ from the no-arbitrage assumptions typically used in option pricing. Instead of a lognormal distribution, more investors might make investments expecting returns to be significantly positive rather than negative (perhaps expecting favorable news). In Example 3.1.1, for instance, if traders invested more in states above $85 for the price of MSFT common stock, the returns to states below $85 could therefore be significantly higher than returns to states above $85.

In addition, it is well known to derivatives traders that traded option prices indicate that price distributions differ markedly from theoretical lognormality or similar theoretical distributions. The so-called volatility skew or "smile" refers to out-of-the-money put and call options trading at higher implied volatilities than options closer to the money. This indicates that traders often expect the distribution of prices to have greater frequency or mass at the extreme observations than predicted according to lognormal distributions. Frequently, this effect is not symmetric so that, for example, the probability of large lower price outcomes are higher than for extreme upward outcomes. Consequently, in a group of DBAR contingent claims of the present invention, investment in states in these regions may be more prevalent and, therefore, finalized returns on outcomes in those regions lower. For example, using the basic DBAR contingent claim information from Example 3.1.1, the following returns may prevail due to investor expectations of return distributions that have more frequent occurrences than those predicted by a lognormal distribution, and thus are skewed to the lower possible returns. In statistical parlance, such a distribution exhibits higher kurtosis and negative skewness in returns than the illustrative distribution used in Example 3.1.1 and reflected in Table 3.1.1-1.

TABLE 3.1.3-1

DBAR Contingent Claim Returns Illustrating Negatively Skewed and Leptokurtotic Return Distribution

| States | Amount Invested in State ('000) | Return Per Unit if State Occurs |
|---|---|---|
| (0, 80] | 3,150 | 30.746 |
| (80, 80.5] | 1,500 | 65.667 |
| (80.5, 81] | 1,600 | 61.5 |
| (81, 81.5] | 1,750 | 56.143 |
| (81.5, 82] | 2,100 | 46.619 |
| (82, 82.5] | 2,550 | 38.216 |
| (82.5, 83] | 3,150 | 30.746 |
| (83, 83.5] | 3,250 | 29.769 |
| (83.5, 84] | 3,050 | 31.787 |
| (84, 84.5] | 8,800 | 10.363 |
| (84.5, 85] | 14,300 | 5.993 |

TABLE 3.1.3-1-continued

DBAR Contingent Claim Returns Illustrating Negatively Skewed and Leptokurtotic Return Distribution

| States | Amount Invested in State ('000) | Return Per Unit if State Occurs |
|---|---|---|
| (85, 85.5] | 10,950 | 8.132 |
| (85.5, 86] | 11,300 | 7.85 |
| (86, 86.5] | 10,150 | 8.852 |
| (86.5, 87] | 11,400 | 7.772 |
| (87, 87.5] | 4,550 | 20.978 |
| (87.5, 88] | 1,350 | 73.074 |
| (88, 88.5] | 1,250 | 79.0 |
| (88.5, 89] | 1,150 | 85.957 |
| (89, 89.5] | 700 | 141.857 |
| (89.5, 90] | 650 | 152.846 |
| (90, ∞] | 1,350 | 73.074 |

The type of complex distribution illustrated in Table 3.1.3-1 is prevalent in the traditional markets. Derivatives traders, actuaries, risk managers and other traditional market participants typically use sophisticated mathematical and analytical tools in order to estimate the statistical nature of future distributions of risky market outcomes. These tools often rely on data sets (e.g., historical time series, options data) that may be incomplete or unreliable. An advantage of the systems and methods of the present invention is that such analyses from historical data need not be complicated, and the full outcome distribution for a group of DBAR contingent claims based on any given event is readily available to all traders and other interested parties nearly instantaneously after each investment.

Example 3.1.4

States Defined for Return Uniformity

It is also possible in preferred embodiments of the present invention to define states for a group of DBAR contingent claims with irregular or unevenly distributed intervals, for example, to make the traded amount across the states more liquid or uniform. States can be constructed from a likely estimate of the final distribution of invested amounts in order to make the likely invested amounts, and hence the returns for each state, as uniform as possible across the distribution of states. The following table illustrates the freedom, using the event and trading period from Example 3.1.1, to define states so as to promote equalization of the amount likely to be invested in each state.

TABLE 3.1.4-1

State Definition to Make Likely Demand Uniform Across States

| States | Invested Amount in State ('000) | Return Per Unit if State Occurs |
|---|---|---|
| (0, 81.403] | 5,000 | 19 |
| (81.403, 82.181] | 5,000 | 19 |
| (82.181, 82.71]. | 5,000 | 19 |
| (82.71, 83.132] | 5,000 | 19 |
| (83.132, 83.497] | 5,000 | 19 |
| (83.497, 83.826] | 5,000 | 19 |
| (83.826, 84.131] | 5,000 | 19 |
| (84.131, 84.422] | 5,000 | 19 |
| (84.422, 84.705] | 5,000 | 19 |
| (84.705, 84.984] | 5,000 | 19 |
| (84.984, 85.264] | 5,000 | 19 |
| (85.264, 85.549] | 5,000 | 19 |
| (85.549, 85.845] | 5,000 | 19 |
| (85.845, 86.158] | 5,000 | 19 |

TABLE 3.1.4-1-continued

State Definition to Make Likely Demand Uniform Across States

| States | Invested Amount in State ('000) | Return Per Unit if State Occurs |
|---|---|---|
| (86.158, 86.497] | 5,000 | 19 |
| (86.497, 86.877] | 5,000 | 19 |
| (86.877, 87.321] | 5,000 | 19 |
| (87.321, 87.883] | 5,000 | 19 |
| (87.883, 88.722] | 5,000 | 19 |
| (88.722, ∞] | 5,000 | 19 |

If investor expectations coincide with the often-used assumption of the lognormal distribution, as reflected in this example, then investment activity in the group of contingent claims reflected in Table 3.1.4-1 will converge to investment of the same amount in each of the 20 states identified in the table. Of course, actual trading will likely yield final market returns which deviate from those initially chosen for convenience using a lognormal distribution.

Example 3.1.5

Government Bond

Uniformly Constructed States

The event, defined states, predetermined termination criteria and other relevant data for an illustrative group of DBAR contingent claims based on a U.S. Treasury Note are set forth below:

- Underlying Security: United States Treasury Note, 5.5%, May 31, 2003
- Bond Settlement Date: Jun. 25, 1999
- Bond Maturity Date: May 31, 2003
- Contingent claim Expiration: Jul. 2, 1999, Market Close, 4:00 p.m. EST
- Trading Period Start Date: May 25, 1999, 4:00 p.m., EST
- Trading Period End Date: May 28, 1999, 4:00 p.m., EST
- Next Trading Period Open: May 28, 1999, 4:00 p.m., EST
- Next Trading Period Close May 29, 1999, 4:00 p.m., EST
- Event: Closing Composite Price as reported on Bloomberg at claim Expiration
- Trading Time: 1 day
- Duration from TED: 5 days
- Coupon: 5.5%
- Payment Frequency: Semiannual
- Daycount Basis: Actual/Actual
- Dividends Payable over Time Horizon: 2.75 per 100 on Jun. 30, 1999
- Treasury note repo rate over Time Horizon: 4.0% (Actual/360 daycount)
- Spot Price: 99.8125
- Forward Price at Expiration: 99.7857
- Price Volatility: 4.7%
- Trade and Payout Units: U.S. Dollars
- Total Demand in Current Trading Period: $50 million
- Transaction Fee: 25 basis points (0.0025%)

TABLE 3.1.5-1

DBAR Contingent Claims on U.S. Government Note

| States | Investment in State ($) | Unit Return if State Occurs |
|---|---|---|
| (0, 98] | 139690.1635 | 356.04 |
| (98, 98.25] | 293571.7323 | 168.89 |

TABLE 3.1.5-1-continued

| DBAR Contingent Claims on U.S. Government Note | | |
|---|---|---|
| States | Investment in State ($) | Unit Return if State Occurs |
| (98.25, 98.5] | 733769.9011 | 66.97 |
| (98.5, 98.75] | 1574439.456 | 30.68 |
| (98.75, 99] | 2903405.925 | 16.18 |
| (99, 99.1] | 1627613.865 | 29.64 |
| (99.1, 99.2] | 1914626.631 | 25.05 |
| (99.2, 99.3] | 2198593.057 | 21.68 |
| (99.3, 99.4] | 2464704.885 | 19.24 |
| (99.4, 99.5] | 2697585.072 | 17.49 |
| (99.5, 99.6] | 2882744.385 | 16.30 |
| (99.6, 99.7] | 3008078.286 | 15.58 |
| (99.7, 99.8] | 3065194.576 | 15.27 |
| (99.8, 99.9] | 3050276.034 | 15.35 |
| (99.9, 100] | 2964602.039 | 15.82 |
| (100, 100.1] | 2814300.657 | 16.72 |
| (100.1, 100.2] | 2609637.195 | 18.11 |
| (100.2, 100.3] | 2363883.036 | 20.10 |
| (100.3, 100.4] | 2091890.519 | 22.84 |
| (100.4, 100.5] | 1808629.526 | 26.58 |
| (100.5, 100.75] | 3326547.254 | 13.99 |
| (100.75, 101] | 1899755.409 | 25.25 |
| (101, 101.25] | 941506.1374 | 51.97 |
| (101.25, 101.5] | 405331.6207 | 122.05 |
| (101.5, ∞] | 219622.6373 | 226.09 |

This Example 3.1.5 and Table 3.1.5-1 illustrate how readily the methods and systems of the present invention may be adapted to sources of risk, whether from stocks, bonds, or insurance claims. Table 3.1.5-1 also illustrates a distribution of defined states which is irregularly spaced—in this case finer toward the center of the distribution and coarser at the ends—in order to increase the amount invested in the extreme states.

Example 3.1.6

Outperformance Asset Allocation

Uniform Range

One of the advantages of the system and methods of the present invention is the ability to construct groups of DBAR contingent claims based on multiple events and their interrelationships. For example, many index fund money managers often have a fundamental view as to whether indices of high quality fixed income securities will outperform major equity indices. Such opinions normally are contained within a manager's model for allocating funds under management between the major asset classes such as fixed income securities, equities, and cash.

This Example 3.1.6 illustrates the use of a preferred embodiment of the systems and methods of the present invention to hedge the real-world event that one asset class will outperform another. The illustrative distribution of investments and calculated opening returns for the group of contingent claims used in this example are based on the assumption that the levels of the relevant asset-class indices are jointly lognormally distributed with an assumed correlation. By defining a group of DBAR contingent claims on a joint outcome of two underlying events, traders are able to express their views on the co-movements of the underlying events as captured by the statistical correlation between the events. In this example, the assumption of a joint lognormal distribution means that the two underlying events are distributed as follows:

$$\tilde{V}_\theta^1 = \left(\frac{V_\tau^1}{Z^1(\tau,\theta)} - \frac{D^1(\tau,\theta)}{Z^1(\tau,\theta)}\right) * e^{-\sigma_1^2/2*(\theta-\tau)} * e^{\sigma_1 * \sqrt{\theta-\tau} * dz_1}$$

$$\tilde{V}_\theta^2 = \left(\frac{V_\tau^2}{Z^2(\tau,\theta)} - \frac{D^2(\tau,\theta)}{Z^2(\tau,\theta)}\right) * e^{-\sigma_2^2/2*(\theta-\tau)} * e^{\sigma_2 * \sqrt{\theta-\tau} * dz_2}$$

$$g(dz_1, dz_2) = \frac{1}{2*\pi*\sqrt{1-\rho^2}} * \exp\left(-\frac{(dz_1^2 + dz_2^2 - 2*\rho*dz_1*dz_1)}{2*(1-\rho^2)}\right)$$

where the subscripts and superscripts indicate each of the two events, and $g(dz_1,dz_2)$ is the bivariate normal distribution with correlation parameter ρ, and the notation otherwise corresponds to the notation used in the description above of DBAR Range Derivatives.

The following information includes the indices, the trading periods, the predetermined termination criteria, the total amount invested and the value units used in this Example 3.1.6:

Asset Class 1: JP Morgan United States Government Bond Index ("JPMGBI")
Asset Class 1 Forward Price at Observation: 250.0
Asset Class 1 Volatility: 5%
Asset Class 2: S&P 500 Equity Index ("SP500")
Asset Class 2 Forward Price at Observation: 1410
Asset Class 2 Volatility: 18%
Correlation Between Asset Classes: 0.5
Contingent claim Expiration: Dec. 31, 1999.
Trading Start Date: May 30, 1999
Current Trading Period Start Date: Jul. 1, 1999
Current Trading Period End Date: Jul. 30, 1999
Next Trading Period Start Date: Aug. 2, 1999
Next Trading Period End Date: Aug. 31, 1999
Current Date: Jul. 12, 1999
Last Trading Period End Date: Dec. 30, 1999
Aggregate Investment for Current Trading Period: $100 million
Trade and Payout Value Units: U.S. Dollars Table 3.1.6 shows the illustrative distribution of state returns over the defined states for the joint outcomes based on this information, with the defined states as indicated.

TABLE 3.1.6-1

| Unit Returns for Joint Performance of S&P 500 and JPMGBI | | | | | | | | | | | | | | | |
|---|---|---|---|---|---|---|---|---|---|---|---|---|---|---|---|
| | | JPMGBI | | | | | | | | | | | | | |
| SP500 | State | (0, 233] | (233, 237] | (237, 241] | (241, 244] | (244, 246] | (246, 248] | (248, 250] | (250, 252 | (252, ]255] | (255, 257] | (257, 259] | (259, 264] | (264, 268] | (268, ∞] |
| | (0, 1102] | 246 | 240 | 197 | 413 | 475 | 591 | 798 | 1167 | 1788 | 3039 | 3520 | 2330 | 11764 | 18518 |
| | (1102, 1174] | 240 | 167 | 110 | 197 | 205 | 230 | 281 | 373 | 538 | 841 | 1428 | 1753 | 7999 | 11764 |
| | (1174, 1252] | 197 | 110 | 61 | 99 | 94 | 98 | 110 | 135 | 180 | 259 | 407 | 448 | 1753 | 5207 |
| | (1252, 1292] | 413 | 197 | 99 | 145 | 130 | 128 | 136 | 157 | 197 | 269 | 398 | 407 | 1428 | 5813 |

TABLE 3.1.6-1-continued

| Unit Returns for Joint Performance of S&P 500 and JPMGBI | | | | | | | | | | | | | | | |
|---|---|---|---|---|---|---|---|---|---|---|---|---|---|---|---|
| | | JPMGBI | | | | | | | | | | | | | |
| SP500 | State | (0, 233] | (233, 237] | (237, 241] | (241, 244] | (244, 246] | (246, 248] | (248, 250] | (250, 252 | (252, ]255] | (255, 257] | (257, 259] | (259, 264] | (264, 268] | (268, ∞] |
| | (1292, 1334] | 475 | 205 | 94 | 130 | 113 | 106 | 108 | 120 | 144 | 189 | 269 | 259 | 841 | 3184 |
| | (1334, 1377] | 591 | 230 | 98 | 128 | 106 | 95 | 93 | 99 | 115 | 144 | 197 | 180 | 538 | 1851 |
| | (1377, 1421] | 798 | 281 | 110 | 136 | 108 | 93 | 88 | 89 | 99 | 120 | 157 | 135 | 373 | 1116 |
| | (1421, 1467] | 1167 | 373 | 135 | 157 | 120 | 99 | 89 | 88 | 93 | 108 | 136 | 110 | 281 | 798 |
| | (1467, 1515] | 1851 | 538 | 180 | 197 | 144 | 115 | 99 | 93 | 95 | 106 | 128 | 98 | 230 | 591 |
| | (1515, 1564] | 3184 | 841 | 259 | 269 | 189 | 144 | 120 | 108 | 106 | 113 | 130 | 94 | 205 | 475 |
| | (1564, 1614] | 5813 | 1428 | 407 | 398 | 269 | 197 | 157 | 136 | 128 | 130 | 145 | 99 | 197 | 413 |
| | (1614, 1720] | 15207 | 1753 | 448 | 407 | 259 | 180 | 135 | 110 | 98 | 94 | 99 | 61 | 110 | 197 |
| | (1720, 1834] | 1176 | 7999 | 1753 | 1428 | 841 | 538 | 373 | 281 | 230 | 205 | 197 | 110 | 167 | 240 |
| | (1834, ∞] | 18518 | 11764 | 2330 | 3520 | 3039 | 1788 | 1167 | 798 | 591 | 475 | 413 | 197 | 240 | 246 |

In Table 3.1.6-1, each cell contains the unit returns to the joint state reflected by the row and column entries. For example, the unit return to investments in the state encompassing the joint occurrence of the JPMGBI closing on expiration at 249 and the SP500 closing at 1380 is 88. Since the correlation between two indices in this example is assumed to be 0.5, the probability both indices will change in the same direction is greater that the probability that both indices will change in opposite directions. In other words, as represented in Table 3.1.6-1, unit returns to investments in states represented in cells in the upper left and lower right of the table—i.e., where the indices are changing in the same direction—are lower, reflecting higher implied probabilities, than unit returns to investments to states represented in cells in the lower left and upper right of Table 3.1.6-1—i.e., where the indices are changing in opposite directions.

As in the previous examples and in preferred embodiments, the returns illustrated in Table 3.1.6-1 could be calculated as opening indicative returns at the start of each trading period based on an estimate of what the closing returns for the trading period are likely to be. These indicative or opening returns can serve as an "anchor point" for commencement of trading in a group of DBAR contingent claims. Of course, actual trading and trader expectations may induce substantial departures from these indicative values.

Demand-based markets or auctions can be structured to trade DBAR contingent claims, including, for example, digital options, based on multiple underlying events or variables and their inter-relationships. Market participants often have views about the joint outcome of two underlying events or assets. Asset allocation managers, for example, are concerned with the relative performance of bonds versus equities. An additional example of multivariate underlying events follows:

Joint Performance: Demand-based markets or auctions can be structured to trade DBAR contingent claims, including, for example, digital options, based on the joint performance or observation of two different variables. For example, digital options traded in a demand-based market or auction can be based on an underlying event defined as the joint observation of non-farm payrolls and the unemployment rate.

Example 3.1.7

Corporate Bond Credit Risk

Groups of DBAR contingent claims can also be constructed on credit events, such as the event that one of the major credit rating agencies (e.g., Standard and Poor's, Moodys) changes the rating for some or all of a corporation's outstanding securities. Indicative returns at the outset of trading for a group of DBAR contingent claims oriented to a credit event can readily be constructed from publicly available data from the rating agencies themselves. For example, Table 3.1.7-1 contains indicative returns for an assumed group of DBAR contingent claims based on the event that a corporation's Standard and Poor's credit rating for a given security will change over a certain period of time. In this example, states are defined using the Standard and Poor's credit categories, ranging from AAA to D (default). Using the methods of the present invention, the indicative returns are calculated using historical data on the frequency of the occurrence of these defined states. In this example, a transaction fee of 1% is charged against the aggregate amount invested in the group of DBAR contingent claims, which is assumed to be $100 million.

TABLE 3.1.7-1

| Illustrative Returns for Credit DBAR Contingent Claims with 1% Transaction Fee | | | | |
|---|---|---|---|---|
| Current Rating | To New Rating | Historical Probability | Invested in State ($) | Indicative Return to State |
| A− | AAA | 0.0016 | 160,000 | 617.75 |
| A− | AA+ | 0.0004 | 40,000 | 2474.00 |
| A− | AA | 0.0012 | 120,000 | 824.00 |
| A− | AA− | 0.003099 | 309,900 | 318.46 |
| A− | A+ | 0.010897 | 1,089,700 | 89.85 |
| A− | A | 0.087574 | 8,757,400 | 10.30 |
| A− | A− | 0.772868 | 77,286,800 | 0.28 |
| A− | BBB+ | 0.068979 | 6,897,900 | 13.35 |
| A− | BBB | 0.03199 | 3,199,000 | 29.95 |
| A− | BBB− | 0.007398 | 739,800 | 132.82 |
| A− | BB+ | 0.002299 | 229,900 | 429.62 |
| A− | BB | 0.004999 | 499,900 | 197.04 |
| A− | BB− | 0.002299 | 229,900 | 429.62 |
| A− | B+ | 0.002699 | 269,900 | 365.80 |
| A− | B | 0.0004 | 40,000 | 2474.00 |
| A− | B− | 0.0004 | 40,000 | 2474.00 |
| A− | CCC | 1E-04 | 10,000 | 9899.00 |
| A− | D | 0.0008 | 80,000 | 1236.50 |

In Table 3.1.7-1, the historical probabilities over the mutually exclusive and collectively exhaustive states sum to unity. As demonstrated above in this specification, in preferred embodiments, the transaction fee affects the probability implied for each state from the unit return for that state.

Actual trading is expected almost always to alter illustrative indicative returns based on historical empirical data. This Example 3.1.7 indicates how efficiently groups of DBAR contingent claims can be constructed for all traders or firms exposed to particular credit risk in order to hedge that risk. For example, in this Example, if a trader has significant exposure to the A-rated bond issue described above, the trader could want to hedge the event corresponding to a downgrade by Standard and Poor's. For example, this trader may be particularly concerned about a downgrade corresponding to an issuer default or "D" rating. The empirical probabilities suggest a payout of approximately $1,237 for each dollar invested in that state. If this trader has $100,000,000 of the corporate issue in his portfolio and a recovery of ratio of 0.3 can be expected in the event of default, then, in order to hedge $70,000,000 of default risk, the trader might invest in the state encompassing a "D" outcome. To hedge the entire amount of the default risk in this example, the amount of the investment in this state should be $70,000,000/$1,237 or $56,589. This represents approximately 5.66 basis points of the trader's position size in this bond (i.e., $56,589/$100,000, 000=0.00056)] which probably represents a reasonable cost of credit insurance against default. Actual investments in this group of DBAR contingent claims could alter the return on the "D" event over time and additional insurance might need to be purchased.

Demand-based markets or auctions can be structured to offer a wide variety of products related to common measures of credit quality, including Moody's and S&P ratings, bankruptcy statistics, and recovery rates. For example, DBAR contingent claims can be based on an underlying event defined as the credit quality of Ford corporate debt as defined by the Standard & Poor's rating agency.

Example 3.1.8

Economic Statistics

As financial markets have become more sophisticated, statistical information that measures economic activity has assumed increasing importance as a factor in the investment decisions of market participants. Such economic activity measurements may include, for example, the following U.S. federal government and U.S. and foreign private agency statistics:

- Employment, National Output, and Income (Non-farm Payrolls, Gross Domestic Product, Personal Income)
- Orders, Production, and Inventories (Durable Goods Orders, Industrial Production, Manufacturing Inventories)
- Retail Sales, Housing Starts, Existing Home Sales, Current Account Balance, Employment Cost Index, Consumer Price Index, Federal Funds Target Rate
- Agricultural statistics released by the U.S.D.A. (crop reports, etc.)
- The National Association of Purchasing Management (NAPM) survey of manufacturing
- Standard and Poor's Quarterly Operating Earnings of the S&P 500
- The semiconductor book-to-bill ratio published by the Semiconductor Industry Association
- The Halifax House Price Index used extensively as an authoritative indicator of house price movements in the U.K.

Because the economy is the primary driver of asset performance, every investor that takes a position in equities, foreign exchange, or fixed income will have exposure to economic forces driving these asset prices, either by accident or design. Accordingly, market participants expend considerable time and resources to assemble data, models and forecasts. In turn, corporations, governments, and financial intermediaries depend heavily on the economic forecasts to allocate resources and to make market projections.

To the extent that economic forecasts are inaccurate, inefficiencies and severe misallocation of resources can result. Unfortunately, traditional derivatives markets fail to provide market participants with a direct mechanism to protect themselves against the adverse consequences of falling demand or rising input prices on a macroeconomic level. Demand-based markets or auctions for economic products, however, provide market participants with a market price for the risk that a particular measure of economic activity will vary from expectations and a tool to properly hedge the risk. The market participants can trade in a market or an auction where the event of economic significance is an underlying measure of economic activity (e.g., the VIX index as calculated by the CBOE) or a measured parameter related to the underlying event (e.g., an implied volatility or standard deviation of the VIX index).

For example, traders often hedge inflation risk by trading in bond futures or, where they exist, inflation-protected floating rate bonds. A group of DBAR contingent claims can readily be constructed to allow traders to express expectations about the distribution of uncertain economic statistics measuring, for example, the rate of inflation or other relevant variables. The following information describes such a group of claims:

Economic Statistic: United States Non-Farm Payrolls
Announcement Date: May 31, 1999
Last Announcement Date: Apr. 30, 1999
Expiration: Announcement Date, May 31, 1999
Trading Start Date: May 1, 1999
Current Trading Period Start Date: May 10, 1999
Current Trading Period End Date: May 14, 1999
Current Date: May 11, 1999
Last Announcement: 128,156 ('000)
Source: Bureau of Labor Statistics
Consensus Estimate: 130,000 (+1.2%)
Aggregate Amount Invested in Current Period: $100 million
Transaction Fee: 2.0% of Aggregate Traded amount Using methods and systems of the present invention, states can be defined and indicative returns can be constructed from, for example, consensus estimates among economists for this index. These estimates can be expressed in absolute values or, as illustrated, in Table 3.1.8-1 in percentage changes from the last observation as follows:

TABLE 3.1.8-1

Illustrative Returns For Non-Farm Payrolls Release with 2% Transaction Fee

| % Chg. In Index State | Investment in State ('000) | State Returns | Implied State Probability |
|---|---|---|---|
| [−100, −5] | 100 | 979 | 0.001 |
| (−5, −3] | 200 | 489 | 0.002 |
| (−3, −1] | 400 | 244 | 0.004 |
| (−1, −.5] | 500 | 195 | 0.005 |
| (−.5, 0] | 1000 | 97 | 0.01 |
| (0, .5] | 2000 | 48 | 0.02 |
| (.5, .7] | 3000 | 31.66667 | 0.03 |
| (.7, .8] | 4000 | 23.5 | 0.04 |
| (.8, .9] | 5000 | 18.6 | 0.05 |
| (.9, 1.0] | 10000 | 8.8 | 0.1 |
| (1.0, 1.1] | 14000 | 6 | 0.14 |
| (1.1, 1.2] | 22000 | 3.454545 | 0.22 |
| (1.2, 1.25] | 18000 | 4.444444 | 0.18 |
| (1.25, 1.3] | 9000 | 9.888889 | 0.09 |
| (1.3, 1.35] | 6000 | 15.33333 | 0.06 |

TABLE 3.1.8-1-continued

Illustrative Returns For Non-Farm Payrolls Release with 2% Transaction Fee

| % Chg. In Index State | Investment in State ('000) | State Returns | Implied State Probability |
|---|---|---|---|
| (1.35, 1.40] | 3000 | 31.66667 | 0.03 |
| (1.40, 1.45] | 200 | 489 | 0.002 |
| (1.45, 1.5] | 600 | 162.3333 | 0.006 |
| (1.5, 1.6] | 400 | 244 | 0.004 |
| (1.6, 1.7] | 100 | 979 | 0.001 |
| (1.7, 1.8] | 80 | 1224 | 0.0008 |
| (1.8, 1.9] | 59 | 1660.017 | 0.00059 |
| (1.9, 2.0] | 59 | 1660.017 | 0.00059 |
| (2.0, 2.1] | 59 | 1660.017 | 0.00059 |
| (2.1, 2.2] | 59 | 1660.017 | 0.00059 |
| (2.2, 2.4] | 59 | 1660.017 | 0.00059 |
| (2.4, 2.6] | 59 | 1660.017 | 0.00059 |
| (2.6, 3.0] | 59 | 1660.017 | 0.00059 |
| (3.0, ∞] | 7 | 13999 | 0.00007 |

As in examples, actual trading prior to the trading end date would be expected to adjust returns according to the amounts invested in each state and the total amount invested for all the states.

Demand-based markets or auctions can be structured to offer a wide variety of products related to commonly observed indices and statistics related to economic activity and released or published by governments, and by domestic, foreign and international government or private companies, institutions, agencies or other entities. These may include a large number of statistics that measure the performance of the economy, such as employment, national income, inventories, consumer spending, etc., in addition to measures of real property and other economic activity. An additional example follows:

Private Economic Indices & Statistics: Demand-based markets or auctions can be structured to trade DBAR contingent claims, including, for example, digital options, based on economic statistics released or published by private sources. For example, DBAR contingent claims can be based on an underlying event defined as the NAPM Index published by the National Association of Purchasing Managers.

Alternative private indices might also include measures of real property. For example, DBAR contingent claims, including, for example, digital options, can be based on an underlying event defined as the level of the Halifax House Price Index at year-end, 2001.

In addition to the general advantages of the demand-based trading system, demand-based products on economic statistics will provide the following new opportunities for trading and risk management:

(1) Insuring against the event risk component of asset price movements. Statistical releases can often cause extreme short-term price movements in the fixed income and equity markets. Many market participants have strong views on particular economic reports, and try to capitalize on such views by taking positions in the bond or equity markets. Demand-based markets or auctions on economic statistics provide participants with a means of taking a direct view on economic variables, rather than the indirect approach employed currently.

(2) Risk management for real economic activity. State governments, municipalities, insurance companies, and corporations may all have a strong interest in a particular measure of real economic activity. For example, the Department of Energy publishes the Electric Power Monthly which provides electricity statistics at the State, Census division, and U.S. levels for net generation, fossil fuel consumption and stocks, quantity and quality of fossil fuels, cost of fossil fuels, electricity retail sales, associated revenue, and average revenue. Demand-based markets or auctions based on one or more of these energy benchmarks can serve as invaluable risk management mechanisms for corporations and governments seeking to manage the increasingly uncertain outlook for electric power.

(3) Sector-specific risk management. The *Health Care CPI* (Consumer Price Index) published by the U.S. Bureau of Labor Statistics tracks the CPI of medical care on a monthly basis in the *CPI Detailed Report*. A demand-based market or auction on this statistic would have broad applicability for insurance companies, drug companies, hospitals, and many other participants in the health care industry. Similarly, the semiconductor book-to-bill ratio serves as a direct measure of activity in the semiconductor equipment manufacturing industry. The ratio reports both shipments and new bookings with a short time lag, and hence is a useful measure of supply and demand balance in the semiconductor industry. Not only would manufacturers and consumers of semiconductors have a direct financial interest, but the ratio's status as a bellwether of the general technology market would invite participation from financial market participants as well.

Example 3.1.9

Corporate Events

Corporate actions and announcements are further examples of events of economic significance which are usually unhedgable or uninsurable in traditional markets but which can be effectively structured into groups of DBAR contingent claims according to the present invention.

In recent years, corporate earnings expectations, which are typically announced on a quarterly basis for publicly traded companies, have assumed increasing importance as more companies forego dividends to reinvest in continuing operations. Without dividends, the present value of an equity becomes entirely dependent on revenues and earnings streams that extend well into the future, causing the equity itself to take on the characteristics of an option. As expectations of future cash flows change, the impact on pricing can be dramatic, causing stock prices in many cases to exhibit option-like behavior.

Traditionally, market participants expend considerable time and resources to assemble data, models and forecasts. To the extent that forecasts are inaccurate, inefficiencies and severe misallocation of resources can result. Unfortunately, traditional derivatives markets fail to provide market participants with a direct mechanism to manage the unsystematic risks of equity ownership. Demand-based markets or auctions for corporate earnings and revenues, however, provide market participants with a concrete price for the risk that earnings and revenues may vary from expectations and permit them to insure or hedge or speculate on the risk.

Many data services, such as IBES and FirstCall, currently publish estimates by analysts and a consensus estimate in advance of quarterly earnings announcements. Such estimates can form the basis for indicative opening returns at the commencement of trading in a demand-based market or auction as illustrated below. For this example, a transaction fee of zero is assumed.

Underlying security: IBM
Earnings Announcement Date: Jul. 21, 1999
Consensus Estimate: 0.879/share
Expiration: Announcement, Jul. 21, 1999
First Trading Period Start Date: Apr. 19, 1999
First Trading Period End Date May 19, 1999
Current Trading Period Start Date: Jul. 6, 1999
Current Trading Period End Date: Jul. 9, 1999
Next Trading Period Start Date: Jul. 9, 1999
Next Trading Period End Date: Jul. 16, 1999
Total Amount Invested in Current Trading Period: $100 million

TABLE 3.19-1

Illustrative Returns For IBM Earnings Announcement

| Earnings State0 | Invested in State ('000 $) | Unit Returns | Implied State Probability |
|---|---|---|---|
| (−∞, .5] | 70 | 1,427.57 | 0.0007 |
| (.5, .6] | 360 | 276.78 | 0.0036 |
| (.6, .65] | 730 | 135.99 | 0.0073 |
| (.65, 3] | 1450 | 67.97 | 0.0145 |
| (.7, .74] | 2180 | 44.87 | 0.0218 |
| (.74, .78] | 3630 | 26.55 | 0.0363 |
| (.78, ..8] | 4360 | 21.94 | 0.0436 |
| (.8, .82] | 5820 | 16.18 | 0.0582 |
| (.82, .84] | 7270 | 12.76 | 0.0727 |
| (.84, .86] | 8720 | 10.47 | 0.0872 |
| (.86, .87] | 10900 | 8.17 | 0.109 |
| (.87, .88] | 18170 | 4.50 | 0.1817 |
| (.88, .89] | 8720 | 10.47 | 0.0872 |
| (.89, .9] | 7270 | 12.76 | 0.0727 |
| (.9, .91] | 5090 | 18.65 | 0.0509 |
| (.91, .92] | 3630 | 26.55 | 0.0363 |
| (.92, .93] | 2910 | 33.36 | 0.0291 |
| (.93, .95] | 2180 | 44.87 | 0.0218 |
| (.95, .97] | 1450 | 67.97 | 0.0145 |
| (.97, .99] | 1310 | 75.34 | 0.0131 |
| (.99, 1.1] | 1160 | 85.21 | 0.0116 |
| (1.1, 1.3] | 1020 | 97.04 | 0.0102 |
| (1.3, 1.5] | 730 | 135.99 | 0.0073 |
| (1.5, 1.7] | 360 | 276.78 | 0.0036 |
| (1.7, 1.9] | 220 | 453.55 | 0.0022 |
| (1.9, 2.1] | 150 | 665.67 | 0.0015 |
| (2.1, 2.3] | 70 | 1,427.57 | 0.0007 |
| (2.3, 2.5] | 40 | 2,499.00 | 0.0004 |
| (2.5, ∞] | 30 | 3,332.33 | 0.0003 |

Consistent with the consensus estimate, the state with the largest investment encompasses the range (0.87, 0.88].

TABLE 3.1.9-2

Illustrative Returns for Microsoft Earnings Announcement

| Calls | | | | | Puts | | | | |
|---|---|---|---|---|---|---|---|---|---|
| Strike | Bid | Offer | Payout | Volume | Strike | Bid | Offer | Payout | Volume |
| <40 | 0.9525 | 0.9575 | 1.0471 | 4,100,000 | <40 | 0.0425 | 0.0475 | 22.2222 | 193,100 |
| <41 | 0.9025 | 0.9075 | 1.1050 | 1,000,000 | <41 | 0.0925 | 0.0975 | 10.5263 | 105,500 |
| <42 | 0.8373 | 0.8423 | 1.1908 | 9,700 | <42 | 0.1577 | 0.1627 | 6.2422 | — |
| <43 | 0.7475 | 0.7525 | 1.3333 | 3,596,700 | <43 | 0.2475 | 0.2525 | 4.0000 | 1,200,000 |
| <44 | 0.622 | 0.627 | 1.6013 | 2,000,000 | <44 | 0.3730 | 0.3780 | 2.6631 | 1,202,500 |
| <45 | 0.4975 | 0.5025 | 2.0000 | 6,000,000 | <45 | 0.4975 | 0.5025 | 2.0000 | 6,000,000 |
| <46 | 0.3675 | 0.3725 | 2.7027 | 2,500,000 | <46 | 0.6275 | 0.6325 | 1.5873 | 4,256,600 |
| <47 | 0.2175 | 0.2225 | 4.5455 | 1,000,000 | <47 | 0.7775 | 0.7825 | 1.2821 | 3,545,700 |
| <48 | 0.1245 | 0.1295 | 7.8740 | 800,000 | <48 | 0.8705 | 0.8755 | 1.1455 | 5,500,000 |
| <49 | 0.086 | 0.091 | 11.2994 | — | <49 | 0.9090 | 0.9140 | 1.0971 | — |
| <50 | 0.0475 | 0.0525 | 20.000 | 194,700 | <50 | 0.9475 | 0.9525 | 1.0526 | 3,700,000 |

The table above provides a sample distribution of trades that might be made for an April 23 auction period for Microsoft Q4 corporate earnings (June 2001), due to be released on Jul. 16, 2001.

For example, at 29 times trailing earnings and 28 times consensus 2002 earnings, Microsoft is experiencing single digit profit growth and is the object of uncertainty with respect to sales of Microsoft Office, adoption rates of Windows 2000, and the .Net initiative. In the sample demand-based market or auction based on earnings expectations depicted above, a market participant can engage, for example, in the following trading tactics and strategies with respect to DBAR digital options.

A fund manager wishing to avoid market risk at the current time but who still wants exposure to Microsoft can buy the 0.43 Earnings per Share Call (consensus currently 0.44-45) with reasonable confidence that reported earnings will be 43 cents or higher. Should Microsoft report earnings as expected, the trader earns approximately 33% on invested demand-based trading digital option premium (i.e., 1/option price of 0.7525). Conversely, should Microsoft report earnings below 43 cents, the invested premium would be lost, but the consequences for Microsoft's stock price would likely be dramatic.

A more aggressive strategy would involve selling or underweighting Microsoft stock, while purchasing a string of digital options on higher than expected EPS growth. In this case, the trader expects a multiple contraction to occur over the short to medium term, as the valuation becomes unsustainable. Using the market for DBAR contingent claims on earnings depicted above, a trader with a $5 million notional exposure to Microsoft can buy a string of digital call options, as follows:

| Strike | Premium | Price | Net Payout |
|---|---|---|---|
| .46 | $37,000 | 0.3725 | $ 62,329 |
| .47 | 22,000 | 0.2225 | 139,205 |
| .48 | 6,350 | 0.1295 | 181,890 |
| .49 | 4,425 | 0.0910 | 226,091 |
| .50 | 0 | 0.0525 | 226,091 |

Figure 21:
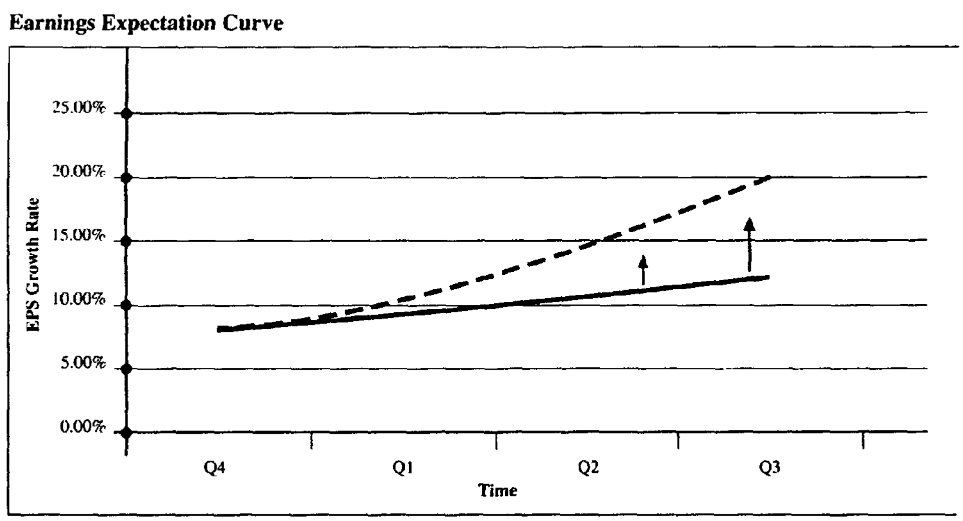
FIG. 21 depicts an upward shift in the earnings expectations curve which can be protected by trading digital options and other contingent claims on earnings in successive quarters according to the embodiments of the present invention.

The payouts displayed immediately above are net of premium investment. Premiums invested are based on the trader's assessment of likely stock price (and price multiple) reaction to a possible earnings surprise. Similar trades in digital options on earnings would be made in successive quarters, resulting in a string of options on higher than expected earnings growth, to protect against an upward shift in the earnings expectation curve, as shown in FIG. 21

The total cost, for this quarter, amounts to $69,775, just above a single quarter's interest income on the notional $5,000,000, invested at 5%.

A trader with a view on a range of earnings expectations for the quarter can profit from a spread strategy over the distribution. By purchasing the 0.42 call and selling the 0.46 call, the trader can construct a digital option spread priced at: 0.8423−0.3675=0.4748. This spread would, consequently, pay out: 1/0.4748=2.106, for every dollar invested.

Many trades can be constructed using demand-based trading for DBAR contingent claims, including, for example, digital options, based on corporate earnings. The examples shown here are intended to be representative, not definitive. Moreover, demand-based trading products can be based on corporate accounting measures, including a wide variety of generally accepted accounting information from corporate balance sheets, income statements, and other measures of cash flow, such as earnings before interest, taxes, depreciation, and amortization (EBITDA). The following examples provide a further representative sampling:

Revenues: Demand-based markets or auctions for DBAR contingent claims, including, for example, digital options can be based on a measure or parameter related to Cisco revenues, such as the gross revenues reported by the Cisco Corporation. The underlying event for these claims is the quarterly or annual gross revenue figure for Cisco as calculated and released to the public by the reporting company.

EBITDA (Earnings Before Interest, Taxes, Depreciation, Amortization): Demand-based markets or auctions for DBAR contingent claims, including, for example, digital options can be based on a measure or parameter related to AOL EBITDA, such as the EBITDA figure reported by AOL that is used to provide a measure of operating earnings. The underlying event for these claims is the quarterly or annual EBITDA figure for AOL as calculated and released to the public by the reporting company.

In addition to the general advantages of the demand-based trading system, products based on corporate earnings and revenues may provide the following new opportunities for trading and risk management:

(1) Trading the price of a stock relative to its earnings. Traders can use a market for earnings to create a "Multiple Trade," in which a stock would be sold (or 'not owned') and a string of DBAR contingent claims, including, for example, digital options, based on quarterly earnings can be used as a hedge or insurance for stock believed to be overpriced. Market expectations for a company's earnings may be faulty, and may threaten the stability of a stock price, post announcement. Corporate announcements that reduce expectation for earnings and earnings growth highlight the consequences for high-multiple growth stocks that fail to meet expectations. For example, an equity investment manager might decide to underweight a high-multiple stock against a benchmark, and replace it with a series of DBAR digital options corresponding to a projected profile for earnings growth. The manager can compare the cost of this strategy with the risk of owning the underlying security, based on the company's PE ratio or some other metric chosen by the fund manager. Conversely, an investor who expects a multiple expansion for a given stock would purchase demand-based trading digital put options on earnings, retaining the stock for a multiple expansion while protecting against a shortfall in reported earnings.

(2) Insuring against an earnings shortfall, while maintaining a stock position during a period when equity options are deemed too expensive. While DBAR contingent claims, including, for example, digital options, based on earnings are not designed to hedge stock prices, they can provide a cost-effective means to mitigate the risk of equity ownership over longer term horizons. For example, periodically, three-month stock options that are slightly out-of-the-money can command premiums of 10% or more. The ability to insure against possible earnings or revenue shortfalls one quarter or more in the future via purchases of DBAR digital options may represent an attractive alternative to conventional hedge strategies for equity price risks.

(3) Insuring against an earnings shortfall that may trigger credit downgrades. Fixed income managers worried about potential exposure to credit downgrades from reduced corporate earnings can use DBAR contingent claims, including, for example, digital options, to protect against earnings shortfalls that would impact EBITDA and prompt declines in corporate bond prices. Conventional fixed income and convertible bond managers can protect against equity exposures without a short sale of the corresponding equity shares.

(4) Obtaining low-risk, incremental returns. Market participants can use deep-in-the-money DBAR contingent claims, including, for example, digital options, based on earnings as a source of low-risk, uncorrelated returns.

Example 3.1.10

Real Assets

Another advantage of the methods and systems of the present invention is the ability to structure liquid claims on illiquid underlying assets such a real estate. As previously discussed, traditional derivatives markets customarily use a liquid underlying market in order to function properly. With a group of DBAR contingent claims all that is usually required is a real-world, observable event of economic significance. For example, the creation of contingent claims tied to real assets has been attempted at some financial institutions over the last several years. These efforts have not been credited with an appreciable impact, apparently because of the primary liquidity constraints inherent in the underlying real assets.

A group of DBAR contingent claims according to the present invention can be constructed based on an observable event related to real estate. The relevant information for an illustrative group of such claims is as follows:

Real Asset Index: Colliers ABR Manhattan Office Rent Rates
Bloomberg Ticker: COLAMANR
Update Frequency: Monthly
Source: Colliers ABR, Inc.
Announcement Date: Jul. 31, 1999
Last Announcement Date: May 30, 1999
Last Index Value: $45.39/sq. ft.
Consensus Estimate: $45.50
Expiration: Announcement Jul. 31, 1999
Current Trading Period Start: May 30, 1999
Current Trading Period End: Jul. 7, 1999

Next Trading Period Start Jul. 7, 1999

Next Trading Period End Jul. 14, 1999

For reasons of brevity, defined states and opening indicative or illustrative returns resulting from amounts invested in the various states for this example are not shown, but can be calculated or will emerge from actual trader investments according to the methods of the present invention as illustrated in Examples 3.1.1-3.1.9.

Demand-based markets or auctions can be structured to offer a wide variety of products related to real assets, such as real estate, bandwidth, wireless spectrum capacity, or computer memory. An additional example follows:

Computer Memory: Demand-based markets or auctions can be structured to trade DBAR contingent claims, including, for example, digital options, based on computer memory components. For example, DBAR contingent claims can be based on an underlying event defined as the 64 Mb (8×8) PC 133 DRAM memory chip prices and on the rolling 90-day average of Dynamic Random Access Memory DRAM prices as reported each Friday by ICIS-LOR, a commodity price monitoring group based in London.

Example 3.1.11

Energy Supply Chain

A group of DBAR contingent claims can also be constructed using the methods and systems of the present invention to provide hedging vehicles on non-tradable quantities of great economic significance within the supply chain of a given industry. An example of such an application is the number of oil rigs currently deployed in domestic U.S. oil production. The rig count tends to be a slowly adjusting quantity that is sensitive to energy prices. Thus, appropriately structured groups of DBAR contingent claims based on rig counts could enable suppliers, producers and drillers to hedge exposure to sudden changes in energy prices and could provide a valuable risk-sharing device.

For example, a group of DBAR contingent claims depending on the rig count could be constructed according to the present invention using the following information (e.g., data source, termination criteria, etc).

Asset Index: Baker Hughes Rig Count U.S. Total

Bloomberg Ticker: BAKETOT

Frequency: Weekly

Source: Baker Hughes, Inc.

Announcement Date: Jul. 16, 1999

Last Announcement Date: Jul. 9, 1999

Expiration Date: Jul. 16, 1999

Trading Start Date: Jul. 9, 1999

Trading End Date: Jul. 15, 1999

Last: 570

Consensus Estimate: 580

For reasons of brevity, defined states and opening indicative or illustrative returns resulting from amounts invested in the various states for this example are not shown, but can be readily calculated or will emerge from actual trader investments according to the methods of the present invention, as illustrated in Examples 3.1.1-3.1.9. A variety of embodiments of DBAR contingent claims, including for example, digital options, can be based on an underlying event defined as the Baker Hughes Rig Count observed on a semi-annual basis.

Demand-based markets or auctions can be structured to offer a wide variety of products related to power and emissions, including electricity prices, loads, degree-days, water supply, and pollution credits. The following examples provide a further representative sampling:

Electricity Prices: Demand-based markets or auctions can be structured to trade DBAR contingent claims, including, for example, digital options, based on the price of electricity at various points on the electricity grid. For example, DBAR contingent claims can be based on an underlying event defined as the weekly average price of electricity in kilowatt-hours at the New York Independent System Operator (NYISO).

Transmission Load: Demand-based markets or auctions can be structured to trade DBAR contingent claims, including, for example, digital options, based on the actual load (power demand) experienced for a particular power pool, allowing participants to trade volume, in addition to price. For example, DBAR contingent claims can be based on an underlying event defined as the weekly total load demand experienced by Pennsylvania-New Jersey-Maryland Interconnect (PJM Western Hub).

Water: Demand-based markets or auctions can be structured to trade DBAR contingent claims, including, for example, digital options, based on water supply. Water measures are useful to a broad variety of constituents, including power companies, agricultural producers, and municipalities. For example, DBAR contingent claims can be based on an underlying event defined as the cumulative precipitation observed at weather stations maintained by the National Weather Service in the Northwest catchment area, including Washington, Idaho, Montana, and Wyoming.

Emission Allowances: Demand-based markets or auctions can be structured to trade DBAR contingent claims, including, for example, digital options, based on emission allowances for various pollutants. For example, DBAR contingent claims can be based on an underlying event defined as price of Environmental Protection Agency (EPA) sulfur dioxide allowances at the annual market or auction administered by the Chicago Board of Trade.

Example 3.1.12

Mortgage Prepayment Risk

Real estate mortgages comprise an extremely large fixed income asset class with hundreds of billions in market capitalization. Market participants generally understand that these mortgage-backed securities are subject to interest rate risk and the risk that borrowers may exercise their options to refinance their mortgages or otherwise "prepay" their existing mortgage loans. The owner of a mortgage security, therefore, bears the risk of being "called" out of its position when mortgage interest rate levels decline.

Market participants expend considerable time and resources assembling econometric models and synthesizing various data populations in order to generate prepayment projections. To the extent that economic forecasts are inaccurate, inefficiencies and severe misallocation of resources can result. Unfortunately, traditional derivatives markets fail to provide market participants with a direct mechanism to protect themselves against a homeowner's exercise of its prepayment option. Demand-based markets or auctions for mortgage prepayment products, however, provide market participants with a concrete price for prepayment risk.

Groups of DBAR contingent claims can be structured according to the present invention, for example, based on the following information:

Asset Index: FNMA Conventional 30 year One-Month Historical Aggregate Prepayments
Coupon: 6.5%
Frequency: Monthly
Source: Bloomberg
Announcement Date: Aug. 1, 1999
Last Announcement Date: Jul. 1, 1999
Expiration: Announcement Date, Aug. 1, 1999
Current Trading Period Start Date: Jul. 1, 1999
Current Trading Period End Date: Jul. 9, 1999
Last: 303 Public Securities Association Prepayment Speed ("PSA")
Consensus Estimate: 310 PSA For reasons of brevity, defined states and opening indicative or illustrative returns resulting from amounts invested in the various states for this example are not shown, but can be readily calculated or will emerge from actual trader investments according to the methods of the present invention, as illustrated in Examples 3.1.1-3.1.9.

In addition to the general advantages of the demand-based trading system, products on mortgage prepayments may provide the following exemplary new opportunities for trading and risk management:

(1) Asset-specific applications. In the simplest form, the owner of a prepayable mortgage-backed security carries, by definition, a series of short option positions embedded in the asset, whereas a DBAR contingent claim, including, for example, a digital option, based on mortgage prepayments would constitute a long option position. A security owner would have the opportunity to compare the digital option's expected return with the prospective loss of principal, correlate the offsetting options, and invest accordingly. While this tactic would not eliminate reinvestment risks, per se, it would generate incremental investment returns that would reduce the security owner's embedded liabilities with respect to short option positions.

(2) Portfolio applications. Certainly, a similar strategy could be applied on an expanded basis to a portfolio of mortgage-backed securities, or a portfolio of whole mortgage loans.

(3) Enhancements to specific pools. Certain pools of seasoned mortgage loans exhibit consistent prepayment patterns, based upon comprehensible factors—origination period, underwriting standards, borrower circumstances, geographic phenomena, etc. Because of homogeneous prepayment performance, mortgage market participants can obtain greater confidence with respect to the accuracy of predictions for prepayments in these pools, than in the case of pools of heterogeneous, newly originated loans that lack a prepayment history. Market conventions tend to assign lower volatility estimates to the correlation of prepayment changes in seasoned pools for given interest rate changes, than in the case of newer pools. A relatively consistent prepayment pattern for seasoned mortgage loan pools would heighten the certainty of correctly anticipating future prepayments, which would heighten the likelihood of consistent success in trading in DBAR contingent claims such as, for example, digital options, based on respective mortgage prepayments. Such digital option investments, combined with seasoned pools, would tend to enhance annuity-like cash profiles, and reduce investment risks.

(4) Prepayment puts plus discount MBS. Discount mortgage-backed securities tend to enjoy two-fold benefits as interest rates decline in the form of positive price changes and increases in prepayment speeds. Converse penalties apply in events of increases in interest rates, where a discount MBS suffers from adverse price change, and a decline in prepayment income. A discount MBS owner could offset diminished prepayment income by investing in DBAR contingent claims, such as, for example, digital put options, or digital put option spreads on prepayments. An analogous strategy would apply to principal-only mortgage-backed securities.

(5) Prepayment calls plus premium MBS. An expectation of interest rate declines that accelerate prepayment activity for premium mortgage-backed securities would motivate a premium bond-holder to purchase DBAR contingent claims, such as, for example, digital call options, based on mortgage prepayments to offset losses attributable to unwelcome paydowns. The analogue would also apply to interest-only mortgage-backed securities.

(6) Convexity additions. An investment in a DBAR contingent claim, such as, for example, a digital option, based on mortgage prepayments should effectively add convexity to an interest rate sensitive investment. According to this reasoning, dollar-weighted purchases of a demand-based market or auction on mortgage prepayments would tend to offset the negative convexity exhibited by mortgage-backed securities. It is likely that expert participants in the mortgage marketplace will analyze and test, and ultimately harvest, the fruitful opportunities for combinations of DBAR contingent claims, including, for example, digital options, based on mortgage prepayments with mortgage-backed securities and derivatives.

Example 3.1.13

Insurance Industry Loss Warranty ("ILW")

The cumulative impact of catastrophic and non-catastrophic insurance losses over the past two years has reduced the capital available in the retrocession market (i.e. reinsurance for reinsurance companies) and pushed up insurance and reinsurance rates for property catastrophe coverage. Because large reinsurance companies operate global businesses with global exposures, severe losses from catastrophes in one country tend to drive up insurance and reinsurance rates for unrelated perils in other countries simply due to capital constraints.

As capital becomes scarce and insurance rates increase, market participants usually access the capital markets by purchasing catastrophic bonds (CAT bonds) issued by special purpose reinsurance companies. The capital markets can absorb the risk of loss associated with larger disasters, whereas a single insurer or even a group of insurers cannot, because the risk is spread across many more market participants.

Unlike traditional capital markets that generally exhibit a natural two-way order flow, insurance markets typically exhibit one-way demand generated by participants desiring protection from adverse outcomes. Because demand-based trading products do not require an underlying source of supply, such products provide an attractive alternative for access to capital.

Groups of DBAR contingent claims can be structured using the system and methods of the present invention to provide insurance and reinsurance facilities for property and casualty, life, health and other traditional lines of insurance. The following information provides information to structure a group of DBAR contingent claims related to large property losses from hurricane damage:

Event: PCS Eastern Excess $5 billion Index
Source: Property claim Services (PCS)
Frequency: Monthly
Announcement Date: Oct. 1, 1999
Last Announcement Date: Jul. 1, 1999
Last Index Value: No events
Consensus Estimate: $1 billion (claims excess of $5 billion)
Expiration: Announcement Date, Oct. 1, 1999
Trading Period Start Date: Jul. 1, 1999
Trading Period End Date: Sep. 30, 1999

For reasons of brevity, defined states and opening indicative or illustrative returns resulting from amounts invested in the various states for this example are not shown, but can be readily calculated or will emerge from actual trader investments according to the methods of the present invention, as illustrated in Examples 3.1.1-3.1.9.

In preferred embodiments of groups of DBAR contingent claims related to property-casualty catastrophe losses, the frequency of claims and the distributions of the severity of losses are assumed and convolutions are performed in order to post indicative returns over the distribution of defined states. This can be done, for example, using compound frequency-severity models, such as the Poisson-Pareto model, familiar to those of skill in the art, which predict, with greater probability than a normal distribution, when losses will be extreme. As indicated previously, in preferred embodiments market activity is expected to alter the posted indicative returns, which serve as informative levels at the commencement of trading.

Demand-based markets or auctions can be structured to offer a wide variety of products related to insurance industry loss warranties and other insurable risks, including property and non-property catastrophe, mortality rates, mass torts, etc. An additional example follows:

Property Catastrophe: Demand-based markets or auctions can be based on the outcome of natural catastrophes, including earthquake, fire, atmospheric peril, and flooding, etc. Underlying events can be based on hazard parameters. For example, DBAR contingent claims can be based on an underlying event defined as the cumulative losses sustained in California as the result of earthquake damage in the year 2002, as calculated by the Property claims Service (PCS).

In addition to the general advantages of the demand-based trading system, products on catastrophe risk will provide the following new opportunities for trading and risk management:

(1) Greater transaction efficiency and precision. A demand-based trading catastrophe risk product, such as, for example, a DBAR digital option, allows participants to buy or sell a precise notional quantity of desired risk, at any point along a catastrophe risk probability curve, with a limit price for the risk. A series of loss triggers can be created for catastrophic events that offer greater flexibility and customization for insurance transactions, in addition to indicative pricing for all trigger levels. Segments of risk coverage can be traded with ease and precision. Participants in demand-based trading catastrophe risk products gain the ability to adjust risk protection or exposure to a desired level. For example, a reinsurance company may wish to purchase protection at the tail of a distribution, for unlikely but extremely catastrophic losses, while writing insurance in other parts of the distribution where returns may appear attractive.

(2) Credit quality. Claims-paying ability of an insurer or reinsurer represents an important concern for many market participants. Participants in a demand-based market or auction do not depend on the credit quality of an individual insurance or reinsurance company. A demand-based market or auction is by nature self-funding, meaning that catastrophic losses in other product or geographic areas will not impair the ability of a demand-based trading catastrophe risk product to make capital distributions.

Example 3.1.14

Conditional Events

As discussed above, advantage of the systems and methods of the present invention is the ability to construct groups of DBAR contingent claims related to events of economic significance for which there is great interest in insurance and hedging, but which are not readily hedged or insured in traditional capital and insurance markets. Another example of such an event is one that occurs only when some related event has previously occurred. For purposes of illustration, these two events may be denoted A and B.

$$q\langle A \mid B\rangle = \frac{q(A \cap B)}{q(B)}$$

where q denotes the probability of a state, $q\langle A|B\rangle$ represents the conditional probability of state A given the prior occurrence of state and B, and $q(A\cap B)$ represents the occurrence of both states A and B.

For example, a group of DBAR contingent claims may be constructed to combine elements of "key person" insurance and the performance of the stock price of the company managed by the key person. Many firms are managed by people whom capital markets perceive as indispensable or particularly important, such as Warren Buffett of Berkshire Hathaway. The holders of Berkshire Hathaway stock have no ready way of insuring against the sudden change in management of Berkshire, either due to a corporate action such as a takeover or to the death or disability of Warren Buffett. A group of conditional DBAR contingent claims can be constructed according to the present invention where the defined states reflect the stock price of Berkshire Hathaway conditional on Warren Buffet's leaving the firm's management. Other conditional DBAR contingent claims that could attract significant amounts for investment can be constructed using the methods and systems of the present invention, as apparent to one of skill in the art.

Example 3.1.15

Securitization Using a DBAR Contingent Claim Mechanism

The systems and methods of the present invention can also be adapted by a financial intermediary or issuer for the issuance of securities such as bonds, common or preferred stock, or other types of financial instruments. The process of creating new opportunities for hedging underlying events through the creation of new securities is known as "securitization," and is also discussed in an embodiment presented in Section 10. Well-known examples of securitization include the mortgage and asset-backed securities markets, in which portfolios of financial risk are aggregated and then recombined into new sources of financial risk. The systems and methods of the present invention can be used within the securitization process by creating securities, or portfolios of securities, whose risk, in whole or part, is tied to an associated or embedded group of DBAR contingent claims. In a preferred embodiment, a group of DBAR contingent claims is associated with a security much like options are currently associated with bonds in order to create callable and putable bonds in the traditional markets.

This example illustrates how a group of DBAR contingent claims according to the present invention can be tied to the issuance of a security in order to share risk associated with an identified future event among the security holders. In this example, the security is a fixed income bond with an embedded group of DBAR contingent claims whose value depends on the possible values for hurricane losses over some time period for some geographic region.

Issuer: Tokyo Fire and Marine

Underwriter: Goldman Sachs

DBAR Event: Total Losses on a Saffir-Simpson Category 4 Hurricane

Geographic: Property claims Services Eastern North America

Date: Jul. 1, 1999-Nov. 1, 1999

Size of Issue: 500 million USD.

Issue Date: May 1, 1999

DBAR Trading Period: May 1, 1999-Jul. 1, 1999

In this example, the underwriter Goldman Sachs issues the bond, and holders of the issued bond put bond principal at risk over the entire distribution of amounts of Category 4 losses for the event. Ranges of possible losses comprise the defined states for the embedded group of DBAR contingent claims. In a preferred embodiment, the underwriter is responsible for updating the returns to investments in the various states, monitoring credit risk, and clearing and settling, and validating the amount of the losses. When the event is determined and uncertainty is resolved, Goldman is "put" or collects the bond principal at risk from the unsuccessful investments and allocates these amounts to the successful investments. The mechanism in this illustration thus includes:

(1) An underwriter or intermediary which implements the mechanism, and (2) A group of DBAR contingent claims directly tied to a security or issue (such as the catastrophe bond above).

For reasons of brevity, defined states and opening indicative or illustrative returns resulting from amounts invested in the various states for this example are not shown, but can be readily calculated or will emerge from actual trader investments according to the methods of the present invention, as illustrated in Examples 3.1.1-3.1.9.

Example 3.1.16

Exotic Derivatives

The securities and derivatives communities frequently use the term "exotic derivatives" to refer to derivatives whose values are linked to a security, asset, financial product or source of financial risk in a more complicated fashion than traditional derivatives such as futures, call options, and convertible bonds. Examples of exotic derivatives include American options, Asian options, barrier options, Bermudan options, chooser and compound options, binary or digital options, lookback options, automatic and flexible caps and floors, and shout options.

Many types of exotic options are currently traded. For example, barrier options are rights to purchase an underlying financial product, such as a quantity of foreign currency, for a specified rate or price, but only if, for example, the underlying exchange rate crosses or does not cross one or more defined rates or "barriers." For example, a dollar call/yen put on the dollar/yen exchange rate, expiring in three months with strike price 110 and "knock-out" barrier of 105, entitles the holder to purchase a quantity of dollars at 110 yen per dollar, but only if the exchange rate did not fall below 105 at any point during the three month duration of the option. Another example of a commonly traded exotic derivative, an Asian option, depends on the average value of the underlying security over some time period. Thus, a class of exotic derivatives is commonly referred to as "path-dependent" derivatives, such as barrier and Asian options, since their values depend not only on the value of the underlying financial product at a given date, but on a history of the value or state of the underlying financial product.

The properties and features of exotic derivatives are often so complex so as to present a significant source of "model risk" or the risk that the tools, or the assumptions upon which they are based, will lead to significant errors in pricing and hedging. Accordingly, derivatives traders and risk managers often employ sophisticated analytical tools to trade, hedge, and manage the risk of exotic derivatives.

One of the advantages of the systems and methods of the present invention is the ability to construct groups of DBAR contingent claims with exotic features that are more manageable and transparent than traditional exotic derivatives. For example, a trader might be interested in the earliest time the yen/dollar exchange rate crosses 95 over the next three months. A traditional barrier option, or portfolio of such exotic options, might suffice to approximate the source of risk of interest to this trader. A group of DBAR contingent claims, in contrast, can be constructed to isolate this risk and present relatively transparent opportunities for hedging. A risk to be isolated is the distribution of possible outcomes for what barrier derivatives traders term the "first passage time," or, in this example, the first time that the yen/dollar exchange rate crosses 95 over the next three months.

The following illustration shows how such a group of DBAR contingent claims can be constructed to address this risk. In this example, it is assumed that all traders in the group of claims agree that the underlying exchange rate is lognormally distributed. This group of claims illustrates how traders would invest in states and thus express opinions regarding whether and when the forward yen/dollar exchange rate will cross a given barrier over the next 3 months:

Underlying Risk: Japanese/U.S. Dollar Yen Exchange Rate

Current Date: Sep. 15, 1999

Expiration: Forward Rate First Passage Time, as defined, between Sep. 16, 1999 to Dec. 16, 1999

Trading Start Date: Sep. 15, 1999

Trading End Date: Sep. 16, 1999

Barrier: 95

Spot JPY/USD: 104.68

Forward JPY/USD 103.268

Assumed (Illustrative) Market Volatility: 20% annualized

Aggregate Traded Amount: 10 million USD

TABLE 3.1.16-1

First Passage Time for Yen/Dollar Dec. 16, 1999 Forward Exchange Rate

| Time in Year Fractions | Invested in State ('000) | Return Per Unit if State Occurs |
|---|---|---|
| (0, .005] | 229.7379 | 42.52786 |
| (.005, .01] | 848.9024 | 10.77992 |
| (.01, .015] | 813.8007 | 11.28802 |
| (.015, .02] | 663.2165 | 14.07803 |
| (.02, .025] | 536.3282 | 17.6453 |
| (.025, .03] | 440.5172 | 21.70059 |
| (.03, .035] | 368.4647 | 26.13964 |
| (.035, .04] | 313.3813 | 30.91 |
| (.04, .045] | 270.4207 | 35.97942 |
| (.045, .05] | 236.2651 | 41.32534 |
| (.05, .075] | 850.2595 | 10.76112 |
| (.075, .1] | 540.0654 | 17.51627 |
| (.1, .125] | 381.3604 | 25.22191 |
| (.125, .15] | 287.6032 | 33.77013 |
| (.15, .175] | 226.8385 | 43.08423 |
| (.175, .2] | 184.8238 | 53.10558 |
| (.2, .225] | 154.3511 | 63.78734 |
| (.225, .25] | 131.4217 | 75.09094 |
| Did Not Hit Barrier | 2522.242 | 2.964727 |

As with other examples, and in preferred embodiments, actual trading will likely generate traded amounts and therefore returns that depart from the assumptions used to compute the illustrative returns for each state.

In addition to the straightforward multivariate events outlined above, demand-based markets or auctions can be used to create and trade digital options (as described in Sections 6 and 7) on calculated underlying events (including the events described in this Section 3), similar to those found in exotic derivatives. Many exotic derivatives are based on path-dependent outcomes such as the average of an underlying event over time, price thresholds, a multiple of the underlying, or some sort of time constraint. An additional example follows:

Path Dependent: Demand-based markets or auctions can be structured to trade DBAR contingent claims, including, for example, digital options, on an underlying event that is the subject of a calculation. For example, digital options traded in a demand-based market or auction could be based on an underlying event defined as the average price of yen/dollar exchange rate for the last quarter of 2001.

Example 3.1.17

Hedging Markets for Real Goods, Commodities and Services

Investment and capital budgeting choices faced by firms typically involve inherent economic risk (e.g., future demand for semiconductors), large capital investments (e.g., semiconductor fabrication capacity) and timing (e.g., a decision to invest in a plant now, or defer for some period of time). Many economists who study such decisions under uncertainty have recognized that such choices involve what they term "real options." This characterization indicates that the choice to invest now or to defer an investment in goods or services or a plant, for example, in the face of changing uncertainty and information, frequently entails risks similar to those encountered by traders who have invested in options which provide the opportunity to buy or sell an underlying asset in the capital markets. Many economists and investors recognize the importance of real options in capital budgeting decisions and of setting up markets to better manage their uncertainty and value. Natural resource and extractive industries, such as petroleum exploration and production, as well as industries requiring large capital investments such as technology manufacturing, are prime examples of industries where real options analysis is increasingly used and valued.

Groups of DBAR contingent claims according to the present invention can be used by firms within a given industry to better analyze capital budgeting decisions, including those involving real options. For example, a group of DBAR contingent claims can be established which provides hedging opportunities over the distribution of future semiconductor prices. Such a group of claims would allow producers of semiconductors to better hedge their capital budgeting decisions and provide information as to the market's expectation of future prices over the entire distribution of possible price outcomes. This information about the market's expectation of future prices could then also be used in the real options context in order to better evaluate capital budgeting decisions. Similarly, computer manufacturers could use such groups of DBAR contingent claims to hedge against adverse semiconductor price changes.

Information providing the basis for constructing an illustrative group of DBAR contingent claims on semiconductor prices is as follows:

Underlying Event: Semiconductor Monthly Sales
Index: Semiconductor Industry Association Monthly Global Sales Release
Current Date: Sep. 15, 1999
Last Release Date: Sep. 2, 1999
Last Release Month: July, 1999
Last Release Value: 11.55 Billion, USD
Next Release Date: Approx. Oct. 1, 1999
Next Release Month: August 1999
Trading Start Date: Sep. 2, 1999
Trading End Date: Sep. 30, 1999

For reasons of brevity, defined states and opening indicative or illustrative returns resulting from amounts invested in the various states for this example are not shown, but can be readily calculated or will emerge from actual trader investments according to the methods of the present invention, as illustrated in previous examples.

Groups of DBAR contingent claims according to the present invention can also be used to hedge arbitrary sources of risk due to price discovery processes. For example, firms involved in competitive bidding for goods or services, whether by sealed bid or open bid markets or auctions, can hedge their investments and other capital expended in preparing the bid by investing in states of a group of DBAR contingent claims comprising ranges of mutually exclusive and collectively exhaustive market or auction bids. In this way, the group of DBAR contingent claim serves as a kind of "meta-auction," and allows those who will be participating in the market or auction to invest in the distribution of possible market or auction outcomes, rather than simply waiting for the single outcome representing the market or auction result. Market or auction participants could thus hedge themselves against adverse market or auction developments and outcomes, and, importantly, have access to the entire probability distribution of bids (at least at one point in time) before submitting a bid into the real market or auction. Thus, a group of DBAR claims could be used to provide market data over the entire distribution of possible bids. Preferred embodiments of the present invention thus can help avoid the so-called Winner's Curse phenomenon known to economists, whereby market or auction participants fail rationally to take account of the information on the likely bids of their market or auction competitors.

Demand-based markets or auctions can be structured to offer a wide variety of products related to commodities such as fuels, chemicals, base metals, precious metals, agricultural products, etc. The following examples provide a further representative sampling:

Fuels: Demand-based markets or auctions can be based on measures related to various fuel sources. For example, DBAR contingent claims, including, e.g., digital options, can be based on an underlying event defined as the price of natural gas in Btu's delivered to the Henry Hub, Louisiana.

Chemicals: Demand-based markets or auctions can be based on measures related to a variety of other chemicals. For example, DBAR contingent claims, including, e.g., digital options, can be based on an underlying event defined as the price of polyethylene.

Base Metals: Demand-based markets or auctions can be based on measures related to various precious metals. For example, DBAR contingent claims, including, e.g., digital options, can be based on an underlying event defined as the price per gross ton of #1 Heavy Melt Scrap Iron.

Precious Metals: Demand-based markets or auctions can be based on measures related to various precious metals. For example, DBAR contingent claims, including, e.g., digital options, can be based on an underlying event defined as the price per troy ounce of Platinum delivered to an approved storage facility.

Agricultural Products: Demand-based markets or auctions can be based on measures related to various agricultural products. For example, DBAR contingent claims, including, e.g., digital options, can be based on an underlying event defined as the price per bushel of #2 yellow corn delivered at the Chicago Switching District.

Example 3.1.18

DBAR Hedging

Another feature of the systems and methods of the present invention is the relative ease with which traders can hedge risky exposures. In the following example, it is assumed that a group of DBAR contingent claims has two states (state 1 and state 2, or $s_1$ or $s_2$), and amounts $T_1$, and $T_2$ are invested in state 1 and state 2, respectively. The unit payout $\pi_1$ for state 1 is therefore $T_2/T_1$ and for state 2 it is $T_1/T_2$. If a trader then invests amount $\alpha_1$ in state 1, and state 1 then occurs, the trader in this example would receive the following payouts, P, indexed by the appropriate state subscripts:

$$P_1 = \alpha_1 * \left(\frac{T_2}{T_1 + \alpha_1} + 1\right)$$

If state 2 occurs the trader would receive $$P_2 = 0$$

If, at some point during the trading period, the trader desires to hedge his exposure, the investment in state 2 to do so is calculated as follows:

$$\alpha_2 = \frac{\alpha_1 * T_2}{T_1}$$

This is found by equating the state payouts with the proposed hedge trade, as follows:

$$P_1 = \alpha_1 * \left(\frac{T_2 + \alpha_2}{T_1 + \alpha_1} + 1\right) = P_2 = \alpha_2 * \left(\frac{T_1 + \alpha_1}{T_2 + \alpha_2} + 1\right)$$

Compared to the calculation required to hedge traditional derivatives, these expressions show that, in appropriate groups of DBAR contingent claims of the present invention, calculating and implementing hedges can be relatively straightforward.

The hedge ratio, $\alpha_2$, just computed for a simple two state example can be adapted to a group of DBAR contingent claims which is defined over more than two states. In a preferred embodiment of a group of DBAR contingent claims, the existing investments in states to be hedged can be distinguished from the states on which a future hedge investment is to be made. The latter states can be called the "complement" states, since they comprise all the states that can occur other than those in which investment by a trader has already been made, i.e., they are complementary to the invested states. A multi-state hedge in a preferred embodiment includes two steps: (1) determining the amount of the hedge investment in the complement states, and (2) given the amount so determined, allocating the amount among the complement states. The amount of the hedge investment in the complement states pursuant to the first step is calculated as:

$$\alpha_C = \frac{\alpha_H * T_C}{T_H}$$

where $\alpha_C$ is amount of the hedge investment in the complement states, $\alpha_H$ is the amount of the existing investment in the states to be hedged, $T_C$ is the existing amount invested in the complement states, and $T_H$ is the amount invested the states to be hedged, exclusive of $\alpha_H$. The second step involves allocating the hedge investment among the complement states, which can be done by allocating $\alpha_c$ among the complement states in proportion to the existing amounts already invested in each of those states.

An example of a four-state group of DBAR contingent claims according to the present invention illustrates this two-step hedging process. For purposes of this example, the following assumptions are made: (i) there are four states, numbered 1 through 4, respectively; (ii) \$50, \$80, \$70 and \$40 is invested in each state, (iii) a trader has previously placed a multi-state investment in the amount of \$10 ($\alpha_H$ as defined above) for states 1 and 2; and (iv) the allocation of this multi-state investment in states 1 and 2 is \$3.8462 and \$6.15385, respectively. The amounts invested in each state, excluding the trader's invested amounts, are therefore \$46.1538, \$73.84615, \$70, and \$40 for states 1 through 4, respectively. It is noted that the amount invested in the states to be hedged, i.e., states 1 and 2, exclusive of the multi-state investment of \$10, is the quantity $T_H$ as defined above.

The first step in a preferred embodiment of the two-step hedging process is to compute the amount of the hedge investment to be made in the complement states. As derived above, the amount of the new hedge investment is equal to the amount of the existing investment multiplied by the ratio of the amount invested in the complement states to the amount invested in the states to be hedged, excluding the trader's existing trades, i.e., \$10*(\$70+\$40)/(\$46.1538+\$73.84615)

=$9.16667. The second step in this process is to allocate this amount between the two complement states, i.e., states 3 and 4.

Following the procedures discussed above for allocating multi-state investments, the complement state allocation is accomplished by allocating the hedge investment amount—-$9.16667 in this example—in proportion to the existing amount previously invested in the complement states, i.e., $9.16667*$70/$110=$5.83333 for state 3 and $9.16667*$40/$110=$3.3333 for state 4. Thus, in this example, the trader now has the following amounts invested in states 1 through 4: ($3.8462, $6.15385, $5.8333, $3.3333); the total amount invested in each of the four states is $50, $80, $75.83333, and $43.3333); and the returns for each of the four states, based on the total amount invested in each of the four states, would be, respectively, (3.98333, 2.1146, 2.2857, and 4.75). In this example, if state 1 occurs the trader will receive a payout, including the amount invested in state 1, of 3.98333*$3.8462+$3.8462=$19.1667 which is equal to the sum invested, so the trader is fully hedged against the occurrence of state 1. Calculations for the other states yield the same results, so that the trader in this example would be fully hedged irrespective of which state occurs.

As returns can be expected to change throughout the trading period, the trader would correspondingly need to rebalance both the amount of his hedge investment for the complement states as well as the multi-state allocation among the complement states. In a preferred embodiment, a DBAR contingent claim exchange can be responsible for reallocating multi-state trades via a suspense account, for example, so the trader can assign the duty of reallocating the multi-state investment to the exchange. Similarly, the trader can also assign to an exchange the responsibility of determining the amount of the hedge investment in the complement states especially as returns change as a result of trading. The calculation and allocation of this amount can be done by the exchange in a similar fashion to the way the exchange reallocates multi-state trades to constituent states as investment amounts change.

Example 3.1.19

Quasi-Continuous Trading

Preferred embodiments of the systems and methods of the present invention include a trading period during which returns adjust among defined states for a group of DBAR contingent claims, and a later observation period during which the outcome is ascertained for the event on which the group of claims is based. In preferred embodiments, returns are allocated to the occurrence of a state based on the final distribution of amounts invested over all the states at the end of the trading period. Thus, in each embodiments a trader will not know his returns to a given state with certainty until the end of a given trading period. The changes in returns or "price discovery" which occur during the trading period prior to "locking-in" the final returns may provide useful information as to trader expectations regarding finalized outcomes, even though they are only indications as to what the final returns are going to be. Thus, in some preferred embodiments, a trader may not be able to realize profits or losses during the trading period. The hedging illustration of Example 3.1.18, for instance, provides an example of risk reduction but not of locking-in or realizing profit and loss.

In other preferred embodiments, a quasi-continuous market for trading in a group of DBAR contingent claims may be created. In preferred embodiments, a plurality of recurring trading periods may provide traders with nearly continuous opportunities to realize profit and loss. In one such embodiment, the end of one trading period is immediately followed by the opening of a new trading period, and the final invested amount and state returns for a prior trading period are "locked in" as that period ends, and are allocated accordingly when the outcome of the relevant event is later known. As a new trading period begins on the group of DBAR contingent claims related to the same underlying event, a new distribution of invested amounts for states can emerge along with a corresponding new distribution of state returns. In such embodiments, as the successive trading periods are made to open and close more frequently, a quasi-continuous market can be obtained, enabling traders to hedge and realize profit and loss as frequently as they currently do in the traditional markets.

An example illustrates how this feature of the present invention may be implemented. The example illustrates the hedging of a European digital call option on the yen/dollar exchange rate (a traditional market option) over a two day period during which the underlying exchange rate changes by one yen per dollar. In this example, two trading periods are assumed for the group of DBAR contingent claims Traditional Option: European Digital Option
Payout of Option: Pays 100 million USD if exchange rate equals or exceeds strike price at maturity or expiration
Underlying Index: Yen/dollar exchange rate
Option Start: Aug. 12, 1999
Option Expiration: Aug. 15, 2000
Assumed Volatility: 20% annualized
Strike Price: 120
Notional: 100 million USD In this example, two dates are analyzed, Aug. 12, 1999 and Aug. 13, 1999:

TABLE 3.1.19-1

Change in Traditional Digital Call Option Value Over Two Days

| Observation Date | Aug. 12, 1999 | Aug. 13, 1999 |
|---|---|---|
| Spot Settlement Date | Aug. 16, 1999 | Aug. 17, 1999 |
| Spot Price for Settlement Date | 115.55 | 116.55 |
| Forward Settlement Date | Aug. 15, 2000 | Aug. 15, 2000 |
| Forward Price | 109.217107 | 110.1779 |
| Option Premium | 28.333% of Notional | 29.8137% of Notional |

Table 3.1.19-1 shows how the digital call option struck at 120 could, as an example, change in value with an underlying change in the yen/dollar exchange rate. The second column shows that the option is worth 28.333% or $28.333 million on a $100 million notional on Aug. 12, 1999 when the underlying exchange rate is 115.55. The third column shows that the value of the option, which pays $100 million should dollar yen equal or exceed 120 at the expiration date, increases to 29.8137% or $29.8137 million per $100 million when the underlying exchange rate has increased by 1 yen to 116.55. Thus, the traditional digital call option generates a profit of $29.81377−$28.333=$1.48077 million.

This example shows how this profit also could be realized in trading in a group of DBAR contingent claims with two successive trading periods. It is also assumed for purposes of this example that there are sufficient amounts invested, or liquidity, in both states such that the particular trader's investment does not materially affect the returns to each state. This is a convenient but not necessary assumption that allows the trader to take the returns to each state "as given" without concern as to how his investment will affect the closing returns for a given trading period. Using information from Table 3.1.19-1, the following closing returns for each state can be derived:

Trading Period 1:

Current trading period end date: Aug. 12, 1999

Underlying Event: Closing level of yen/dollar exchange rate for Aug. 15, 2000 settlement, 4 pm EDT Spot Price for Aug. 16, 1999 Settlement: 115.55

| State | JPY/ USD < 120 for for Aug. 15, 2000 | JPY/USD ≧ 120 for Aug. 15, 2000 |
|---|---|---|
| Closing Returns | 0.39533 | 2.5295 |

For purposes of this example, it is assumed that an illustrative trader has $28.333 million invested in the state that the yen/dollar exchange rate equals or exceeds 120 for Aug. 15, 2000 settlement.

Trading Period 2:

Current trading period end date: Aug. 13, 1999

Underlying Event: Closing level of dollar/yen exchange rate for Aug. 15, 2000 settlement, 4 pm EDT Spot Price for Aug. 17, 1999 Settlement: 116.55

| State | JPY/ USD < 120 for Aug. 15, 2000 | JPY/USD ≧ 120 for Aug. 15, 2000 |
|---|---|---|
| Closing State Returns | .424773 | 2.3542 |

For purposes of this example, it is also assumed that the illustrative trader has a $70.18755 million hedging investment in the state that the yen/dollar exchange rate is less than 120 for Aug. 15, 2000 settlement. It is noted that, for the second period, the closing returns are lower for the state that the exchange equals or exceeds 120. This is due to the change represented in Table 3.1.19-1 reflecting an assumed change in the underlying market, which would make that state more likely.

The trader now has an investment in each trading period and has locked in a profit of $1.4807 million, as shown below:

| State | JPY/USD < 120 for Aug. 15, 2000 | JPY/USD ≧ 120 for Aug. 15, 2000 |
|---|---|---|
| Profit and Loss (000.000) | $70.18755*.424773 − $28.333 = $1.48077 | $−70.18755 + 28.333* $2.5295 = $1.48077 |

The illustrative trader in this example has therefore been able to lock-in or realize the profit no matter which state finally occurs. This profit is identical to the profit realized in the traditional digital option, illustrating that systems and methods of the present invention can be used to provide at least daily if not more frequent realization of profits and losses, or that risks can be hedged in virtually real time.

In preferred embodiments, a quasi-continuous time hedge can be accomplished, in general, by the following hedge investment, assuming the effect of the size of the hedge trade does not materially effect the returns:

$$H = \alpha_t * \frac{1 + r_t}{1 + r^c_{t+1}}$$

where $r_t$=closing returns a state in which an investment was originally made at time t $\alpha_t$=amount originally invested in the state at time t $r^c_{t+1}$=closing returns at time t+1 to state or states other than the state in which the original investment was made (i.e., the so-called complement states which are all states other than the state or states originally traded which are to be hedged)

H=the amount of the hedge investment

If H is to be invested in more than one state, then a multi-state allocation among the constituent states can be performed using the methods and procedures described above. This expression for H allows investors in DBAR contingent claims to calculate the investment amounts for hedging transactions. In the traditional markets, such calculations are often complex and quite difficult.

Example 3.1.20

Value Units for Investments and Payouts

As previously discussed in this specification, the units of investments and payouts used in embodiments of the present invention can be any unit of economic value recognized by investors, including, for example, currencies, commodities, number of shares, quantities of indices, amounts of swap transactions, or amounts of real estate. The invested amounts and payouts need not be in the same units and can comprise a group or combination of such units, for example 25% gold, 25% barrels of oil, and 50% Japanese Yen. The previous examples in this specification have generally used U.S. dollars as the value units for investments and payouts.

This Example 3.1.20 illustrates a group of DBAR contingent claims for a common stock in which the invested units and payouts are defined in quantities of shares. For this example, the terms and conditions of Example 3.1.1 are generally used for the group of contingent claims on MSFT common stock, except for purposes of brevity, only three states are presented in this Example 3.1.20: (0,83], (83, 88], and (88,∞]. Also in this Example 3.1.20, invested amounts are in numbers of shares for each state and the exchange makes the conversion for the trader at the market price prevailing at the time of the investment. In this example, payouts are made according to a canonical DRF in which a trader receives a quantity of shares equal to the number of shares invested in states that did not occur, in proportion to the ratio of number of shares the trader has invested in the state that did occur, divided by the total number of shares invested in that state. An indicative distribution of trader demand in units of number of shares is shown below, assuming that the total traded amount is 100,000 shares:

| State | Amount Traded in Number of Share | Return Per Share if State Occurs Unit Returns in Number of Shares |
|---|---|---|
| (0, 83] | 17,803 | 4.617 |
| (83, 88] | 72,725 | .37504 |
| (88, ∞] | 9,472 | 9.5574 |

If, for instance, MSFT closes at 91 at expiration, then in this example the third state has occurred, and a trader who had previously invested 10 shares in that state would receive a payout of 10*9.5574+10=105.574 shares which includes the trader's original investment. Traders who had previously invested in the other two states would lose all of their shares upon application of the canonical DRF of this example.

An important feature of investing in value units other than units of currency is that the magnitude of the observed outcome may well be relevant, as well as the state that occurs based on that outcome. For example, if the investments in this example were made in dollars, the trader who has a dollar invested in state (88,∞] would not care, at least in theory, whether the final price of MSFT at the close of the observation period were 89 or 500. However, if the value units are numbers of shares of stock, then the magnitude of the final outcome does matter, since the trader receives as a payout a number of shares which can be converted to more dollars at a higher outcome price of $91 per share. For instance, for a payout of 105.574 shares, these shares are worth 105.574*$91=$9,607.23 at the outcome price. Had the outcome price been $125, these shares would have been worth 105.574*125=$13,196.75.

A group of DBAR contingent claims using value units of commodity having a price can therefore possess additional features compared to groups of DBAR contingent claims that offer fixed payouts for a state, regardless of the magnitude of the outcome within that state. These features may prove useful in constructing groups of DBAR contingent claims which are able to readily provide risk and return profiles similar to those provided by traditional derivatives. For example, the group of DBAR contingent claims described in this example could be of great interest to traders who transact in traditional derivatives known as "asset-or-nothing digital options" and "supershares options."

Example 3.1.21

Replication of an Arbitrary Payout Distribution

An advantage of the systems and methods of the present invention is that, in preferred embodiments, traders can generate an arbitrary distribution of payouts across the distribution of defined states for a group of DBAR contingent claims. The ability to generate a customized payout distribution may be important to traders, since they may desire to replicate contingent claims payouts that are commonly found in traditional markets, such as those corresponding to long positions in stocks, short positions in bonds, short options positions in foreign exchange, and long option straddle positions, to cite just a few examples. In addition, preferred embodiments of the present invention may enable replicated distributions of payouts which can only be generated with difficulty and expense in traditional markets, such as the distribution of payouts for a long position in a stock that is subject to being "stopped out" by having a market-maker sell the stock when it reaches a certain price below the market price. Such stop-loss orders are notoriously difficult to execute in traditional markets, and traders are frequently not guaranteed that the execution will occur exactly at the pre-specified price.

In preferred embodiments, and as discussed above, the generation and replication of arbitrary payout distributions across a given distribution of states for a group of DBAR contingent claims may be achieved through the use of multi-state investments. In such embodiments, before making an investment, traders can specify a desired payout for each state or some of the states in a given distribution of states. These payouts form a distribution of desired payouts across the distribution of states for the group of DBAR contingent claims. In preferred embodiments, the distribution of desired payouts may be stored by an exchange, which may also calculate, given an existing distribution of investments across the distribution of states, (1) the total amount required to be invested to achieve the desired payout distribution; (2) the states into which the investment is to allocated; and (3) how much is to be invested in each state so that the desired payout distribution can be achieved. In preferred embodiments, this multi-state investment is entered into a suspense account maintained by the exchange, which reallocates the investment among the states as the amounts invested change across the distribution of states. In preferred embodiments, as discussed above, a final allocation is made at the end of the trading period when returns are finalized.

The discussion in this specification of multi-state investments has included examples in which it has been assumed that an illustrative trader desires a payout which is the same no matter which state occurs among the constituent states of a multi-state investment. To achieve this result, in preferred embodiments the amount invested by the trader in the multi-state investment can be allocated to the constituent state in proportion to the amounts that have otherwise been invested in the respective constituent states. In preferred embodiments, these investments are reallocated using the same procedure throughout the trading period as the relative proportion of amounts invested in the constituent states changes.

In other preferred embodiments, a trader may make a multi-state investment in which the multi-state allocation is not intended to generate the same payout irrespective of which state among the constituent state occurs. Rather, in such embodiments, the multi-state investment may be intended to generate a payout distribution which matches some other desired payout distribution of the trader across the distribution of states, such as, for example, for certain digital strips, as discussed in Section 6. Thus, the systems and methods of the present invention do not require amounts invested in multi-state investments to be allocated in proportion of the amounts otherwise invested in the constituent states of the multi-statement investment.

Notation previously developed in this specification is used to describe a preferred embodiment of a method by which replication of an arbitrary distribution of payouts can be achieved for a group of DBAR contingent claims according to the present invention. The following additional notation, is also used:

- $A_{i,*}$ denotes the i-th row of the matrix A containing the invested amounts by trader i for each of the n states of the group of DBAR contingent claims In preferred embodiments, the allocation of amounts invested in all the states which achieves the desired payouts across the distribution of states can be calculated using, for example, the computer code listing in Table 1 (or functional equivalents known to one of skill in the art), or, in the case where a trader's multi-state investment is small relative to the total investments already made in the group of DBAR contingent claims, the following approximation:

$$A_{i,*}^T = \Pi^{-1} * P_{i,*}^T$$

where the −1 superscript on the matrix Π denotes a matrix inverse operation. Thus, in these embodiments, amounts to be invested to produce an arbitrary distribution payouts can approximately be found by multiplying (a) the inverse of a diagonal matrix with the unit payouts for each state on the diagonal (where the unit payouts are determined from the amounts invested at any given time in the trading period) and (b) a vector containing the trader's desired payouts. The equation above shows that the amounts to be invested in order to produce a desired payout distribution are a function of the desired payout distribution itself ($P_{i,*}$) and the amounts otherwise invested across the distribution of states (which are used to form the matrix $\Pi$, which contains the payouts per unit along its diagonals and zeroes along the off-diagonals). Therefore, in preferred embodiments, the allocation of the amounts to be invested in each state will change if either the desired payouts change or if the amounts otherwise invested across the distribution change. As the amounts otherwise invested in various states can be expected to change during the course of a trading period, in preferred embodiments a suspense account is used to reallocate the invested amounts, $A_{i,*}$, in response to these changes, as described previously. In preferred embodiments, at the end of the trading period a final allocation is made using the amounts otherwise invested across the distribution of states. The final allocation can typically be performed using the iterative quadratic solution techniques embodied in the computer code listing in Table 1.

Example 3.1.21 illustrates a methodology for generating an arbitrary payout distribution, using the event, termination criteria, the defined states, trading period and other relevant information, as appropriate, from Example 3.1.1, and assuming that the desired multi-state investment is small in relation to the total amount of investments already made. In Example 3.1.1 above, illustrative investments are shown across the distribution of states representing possible closing prices for MSFT stock on the expiration date of Aug. 19, 1999. In that example, the distribution of investment is illustrated for Aug. 18, 1999, one day prior to expiration, and the price of MSFT on this date is given as 85. For purposes of this Example 3.1.21, it is assumed that a trader would like to invest in a group of DBAR contingent claims according to the present invention in a way that approximately replicates the profits and losses that would result from owning one share of MSFT (i.e., a relatively small amount) between the prices of 80 and 90. In other words, it is assumed that the trader would like to replicate a traditional long position in MSFT with the restrictions that a sell order is to be executed when MSFT reaches 80 or 90. Thus, for example, if MSFT closes at 87 on Aug. 19, 1999 the trader would expect to have $2 of profit from appropriate investments in a group of DBAR contingent claims. Using the defined states identified in Example 3.1.1, this profit would be approximate since the states are defined to include a range of discrete possible closing prices.

In preferred embodiments, an investment in a state receives the same return regardless of the actual outcome within the state. It is therefore assumed for purposes of this Example 3.1.21 that a trader would accept an appropriate replication of the traditional profit and loss from a traditional position, subject to only "discretization" error. For purposes of this Example 3.1.21, and in preferred embodiments, it is assumed that the profit and loss corresponding to an actual outcome within a state is determined with reference to the price which falls exactly in between the upper and lower bounds of the state as measured in units of probability, i.e., the "state average." For this Example 3.1.21, the following desired payouts can be calculated for each of the states the amounts to be invested in each state and the resulting investment amounts to achieve those payouts:

TABLE 3.1.21-1

| States | State Average ($) | Desired Payout ($) | Investment Which Generates Desired Payout ($) |
|---|---|---|---|
| (0, 80] | NA | 80 | 0.837258 |
| (80, 80.5] | 80.33673 | 80.33673 | 0.699493 |
| (80.5, 81] | 80.83349 | 80.83349 | 1.14091 |
| (81, 81.5] | 81.33029 | 81.33029 | 1.755077 |
| (81.5, 82] | 81.82712 | 81.82712 | 2.549131 |
| (82, 82.5] | 82.32401 | 82.32401 | 3.498683 |
| (82.5, 83] | 82.82094 | 82.82094 | 4.543112 |
| (83, 83.5] | 83.31792 | 83.31792 | 5.588056 |
| (83.5, 84] | 83.81496 | 83.81496 | 6.512429 |
| (84, 84.5] | 84.31204 | 84.31204 | 7.206157 |
| (84.5, 85] | 84.80918 | 84.80918 | 7.572248 |
| (85, 85.5] | 85.30638 | 85.30638 | 7.555924 |
| (85.5, 86] | 85.80363 | 85.80363 | 7.18022 |
| (86, 86.5] | 86.30094 | 86.30094 | 6.493675 |
| (86.5, 87] | 86.7983 | 86.7983 | 5.59628 |
| (87, 87.5] | 87.29572 | 87.29572 | 4.599353 |
| (87.5, 88] | 87.7932 | 87.7932 | 3.611403 |
| (88, 88.5] | 88.29074 | 88.29074 | 2.706645 |
| (88.5, 89] | 88.78834 | 88.78834 | 1.939457 |
| (89, 89.5] | 89 .28599 | 89.28599 | 1.330046 |
| (89.5, 90] | 89.7837 | 89.7837 | 0.873212 |
| (90, ∞] | NA | 90 | 1.2795 |

The far right column of Table 3.1.21-1 is the result of the matrix computation described above. The payouts used to construct the matrix $\Pi$ for this Example 3.1.21 are one plus the returns shown in Example 3.1.1 for each state.

Pertinently the systems and methods of the present invention may be used to achieve almost any arbitrary payout or return profile, e.g., a long position, a short position, an option "straddle", etc., while maintaining limited liability and the other benefits of the invention described in this specification.

As discussed above, if many traders make multi-state investments, in a preferred embodiment an iterative procedure is used to allocate all of the multi-state investments to their respective constituent states. Computer code, as previously described and apparent to one of skill in the art, can be implemented to allocate each multi-state investment among the constituent states depending upon the distribution of amounts otherwise invested and the trader's desired payout distribution.

Example 3.1.22

Emerging Market Currencies

Corporate and investment portfolio managers recognize the utility of options to hedge exposures to foreign exchange movements. In the G7 currencies, liquid spot and forward markets support an extremely efficient options market. In contrast, many emerging market currencies lack the liquidity to support efficient, liquid spot and forward markets because of their small economic base. Without ready access to a source of tradable underlying supply, pricing and risk control of options in emerging market currencies are difficult or impossible.

Governmental intervention and credit constraints further inhibit transaction flows in emerging market currencies. Certain governments choose to restrict the convertibility of their currency for a variety of reasons, thus reducing access to liquidity at any price and effectively preventing option market-makers from gaining access to a tradable underlying supply. Mismatches between sources of local liquidity and creditworthy counterparties further restrict access to a tradable underlying supply. Regional banks that service local customers have access to indigenous liquidity but poor credit ratings while multinational commercial and investment banks with superior credit ratings have limited access to liquidity. Because credit considerations prevent external market participants from taking on significant exposures to local counterparties, transaction choices are limited.

The foreign exchange market has responded to this lack of liquidity by making use of non-deliverable forwards (NDFs) which, by definition, do not require an exchange of underlying currency. Although NDFs have met with some success, their utility is still constrained by a lack of liquidity. Moreover, the limited liquidity available to NDFs is generally insufficient to support an active options market.

Groups of DBAR contingent claims can be structured using the system and methods of the present invention to support an active options market in emerging market currencies.

In addition to the general advantages of the demand-based trading system, products on emerging market currencies will provide the following new opportunities for trading and risk management:

(1) Credit enhancement. An investment bank can use demand-based trading emerging market currency products to overcome existing credit barriers. The ability of a demand-based market or auction to process only buy orders, combined with the limited liability of option payout profiles (vs. forward contracts), allows banks to precisely define the limits of their counterparty credit exposure and, hence, to trade with local market institutions, increasing participation and liquidity.

Example 3.1.23

Central Bank Target Rates

Portfolio managers and market-makers formulate market views based in part on their forecasts for future movements in central bank target rates. When the Federal Reserve (Fed), European Central Bank (ECB) or Bank of Japan (BOJ), for example, changes their target rate or when market participants adjust their expectations about future rate moves, global equity and fixed income financial markets can react quickly and dramatically.

Market participants currently take views on central bank target rates by trading 3-month interest rate futures, such as Eurodollar futures for the Fed and Euribor futures for the ECB. Although these markets are quite liquid, significant risks impair trading in such contracts: futures contracts have a 3-month maturity while central bank target rates change overnight; and models for credit spreads and term structure are required for futures pricing. Market participants additionally express views on the target Fed funds rate by trading Fed funds futures, which are based on the overnight Fed funds rate. Although less risky than Eurodollar futures, significant risks also impair trading in Fed funds futures: the overnight Fed funds rate can differ, sometimes significantly, from the target Fed funds rate due to overnight liquidity spikes and month-end effects; and, Fed funds futures frequently cannot accommodate the full volumes that investment managers would like to execute at a given market price.

Groups of DBAR contingent claims can be structured using the system and methods of the present invention to develop an explicit mechanism by which market participants can express views regarding central bank target rates. For example, demand-based markets or auctions can be based on central bank policy parameters such as the Federal Reserve Target Fed Funds Rate, the Bank of Japan Official Discount Rate, or the Bank of England Base Rate. For example, the underlying event may be defined as the Federal Reserve Target Fed Funds Rate as of Jun. 1, 2002. Because demand-based trading products settle using the target rate of interest, maturity and credit mismatches no longer pose market barriers.

In addition to the general advantages of the demand-based trading system, products on central bank target rates may provide the following new advantages for trading and risk management:

(1) No basis risk. Since demand-based trading products settle using the target rate of interest, there is no maturity mismatch and no credit mismatch. Demand-based trading products for central bank target rates have no basis risk.

(2) An exact date match to central bank meetings. Demand-based trading products can be structured to allow investors to take views on specific meetings by matching the date of expiry of a contract with the date of the central bank meeting.

(3) A direct way to express views on intra-meeting moves. Demand-based trading products allow special tailoring so that portfolio managers can take a view on whether or not a central bank will change its target rate intra-meeting.

(4) Managing the event risk associated with a central bank meeting. Almost all market participants have portfolios that are significantly affected by shifts in target rates. Market participants can use demand-based trading options on central bank target rates to lower their portfolio's overall volatility.

(5) Managing short-term funding costs. Banks and large corporations often borrow short-term funds at a rate highly correlated with central bank target rates, e.g., U.S. banks borrow at a rate that closely follows target Fed funds. These institutions may better manage their funding costs using demand-based trading products on central bank rates.

Example 3.1.24

Weather

In recent years, market participants have expressed increasing interest in a market for derivative instruments related to weather as a means to insure against adverse weather outcomes. Despite greater recognition of the role of weather in economic activity, the market for weather derivatives has been relatively slow to develop. Market-makers in traditional over-the-counter markets often lack the means to redistribute their risk because of limited liquidity and lack of an underlying instrument. The market for weather derivatives is further hampered by poor price discovery.

A group of DBAR contingent claims can be constructed using the methods and systems of the present invention to provide market participants with a market price for the probability that a particular weather metric will be above or below a given level. For example, participants in a demand-based market or auction on cooling degree days (CDDs) or on heating degree days (HDDs) in New York from Nov. 1, 2001 through Mar. 31, 2002 may be able to see at a glance the market consensus price that cumulative CDDs or HDDs will exceed certain levels. The event observation could be specified as taking place at a preset location such as the Weather Bureau Army Navy Observation Station #14732. Alternatively, participants in a demand-based market or auction on wind-speed in Chicago may be able to see at a glance the market consensus price that cumulative wind-speeds will exceed certain levels.

Example 3.1.25

Financial Instruments

Demand-based markets or auctions can be structured to offer a wide variety of products on commonly offered financial instruments or structured financial products related to fixed income securities, equities, foreign exchange, interest rates, and indices, and any derivatives thereof. When the underlying economic event is a change (or degree of change) in a financial instrument or product, the possible outcomes can include changes which are positive, negative or equal to zero when there is no change, and amounts of each positive and negative change. The following examples provide a further representative sampling:

- Equity Prices: Demand-based markets or auctions can be structured to trade DBAR contingent claims, including, for example, digital options, based on prices for equity securities listed on recognized exchanges throughout the world. For example, DBAR contingent claims can be based on an underlying event defined as the closing price each week of Juniper Networks. The underlying event can also be defined using an alternative measure, such as the volume weighted average price during any day.
- Fixed Income Security Prices: Demand-based markets or auctions can be structured to trade DBAR contingent claims, including, for example, digital options, based on a variety of fixed income securities such as government T-bills, T-notes, and T-bonds, commercial paper, CD's, zero coupon bonds, corporate, and municipal bonds, and mortgage-backed securities. For example, DBAR contingent claims can be based on an underlying event defined as the closing price each week of Qwest Capital Funding 7¼% notes, due February of 2011. The underlying event can also be defined using an alternative measure, such as the volume weighted average price during any day. DBAR contingent claims on government and municipal obligations can be traded in a similar way.
- Hybrid Security Prices: Demand-based markets or auctions can be structured to trade DBAR contingent claims, including, for example, digital options, based on hybrid securities that contain both fixed-income and equity features, such as convertible bond prices. For example, DBAR contingent claims can be based on an underlying event defined as the closing price each week of Amazon.com 4¾% convertible bonds due February 2009. The underlying event can also be defined using an alternative measure, such as the volume weighted average price during any day.
- Interest Rates: Demand-based markets or auctions can be structured to trade DBAR contingent claims, including, for example, digital options, based on interest rate measures such as LIBOR and other money market rates, an index of AAA corporate bond yields, or any of the fixed income securities listed above. For example, DBAR contingent claims can be based on an underlying event defined as the fixing price each week of 3-month LIBOR rates. Alternatively, the underlying event could be defined as an average of an interest rate over a fixed length of time, such as a week or month.
- Foreign Exchange: Demand-based markets or auctions can be structured to trade DBAR contingent claims, including, for example, digital options, based on foreign exchange rates. For example, DBAR contingent claims can be based an underlying event defined as the exchange rate of the Korean Won on any day.
- Price & Return Indices: Demand-based markets or auctions can be structured to trade DBAR contingent claims, including, for example, digital options, based on a broad variety of financial instrument price indices, including those for equities (e.g., S&P 500), interest rates, commodities, etc. For example, DBAR contingent claims can be based on an underlying event defined as the closing price each quarter of the S&P Technology index. The underlying event can also be defined using an alternative measure, such as the volume weighted average price during any day. Alternatively, other index measurements can be used such as return instead of price.
- Swaps: Demand-based markets or auctions can be structured to trade DBAR contingent claims, including, for example, digital options, based on interest rate swaps and other swap based transactions. In this example, discussed further in an embodiment described in Section 9, digital options traded in a demand-based market or auction are based on an underlying event defined as the 10 year swap rate at which a fixed 10 year yield is received against paying a floating 3 month LIBOR rate. The rate may be determined using a common fixing convention.

Other derivatives on any security or other financial product or instrument may be used as the underlying instrument for an event of economic significance in a demand-based market or auction. For example, such derivatives can include futures, forwards, swaps, floating rate notes and other structured financial products. Alternatively, derivatives strategies, securities (as well as other financial products or instruments) and derivatives thereof can be converted into equivalent DBAR contingent claims or into replication sets of DBAR contingent claims, such as digitals (for example, as in the embodiments discussed in Sections 9 and 10) and traded as a demand-enabled product alongside DBAR contingent claims in the same demand-based market or auction.

3.2 DBAR Portfolios

It may be desirable to combine a number of groups of DBAR contingent claims based on different events into a single portfolio. In this way, traders can invest amounts within the distribution of defined states corresponding to a single event as well as across the distributions of states corresponding to all the groups of contingent claims in the portfolio. In preferred embodiments, the payouts to the amounts invested in this fashion can therefore be a function of a relative comparison of all the outcome states in the respective groups of DBAR contingent claims to each other. Such a comparison may be based upon the amount invested in each outcome state in the distribution for each group of contingent claims as well as other qualities, parameters or characteristics of the outcome state (e.g., the magnitude of change for each security underlying the respective groups of contingent claims). In this way, more complex and varied payout and return profiles can be achieved using the systems and methods of the present invention. Since a preferred embodiment of a demand reallocation function (DRF) can operate on a portfolio of DBAR contingent claims, such a portfolio is referred to as a DBAR Portfolio, or DBARP. A DBARP is a preferred embodiment of DBAR contingent claims according to the present invention based on a multi-state, multi-event DRF.

In a preferred embodiment of a DBARP involving different events relating to different financial products, a DRF is employed in which returns for each contingent claim in the portfolio are determined by (i) the actual magnitude of change for each underlying financial product and (ii) how much has been invested in each state in the distribution. A large amount invested in a financial product, such as a common stock, on the long side will depress the returns to defined states on the long side of a corresponding group of DBAR contingent claims. Given the inverse relationship in preferred embodiments between amounts invested in and returns from a particular state, one advantage to a DBAR portfolio is that it is not prone to speculative bubbles. More specifically, in preferred embodiments a massive influx of long side trading, for example, will increase the returns to short side states, thereby increasing returns and attracting investment in those states.

The following notation is used to explain further preferred embodiments of DBARP:

| | |
|---|---|
| $\mu_i$ | is the actual magnitude of change for financial product i |
| $W_i$ | is the amount of successful investments in financial product i |
| $L_i$ | is the amount of unsuccessful investments in financial product i |
| f | is the system transaction fee |
| L | is the aggregate losses $= \sum_i L_i$ |
| $\gamma_i$ | is the normalized returns for successful trades $= \frac{\lvert\mu_i\rvert}{\sum_i \lvert\mu_i\rvert}$ |
| $\pi^p_i$ | is the payout per value unit invested in financial product i for a successful investment |
| $r^p_i$ | is the return per unit invested in financial product i for a successful investment |

The payout principle of a preferred embodiment of a DBARP is to return to a successful investment a portion of aggregate losses scaled by the normalized return for the successful investment, and to return nothing to unsuccessful investments. Thus, in a preferred embodiment a large actual return on a relatively lightly traded financial product will benefit from being allocated a high proportion of the unsuccessful investments.

$$\pi_i^p = \frac{\gamma_i * L}{W_i}$$

$$r_i^p := \frac{\gamma_i * L}{W_i} - 1$$

As explained below, the correlations of returns across securities is important in preferred embodiments to determine payouts and returns in a DBARP.

An example illustrates the operation of a DBARP according to the present invention. For purposes of this example, it is assumed that a portfolio contains two stocks, IBM and MSFT (Microsoft) and that the following information applies (e.g., predetermined termination criteria):

Trading start date: Sep. 1, 1999
Expiration date: Oct. 1, 1999
Current trading period start date: Sep. 1, 1999
Current trading period end date: Sep. 5, 1999
Current date: Sep. 2, 1999
IBM start price: 129
MSFT start price: 96
Both IBM and MSFT Ex-dividends
No transaction fee In this example, states can be defined so that traders can invest for IBM and MSFT to either depreciate or appreciate over the period. It is also assumed that the distribution of amounts invested in the various states is the following at the close of trading for the current trading period:

| Financial Product | Depreciate State | Appreciate State |
|---|---|---|
| MSFT | $100 million | $120 million |
| IBM | $80 million | $65 million |

The amounts invested express greater probability assessments that MSFT will likely appreciate over the period and IBM will likely depreciate.

For purposes of this example, it is further assumed that on the expiration date of Oct. 1, 1999, the following actual outcomes for prices are observed:

MSFT: 106 (appreciated by 10.42%)
IBM 127 (depreciated by 1.55%)

In this example, there is $100+$65=$165 million to distribute from the unsuccessful investments to the successful investments, and, for the successful investments, the relative performance of MSFT (10/42/(10.42+1.55)=0.871) is higher than for IBM (1.55/10.42+1.55)=0.229). In a preferred embodiment, 87.1% of the available returns is allocated to the successful MSFT traders, with the remainder due the successful IBM traders, and with the following returns computed for each state:

MSFT: $120 million of successful investment produces a payout of 0.871*$165 million=$143.72 million for a return to the successful traders of $$\frac{120\text{ M} + 143.72\text{ M}}{120\text{ M}} - 1 = 119.77\%$$

IBM: $80 million in successful investment produces a payout of (1−0.871)*$165 million=$21.285 million, for a return to the successful traders of $$\frac{80\text{ M} + 21.285\text{ M}}{80\text{ M}} - 1 = 26.6\%$$

The returns in this example and in preferred embodiments are a function not only of the amounts invested in each group of DBAR contingent claims, but also the relative magnitude of the changes in prices for the underlying financial products or in the values of the underlying events of economic performance. In this specific example, the MSFT traders receive higher returns since MSFT significantly outperformed IBM. In other words, the MSFT longs were "more correct" than the IBM shorts.

The operation of a DBARP is further illustrated by assuming instead that the prices of both MSFT and IBM changed by the same magnitude, e.g., MSFT went up 10%, and IBM went down 10%, but otherwise maintaining the assumptions for this example. In this scenario, $165 million of returns would remain to distribute from the unsuccessful investments but these are allocated equally to MSFT and IBM successful investments, or $82.5 million to each. Under this scenario the returns are:

$$MSFT: \frac{120\text{ M} + 82.5\text{ M}}{120\text{ M}} - 1 = 68.75\%$$

$$IBM: \frac{80\text{ M} + 82.5\text{ M}}{80\text{ M}} - 1 = 103.125\%$$

The IBM returns in this scenario are 1.5 times the returns to the MFST investments, since less was invested in the IBM group of DBAR contingent claims than in the MSFT group.

This result confirms that preferred embodiments of the systems and methods of the present invention provide incentives for traders to make large investments, i.e. promote liquidity, where it is needed in order to have an aggregate amount invested sufficient to provide a fair indication of trader expectations.

The payouts in this example depend upon both the magnitude of change in the underlying stocks as well as the correlations between such changes. A statistical estimate of these expected changes and correlations can be made in order to compute expected returns and payouts during trading and at the close of each trading period. While making such an investment may be somewhat more complicated that in a DBAR range derivative, as discussed above, it is still readily apparent to one of skill in the art from this specification or from practice of the invention.

The preceding example of a DBARP has been illustrated with events corresponding to closing prices of underlying securities. DBARPs of the present invention are not so limited and may be applied to any events of economic significance, e.g., interest rates, economic statistics, commercial real estate rentals, etc. In addition, other types of DRFs for use with DBARPs are apparent to one of ordinary skill in the art, based on this specification or practice of the present invention.

4. RISK CALCULATIONS

Another advantage of the groups of DBAR contingent claims according to the present invention is the ability to provide transparent risk calculations to traders, market risk managers, and other interested parties. Such risks can include market risk and credit risk, which are discussed below.

4.1 Market Risk

Market risk calculations are typically performed so that traders have information regarding the probability distribution of profits and losses applicable to their portfolio of active trades. For all trades associated with a group of DBAR contingent claims, a trader might want to know, for example, the dollar loss associated with the bottom fifth percentile of profit and loss. The bottom fifth percentile corresponds to a loss amount which the trader knows, with a 95% statistical confidence, would not be exceeded. For the purposes of this specification, the loss amount associated with a given statistical confidence (e.g., 95%, 99%) for an individual investment is denoted the capital-at-risk ("CAR"). In preferred embodiments of the present invention, a CAR can be computed not only for an individual investment but also for a plurality of investments related to for the same event or for multiple events.

In the financial industry, there are three common methods that are currently employed to compute CAR: (1) Value-at-Risk ("VAR"); (2) Monte Carlo Simulation ("MCS"); and (3) Historical Simulation ("HS").

4.1.1 Capital-at-Risk Determinations Using Value-at-Risk Techniques

VAR is a method that commonly relies upon calculations of the standard deviations and correlations of price changes for a group of trades. These standard deviations and correlations are typically computed from historical data. The standard deviation data are typically used to compute the CAR for each trade individually.

To illustrate the use of VAR with a group of DBAR contingent claims of the present invention, the following assumptions are made: (i) a trader has made a traditional purchase of a stock, say $100 of IBM; (ii) using previously computed standard deviation data, it is determined that the annual standard deviation for IBM is 30%; (iii) as is commonly the case, the price changes for IBM have a normal distribution; and (iv) the percentile of loss to be used is the bottom fifth percentile. From standard normal tables, the bottom fifth percentile of loss corresponds to approximately 1.645 standard deviations, so the CAR in this example—that is, loss for the IBM position that would not be exceeded with 95% statistical confidence—is 30%*1.645*$100, or $49.35. A similar calculation, using similar assumptions, has been made for a $200 position in GM, and the CAR computed for GM is $65.50. If, in this example, the computed correlation, ζ, between the prices of IBM and GM stock is 0.5, the CAR for the portfolio containing both the IBM and GM positions may be expressed as:

$$CAR = \sqrt{\begin{matrix}(1.645\alpha_{IBM}\sigma_{IBM})^2 + (1.645\alpha_{GM}\sigma_{GM})^2 + \\ 2\varsigma 1.645\alpha_{IBM}\sigma_{IBM} * 1.645\alpha_{GM}\sigma_{GM}\end{matrix}} = \sqrt{\begin{matrix}49.35^2 + 65.50^2 + \\ 2*.5*49.35*65.5\end{matrix}} = 99.79$$

where α is the investment in dollars, σ is the standard deviation, and ζ is the correlation.

These computations are commonly represented in matrix form as:

C is the correlation matrix of the underlying events, w is the vector containing the CAR for each active position in the portfolio, and $w^T$ is the transpose of W.

In preferred embodiments, C is a y×y matrix, where y is the number of active positions in the portfolio, and where the elements of C are:

$c_{i,j}=1$ when i=j i.e., has 1's on the diagonal, and otherwise $c_{i,j}$=the correlation between the ith and jth events $$CAR = \sqrt{w^T * C * w} = \sqrt{(49.35 \quad 65.5)\begin{pmatrix}1 & .5\\ .5 & 1\end{pmatrix}\begin{pmatrix}49.35\\ 65.5\end{pmatrix}}$$

In preferred embodiments, several steps implement the VAR methodology for a group of DBAR contingent claims of the present invention. The steps are first listed, and details of each step are then provided. The steps are as follows:

(1) beginning with a distribution of defined states for a group of DBAR contingent claims, computing the standard deviation of returns in value units (e.g., dollars) for each investment in a given state;

(2) performing a matrix calculation using the standard deviation of returns for each state and the correlation matrix of returns for the states within the same distribution of states, to obtain the standard deviation of returns for all investments in a group of DBAR contingent claims;

(3) adjusting the number resulting from the computation in step (2) for each investment so that it corresponds to the desired percentile of loss;

(4) arranging the numbers resulting from step (3) for each distinct DBAR contingent claim in the portfolio into a vector, w, having dimension equal to the number of distinct DBAR contingent claims;

(5) creating a correlation matrix including the correlation of each pair of the underlying events for each respective DBAR contingent claim in the portfolio; and (6) calculating the square root of the product of w, the correlation matrix created in step (5), and the transpose of w.

The result is CAR using the desired percentile of loss, for all the groups of DBAR contingent claims in the portfolio.

In preferred embodiments, the VAR methodology of steps (1)-(6) above can be applied to an arbitrary group of DBAR contingent claims as follows. For purposes of illustrating this methodology, it is assumed that all investments are made in DBAR range derivatives using a canonical DRF as previously described. Similar analyses apply to other forms of DRFs.

In step (1), the standard deviation of returns per unit of amount invested for each state i for each group of DBAR contingent claim is computed as follows:

$$\sigma_i = \sqrt{\frac{T}{T_i} - 1} = \sqrt{\frac{(1-q_i)}{q_i}} = \sqrt{r_i}$$

where $\sigma_i$ is the standard deviation of returns per unit of amount invested in each state i, $T_i$ is the total amount invested in state i; T is the sum of all amounts invested across the distribution of states; $q_i$ is the implied probability of the occurrence of state i derived from T and $T_i$; and $r_i$ is the return per unit of investment in state i. In this preferred embodiment, this standard deviation is a function of the amount invested in each state and total amount invested across the distribution of states, and is also equal to the square root of the unit return for the state. If $\alpha_i$ is the amount invested in state i, $\alpha_i*\sigma_i$ is the standard deviation in units of the amount invested (e.g., dollars) for each state i.

Step (2) computes the standard deviation for all investments in a group of DBAR contingent claims. This step (2) begins by calculating the correlation between each pair of states for every possible pair within the same distribution of states for a group of DBAR contingent claims. For a canonical DRF, these correlations may be computed as follows:

$$\rho_{i,j} = -\frac{\sqrt{T_i * T_j}}{\sqrt{(T-T_i)*(T-T_j)}} = -\sqrt{\frac{q_i * q_j}{(1-q_i)*(1-q_j)}} = \frac{-1}{\sqrt{r_i * r_j}} = \frac{-1}{\sigma_i * \sigma_j}$$

where $\rho_{i,j}$ is the correlation between state i and state j. In preferred embodiments, the returns to each state are negatively correlated since the occurrence of one state (a successful investment) precludes the occurrence of other states (unsuccessful investments). If there are only two states in the distribution of states, then $T_j=T-T_i$ and the correlation $\rho_{i,j}$ is −1, i.e., an investment in state i is successful and in state j is not, or vice versa, if i and j are the only two states. In preferred embodiments where there are more than two states, the correlation falls in the range between 0 and −1 (the correlation is exactly 0 if and only if one of the states has implied probability equal to one). In step (2) of the VAR methodology, the correlation coefficients $\rho_{i,j}$ are put into a matrix $C_s$ (the subscript s indicating correlation among states for the same event) which contains a number of rows and columns equal to the number of defined states for the group of DBAR contingent claims. The correlation matrix contains 1's along the diagonal, is symmetric, and the element at the i-th row and j-th column of the matrix is equal to $\rho_{i,j}$. From step (1) above, a n×1 vector U is constructed having a dimension equal to the number of states n, in the group of DBAR contingent claims, with each element of U being equal to $\alpha_i*\sigma_i$. The standard deviation, $w_k$, of returns for all investments in states within the distribution of states defining the kth group of DBAR contingent claims can be calculated as follows:

$$w_k = \sqrt{U^T * C_s * U}$$

Step (3) involves adjusting the previously computed standard deviation, $w_k$, for every group of DBAR contingent claims in a portfolio by an amount corresponding to a desired or acceptable percentile of loss. For purposes of illustration, it is assumed that investment returns have a normal distribution function; that a 95% statistical confidence for losses is desirable; and that the standard deviations of returns for each group of DBAR contingent claims, $w_k$, can be multiplied by 1.645, i.e., the number of standard deviations in the standard normal distribution corresponding to the bottom fifth percentile. A normal distribution is used for illustrative purposes, and other types of distributions (e.g., the Student T distribution) can be used to compute the number of standard deviations corresponding to the any percentile of interest. As discussed above, the maximum amount that can be lost in preferred embodiments of canonical DRF implementation of a group of DBAR contingent claims is the amount invested.

Accordingly, for this illustration the standard deviations $w_k$ are adjusted to reflect the constraint that the most that can be lost is the smaller of (a) the total amount invested and (b) the percentile loss of interest associated with the CAR calculation for the group of DBAR contingent claims, i.e.:

$$w_k = \min\left(1.645 * w_k, \sum_{i=1 \ldots n} \alpha_i\right)$$

In effect, this updates the standard deviation for each event by substituting for it a CAR value that reflects a multiple of the standard deviation corresponding to an extreme loss percentile (e.g., bottom fifth) or the total invested amount, whichever is smaller.

Step (4) involves taking the adjusted Wk, as developed in step (4) for each of m groups of DBAR contingent claims, and arranging them into an y×1 dimensional column vector, w, each element of which contains $w_k$, k=1 . . . y.

Step (5) involves the development of a symmetric correlation matrix, $C_e$, which has a number of rows and columns equal to the number of groups of DBAR contingent claims, y. in which the trader has one or more investments. Correlation matrix $C_e$ can be estimated from historical data or may be available more directly, such as the correlation matrix among foreign exchange rates, interest rates, equity indices, commodities, and other financial products available from JP Morgan's RiskMetrics database. Other sources of the correlation information for matrix $C_e$ are known to those of skill in the art. Along the diagonals of the correlation matrix $C_e$ are 1's, and the entry at the i-th row and j-th column of the matrix contains the correlation between the i-th and j-th events which define the i-th and j-th DBAR contingent claim for all such possible pairs among the m active groups of DBAR contingent claims in the portfolio.

In Step (6), the CAR for the entire portfolio of m groups of DBAR contingent claims is found by performing the following matrix computation, using each $w_k$ from step (4) arrayed into vector w and its transpose $w^T$:

$$CAR = \sqrt{w^T * C_e * w}$$

This CAR value for the portfolio of groups of DBAR contingent claims is an amount of loss that will not be exceeded with the associated statistical confidence used in Steps (1)-(6) above (e.g., in this illustration, 95%).

Example 4.1.1-1

VAR-Based CAR Calculation

An example further illustrates the calculation of a VAR-based CAR for a portfolio containing two groups of DBAR range derivative contingent claims (i.e., y=2) with a canonical DRF on two common stocks, IBM and GM. For this example, the following assumptions are made: (i) for each of the two groups of DBAR contingent claims, the relevant underlying event upon which the states are defined is the respective closing price of each stock one month forward; (ii) there are only three states defined for each event: "low", "medium", and "high," corresponding to ranges of possible closing prices on that date; (iii) the posted returns for IBM and GM respectively for the three respective states are, in U.S. dollars, (4, 0.6667, 4) and (2.333, 1.5, 2.333); (iv) the exchange fee is zero; (v) for the IBM group of contingent claims, the trader has one dollar invested in the state "low", three dollars invested in the state "medium," and two dollars invested in the state "high"; (vi) for the GM group of contingent claims, the trader has a single investment in the amount of one dollar in the state "medium"; (vii) the desired or acceptable percentile of loss in the fifth percentile, assuming a normal distribution; and (viii) the estimated correlation of the price changes of IBM and GM is 0.5 across the distribution of states for each stock.

Steps (1)-(6), described above, are used to implement VAR in order to compute CAR for this example. From Step (1), the standard deviations of state returns per unit of amount invested in each state for the IBM and GM groups of contingent claims are, respectively, (2, 0.8165, 2) and (1.5274, 1.225, 1.5274). In further accordance with Step (1) above, the amount invested in each state in the respective group of contingent claims, $\alpha_i$; is multiplied by the previously calculated standard deviation of state returns per investment, $\sigma_i$, so that the standard deviation of returns per state in dollars for each claim equals, for the IBM group: (2, 2.4495, 4) and, for the GM group, (0,1.225, 0).

In accordance with Step (2) above, for each of the two groups of DBAR contingent claims in this example, a correlation matrix between any pair of states, $C_s$, is constructed, as follows:

$$C_s^{IBM} = -\begin{matrix} 1 & -.6124 & -.25 \\ -.6124 & 1 & -.6124 \\ -.25 & -.6124 & 1 \end{matrix}$$

$$C_s^{GM} = -\begin{matrix} 1 & -.5345 & -.4286 \\ -.5345 & 1 & -.5345 \\ -.4286 & -.5345 & 1 \end{matrix}$$

where the left matrix is the correlation between each pair of state returns for the IBM group of contingent claims and the right matrix is the corresponding matrix for the GM group of contingent claims.

Also according to step (2) above, for each of the two groups of contingent claims, the standard deviation of returns per state in dollars, $\alpha_i\sigma_i$, for each investment in this example can be arranged in a vector with dimension equal to three (i.e., the number of states):

$$U_{IBM} = \begin{matrix} 2 \\ 2.4495 \\ 4 \end{matrix} \qquad U_{GM} = \begin{matrix} 0 \\ 1.225 \\ 0 \end{matrix}$$

where the vector on the left contains the standard deviation in dollars of returns per state for the IBM group of contingent claims, and the vector on the right contains the corresponding information for the GM group of contingent claims. Further in accordance with Step (2) above, a matrix calculation can be performed to compute the total standard deviation for all investments in each of the two groups of contingent claims, respectively:

$$w_1 = \sqrt{U_{IBM}^T * C_s^{IBM} * U_{IBM}} = 2$$

$$w_2 = \sqrt{U_{GM}^T * C_s^{GM} * U_{GM}} = 1.225$$

where the quantity on the left is the standard deviation for all investments in the distribution of the IBM group of contingent claims, and the quantity on the right is the corresponding standard deviation for the GM group of contingent claims.

In accordance with step (3) above, $w_1$ and $w_2$ are adjusted by multiplying each by 1.645 (corresponding to a CAR loss percentile of the bottom fifth percentile assuming a normal distribution) and then taking the lower of (a) that resulting value and (b) the maximum amount that can be lost, i.e., the amount invested in all states for each group of contingent claims:

$$w_1=\min(2*1.645,6)=3.29 \quad w_2=\min(2*1.225,1)=1$$

where the left quantity is the adjusted standard deviation of returns for all investments across the distribution of the IBM group of contingent claims, and the right quantity is the corresponding amount invested in the GM group of contingent claims. These two quantities, $w_1$ and $w_2$, are the CAR values for the individual groups of DBAR contingent claims respectively, corresponding to a statistical confidence of 95%. In other words, if the normal distribution assumptions that have been made with respect to the state returns are valid, then a trader, for example, could be 95% confident that losses on the IBM groups of contingent claims would not exceed $3.29.

Proceeding now with Step (4) in the VAR process described above, the quantities $w_1$ and $w_2$ are placed into a vector which has a dimension of two, equal to the number of groups of DBAR contingent claims in the illustrative trader's portfolio:

$$w = \begin{matrix} 3.29 \\ 1 \end{matrix}$$

According to Step (5), a correlation matrix $C_e$ with two rows and two columns, is either estimated from historical data or obtained from some other source (e.g., RiskMetrics), as known to one of skill in the art. Consistent with the assumption for this illustration that the estimated correlation between the price changes of IBM and GM is 0.5, the correlation matrix for the underlying events is as follows:

$$C_e = \begin{matrix} 1 & .5 \\ .5 & 1 \end{matrix}$$

Proceeding with Step (6), a matrix multiplication is performed by pre- and post-multiplying $C_e$ by the transpose of w and by w, and taking the square root of the resulting product:

$$\text{CAR}=\sqrt{w^{T}*C_e*w}=3.8877$$

This means that for the portfolio in this example, comprising the three investments in the IBM group of contingent claims and the single investment in the GM group of contingent claims, the trader can have a 95% statistical confidence he will not have losses in excess of $3.89.

4.1.2 Capital-at-Risk Determinations Using Monte Carlo Simulation Techniques

Monte Carlo Simulation ("MCS") is another methodology that is frequently used in the financial industry to compute CAR. MCS is frequently used to simulate many representative scenarios for a given group of financial products, compute profits and losses for each representative scenario, and then analyze the resulting distribution of scenario profits and losses. For example, the bottom fifth percentile of the distribution of the scenario profits and losses would correspond to a loss for which a trader could have a 95% confidence that it would not be exceeded. In a preferred embodiment, the MCS methodology can be adapted for the computation of CAR for a portfolio of DBAR contingent claims as follows.

Step (1) of the MCS methodology involves estimating the statistical distribution for the events underlying the DBAR contingent claims using conventional econometric techniques, such as GARCH. If the portfolio being analyzed has more than one group of DBAR contingent claim, then the distribution estimated will be what is commonly known as a multivariate statistical distribution which describes the statistical relationship between and among the events in the portfolio. For example, if the events are underlying closing prices for stocks and stock price changes have a normal distribution, then the estimated statistical distribution would be a multivariate normal distribution containing parameters relevant for the expected price change for each stock, its standard deviation, and correlations between every pair of stocks in the portfolio. Multivariate statistical distribution is typically estimated from historical time series data on the underlying events (e.g., history of prices for stocks) using conventional econometric techniques.

Step (2) of the MCS methodology involves using the estimated statistical distribution of Step (1) in order to simulate the representative scenarios. Such simulations can be performed using simulation methods contained in such reference works as *Numerical Recipes in C* or by using simulation software such as @Risk package available from Palisade, or using other methods known to one of skill in the art. For each simulated scenario, the DRF of each group of DBAR contingent claims in the portfolio determines the payouts and profits and losses on the portfolio computed.

Using the above two stock example involving GM and IBM used above to demonstrate VAR techniques for calculating CAR, a scenario simulated by MCS techniques might be "High" for IBM and "Low" for GM, in which case the trader with the above positions would have a four dollar profit for the IBM contingent claim and a one dollar loss for the GM contingent claim, and a total profit of three dollars. In step (2), many such scenarios are generated so that a resulting distribution of profit and loss is obtained. The resulting profits and losses can be arranged into ascending order so that, for example, percentiles corresponding to any given profit and loss number can be computed. A bottom fifth percentile, for example, would correspond to a loss for which the trader could be 95% confident would not be exceeded, provided that enough scenarios have been generated to provide an adequate representative sample. This number could be used as the CAR value computed using MCS for a group of DBAR contingent claims. Additionally, statistics such as average profit or loss, standard deviation, skewness, kurtosis and other similar quantities can be computed from the generated profit and loss distribution, as known by one of skill in the art.

4.1.3 Capital-at-Risk Determination Using Historical Simulation Techniques

Historical Simulation ("HS") is another method used to compute CAR values. HS is comparable to that of MCS in that it relies upon the use of representative scenarios in order to compute a distribution of profit and loss for a portfolio. Rather than rely upon simulated scenarios from an estimated probability distribution, however, HS uses historical data for the scenarios. In a preferred embodiment, HS can be adapted to apply to a portfolio of DBAR contingent claims as follows.

Step (1) involves obtaining, for each of the underlying events corresponding to each group of DBAR contingent claims, a historical time series of outcomes for the events. For example, if the events are stock closing prices, time series of closing prices for each stock can be obtained from a historical database such as those available from Bloomberg, Reuters, or Datastream or other data sources known to someone of skill in the art.

Step (2) involves using each observation in the historical data from Step (1) to compute payouts using the DRF for each group of DBAR contingent claims in the portfolio. From the payouts for each group for each historical observation, a portfolio profit and loss can be computed. This results in a distribution of profits and losses corresponding to the historical scenarios, i.e., the profit and loss that would have been obtained had the trader held the portfolio throughout the period covered by the historical data sample.

Step (3) involves arranging the values for profit and loss from the distribution of profit and loss computed in Step (2) in ascending order. A profit and loss can therefore be computed corresponding to any percentile in the distribution so arranged, so that, for example, a CAR value corresponding to a statistical confidence of 95% can be computed by reference to the bottom fifth percentile.

4.2 Credit Risk

In preferred embodiments of the present invention, a trader may make investments in a group of DBAR contingent claims using a margin loan. In preferred embodiments of the present invention implementing DBAR digital options, an investor may make an investment with a profit and loss scenario comparable to a sale of a digital put or call option and thus have some loss if the option expires "in the money," as discussed in Section 6, below. In preferred embodiments, credit risk may be measured by estimating the amount of possible loss that other traders in the group of contingent claims could suffer owing to the inability of a given trader to repay a margin loan or otherwise cover a loss exposure. For example, a trader may have invested $1 in a given state for a group of DBAR contingent claims with $0.50 of margin. Assuming a canonical DRF for this example, if the state later fails to occur, the DRF collects $1 from the trader (ignoring interest) which would require repayment of the margin loan. As the trader may be unable to repay the margin loan at the required time, the traders with successful trades may potentially not be able to receive the full amounts owing them under the DRF, and may therefore receive payouts lower than those indicated by the finalized returns for a given trading period for the group of contingent claims. Alternatively, the risk of such possible losses due to credit risk may be insured, with the cost of such insurance either borne by the exchange or passed on to the traders. One advantage of the system and method of the present invention is that, in preferred embodiments, the amount of credit risk associated with a group of contingent claims can readily be calculated.

In preferred embodiments, the calculation of credit risk for a portfolio of groups of DBAR contingent claims involves computing a credit-capital-at-risk ("CCAR") figure in a manner analogous to the computation of CAR for market risk, as described above.

The computation of CCAR involves the use of data related to the amount of margin used by each trader for each investment in each state for each group of contingent claims in the portfolio, data related to the probability of each trader defaulting on the margin loan (which can typically be obtained from data made available by credit rating agencies, such as Standard and Poors, and data related to the correlation of changes in credit ratings or default probabilities for every pair of traders (which can be obtained, for example, from JP Morgan's CreditMetrics database).

In preferred embodiments, CCAR computations can be made with varying levels of accuracy and reliability. For example, a calculation of CCAR that is substantially accurate but could be improved with more data and computational effort may nevertheless be adequate, depending upon the group of contingent claims and the desires of traders for credit risk related information. The VAR methodology, for example, can be adapted to the computation of CCAR for a group of DBAR contingent claims, although it is also possible to use MCS and HS related techniques for such computations. The steps that can be used in a preferred embodiment to compute CCAR using VAR-based, MCS-based, and HS-based methods are described below.

4.2.1 CCAR Method for DBAR Contingent Claims Using the VAR-Based Methodology

Step (i) of the VAR-based CCAR methodology involves obtaining, for each trader in a group of DBAR contingent claims, the amount of margin used to make each trade or the amount of potential loss exposure from trades with profit and loss scenarios comparable to sales of options in conventional markets.

Step (ii) involves obtaining data related to the probability of default for each trader who has invested in the groups of DBAR contingent claims. Default probabilities can be obtained from credit rating agencies, from the JP Morgan CreditMetrics database, or from other sources as known to one of skill in the art. In addition to default probabilities, data related to the amount recoverable upon default can be obtained. For example, an AA-rated trader with $1 in margin loans may be able to repay $0.80 dollars in the event of default.

Step (iii) involves scaling the standard deviation of returns in units of the invested amounts. This scaling step is described in step (1) of the VAR methodology described above for estimating market risk. The standard deviation of each return, determined according to Step (1) of the VAR methodology previously described, is scaled by (a) the percentage of margin [or loss exposure] for each investment; (b) the probability of default for the trader; and (c) the percentage not recoverable in the event of default.

Step (iv) of this VAR-based CCAR methodology involves taking from step (iii) the scaled values for each state for each investment and performing the matrix calculation described in Step (2) above for the VAR methodology for estimating market risk, as described above. In other words, the standard deviations of returns in units of invested amounts which have been scaled as described in Step (iii) of this CCAR methodology are weighted according to the correlation between each possible pair of states (matrix $C_s$, as described above). The resulting number is a credit-adjusted standard deviation of returns in units of the invested amounts for each trader for each investment on the portfolio of groups of DBAR contingent claims. For a group of DBAR contingent claims, the standard deviations of returns that have been scaled in this fashion are arranged into a vector whose dimension equals the number of traders.

Step (v) of this VAR-based CCAR methodology involves performing a matrix computation, similar to that performed in Step (5) of the VAR methodology for CAR described above. In this computation, the vector of credit-scaled standard deviations of returns from step (iv) are used to pre- and post-multiply a correlation matrix with rows and columns equal to the number of traders, with 1's along the diagonal, and with the entry at row i and column j containing the statistical correlation of changes in credit ratings described above. The square root of the resulting matrix multiplication is an approximation of the standard deviation of losses, due to default, for all the traders in a group of DBAR contingent claims. This value can be scaled by a number of standard deviations corresponding to a statistical confidence of the credit-related loss not to be exceeded, as discussed above.

In a preferred embodiment, any given trader may be omitted from a CCAR calculation. The result is the CCAR facing the given trader due to the credit risk posed by other traders who have invested in a group of DBAR contingent claims. This computation can be made for all groups of DBAR contingent claims in which a trader has a position, and the resulting number can be weighted by the correlation matrix for the underlying events, $C_e$, as described in Step (5) for the VAR-based CAR calculation. The result corresponds to the risk of loss posed by the possible defaults of other traders across all the states of all the groups of DBAR contingent claims in a trader's portfolio.

4.2.2 CCAR Method for DBAR Contingent Claims Using the Monte Carlo Simulation (MCS) Methodology As described above, MCS methods are typically used to simulate representative scenarios for a given group of financial products, compute profits and losses for each representative scenario, then analyze the resulting distribution of scenario profits and losses. The scenarios are designed to be representative in that they are supposed to be based, for instance, on statistical distributions which have been estimated, typically using econometric time series techniques, to have a great degree of relevance for the future behavior of the financial products. A preferred embodiment of MCS methods to estimate CCAR for a portfolio of DBAR contingent claims of the present invention, involves two steps, as described below.

Step (i) of the MCS methodology is to estimate a statistical distribution of the events of interest. In computing CCAR for a group of DBAR contingent claims, the events of interest may be both the primary events underlying the groups of DBAR contingent claims, including events that may be fitted to multivariate statistical distributions to compute CAR as described above, as well as the events related to the default of the other investors in the groups of DBAR contingent claims. Thus, in a preferred embodiment, the multivariate statistical distribution to be estimated relates to the market events (e.g., stock price changes, changes in interest rates) underlying the groups of DBAR contingent claims being analyzed as well as the event that the investors in those groups of DBAR contingent claims, grouped by credit rating or classification will be unable to repay margin loans for losing investments.

For example, a multivariate statistical distribution to be estimated might assume that changes in the market events and credit ratings or classifications are jointly normally distributed. Estimating such a distribution would thus entail estimating, for example, the mean changes in the underlying market events (e.g., expected changes in interest rates until the expiration date), the mean changes in credit ratings expected until expiration, the standard deviation for each market event and credit rating change, and a correlation matrix containing all of the pairwise correlations between every pair of events, including market and credit event pairs. Thus, a preferred embodiment of MCS methodology as it applies to CCAR estimation for groups of DBAR contingent claims of the present invention typically requires some estimation as to the statistical correlation between market events (e.g., the change in the price of a stock issue) and credit events (e.g., whether an investor rated A− by Standard and Poors is more likely to default or be downgraded if the price of a stock issue goes down rather than up).

It is sometimes difficult to estimate the statistical correlations between market-related events such as changes in stock prices and interest rates, on the one hand, and credit-related events such as counterparty downgrades and defaults, on the other hand. These difficulties can arise due to the relative infrequency of credit downgrades and defaults. The infrequency of such credit-related events may mean that statistical estimates used for MCS simulation can only be supported with low statistical confidence. In such cases, assumptions can be employed regarding the statistical correlations between the market and credit-related events. For example, it is not uncommon to employ sensitivity analysis with regard to such correlations, i.e., to assume a given correlation between market and credit-related events and then vary the assumption over the entire range of correlations from −1 to 1 to determine the effect on the overall CCAR.

A preferred approach to estimating correlation between events is to use a source of data with regard to credit-related events that does not typically suffer from a lack of statistical frequency. Two methods can be used in this preferred approach. First, data can be obtained that provide greater statistical confidence with regard to credit-related events. For example, expected default frequency data can be purchased from such companies as KMV Corporation. These data supply probabilities of default for various parties that can be updated as frequently as daily. Second, more frequently observed default probabilities can be estimated from market interest rates. For example, data providers such as Bloomberg and Reuters typically provide information on the additional yield investors require for investments in bonds of varying credit ratings, e.g., AAA, AA, A, A−. Other methods are readily available to one skilled in the art to provide estimates regarding default probabilities for various entities. Such estimates can be made as frequently as daily so that it is possible to have greater statistical confidence in the parameters typically needed for MCS, such as the correlation between changes in default probabilities and changes in stock prices, interest rates, and exchange rates.

The estimation of such correlations is illustrated assuming two groups of DBAR contingent claims of interest, where one group is based upon the closing price of IBM stock in three months, and the other group is based upon the closing yield of the 30-year U.S. Treasury bond in three months. In this illustration, it is also assumed that the counterparties who have made investments on margin in each of the groups can be divided into five distinct credit rating classes. Data on the daily changes in the price of IBM and the bond yield may be readily obtained from such sources as Reuters or Bloomberg. Frequently changing data on the expected default probability of investors can be obtained, for example, from KMV Corporation, or estimated from interest rate data as described above. As the default probability ranges between 0 and 1, a statistical distribution confined to this interval is chosen for purposes of this illustration. For example, for purposes of this illustration, it can be assumed that the expected default probability of the investors follows a logistic distribution and that the joint distribution of changes in IBM stock and the 30-year bond yield follows a bivariate normal distribution. The parameters for the logistic distribution and the bivariate normal distribution can be estimated using econometric techniques known to one skilled in the art.

Step (ii) of a MCS technique, as it may be applied to estimating CCAR for groups of DBAR contingent claims, involves the use of the multivariate statistical distributions estimated in Step (i) above in order to simulate the representative scenarios. As described above, such simulations can be performed using methods and software readily available and known to those of skill in the art. For each simulated scenario, the simulated default rate can be multiplied by the amount of losses an investor faces based upon the simulated market changes and the margin, if any, the investor has used to make losing investments. The product represents an estimated loss rate due to investor defaults. Many such scenarios can be generated so that a resulting distribution of credit-related expected losses can be obtained. The average value of the distribution is the mean loss. The lowest value of the top fifth percentile of the distribution, for example, would correspond to a loss for which a given trader could be 95% confident would not be exceeded, provided that enough scenarios have been generated to provide a statistically meaningful sample. In preferred embodiments, the selected value in the distribution, corresponding to a desired or adequate confidence level, is used as the CCAR for the groups of DBAR contingent claims being analyzed.

4.2.3 CCAR Method for DBAR Contingent Claims Using the Historical Simulation ("HS") Methodology As described above, Historical Simulation (HS) is comparable to MCS for estimating CCAR in that HS relies on representative scenarios in order to compute a distribution of profit and loss for a portfolio of groups of DBAR contingent claim investments. Rather than relying on simulated scenarios from an estimated multivariate statistical distribution, however, HS uses historical data for the scenarios. In a preferred embodiment, HS methodology for calculating CCAR for groups of DBAR contingent claims uses three steps, described below.

Step (i) involves obtaining the same data for the market-related events as described above in the context of CAR. In addition, to use HS to estimate CCAR, historical time series data are also used for credit-related events such as downgrades and defaults. As such data are typically rare, methods described above can be used to obtain more frequently observed data related to credit events. For example, in a preferred embodiment, frequently-observed data on expected default probabilities can be obtained from KMV Corporation. Other means for obtaining such data are known to those of skill in the art.

Step (ii) involves using each observation in the historical data from the previous step (i) to compute payouts using the DRF for each group of DBAR contingent claims being analyzed. The amount of margin to be repaid for the losing trades, or the loss exposure for investments with profit and loss scenarios comparable to digital option "sales," can then be multiplied by the expected default probability to use HS to estimate CCAR, so that an expected loss number can be obtained for each investor for each group of contingent claims. These losses can be summed across the investment by each trader so that, for each historical observation data point, an expected loss amount due to default can be attributed to each trader. The loss amounts can also be summed across all the investors so that a total expected loss amount can be obtained for all of the investors for each historical data point.

Step (iii) involves arranging, in ascending order, the values of loss amounts summed across the investors for each data point from the previous step (ii). An expected loss amount due to credit-related events can therefore be computed corresponding to any percentile in the distribution so arranged. For example, a CCAR value corresponding to a 95% statistical confidence level can be computed by reference to 95$^{th}$ percentile of the loss distribution.

5. LIQUIDITY AND PRICE/QUANTITY RELATIONSHIPS

In the trading of contingent claims, whether in traditional markets or using groups of DBAR contingent claims of the present invention, it is frequently useful to distinguish between the fundamental value of the claim, on the one hand, as determined by market expectations, information, risk aversion and financial holdings of traders, and the deviations from such value due to liquidity variations, on the other hand. For example, the fair fundamental value in the traditional swap market for a five-year UK swap (i.e., swapping fixed interest for floating rate payments based on UK LIBOR rates) might be 6.79% with a 2 basis point bid/offer (i.e., 6.77% receive, 6.81% pay). A large trader who takes the market's fundamental mid-market valuation of 6.79% as correct or fair might want to trade a swap for a large amount, such as 750 million pounds. In light of likely liquidity available according to current standards of the traditional market, the large amount of the transaction could reduce the likely offered rate to 6.70%, which is a full 7 basis points lower than the average offer (which is probably applicable to offers of no more than 100 million pounds) and 9 basis points away from the fair mid-market value.

The difference in value between a trader's position at the fair or mid-market value and the value at which the trade can actually be completed, i.e. either the bid or offer, is usually called the liquidity charge. For the illustrative five-year UK swap, a 1 basis point liquidity charge is approximately equal to 0.04% of the amount traded, so that a liquidity charge of 9 basis points equals approximately 2.7 million pounds. If no new information or other fundamental shocks intrude into or "hit" the market, this liquidity charge to the trader is almost always a permanent transaction charge for liquidity—one that also must be borne when the trader decides to liquidate the large position. Additionally, there is no currently reliable way to predict, in the traditional markets, how the relationship between price and quantity may deviate from the posted bid and offers, which are usually applicable only to limited or representative amounts. Price and quantity relationships can be highly variable, therefore, due to liquidity variations. Those relationships can also be non-linear. For instance, it may cost more than twice as much, in terms of a bid/offer spread, to trade a second position that is only twice as large as a first position.

From the point of view of liquidity and transactions costs, groups of DBAR contingent claims of the present invention offer advantages compared to traditional markets. In preferred embodiments, the relationship between price (or returns) and quantity invested (i.e., demanded) is determined mathematically by a DRF. In a preferred embodiment using a canonical DRF, the implied probability $q_i$ for each state i increases, at a decreasing rate, with the amount invested in that state:

$$q_i = \frac{T_i}{T}$$

$$\frac{\partial q_i}{\partial T_i} = \frac{T - T_i}{T^2}$$

$$\frac{\partial^2 q_i}{\partial T_i^2} = -2 * \frac{T - T_i}{T^3}$$

$$\frac{\partial q_i}{\partial T_{j,j\neq i}} = -\frac{T_i}{T^2} = -\frac{q_i}{T}$$

where T is the total amount invested across all the states of the group of DBAR contingent claims and $T_i$ is the amount invested in the state i. As a given the amount gets very large, the implied probability of that state asymptotically approaches one. The last expression immediately above shows that there is a transparent relationship, available to all traders, between implied probabilities and the amount invested in states other than a given state i. The expression shows that this relationship is negative, i.e., as amounts invested in other states increase, the implied probability for the given state i decreases. Since, in preferred embodiments of the present invention, adding investments to states other than the given state is equivalent to selling the given state in the market, the expression for $$\frac{\partial q_i}{\partial T_{j,j\neq i}}$$

above shows how, in a preferred embodiment, the implied probability for the given state changes as a quantity for that state is up for sale, i.e., what the market's "bid" is for the quantity up for sale. The expression for $$\frac{\partial q_i}{\partial T_i}$$

above shows, in a preferred embodiment, how the probability for the given state changes when a given quantity is demanded or desired to be purchased, i.e., what the market's "offer" price is to purchasers of the desired quantity.

In a preferred embodiment, for each set of quantities invested in the defined states of a group of DBAR contingent claims, a set of bid and offer curves is available as a function of the amount invested.

In the groups of DBAR contingent claims of the present invention, there are no bids or offers per se. The mathematical relationships above are provided to illustrate how the systems and methods of the present invention can, in the absence of actual bid/offer relationships, provide groups of DBAR contingent claims with some of the functionality of bid/offer relationships.

Economists usually prefer to deal with demand and cross-demand elasticities, which are the percentage changes in prices due to percentage changes in quantity demanded for a given good (demand elasticity) or its substitute (cross-demand elasticity). In preferred embodiments of the systems and methods of the present invention, and using the notation developed above, $$\frac{\Delta q_i}{q_i} \Big/ \frac{\Delta T_i}{T_i} = 1 - q_i$$

$$\frac{\Delta q_i}{q_i} \Big/ \frac{\Delta T_j}{T_j} = -q_j$$

The first of the expressions immediately above shows that small percentage changes in the amount invested in state i have a decreasing percentage effect on the implied probability for state i, as state i becomes more likely (i.e., as $q_i$ increases to 1). The second expression immediately above shows that a percentage change in the amount invested in a state j other than state i will decrease the implied probability for state i in proportion to the implied probability for the other state j.

In preferred embodiments, in order to effectively "sell" a state, traders need to invest or "buy" complement states, i.e., states other than the one they wish to "sell." Thus, in a preferred embodiment involving a group of DBAR claims with two states, a "seller" of state 1 will "buy" state 2, and vice versa. In order to "sell" state 1, state 2 needs to be "bought" in proportion to the ratio of the amount invested in state 2 to the amount invested in state 1. In a state distribution which has more than two states, the "complement" for a given state to be "sold" are all of the other states for the group of DBAR contingent claims. Thus, "selling" one state involves "buying" a multi-state investment, as described above, for the complement states.

Viewed from this perspective, an implied offer is the resulting effect on implied probabilities from making a small investment in a particular state. Also from this perspective, an implied bid is the effect on implied probabilities from making a small multi-state investment in complement states. For a given state in a preferred embodiment of a group of DBAR contingent claims, the effect of an invested amount on implied probabilities can be stated as follows:

$$\text{Implied "Bid"} = q_i - \frac{(1 - q_i)}{T} * \Delta T_i$$

$$\text{Implied "Offer"} = q_i + q_i * \left(\frac{1}{T_i} - \frac{1}{T}\right) * \Delta T_i$$

where $\Delta T_i$ (considered here to be small enough for a first-order approximation) is the amount invested for the "bid" or "offer." These expressions for implied "bid" and implied "offer" can be used for approximate computations. The expressions indicate how possible liquidity effects within a group of DBAR contingent claims can be cast in terms familiar in traditional markets. In the traditional markets, however, there is no ready way to compute such quantities for any given market.

The full liquidity effect—or liquidity response function—between two states in a group of DBAR contingent claims can be expressed as functions of the amounts invested in a given state, $T_i$, and amounts invested in the complement states, denoted $T^c_i$, as follows:

Implied "Bid" Demand Response $$q_i^B(\Delta T_i) = \frac{T_i}{T_i + T_i^c + \Delta T_i * \left(\frac{T_i^c}{T_i - \Delta T_i}\right)}$$

Implied "Offer" Demand Response $$q_i^O(\Delta T_i) = \frac{T_i + \Delta T_i}{T_i + T_i^c + \Delta T_i}$$

The implied "bid" demand response function shows the effect on the implied state probability of an investment made to hedge an investment of size $\Delta T_i$. The size of the hedge investment in the complement states is proportional to the ratio of investments in the complement states to the amount of investments in the state or states to be hedged, excluding the investment to be hedged (i.e., the third term in the denominator). The implied "offer" demand response function above shows the effect on the implied state probability from an incremental investment of size $\Delta T_i$ in a particular defined state.

In preferred embodiments of systems and methods of the present invention, only the finalized returns for a given trading period are applicable for computing payouts for a group of DBAR contingent claims. Thus, in preferred embodiments, unless the effect of a trade amount on returns is permanent, i.e., persists through the end of a trading period, a group of DBAR contingent claims imposes no permanent liquidity charge, as the traditional markets typically do. Accordingly, in preferred embodiments, traders can readily calculate the effect on returns from investments in the DBAR contingent claims, and unless these calculated effects are permanent, they will not affect closing returns and can, therefore, be ignored in appropriate circumstances. In other words, investing in a preferred embodiment of a group of DBAR contingent claims does not impose a permanent liquidity charge on traders for exiting and entering the market, as the traditional markets typically do.

The effect of a large investment may, of course, move intra-trading period returns in a group of DBAR contingent claims as indicated by the previous calculations. In preferred embodiments, these effects could well be counteracted by subsequent investments that move the market back to fair value (in the absence of any change in the fundamental or fair value). In traditional markets, by contrast, there is usually a "toll booth" effect in the sense that a toll or change is usually exacted every time a trader enters and exits the market. This toll is larger when there is less "traffic" or liquidity and represents a permanent loss to the trader. By contrast, other than an exchange fee, in preferred embodiments of groups of DBAR contingent claims, there is no such permanent liquidity tax or toll for market entry or exit.

Liquidity effects may be permanent from investments in a group of DBAR contingent claims if a trader is attempting to make a relatively very large investment near the end of a trading period, such that the market may not have sufficient time to adjust back to fair value. Thus, in preferred embodiments, there should be an inherent incentive not to hold back large investments until the end of the trading period, thereby providing incentives to make large investments earlier, which is beneficial overall to liquidity and adjustment of returns. Nonetheless, a trader can readily calculate the effects on returns to a investment which the trader thinks might be permanent (e.g., at the end of the trading period), due to the effect on the market from a large investment amount.

For example, in the two period hedging example (Example 3.1.19) above, it was assumed that the illustrated trader's investments had no material effect on the posted returns, in other words, that this trader was a "price taker." The formula for the hedge trade H in the second period of that example above reflects this assumption. The following equivalent expression for H takes account of the possibly permanent effect that a large trade investment might have on the closing returns (because, for example, the investment is made very close to the end of the trading period):

$$H = \frac{P_t - T_{t+1} + \sqrt{T_{i+1}^2 - 2 * T_{i+1} * P_t + P_t^2 + 4 * P_t * T_{t+1}^c}}{2}$$

where $$P_t = \alpha_t * (1 + r_t)$$

in the notation used in Example 3.1.19, above, and $T_{t+1}$ is the total amount invested in period t+1 and $T^c_{t+1}$ is the amount invested in the complement state in period t+1. The expression for H is the quadratic solution which generates a desired payout, as described above but using the present notation. For example, if $1 billion is the total amount, T, invested in trading period 2, then, according to the above expressions, the hedge trade investment assuming a permanent effect on returns is $70.435 million compared to $70.18755 million in Example 3.1.19. The amount of profit and loss locked-in due to the new hedge is $1.232 million, compared to $1.48077 in Example 3.1.19. The difference represents the liquidity effect, which even in the example where the invested notional is 10% of the total amount invested, is quite reasonable in a market for groups of DBAR contingent claims. There is no ready way to estimate or calculate such liquidity effects in traditional markets.

6. DBAR DIGITAL OPTIONS EXCHANGE

In a preferred embodiment, the DBAR methods and systems of the present invention may be used to implement financial products known as digital options and to facilitate an exchange in such products. A digital option (sometimes also known as a binary option) is a derivative security which pays a fixed amount should specified conditions be met (such as the price of a stock exceeding a given level or "strike" price) at the expiration date. If the specified conditions are met, a digital option is often characterized as finishing "in the money." A digital call option, for example, would pay a fixed amount of currency, say one dollar, should the value of the underlying security, index, or variable upon which the option is based expire at or above the strike price of the call option. Similarly, a digital put option would pay a fixed amount of currency should the value of the underlying security, index or variable be at or below the strike price of the put option. A spread of either digital call or put options would pay a fixed amount should the underlying value expire at or between the strike prices. A strip of digital options would pay out fixed ratios should the underlying expire between two sets of strike prices. Graphically, digital calls, puts, spreads, and strips can have simple representations:

TABLE 6.0.1

Digital Call

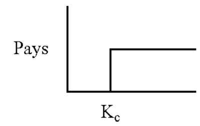

TABLE 6.0.2

Digital Put

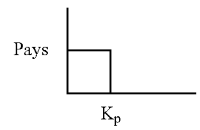

TABLE 6.0.3

Digital Spread

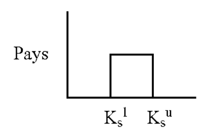

TABLE 6.0.4

Digital Strip

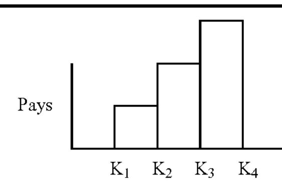

As depicted in Tables 6.0.1, 6.0.2, 6.0.3, and 6.0.4, the strike prices for the respective options are marked using familiar options notation where the subscript "c" indicates a call, the subscript "p" indicates a put, the subscript "s" indicates "spread," and the superscripts "l" and "u" indicate lower and upper strikes, respectively.

A difference between digital options, which are frequently transacted in the OTC foreign currency options markets, and traditional options such as the equity options, which trade on the Chicago Board Options Exchange ("CBOE"), is that digital options have payouts which do not vary with the extent to which the underlying asset, index, or variable ("underlying") finishes in or out of the money. For example, a digital call option at a strike price for the underlying stock at 50 would pay the same amount if, at the fulfillment of all of the termination criteria, the underlying stock price was 51, 60, 75 or any other value at or above 50. In this sense, digital options represent the academic foundations of options theory, since traditional equity options could in theory be replicated from a portfolio of digital spread options whose strike prices are set to provide vanishingly small spreads. (In fact, a "butterfly spread" of the traditional options yields a digital option spread as the strike prices of the traditional options are allowed to converge.) As can be seen from Tables 6.0.1, 6.0.2, 6.0.3, and 6.0.4, digital options can be constructed from digital option spreads.

The methods and systems of the present invention can be used to create a derivatives market for digital options spreads. In other words, each investment in a state of a mutually exclusive and collectively exhaustive set of states of a group of DBAR contingent claims can be considered to correspond to either a digital call spread or a digital put spread Since digital spreads can readily and accurately be used to replicate digital options, and since digital options are known, traded and processed in the existing markets, DBAR methods can therefore be represented effectively as a market for digital options—that is, a DBAR digital options market.

6.1 Representation of Digital Options as DBAR Contingent Claims

One advantage of the digital options representation of DBAR contingent claims is that the trader interface of a DBAR digital options exchange (a "DBAR DOE") can be presented in a format familiar to traders, even though the underlying DBAR market structure is quite novel and different from traditional securities and derivatives markets. For example, the main trader interface for a DBAR digital options exchange, in a preferred embodiment, could have the following features:

TABLE 6.1.1

MSFT Digital Options

| | CALLS | | | PUTS | | |
|---|---|---|---|---|---|---|
| STRIKE | IND BID | IND OFFER | IND PAYOUT | IND BID | IND OFFER | IND PAYOUT |
| 30 | 0.9388 | 0.940 | 1.0641 | 0.0593 | 0.0612 | 16.5999 |
| 40 | 0.7230 | 0.7244 | 1.3818 | 0.2756 | 0.2770 | 3.6190 |
| 50 | 0.4399 | 0.4408 | 2.2708 | 0.5592 | 0.5601 | 1.7869 |
| 60 | 0.2241 | 0.2245 | 4.4582 | 0.7755 | 0.7759 | 1.2892 |
| 70 | 0.1017 | 0.1019 | 9.8268 | 0.8981 | 0.8983 | 1.1133 |
| 80 | 0.0430 | 0.0431 | 23.2456 | 0.9569 | 0.9570 | 1.0450 |

The illustrative interface of Table 6.1.1 contains hypothetical market information on DBAR digital options on Microsoft stock ("MSFT") for a given expiration date. For example, an investor who desires a payout if MSFT stock closes higher than 50 at the expiration or observation date will need to "pay the offer" of $0.4408 per dollar of payout. Such an offer is "indicative" (abbreviated "IND") since the underlying DBAR distribution—that is, the implied probability that a state or set of states will occur—may change during the trading period. In a preferred embodiment, the bid/offer spreads presented in Table 6.1.1 are presented in the following manner. The "offer" side in the market reflects the implied probability that underlying value of the stock (in this example MSFT) will finish "in the money." The "bid" side in the market is the "price" at which a claim can be "sold" including the transaction fee. (In this context, the term "sold" reflects the use of the systems and, methods of the present invention to implement investment profit and loss scenarios comparable to "sales" of digital options, discussed in detail below.) The amount in each "offer" cell is greater than the amount in the corresponding "bid" cell. The bid/offer quotations for these digital option representations of DBAR contingent claims are presented as percentages of (or implied probabilities for) a one dollar indicative payout.

The illustrative quotations in Table 6.1.1 can be derived as follows. First the payout for a given investment is computed assuming a 10 basis point transaction fee. This payout is equal to the sum of all investments less 10 basis points, divided by the sum of the investments over the range of states corresponding to the digital option. Taking the inverse of this quantity gives the offer side of the market in "price" terms. Performing the same calculation but this time adding 10 basis points to the total investment gives the bid side of the market.

In another preferred embodiment, transaction fees are assessed as a percentage of payouts, rather than as a function of invested amounts. Thus, the offer (bid) side of the market for a given digital option could be, for example, (a) the amount invested over the range of states comprising the digital option, (b) plus (minus) the fee (e.g., 10 basis points) multiplied by the total invested for all of the defined states, (c) divided by the total invested for all of the defined states. An advantage of computing fees based upon the payout is that the bid/offer spreads as a percentage of "price" would be different depending upon the strike price of the underlying, with strikes that are less likely to be "in the money" having a higher percentage fee. Other embodiments in which the exchange or transaction fees, for example, depend on the time of trade to provide incentives for traders to trade early or to trade certain strikes, or otherwise reflect liquidity conditions in the contract, are apparent to those of skill in the art.

As explained in detail below, in preferred embodiments of the systems and methods of the present invention, traders or investors can buy and "sell" DBAR contingent claims that are represented and behave like digital option puts, calls, spreads, and strips using conditional or "limit" orders. In addition, these digital options can be processed using existing technological infrastructure in place at current financial institutions. For example, Sungard, Inc., has a large subscriber base to many off-the-shelf programs which are capable of valuing, measuring the risk, clearing, and settling digital options. Furthermore, some of the newer middleware protocols such as FINXML (see www.finxml.org) apparently are able to handle digital options and others will probably follow shortly (e.g., FPML). In addition, the transaction costs of a digital options exchange using the methods and systems of the present invention can be represented in a manner consistent with the conventional markets, i.e., in terms of bid/offer spreads.

6.2 Construction of Digital Options Using DBAR Methods and Systems

The methods of multistate trading of DBAR contingent claims previously disclosed can be used to implement investment in a group of DBAR contingent claims that behave like a digital option. In particular, and in a preferred embodiment, this can be accomplished by allocating an investment, using the multistate methods previously disclosed, in such a manner that the same payout is received from the investment should the option expire "in-the-money", e.g., above the strike price of the underlying for a call option and below the strike price of the underlying for a put. In a preferred embodiment, the multistate methods used to allocate the investment need not be made apparent to traders. In such an embodiment, the DBAR methods and systems of the present invention could effectively operate "behind the scenes" to improve the quality of the market without materially changing interfaces and trading screens commonly used by traders. This may be illustrated by considering the DBAR construction of the MSFT Digital Options market activity as represented to the user in Table 6.1.1. For purposes of this illustration, it is assumed that the market "prices" or implied probabilities for the digital put and call options as displayed in Table 6.1.1 result from $100 million in investments. The DBAR states and allocated investments that construct these "prices" are then:

TABLE 6.2.1

| States | State Prob | State Investments |
|---|---|---|
| (0, 30] | 0.0602387 | $ 6,023,869.94 |
| (30, 40] | 0.2160676 | $21,606,756.78 |
| (40, 50] | 0.2833203 | $28,332,029.61 |
| (50, 60] | 0.2160677 | $21,606,766.30 |
| (60, 70] | 0.1225432 | $12,254,324.67 |
| (70, 80] | 0.0587436 | $ 5,874,363.31 |
| (80, ∞] | 0.0430189 | $ 4,301,889.39 |

In Table 6.2.1, the notation (x, y] is used to indicate a single state part of a set of mutually exclusive and collectively exhaustive states which excludes x and includes y on the interval.

(For purposes of this specification a convention is adopted for puts, calls, and spreads which is consistent with the internal representation of the states. For example, a put and a call both struck at 50 cannot both be paid out if the underlying asset, index or variable expires exactly at 50. To address this issue, the following convention could be adopted: calls exclude the strike price, puts include the strike price, and spreads exclude the lower and include the upper strike price. This convention, for example, would be consistent with internal states that are exclusive on the lower boundary and inclusive on the upper boundary. Another preferred convention would have calls including the strike price and puts excluding the strike price, so that the representation of the states would be inclusive on the lower boundary and exclusive on the upper. In any event, related conventions exist in traditional markets. For example, consider the situation of a traditional foreign exchange options dealer who sells an "at the money" digital and an "at the money" put, with strike price of 100. Each is equally likely to expire "in the money," so for every $1.00 in payout, the dealer should collect $0.50. If the dealer has sold a $1.00 digital call and put, and has therefore collected a total of $1.00 in premium, then if the underlying expires exactly at 100, a discontinuous payout of $2.00 is owed. Hence, in a preferred embodiment of the present invention, conventions such as those described above or similar methods may be adopted to avoid such discontinuities.)

A digital call or put may be constructed with DBAR methods of the present invention by using the multistate allocation algorithms previously disclosed. In a preferred embodiment, the construction of a digital option involves allocating the amount to be invested across the constituent states over which the digital option is "in-the-money" (e.g., above the strike for a call, below the strike for a put) in a manner such that the same payout is obtained regardless of which state occurs among the "in the money" constituent states. This is accomplished by allocating the amount invested in the digital option in proportion to the then-existing investments over the range of constituent states for which the option is "in the money." For example, for an additional $1,000,000 investment a digital call struck at 50 from the investments illustrated in Table 6.2.1, the construction of the trade using multistate allocation methods is:

TABLE 6.2.2

| Internal States | $1,000,000.00 |
|---|---|
| [0, 30] | |
| [30, 40] | |
| [40, 50] | |
| [50, 60] | $490,646.45 |
| [60, 70] | $278,271.20 |
| [70, 80] | $133,395.04 |
| [80, ∞] | $ 97,687.30 |

As other traders subsequently make investments, the distribution of investments across the states comprising the digital option may change, and may therefore require that the multistate investments be reallocated so that, for each digital option, the payout is the same for any of its constituent "in the money" states, regardless of which of these constituent states occurs after the fulfillment of all of the termination, criteria, and is zero for any of the other states. When the investments have been allocated or reallocated so that this payout scenario occurs, the group of investments or contract is said to be in equilibrium. A further detailed description of the allocation methods which can be used to achieve this equilibrium is provided in connection with the description of FIGS. 13-14.

6.3 Digital Option Spreads

In a preferred embodiment, a digital option spread trade may be offered to investors which simultaneously execute a buy and a "sell" (in the synthetic or replicated sense of the term, as described below) of a digital call or put option. An investment in such a spread would have the same payout should the underlying outcome expire at any value between the lower and upper strike prices in the spread. If the spread covers one state, then the investment is comparable to an investment in a DBAR contingent claim for that one state. If the spread covers more than one constituent state, in a preferred embodiment the investment is allocated using the multistate investment method previously described so that, regardless of which state occurs among the states included in the spread trade, the investor receives the same payout.

6.4 Digital Option Strips

Traders in the derivatives markets commonly trade related groups of futures or options contracts in desired ratios in order to accomplish some desired purpose. For example, it is not uncommon for traders of LIBOR based interest rate futures on the Chicago Mercantile Exchange ("CME") to execute simultaneously a group of futures with different expiration dates covering a number of years. Such a group, which is commonly termed a "strip," is typically traded to hedge another position which can be effectively approximated with a strip whose constituent contracts are executed in target relative ratios. For example, a strip of LIBOR-based interest rate futures may be used to approximate the risk inherent of an interest rate swap of the same maturity as the latest contract expiration date in the strip.

In a preferred embodiment, the DBAR methods of the present invention can be used to allow traders to construct strips of digital options and digital option spreads whose relative payout ratios, should each option expire in the money, are equal to the ratios specified by the trader. For example, a trader may desire to invest in a strip consisting of the 50, 60, 70, and 80 digital call options on MSFT, as illustrated in Table 6.1.1. Furthermore, and again as an illustrative example, the trader may desire that the payout ratios, should each option expire in the money, be in the following relative ratio: 1:2:3:4. Thus, should the underlying price of MSFT at the expiration date (when the event outcome is observed) be equal to 65, both the 50 and 60 strike digital options are in the money. Since the trader desires that the 60 strike digital call option pay out twice as much as the 50 strike digital call option, a multistate allocation algorithm, as previously disclosed and described in detail, can be used dynamically to reallocate the trader's investments across the states over which these options are in the money (50 and above, and 60 and above, respectively) in such a way as to generate final payouts which conform to the indicated ratio of 1:2. As previously disclosed, the multistate allocation steps may be performed each time new investments are added during the trading period, and a final multistate allocation may be performed after the trading period has expired.

6.5 Multistate Allocation Algorithm for Replicating "Sell" Trades

In a preferred embodiment of a digital options exchange using DBAR methods and systems of the present invention, traders are able to make investments in DBAR contingent claims which correspond to purchases of digital options. Since DBAR methods are inherently demand-based—i.e., a DBAR exchange or market functions without traditional sellers—an advantage of the multistate allocation methods of the present invention is the ability to generate scenarios of profits and losses ("P&L") comparable to the P&L scenarios obtained from selling digital options, spreads, and strips in traditional, non-DBAR markets without traditional sellers or order-matching.

In traditional markets, the act of selling a digital option, spread, or strip means that the investor (in the case of a sale, a seller) receives the cost of the option, or premium, if the option expires worthless or out of the money. Thus, if the option expires out of the money, the investor/seller's profit is the premium. Should the option expire in the money, however, the investor/seller incurs a net liability equal to the digital option payout less the premium received. In this situation, the investor/seller's net loss is the payout less the premium received for selling the option, or the notional payout less the premium. Selling an option, which is equivalent in many respects to the activity of selling insurance, is potentially quite risky, given the large contingent liabilities potentially involved. Nonetheless, option selling is commonplace in conventional, non-DBAR markets.

As indicated above, an advantage of the digital options representation of the DBAR methods of the present invention is the presentation of an interface which displays bids and offers and therefore, by design, allows users to make investments in sets of DBAR contingent claims whose P&L scenarios are comparable to those from traditional "sales" as well as purchases of digital calls, puts, spreads, and strips. Specifically in this context, "selling" entails the ability to achieve a profit and loss profile which is analogous to that achieved by sellers of digital options instruments in non-DBAR markets, i.e., achieving a profit equal to the premium should the digital option expire out of the money, and suffering a net loss equal to the digital option payout (or the notional) less the premium received should the digital option expire in the money.

In a preferred embodiment of a digital options exchange using the DBAR contingent claims methods and systems of the present invention, the mechanics of "selling" involves converting such "sell" orders to complementary buy orders. Thus, a sale of the MSFT digital put options with strike price equal to 50, would be converted, in a preferred DBAR DOE embodiment, to a complementary purchase of the 50 strike digital call options. A detailed explanation of the conversion process of a "sale" to a complementary buy order is provided in connection with the description of FIG. 15.

The complementary conversion of DBAR DOE "sales" to buys is facilitated by interpreting the amount to be "sold" in a manner which is somewhat different from the amount to be bought for a DBAR DOE buy order. In a preferred embodiment, when a trader specifies an amount in an order to be "sold," the amount is interpreted as the total amount of loss that the trader will suffer should the digital option, spread, or strip sold expire in the money. As indicated above, the total amount lost or net loss is equal to the notional payout less the premium from the sale. For example, if the trader "sells" $1,000,000 of the MSFT digital put struck at 50, if the price of MSFT at expiration is 50 or below, then the trader will lose $1,000,000. Correspondingly, in a preferred embodiment of the present invention, the order amount specified in a DBAR DOE "sell" order is interpreted as the net amount lost should the option, strip, or spread sold expire in the money. In conventional options markets, the amount would be interpreted and termed a "notional" or "notional amount" less the premium received, since the actual amount lost should the option expire in the money is the payout, or notional, less the premium received. By contrast, the amount of a buy order, in a preferred DBAR DOE embodiment, is interpreted as the amount to be invested over the range of defined states which will generate the payout shape or profile expected by the trader. The amount to be invested is therefore equivalent to the option "premium" in conventional options markets. Thus, in preferred embodiments of the present invention, for DBAR DOE buy orders, the order amount or premium is known and specified by the trader, and the contingent gain or payout should the option purchased finish in the money is not known until after all trading has ceased, the final equilibrium contingent claim "prices" or implied probabilities are calculated and any other termination criteria are fulfilled. By contrast, for a "sell" order in a preferred DBAR DOE embodiment of the present invention, the amount specified in the order is the specified net loss (equal to the notional less the premium) which represents the contingent loss should the option expire in the money. Thus, in a preferred embodiment, the amount of a buy order is interpreted as an investment amount or premium which generates an uncertain payout until all predetermined termination criteria have been met; and the amount of a "sell" order is interpreted as a certain net loss should the option expire in the money corresponding to an investment amount or premium that remains uncertain until all predetermined termination criteria have been met. In other words, in a DBAR DOE preferred embodiment, buy orders are for "premium" while "sell" orders are for net loss should the option expire in the money.

A relatively simple example illustrates the process, in a preferred embodiment of the present invention, of converting a "sale" of a DBAR digital option, strip, or spread to a complementary buy and the meaning of interpreting the amount of a buy order and "sell" order differently. Referring the MSFT example illustrated in Table 6.1.1 and Table 6.2.1 above, assume that a trader has placed a market order (conditional or limit orders are described in detail below) to "sell" the digital put with strike price equal to 50. Ignoring transaction costs, the "price" of the 50 digital put option is equal to the sum of the implied state probabilities spanning the states where the option is in the money (i.e., (0,30], (30,40], and (40,50]) and is approximately 0.5596266. When the 50 put is in the money, the 50 call is out of the money and vice versa. Accordingly, the 50 digital call is "complementary" to the 50 digital put. Thus, "selling" the 50 digital put for a given amount is equivalent in a preferred embodiment to investing that amount in the complementary call, and that amount is the net loss that would be suffered should the 50 digital put expire in the money (i.e., 50 and below). For example, if a trader places a market order to "sell" 1,000,000 value units of the 50 strike digital put, this 1,000,000 value units are interpreted as the net loss if the digital put option expires in the money, i.e., it corresponds to the notional payout loss plus the premium received from the "sale."

In preferred embodiments of the present investment, the 1,000,000 value units to be "sold" are treated as invested in the complementary 50-strike digital call, and therefore are allocated according to the multistate allocation algorithm described in connection with the description of FIG. 13. The 1,000,000 value units are allocated in proportion to the value units previously allocated to the range of states comprising the 50-strike digital call, as indicated in Table 6.2.2 above. Should the digital put expire in the money, the trader "selling" the digital put loses 1,000,000 value units, i.e., the trader loses the payout or notional less the premium. Should the digital put finish out of the money, the trader will receive a payout approximately equal to 2,242,583.42 value units (computed by taking the total amount of value units invested, or 101,000,000, dividing by the new total invested in each state above 50 where the digital put is out of the money, and multiplying by the corresponding state investment). The payout is the same regardless of which state above 50 occurs upon fulfillment of the termination criteria, i.e., the multistate allocation has achieved the desired payout profile for a digital option. In this illustration, the "sell" of the put will profit by 1,242,583.42 should the option sold expire out of the money. This profit is equivalent to the premium "sold." On the other hand, to achieve a net loss of 1,000,000 value units from a payout of 2,242,583.42, the premium is set at 1,242,583.42 value units.

The trader who "sells" in a preferred embodiment of a DBAR DOE specifies an amount that is the payout or notional to be sold less the premium to be received, and not the profit or premium to be made should the option expire out of the money. By specifying the payout or notional "sold" less the premium, this amount can be used directly as the amount to be invested in the complementary option, strip, or spread. Thus, in a preferred embodiment, a DBAR digital options exchange can replicate or synthesize the equivalent of trades involving the sale of option payouts or notional (less the premium received) in the traditional market.

In another preferred embodiment, an investor may be able to specify the amount of premium to be "sold." To illustrate this embodiment, quantity of premium to be "sold" can be assigned to the variable x. An investment of quantity y on the states complementary to the range of states being "sold" is related to the premium x in the following manner:

$$\frac{y}{1-p} - y = x$$

where p is the final equilibrium "price", including the "sale" x (and the complementary investment y) of the option being "sold." Rearranging this expression yields the amount of the complementary buy investment y that must be made to effect the "sale" of the premium x:

$$y = x * \frac{(1-p)}{p}$$

From this it can be seen that, given an amount of premium x that is desired to be "sold," the complementary investment that must be bought on the complement states in order for the trader to receive the premium x, should the option "sold" expire out of the money, is a function of the price of the option being "sold." Since the price of the option being "sold" can be expected to vary during the trading period, in a preferred embodiment of a DBAR DOE of the present invention, the amount y required to be invested in the complementary state as a buy order can also be expected to vary during the trading period.

In a preferred embodiment, traders may specify an amount of notional less the premium to be "sold" as denoted by the variable y. Traders may then specify a limit order "price" (see Section 6.8 below for discussion of limit orders) such that, by the previous equation relating y to x, a trader may indirectly specify a minimum value of x with the specified limit order "price," which may be substituted for p in the preceding equation. In another preferred embodiment, an order containing iteratively revised y amounts, as "prices" change during the trading period are submitted. In another preferred embodiment, recalculation of equilibrium "prices" with these revised y amounts is likely to lead to a convergence of the y amounts in equilibrium. In this embodiment an iterative procedure may be employed to seek out the complementary buy amounts that must be invested on the option, strip, or spread complementary to the range of states comprising the option being "sold" in order to replicate the desired premium that the trader desired to "sell." This embodiment is useful since it aims to make the act of "selling" in a DBAR DOE more similar to the traditional derivatives markets.

It should be emphasized that the traditional markets differ from the systems and methods of the present invention in as least one fundamental respect. In traditional markets, the sale of an option requires a seller who is willing to sell the option at an agreed-upon price. An exchange of DBAR contingent claims of the present invention, in contrast, does not require or involve such sellers. Rather, appropriate investments may be made (or bought) in contingent claims in appropriate states so that the payout to the investor is the same as if the claim, in a traditional market, had been sold. In particular, using the methods and systems of the present invention, the amounts to be invested in various states can be calculated so that the payout profile replicates the payout profile of a sale of a digital option in a traditional market, but without the need for a seller. These steps are described in detail in connection with FIG. 15.

6.6 Clearing and Settlement

In a preferred embodiment of a digital options exchange using the DBAR contingent claims systems and methods of the present invention, all types of positions may be processed as digital options. This is because at fixing (i.e., the finalization of contingent claim "prices" or implied probabilities at the termination of the trading period or other fulfillment of all of the termination criteria) the profit and loss expectations of all positions in the DBAR exchange are, from the trader's perspective, comparable to if not the same as the profit and loss expectations of standard digital options commonly traded in the OTC markets, such as the foreign exchange options market (but without the presence of actual sellers, who are needed on traditional options exchanges or in traditional OTC derivatives markets). The contingent claims in a DBAR DOE of the present invention, once finalized at the end of a trading period, may therefore be processed as digital options or combinations of digital options. For example, a MSFT digital option call spread with a lower strike of 40 and upper strike of 60 could be processed as a purchase of the lower strike digital option and a sale of the upper strike digital option.

There are many vendors of back office software that can readily handle the processing of digital options. For example, Sungard, Inc., produces a variety of mature software systems for the processing of derivatives securities, including digital options. Furthermore, in-house derivatives systems currently in use at major banks have basic digital options capability. Since digital options are commonly encountered instruments, many of the middleware initiatives currently underway e.g., FINXML, will likely incorporate a standard protocol for handling digital options. Therefore, an advantage of a preferred embodiment of the DBAR DOE of the present invention is the ability to integrate with and otherwise use existing technology for such an exchange.

6.7 Contract Initialization

Another advantage of the systems and methods of the present invention is that, as previously noted, digital options positions can be represented internally as composite trades. Composite trades are useful since they help assure that an equilibrium distribution of investments among the states can be achieved. In preferred embodiments, digital option and spreading activity will contribute to an equilibrium distribution. Thus, in preferred embodiments, indicative distributions may be used to initialize trading at the beginning of the trading period.

In a preferred embodiment, these initial distributions may be represented as investments or opening orders in each of the defined states making up the contract or in the group of DBAR contingent claims being traded in the auction. Since these investments need not be actual trader investments, they may be reallocated among the defined states as actual trading occurs, so long as the initial investments do not change the implicit probabilities of the states resulting from actual investments. In a preferred embodiment, the reallocation of initial investments is performed gradually so as to maximize the stability of digital call and put "prices" (and spreads), as viewed by investors. By the end of the trading period, all of the initial investments may be reallocated in proportion to the investments in each of the defined states made by actual traders. The reallocation process may be represented as a composite trade that has a same payout irrespective of which of the defined states occurs. In preferred embodiments the initial distribution can be chosen using current market indications from the traditional markets to provide guidance for traders, e.g., options prices from traditional option markets can be used to calculate a traditional market consensus probability distribution, using for example, the well-known technique of Breeden and Litzenberger. Other reasonable initial and indicative distributions could be used. Alternatively, in a preferred embodiment, initialization can be performed in such a manner that each defined state is initialized with a very small amount, distributed equally among each of the defined states. For example, each of the defined states could be initialized with $10^{-6}$ value units. Initialization in this manner is designed to start each state with a quantity that is very small, distributed so as to provide a very small amount of information regarding the implied probability of each defined state. Other initialization methods of the defined states are possible and could be implemented by one of skill in the art.

6.8 Conditional Investments, or Limit Orders

In a preferred embodiment of the system and methods of the present invention, traders may be able to make investments which are only binding if a certain "price" or implied probability for a given state or digital option (or strip, spread, etc.) is achieved. In this context, the word "price," is used for convenience and familiarity and, in the systems and methods of the present invention, reflects the implied probability of the occurrence of the set of states corresponding to an option—i.e., the implied probability that the option expires "in the money." For instance, in the example reflected in Table 6.2.1, a trader may wish to make an investment in the MSFT digital call options with strike price of 50, but may desire that such an investment actually be made only if the final equilibrium "price" or implied probability is 0.42 or less. Such a conditional investment, which is conditional upon the final equilibrium "price" for the digital option, is sometimes referred to (in conventional markets) as a "limit order." Limit orders are popular in traditional markets since they provide the means for investors to execute a trade at "their price" or better. Of course, there is no guarantee that such a limit order—which may be placed significantly away from the current market price—will in fact be executed. Thus, in traditional markets, limit orders provide the means to control the price at which a trade is executed, without the trader having to monitor the market continuously. In the systems and method of the present invention, limit orders provide a way for investors to control the likelihood that their orders will be executed at their preferred "prices" (or better), also without having continuously to monitor the market.

In a preferred embodiment of a DBAR DOE, traders are permitted to buy and sell digital call and put options, digital spreads, and digital strips with limit "prices" attached. The limit "price" indicates that a trader desires that his trade be executed at that indicated limit "price"—actually the implied probability that the option will expire in the money—"or better." In the case of a purchase of a digital option, "better" means at the indicated limit "price" implied probability or lower (i.e., purchasing not higher than the indicated limit "price"). In the case of a "sale" of a DBAR digital option, "better" means at the indicated limit "price" (implied probability) or higher (i.e., selling not lower than the indicated limit "price").

A benefit of a preferred embodiment of a DBAR DOE of the present invention which includes conditional investments or limit orders is that the placing of limit orders is a well-known mechanism in the financial markets. By allowing traders and investors to interact with a DBAR DOE of the present invention using limit orders, more liquidity should flow into the DBAR DOE because of the familiarity of the mechanism, even though the underlying architecture of the DBAR DOE is different from the underlying architecture of other financial markets.

The present invention also includes novel methods and systems for computing the equilibrium "prices" or implied probabilities, in the presence of limit orders, of DBAR contingent claims in the various states. These methods and systems can be used to arrive at an equilibrium exclusively in the presence of limit orders, exclusively in the presence of market orders, and in the presence of both. In a preferred embodiment, the steps to compute a DBAR DOE equilibrium for a group of contingent claims including at least one limit order are summarized as follows:

6.8(1) Convert all "sale" orders to complementary buy orders. This is achieved by (i) identifying the states complementary to the states being sold; (ii) using the amount "sold" as the amount to be invested in the complementary states, and; and (iii) for limit orders, adjusting the limit "price" to one minus the original limit "price."

6.8(2) Group the limit orders by placing all of the limit orders which span or comprise the same range of defined states into the same group. Sort each group from the best (highest "price" buy) to the worst (lowest "price" buy). All orders may be processed as buys since any "sales" have previously been converted to complementary buys. For example, in the context of the MSFT Digital Options illustrated in Table 6.2.1, there would be separate groups for the 30 digital calls, the 30 digital puts, the 40 digital calls, the 40 digital puts, etc. In addition, separate groups are made for each spread or strip that spans or comprises a distinct set of defined states.

6.8(3) Initialize the contract or group of DBAR contingent claim. This may be done, in a preferred embodiment, by allocating minimal quantities of value units uniformly across the entire distribution of defined states so that each defined state has a non-zero quantity of value units.

6.8(4) For all limit orders, adjust the limit "prices" of such orders by subtracting from each limit order the order, transaction or exchange fees for the respective contingent claims.

6.8(5) With all orders broken into minimal size unit lots (e.g., one dollar or other small value unit for the group of DBAR contingent claims), identify one order from a group that has a limit "price" better than the current equilibrium "price" for the option, spread, or strip specified in the order.

6.8(6) With the identified order, find the maximum number of additional unit lots ("lots") than can be invested such that the limit "price" is no worse than the equilibrium "price" with the chosen maximum number of unit lots added. The maximum number of lots can be found by (i) using the method of binary search, as described in detail below, (ii) trial addition of those lots to already-invested amounts and (iii) recalculating the equilibrium iteratively.

6.8(7) Identify any orders which have limit "prices" worse than the current calculated equilibrium "prices" for the contract or group of DBAR contingent claims. Pick such an order with the worst limit "price" from the group containing the order. Remove the minimum quantity of unit lots required so that the order's limit "price" is no longer worse than the equilibrium "price" calculated when the unit lots are removed. The number of lots to be removed can be found by (i) using the method of binary search, as described in detail below, (ii) trial subtraction of those lots from already invested amounts and (iii) recalculating the equilibrium iteratively.

6.8(8) Repeat steps 6.8(5) to 6.8(7). Terminate those steps when no further additions or removals are necessary.

6.8(9) Optionally, publish the equilibrium from step 6.8(8) both during the trading period and the final equilibrium at the end of the trading period. The calculation during the trading period is performed "as if" the trading period were to end at the moment the calculation is performed. All prices resulting from the equilibrium computation are considered mid-market prices, i.e., they do not include the bid and offer spreads owing to transaction fees. Published offer (bid) "prices" are set equal to the mid-market equilibrium "prices" plus (minus) the fee.

In a preferred embodiment, the preceding steps 6.8(1) to 6.8(8) and optionally step 6.8(9) are performed each time the set of orders during the trading or auction period changes. For example, when a new order is submitted or an existing order is cancelled (or otherwise modified) the set of orders changes, steps 6.8(1) to 6.8(8) (and optionally step 6.8(9)) would need to be repeated.

The preceding steps result in an equilibrium of the DBAR contingent claims and executable orders which satisfy typical trader expectations for a market for digital options:

(1) At least some buy ("sell") orders with a limit "price" greater (less) than or equal to the equilibrium "price" for the given option, spread or strip are executed or "filled."

(2) No buy ("sell") orders with limit "prices" less (greater) than the equilibrium "price" for the given option, spread or strip are executed.

(3) The total amount of executed lots equals the total amount invested across the distribution of defined states.

(4) The ratio of payouts should each constituent state of a given option, spread, or strike occur is as specified by the trader, (including equal payouts in the case of digital options), within a tolerable degree of deviation.

(5) Conversion of filled limit orders to customer orders for the respective filled quantities and recalculating the equilibrium does not materially change the equilibrium.

(6) Adding one or more lots to any of the filled limit orders converted to market orders in step (5) and recalculating of the equilibrium "prices" results in "prices" which violate the limit "price" of the order to which the lot was added (i.e., no more lots can be "squeaked in" without forcing market prices to go above the limit "prices" of buy orders or below the limit "prices" of sell orders).

The following example illustrates the operation of a preferred embodiment of a DBAR DOE of the present invention exclusively with limit orders. It is anticipated that a DBAR DOE will operate and process both limit and non-limit or market orders. As apparent to a person of skill in the art, if a DBAR DOE can operate with only limit orders, it can also operate with both limit orders and market orders.

Like earlier examples, this example is also based on digital options derived from the price of MSFT stock. To reduce the complexity of the example, it is assumed, for purposes of illustration, that there are illustrative purposes, only three strike prices: $30, $50, and $80.

TABLE 6.8.1

| Buy Orders | | | | | |
|---|---|---|---|---|---|
| Limit "Price" | Quantity | Limit "Price" | Quantity | Limit "Price" | Quantity |
| | 30 calls | | 50 calls | | 80 calls |
| 0.82 | 10000 | 0.43 | 10000 | 0.1 | 10000 |
| 0.835 | 10000 | 0.47 | 10000 | 0.14 | 10000 |
| 0.84 | 10000 | 0.5 | 10000 | | |
| | 80 puts | | 50 puts | | 30 puts |
| 0.88 | 10000 | 0.5 | 10000 | 0.16 | 10000 |
| 0.9 | 10000 | 0.52 | 10000 | 0.17 | 10000 |
| 0.92 | 10000 | 0.54 | 10000 | | |

TABLE 6.8.2

| "Sell" Orders | | | | | |
|---|---|---|---|---|---|
| Limit "Price" | Quantity | Limit "Price" | Quantity | Limit "Price" | Quantity |
| | 30 calls | | 50 calls | | 80 calls |
| 0.81 | 5000 | 0.42 | 10000 | 0.11 | 10000 |
| | | 0.44 | 10000 | 0.12 | 10000 |
| | 80 puts | | 50 puts | | 30 puts |
| 0.9 | 20000 | 0.45 | 10000 | 0.15 | 5000 |
| | | 0.50 | 10000 | 0.16 | 10000 |

The quantities entered in the "Sell Orders" table, Table 6.8.2, are the net loss amounts which the trader is risking should the option "sold" expire in the money, i.e., they are equal to the notional less the premium received from the sale, as discussed above.

(i) According to step 6.8(1) of the limit order methodology described above, the "sale" orders are first converted to buy orders. This involves switching the contingent claim "sold" to a buy of the complementary contingent claim and creating a new limit "price" for the converted order equal to one minus the limit "price" of the sale. Converting the "sell" orders in Table 6.8.2 therefore yields the following converted buy orders:

TABLE 6.8.3

| "Sale" Orders Converted to Buy Orders | | | | | |
|---|---|---|---|---|---|
| Limit "Price" | Quantity | Limit "Price" | Quantity | Limit "Price" | Quantity |
| | 30 puts | | 50 puts | | 80 puts |
| 0.19 | 5000 | 0.58 | 10000 | 0.89 | 10000 |
| | | 0.56 | 10000 | 0.88 | 10000 |
| | 80 calls | | 50 calls | | 30 calls |
| 0.1 | 20000 | 0.55 | 10000 | 0.85 | 5000 |
| | | 0.50 | 10000 | 0.84 | 10000 |

(ii) According to step 6.8(2), the orders are then placed into groupings based upon the range of states which each underlying digital option comprises or spans. The groupings for this illustration therefore are: 30 calls, 50 calls, 80 calls, 30 puts, 50 puts, and 80 puts (iii) In this illustrative example, the initial liquidity in each of the defined states is set at one value unit.

(iv) According to step 6.8(4), the orders are arranged from worst "price" (lowest for buys) to best "price" (highest for buys). Then, the limit "prices" are adjusted for the effect of transaction or exchange costs. Assuming that the transaction fee for each order is 5 basis points (0.0005 value units), then 0.0005 is subtracted from each limit order price. The aggregated groups for this illustrative example, sorted by adjusted limit prices (but without including the initial one-value-unit investments), are as displayed in the following table:

TABLE 6.8.4

| Aggregated, Sorted, Converted, and Adjusted Limit Orders | | | | | |
|---|---|---|---|---|---|
| Limit "Price" | Quantity | Limit "Price" | Quantity | Limit "Price" | Quantity |
| | 30 calls | | 50 calls | | 80 calls |
| 0.8495 | 5000 | 0.5495 | 10000 | 0.1395 | 10000 |
| 0.8395 | 20000 | 0.4995 | 20000 | 0.0995 | 30000 |
| 0.8345 | 10000 | 0.4695 | 10000 | | |
| 0.8195 | 10000 | 0.4295 | 10000 | | |
| | 80 puts | | 50 puts | | 30 puts |
| 0.9195 | 10000 | 0.5795 | 10000 | 0.1895 | 5000 |
| 0.8995 | 10000 | 0.5595 | 10000 | 0.1695 | 10000 |
| 0.8895 | 10000 | 0.5395 | 10000 | 0.1595 | 10000 |
| 0.8795 | 20000 | 0.5195 | 10000 | | |
| | | 0.4995 | 10000 | | |

After adding the initial liquidity of one value unit in each state, the initial option prices are as follows:

TABLE 6.8.5

MSFT Digital Options
Initial Prices

| | CALLS | | | PUTS | | |
|---|---|---|---|---|---|---|
| STRIKE | IND MID | IND BID | IND OFFER | IND MID | IND BID | IND OFFER |
| 30 | 0.85714 | 0.85664 | 0.85764 | 0.14286 | 0.14236 | 0.14336 |
| 50 | 0.57143 | 0.57093 | 0.57193 | 0.42857 | 0.42807 | 0.42907 |
| 80 | 0.14286 | 0.14236 | 0.14336 | 0.85714 | 0.85664 | 0.85764 |

Figure 12:
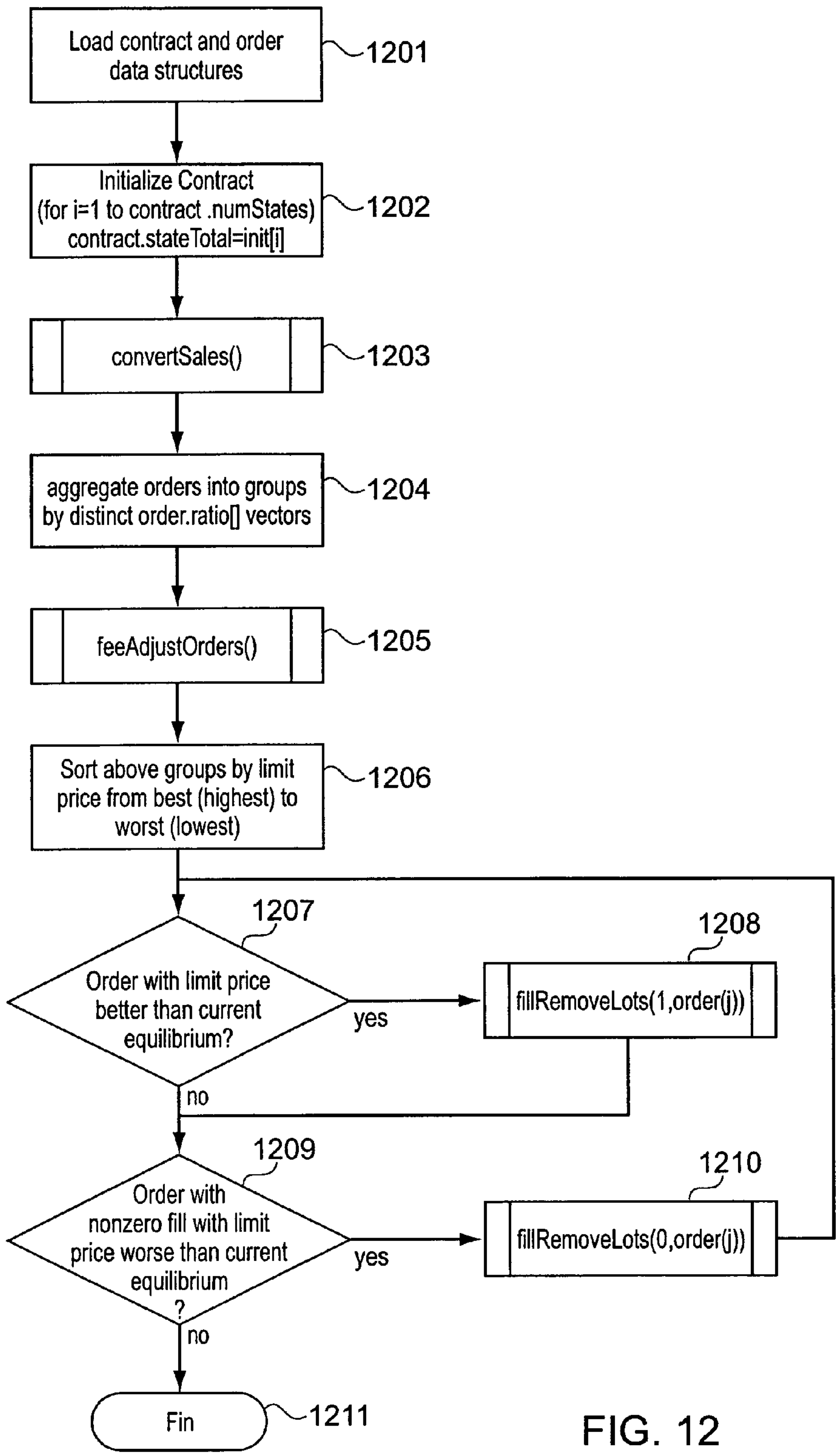
FIG. 12 depicts a preferred embodiment of a method for processing limit and market orders in a Demand-Based Adjustable Return Digital Options Exchange of the present invention.

(v) According to step 6.8(5) and based upon the description of limit order processing in connection with FIG. 12, in this illustrative example an order from Table 6.8.4 is identified which has a limit "price" better or higher than the current market "price" for a given contingent claim. For example, from Table 6.9.4, there is an order for 10000 digital puts struck at 80 with limit "price" equal to 0.9195. The current mid-market "price" for such puts is equal to 0.85714.

(vi) According to step 6.8(6), by the methods described in connection with FIG. 17, the maximum number of lots of the order for the 80 digital puts is added to already-invested amounts without increasing the recalculated mid-market "price," with the added lots, above the limit order price of 0.9195. This process discovers that, when five lots of the 80 digital put order for 10000 lots and limit "price" of 0.9195 are added, the new mid-market price is equal to 0.916667. Assuming the distribution of investments for this illustrative example, addition of any more lots will drive the mid-market price above the limit price. With the addition of these lots, the new market prices are:

TABLE 6.8.5

MSFT Digital Options
Prices after addition of five lots of 80 puts

| | CALLS | | | PUTS | | |
|---|---|---|---|---|---|---|
| STRIKE | IND MID | IND BID | IND OFFER | IND MID | IND BID | IND OFFER |
| 30 | 0.84722 | 0.84672 | 0.84772 | 0.15278 | 0.15228 | 0.15328 |
| 50 | 0.54167 | 0.54117 | 0.54217 | 0.45833 | 0.45783 | 0.45883 |
| 80 | 0.08333 | 0.08283 | 0.08383 | 0.91667 | 0.91617 | 0.91717 |

As can be seen from Table 6.8.5, the "prices" of the call options have decreased while the "prices" of the put options have increased as a result of filling five lots of the 80 digital put options, as expected.

Figure 17:
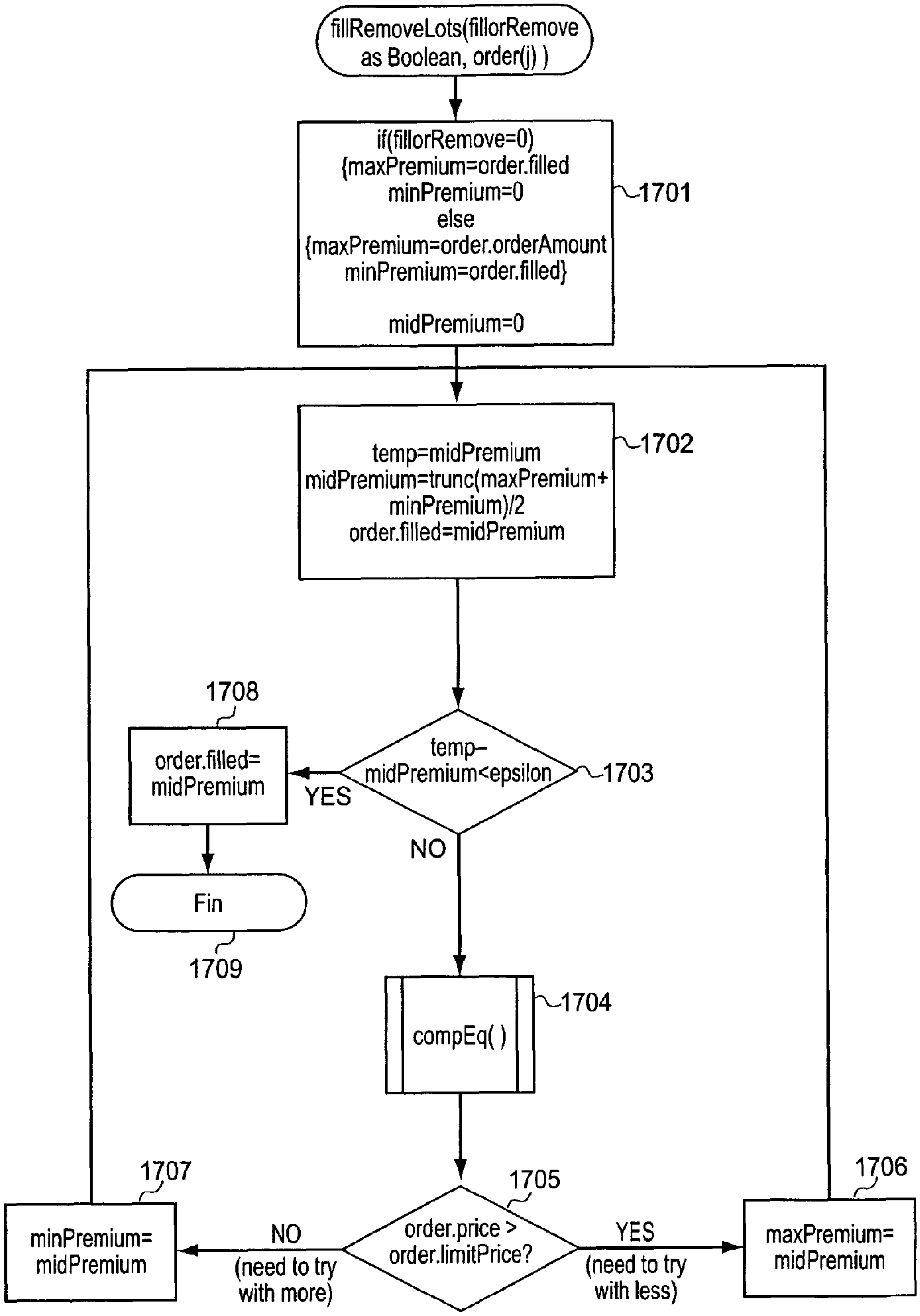
FIG. 17 depicts a preferred embodiment of a method for filling and removing lots of limit orders in a Demand-Based Adjustable Return Digital Options Exchange of the present invention.

(vii) According to step 6.8(7), the next step is to determine, as described in FIG. 17, whether there are any limit orders which have previously been filled whose limit "prices" are now less than the current mid-market "prices," and as such, should be subtracted. Since there are no orders than have been filled other than the just filled 80 digital put, there is no removal or "prune" step required at this stage in the process.

(viii) According to step 6.8(8), the next step is to identify another order which has a limit "price" higher than the current mid-market "prices" as a candidate for lot addition. Such a candidate is the order for 10000 lots of the 50 digital puts with limit price equal to 0.5795. Again the method of binary search is used to determine the maximum number of lots that can be added from this order to already-invested amounts without letting the recalculated mid-market "price" exceed the order's limit price of 0.5795. Using this method, it can be determined that only one lot can be added without forcing the new market "price" including the additional lot above 0.5795. The new prices with this additional lot are then:

TABLE 6.8.6

MSFT Digital Options
"Prices" after (i) addition of five lots of 80 puts and
(ii) addition of one lot of 50 puts

| | CALLS | | | PUTS | | |
|---|---|---|---|---|---|---|
| STRIKE | IND MID | IND BID | IND OFFER | IND MID | IND BID | IND OFFER |
| 30 | 0.82420 | 0.82370 | 0.82470 | 0.17580 | 0.17530 | 0.17630 |
| 50 | 0.47259 | 0.47209 | 0.47309 | 0.52741 | 0.52691 | 0.52791 |
| 80 | 0.07692 | 0.07642 | 0.07742 | 0.923077 | 0.92258 | 0.92358 |

Continuing with step 6.8(8), the next step is to identify an order whose limit "price" is now worse (i.e., lower than) the mid-market "prices" from the most recent equilibrium calculation as shown in Table 6.8.6. As can be seen from the table, the mid-market "price" of the 80 digital put options is now 0.923077. The best limit order (highest "priced") is the order for 10000 lots at 0.9195, of which five are currently filled. Thus, the binary search routine determines the minimum number of lots which are to be removed from this order so that the order's limit "price" is no longer worse (i.e., lower than) the newly recalculated market "price." This is the removal or prune part of the equilibrium calculation.

The "add and prune" steps are repeated iteratively with intermediate multistate equilibrium allocations performed. The contract is at equilibrium when no further lots may be added for orders with limit order "prices" better than the market or removed for limit orders with "prices" worse than the market. At this point, the group of DBAR contingent claims (sometimes referred to as the "contract") is in equilibrium, which means that all of the remaining conditional investments or limit orders—i.e., those that did not get removed—receive "prices" in equilibrium which are equal to or better than the limit "price" conditions specified in each order. In the present illustration, the final equilibrium "prices" are:

TABLE 6.8.7

| MSFT Digital Options Equilibrium Prices | | | | | | |
|---|---|---|---|---|---|---|
| | CALLS | | | PUTS | | |
| STRIKE | IND MID | IND BID | IND OFFER | IND MID | IND BID | IND OFFER |
| 30 | 0.830503 | 0.830003 | 0.831003 | 0.169497 | 0.168997 | 0.169997 |
| 50 | 0.480504 | 0.480004 | 0.481004 | 0.519496 | 0.518996 | 0.519996 |
| 80 | 0.139493 | 0.138993 | 0.139993 | 0.860507 | 0.860007 | 0.861007 |

Thus, at these equilibrium "prices," the following table shows which of the original orders are executed or "filled":

TABLE 6.8.8

| Filled Buy Orders | | |
|---|---|---|
| Limit "Price" | Quantity | Filled |
| | 30 calls | |
| 0.82 | 10000 | 0 |
| 0.835 | 10000 | 10000 |
| 0.84 | 10000 | 10000 |
| | 80 puts | |
| 0.88 | 10000 | 10000 |
| 0.9 | 10000 | 10000 |
| 0.92 | 10000 | 10000 |
| | 50 calls | |
| 0.43 | 10000 | 0 |
| 0.47 | 10000 | 0 |
| 0.5 | 10000 | 10000 |
| | 50 puts | |
| 0.5 | 10000 | 0 |
| 0.52 | 10000 | 2425 |
| 0.54 | 10000 | 10000 |
| | 80 calls | |
| 0.1 | 10000 | 0 |
| 0.14 | 10000 | 8104 |
| | 30 puts | |
| 0.16 | 10000 | 0 |
| 0.17 | 10000 | 2148 |

TABLE 6.8.9

| Filled Sell Orders | | |
|---|---|---|
| Limit "Price" | Quantity | Filled |
| | 30 calls | |
| 0.81 | 5000 | 5000 |
| | 80 puts | |
| 0.9 | 20000 | 0 |
| | 50 calls | |
| 0.42 | 10000 | 10000 |
| 0.44 | 10000 | 10000 |
| | 50 puts | |
| 0.45 | 10000 | 10000 |
| 0.50 | 10000 | 10000 |
| | 80 calls | |
| 0.11 | 10000 | 10000 |
| 0.12 | 10000 | 10000 |
| | 30 puts | |
| 0.15 | 5000 | 5000 |
| 0.16 | 10000 | 10000 |

It may be possible only partially to execute or "fill" a trader's order at a given limit "price" or implied probability of the relevant states. For example, in the current illustration, the limit buy order for 50 puts at limit "price" equal to 0.52 for an order amount of 10000 may be only filled in the amount 2424 (see Table 6.8.8). If orders are made by more than one investor and not all of them can be filled or executed at a given equilibrium, in preferred embodiments it is necessary to decide how many of which investor's orders can be filled, and how many of which investor's orders will remain unfulfilled at that equilibrium. This may be accomplished in several ways, including by filling orders on a first-come-first-filled basis, or on a pro rata or other basis known or apparent to one of skill in the art. In preferred embodiments, investors are notified prior to the commencement of a trading period about the basis on which orders are filled when all investors' limit orders cannot be filled at a particular equilibrium.

6.9 Sensitivity Analysis and Depth of Limit Order Book

In preferred embodiments of the present invention, traders in DBAR digital options may be provided with information regarding the quantity of a trade that could be executed ("filled") at a given limit "price" or implied probability for a given option, spread or strip. For example, consider the MSFT digital call option with strike of 50 illustrated in Table 6.1.1 above. Assume the current "price" or implied probability of the call option is 0.4408 on the "offer" side of the market. A trader may desire, for example, to know what quantity of value units could be transacted and executed at any given moment for a limit "price" which is better than the market. In a more specific example, for a purchase of the 50 strike call option, a trader may want to know how much would be filled at that moment were the trader to specify a limit "price" or implied probably of, for example, 0.46. This information is not necessarily readily apparent, since the acceptance of conditional investments (i.e., the execution of limit orders) changes the implied probability or "price" of each of the states in the group. As the limit "price" is increased, the quantities specified in a buy order are more likely to be filled, and a curve can be drawn with the associated limit "price"/quantity pairs. The curve represents the amount that could be filled (for example, along the X-axis) versus the corresponding limit "price" or implied probability of the strike of the order (for example, along the Y-axis). Such a curve should be useful to traders, since it provides an indication of the "depth" of the DBAR DOE for a given contract or group of contingent claims. In other words, the curve provides information on the "price" or implied probability, for example, that a buyer would be required to accept in order to execute a predetermined or specified number of value units of investment for the digital option.

6.10 Networking of DBAR Digital Options Exchanges

In preferred embodiments, one or more operators of two or more different DBAR Digital Options Exchanges may synchronize the time at which trading periods are conducted (e.g., agreeing on the same commencement and predetermined termination criteria) and the strike prices offered for a given underlying event to be observed at an agreed upon time. Each operator could therefore be positioned to offer the same trading period on the same underlying DBAR event of economic significance or financial instrument. Such synchronization would allow for the aggregation of liquidity of two or more different exchanges by means of computing DBAR DOE equilibria for the combined set of orders on the participating exchanges. This aggregation of liquidity is designed to result in more efficient "pricing" so that implied probabilities of the various states reflect greater information about investor expectations than if a single exchange were used.

7. DBAR DOE

Another Embodiment

In another embodiment of a DBAR Digital Options Exchange ("DBAR DOE"), a type of demand-based market or auction, all orders for digital options are expressed in terms of the payout (or "notional payout") received should any state of the set of constituent states of a DBAR digital option occur (as opposed to, for example, expressing buy digital option orders in terms of premium to be invested and expressing "sell" digital option orders in terms of notional payout, or notional payout less the premium received). In this embodiment, the DBAR DOE can accept and process limit orders for digital options expressed in terms of each trader's desired payout. In this embodiment, both buy and sell orders may be handled consistently, and the speed of calculation of the equilibrium calculation is increased. This embodiment of the DBAR DOE can be used with or without limit orders (also referred to as conditional investments). Additionally this embodiment of the DBAR DOE can be used to trade in a demand-based market or auction based on any event, regardless of whether the event is economically significant or not.

In this embodiment, an equilibrium algorithm (set forth in Equations 7.3.7 and 7.4.7) may be used on orders without limits (without limits on the price), to determine the prices and total premium invested into a DBAR DOE market or auction based only upon information concerning the requested payouts per order and the defined states (or spreads) for which the desired digital option is in-the-money (the payout profile for the order). The requested payout per order is the executed notional payout per order, and the trader or user pays the price determined at the end of the trading period by the equilibrium algorithm necessary to receive the requested payout.

In this embodiment, an optimization system (also referred to as the Order Price Function or OPF) may also be utilized that maximizes the payouts per order within the constraints of the limit order. In other words, when a user or trader specifies a limit order price, and also specifies the requested payouts per order and the defined states (or spreads) for which the desired digital option is in-the-money, then the optimization system or OPF determines a price of each order that is less than or equal to each order's limit price, while maximizing the executed notional payout for the orders. As set forth below, in this limit order example, the user may not receive the requested payout but will receive a maximum executed notional payout given the limit price that the user desires to invest for the payout.

In other words, in this embodiment, three mathematical principles underlie demand-based markets or auctions: demand-based pricing and self-funding conditions; how orders in digital options are constituted in a demand-based market or auction; and, how a demand-based auction or market may be implemented with standard limit orders. Similar equilibrium algorithms, optimization systems, and mathematical principles also underlie and apply to demand-based markets or auctions that include one or more customer orders for derivatives strategies or other contingent claims, that are replicated or approximated with a set of replicating claims, which can be digital options and/or vanilla options, as described in greater detail in Sections 10, 11 and 13 below. These customer orders are priced based upon a demand-based valuation of the replicating digital options and/or vanilla options that replicate the derivatives strategies, and the demand-based valuation includes the application of the equilibrium algorithm, optimization system and mathematical principals to such an embodiment.

In this DBAR DOE embodiment, for each demand-based market or auction, the demand-based pricing condition applies to every pair of fundamental contingent claims. In demand-based systems, the ratio of prices of each pair of fundamental contingent claims is equal to the ratio of volume filled for those claims. This is a notable feature of DBAR contingent claims markets because the demand-based pricing condition relates the amount of relative volumes that may clear in equilibrium to the relative equilibrium market prices.

Thus, a demand-based market microstructure, which is the foundation of demand-based market or auction, is unique among market mechanisms in that the relative prices of claims are directly related to the relative volume transacted of those claims. By contrast, in conventional markets, which have heretofore not adopted demand-based principles, relative contingent claim prices typically reflect, in theory, the absence of arbitrage opportunities between such claims, but nothing is implied or can be inferred about the relative volumes demanded of such claims in equilibrium.

Equation 7.4.7, as set forth below, is the equilibrium equation for demand-based trading in accordance with one embodiment of the present invention. It states that a demand-based trading equilibrium can be mathematically expressed in terms of a matrix eigensystem, in which the total premium collected in a demand-based market or auction (T) is equal to the maximum eigenvalue of a matrix (H) which is a function of the aggregate notional amounts executed for each fundamental spread and the opening orders. In addition, the eigenvector corresponding to this maximum eigenvalue, when normalized, contains the prices of the fundamental single strike spreads. Equation 7.4.7 shows that given aggregate notional amounts to be executed (Y) and arbitrary amounts of opening orders (K), that a unique demand-based trading equilibrium results. The equilibrium is unique because a unique total premium investment, T, is associated with a unique vector of equilibrium prices, p, by the solution of the eigensystem of Equation 7.4.7.

Demand-based markets or auctions may be implemented with a standard limit order book in which traders attach price conditions for execution of buy and sell orders. As in any other market, limit orders allow traders to control the price at which their orders are executed, at the risk that the orders may not be executed in full or in part. Limit orders may be an important execution control feature in demand-based auctions or markets because final execution is delayed until the end of the trading or auction period.

Demand-based markets or auctions may incorporate standard limit orders and limit order book principles. In fact, the limit order book employed in a demand-based market or auction and the mathematical expressions used therein may be compatible with standard limit order book mechanisms for other existing markets and auctions. The mathematical expression of a General Limit Order Book is an optimization problem in which the market clearing solution to the problem maximizes the volume of executed orders subject to two constraints for each order in the book. According to the first constraint, should an order be executed, the order's limit price is greater than or equal to the market price including the executed order. According to the second constraint, the order's executed notional amount is not to exceed the notional amount requested by the trader to be executed.

7.1 Special Notation

For the purposes of the discussion of the embodiment described in the present section, the following notation is utilized. The notation uses some symbols previously employed in other sections of this specification. It should be understood that the meanings of these notational symbols are valid as defined below only in the context of the discussion in the present section (Section 7—DBAR DOE: ANOTHER EMBODIMENT as well as the discussion in relation to FIG. 19 and FIG. 20 in Section 9).

Known Variables m: number of defined states or spreads, a natural number. Index letter i, i=1, 2, . . . , m.

k: m×1 vector where $k_i$ is the initial invested premium for state i, i=1, 2, . . . , m.

$k_i$ is a natural number so $k_i>0$ i=1, 2, . . . , m e: a vector of ones of length m (m×1 unit vector)

n: number of orders in the market or auction, a natural number. Index letter j, j=1, 2, . . . , n r: n×1 vector where $r_j$ is equal to the requested payout for order j, j=1, 2, . . . , n. $r_j$ is a natural number so $r_j$ is positive for all j, j 1, 2, . . . , n w: n×1 vector where $w_j$ equals the inputted limit price for order j, j=1, 2, . . . , n Range:

$0<w_j\leqq 1$ for j=1, 2, . . . , n for digital options $0<w_j$ for j=1, 2, . . . , n for arbitrary payout options $w_j^a$: n×1 vector where $w_j^a$ is the adjusted limit price for order j after converting "sell" orders into buy orders (as discussed below) and after adjusting the inputted limit order $w_j$ with fee $f_j$ (assuming flat fee) for order j, j=1, 2 . . . , n For a "sell" order j, the adjusted limit price $w_j^a$ equals $(1-w_j-f_j)$ For a buy order j, the adjusted limit price $w_j^a$ equals $(w_j-f_j)$ B: n×m matrix where $B_{j,i}$ is a positive number if the jth order requests a payout for the $i^{th}$ state, and 0 otherwise. For digital options, the positive number is one.

Each row j of B comprises a payout profile for order j.

$f_j$: transaction fee for order j, scalar (in basis points) added to and subtracted from equilibrium price to obtain offer and bid prices, respectively, and subtracted from and added to limit prices, $w_j$, to obtain adjusted limit price, $w_j^a$ for buy and sell limit prices, respectively.

Unknown Variables x: n×1 vector where $x_j$ is the notional payout executed for order j in equilibrium Range: $0\leqq x_j\leqq r_j$ for j=1, 2, . . . , n y: m×1 vector where $y_i$ is the notional payout executed per defined state i, i=1, 2, . . . , m Definition: $y\equiv B^T x$ T: positive scalar, not necessarily an integer.

T is the total invested premium (in value units) in the contract $$T=\sum_{i=1}^{m} y_i p_i+\sum_{i=1}^{m} k_i=\sum_{j=1}^{n} x_j \pi_j+\sum_{i=1}^{m} k_i$$

$T_i$: positive scalar, not necessarily an integer $T_i$ is the total invested premium (in value units) in state i p: m×1 vector where $p_i$ is the price/probability for state i, i=1, 2, . . . , m $$p_i\equiv\frac{k_i}{T-y_i}$$

for i=1, 2, . . . , m $\pi_j$: equilibrium price for order j $\pi(x)$: B*p, an n×1 vector containing the equilibrium prices for each order j.

g: n×1 vector whose j element is $g_i$ for j=1, 2, . . . , n

Definition: g≡B*p−w

Note B*p is the vector of market prices for order j denoted by $\pi_j$ g is the difference between the market prices and the limit prices 7.2 Elements of Example DBAR DOE Embodiment In this embodiment (Section 7), traders submit orders during the DBAR market or auction that include the following data: (1) an order payout size (denoted $r_j$), (2) a limit order price (denoted $w_j$), and (3) the defined states for which the desired digital option is in-the-money (denoted as the rows of the matrix B, as described in the previous sub-section). In this embodiment, all of the order requests are in the form of payouts to be received should the defined states over which the respective options are in-the-money occur. In Section 6, an embodiment was described in which the order amounts are invested premium amounts, rather than the aforementioned payouts.

7.3 Mathematical Principles

In this embodiment of a DBAR DOE market or auction, traders are able to buy and sell digital options and spreads. The fundamental contingent claims of this market or auction are the smallest digital option spreads, i.e., those that span a single strike price. For example, a demand-based market or auction, such as, for example, a DBAR auction or market, that offers digital call and put options with strike prices of 30, 40, 50, 60, and 70 contains six fundamental states: the spread below and including 30; the spread between 30 and 40 including 40; the spread between 40 and 50 including 50; etc. As indicated in the previous section, in this embodiment, $p_i$ is the price of a single strike spread i and m is the number of fundamental single state spreads or "defined states." For these single strike spreads, the following assumptions are made:

DBAR DOE Assumptions for this Embodiment $$(1)\ \sum_{i=1}^{m} p_i = 1 \qquad 7.3.1$$

$$(2)\ p_i > 0 \text{ for } i = 1, \ldots, m$$

$$(3)\ k_i > 0 \text{ for } i = 1, \ldots, m$$

The first assumption, equation 7.3.1(1), is that the fundamental spread prices sum to unity. This equation holds for this embodiment as well as for other embodiments of the present invention. Technically, the sum of the fundamental spread prices should sum to the discount factor that reflects the time value of money (i.e., the interest rate) prevailing from the time at which investors must pay for their digital options to the time at which investors receive a payout from an in-the-money option after the occurrence of a defined state. For the purposes of this description of this embodiment, the time value of money during this period will be taken to be zero, i.e., it will be ignored so that the fundamental spread prices sum to unity. The second assumption, equation 7.3.1(2), is that each price must be positive. Assumption 3, equation 7.3.1(3), is that the DBAR DOE contract of the present embodiment is initialized (see Section 6.7, above) with value units invested in each state in the amount of $k_i$ (initial amount of value units invested for state i).

Using the notation from Section 7.1, the Demand Reallocation Function (DRF) of this embodiment of an OPF is a canonical DRF (CDRF), setting the total amount of investments that are allocated using multistate allocation techniques to the defined states equal to the total amount of investment in the auction or market that is available (net of any transaction fees) to allocate to the payouts upon determining the defined state which has occurred. Alternatively, a non-canonical DRF may be used in an OPF.

Under a CDRF, the total amount invested in each defined state is a function of the price in that state, the total amount of notional payout requested for that state, and the initial amount of value units invested in the defined state, or:

$$T_i = p_i * y_i + k_i \qquad 7.3.2$$

The ratio of the invested amounts in any two states is therefore equal to:

$$\frac{T_i}{T_j} = \frac{p_i * y_i + k_i}{p_j * y_j + k_j} \qquad 7.3.3$$

As described previously, since each state price is equal to the total investment in the state divided by the total investment over all of the states ($p_i=T_i/T$ and $p_j=T_j/T$), the ratio of the investment amounts in each DBAR contingent claim defined state is equal to the ratio of the prices or implied probabilities for the states, which, using the notation of Section 7.1, yields:

$$\frac{T_i}{T_j} = \frac{p_i * y_i + k_i}{p_j * y_j + k_j} = \frac{p_i}{p_j} \qquad 7.3.4$$

Eliminating the denominators of the previous equation and summing over j yields:

$$\sum_{j=1}^{m} p_j (p_i * y_i + k_i) = \sum_{j=1}^{m} p_i * (p_j * y_j + k_j) \qquad 7.3.5$$

Substitution for T into the above equation yields:

$$(p_i * y_i + k_i)\left(\sum_{j=1}^{m} p_j\right) = p_i T \qquad 7.3.6$$

By the assumption that the state prices or probabilities sum to unity from Equation 7.3.1, this yields the following equation:

$$p_i = \frac{k_i}{T - y_i} \qquad 7.3.7$$

This equation yields the state price or probability of a defined state in terms of: (1) the amount of value units invested in each state to initialize the DBAR auction or market ($k_i$); (2) the total amount of premium invested in the DBAR auction or market (T); and (3) the total amount of payouts to be executed for all of the traders' orders for state i ($y_i$). Thus, in this embodiment, Equation 7.3.7 follows from the assumptions stated above, as indicated in the equations in 7.3.1, and the requirement the DRF imposes that the ratio of the state prices for any two defined states in a DBAR auction or market be equal to the ratio of the amount of invested value units in the defined states, as indicated in Equation 7.3.4.

7.4 Equilibrium Algorithm

From equation 7.3.7 and the assumption that the probabilities of the defined states sum to one (again ignoring any interest rate considerations), the following m+1 equations may be solved to obtain the unique set of defined state probabilities (p's) and the total premium investment for the group of defined states or contingent claims:

$$p_i = \frac{k_i}{T - y_i},\ i = 1, 2, \ldots, m \quad \text{(a)} \qquad 7.4.1$$

-continued $$\sum_{i=1}^{m} p_i = \sum_{i=1}^{m} \frac{k_i}{T - y_i} = 1 \qquad \text{(b)}$$

Equation 7.4.1 contains m+1 unknowns and m+1 equations. The unknowns are the $p_i$, i=1, 2, . . . , m, and T, the total investment for all of the defined states. In accordance with the embodiment, the method of solution of the m+1 equations is to first solve Equation 7.4.1(b). This equation is a polynomial in T. By the assumption that all of the probabilities of the defined states must be positive, as stated in Equation 7.3.1, and that the probabilities also sum to one, as also stated in Equation 7.3.1, the defined state probabilities are between 0 and 1 or:

$0<p_i<1$, which implies $$0 < \frac{k_i}{T - y_i} < 1,$$

for i=1, 2, . . . m, which implies $T>y_i+k_i$, for $i$=1, 2, . . . m, which implies $$T>\max(y_i+k_i), \text{ for } i=1, 2, \ldots m \qquad 7.4.2$$

So the lower bound for T is equal to:

$$T_{lower}=\max(y_i+k_i)$$

By Equation 7.3.2:

$$T = \sum_{i=1}^{m} T_i = \sum_{i=1}^{m} k_i + \sum_{i=1}^{m} p_i y_i \qquad 7.4.3$$

Letting $y_{(m)}$ be the maximum value of the y's, $$T = \sum_{i=1}^{m} k_i + \sum_{i=1}^{m} p_i y_i \le \sum_{i=1}^{m} k_i + \sum_{i=1}^{m} p_i y_{(m)} = \sum_{i=1}^{m} k_i + y_{(m)} \sum_{i=1}^{m} p_i = \sum_{i=1}^{m} k_i + y_{(m)} \qquad 7.4.4$$

Thus, the upper bound for T is equal to:

$$T_{upper} = \sum_{i=1}^{m} k_i + y_{(m)} = \max(y_i) + \sum_{i=1}^{m} k_i \qquad 7.4.5$$

The solution for the total investment in the defined states therefore lies in the following interval $T_{lower}<T\leqq T_{upper}$, or $$\max(y_i + k_i) < T \le \max(y_i) + \sum_{i=1}^{m} k_i \qquad 7.4.6$$

In this embodiment, T is determined uniquely from the equilibrium execution order amounts, denoted by the vector x. Recall that in this embodiment, $y \equiv B^T x$. As shown above, $$T \in (T_{lower}, T_{upper}]$$

Let the function f be $$f(T) = \sum_{i=1}^{m} \left(\frac{k_i}{T - y_i}\right) - 1 = 0 = \sum_{i=1}^{m} p_i - 1$$

Further, $$f(T_{lower})>0$$

$$f(T_{upper})<0$$

Now, over the range $T \in (T_{lower}, T_{upper}]$, f(T) is differentiable and strictly monotonically decreasing. Thus, there is a unique T in the range such that $$f(T)=0$$

Thus, T is uniquely determined by the $x_j$'s (the equilibrium executed notional payout amounts for each order j).

The solution for Equation 7.4.1(b) can therefore be obtained using standard root-finding techniques, such as the Newton-Raphson technique, over the interval for T stated in Equation 7.4.6. Recall that the function f(T) is defined as $$f(T) = \sum_{i=1}^{m} \left(\frac{k_i}{T - y_i}\right) - 1$$

The first derivative of this function is therefore:

$$f'(T) = \frac{df}{dT} = -\sum_{i=1}^{m} \frac{k_i}{(T - y_i)^2}$$

Thus for T, take for an initial guess $$T^0=\text{Max}(y_1+k_1, y_2+k_2, \ldots, y_m+k_m)$$

For the p+1$^{st}$ guess use $$T^{p+1} = T^p - \frac{f(T^p)}{f'(T^p)}$$

and calculate iteratively until a desired level of convergence to the root of f(T), is obtained.

Once the solution for Equation 7.4.1(b) is obtained, the value of T can be substituted into each of the m equations in 7.4.1(a) to solve for the $p_i$. When the T and the $p_i$ are known, all prices for DBAR digital options and spreads may be readily calculated, as indicated by the notation in 7.1.

Note that, in the alternative embodiment with no limit orders (briefly discussed at the beginning of this section 7), there are no constraints set by limit prices, and the above equilibrium algorithm is easily calculated because $x_j$, the executed notional payout amounts for each order j, is equal to $r_j$ (a known quantity), the requested notional payout for order j.

Regardless of the presence of limit orders, an equivalent set of mathematics for this embodiment of a DBAR DOE is developed using matrix notation. The matrix equivalent of Equation 7.3.2 may be written as follows:

$$H^*p=T^*p \qquad 7.4.7$$

where T and p are the total premium and state probability vector, respectively, as described in Section 7.1. The matrix H, which has m rows and m columns where m is the number of defined states in the DBAR market or auction, is defined as follows:

$$H=\begin{bmatrix} y_1+k_1 & k_1 & k_1 & \dots & k_1 \\ k_2 & y_2+k_2 & k_2 & \dots & k_2 \\ \vdots & \vdots & \vdots & \dots & \vdots \\ k_m & k_m & k_m & \dots & y_m+k_m \end{bmatrix} \qquad 7.4.8$$

H is a matrix with m rows and m columns. Each diagonal entry of H is equal to $y_i+k_i$ (the sum of the notional payout requested by all the traders for state i and the initial amount of value units invested for state i). The other entries for each row are equal to $k_i$ (the initial amount of value units invested for state i). Equation 7.4.7 is an eigenvalue problem, where:

$$H=Y+K^*V$$

Y=an m×m diagonal matrix of the aggregate notional amounts to be executed, $Y_{i,j}=y_i$ K=an m×m diagonal matrix of the arbitrary amounts of opening orders, $K_{i,j}=k_i$ V=an m×m matrix of ones, $V_{i,j}=1$ T=max ($\lambda_i$(H)), i.e., the maximum eigenvalue of the matrix H; and p=|v(H,T)|, i.e., the normalized eigenvector associated with the eigenvalue T.

Thus, Equation 7.4.7 is, in this embodiment, a method of mathematically describing the equilibrium of a DBAR digital options market or auction that is unique given the aggregate notional amounts to be executed (Y) and arbitrary amounts of opening orders (K). The equilibrium is unique since a unique total premium investment, T, is associated with a unique vector of equilibrium prices, p, by the solution of the eigensystem of Equation 7.4.7.

7.5 Sell Orders

In this embodiment, "sell" orders in a DBAR digital options market or auction are processed as complementary buy orders with limit prices equal to one minus the limit price of the "sell" order. For example, for the MSFT Digital Options auction of Section 6, a sell order for the 50 calls with a limit price of 0.44 would be processed as a complementary buy order for the 50 puts (which are complementary to the 50 calls in the sense that the defined states which are spanned by the 50 puts are those which are not spanned by the 50 calls) with limit price equal to 0.56 (i.e., 1−0.44). In this manner, buy and sell orders, in this embodiment of this Section 7, may both be entered in terms of notional payouts. Selling a DBAR digital call, put or spread for a given limit price of an order j ($w_j$) is equivalent to buying the complementary digital call, put, or spread at the complementary limit price of order j ($1-w_j$).

7.6 Arbitrary Payout Options

In this embodiment, a trader may desire an option that has a payout should the option expire in the money that varies depending upon which defined in-the-money state occurs. For example, a trader may desire twice the payout if the state [40,50) occurs than if the state [30,40) occurs. Similarly, a trader may desire that an option have a payout that is linearly increasing over the defined range of in-the-money states ("strips" as defined in Section 6 above) in order to approximate the types of options available in non-DBAR, traditional markets. Options with arbitrary payout profiles can readily be accommodated with the DBAR methods of the present invention. In particular, the B matrix, as described in Section 7.2 above, can readily represent such options in this embodiment. For example, consider a DBAR contract with 5 defined states. If a trader desires an option that has the payout profile (0,0,1,2,3), i.e., an option that is in-the-money only if the last 3 states occur, and for which the fourth state has a payout twice the third, and the fifth state a payout three times the third, then the row of the B matrix corresponding to this order is equal to (0,0,1,2,3). By contrast, a digital option for which the same three states are in-the-money would have a corresponding entry in the B matrix of (0,0,1,1,1). Additionally, for digital options all prices, both equilibrium market prices and limit prices, are bound between 0 and 1. This is because all options are equally weighted linear combinations of the defined state probabilities. If, however, options with arbitrary payout distributions are processed, then the linear combinations (as based upon the rows of the B matrix) will not be weighted equally and prices need not be bounded between 0 and 1. For ease of exposition, the bulk of the disclosure in this Section 7 has assumed that digital options (i.e., equally weighted payouts) are the only options under consideration.

7.7 Limit Order Book Optimization

In this embodiment of a DBAR digital options exchange or market or auction as described in this Section 7, traders may enter orders for digital calls, puts, and spreads by placing conditional investment or limit orders. As indicated previously in Section 6.8, a limit order is an order to buy or sell a digital call, put or spread that contains a price (the "limit price") worse than which the trader desires not to have his order executed. For example, for a buy order of a digital call, put, or spread, a limit order will contain a limit price which indicates that execution should occur only if the final equilibrium price of the digital call, put or spread is at or below the limit price for the order. Likewise, a limit sell order for a digital option will contain a limit price which indicates that the order is to be executed if the final equilibrium price is at or higher than the limit sell price. All orders are processed as buy orders and are subject to execution whenever the order's limit price is greater than or equal to the then prevailing equilibrium price, because sell orders may be represented as buy orders, as described in the previous section.

In this embodiment, accepting limit orders for a DBAR digital options exchange uses the solution of a nonlinear optimization problem (one example of an OPF). The problem seeks to maximize the sum total of notional payouts of orders that can be executed in equilibrium subject to each order's limit price and the DBAR digital options equilibrium Equation 7.4.7. Mathematically, the nonlinear optimization that represents the DBAR digital options market or auction limit order book may be expressed as follows:

$$x^*=\underset{x}{\operatorname{argmax}}\sum_{j=1}^{n} x_j$$

subject to $$(1)\,g_j(x)=x_j(\pi_j(x)-w_j^a)\leqq 0 \qquad 7.7.1$$

$$(2)\,0\leqq x_j\leqq r_j$$

$$(3)\,Hp=Tp$$

The objective function of the optimization problem in 7.7.1 is the sum of the payout amounts for all of the limit orders that may be executed in equilibrium. The first constraint, 7.7.1(1), requires that the limit price be greater than or equal to the equilibrium price for any payout to be executed in equilibrium (recalling that all orders, including "sell" orders, may be processed as buy orders). The second constraint, 7.7.1(2), requires that the execution payout for the order be positive and less than or equal to the requested payout of the order. The third constraint, 7.7.1(3) is the DBAR digital option equilibrium equation as described in Equation 7.4.7. These constraints also apply to DBAR or demand-based markets or auctions, in which contingent claims, such as derivatives strategies, are replicated with replicating claims (e.g., digital options and/or vanilla options), and then evaluated based on a demand-based valuation of these replicating claims, as described in Sections 10, 11 and 13 below.

7.8 Transaction Fees

In this embodiment, before solving the nonlinear optimization problem, the limit order prices for "sell" orders provided by the trader are converted into buy orders (as discussed above) and both buy and "sell" limit order prices are adjusted with the exchange fee or transaction fee, $f_j$. The transaction fee can be set for zero, or it can be expressed as a flat fee as set forth in this embodiment which is added to the limit order price received for "sell" orders, and subtracted from the limit order price paid for buy orders to arrive at an adjusted limit order price $w_j^a$ for order j, as follows:

For a "sell" order $j, w_j^a=1-w_j-f_j$ 7.8.1

For a buy order $j, w_j^a=w_j-f_j$ 7.8.2

Alternatively, if the transaction fee $f_j$ is variable, and expressed as a percentage of the limit order price, $w_j$, then the limit order price may be adjusted as follows:

For a "sell" order j, $$w_j^a=(1-w_j)*(1-f_j) \quad 7.8.3$$

For a buy order j, $$w_j^a=w_j*(1-f_j) \quad 7.8.4$$

The transaction fee $f_j$ can also depend on the time of trade, to provide incentives for traders to trade early or to trade certain strikes, or otherwise reflect liquidity conditions in the contract. Regardless of the type of transaction fee $f_j$, the limit order prices $w_j$ should be adjusted to $w_j^a$ before beginning solution of the nonlinear optimization program. Adjusting the limit order price adjusts the location of the outer boundary for optimization set by the limiting equation 7.7.1(1). After the optimization solution has been reached, the equilibrium prices for each executed order j, $\pi_j(x)$ can be adjusted by adding the transaction fee to the equilibrium price to produce the market offer price, and by subtracting the transaction fee from the equilibrium price to produce the market bid price. The limit and equilibrium prices for each executed customer order, in an example embodiment in which derivative strategies are replicated into a digital or vanilla replicating basis, and then subject to a demand-based valuation, as more fully set forth in Sections 10, 11 and 13, can similarly be adjusted with transaction fees.

7.9 An Embodiment of the Algorithm to Solve the Limit Order Book Optimization

In this embodiment, the solution of Equation 7.7.1 can be achieved with a stepping iterative algorithm, as described in the following steps:

(1) Place Opening Orders: For each state, premium equal to $k_i$, for i=1, 2, . . . , m, is invested. These investments are called the "opening orders." The size of such investments, in this embodiment, are generally small relative to the subsequent orders.

(2) Convert all "sale" orders to complementary buy orders. As indicated previously in Section 6.8, this is achieved by (i) identifying the range of defined states i complementary to the states being "sold"; and (ii) adjusting the limit "price" ($w_j$) to one minus the original limit "price" ($1-w_j$). Note that by contrast to the method disclosed in Section 6.8, there is no need to convert the amount being sold into an equivalent amount being bought. In this embodiment in this section, both buy and "sell" orders are expressed in terms of payout (or notional payout) terms.

(3) For all limit orders, adjust the limit "prices" ($w_j$, $1-w_j$) with transaction fee, by subtracting the transaction fee $f_j$: For a "sell" order j, the adjusted limit price $w_j^a$ therefore equals ($1-w_j+f_j$), while for a buy order j, the adjusted limit price $w_j^a$ equals ($w_j-f_j$).

(4) As indicated above in Section 6.8, group the limit orders by placing all of the limit orders that span or comprise the same range of defined states into the same group. Sort each group from the best (highest "price" buy) to the worst (lowest "price" buy).

(5) Establish an initial iteration step size, $\alpha_j(1)$. In this embodiment the initial iteration step size $\alpha_j(1)$ may be chosen to bear some reasonable relationship to the expected order sizes to be encountered in the DBAR digital options market or auction. In most applications, an initial iteration step size $\alpha_j(1)$ equal to 100 is adequate. The current step size $\alpha_j(\kappa)$ will initially equal the initial iteration step size ($\alpha_j(\kappa)=\alpha_j(1)$ for first iteration) until and unless the current step size is adjusted to a different step size.

(6) Calculate the equilibrium to obtain the total investment amount T and the state probabilities, p, using equation 7.4.7. Although the eigenvalues can be computed directly, this embodiment finds T by Newton-Raphson solution of Equation 7.4.1(b). The solution to T and equation 7.4.1(a) is used to find the p's.

(7) Compute the equilibrium order prices $\pi(x)$ using the p's obtained in step (5). The equilibrium order prices $\pi(x)$ are equal to B*p.

(8) Increment the orders ($x_j$) that have adjusted limit prices ($w_j^a$) greater than or equal to the current equilibrium price for that order $\pi_j(x)$ (obtained in step (6)) by the current step size $\alpha_j(\kappa)$, but not to exceed the requested notional payout of the order, $r_j$. Decrement the orders ($x_j$) that have a positive executed order amount ($x_j>0$) and have limit prices less than the current equilibrium market price $\pi_j(x)$ by the current step size $\alpha_j(\kappa)$, but not to an amount less than zero.

(9) Repeat steps (5) to (7) in subsequent iterations until the values obtained for the executed order amounts ($x_j$'s) achieve a desired convergence, as measured by certain convergence criteria (set forth in Step (8)a), periodically adjusting the current step size $\alpha_j(\kappa)$ and/or the iteration process after the initial iteration to further progress the stepping iterative process towards the desired convergence. The adjustments are set forth in steps (8)b to (8)d.

(8)a In this embodiment, the stepping iterative algorithm is considered converged based upon a number of convergence criteria. One such criterion is a convergence of the state probabilities ("prices") of the individual defined states. A sampling window can be chosen, similar to the method by which the rate of progress statistic is measured (described below), in order to measure whether the state probabilities are fluctuating or are merely undergoing slight oscillations (say at the level of $10^{-5}$) that would indicate a tolerable level of convergence. Another convergence criterion, in this embodiment, would be to apply a similar rate of progress statistic to the order steps themselves. Specifically, the iterative stepping algorithm may be considered converged when all of the rate of progress statistics in Equation 7.9.1(c) below are tolerably close to zero. As another convergence criterion, in this embodiment, the iterative stepping algorithm will be considered converged when, in possible combination with other convergence criteria, the amount of payouts to be paid should any given defined state occur does not exceed the total amount of investment in the defined states, T, by a tolerably small amount, such as $10^{-5}*T$.

(8)b In this embodiment, the step size may be increased and decreased dynamically based upon the experienced progress of the iterative scheme. If, for example, the iterative increments and decrements are making steady linear progress, then it may be advantageous to increase the step size. Conversely, if the iterative increments and decrements ("stepping") is making less than linear progress or, in the extreme case, is making little or no progress, then it is advantageous to reduce the size of the iterative step.

In this embodiment, the step size may be accelerated and decelerated using the following:

$$\omega=\mu*\theta \quad (a)$$

7.9.1

$$\mathrm{mod}\left(\frac{\kappa}{\omega}\right)=0,\ \kappa>\omega \quad (b)$$

$$\gamma_j(\kappa)=\frac{|x_j(\kappa)-x_j(\kappa-\omega)|}{\sum_{i=1}^{\omega}|x_j(i)-x_j(i-1)|} \quad (c)$$

$$\alpha_j(\kappa)=\begin{cases}\theta^{\left(\frac{\gamma_j(\kappa)*\theta-1}{\theta-1}\right)}*\alpha_j(\kappa-1),\ \gamma_j(\kappa)>\frac{1}{\theta}\\ \theta^{\gamma_j(\kappa)*\theta-1}*\alpha_j(\kappa-1),\ \gamma_j(\kappa)\le\frac{1}{\theta}\end{cases} \quad (d)$$

where Equation 7.9.1(a) contains the parameters of the acceleration/deceleration rules. These parameters have the following interpretation:

θ: a parameter that controls the rate of step size acceleration and deceleration. Typically, the values for this parameter will range between 2 and 4, indicating that a maximum range of acceleration from 100-300%.

μ: a multiplier parameter, which, when used to multiply the parameter θ, yields a number of iterations over which the step size remains unchanged. Typically, the range of values for this parameter are 3 to 10.

ω: the window length parameter, which is the product of θ and μ over which the step size remains unchanged. The window parameter is a number of iterations over which the orders are stepped with a fixed step size. After these number of iterations, the progress is assessed, and the step size for each order may be accelerated or decelerated. Based upon the above described ranges for θ and μ, the range of values for ω is between 6 and 40, i.e., every 6 to 40 iterations the step size is evaluated for possible acceleration or deceleration.

κ: the variable denoting the current iteration of the step algorithm where κ is an integer multiple of the window length, ω.

$\gamma_j(\kappa)$: a calculated statistic, calculated at every $\kappa^{th}$ iteration for each order j. The statistic is a ratio of two quantities. The numerator is the absolute value of the difference between the quantity of order j filled at the iteration corresponding to the beginning of the window and at the iteration at the end of window. It represents, for each order j, the total amount of progress made, in terms of the execution of order j by either incrementing or decrementing the executed quantity of order j, from the start of the window to the end of the window iteration. The denominator is the sum of the absolute changes of the order execution for each iteration of the window. Thus, if an order has made no progress, the $\gamma_j(\kappa)$ statistic will be zero. If each step has resulted in progress in the same direction the $\gamma_j(\kappa)$ statistic will equal one. Thus, in this embodiment, the $\gamma_j(\kappa)$ statistic represents the amount of progress that has been made over the previous iteration window, with zero corresponding to no progress for order j and one corresponding to linear progress for order j.

$\alpha_j(\kappa)$: this parameter is the current step size for order j at iteration count κ. At every $\kappa^{th}$ iteration, it is updated using the equation 7.9.1(d). If the $\gamma_j(\kappa)$ statistic reflects sufficient progress over the previous window by exceeding the quantity 1/θ, then 7.9.1(d) provides for an increase in the step size, which is accomplished through a multiplication of the current step size by a number exceeding one as governed by the formula in 7.9.1(d). Similarly, if the $\gamma_j(\kappa)$ statistic reflects insufficient progress by being equal or less than 1/θ, the step size parameter will remain the same or will be reduced according to the formula in 7.9.1(d).

These parameters are selected, in this embodiment, based upon, in part, the overall performance of the rules with respect to test data. Typically, θ=2-4, μ=3-10 and therefore ω=6-40. Different parameters may be selected depending upon the overall performance of the rules. Equation 7.9.1(b) states that the acceleration or deceleration of an iterative step for each order's executed amount is to be performed only on the ω-th iteration, i.e., ω is a sampling window of a number of iterations (say 6-40) over which the iterative stepping procedure is evaluated to determine its rate of progress. Equation 7.9.1(c) is the rate of progress statistic that is calculated over the length of each sampling window. The statistic is calculated for each order j on every ω-th iteration and measures the rate of progress over the previous ω iterations of stepping. For each order, the numerator is the absolute value of how much each order j has been stepped over the sampling window. The larger the numerator, the larger the amount of total progress that has been made over the window. The denominator is the sum of the absolute values of the progress made over each individual step within the window, summed over the number of steps, ω, in the window. The denominator will be the same value, for example, whether 10 positive steps of 100 have been made or whether 5 positive steps of 100 and 5 negative steps of 100 have been made for a given order. The ratio of the numerator and denominator of Equation 7.9.1(c) is therefore a statistic that resides on the interval between 0 and 1, inclusive. If, for example, an order j has not made any progress over the window period, then the numerator is zero and the statistic is zero. If, however, an order j has made maximum progress over the window period, the rate of progress statistic will be equal to 1. Equation 7.9.1(d) describes the rule based upon the rate of progress statistic. For each order j at iteration κ (where κ is a multiple of the window length), if the rate of progress statistic exceeds 1/θ, then the step size is accelerated. A higher choice of the parameter θ will result in more frequent and larger accelerations. If the rate of progress statistic is less than or equal to 1/θ, then the step size is either kept the same or decelerated. It may be possible to employ similar and related acceleration and deceleration rules, which may have a somewhat different mathematical parameterization as that described above, to the iterative stepping of the order amount executions.

(8)c In this embodiment, a linear program may be used, in conjunction with the iterative stepping algorithm described above, to further accelerate the rate of progress. The linear program would be employed primarily at the point when a tolerable level of convergence in the defined state probabilities has been achieved. When the defined state probabilities have reached a tolerable level of convergence, the nonlinear program of Equation 7.7.1 is transformed, with prices held constant, into a linear program. The linear program may be solved using widely available techniques and software code. The linear program may be solved using a variety of numerical tolerances on the set of linear constraints. The linear program will yield a result that is either feasible or infeasible. The result contains the maximum sum of the executed order amounts (sum of the $x_j$), subject to the price, bounds, and equilibrium constraints of Equation 7.7.1, but with the prices (the vector p) held constant. In frequent cases, the linear program will result in executed order amounts that are larger than those in possession at the current iteration of the stepping procedure. After the linear program is solved, the iterative stepping procedure is resumed with the executed order amounts from the linear program. The linear program is an optimization program of Equation 7.7.1 but with the vector p from the current iteration κ held constant. With prices constant, constraints (1) and (3) of nonlinear optimization problem 7.7.1 become linear and therefore Equation 7.7.1 is transformed from a nonlinear optimization program to a linear program.

(8)d Once a tolerable level of convergence has been achieved for the notional payout executed for each order, $x_j$, the entire stepping iterative algorithm to solve Equation 7.7.1 may then be repeated with a substantially smaller step size, e.g., a step size, $\alpha_j(\kappa)$, equal to 1 until a higher level of convergence has been achieved.

This incremental iteration process also applies to determine the equilibrium prices of the replicating claims in the auction and the equilibrium prices of the derivatives strategies, and the premiums of the customer orders, and resolve the set of equilibrium conditions, as more fully set forth in Sections 10, 11 and 13.

7.10 Limit Order Book Display

In this embodiment of a DBAR digital options market or auction, it may be desirable to inform market or auction participants of the amount of payout that could be executed at any given limit price for any given DBAR digital call, put, or spread, as described previously in Section 6.9. The information may be displayed in such a manner so as to inform traders and other market participants the amount of an order that may be bought and "sold" above and below the current market price, respectively, for any digital call, put, or spread option. In this embodiment, such a display of information of the limit order book appears in a manner similar to the data displayed in the following table.

TABLE 7.10.1

| Current Pricing | | | | | |
|---|---|---|---|---|---|
| Strike | Spread To | Bid | Offer | Payout | Volume |
| <50 | | 0.2900 | 0.3020 | 3.3780 | 110,000,000 |
| | | <50 PUT | | | |
| | | | Offer | Offer Side Volume | |
| | | | 0.35 | 140,002,581 | |
| | | | 0.32 | 131,186,810 | |
| | | | 0.31 | 130,000,410 | |
| MARKET PRICE | | 0.2900 | 0.3020 | MARKET PRICE | |
| 120,009,731 | | 0.28 | | | |
| 120,014,128 | | 0.27 | | | |
| 120,058,530 | | 0.24 | | | |
| Bid Side Volume | | Bid | | | |

In Table 7.10.1, the amount of payout that a trader could execute were he willing to place an order at varying limit prices above the market (for buy orders) and below the market (for "sell" orders) is displayed. As displayed in the table, the data pertains to a put option, say for MSFT stock as in Section 6, at a strike price of 50. The current price is 0.2900/0.3020 indicating that the last "sale" order could have been processed at 0.2900 (the current bid price) and that the last buy order could have been processed at 0.3020 (the current offer price). The current amount of executed notional volume for the 50 put is equal to 110,000,000. The data indicate that a trader willing to place a buy order with limit price equal to 0.31 would be able to execute approximately 130,000,000 notional payout. Similarly, a trader willing to place a "sell" order with limit price equal to 0.28 would be able to achieve indicative execution of approximately 120,000,000 in notional.

7.11 Unique Price Equilibrium Proof

The following is a proof that a solution to Equation 7.7.1 results in a unique price equilibrium. The first-order optimality conditions for Equation 5 yield the following complementary conditions:

$$(1)\, g_j(x)<0 \rightarrow x_j=r_j$$

$$(2)\, g_j(x)>0 \rightarrow x_j=0$$

$$(3)\, g_j(x)=0 \rightarrow 0 \leqq x_j \leqq r_j \qquad \text{7.11.1A}$$

The first condition is that if an order's limit price is higher than the market price ($g_j(x)<0$), then that order is fully filled (i.e., filled in the amount of the order request, $r_j$). The second condition is that an order not be filled if the order's limit price is less than the market equilibrium price (i.e., $g_j(x)>0$). Condition 3 allows for orders to be filled in all or part in the case where the order's limit price exactly equals the market equilibrium price.

To prove the existence and convergence to a unique price equilibrium, consider the following iterative mapping:

$$F(x)=x-\beta^* g(x) \qquad \text{7.11.2A}$$

Equation 7.11.2A can be proved to be contraction mapping which for a step size independent of x will globally converge to a unique equilibrium, i.e., it can be proven that Equation 2A has a unique fixed point of the form $$F(x^*)=x^* \qquad \text{7.11.3A}$$

To first show that F(x) is a contraction mapping, matrix differentiation of Equation 2A yields:

$$\frac{dF(x)}{dx} = I - \beta * D(x)$$

where $$D(x)=B*A*Z^{-1}*B^T \quad 7.11.4A$$

$$A_{i,j} = \begin{cases} p_i*(1-p_i),\ i=j \\ -p_i*p_j,\ i \neq j \end{cases}$$

$$Z_{i,j} = \begin{cases} T-y_i+p_i*y_i,\ i=j \\ p_j*y_i,\ i \neq j \end{cases}$$

The matrix D(x) of Equation 4A is the matrix of order price first derivatives (i.e., the order price Jacobian). Equation 7.11.2A can be shown to be a contraction if the following condition holds:

$$\left|\frac{dF(x)}{dx}\right| < 1 \quad 7.11.5A$$

which is the case if the following condition holds:

$$\beta*\rho(D)<1,$$

where $\rho(D)=\max(\lambda_i(D))$, i.e., the spectral radius of D

By the Gerschgorin's Circle Theorem the eigenvalues of A are bounded between 0 and 1. The matrix $Z^{-1}$ is a diagonally dominant matrix, all rows of which sum to 1/T. Because of the diagonal dominance, the other eigenvalues of $Z^{-1}$ are clustered around the diagonal elements of the matrix, and are approximately equal to $p_i/k_i$. The largest eigenvalue of $Z^{-1}$ is therefore bounded above by $1/k_i$. The spectral radius of D is therefore bounded between 0 and linear combinations of $1/k_i$ as follows:

$$\rho(D) \leq L \quad 7.11.7A$$

$$L = \frac{1}{\sum_{i=1}^{m} \frac{1}{k_i}}$$

where the quantity L, a function of the opening order amounts, can be interpreted as the "liquidity capacitance" of the demand-based trading equilibrium (mathematically L is quite similar to the total capacitance of capacitors in series). The function F(x) of Equation 2A is therefore a contraction if $$\beta<L \quad 7.11.8A$$

Equation 7.11.8A states that a contraction to the unique price equilibrium can be guaranteed for contraction step sizes no larger than L, which is an increasing function of the opening orders in the demand-based market or auction.

The fixed point iteration of Equation 2A converges to x*. Since $y^*=B^Tx^*$, y* can be used in Equation 7.4.7 to compute the fundamental state prices p* and the total quantity of premium invested T*. If there are linear dependencies in the B matrix, it may be possible to preserve p* through a different allocation of the x's corresponding to the linearly dependent rows of B. For example, consider two orders, $x_1$ and $x_2$, which span the same states and have the same limit order price. Assume that $r_1=100$ and $r_2=100$ and that $x_1^*=x_2^*=50$ from the fixed point iteration. Then clearly, $x_1=100$ and $x_2=0$ may be set without disturbing p*. For example, different order priority rules may give execution precedence to the earlier submitted identical order. In any event, the fixed point iteration results in a unique price equilibrium, that is, unique in p.

8. NETWORK IMPLEMENTATION

Figure 22:
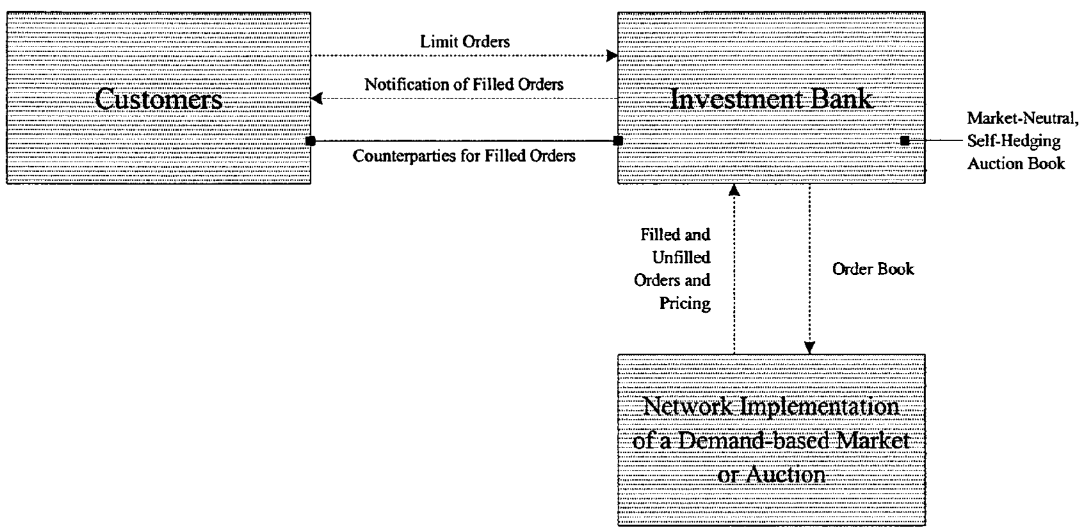
FIG. 22 depicts a network implementation of a demand-based market or auction according to the embodiments of the present invention.

A network implementation of the embodiment described in Section 7 is a means to run a complete, market-neutral, self-hedging open book of limit orders for digital options. The network implementation is formed from a combination of demand-based trading core algorithms with an electronic interface and a demand-based limit order book. This embodiment enables the exchange or sponsor to create products, e.g., a series of demand-based auctions or markets specific to an underlying event, in response to customer demand by using the network implementation to conduct the digital options markets or auctions. These digital options, in turn, form the foundation for a variety of investment, risk management and speculative strategies that can be used by market participants. As shown in FIG. 22, whether accessed using secure, browser-based interfaces over web sites on the Internet or an extension of a private network, the network implementation provides market makers with all the functionality conduct a successful market or auction including, for example:

(1) Order entry. Orders are taken by a market maker's sales force and entered into the network implementation.

(2) Limit order book. All limit orders are displayed.

(3) Indicative pricing and volumes. While an auction or market is in progress, prices and order volumes are displayed and updated in real time.

(4) Price publication. Prices may be published using the market maker's intranet (for a private network implementation) or Internet web site (for an Internet implementation) in addition to market data services such as Reuters and Bloomberg.

(5) Complete real-time distribution of market expectations. The network implementation provides market participants with a display of the complete distribution of expected returns at all times.

(6) Final pricing and order amounts. At the conclusion of a market or an auction, final prices and filled orders are displayed and delivered to the market maker for entry or export to existing clearing and settlement systems.

(7) Auction or Market administration. The network implementation provides all functions necessary to administer the market or auction, including start and stop functions, and details and summary of all orders by customer and salesperson.

A practical example of a demand-based market or auction conducted using the network implementation follows. The example assumes that an investment bank receives inquiries for derivatives whose payouts are based upon a corporation's quarterly earnings release. At present, no underlying tradable supply of quarterly corporate earnings exists and few investment banks would choose to coordinate the "other side" of such a transaction in a continuous market.

Establishing the Market or Auction: First, the sponsor of the market or auction establishes and communicates the details that define the market or auction, including the following:

An underlying event, e.g., the scheduled release of an earnings announcement

An auction period or trading period, e.g., the specified date and time period for the market or auction Digital options strike prices, e.g., the specified increments for each strike Accepting and Processing Customer Limit Orders: During the auction or trading period, customers may place buy and sell limit orders for any of the calls or puts, as defined in the market or auction details establishing the market or auction.

Indicative and Final Clearing of the Limit Order Book: During the auction or trading period, the network implementation displays indicative clearing prices and quantities, i.e., those that would exist if the order book were cleared at that moment. The network implementation also displays the limit order book for each option, enabling market participants to assess market depth and conditions. Clearing prices and quantities are determined by the available intersection of limit orders as calculated according to embodiments of the present invention. At the end of the auction or trading period, a final clearing of the order book is performed and option prices and filled order quantities are finalized. Market participants remit and accept premium for filled orders. This completes a successful market or auction of digital options on an event with no underlying tradable supply.

Summary of Demand-Based Market or Auction Benefits: Demand-based markets or auctions can operate efficiently without the requirement of a discrete order match between and among buyers and sellers of derivatives. The mechanics of demand-based markets or auctions are transparent. Investment, risk management and speculative demand exists for large classes of economic events, risks and variables for which no associated tradable supply exists. Demand-based markets and auctions meet these demands.

9. STRUCTURED INSTRUMENT TRADING

In another embodiment, clients can offer instruments suitable to broad classes of investors. In particular, an opportunity exists for participation in demand-based markets or auctions by customers who would otherwise not participate because they typically avoid leverage and trading in derivatives contracts. In this embodiment, these customers may transact using existing financial instruments or other structured products, for example, risk-linked notes and swaps, simultaneously with customers transacting using DBAR contingent claims, for example, digital options, in the same demand-based market or auction.

In this embodiment, a set of one or more digital options are created to approximate one or more parameters of the structured products, e.g., a spread to LIBOR (London Interbank Offered Rate) or a coupon on a risk-linked note or swap, a note notional (also referred to, for example, as a face amount of the note or par or principal), and/or a trigger level for the note or swap to expire in-the-money. The set of one or more digital options may be referred to, for example, as an approximation set. The structured products become DBAR-enabled products, because, once their parameters are approximated, the customer is enabled to trade them alongside other DBAR contingent claims, for example, digital options.

The approximation, a type of mapping from parameters of structured products to parameters of digital options, could be an automatic function built into a computer system accepting and processing orders in the demand-based market or auction. The approximation or mapping permits or enables non-leveraged customers to interface with the demand-based market or auction, side by side with leverage-oriented customers who trade digital options. DBAR-enabled notes and swaps, as well as other DBAR-enabled products, provide non-leveraged customers the ability to enhance returns and achieve investment objectives in new ways, and increase the overall liquidity and risk pricing efficiency of the demand-based market or auction by increasing the variety and number of participants in the market or auction.

9.1 Overview: Customer-Oriented DBAR-Enabled Products

Instruments can be offered to fit distinct investment styles, needs, and philosophies of a variety of customers. In this embodiment, "clientele effects" refers to, for example, the factors that would motivate different groups of customers to transact in one type of DBAR-enabled product over another. The following classes of customers may have varying preferences, institutional constraints, and investment and risk management philosophies relevant to the nature and degree of participation in demand-based markets or auctions:

Hedge Funds
Proprietary Traders
Derivatives Dealers
Portfolio Managers
Insurers and Reinsurers
Pension Funds Regulatory, accounting, internal institutional policies, and other related constraints may affect the ability, willingness, and frequency of participation in leveraged investments in general and derivatives products such as options, futures, and swaps in particular. Hedge funds and proprietary traders, for instance, may actively trade digital options, but may be unlikely to trade in certain structured note products that have identical risks while requiring significant capital. On the other hand, "real money" accounts such as portfolio managers, insurers, and pension funds may actively trade instruments that bear significant event risk, but these real money customers may be unlikely to trade DBAR digital options bearing identical event risks.

For example, according to the prospectus for their total return fund, one particular fixed income manager may invest in fixed income securities for which the return of principal and payment of interest are contingent upon the non-occurrence of a specific 'trigger' event, such as a hurricane, earthquake, tornado, or other phenomenon (referred to, for example, as 'event-linked bonds'). These instruments typically pay a spread to LIBOR should losses not exceed a stipulated level.

On the other hand, a fixed-income manager may not trade in an Industry Loss Warranty market or auction with insurers (discussed above in Section 3), even though the risks transacted in this market or auction, effectively a market or auction for digital options on property risks posed by hurricanes, may be identical to the risks borne in the underwritten Catastrophe-linked (CAT) securities. Similarly, the fixed-income manager and other fixed income managers may participate widely in the corporate bond market, but may participate to a lesser extent in the default swap market (convertible into a demand-based market or auction), even though a corporate bond bears similar risks as a default swap bundled with a traditional. LIBOR-based note or swap.

The unifying theme to these clientele effects is that the structure and form in which products are offered can impact the degree of customer participation in demand-based markets or auctions, especially for real money customers which avoid leverage and trade few, if any, options but actively seek fixed-income-like instruments offering significant spreads to LIBOR for bearing some event-related risk on an active and informed basis.

This embodiment addresses these "clientele effects" in the risk-bearing markets by allowing demand-based markets or auctions to simultaneously offer both digital options and DBAR-enabled products, such as, for example, risk-linked FRNs (or floating rate notes) and swaps, to different customers within the same risk-pricing, allocation, and execution mechanism. Thus, hedge funds, arbitrageurs, and derivatives dealers can transact in the demand-based market or auction in terms of digital options, while real money customers can transact in the demand-based market or auction in terms of different sets of instruments: swaps and notes paying spreads to LIBOR. For both types of customers, the payout is contingent upon an observed outcome of an economic event, for example, the level of the economic statistic at the release date (or e.g., at the end of the observation period).

9.2 Overview: FRNs and Swaps

Figure 23:
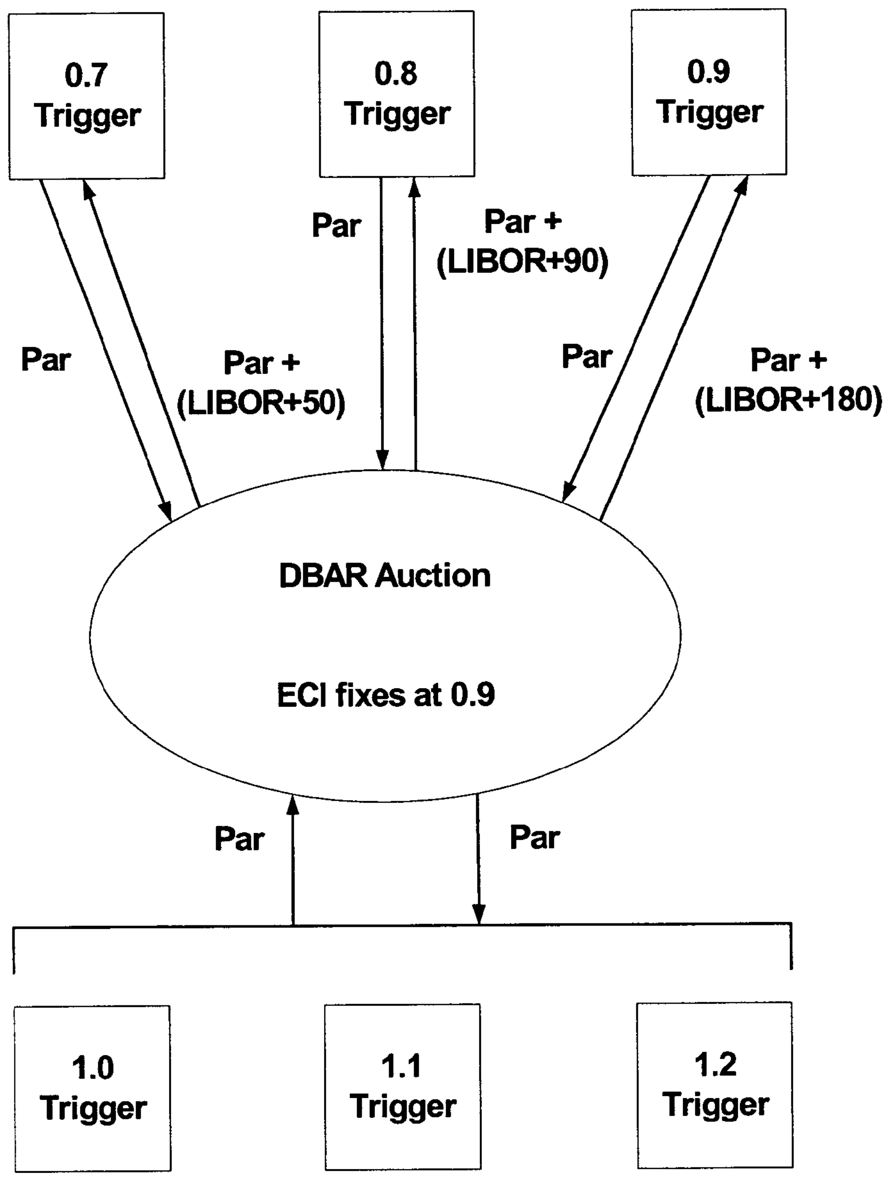
FIG. 23 depicts cash flows for each participant trading a principle-protected ECI-linked FRN.

For FRN and swap customers, according to this embodiment, a nexus of counterparties to contingent LIBOR-based cash flows based upon material risky events can be created in a demand-based market or auction. Schematically, the cash flows resemble a multiple counterparty version of standard FRN or swap LIBOR-based cash flows. FIG. 23 illustrates the cash flows for each participant. The underlying properties of DBAR markets or auctions will still apply (as described below), the offering of this event-linked FRN is market-neutral and self-hedging. In this embodiment, as with other embodiments of the present invention, a demand-based market or auction is created, ensuring that the receivers of positive spreads to LIBOR are being funded, and completely offset, by those out-of-the-money participants who receive par.

In this example, with actual ECI at 0.9%, the participants, each with trigger levels of 0.7%, 0.8%, or 0.9% are all in-the-money, and will earn LIBOR plus the corresponding spread for those triggers on. Those participants with trigger levels above 0.9% receive par.

9.3 Parameters: FRNs and Swaps vs. Digital Options

The following information provides an illustration of parameters related to a principal-protected Employment Cost Index (ECI)-linked FRN note and swap and ECI-linked digital options:

End of Trading Period: Oct. 23, 2001
End of Observation Period: Oct. 25, 2001
Coupon Reset Date: Oct. 25, 2001
(also referred to, for example, as the "FRN Fixing Date")
Note Maturity: Jan. 25, 2002
(when par amount needs to be repaid)
Option payout date: Jan. 25, 2002
(when payout of digital option is paid, can be set to be the same date as Note Maturity or a different date)
Trigger Index: Employment Cost Index ("ECI")
(also known as the strike price for an equivalent DBAR digital option)
Principal Protection: Par

TABLE 9.3

Indicative Trigger Levels and Indicative Pricing

| ECI Trigger (%) | Spread to LIBOR* (bps) |
|---|---|
| 0.7 | 50 |
| 0.8 | 90 |
| 0.9 | 180 |
| 1 | 350 |
| 1.1 | 800 |
| 1.2 | 1200 |

*For the purposes of the example, assume mid-market LIBOR execution

In this example, a customer (for example, an FRN holder or a note holder) places an order for an FRN with $100,000,000 par (also referred to, for example, as the face value of the note or notional or principal of the note), selecting a trigger of 0.9% ECI and a minimum spread of 180 bps to LIBOR (180 basis points or 1.80% in addition to LIBOR) during a trading period. After the end of the trading period, Oct. 23, 2001, if the market or auction determines the coupon for the note (e.g., the spread to LIBOR) equal to 200 bps to LIBOR, and the customer's note expires in-the-money at the end of the observation period, Oct. 25, 2001, then the customer will receive a return of 200 bps plus LIBOR on par ($100,000,000) on the note maturity date, Jan. 25, 2002.

Alternatively, if the market or auction fixes the rate on the note or sets the spread to 180 bps to LIBOR, and the customer's note expires-in-the money at the end of the observation period, then the customer will receive a return of 180 bps plus LIBOR (the selected minimum spread) on par on the note maturity date. If a 3-month LIBOR is equal to 3.5%, and the spread of 180 bps to LIBOR is also for a 3 month period, and the note expires in-the-money, then the customer receives a payout $101,355,444.00 on Jan. 25, 2002, or:

$$\text{in-the-money payout} = \text{par} + \text{par} \times (LIBOR + \text{spread}) \times \frac{daycount}{\text{basis}} \quad 9.3A$$

An "in-the-money note payout" may be a payout that the customer receives if the FRN expires in-the-money. Analogously, an "out-of-the-money note payout" may be a payout that the customer receives if the FRN expires out-of-the-money. "Daycount" is the number of days between the end of the coupon reset date and the note maturity date (in this example, 92 days). Basis is the number of days used to approximate a year, often set at 360 days in many financial calculations. The variable, "daycount/basis" is the fraction of a year between the observation period and the note maturity date, and is used to adjust the relevant annualized interest rates into effective interest rates for a fraction of a year.

If the note expires out-of-the-money, because the ECI is observed to be 0.8%, for example, on Oct. 25, 2001 (the end of the observation period), then the customer receives an out-of-the-money payout of par on Jan. 25, 2002, the note maturity date, or:

$$\text{out-of-the-money note payout} = \text{par} \quad 9.3B$$

Alternatively, the FRN could be structured as a swap, in which case the exchange of par does not occur. If the swap is structured to adjust the interest rates into effective interest rates for the actual amount of time elapsed between the end of the observation period and the note maturity date, then the customer receives a swap payout of $1,355,444. If the ECI fixes below 0.9% (and the swap is structured to adjust the interest rates), then the FRN holder loses or pays a swap loss of $894,444 or LIBOR times par (see equation 9.3D). The swap payout and swap loss can be formulated as follows:

$$\text{swap payout} = \text{par} \times (LIBOR + \text{spread}) \times \frac{daycount}{\text{basis}} \quad 9.3C$$

$$\text{swap loss} = \text{par} \times LIBOR \times \frac{daycount}{\text{basis}} \quad 9.3D$$

As opposed to FRNs and swaps, digital options provide a notional or a payout at a digital payout date, occurring on or after the end of the observation period (when the outcome of the underlying event has been observed). The digital payout date can be set at the same time as the note maturity date or can occur at some other earlier time, as described below. The digital option customer can specify a desired or requested payout, a selected outcome, and a limit on the investment amount for limit orders (as opposed to market orders, in which the customer does not place a limit on the investment amount needed to achieve the desired or requested payout).

9.4 Mechanics: DBAR-Enabling FRNs and Swaps

In this embodiment, as discussed above, both digital options and risk-linked FRNs or swaps may be offered in the same demand-based market or auction. Due to clientele effects, traditional derivatives customers may follow the market or auction in digital option format, while the real money customers may participate in the market or auction in an FRN format. Digital options customers may submit orders, inputting option notional (as a desired payout), a strike price (as a selected outcome), and a digital option limit price (as a limit on the investment amount). FRN customers may submit orders, inputting a notional note size or par, a minimum spread to LIBOR, and a trigger level or levels, indicating the level (equivalently, a strike price) at or above which the FRN will earn the market or auction-determined spread to LIBOR or the minimum spread to LIBOR. An FRN may provide, for example, two trigger levels (or strike prices) indicating that the FRN will earn a spread should the ECI Index fall between them at the end of the observation period.

In this embodiment, the inputs for an FRN order (which are some of the parameters associated with an FRN) can be mapped or approximated, for example, at a built-in interface in a computer system, into desired payouts, selected outcomes and limits on the investment amounts for one or more digital options in an approximation set, so that the FRN order can be processed in the same demand-based market or auction along with direct digital option orders. Specifically, each FRN order in terms of a note notional, a coupon or spread to LIBOR, and trigger level may be approximated with a LIBOR-bearing note for the notional amount (or a note for notional amount earning an interest rate set at LIBOR), and an embedded approximation set of one or more digital options.

As a result of the mapping or approximation, all orders of contingent claims (for example, digital option orders and FRN orders) are expressed in the same units or variables. Once all orders are expressed in the same units or variables, an optimization system, such as that described above in Section 7, determines an optimal investment amount and executed payout per order (if it expires in-the-money) and total amount invested in the demand-based market or auction. Then, at the interface, the parameters of the digital options in the approximation set corresponding to each FRN order are mapped back to parameters of the FRN order. The coupon for the FRN (if above the minimum spread to LIBOR specified by the customer) is determined as a function of the digital options in the approximation set which are filled and the equilibrium price of the filled digital options in the approximation set, as determined by the entire demand-based market or auction. Thus, the FRN customer inputs certain FRN parameters, such as the minimum spread to LIBOR and the notional amount for the note, and the market or auction generates other FRN parameters for the customer, such as the coupon earned on the notional of the note if the note expires-in-the money.

The methods described above and in section 9.5 below set forth an example of the type of mapping that can be applied to the parameters of a variety of other structured products, to enable the structured products to be traded in a demand-based market or auction alongside other DBAR contingent claims, including, for example, digital options, thereby increasing the degree and variety of participation, liquidity and pricing efficiency of any demand-based market or auction. The structured products include, for example, any existing or future financial products or instruments whose parameters can be approximated with the parameters of one or more DBAR contingent claims, for example, digital options. The mapping in this embodiment can be used in combination with and/or applied to the other embodiments of the present invention.

9.5 Example: Mapping FRNs into Digital Option Space

The following notation, figures and equations illustrate the mapping of ECI-linked FRNs into digital option space, or approximating the parameters of ECI-linked FRNs into parameters of an approximation set of one or more digital options, and can be applied to illustrate the mapping of ECI-linked swaps into digital option space.

9.5.1 Date and Timing Notation and Formulation $t_S$: the premium settlement date for the direct digital option orders and the FRN orders, set at the same time or some time after the TED (or the end of the trading or auction period).

$t_E$: the event outcome date or the end of the observation period (e.g., the date of that the outcome of the event is observed).

$t_O$: the option payout date $t_R$: the coupon reset date, or the date when interest (spread to LIBOR, including, for example, spread plus LIBOR) begins to accrue on the note notional.

$t_N$: the note maturity date, or the date for repayment of the note.

f: the fraction of the year from date $t_R$ to date $t_N$. This number may depend on the day-count convention used, e.g., whether the basis for the year is set at 365 days per year or 360 days per year. In this example, the basis for the year is set at 360 days, and f can be formulated as follows:

$$f = \frac{\text{number of days between } t_R \text{ and } t_N}{360} \qquad \text{9.5.1A}$$

Figure 24:
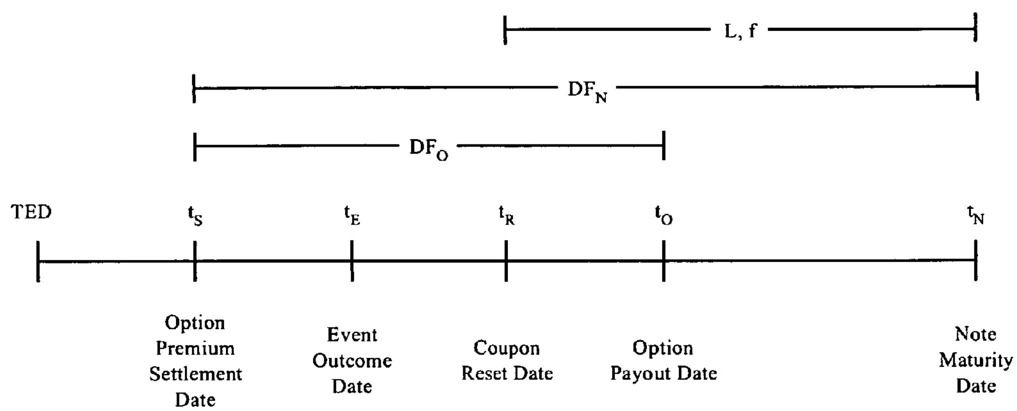
FIG. 24 depicts an example time line for a demand-based market trading DBAR-enabled FRNs or swaps according to the embodiments of the present invention.

As shown in FIG. 24, the market or auction in this example is structured such that the note maturity date ($t_N$) occurs on or after the option payout date ($t_O$) although, for example, the market or auction can be structured such that $t_N$ occurs before $t_O$. Additionally, as illustrated, the option payout date ($t_O$) occurs on or after the end of the observation period ($t_E$), and the end of the observation period ($t_E$) occurs on or after the premium settlement date ($t_S$). The premium settlement date ($t_S$), can occur on or after the end of the trading period for the demand-based market or auction. Further, the demand-based market or auction in this example is structured such that the coupon reset date ($t_R$) occurs after the premium settlement date ($t_S$) and before the note maturity date ($t_N$). However, the coupon reset date (also referred to, for example, as the "FRN Fixing Date") ($t_R$) can occur at any time before the note maturity date ($t_N$), and at any time on or after the end of the trading period or the premium settlement date ($t_S$). The coupon reset date ($t_R$), for example, can occur after the end of the observation period ($t_E$) and/or the option payout date ($t_O$). In this example, as shown in FIG. 24, the coupon reset date ($t_R$) is set between the end of the observation period ($t_E$) and the option payout date ($t_O$).

Similar to the discussion earlier in this specification in Section 1 that the duration of the trading period can be unknown to the participants at the time that they place their orders, any of the dates above can be pre-determined and known by the participants at the outset, or they can be unknown to the participants at the time that they place their orders. The end of the trading period, the premium settlement date or the coupon reset date, for example, can occur at a randomly selected time, or could occur depending upon the occurrence of some event associated or related to the event of economic significance, or upon the fulfillment of some criterion. For example, for DBAR-enabled FRNs, the coupon reset date could occur after a certain volume, amount, or frequency of trading or volatility is reached in a respective demand-based market or auction. Alternatively, the coupon reset date could occur, for example, after an nth catastrophic natural event (e.g., a fourth hurricane), or after a catastrophic event of a certain magnitude (e.g., an earthquake of a magnitude of 5.5 or higher on the Richter scale), and the natural or catastrophic event can be related or unrelated to the event of economic significance, in this example, the level of the ECI.

9.5.2 Variables and Formulation for Demand-Based Market or Auction

E: Event of economic significance, in this example, ECI. The level of the ECI observed on $t_E$. This event is the same event for the FRN and direct digital option orders, referred to, e.g., as a "Trigger Level" for the FRN order, and as a "strike price" for the direct digital option order.

L: London Interbank Offered Rate (LIBOR) from the date $t_R$ to $t_N$, a variable that can be fixed, e.g., at the start of the trading period.

m: number of defined states, a natural number. Index letter i, i=1, 2 . . . , m.

In the example shown in FIG. 9.2, for example, there can be 7 states depending on the outcome of an economic event: the level of the ECI on the event observation date.

| |
|---|
| ECI < 0.7; |
| 0.7 ≦ ECI < 0.8; |
| 0.8 ≦ ECI < 0.9; |
| 0.9 ≦ ECI < 1.0; |
| 1.0 ≦ ECI < 1.1; |
| 1.1 ≦ ECI < 1.2; and |
| ECI ≧ 1.2. |

$n_N$: number of FRN orders in a demand-based market or auction, a non-negative integer. Index letter $j_N$, $j_N$=1, 2, . . . $n_N$.

$n_D$: number of direct digital option orders in a demand-based market or auction, a non-negative integer. Index letter $j_D$, $j_D$=1, 2, . . . $n_D$. Direct digital option orders, include, for example, orders which are placed using digital option parameters.

$n_{AD}$: number of digital option orders in an approximation set for a $j_N$ FRN order. In this example, this number is known and fixed, e.g., at the start of the trading period, however as described below, this number can be determined during the mapping process, a non-negative integer. Index letter z, z=1, 2, . . . $n_{AD}$.

n: number of all digital option orders in a demand-based market or auction, a non-negative integer. Index letter j, j=1, 2, . . . n.

The above numbers relate to one another in a single demand-based market or auction as follows:

$$n=\sum_{j_N=1}^{n_N} n_{AD}(j_N)+n_D \qquad 9.5.2A$$

L: the rate of LIBOR from date $t_R$ to date $t_N$ $DF_O$: the discount factor between the premium settlement date and the option payout date ($t_S$ and $t_O$), to account for the time value of money. $DF_O$ can be set using LIBOR (although other interest rates may be used), and equal to, for example, 1/[1+(L* portion of year from $t_S$ to $t_O$)].

$DF_N$: the discount rate between the premium settlement date and the note maturity date, $t_S$ and $t_N$. $DF_N$ can also be set using LIBOR (although other interest rates may be used), and equal to, for example, 1/[1+(L* portion of year from $t_S$ to $t_N$)].

9.5.3 Variables and Formulations for Each Note $j_N$ in Demand-Based Market or Auction A: notional or face amount or par of note.

U: minimum spread to LIBOR (a positive number) specified by customer for note, if the customer's selected outcome becomes the observed outcome of the event.

Although both buy and sell FRN orders can be processed together with buy and sell direct digital option orders in the same demand-based market or auction, this example demonstrates the mapping for a buy FRN order.

$N_P$: The profit on the note if one or more of the states corresponding to the selected outcome of the event is identified on the event outcome date as one or more of the states corresponding to the observed outcome (e.g., the selected outcome turns out to be the observed outcome, or the ECI reaching or surpassing the Trigger Level on the event outcome date), at the coupon rate, c, determined by this demand-based market or auction.

$$N_P=A\times c\times f\times DF_N \qquad 9.5.3A$$

$N_L$: The loss on the note if none of the states corresponding to the selected outcome of the event is identified on the event outcome date as one more of the states corresponding to the observed outcome (e.g., the selected outcome does not turn out to be the observed outcome, or the ECI does not reach the Trigger Level on the event outcome date).

$$N_L=A\times L\times f\times DF_N \qquad 9.5.3B$$

π: the equilibrium price of each of the digital options in the approximation set that are filled by the demand-based market or auction, the equilibrium price being determined by the demand-based market or auction.

All of the digital options in the approximation set can have, for example, the same payout profile or selected outcome, matching the selected outcome of the FRN. Therefore, all of the digital options in one approximation set that are filled by the demand-based market or auction will have, for example, the same equilibrium price.

9.5.4 Variables and Formulations for Each Digital Option, z, in the Approximation Set of One or More Digital Options for Each Note, $j_N$, in a Demand-Based Market or Auction $w_z$: digital option limit price for the $z^{th}$ digital option in the approximation set. The digital options in the approximation set can be arranged in descending order by limit price. The first digital option in the set has the largest limit price. Each subsequent digital option has a lower limit price, but the limit price remains a positive number, such that $w_{z+1}<w_z$. The number of digital options in an approximation set can be pre-determined before the order is placed, as in this example, or can be determined during the mapping process as discussed below.

In this example, the limit price for the first digital option (z=1) in an approximation set for one FRN order ($j_N$) can be determined as follows:

$$w_1=DF_O*L/(U+L) \qquad 9.5.4A$$

The limit prices for subsequent digital options can be established such that the differences between the limit prices in the approximation set become smaller and eventually approach zero.

$r_z$: requested or desired payout or notional for the $z^{th}$ digital option in the approximation set.

c: coupon on the FRN, e.g., the spread to LIBOR on the FRN, corresponding to the coupon determined after the last digital option order in the approximation set is filled according to the methodology discussed, for example, in Sections 6 and 7.

The coupon, c, can be determined, for example, by the following:

$$c = L \times \frac{DF_O - \pi}{w_z} \quad \text{9.5.4B}$$

where $w_z$ is the limit price of the last digital option order z in the approximation set of an FRN, $j_N$, to be filled by the demand-based market or auction.

9.5.5 Formulations for the First Digital Option, z=1, in the Approximation Set of One or More Digital Options for A Note, $j_N$, in a Demand-Based Market or Auction:

Assuming that the first digital option in the approximation set is the only digital option order filled by the demand-based market or auction (e.g., $w_2 < \pi \leqq w_1$), then following equation 9.5.4B, then:

$$c = L \times \frac{DF_O - \pi}{w_1} \quad \text{9.5.5A}$$

When the equilibrium price (for each of the filled digital options in the approximation set) is equal to the limit price for the first digital option in the approximation set, $\pi = w_1$, the digital option profit is $r_1(DF_O - w_1)$ and the digital option loss is $r_1 w_1$. Equating the option's profit with the note's profit yields:

$$r_1(DF_O - w_1) = A^*U^*f^*DF_N \quad \text{9.5.5B}$$

Next, equating the option's loss with the note's loss yields:

$$r_1 w_1 = A^*L^*f^*DF_N \quad \text{9.5.5C}$$

The ratio of the option's profit to the option's loss is equal to the ratio of the note's profit to the note's loss:

$$\frac{r_1(DF_O - w_1)}{r_1 w_1} = \frac{A \times U \times f \times DF_N}{A \times L \times f \times DF_N} \quad \text{9.5.5D}$$

Simplifying this equation yields:

$$\frac{DF_O - w_1}{w_1} = \frac{U}{L} \quad \text{9.5.5E}$$

$$\frac{DF_O}{w_1} = \frac{U}{L} + 1 = \frac{L + U}{L} \quad \text{9.5.5F}$$

Solving for $w_1$ yields:

$$w_1 = \left(\frac{L}{L + U}\right) DF_O \quad \text{9.5.5G}$$

Solving for $r_1$ from Equation 9.5.5C yields:

$$r_1 = A^*L^*f^*DF_N/w_1 \quad \text{9.5.5H}$$

Substituting equation 9.5.5G for w, into equation 9.5.5H yields the following formulation for the requested payout for the first digital option in the approximation set:

$$r_1 = \frac{A \times f \times DF_N \times (L + U)}{DF_O} \quad \text{9.5.5I}$$

9.5.6 Formulations for the Second Digital Option, z=2, in the Approximation Set of One or More Digital Options for a Note, $j_N$, in a Demand-Based Market or Auction:

Assuming that the second digital option will be filled in the optimization system for the entire demand-based market or auction, the coupon earned on the note will be higher than the minimum spread to LIBOR specified by the customer, e g., c>U.

As stated above, the profit of the FRN is $A^*c^*f^*DF_N$ and the loss if the states specified do not occur is $A^*L^*f^*DF_N$.

Now, since $w_1$ is determined as set forth above, and $w_2$ can be set as some number lower than $w_1$, assuming that the market or auction fills both the first and the second digital options and assuming that the equilibrium price is equal to the limit price for the second digital option ($\pi = w_2$), the profits for the digital options if they expire in-the-money is equal to $(r_1 + r_2)^*(DF_O - w_2)$, and the option loss is equal to $(r_1 + r_2)^*w_2$. Equating the option's profit with the note's profit yields:

$$(r_1 + r_2)(DF_O - w_2) = A^*c^*f^*DF_N \quad \text{9.5.6A}$$

Equating the option's loss with the note's loss yields:

$$(r_1 + r_2)w_2 = A^*L^*f^*DF_N \quad \text{9.5.6B}$$

Solving for r2 yields:

$$r_2 = (A^*L^*f^*DF_N)/w_2 - r_1 \quad \text{9.5.6C}$$

Assuming that the second digital option is the highest order filled in the approximation set by the demand-based market or auction, the ratio of the profits and losses of both of the options is approximately equal to the profits and losses of the FRN. This approximate equality is used to solve for the coupon, c. Simplifying the combination of the above equations relating to equating the profits and losses of both options to the profit and loss of the note, yields the following formulation for the coupon, c, earned on the note if the note expires in-the-money and $w_2 > \pi$:

$$c = L^*(DF_O - \pi)/w_2 \quad \text{9.5.6D}$$

9.5.7 Formulations for the $z^{th}$ Digital Option in the Approximation Set of One or More Digital Options for a Note, $j_N$, in a Demand-Based Market or Auction:

The above description sets forth formulae involved with the first and second digital options in the approximation set. The following can be used to determine the requested payout for the $z^{th}$ digital option in the approximation set. The following can also be used as the demand-based market's or auction's determination of a coupon for the FRN if the $z^{th}$ digital option is the last digital option in the approximation set filled by the demand-based market or auction (for example, according to the optimization system discussed in Section 7), and if the FRN expires in-the-money.

The order of each digital option in the approximation set is treated analogously to a market order (as opposed to a limit order), where the price of the option, $\pi$, is set equal to the limit price for the option, $w_z$.

Thus, the requested payout for each digital option, $r_z$, in the approximation set can be determined according to the following formula:

$$r_z = \frac{A \times L \times f \times DF_N}{w_z} - \sum_{x=1}^{z-1} r_x \quad 9.5.7A$$

Note that the determination of the requested payout for each digital option, $r_z$, is recursively dependent on the payouts for the prior digital options, $r_1, r_2, \ldots, r_{z-1}$.

The number of digital option orders, $n_{AD}$, used in an approximation set can be adjusted in the demand-based market or auction. For example, an FRN order could be allocated an initial set number of digital option orders in the approximation set, and each subsequent digital option order could be allocated a descending limit order price as discussed above. After these initial quantities are established for an FRN, the requested payouts for each subsequent digital option can be determined according to equation 9.5.7A. If the requested payout for the $z^{th}$ digital option in the approximation set approaches sufficiently close to zero, where $z<n_{AD}$, then the $z^{th}$ digital option could be set as the last digital option needed in the approximation set, $n_{AD}$ would then equal z. The coupon determined by the demand-based market or auction becomes a function of LIBOR, the discount factor between the premium settlement date and the option payment date, the equilibrium price, and the limit price of the last digital option in the approximation set to be filled by the optimization system for the demand-based market or auction discussed in Section 7:

$$c=L^*(DF_O-\pi)/w_z \quad 9.5.7B$$

where $w_z$ is the limit price of the last digital option order in the approximation set to be filled by the optimization system.

9.5.8 Numerical Example of Implementing Formulations for the $z^{th}$ Digital Option in the Approximation Set of One or More Digital Options for a Note, $j_N$, in a Demand-Based Market or Auction:

The following provides an illustration of a principal-protected Employment Cost Index-linked Floating Rate Note. In this numerical example, the auction premium settlement date $t_S$ is Oct. 24, 2001; the event outcome date $t_E$, the coupon reset date $t_R$, and the option payout date are all Oct. 25, 2001; and the note maturity date $t_N$ is Jan. 25, 2002.

In this case, the discount factors can be solved using a LIBOR rate L of 3.5% and a basis of Actual number of days/360:

$DF_O$=0.999903

$DF_N$=0.991135 f=0.255556

(There are 92 days of discounting between Oct. 25, 2001 and Jan. 25, 2002, which is used for the computation of f and $DF_N$.)

The customer or note holder specifies, in this example, that the FRN is a principal protected FRN, because the principal or par or face amount or notional is paid to the note holder in the event that the FRN expires out-of-the-money. The customer specifies the trigger level of the ECI as 0.9% or higher, and the customer enters an order with a minimum spread of 150 basis points to LIBOR. This customer will receive LIBOR plus 150 bps in arrears on 100 million USD on Jan. 25, 2002, plus par if the ECI index fixes at 0.9% or higher. This customer will receive 100 million USD (since the note is principal protected) on Jan. 25, 2002 if the ECI index fixes at lower than 0.9%.

Following the notation for the variables and the formulation presented above,

A=$100,000,000.00 (referred to as the par, principal, notional, face amount of the note)

U=0.015, i.e. bidder wants to receive a minimum of 150 basis points over LIBOR

The parameters for the first digital option in the approximation set for the demand-based market or auction are determined as follows by equation 9.5.4A:

$$w_1=(0.035/[0.035+0.015])*0.999903=0.70$$

It is reasonable to set $w_2$, the limit price for the second digital option order in the approximation set to be equal to 0.69, therefore by equation 9.5.5H:

$$r_1=\$100{,}000{,}000*0.035*0.255556*0.991135/0.70=\$1{,}266{,}500$$

The coupon, c, equals 0.015 or 150 basis points, if the first digital option order becomes the only digital option order filled by the demand-based market or auction and the equilibrium price is equal to the limit price for the first digital option ($\pi$=0.7).

The parameters for the second digital option in the approximation set for the demand-based market or auction are determined as follows, setting the limit price for this digital option to be less than the limit price for the first digital option, or $w_2$=0.69, then by equation 9.5.6C:

$$\begin{aligned} r_2 &= \$100{,}000{,}000 * 0.035 * 0.255556 * 0.991135/0.69 - \$1{,}266{,}500 \\ &= \$18{,}306 \end{aligned}$$

If $\pi$, the equilibrium price of the digital option, is between 0.69 ($w_2$) and 0.70 ($w_1$), e.g., $\pi$=0.695, then the note coupon, c=0.0152=0.035*(0.999903−0.695)/0.70, or 152 bps spread to LIBOR by equation 9.5.5A. This becomes the coupon for the note if the demand-based market or auction only fills the first digital option order in the approximation set and if the demand-based market or auction sets the equilibrium price for the selected outcome equal to 0.695.

If $\pi$, the equilibrium price of the digital option, is equal to 0.69 ($w_2$), the coupon for the FRN becomes 157 basis points if the second digital option is the highest digital option order filled by the demand-based market or auction, by equation 9.5.6D:

$$c=0.035*(0.999903-0.69)/0.69=0.0157 \text{ or } 157 \text{ basis points}$$

The requested payouts for each subsequent digital option, and the subsequently determined coupon on the note (determined pursuant to the limit price of the last digital option in the approximation set to be filled by the demand-based market or auction and the equilibrium price for the selected outcome), are determined using equations 9.5.7A and 9.5.7B.

9.6 Conclusion

Figure 25:
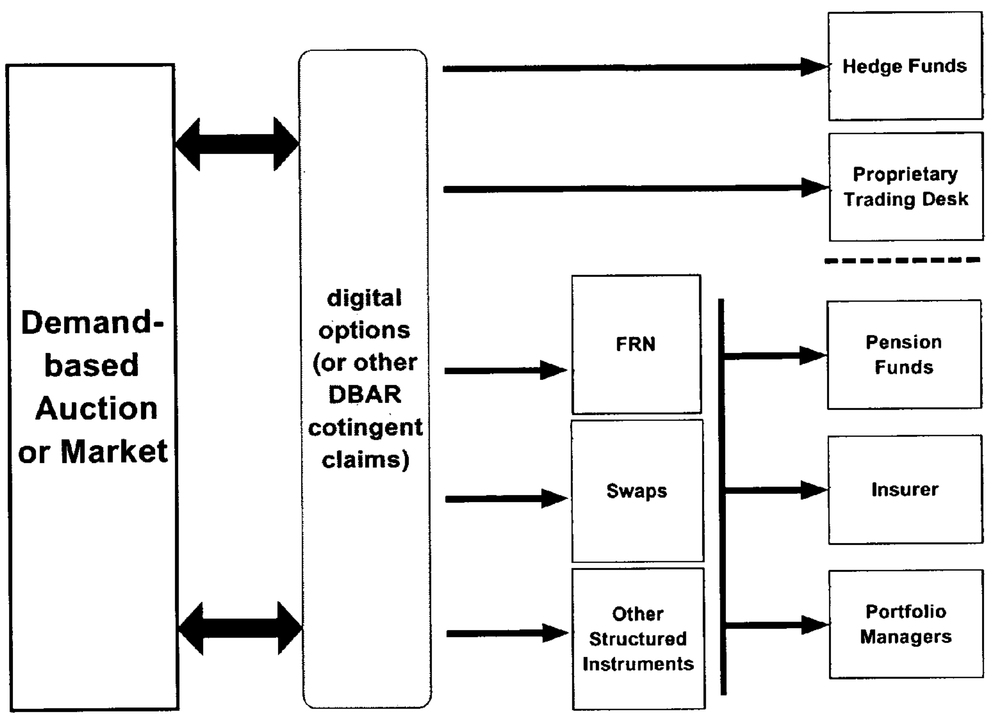
FIG. 25 depicts an example of an embodiment of a demand-based market or auction with digital options and DBAR-enabled products.

These equations present one example of how to map FRNs and swaps into approximation sets comprised of digital options, transforming these FRNs and swaps into DBAR-enabled FRNs and swaps. The mapping can occur at an interface in a demand-based market or auction, enabling otherwise structured instruments to be evaluated and traded alongside digital options, for example, in the same optimization solution. As shown in FIG. 25, the methods in this embodiment can be used to create DBAR-enabled products out of any structured instruments, so that a variety of structured instruments and digital options can be traded and evaluated in the same efficient and liquid demand-based market or auction, thus significantly expanding the potential size of demand-based markets or auctions.

10. REPLICATING DERIVATIVES STRATEGIES USING DIGITAL OPTIONS

Financial market participants express market views and construct hedges using a number of derivatives strategies including vanilla calls and vanilla puts, combinations of vanilla calls and puts including spreads and straddles, forward contracts, digital options, and knockout options. This section shows how an entity or auction sponsor running a demand-based or DBAR auction can receive and fill orders for these derivatives strategies.

Figure 26:
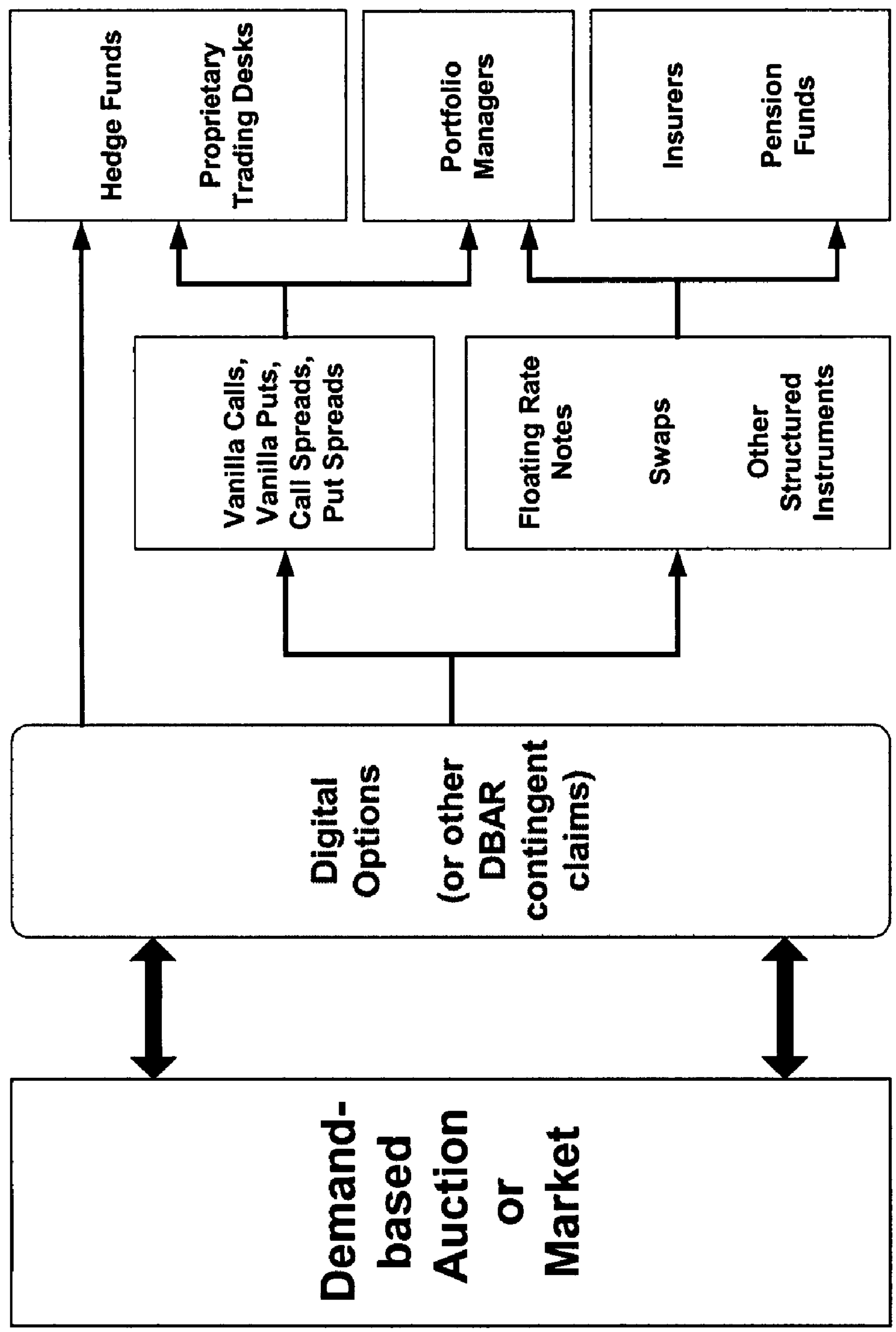
FIG. 26 depicts an example of an embodiment of a demand-based market or auction with replicated derivatives strategies, digital options and other DBAR-enabled products and derivatives.
Figure 29:
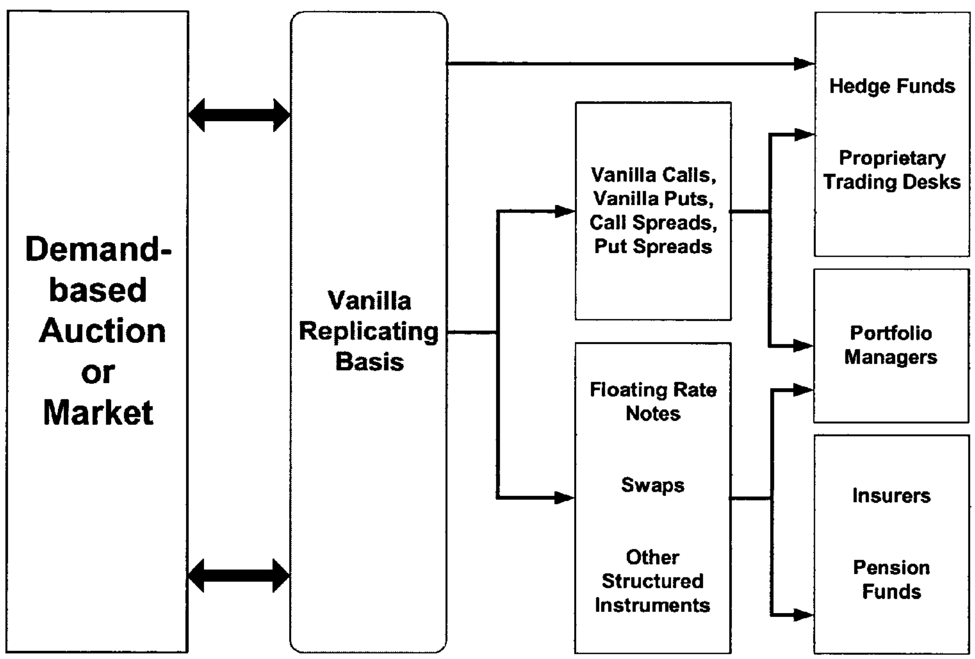
FIG. 29 depicts an example of an embodiment of a demand-based market or auction with derivatives strategies, structured instruments and other products that are DBAR-enabled by replicating them into a vanilla replicating basis.

These derivatives strategies can be included in a DBAR auction using a replicating approximation, a mapping from parameters of, for example, vanilla options to digital options (also referred to as "digitals"), or, as described further in Section 11, a mapping from parameters of, for example, derivative strategies to a vanilla replicating basis. This mapping could be an automatic function built into a computer system accepting and processing orders in the demand-based market or auction. The replicating approximation permits or enables auction participants or customers to interface with the demand-based market or auction, side by side with customers who trade digital options, notes and swaps, as well as other DBAR-enabled products. This increases the overall liquidity and risk pricing efficiency of the demand-based market or auction by increasing the variety and number of participants in the market or auction. FIG. 26 shows how these options may be included in a DBAR auction with a digital replicating basis. FIG. 29 shows how these options may be included in a DBAR auction with a vanilla replicating basis.

Offering such derivatives strategies in a DBAR auction provides several benefits for the customers. First, customers may have access to two-way markets for these derivatives strategies giving customers transparency not currently available in many derivatives markets. Second, customers will receive prices for the derivatives strategies based on the prices of the underlying digital claims, insuring that the prices for the derivatives strategies are fairly determined. Third, a DBAR auction may provide customers with greater liquidity than many current derivatives markets: in a DBAR auction, customers may receive a lower bid-ask spread for a given notional size executed and customers may be able to execute more notional volume for a given limit price. Finally, offering these options provides customers the ability to enhance returns and achieve investment objectives in new ways.

In addition, offering such derivative strategies in a DBAR auction provides benefits for the auction sponsor. First, the auction sponsor will earn fee income from these orders. In addition, the auction sponsor has no price making requirements in a DBAR auction as prices are determined endogenously. In offering these derivatives strategies, the auction sponsor may be exposed to the replication profit and loss or replication P&L—the risk deriving from synthesizing the various derivatives strategies using only digital options. However, this risk may be small in a variety of likely instances, and in certain instances described in Section 11, when derivative strategies are replicated into a vanilla replicating basis, this risk may be reduced to zero. Regardless, the cleared book from a DBAR auction, excluding this replication P&L and opening orders, will be risk-neutral and self-hedging, a further benefit for the auction sponsor.

The remainder of section 10 shows how a number of derivatives strategies can be replicated in a DBAR auction. Section 10.1 shows how to replicate a general class of derivatives strategies. Next, section 10.2 applies this general result for a variety of derivatives strategies. Section 10.3 shows how to replicate digitals using two distributional models for the underlying. Section 10.4 computes the replication P&L for a set of orders in the auction. Appendix 10A summarizes the notation used in this section. Appendix 10B derives the mathematics behind the results in section 10.1 and 10.2. Appendix 10C derives the mathematics behind results in section 10.3.

10.1 The General Approach to Replicating Derivatives Strategies with Digital Options Let U denote the underlying measurable event and let Q denote the sample space for U.

U may be a univariate random variable and thus Ω may be, for example, $R^1$ or $R^+$. Otherwise U may be a multidimensional random variable and Ω may be, for example, $R^n$.

Assume that the sample space Ω is divided into S disjoint and non-empty subsets $\Omega_1, \Omega_2, \ldots \Omega_S$ such that $$\Omega_i \cap \Omega_j = \emptyset \text{ for } 1 \leq i \leq S \text{ and } 1 \leq j \leq S \text{ and } i \neq j \quad \text{10.1A}$$

$$\Omega_1 \cup \Omega_2 \cup \ldots \Omega_S = \Omega \quad \text{10.1B}$$

Thus, $\Omega_1, \Omega_2, \ldots, \Omega_S$ represents a mutually exclusive and collectively exhaustive division of Ω.

Each sample space partition $\Omega_s$ can be associated with a state s. Namely, the underlying $U \in \Omega_s$ that means that state s has occurred, for s=1, 2, . . . , S. Thus, there are S states in totality. It is worth noting that this definition of "state" differs from other definitions of "state" in that a "state" may represent only a specific outcome of a sample space: in this example embodiment, a "state" may represent a set of multiple outcomes.

Denote the probability of state s occurring as p, for s=1, 2, . . . , S. Thus, $$p_s \equiv Pr[U: U \in \Omega_s] \text{ for } s=1, 2, \ldots, S \quad \text{10.1C}$$

Assume that $p_s > 0$ for s=1, 2, . . . , S.

Consider a derivatives strategy that pays out d(U). This derivatives strategy will be referred to using the function d. The function d may be quite general: d may be a continuous or discontinuous function of U, a differentiable or non-differentiable function of U. For example, in the case where a derivatives strategy based on digitals is being replicated, the function d is discontinuous and non-differentiable.

Let $a_s$ denote the digital replication for state s, the series of digitals that replicate the derivatives strategy d. Let C denote the replication P&L to the auction sponsor. If C is positive (negative), then the auction sponsor receives a profit (a loss) from the replication of the strategy. The replication P&L to the auction sponsor C is given by the following formula for a buy order of d $$C \equiv \sum_{s=1}^{S} I[U \in \Omega_s][a_s - d(U) + \underline{e}] \quad \text{10.1D}$$

where $$\underline{e} = \min_{s=1,2,\ldots,S} E[d(U) \mid U \in \Omega_s] \quad \text{10.1E}$$

In this case, e denotes the minimum conditional expected value of d(U) within state s. For intuition as to why C depends on e, consider the simple example where d(U)=ξ (a constant) for all values of U. In this case, of course, the replication P&L should be zero since there are no digitals required to replicate the strategy d. It can be shown that $\underline{e}$=ξ and C equals 0 for $a_s$=0 for s=1, 2, . . . , S using equation 10.1D. Thus, e is required in equation 10.1D to make C, the replication P&L, zero in this case.

The replication P&L for a sell of d is the negative of the replication P&L of a buy of d $$C \equiv \sum_{s=1}^{S} I[U \in \Omega_s][d(U) - a_s - \underline{e}] \qquad 10.1F$$

In equation 10.1F, $a_s$ represents the replicating digital for a buy order.

Let $$\overline{e} \equiv \max_{s=1,2,\ldots,S} E[d(U) \mid U \in \Omega_s] \qquad 10.1G$$

As defined in 10.1G, $\overline{e}$ denotes the maximum conditional expected value of d(U) within state s.

This example embodiment restricts these parameters $$0 \leqq \underline{e} < \overline{e} < \infty \qquad 10.1H$$

so that the conditional expected value of d is bounded above and below. Note that this condition can be met when the function d itself is unbounded, as is the case for many derivatives strategies such as vanilla calls and vanilla puts.

Values of ($a_1, a_2, \ldots, a_{S-1}, a_S$) are selected in this example embodiment as follows Objective: Choose ($a_1, a_2, \ldots, a_{S-1}, a_S$) to minimize Var[C] subject to E[C]=0

In words, the a's are selected so that the auction sponsor has the minimum variance of replication P&L subject to the constraint that the expected replication P&L is zero.

Under these conditions, the general replication theorem in appendix 10B proves that the replication digitals are $$a_s = E[d(U)|U \in \Omega_s] - \underline{e} \text{ for } s=1, 2, \ldots, S \qquad 10.1I$$

The replication P&L and the infimum replication P&L can be computed as follows $$C = \sum_{s=1}^{S} I[U \in \Omega_s]\left(E[d(U) \mid U \in \Omega_s] - d(U)\right) \qquad 10.1J$$

$$inf\ C = \min_{s=1,2,\ldots,S}\left[\inf_{U \in \Omega_s}\left(E[d(U) \mid U \in \Omega_s] - d(U)\right)\right] \qquad 10.1K$$

The infimum is significant because it represents the worst possible loss to the auction sponsor. If d is bounded over the sample space, then this infimum will be finite, but in the case where d is unbounded this infimum may be unbounded below.

For an order to sell the derivatives strategy d, the general replication theorem in appendix 10B shows that the replicating digitals for selling d are $$a_s \overline{e} - E[d(U)|U \in \Omega_s] \text{ for } s=1, 2, \ldots, S \qquad 10.1L$$

The replication P&L and the infimum replication P&L for a sell of d can be computed as follows $$C = \sum_{s=1}^{S} I[U \in \Omega_s](d(U) - E[d(U) \mid U \in \Omega_s]) \qquad 10.1M$$

$$inf\ C = \min_{s=1,2,\ldots,S}\left[\inf_{U \in \Omega_s}\left(d(U) - E[d(U) \mid U \in \Omega_s]\right)\right] \qquad 10.1N$$

Note that the replication P&L for a sell of d is the negative of the replication P&L for a buy of d. Similarly, the infimum replication P&L for a sell of d is the negative of the infimum replication P&L for a buy of d.

The variance of the replication P&L is the same for a buy or a sell $$\text{Var}[C] = \sum_{s=1}^{S} p_s \text{Var}[d(U) \mid U \in \Omega_s] \qquad 10.1O$$

It is worth noting that for both buys of d and sells of d that $$\min(a_1, a_2, \ldots, a_{S-1}, a_S) = 0 \qquad 10.1P$$

Thus, all the a's are non-negative and at least one of the a's is exactly zero.

The example embodiment described above restricts the parameters as follows $$0 \leqq \underline{e} < \overline{e} < \infty \qquad 10.1Q$$

Equation 10.1Q requires the conditional expected value of d(U) to be bounded both above and below. Other example embodiments may relax this assumption. For example, values of ($a_1, a_2, \ldots, a_{S-1}, a_S$) could be selected such that Objective: Choose ($a_1, a_2, \ldots, a_{S-1}, a_S$) to minimize E[median|C|] subject to median[C]=0

In this case, the a's are selected so that the auction sponsor has the lowest average absolute replication P&L subject to the constraint that the median replication P&L is zero. This objective function allows a solution for the ($a_1, a_2, \ldots, a_{S-1}, a_S$) where the conditional expected values of d(U) can be unbounded.

In addition to replicating these derivatives strategies, one can determine pricing on a derivatives strategy based on the replicating digitals. In an example embodiment, the price of a derivatives strategy d will be $$DF \times \sum_{s=1}^{S} a_s p_s,$$

where the a's represent the replicating digitals for the strategy d and DF represents the discount factor (which is based on the funding rate between the premium settlement date and the notional settlement date). In the case where the discount factor DF equals 1, the price of a derivatives strategy d will be $$\sum_{s=1}^{S} a_s p_s.$$

In an example embodiment, the auction sponsor may assess a fee for a customer transaction thus increasing the customer's price for a buy and decreasing the customer's price for a sell. This fee may be based on the replication P&L associated with each strategy, charging possibly an increasing amount based on but not limited to the variance of replication P&L or the infimum replication P&L for a derivatives strategy d.

10.2 Application of General Results to Special Cases

This section begins by examining the special case where the underlying U is one-dimensional. Section 10.2.1 introduces the general result and then section 10.2.2 provides specific examples for a one-dimensional underlying. Section 10.2.3 provides results for a two-dimensional underlying and section 10.2.4 provides results for higher dimensions.

10.2.1 General Result

For a one-dimensional underlying U, let the strikes be denoted as $k_1, k_2, \ldots, k_{S-1}$. Let the strikes be in increasing order, that is, $$k_1<k_2<k_3<\ldots<k_{S-2}<k_{S-1} \quad \text{10.2.1A}$$

For notational purposes, let $k_0=-\infty$ and let $k_S=+\infty$. Therefore, $$\Omega_1=[U:k_0\leqq U<k_1]=[U:U<k_1] \quad \text{10.2.1B}$$

$$\Omega_S=[U:k_{S-1}\leqq U<k_S]=[U:k_{S-1}\leqq U] \quad \text{10.2.1C}$$

and thus $\Omega=R^1$ and $$\Omega_s=[U:k_{s-1}\leqq U<k_s], s=1, 2, \ldots, S \quad \text{10.2.1D}$$

In other example embodiments $\Omega=R^+$, which may be useful for example if the underlying U represents the price of an instrument that cannot be negative.

The replicating digitals for a buy for a one-dimensional underlying is $$a_s=E[d(U)|k_{s-1}\leqq U<k_s]-\underline{e} \text{ for } s=1, 2, \ldots, S \quad \text{10.2.1E}$$

where $$\underline{e}=\min_{s=1,2,\ldots,S} E\left[d(U)\,\middle|\,k_{s-1}\le U<k_s\right] \quad \text{10.2.1F}$$

The replication P&L and the infimum replication P&L are $$C=\sum_{s=1}^{S} I[k_{s-1}\le U<k_s]\big(E[d(U)\,|\,k_{s-1}\le U<k_s]-d(U)\big) \quad \text{10.2.1G}$$

$$\mathit{inf}\ C=\min_{s=1,2,\ldots,S}\left[\inf_{k_{s-1}\le U<k_s}\big(E[d(U)\,|\,k_{s-1}\le U<k_s]-d(U)\big)\right] \quad \text{10.2.1H}$$

For sells of the derivatives strategy d the replicating digitals are $$a_s=\overline{e}-E[d(U)|k_{s-1}\leqq U<k_s] \text{ for } s=1, 2, \ldots, S \quad \text{10.2.1I}$$

where $$\overline{e}=\max_{s=1,2,\ldots,S} E[d(U)\,|\,k_{s-1}\le U<k_s] \quad \text{10.2.1J}$$

Further, the replication P&L and the infimum replication P&L are $$C=\sum_{s=1}^{S} I[k_{s-1}\le U<k_s]\big(d(U)-E[d(U)\,|\,k_{s-1}\le U<k_s]\big) \quad \text{10.2.1K}$$

$$\mathit{inf}\ C=\min_{s=1,2,\ldots,S}\left[\inf_{k_{s-1}\le U<k_s}\big(d(U)-E[d(U)\,|\,k_{s-1}\le U<k_s]\big)\right] \quad \text{10.2.1L}$$

The variance of replication P&L for both buys and sells of d is $$\mathrm{Var}[C]=\sum_{s=1}^{S} p_s \mathrm{Var}[d(U)\,|\,k_{s-1}\le U<k_s] \quad \text{10.2.1M}$$

Section 10.2.2 uses these formulas to derive results for derivatives strategies on one-dimensional underlyings.

10.2.2 Replicating Derivatives Strategies with a One-Dimensional Underlying

This section uses the formulas from section 10.2.1 to compute replicating digitals $(a_1, a_2, \ldots, a_{S-1}, a_S)$ for both buys and sells of the following derivatives strategies: digital options (digital calls, digital puts, and range binaries), vanilla call options and vanilla put options, call spreads and put spreads, straddles, collared straddles, forwards, collared forwards, fixed price digital options, and fixed price vanilla options.

In addition to these derivatives strategies, an auction sponsor can offer derivatives based on these techniques, including but not limited to derivatives that are quadratic (or higher power) functions of the underlying, exponential functions of the underlying, and butterfly or combination strategies that generally require the buying and selling of three of more options.

Replicating Digital Calls, Digital Puts and Range Binaries

A digital call expires in-the-money and pays out a specified amount if the underlying U is greater than or equal to a threshold value. For notation, let v be an integer such that $1\leqq v\leqq S-1$. Then the d function for a digital call with a strike price of $k_v$ is $$d(U)=\begin{cases}0 & \text{for } U<k_v\\ 1 & \text{for } k_v\le U\end{cases} \quad \text{10.2.2A}$$

For a buy order of a digital call with a strike price of $k_v$ the replicating digitals are $$a_s=\begin{cases}0 & \text{for } s=1,2,\ldots,v\\ 1 & \text{for } s=v+1,v+2,\ldots,S\end{cases} \quad \text{10.2.2B}$$

For a sell order of a digital call with a strike price of $k_v$ the replicating digitals are $$a_s=\begin{cases}1 & \text{for } s=1,2,\ldots,v\\ 0 & \text{for } s=v+1,v+2,\ldots,S\end{cases} \quad \text{10.2.2C}$$

A digital put pays out a specific quantity if the underlying is strictly below a threshold on expiration. Let v be an integer such that 1≦v≦S−1. For a digital put, d is defined as $$d(U) = \begin{cases} 1 & \text{for } U < k_v \\ 0 & \text{for } k_v \le U \end{cases} \quad 10.2.2D$$

For a buy order of a digital put with a strike price of $k_v$ the replicating digitals are $$a_s = \begin{cases} 1 & \text{for } s = 1, 2, \ldots, v \\ 0 & \text{for } s = v+1, v+2, \ldots, S \end{cases} \quad 10.2.2E$$

For a sell order of a digital put with a strike price of $k_v$ the replicating digitals are $$a_s = \begin{cases} 0 & \text{for } s = 1, 2, \ldots, v \\ 1 & \text{for } s = v+1, v+2, \ldots, S \end{cases} \quad 10.2.2F$$

A range binary strategy pays out a specific amount if the underlying is within a specified range. Let v and w be integers such that 1≦v<w≦S−1. Then the range binary strategy can be represented as $$d(U) = \begin{cases} 0 & \text{for } U < k_v \\ 1 & \text{for } k_v \le U < k_w \\ 0 & \text{for } k_w \le U \end{cases} \quad 10.2.2G$$

For a buy order of a range binary with strikes $k_v$ and $k_w$ the replicating digitals are $$a_s = \begin{cases} 0 & \text{for } s = 1, 2, \ldots, v \\ 1 & \text{for } s = v+1, v+2, \ldots, w \\ 0 & \text{for } s = w+1, w+2, \ldots, S \end{cases} \quad 10.2.2H$$

For a sell order of a range binary with strikes $k_v$ and $k_w$ the replicating digitals are $$a_s = \begin{cases} 1 & \text{for } s = 1, 2, \ldots, v \\ 0 & \text{for } s = v+1, v+2, \ldots, w \\ 1 & \text{for } s = w+1, w+2, \ldots, S \end{cases} \quad 10.2.2I$$

For these three digital strategies, it can be shown that e=0 and $\bar{e}$=1. For buys and sells of digital calls, digital puts, and range binaries, the replication P&L is zero and the variance of the replication P&L is zero.

Replicating Vanilla Call Options and Vanilla Put Options

This section describes how to replicate vanilla calls and vanilla puts. Though financial market participants will often just refer to these options as simply calls and puts, the modifier vanilla is used here to differentiate these calls and puts from digital calls and digital puts.

Let v denote an integer such that 1≦v≦S−1. A vanilla call pays out as follows $$d(U) = \begin{cases} 0 & \text{for } U < k_v \\ U - k_v & \text{for } k_v \le U \end{cases} \quad 10.2.2J$$

For a buy order for a vanilla call with strikes of $k_v$ the replicating digitals are $$a_s = \begin{cases} 0 & \text{for } s = 1, 2, \ldots, v \\ E[U \mid k_{s-1} \le U < k_s] - k_v & \text{for } s = v+1, v+2, \ldots, S \end{cases} \quad 10.2.2K$$

For a sell order for a vanilla call with strike $k_v$ the replicating digitals are $$a_s = \begin{cases} E[U \mid k_{S-1} \le U] - k_v & \text{for } s = 1, 2, \ldots, v \\ E[U \mid k_{S-1} \le U] - E[U \mid k_{s-1} \le U < k_s] & \text{for } s = v+1, v+2, \ldots, S \end{cases} \quad 10.2.2L$$

Note that for a vanilla call, e=0 and $\bar{e}=E[U|k_{S-1} \leqq U]-k_v$.

Figure 27A:
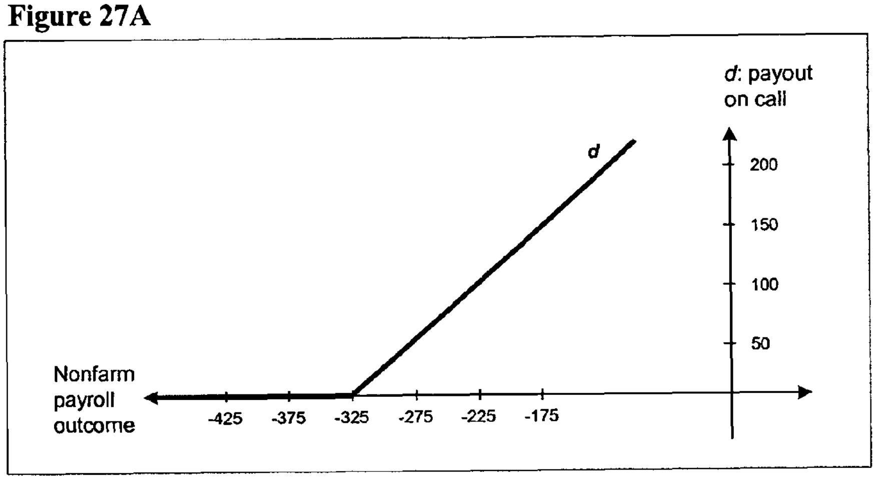
FIGS. 27A, 27B and 27C depict an example of an embodiment replicating a vanilla call for a demand-based market or auction with a strike of −325.
Figure 27B:
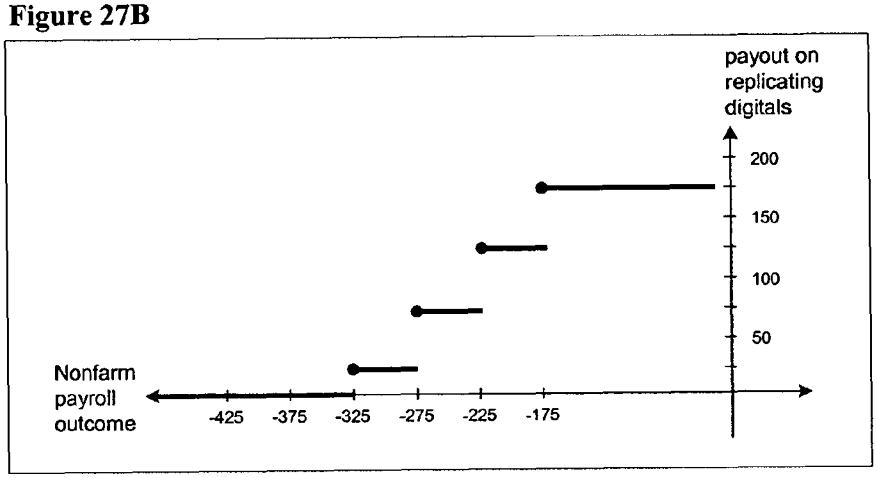
Figure 27C:
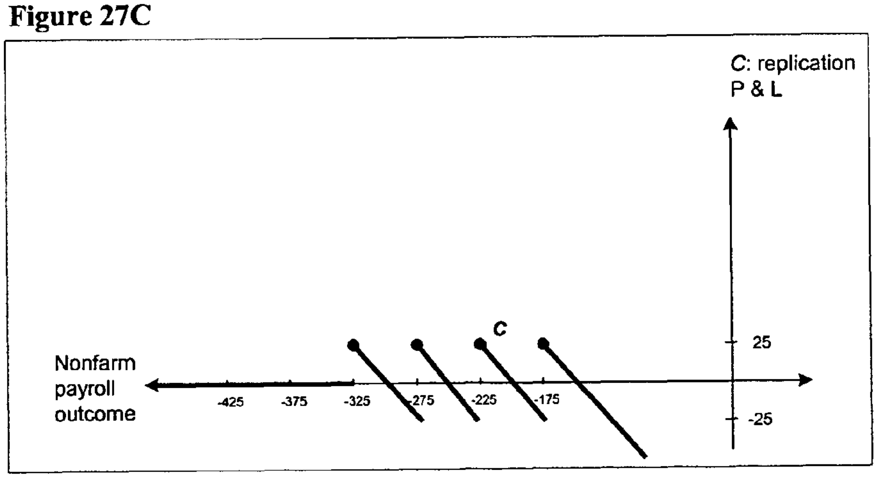

FIGS. 27A, 27B and 27C show the functions d and C for a vanilla call option for an example that is discussed in further detail in sections 10.3.1 and 10.3.2.

For a vanilla put, let v be an integer such that 1≦v≦S−1. A vanilla put pays out as follows $$d(U) = \begin{cases} k_v - U & \text{for } U < k_v \\ 0 & \text{for } k_v \le U \end{cases} \quad 10.2.2M$$

For a buy order for a vanilla put with strikes of $k_v$ the replicating digitals are $$a_s = \begin{cases} k_v - E[U \mid k_{s-1} \le U < k_s] & \text{for } s = 1, 2, \ldots, v \\ 0 & \text{for } s = v+1, v+2, \ldots, S \end{cases} \quad 10.2.2N$$

For a sell order for a vanilla put with a strike of $k_v$ the replicating digitals are $$a_s = \begin{cases} E[U \mid k_{s-1} \le U < k_s] - E[U \mid U < k_1] & \text{for } s = 1, 2, \ldots, v \\ k_v - E[U \mid U < k_1] & \text{for } s = v+1, v+2, \ldots, w \end{cases} \quad 10.2.2O$$

Note that for a vanilla put, $\underline{e}=0$ and $\overline{e}=k_v-E[U|U<k_1]$.

It is worth noting that the replication P&L for a buy or sell of a vanilla call and vanilla put can be unbounded because these options can pay out unbounded amounts.

Replicating Call Spreads and Put Spreads

A buy of a call spread is the simultaneous buy of a vanilla call and the sell of a vanilla call. Let v and w be integers such that $1 \leqq v < w \leqq S-1$. Then d for a call spread is $$d(U) = \begin{cases} 0 & \text{for } U < k_v \\ U - k_v & \text{for } k_v \leq U < k_w \\ k_w - k_v & \text{for } k_w \leq U \end{cases} \quad 10.2.2P$$

For a buy order for a call spread with strikes of $k_v$ and $k_w$ the replicating digitals are $$a_s = \begin{cases} 0 & \text{for } s = 1, 2, \ldots, v \\ E[U \mid k_{s-1} \leq U < k_s] - k_v & \text{for } s = v+1, v+2, \ldots, w \\ k_w - k_v & \text{for } s = w+1, w+2, \ldots, S \end{cases} \quad 10.2.2Q$$

For a sell order for a call spread with strikes of $k_v$ and $k_w$ the replicating digitals are $$a_s = \begin{cases} k_w - k_v & \text{for } s = 1, 2, \ldots, v \\ k_w - E[U \mid k_{s-1} \leq U < k_s] & \text{for } s = v+1, v+2, \ldots, w \\ 0 & \text{for } s = w+1, w+2, \ldots, S \end{cases} \quad 10.2.2R$$

If strike $k_w$ is high enough, a call spread will approximate a vanilla call. However, note that the replication P&L for a call spread is always bounded, whereas the replication P&L for a vanilla call can be infinite.

Figure 28A:
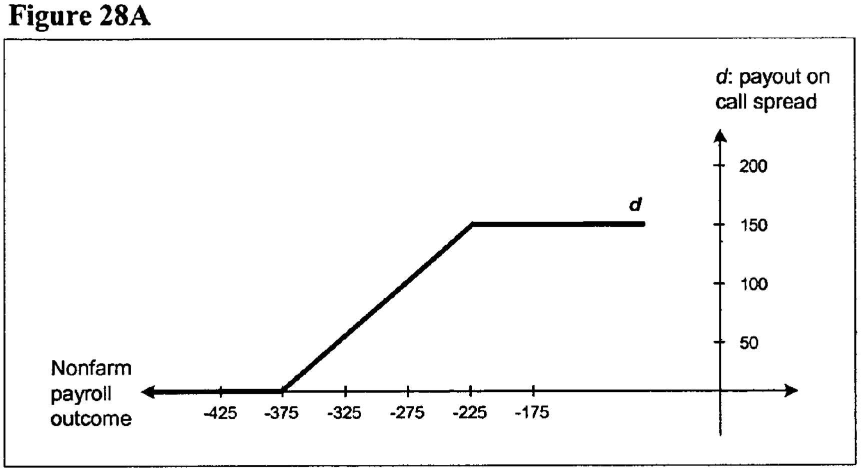
FIGS. 28A, 28B and 28C depict an example of an embodiment replicating a call spread for a demand-based market or auction with strikes −375 and −225.
Figure 28B:
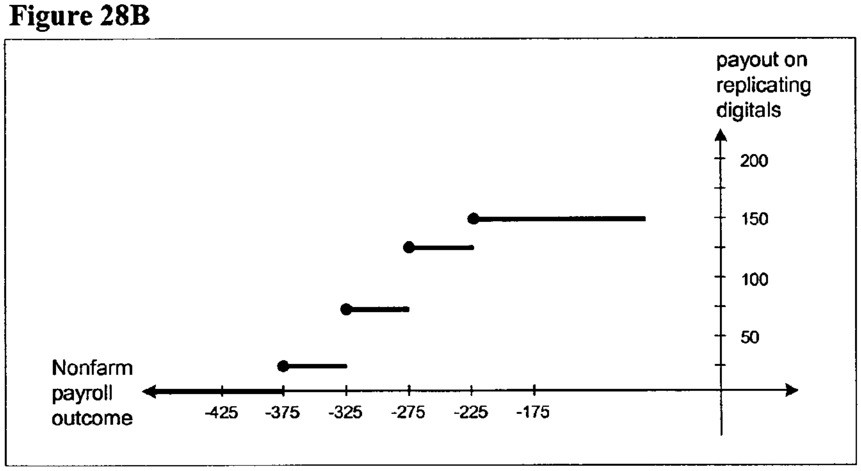
Figure 28C:
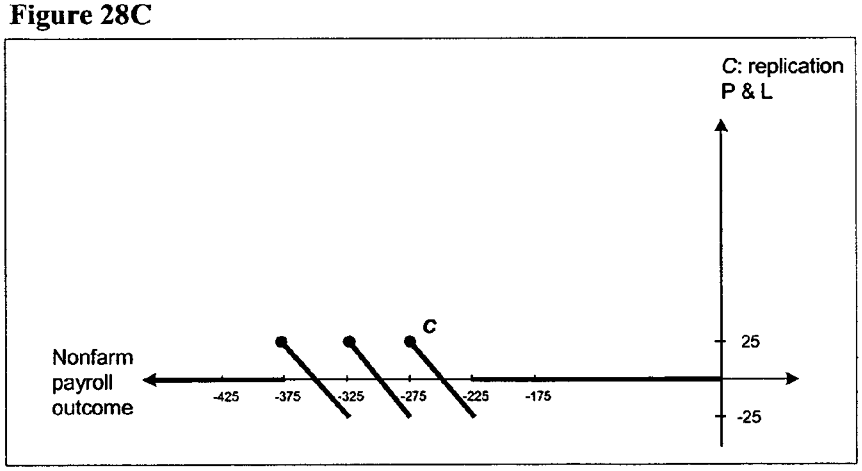

FIGS. 28A, 28B and 28C show the functions d and C for a call spread for an example that is discussed in further detail in sections 10.3.1 and 10.3.2.

A buy of a put spread is the simultaneous buy of a vanilla put and a sell of a vanilla put. Let v and w be integers such that $1 \leqq v < w \leqq S-1$. Then for a put spread the function d is $$d(U) = \begin{cases} k_w - k_v & \text{for } U < k_v \\ k_w - U & \text{for } k_v \leq U < k_w \\ 0 & \text{for } k_w \leq U \end{cases} \quad 10.2.2S$$

For a buy order for a put spread with strikes of $k_v$ and $k_w$ the replicating digitals are $$a_s = \begin{cases} k_w - k_v & \text{for } s = 1, 2, \ldots, v \\ k_w - E[U \mid k_{s-1} \leq U < k_s] & \text{for } s = v+1, v+2, \ldots, w \\ 0 & \text{for } s = w+1, w+2, \ldots, S \end{cases} \quad 10.2.2T$$

For a sell order for a put spread with strikes of $k_v$ and $k_w$ the replicating digitals are $$a_s = \begin{cases} 0 & \text{for } s = 1, 2, \ldots, v \\ E[U \mid k_{s-1} \leq U < k_s] - k_v & \text{for } s = v+1, v+2, \ldots, w \\ k_w - k_v & \text{for } s = w+1, w+2, \ldots, S \end{cases} \quad 10.2.2U$$

For a strike $k_v$ low enough, this put spread will approximate a vanilla put. However, note that the replication P&L for a put spread is always bounded, whereas the replication P&L for a vanilla put can be infinite.

For call spreads and put spreads note that $\underline{e}=0$ and $\overline{e}=k_w-k_v$.

Replicating Straddles and Collared Straddles

A buy of a straddle is the simultaneous buy of a call and a put both with identical strike prices. A buy of a straddle is generally a bullish volatility strategy, in that the purchaser profits if the outcome is very low or very high. Using digitals one can construct straddles as follows.

Let v be an integer such that $2 \leqq v \leqq S-2$. For a straddle, the payout d is $$d(U) = \begin{cases} k_v - U & \text{for } U < k_v \\ U - k_v & \text{for } k_v \leq U \end{cases} \quad 10.2.2V$$

For a buy order of a straddle with strike $k_v$ the replicating digitals are $$a_s = \begin{cases} k_v - E[U \mid k_{s-1} \leq U < k_s] - \underline{e} & \text{for } s = 1, 2, \ldots, v \\ E[U \mid k_{s-1} \leq U < k_s] - k_v - \underline{e} & \text{for } s = v+1, v+2, \ldots, S \end{cases} \quad 10.2.2W$$

where $$\underline{e}=\min[k_v-E[U|k_{v-1} \leqq U<k_v], E[U|k_v \leqq U<k_{v+1}]-k_v] \quad 10.2.2X$$

For the sell of a straddle with strike $k_v$, the replicating digitals are $$a_s = \begin{cases} \overline{e} - k_v + E[U \mid k_{s-1} \leq U < k_s] & \text{for } s = 1, 2, \ldots, v \\ \overline{e} - E[U \mid k_{s-1} \leq U < k_s] + k_v & \text{for } s = v+1, v+2, \ldots, S \end{cases} \quad 10.2.2Y$$

where $$\overline{e}=\max[k_v-E[U<k_1], E[U|k_{S-1} \leqq U]-k_v] \quad 10.2.2Z$$

Note that, buys and sells of straddles may have unbounded replication P&L since the underlying vanilla calls and vanilla puts themselves can have unbounded payouts.

As opposed to offering straddles, an auction sponsor may instead wish to offer customers a straddle-like instrument with bounded replication P&L, referred to here as a collared straddle. Let v be an integer such that $2 \leqq v \leqq S-2$. For a collared straddle let $$d(U) = \begin{cases} k_v - k_1 & \text{for } U < k_1 \\ k_v - U & \text{for } k_1 \leq U < k_v \\ U - k_v & \text{for } k_v \leq U < k_{S-1} \\ k_{S-1} - k_v & \text{for } k_{S-1} \leq U \end{cases} \quad 10.2.2AA$$

For a buy order of a collared straddle with strike $k_v$ the replicating digitals are $$a_s = \begin{cases} k_v - k_1 - \underline{e} \text{ for } s = 1 \\ k_v - E[U \mid k_{s-1} \le U < k_s] - \underline{e} \text{ for } s = 2, 3, \ldots, v \\ E[U \mid k_{s-1} \le U < k_s] - k_v - \underline{e} \text{ for } s = v+1, v+2, \ldots, S-1 \\ k_{S-1} - k_v - \underline{e} \text{ for } s = S \end{cases} \quad \text{10.2.2AB}$$

where $\underline{e}$ is as before. For a sell order of a collared straddle with strike $\bar{k}_v$ the replicating digitals are $$a_s = \begin{cases} \bar{e} - k_v - k_1 \text{ for } s = 1 \\ \bar{e} - k_v + E[U \mid k_{s-1} \le U < k_s] \text{ for } s = 2, 3, \ldots, v \\ \bar{e} - E[U \mid k_{s-1} \le U < k_s] + k_v \text{ for } s = v+1, v+2, \ldots, S-1 \\ \bar{e} - k_{S-1} + k_v \text{ for } s = S \end{cases} \quad \text{10.2.2AC}$$

where $\bar{e}=\max[k_{S-1}-k_v, k_v-k_1]$.

As observed above, the replication P&L for this collared straddle is bounded, since it comprises the buy of a call spread and the buy of a put spread.

Replicating Forwards and Collared Forwards

A forward pays out based on the underlying as follows $$d(U)=U \quad \text{1.0.2.2AD}$$

Therefore, for a buy order for a forward, the replicating digitals are $$a_s=E[U|k_{s-1} \leqq U<k_s]-E[U|U<k_1] \text{ for } s=1, 2, \ldots, S \quad \text{10.2.2AE}$$

For a sell order for a forward, note the replicating digitals are $$a_s=E[U|k_{S-1} \leqq U]-E[U|k_{s-1} \leqq U<k_s] \text{ for } s=1, 2, \ldots, S \quad \text{10.2.2AF}$$

Note that for a forward, $\underline{e}=E[U|U<k_1]$ and $\bar{e}=E[U|k_{S-1} \leqq U]$.

Note that buys and sells of forwards can have unbounded replication P&L.

To avoid offering a forward with possibly unbounded replication P&L, the auction sponsor may offer a collared forward strategy with maximum and minimum payouts. For a collared forward $$d(U) = \begin{cases} k_1 \text{ for } U < k_1 \\ U \text{ for } k_1 \le U < k_{S-1} \\ k_{S-1} \text{ for } k_{S-1} \le U \end{cases} \quad \text{10.2.2AG}$$

Note that $\underline{e}=k_1$ and $\bar{e}=k_{S-1}$. Therefore, for a buy order for a collared forward, the replicating digitals are $$a_s = \begin{cases} 0 \text{ for } s = 1 \\ E[U \mid k_{s-1} \le U < k_s] - k_1 \text{ for } s = 2, 3, \ldots, S-1 \\ k_{S-1} - k_1 \text{ for } s = S \end{cases} \quad \text{10.2.2AH}$$

Note that the formulas for the a's are identical to those for a call spread with strikes of $k_1$ and $k_{S-1}$.

For a sell order for a collared forwarded $$a_s = \begin{cases} k_{S-1} - k_1 \text{ for } s = 1 \\ k_{S-1} - E[U \mid k_{s-1} \le U < k_s] \text{ for } s = 2, 3, \ldots, S-1 \\ 0 \text{ for } s = S \end{cases} \quad \text{10.2.2AI}$$

Note that buys and sells of collared forwards, by construction, have bounded replication P&L.

Replicating Digital Options with a Maximum Fixed Price

An auction sponsor can offer customers derivatives strategies where the customer specifies the maximum price to pay and then the strike is determined such that the customer pays as close as possible to but no greater than the specified price. Offering these derivatives strategies will allow a customer to trade such market strategies as the over-under strategy, where the customer receives a notional quantity equal to twice the price. As another example, a customer could trade a digital option with a specific payout of say 5 to 1. These derivatives strategies may provide the customer with an option with a strike that may not be available for other options in the auction. For example, in general the option strikes on these strategies may be different from $k_1, k_2, \ldots, k_{S-1}$ thus these derivative strategies provide the customers with customized strikes.

For illustrative purposes, assume that the customer desires a digital call option and specifies a price $p_*$, which is the maximum price the customer is willing to pay for this option. Based on this $p_*$, the strike $k_*$ is then determined such that $k_*$ is as low as possible such that the price of the digital call option is no greater than $p_*$. To implement an over-under strategy, the customer will submit a price of $p_*=0.5$ and to request a digital option with a 5 to 1 payout, the customer will submit a price of $p_*=0.2$.

This digital call option pays out 1 if the underlying U is greater than or equal to k* and zero otherwise. Therefore, $$d(U) = \begin{cases} 0 \text{ for } U < k_* \\ 1 \text{ for } k_* \le U \end{cases} \quad \text{10.2.2AJ}$$

Assume that the digital call option struck at $k_{v-1}$ has a price less than $p_*$ and the digital call option struck at $k_v$ has a price greater than or equal to $p_*$ and assume that $1 \leqq v \leqq S-2$. Therefore, $$k_{v-1}<k_* \leqq k_v \quad \text{10.2.2AK}$$

In the special case where the price of the digital call option struck at $k_v$ equals exactly $p_*$, then $k_*=k_v$ and the replicating digitals for this derivatives strategy are the replicating digitals for the digital call struck at $k_v$.

The expected value of the digital call option payout is $$E[d(U)]=Pr[k_* \leqq U] \quad \text{10.2.2AL}$$

The auction sponsor will set $k_*$ such that the expected payout on the option is as close to as possible but no greater than $p_*$. Namely, $k_*$ is the minimum value such that $$Pr[k_* \leqq U] \leqq p_* \quad \text{10.2.2AM}$$

Therefore, in terms of the states s, the payout of the option strategy is $$d(U)=\begin{cases}0 \text{ for } s=1,2,\ldots,v-1\\ 0 \text{ for } s=v \text{ and } U<k_*\\ 1 \text{ for } s=v \text{ and } k_*\le U\\ 1 \text{ for } s=v+1,v+2,\ldots,S\end{cases} \quad 10.2.2\text{AN}$$

Now, as for the previously considered digital options e=0 and $\bar{e}$=1. By the general replication theorem of appendix 10B then $$a_s=\begin{cases}0 \text{ for } s=1,2,\ldots,v-1\\ \dfrac{Pr[k_*\le U<k_v]}{p_v} \text{ for } s=v\\ 1 \text{ for } s=v+1,v+2,\ldots,S\end{cases} \quad 10.2.2\text{AO}$$

The price of this digital call option can be computed as $$\begin{aligned}\sum_{s=1}^{S}a_sp_s&=\frac{Pr[k_*\le U<k_v]}{p_v}p_v+\sum_{s=v+1}^{S}p_s\\ &=Pr[k_*\le U<k_v]+\sum_{s=v+1}^{S}p_s\\ &=Pr[k_*\le U]\le p_*\end{aligned} \quad 10.2.2\text{AP}$$

where the last step follows by how $k_*$ is constructed.

By the general replication theorem of appendix 10B, the sell of this strategy has the following replicating digitals $$a_s=\begin{cases}1 \text{ for } s=1,2,\ldots,v-1\\ 1-\dfrac{Pr[k_*\le U<k_v]}{p_v} \text{ for } s=v\\ 0 \text{ for } s=v+1,v+2,\ldots,S\end{cases} \quad 10.2.2\text{AQ}$$

It is worth noting that the infimum replication P&L for buys and sells of this strategy is finite.

Replicating Vanilla Options with a Fixed Price

This section shows how to replicate a vanilla option with a fixed price. For illustrative purposes, assume that a customer requests to purchase a vanilla call with a price of $p_*$. Let $k_*$ denote the strike price of the option to be determined to create an option with a price of $p_*$. This vanilla call pays out as follows $$d(U)=\begin{cases}0 \text{ for } U<k_*\\ U-k_* \text{ for } k_*\le U\end{cases} \quad 10.2.2\text{AR}$$

Assume that the price of a vanilla call with a strike of $k_{v-1}$ is less than $p_*$ and that the price of a vanilla call with a strike of $k_v$ is greater than or equal to $p_*$. Thus, $$k_{v-1}<k_*\leqq k_v \quad 10.2.2\text{AS}$$

In the special case that the price of a vanilla call with a strike of $k_v$ is exactly $p_*$ then set $k_*=k_v$ and the replicating digitals are the replicating digitals for a vanilla call.

Now, the expected value of the payout on this option is $$E[d(U)]=E[U-k_*|k_*\le U<k_v]Pr[k_*\le U<k_v]+\sum_{s=v+1}^{S}E[U-k_*\mid k_{s-1}\le U<k_s]p_s \quad 10.2.2\text{AT}$$

Set $k_*$ such that the expected payout on the option equals the price $p_*$. Namely, that $$p_*=E[U-k_*|k_*\le U<k_v]Pr[k_*\le U<k_v]+\sum_{s=v+1}^{S}E[U-k_*\mid k_{s-1}\le U<k_s]p_s \quad 10.2.2\text{AU}$$

Solving for $k_*$ in this equation may require a one-dimensional iterative search.

Therefore, the derivatives strategy d in terms of states is $$d(U)=\begin{cases}0 \text{ for } s=1,2,\ldots,v-1\\ 0 \text{ for } s=v \text{ and } U<k_*\\ U-k_* \text{ for } s=v \text{ and } k_*\le U\\ U-k_* \text{ for } s=v+1,v+2,\ldots,S\end{cases} \quad 10.2.2\text{AV}$$

Note that e=0 and $\bar{e}=E[U-k_*|k_{S-1}\leqq U]$. Therefore, by the general replication theorem of appendix 10B, the replicating digitals are $$a_s=\begin{cases}0 \text{ for } s=1,2,\ldots,v-1\\ \dfrac{Pr[k_*\le U<k_v](E[U-k_*|k_*\le U<k_v])}{p_v} \text{ for } s=v\\ E[U-k_*|k_{s-1}\le U<k_s] \text{ for } s=v+1,v+2,\ldots,S\end{cases} \quad 10.2.2\text{AW}$$

To check that the replication of this derivatives strategy has a price of p*, note that the price is $$\begin{aligned}\sum_{s=1}^{S}a_sp_s&=\frac{Pr[k_*\le U<k_v](E[U-k_*|k_*\le U<k_v]}{p_v}p_v+\sum_{s=v+1}^{S}p_sE[U-k_*|k_{s-1}\le U<k_s]\\ &=Pr[k_*\le U<k_v]E[U-k_*|k_*\le U<k_v]+\sum_{s=v+1}^{S}p_sE[U-k_*|k_{s-1}\le U<k_s]\\ &=p_*\end{aligned} \quad 10.2.2\text{AX}$$

For sells of this strategy, $$a_s = \begin{cases} E[U - k_* | k_{s-1} \le U] \text{ for } s = 1, 2, \ldots, v-1 \\ E[U - k_* | k_{s-1} \le U] - \dfrac{Pr[k_* \le U < k_v](E[U - k_* | k_* \le U < k_v])}{p_v} \text{ for } s = v \\ E[U - k_* | k_{s-1} \le U] - E[U - k_* | k_{s-1} \le U < k_s] \text{ for } s = v+1, v+2, \ldots, S \end{cases} \quad \text{10.2.2AY}$$

Using this approach, an auction sponsor can use digital options to replicate a vanilla call option with a fixed delta. In this way, a customer can request a vanilla call option with a 25 delta or a 50 delta since the price of a vanilla call option is a one-to-one function of the delta of a vanilla call option (with the option maturity, the forward of the underlying, the implied volatility as a differentiable function of strike, and the interest rate all fixed and known).

In addition to replicating vanilla call options, auction sponsors can use this replication approach to offer fixed price options for, but not limited to, vanilla puts, call spreads, and put spreads.

Summary of Replication P&L

Table 10.2.2-1 shows the replication P&L for these different derivatives strategies discussed above.

TABLE 10.2.2-1

Replication P&L for different derivative strategies.

| Derivative Strategy | Replication P&L |
|---|---|
| A digital call | 0 |
| A digital put | 0 |
| A range binary | 0 |
| A vanilla call | Possibly Infinite |
| A vanilla put | Possibly Infinite |
| A call spread | Finite |
| A put spread | Finite |
| A straddle | Possibly Infinite |
| A collared straddle | Finite |
| A forward | Possibly Infinite |
| A collared forward | Finite |
| A digital call with maximum price | Finite |
| A vanilla call with a fixed price | Possibly Infinite |

10.2.3 Replicating Derivatives Strategies when the Underlying is Two-Dimensional Assume that the underlying U is two-dimensional and let $U_1$ and $U_2$ denote one-dimensional random variables as follows $$U=(U_1,U_2) \quad \text{10.2.3A}$$

Assume that derivatives strategies will be based on a total of $S_1-1$ strikes for $U_1$ denoted $k_1^1, k_2^1, k_3^1, \ldots, k_{s_1-1}^1$, and assume option strategies will be based on a total of $S_2-1$ strikes for $U_2$ denoted $k_1^2, k_2^2, k_3^2, \ldots, k_{s_2-1}^2$. Note that a superscript of 1 is used to denote strikes associated with $U_1$ and a superscript of 2 is used to denote strikes associated with $U_2$. Further, assume that $$k_1^1<k_2^1<k_3^1< \ldots <k_{S_1-2}^1<k_{S_1-1}^1 \quad \text{10.2.3B}$$

$$k_1^2<k_2^2<k_3^2< \ldots <k_{S_2-2}^2<k_{S_2-1}^2 \quad \text{10.2.3C}$$

Thus, the strikes are in ascending order based on the subscript. Further, for notational convenience, for $U_1$ let $k_0^1=-\infty$ and let $k_{S_1}^1=\infty$. For $U_2$, let $k_0^2=-\infty$ and $k_{s_2}^2=\infty$. These four variables do not represent actual strikes but will be useful in representing formulas later.

For terminology, let state (i,j) denote an outcome U such that $$[U:k_{i-1}^1 \leqq U_1<k_i^1]\cap[U:k_{j-1}^2 \leqq U_2<k_j^2] \quad \text{10.2.3D}$$

for i=1, 2, . . . , $S_1$ and j=1, 2, . . . , $S_2$.

Let $p_{ij}$ denote the probability of state (i,j) occurring. That is $$p_{ij}=Pr[k_{i-1}^1 \leqq U_1<k_i^1 \;\&\; k_{j-1}^2 \leqq U_2<k_j^2] \quad \text{10.2.3E}$$

for i=1, 2, . . . , $S_1$ and j=1, 2, . . . , $S_2$. Let $a_{ij}$ denote the replicating quantity of digitals for state (i,j).

The remainder of the section will use this notation tailored to this two-dimensional case. However, it is worth mapping this notation into the general notation from section 10.2.1. In this case one can enumerate a mapping from state (i,j) into state s as follows $$s=(i-1)S_2+j \text{ for } i=1, 2, \ldots, S_1 \text{ and } j=1, 2, \ldots, S_2 \quad \text{10.2.3F}$$

This defines s for s=1, 2, . . . , S where $S=S_1\times S_2$. Then $$\Omega_s=[U:k_{i-1}^1 \leqq U_1<k_i^1, k_{j-1}^2 \leqq U_2<k_j^2] \quad \text{10.2.3G}$$

$$p_s=p_{ij} \quad \text{10.2.3H}$$

$$a_s=a_{ij} \quad \text{10.2.3I}$$

for $s=(i-1)S_2+j$.

The general replication theorem from appendix 10B can be used to derive results for this two-dimensional case. The digital replication for a buy is $$a_{ij}=E[d(U_1,U_2)|k_{i-1}^1 \leqq U_1<k_i^1 \;\&\; k_{j-1}^2 \leqq U_2<k_j^2]-\underline{e} \quad \text{10.2.3J}$$

for i=1, 2, . . . , $S_1$ and j=1, 2, . . . , $S_2$ where $$\underline{e} = \min_{\substack{i=1,2,\ldots,S_1 \\ j=1,2,\ldots,S_2}} E[d(U_1, U_2)|k_{i-1}^1 \le U_1 < k_i^1 \;\&\; k_{j-1}^2 \le U_2 < k_j^2] \quad \text{10.2.3K}$$

The replication P&L and the infimum replication P&L for a buy is given by $$C = \sum_{i=1}^{S_1} \sum_{j=1}^{S_2} I[k_{i-1}^1 \le U_1 < k_i^1] I[k_{j-1}^2 \le U_2 < k_j^2] \times (E[d(U_1, U_2)|k_{i-1}^1 \le U_1 < k_i^1 \;\&\; k_{j-1}^2 \le U_2 < k_j^2] - d(U_1, U_2)) \quad \text{10.2.3L}$$

$$\inf C = \min_{\substack{i=1,2,\ldots,S_1 \\ j=1,2,\ldots,S_2}} \left[ \inf_{\substack{k_{i-1}^1 \le U_1 < k_i^1 \\ k_{j-1}^2 \le U_2 < k_j^2}} \left( E[d(U_1, U_2) \,|\, k_{i-1}^1 \le U_1 < k_i^1 \;\&\; k_{j-1}^2 \le U_2 < k_j^2] - d(U_1, U_2) \right) \right] \quad \text{10.2.3M}$$

For sells of the strategy based on d $$a_{ij}=\bar{e}-E[d(U)|k_{i-1}^1 \leqq U_1<k_i^1 \;\&\; k_{j-1}^2 \leqq U_2<k_j^2] \quad \text{10.2.3N}$$

for i=1, 2, . . . , $S_1$ and j=1, 2, . . . , $S_2$ where $$\bar{e} = \max_{\substack{i=1,2,\ldots,S_1\\ j=1,2,\ldots,S_2}} E[d(U_1, U_2) | k_{i-1}^1 \le U_1 < k_i^1 \ \& k_{j-1}^2 \le U_2 < k_j^2] \quad 10.2.3O$$

The replication P&L, and the infimum replication P&L are $$C = \sum_{i=1}^{S_1} \sum_{j=1}^{S_2} I[k_{i-1}^1 \le U_1 < k_i^1] I[k_{j-1}^2 \le U_2 < k_j^2] \times (d(U_1, U_2) - [d(U_1, U_2) | k_{i-1}^1 \le U_1 < k_i^1 \ \& k_{j-1}^2 \le U_2 < k_j^2]]) \quad 10.2.3P$$

$$inf\ C = \min_{\substack{i=1,2,\ldots,S_1\\ j=1,2,\ldots,S_2}} \left[ \inf_{\substack{k_{i-1}^1 \le U_1 < k_i^1\\ k_{j-1}^2 \le U_2 < k_j^2}} (d(U_1, U_2) - E[d(U_1, U_2) \mid k_{i-1}^1 \le U_1 < k_i^1 \ \& k_{j-1}^2 \le U_2 < k_j^2]) \right] \quad 10.2.3Q$$

The variance of the replication P&L for both buys and sells of d is $$\text{Var}[C] = \sum_{i=1}^{S_1} \sum_{j=1}^{S_2} p_{ij} \text{Var}[d(U_1, U_2) | k_{i-1}^1 \le U_1 < k_i^1 \ \& k_{j-1}^2 \le U_2 < k_j^2] \quad 10.2.3R$$

Replicating Derivatives Strategies that Depend Upon Only One Underlying

With a two-dimensional underlying (or equivalently option strategies based on two univariate random variables), an auction sponsor can offer customers option strategies described above from the one-dimensional underlying including but not limited to call spreads and put spreads. Including these univariate vanilla options with a two-dimensional underlying will help aggregate liquidity in these markets as it allows customers to take positions based on $U_1$ individually, $U_2$ individually, or $U_1$ and $U_2$ jointly all in the same auction.

To see how this can be done, as an illustration consider a call spread with strikes $k_v^1$ and $k_w^1$. To price a call spread on $U_1$ in this framework define $$d(U_1, U_2) = \begin{cases} 0 \text{ if } U_1 < k_v^1 \\ U_1 - k_v^1 \text{ if } k_v^1 \le U_1 < k_w^1 \\ k_w^1 - k_v^1 \text{ if } k_w^1 \le U_1 \end{cases} \quad 10.2.3S$$

Note that this function does not depend upon $U_2$ in any way. For a buy of d in this case, the replicating digitals are $$a_{ij} = \begin{cases} 0 \text{ for } i = 1,2,\ldots, v \text{ and } j = 1,2,\ldots, S_2 \\ E[U_1 | k_{i-1}^1 \le U_1 < k_i^1 \ \& k_{j-1}^2 \le U_2 < k_j^2] - k_v^1 \\ \text{for } i = v+1, v+2, \ \ldots, w \text{ and } j = 1,2,\ldots, S_2 \\ k_w^1 - k_v^1 \text{ for } i = w+1, w+2, \ \ldots, S_1 \text{ and } j = 1,2,\ldots, S_2 \end{cases} \quad 10.2.3T$$

Also, for a sell order on d $$a_{ij} = \begin{cases} k_w^1 - k_v^1 \text{ for } i = 1,2,\ldots, v \text{ and } j = 1,2,\ldots, S_2 \\ k_w^1 - E[U_1 | k_{i-1}^1 \le U_1 < k_i^1 \ \& k_{j-1}^2 \le U_2 < k_j^2] \\ \text{for } i = v+1, v+2, \ \ldots, w \text{ and } j = 1,2,\ldots, S_2 \\ 0 \text{ for } i = w+1, w+2, \ \ldots, S_1 \text{ and } j = 1,2,\ldots, S_2 \end{cases} \quad 10.2.3U$$

For a specific i, consider the case where $$E[U_1 | k_{i-1}^1 \leqq k_i^1 \ \& \ k_{j-1}^2 \leqq U_2 < k_j^2] = E[U_1 | k_{i-1}^1 \leqq U_1 < k_i^1] \quad 10.2.3V$$

for all j, i.e. if the conditional expectation of $U_1$ given i and j is equal to the conditional expectation of $U_1$ given i. This condition will be satisfied, for instance, if $U_1$ and $U_2$ are independent random variables. Then under this condition the formula for $a_{ij}$ for buys and sells simplifies to the replication formulas for a call spread in one-dimension discussed in section 10.3. Specifically, equation 10.2.3T simplifies to equation 10.2.2Q, and equation 10.2.3U simplifies to equation 10.2.2R.

Replicating Derivatives Strategies on the Sum, Difference, Product and Quotient of Two Variables To create an option on the sum of two variables, set the function d as follows $$d(U_1, U_2) = \begin{cases} 0 \text{ if } U_1 + U_2 < k \\ U_1 + U_2 - k \text{ if } k \le U_1 + U_2 \end{cases} \quad 10.2.3W$$

Assume that the strikes are all non-negative and the underlyings are also non-negative (so $k_0^1=0$ and $k_0^2=0$) and further assume that $k>k_1^1+k_1^2$. In this case, for a buy of d $$a_{ij}=E[\max(U_1+U_2-k,0) | k_{i-1}^1 \leqq U_1 < k_i^1 \ \& \ k_{j-1}^2 \leqq U_2 < k_j^2] \quad 10.2.3X$$

for $i=1, 2, \ldots, S_1$ and $j=1, 2, \ldots, S_2$

Note that several values of $a_{ij}$ will likely be zero in this case. For example, since $k>k_1^1+k_1^2$, then in state (1, 1) $U_1+U_2<k$ so $a_{11}=0$. This implies that $\bar{e}=0$. For a sell of d, then, $$a_{ij}=\bar{e}-E[\max(U_1+U_2-k,0) | k_{i-1}^1 \leqq U_1 < k_i^1 \ \& \ k_{j-1}^2 \leqq U_2 < k_j^2] \quad 10.2.3Y$$

for $i=1, 2, \ldots, S_1$ and $j=1, 2, \ldots, S_2$ where $$\bar{e}=E[U_1+U_2-k | k_{s_1-1}^1 \leqq U_1 \ \& \ k_{s_2-1}^2 \leqq U_2] \quad 10.2.3Z$$

Creating options on the sum of two variables will be useful to the auction sponsor. For example, $U_1$ could be the number of heating degree days for January and $U_2$ could be the number of heating degree days for February. Then the sum of these two variables $U_1+U_2$ is the number of heating degree days for January and February combined.

In a similar fashion an auction sponsor can offer derivatives strategies on the difference between $U_1$ and $U_2$. For instance, $U_1$ could be the level of target federal funds at the end of the next federal reserve open market committee meeting and $U_2$ could be level of target federal funds after the following such meeting. Thus an option on the difference $U_2-U_1$ would relate to what happens between the end of the 1st meeting and the end of the 2nd meeting. In addition, derivatives strategies on differences can be applied to the interest rate market. If $U_1$ is a two-year interest rate at the close at a certain date in the future and $U_2$ is a ten-year interest rate at the close at the same future date, then the difference represents the slope of the interest rate curve at the future specified date. If $U_1$ is the yield on a 10-year reference Treasury at the close at a certain date in the future and $U_2$ is the 10-year swap rate at the close at the same date in the future, then the difference represents the swaps spread.

In a similar fashion, an auction sponsor can create options on the product of two variables. For example if $U_1$ is the exchange rate of dollars per euro and $U_2$ is the exchange rate of yen per dollar, then $U_1 \times U_2$ is the exchange rate of yen per euros.

Further, an auction sponsor can create options on the quotient of two variables. In the foreign exchange market, if $U_1$ is the Canadian dollar exchange rate per US dollar and $U_2$ is the Japanese yen exchange rate per dollar then $U_2/U_1$ is the cross rate or the Japanese yen per Canadian dollar exchange rate. As another example, if $U_2$ is the price of a stock, $U_1$ is the earnings on a stock. Then $U_2/U_1$ is the price earnings multiple of the stock.

Note that $U_1$ and $U_2$ in the examples described above have both been based on similar variables such as both based on weather outcomes. However, there is no requirement that $U_1$ and $U_2$ be closely related: in fact, they can represent underlyings that bear little or no relation to one another. For example $U_1$ may represent an underlying based on weather and $U_2$ may be an underlying based on a foreign exchange rate.

Replicating a Path Dependent Option

An example embodiment in two-dimensions can offer customers the ability to trade path dependent options. For example, consider a call option with an out-of-the-money knock out. Namely, the option pays out if the minimum of the exchange rate remains above a certain barrier $k_v$ and spot is above the strike $k_w$ on expiration.

Let $X_t$ denote the exchange rate of a currency per dollar at time t. Let $U_1$ denote the minimum value of the exchange rate over a time period so that $$U_1 = \mathrm{Min}\{X_t,\ 0 \leqq t \leqq T\} \qquad 10.2.3\text{AA}$$

where T denotes the expiration of the option. Let $U_2$ denote $X_T$, the exchange rate at time T. Then the derivatives strategy pays out as follows $$d(U_1, U_2) = \begin{cases} 0 \text{ if } U_1 < k_v \text{ or } U_2 < k_w \\ U_2 - k_w \text{ if } k_v \le U_1 \text{ and } k_w \le U_2 \end{cases} \qquad 10.2.3\text{AB}$$

Therefore, the replicating digitals are $$a_{ij} = \begin{cases} 0 \text{ for } i = 1,2, \ldots, v \text{ and } j = 1,2, \ldots, S_2 \\ E[U_2 | k_{i-1}^1 \le U_1 < k_i^1 \ \& \ k_{j-1}^2 \le U_2 < k_j^2] - k_w \\ \text{for } i = v+1, v+2, \ \ldots, S_1 \text{ and } j = 1,2, \ldots, S_2 \end{cases} \qquad 10.2.3\text{AC}$$

For a sell of this option strategy, $$a_{ij} = \begin{cases} \overline{e} - E[U_2 \mid k_{i-1}^1 \le U_1 < k_i^1 \ \& \ k_{j-1}^2 \le U_2 < k_j^2] \\ \quad \text{for } i = 1, 2, \ldots, v \text{ and } j = 1, 2, \ldots, S_2 \\ 0 \text{ for } i = v+1, v+2, \ldots, S_1 \text{ and } j = 1, 2, \ldots, S_2 \end{cases} \qquad 10.2.3\text{AD}$$

It is worth noting that the replicating digitals depend on the quantity $$E[U_2 | k_{i-1}^1 \leqq U_1 < k_i^1 \ \& \ k_{j-1}^2 \leqq U_2 < k_j^2] \qquad 10.2.3\text{AE}$$

which is equal to $$E[X_T | k_{i-1}^1 \leqq \mathrm{Min}\{X_t,\ 0 \leqq t \leqq T\} < k_i^1, k_{j-1}^1 < X_T < k_j^1] \qquad 10.2.3\text{AF}$$

Note that $\mathrm{Min}\{X_t,\ 0 \leqq t \leqq T\}$ and $X_T$ are in general not independent quantities: for example, they will be positively correlated if the path of the exchange rate follows a Brownian motion. Thus this conditional expectation may require methods that incorporate this correlation to compute this quantity.

Note that this strategy d has unbounded replication P&L. The auction sponsor could offer customers a knock out call spread to allow for strategies with bounded replication P&L.

10.2.4 Replicating Derivatives Strategies Based on Three or More Variables

Using the general formulas in section 10.1 such as equation 10.1I, an auction sponsor could replicate other types of derivatives strategies. To trade out of the money knockout options and in the money knockout options, one could set $U_1$ to be the minimum over a time period, $U_2$ to be a maximum over a time period, and $U_3$ to represent the closing value over the time period.

Section 10.3 Estimating the Distribution of the Underlying U

Sections 10.1 and 10.2 describe how to replicate derivatives strategies using digital options. This replication technique depends on certain aspects of the distribution of the underlying U. For example, the replicating digitals and the replication variance for vanilla options depend upon $E[U | k_{s-1} \leqq U < k_s]$ and $\mathrm{Var}[U | k_{s-1} \leqq U < k_s]$. This section shows how different example embodiments can be used to compute these conditional moments and, more generally, the distribution of U. The formulations in this Section 10.3, can be used and apply equally to determine the conditional moments and the distributions of U for embodiments in which the replicating basis is the vanilla replicating basis (using replicating vanillas alone or together with replicating digitals) discussed in Section 11.2 et seq., as opposed to being the digital replicating basis (using replicating digitals alone) discussed in this Section 10 and in Section 11.1.

Techniques for estimating the distribution of U can be broadly divided into global approaches and local approaches. In a global approach, a single parametric distribution is fitted or hypothesized for the distribution of the underlying. An example of a global approach would be to use a normal distribution or log-normal distribution to model the underlying. In contrast, in a local approach several distributions may be combined together to fit the underlying. For instance, a local approach may use a different distribution for each state in the sample space.

Independent of whether the auction sponsor uses a global or local approach, the auction sponsor has to choose whether or not to estimate the replicating digitals based on the auction prices. Allowing the replicating digitals to depend on the auction prices may help keep the conditional mean of the replication P&L equal to zero (where the mean is conditioned on the auction prices), as these replicating digitals will be based on the market determined distribution for U. However, this dependence on auction prices adds iterations to the calculation engine as follows: when the equilibrium prices change due to say a new order, then the replication amounts for each order will change, which will then change the equilibrium prices, which will again change the replication amounts, and so on. This process will slow down the calculation of equilibrium prices. On the other hand, if the replicating digitals are constant through the auction and do not depend on the auction prices, then convergence techniques will not require this extra iteration but the replication P&L may not have a conditional mean equal to zero, given the auction prices.

If the auction sponsor wants to offer customers fixed priced options as discussed in section 10.2.2, then the auction sponsor will have to adopt the more computationally intensive technique to compute the equilibrium, since the set of replicating digitals depend upon the auction prices for these options.

This section begins with a discussion of the global approach in section 10.3.1 followed by a discussion of the local approach in 10.3.2.

10.3.1 The Global Approach

This section discusses how the auction sponsor can use the global approach for estimating the distribution of U. First, this section describes how the auction sponsor selects a distribution for the underlying. Second, this section describes how the auction sponsor estimates the parameters of that distribution. Then, this section shows how the auction sponsor can compute the replicating digitals after the parameters of the distribution are estimated. This section concludes with an illustrative example.

Classes of Distributions for the Underlying

The auction sponsor may assume that the underlying follows a log-normal distribution, a distribution that is used frequently when the underlying is the price of a financial asset or for other variables that can only take on positive values. The log-normal model is used, for example, in the Black-Scholes pricing formula. The auction sponsor may model the underlying to be normally distributed, a distribution that has been shown to approximate many variables. In addition if the underlying is the continuously compounded return on an asset, then the return will be normally distributed if the price of the asset is log-normally distributed.

The auction sponsor may choose a distribution that matches specific characteristics of the distribution of the underlying. If the underlying has fatter tails than the normal distribution, then the auction sponsor may model the underlying as t distributed. If the underlying has positive skewness, then the auction sponsor might model the underlying as gamma distributed. If the underlying has time-varying volatility, then the auction sponsor may model the underlying as a GARCH process.

In addition to the continuous distributions described above, the auction sponsor may model the underlying using a discrete distribution, since many underlyings may in fact take on only a discrete set of values. For example, US CPI is reported to the nearest tenth and heating degree days are typically reported to the nearest degree, so both of these are discrete random variables. To handle discreteness, the auction sponsor may model U as a discrete random variable such as a multinomial random variable. In other example embodiments, the auction sponsor may choose to discretize a continuous random variable. For notation, let ρ denote the level of precision to which that the underlying U is reported. For example, ρ equals 0.1 if the underlying U is US CPI and ρ equals 1 if the underlying U is heating degree days. To model U as a discretized random variable let V denote a continuous distributed random variable and let $$U = R(V, \rho) = \rho \times int\left[\frac{V}{\rho} + 0.5\right] \qquad 10.3.1A$$

where "int" represents the greatest integer function. U is discretized through the function R applied to the continuous random variable V.

Selecting the Appropriate Distribution

The auction sponsor may select the distribution using a variety of techniques. First, the choice of the distribution may be dictated by financial theory. For example, as in the Black-Scholes formula, the log-normal distribution is often used when U denotes the price of a financial instrument. Because of this, the normal distribution is often used when U denotes the return on the financial instrument.

If historical data on the underlying is available, the auction sponsor can perform specification tests to determine a distribution that fits the historical data. For example, the auction sponsor may use historical data to compute excess kurtosis to test whether the normal distribution fits as well as the t distribution for U. As another example, the auction sponsor may use historical data to test for GARCH effects to see if a GARCH model would best fit the data. If the underlying is a discretized version of a continuous distribution, then the specification tests may specifically incorporate this information.

Estimating the Parameters of the Distribution

The auction sponsor may estimate the parameters of the distribution using a variety of approaches.

If historical data is available on the underlying, then the auction sponsor can estimate the parameters of the distribution using techniques such as moment matching and maximum likelihood. If the variable is discrete, then this discreteness may be modeled explicitly using maximum likelihood.

If options are traded on the underlying, then the auction sponsor can use these option prices to estimate the distribution of the underlying. A large body of academic literature uses the prices on options to estimate the distribution of the underlying. In these methods the implied volatility is expressed as a function of the option's strike price and then numerical derivatives are used to determine the distribution of the underlying. For example, if the 25 delta calls have a higher implied volatility than the 75 delta calls, then this method will likely imply a negative skewness in the distribution of the underlying.

If market economists or analysts forecast the underlying, the auction sponsor can use these forecasts to help determine the mean and standard deviation of the underlying. For example, when U represents an upcoming economic data release in the US such as nonfarm payrolls, between 20 and 60 economists will often forecast the release. The mean and standard deviation of these forecasts for instance may provide accurate estimates of the mean and standard deviation of the underlying. As another example, many equity analysts forecast the earnings for US large companies so if the underlying is the quarterly earnings of a large company, analyst forecasts can be used to estimate the parameters of the distribution.

In addition, an auction sponsor may determine parameters of the distribution based on the auction's implied distribution. In this case, an example embodiment may set the parameters of the distribution such that the implied probabilities of each state based on the distribution is close to or equal to the implied probabilities based on the auction's distribution.

Computing Replication Quantities from the Distribution

Once the auction sponsor has determined the distribution and the parameters of the distribution, the auction sponsor can then compute the quantities for the digital replication. For example, the quantity of replicating digitals for many option strategies such as vanilla options depend on $E[U|k_{s-1} \leqq U < k_s]$ and the replication variance for these options depend upon $Var[U|k_{s-1} \leqq U < k_s]$. This section shows how to evaluate these quantities.

Consider the case where U is normally distributed with a mean μ and standard deviation σ. Since U is a continuous random variable, the rounding parameter ρ equals 0. Let the option strikes be denoted as $k_s$ for s=1, 2, . . . , S−1. Appendix 10C shows that for s=2, 3, . . . , S−1

$$E[U \mid k_{s-1} \le U < k_s] = \mu + \frac{\frac{\sigma}{\sqrt{2}}\left[\exp\left(-\frac{(k_{s-1}-\mu)^2}{2\sigma^2}\right) - \exp\left(-\frac{(k_s-\mu)^2}{2\sigma^2}\right)\right]}{N\left[\frac{k_s-\mu}{\sigma}\right] - N\left[\frac{k_{s-1}-\mu}{\sigma}\right]} \quad 10.3.1B$$

where "exp" denotes the exponential function or raising the argument to the power of e. In this case, the variance of replication P&L will depend upon Var[U|$k_{s-1}$≦U<$k_s$], which is equal to $$Var[U \mid k_{s-1} \le U < k_s] = E[U^2 \mid k_{s-1} \le U < k_s] - (E[U \mid k_{s-1} \le U < k_s])^2 = \frac{\int_{k_{s-1}}^{k_s} u^2 f_{\mu,\sigma}(u)du}{Pr[k_{s-1} \le U < k_s]} - (E[U \mid k_{s-1} \le U < k_s])^2 \quad 10.3.1C$$

where $f_{\mu,\sigma}$ denotes the normal density function with mean μ and standard deviation σ. To evaluate this expression, the integral can be computed using for example numerical techniques.

Next consider the case where U is a discretized normal. That is, let V be normally distributed with a mean μ and standard deviation σ and let U be a function of V as follows $$U=R(V,\rho) \quad 10.3.1D$$

where R is defined in equation 10.3.1A. In this case, all outcomes of U are divisible by ρ. Assume that each strike $k_s$ is exactly equal to a possible outcome of U and then for s=2, 3, . . . , S−1

$$E[U \mid k_{s-1} \le U < k_s] = E[R(V,\rho) \mid k_{s-1} \le R(V,\rho) < k_s] = \quad 10.3.1E$$

$$\frac{\sum_{v=k_{s-1}}^{k_s-\rho} vPr[v-\rho/2 \le V < v+\rho/2]}{Pr[k_{s-1}-\rho/2 \le V < k_s-\rho/2]} = \frac{\sum_{v=k_{s-1}}^{k_s-\rho} vPr[v-\rho/2 \le V < v+\rho/2]}{N\left[\frac{k_s-\mu-(\rho/2)}{\sigma}\right] - N\left[\frac{k_{s-1}-\mu-(\rho/2)}{\sigma}\right]} = \frac{\sum_{v=k_{s-1}}^{k_s-\rho} v\left(N\left[\frac{v-\mu+(\rho/2)}{\sigma}\right] - N\left[\frac{v-\mu-(\rho/2)}{\sigma}\right]\right)}{N\left[\frac{k_s-\mu-(\rho/2)}{\sigma}\right] - N\left[\frac{k_{s-1}-\mu-(\rho/2)}{\sigma}\right]}$$

where the summation variable v increases in increments of ρ.

Recall that the replication variance depends on Var[U|$k_{s-1}$≦U<$k_s$], which is equal to $$Var[U \mid k_{s-1} \le U < k_s] = E[U^2 \mid k_{s-1} \le U < k_s] - (E[U \mid k_{s-1} \le U < k_s])^2 = \quad 10.3.1F$$

-continued $$\frac{\sum_{v=k_{s-1}}^{k_s-\rho} v^2 Pr[v-\rho/2 \le V < v+\rho/2]}{Pr[k_{s-1}-\rho/2 \le V < k_s-\rho/2]} - (E[U \mid k_{s-1} \le U < k_s])^2 = \frac{\sum_{v=k_{s-1}}^{k_s-\rho} v^2\left(N\left[\frac{v-\mu+(\rho/2)}{\sigma}\right] - N\left[\frac{v-\mu-(\rho/2)}{\sigma}\right]\right)}{Pr[k_{s-1}-\rho/2 \le V < k_s-\rho/2]} - (E[U \mid k_{s-1} \le U < k_s])^2$$

Example for Computing the Distribution and Replicating Digitals

Consider the following example to compute the replicating digitals for an auction using the global approach. Assume that the auction sponsor runs an auction for the change in US nonfarm payrolls for October 2001 as released on Nov. 2, 2001. This example will show how economist forecasts can be used to create the replicating digitals. The underlying U is measured in the change in the thousands of number of employed so an underlying value of 100 means a payroll change of 100,000 people. The payrolls are rounded to the nearest thousand: since the underlying is in thousands, then ρ=1.

Table 10.3.1-1 shows forecasts from 55 economists surveyed by Bloomberg for this economic release. These forecasts have a mean of −299.05 thousand people with a standard deviation of 70.04 thousand people.

TABLE 10.3.1-1

Economist forecasts for October 2001 change in US nonfarm payrolls in thousands of people.

| | | | | |
|---|---|---|---|---|
| −500 | −350 | −300 | −289 | −250 |
| −400 | −350 | −300 | −285 | −250 |
| −400 | −350 | −300 | −283 | −250 |
| −400 | −350 | −300 | −275 | −225 |
| −400 | −340 | −300 | −275 | −210 |
| −385 | −325 | −300 | −275 | −200 |
| −380 | −325 | −300 | −275 | −185 |
| −380 | −325 | −300 | −275 | −150 |
| −360 | −325 | −300 | −275 | −150 |
| −350 | −300 | −300 | −275 | −150 |
| −350 | −300 | −290 | −266 | −145 |

If the auction sponsor assumes that U is a discretized version of the normal, then the likelihood function is $$\text{Likelihood Function} = \prod_{t=1}^{53}\left(N\left[\frac{f_t-\mu+(\rho/2)}{\sigma}\right] - N\left[\frac{f_t-\mu-(\rho/2)}{\sigma}\right]\right) \quad 10.3.1G$$

where $f_t$ denotes the forecast from the t-th economist. The maximum likelihood estimators give a mean of −299.06 and a standard deviation of 69.40. Note that the maximum likelihood estimates are quite close to the sample mean and standard deviation, suggesting that the rounding parameter ρ is a small factor in the maximum likelihood estimation.

For this auction, the strikes are set to be −425, −375, −325, −275, −225 and −175. Table 10.3.1-2 shows the values of Pr[$k_{s-1}$≦U<$k_s$], E[U|$k_{s-1}$≦U<$k_s$], and Var[U|$k_{s-1}$≦U<$k_s$] based on the model that the outcome is a discretized version of the normal with mean −299.06 with a standard deviation of 69.40 and rounding to the nearest integer (ρ=1). This model is referred to as the discretized normal model.

TABLE 10.3.1-2

The probabilities, the conditional mean, and the conditional variance for the discretized normal model.

| | State 1 U < −425 | State 2 −425 <= U < −375 | State 3 −375 <= U < −325 | State 4 −325 <= U < −275 | State 5 −275 <= U < −225 | State 6 −225 <= U < −175 | State 7 −175 <= U |
|---|---|---|---|---|---|---|---|
| Probability of State | 0.0342 | 0.1011 | 0.2162 | 0.2813 | 0.2225 | 0.1071 | 0.0375 |
| Conditional Expectation: E[U\|state s] | −452.01 | −396.26 | −348.32 | −300.44 | −252.55 | −204.62 | −147.75 |
| Conditional Variance: Var[U\|state s] | 609.13 | 194.14 | 201.88 | 204.67 | 202.18 | 194.70 | 618.05 |

Based on this model one can compute the replicating digitals for different derivatives strategies. Table 10.3.1-3 shows these replicating digitals, the prices of the strategies, and the variance of replication P&L.

TABLE 10.3.1-3

The replicating digitals, prices, and variances of different strategies based on the global normal model.

| Derivative Strategy | State 1 U < −425 | State 2 −425 <= U < −375 | State 3 −375 <= U < −325 | State 4 −325 <= U < −275 | State 5 −275 <= U < −225 | State 6 −225 <= U < −175 | State 7 −175 <= U | Price of Strategy | Replication Variance |
|---|---|---|---|---|---|---|---|---|---|
| Buy a digital call struck at −325 | 0.00 | 0.00 | 0.00 | 1.00 | 1.00 | 1.00 | 1.00 | 0.6484 | 0 |
| Buy a digital put struck at −275 | 1.00 | 1.00 | 1.00 | 1.00 | 0.00 | 0.00 | 0.00 | 0.6329 | 0 |
| Buy a range binary with strikes of −375 and −225 | 0.00 | 0.00 | 1.00 | 1.00 | 1.00 | 0.00 | 0.00 | 0.7200 | 0 |
| Buy a vanilla call struck at −325 | 0.00 | 0.00 | 0.00 | 24.56 | 72.45 | 120.38 | 177.25 | 42.5715 | 146.60 |
| Buy a vanilla put struck at −275 | 177.01 | 121.26 | 73.32 | 25.44 | 0.00 | 0.00 | 0.00 | 41.3320 | 141.70 |
| Buy a call spread strikes at −375 and −225 | 0.00 | 0.00 | 26.68 | 74.56 | 122.45 | 150.00 | 150.00 | 75.6798 | 146.22 |
| Buy a put spread strikes at −375 and −225 | 150.00 | 150.00 | 123.32 | 75.44 | 27.55 | 0.00 | 0.00 | 74.3202 | 146.22 |

10.3.2 Local Approach

In addition to the global approach described above, an auction sponsor can apply a local approach where the underlying is modeled with a large number of parameters. In particular, the local approach can be set up to have more parameters than states, whereas the global approach typically only has one or two parameters. The local approach allows the auction sponsor to fit the distribution of U with great flexibility.

The Intrastate Uniform Model

Assume that the distribution of U is discrete and that given that U is between $k_{s-1}$ and $k_s$, U is equally likely to be any of the possible outcomes within that state. In other words, if U is between $k_{s-1}$ and $k_s$, then U takes on the values $$k_{s-1}, k_{s-1}+\rho, k_{s-1}+2\rho, \ldots, k_s-\rho \quad \text{10.3.2A}$$

and $$Pr[U=k_{s-1}]=Pr[U=k_{s-1}+\rho]= \ldots =Pr[U=k_s-\rho] \quad \text{10.3.2B}$$

This intrastate uniform model can be used to compute the replicating digitals and the variance of the replicating digitals.

The conditional mean and the conditional variance for the intrastate uniform model are for s=2, 3, . . . , S−1

$$E[U \mid k_{s-1} \le U < k_s] = \frac{k_{s-1}+k_s-\rho}{2} \quad \text{10.3.2C}$$

$$Var[U \mid k_{s-1} \le U < k_s] = \frac{(k_s-k_{s-1}-\rho)(k_s-k_{s-1}+\rho)}{12} \quad \text{10.3.2D}$$

Note that these quantities are parameter free, even though the distribution of U and the variance of C depend on probabilities of each state occurring. The variance in equation 10.3.2D is derived in appendix 10C.

For the intrastate uniform model, the conditional variance of U can be written as for s=2, 3, . . . , S−1

$$Var[U \mid k_{s-1} \le U < k_s] = \frac{(k_s-k_{s-1})^2-\rho^2}{12} \quad \text{10.3.2E}$$

Thus, the variance is an increasing function of the distance between the strikes. In an example embodiment, the auction sponsor can decrease the variance of replication P&L, all other things being equal, by decreasing the distance between the strikes. This result holds for the intrastate uniform model, but will hold for other example embodiments as well.

It is worth considering three special cases for this model. In the case where $\rho=(k_s-k_{s-1})/2$, there are two possible outcomes in state s so U is binomially distributed with the two values $k_{s-1}$ and $k_{s-1}+\rho=k_{s-1}+(k_s-k_{s-1})/2=(k_s+k_{s-1})/2$. In this case, the conditional mean and the conditional variance is for s=2, 3, . . . , S−1

$$E[U \mid k_{s-1} \le U < k_s] = \frac{k_{s-1}+k-\rho}{2} = \frac{k_{s-1}+(k_{s-1}+2\rho)-\rho}{2} = k_{s-1}+\frac{\rho}{2} \quad \text{10.3.2F}$$

$$Var[U \mid k_{s-1} \le U < k_s] = \frac{(k_s-k_{s-1}-\rho)(k_s-k_{s-1}+\rho)}{12} = \frac{(2\rho-\rho)(2\rho+\rho)}{12} = \frac{\rho^2}{4} \quad \text{10.3.2G}$$

In the special case of $\rho=k_s-k_{s-1}$, the underlying only takes on the value $k_{s-1}$ in the range of state s. Therefore, the conditional mean and the conditional variance is for s=2, 3, . . . , S−1

$$E[U|k_{s-1} \leqq U<k_s]=k_{s-1} \quad \text{10.3.2H}$$

$$Var[U|k_{s-1} \leqq U<k_s]=0 \quad \text{10.3.21}$$

The case of $\rho=0$ implies that U is continuous, and in this case, for s=2, 3, . . . , S−1

$$E[U \mid k_{s-1} \le U < k_s] = \frac{k_{s-1}+k_s}{2} \quad \text{10.3.2J}$$

-continued $$Var[U \mid k_{s-1} \le U < k_s] = \frac{(k_s-k_{s-1})}{12} \quad \text{10.3.2K}$$

In contrast to the intrastate uniform model, another example embodiments might assume that the probability mass function of U is non-negative and takes the form $$Pr[U=u|k_{s-1} \leqq U<k_s]=\rho(\Gamma_s+\Phi_s u) \quad \text{10.3.2L}$$

This restriction allows the probability mass function to have a non-zero slope intrastate, as opposed to the intrastate uniform model where the probability mass function has a slope of zero intrastate. An example embodiment might estimate the parameters $\Gamma_s$ and $\Phi_s$ of this model such that these parameters minimize $$(Pr_{\Gamma_s,\Phi_s}[k_{s-2} \leqq U<k_{s-1}]-p_{s-1})^2+(Pr_{\Gamma_s,\Phi_s}[k_s \leqq U<k_{s+1}]-p_{s+1})^2 \quad \text{10.3.2M}$$

where $Pr_{\Gamma_s,\Phi_s}[k_{s-2} \leqq U<k_{s-1}]$ denotes the probability of state s−1 occurring based on $\Gamma_s$ and $\Phi_s$, $Pr_{\Gamma_s,\Phi_s}[k_s \leqq U<k_{s+1}]$ denotes the probability of state s+1 occurring based on $\Gamma_s$ and $\Phi_s$, and $p_{s-1}$ and $p_{s+1}$ denote the probability that the state's s−1 and s+1 occur based on the auction pricing.

EXAMPLE

Consider the change in US nonfarm payrolls auction for October 2001 with the strikes −425, −375, −325, −275, −225 and −175. In addition to the assumptions above for the intrastate uniform model, assume that $$E[U|U<-425]=-450.50 \quad \text{10.3.2N}$$

$$E[U|-175 \leqq U]=-150.50 \quad \text{10.3.2O}$$

Table 10.3.2-1 shows $Pr[k_{s-1} \leqq U<k_s]$, $E[U|k_{s-1} \leqq U<k_s]$, and $Var[U|k_{s-1} \leqq U<k_s]$ based on this intrastate uniform model. The probabilities of each state occurring are equal to those from table 10.3.1-2 by assumption. Note that the conditional expectations and the conditional variance for the intrastate uniform model are different than those quantities for the discretized normal model in table 10.3.1-2.

TABLE 10.3.2-1

The probabilities, the conditional mean, and the conditional variance for the intrastate uniform model.

| | State 1 U < −425 | State 2 −425 <= U < −375 | State 3 −375 <= U < −325 | State 4 −325 <= U < −275 | State 5 −275 <= U < −225 | State 6 −225 <= U < −175 | State 7 −175 <= U |
|---|---|---|---|---|---|---|---|
| Probability of State | 0.0342 | 0.1011 | 0.2162 | 0.2813 | 0.2225 | 0.1071 | 0.0375 |
| Conditional Expectation: E[U\|state s] | −450.50 | −400.50 | −350.50 | −300.50 | −250.50 | −200.50 | −150.50 |
| Conditional Variance: Var[U\|state s] | 208.25 | 208.25 | 208.25 | 208.25 | 208.25 | 208.25 | 208.25 |

Table 10.3.2-2 shows the replicating digitals, the prices, and the variance based on the intrastate uniform model. Note that the replicating digitals for the discretized normal model and intrastate uniform model are the same for the digital call, the digital put, and the range binary. Note that these replicating values are different for all other options.

TABLE 10.3.2-2

The replicating digitals, price of strategy, and variance of different strategies based on the intrastate uniform model.

| Derivative Strategy | State 1 U < −425 | State 2 −425 <= U <- 375 | State 3 −375 <= U < −325 | State 4 −325 <= U < −275 | State 5 −275 <= U < −225 | State 6 −225 <= U < −175 | State 7 −175 <= U | Price of Strategy | Replication Variance |
|---|---|---|---|---|---|---|---|---|---|
| Buy a digital call struck at −325 | 0.00 | 0.00 | 0.00 | 1.00 | 1.00 | 1.00 | 1.00 | 0.6484 | 0 |
| Buy a digital put struck at −275 | 1.00 | 1.00 | 1.00 | 1.00 | 0.00 | 0.00 | 0.00 | 0.6329 | 0 |

TABLE 10.3.2-2-continued

The replicating digitals, price of strategy, and variance of different strategies based on the intrastate uniform model.

| Derivative Strategy | State 1 U < −425 | State 2 −425 <= U < −375 | State 3 −375 <= U < −325 | State 4 −325 <= U < −275 | State 5 −275 <= U < −225 | State 6 −225 <= U < −175 | State 7 −175 <= U | Price of Strategy | Replication Variance |
|---|---|---|---|---|---|---|---|---|---|
| Buy a range binary with strikes of −375 and −225 | 0.00 | 0.00 | 1.00 | 1.00 | 1.00 | 0.00 | 0.00 | 0.7200 | 0 |
| Buy a vanilla call struck at −325 | 0.00 | 0.00 | 0.00 | 24.50 | 74.50 | 124.50 | 174.50 | 43.3494 | 135.03 |
| Buy a vanilla put struck at −275 | 175.50 | 125.50 | 75.50 | 25.50 | 0.00 | 0.00 | 0.00 | 42.1964 | 131.79 |
| Buy a call spread strikes at −375 and −225 | 0.00 | 0.00 | 24.50 | 74.50 | 124.50 | 150.00 | 150.00 | 75.6493 | 149.95 |
| Buy a put spread strikes at −375 and −225 | 150.00 | 150.00 | 125.50 | 75.50 | 25.50 | 0.00 | 0.00 | 74.3507 | 149.95 |

FIGS. 27A, 27B, and 27C show the functions d and C for a vanilla call option with a strike of −325 computed using the intrastate uniform model. FIGS. 28A, 28B, and 28C show the functions d and C for a call spread with strikes of −375 and −225 also using the intrastate uniform model.

10.4 Replication P&L for a Set of Orders

Previous sections showed how to compute the replication P&L for a single order for a specific derivatives strategy. This section shows how to compute the replication P&L on a set of orders or an entire auction.

10.4.1 Replication P&L in the General Case

As before, assume U takes on values in Ω, where Ω has a countable number of elements. Assume that the sample space Ω is divided into S disjoint and non-empty subsets $\Omega_1$, $\Omega_2$, . . . , $\Omega_S$. Assume that Pr[U=u] is the probability that outcome u occurs. Therefore, $$p_s = \sum_{u\varepsilon\Omega_s} Pr[U = u] \text{ for } s = 1, 2, \ldots, S \qquad 10.4.1\text{A}$$

where $p_s$ denotes the probability that state s occurs as defined in equation 10.1C.

Let J denote the number of filled customer orders and let these orders be indexed by the variable j, j=1, . . . , J. Let $d_j$ denote the payout function for the strategy for order j. For example if the jth order is a call spread with strikes $k_v$ and $k_w$, then $$d_j(U) = \begin{cases} 0 \text{ for } U < k_v \\ U - k_v \text{ for } k_v \le U < k_w \\ k_w - k_v \text{ for } k_w \le U \end{cases} \qquad 10.4.1\text{B}$$

Denote the filled notional payout amount for order j as $x_j$. It is worth noting that the derivations in sections 10.1, 10.2, and 10.3 implicitly assumed a notional payout value of 1 unit for each order. Let x denote the vector of length J, whose jth element is $x_j$.

Let $a_{j,s}$ denote the replicating digital for state s for order j. For instance, if the jth order is a call spread then the replicating digitals are $$a_{j,s} = \begin{cases} 0 \text{ for } s = 1, 2, \ldots, v \\ E[U \mid k_{s-1} \le U < k_s] - k_v \text{ for } s = v+1, v+2, \ldots, w \\ k_w - k_v \text{ for } s = w+1, w+2, \ldots, S \end{cases} \qquad 10.4.1\text{C}$$

Further let $$\underline{e}_j = \min_{s=1,2,\ldots,S} E[d_j(U) \mid U \in \Omega_s] \qquad 10.4.1\text{D}$$

Let C denote the replication P&L for this set of orders (in sections 10.1, 10.2, and 10.3, C previously denoted the replication P&L for a single order). The replication P&L for this set of orders if the orders are buys of strategies $d_j$ is $$C = \sum_{j=1}^{j} x_j\left[a_{j,s} - d_j(U) + \underline{e}_j\right] \qquad 10.4.1\text{E}$$

In this case, one can compute the expected replication P&L and the variance of replication P&L from the auction as follows $$E[C] = \sum_{u\varepsilon\Omega} Pr[U = u]C(u) \qquad 10.4.1\text{F}$$

$$Var[C] = \left(\sum_{u\varepsilon\Omega} Pr[U = u]C(u)^2\right) - (E[C])^2 \qquad 10.4.1.\text{G}$$

(Note that C depends on the outcome u of U and equation 10.4.1F and equation 10.4.1G makes that explicit by writing C(u)). Using formula 10.4.1E one can compute the infimum replication P&L for the set of buy orders by computing the replication P&L over all possible values u of U. In the event that the sample space Ω takes on an uncountable number of values, formulas 10.4.1 F and 10.4.1G will require modification.

10.4.2 Replication P&L for Special Cases

Consider the following types of derivative strategies:

Digital calls, digital puts, and range binaries

Vanilla calls and vanilla puts

Call spreads and put spreads

Straddles and collared straddles

Forwards and collared forwards

These derivative strategies all have the property that their payout functions d can be written as piece wise linear functions. The section below derives formulas for the replication variance for auctions with these derivative strategies.

Let D be a matrix with J rows and S columns. Define the element in the jth row and sth column $D_{j,s}$ as follows $$D_{j,s} = \begin{cases} 1 \text{ if the replication risk for order } j \text{ is an increasing function} \\ \quad \text{of } U \text{ over state } s \\ 0 \text{ if the replication risk for order } j \text{ over state } s \text{ is zero} \\ -1 \text{ if the replication risk for order } j \text{ is an decreasing function} \\ \quad \text{of } U \text{ over state } s \end{cases} \quad \text{10.4.2A}$$

Because digital calls, digital puts, and range binaries have no replication P&L, then if order j is either a buy or sell of one of these instruments then $$D_{j,s}=0 \text{ for } s=1, 2, \ldots, S \quad \text{10.4.2B}$$

If order j is a buy of a call spread with strikes $k_v$ and $k_w$ (or a sell of a put spread with strikes $k_v$ and $k_w$), then $$D_{j,s} = \begin{cases} 0 & \text{for } s = 1, 2, \ldots, v \\ 1 & \text{for } s = v+1, v+2, \ldots, w \\ 0 & \text{for } s = w+1, w+2, \ldots, S \end{cases} \quad \text{10.4.2C}$$

Similarly if order j is a sell of a call spread with strikes of $k_v$ and $k_w$ (or a buy of a put spread with strikes $k_v$ and $k_w$) then $$D_{j,s} = \begin{cases} 0 & \text{for } s = 1, 2, \ldots, v \\ -1 & \text{for } s = v+1, v+2, \ldots, w \\ 0 & \text{for } s = w+1, w+2, \ldots, S \end{cases} \quad \text{10.4.2D}$$

Next, it is worth considering two special cases to compute the variance of the replication P&L.

Case I: Var[U]<∞. In this case, one can compute the variance of replication P&L for an auction with the following strategies:

Digital calls, digital puts, and range binaries

Vanilla calls and vanilla puts

Call spreads and put spreads

Straddles and collared straddles

Forwards and collared forwards

Let $U_{new}$ be a vector of length S defined such that the sth element of $U_{new}$ is $$I[U \in \Omega_s](E[U|U \in \Omega_s]-U) \quad \text{10.4.2E}$$

for s=1, 2, . . . , S. Note, of course, that $U_{new}$ does not depend on order j. The replication P&L from an auction with these orders is $$C=x^T \times D \times U_{new} \quad \text{10.4.2F}$$

Then, $$\begin{aligned} Var[C] &= Var[x^T \times D \times U_{new}] \\ &= x^T \times D \times Var[U_{new}] \times D^T \times x \end{aligned} \quad \text{10.4.2G}$$

Because of the definition of $U_{new}$ and the fact that (E[U|$k_{s-1}$≦U<$k_s$]−U) is mean 0, then Var[$U_{new}$] is a diagonal matrix where the element in the sth diagonal position is $p_s$Var[U|$k_{s-1}$≦U<$k_s$].

Case II: Var[U]=∞. In this case, the equations from Case I can be modified to compute the variance of replication P&L for auctions with the following instruments, which all have finite replication P&L (see table 10.2.2-1):

Digital calls, digital puts, and range binaries

Call spreads and put spreads

Collared straddles

Collared forwards

Let $U_{new}$ be a vector of length S defined such that the sth element of $U_{new}$ is $$I[U \in \Omega_s](E[U|U \in \Omega_s]-U) \quad \text{10.4.2H}$$

for s=2, . . . , S−1 and let the first element and Sth element equal 0. The replication P&L from an auction with these orders is $$C=x^T \times D \times U_{new} \quad \text{10.4.2I}$$

Then, $$\begin{aligned} Var[C] &= Var[x^T \times D \times U_{new}] \\ &= x^T \times D \times Var[U_{new}] \times D^T \times x \end{aligned} \quad \text{10.4.2J}$$

10.4.2K

Because of the definition of $U_{new}$ and the fact that (E[U|$k_{s-1}$≦U<$k_s$]−U) is mean 0, then Var[$U_{new}$] is a diagonal matrix where the element in the sth diagonal position is $p_s$Var[U|$k_{s-1}$≦U<$k_s$] for s=2, 3, . . . , S−1 and zero in element 1 and S.

EXAMPLE

To illustrate Case II, consider the example from section 10.3 with S=7 states with strikes −425, −375, −325, −275, −225 and −175. Table 10.4.2-1 shows the D's for a buy of a call spread with strikes −375 and −225 and a buy of a put spread with strikes −425 and −275, both with filled notional amounts of 1. For this example, assume that the conditional variance of each state is modeled according to the intrastate uniform model of section 10.3.2 as shown in table 10.3.2-1. Table 10.4.2-1 shows that the variance of replication P&L for the call spread and put spread is 149.95 and 124.66 respectively. For J=2, these two orders combined together in an auction have a replication variance of 67.40. Because of the netting in the D's from these orders in states 3 and 4, the replication variance for these combined orders is less than the sum of the replication variance of each order. (In fact, the replication variance for these combined orders is less than the replication variance of each order individually, because the orders netted together have replication risk on states with lower probabilities.) This netting phenomenon is likely to be a feature of many different sets of orders, keeping replication P&L growing less than linearly in J, the number of orders filled.

Pr: the probability operator;
R: the rounding function, which discretizes a continuous distribution;
s: a scalar used to index across the states;
S: a scalar representing the number of states;
$S_1$: a scalar representing the number of states for $U_1$ when U is two-dimensional;
$S_2$: a scalar representing the number of states for $U_2$ when U is two-dimensional;

TABLE 10.4.2-1

The Matrix D and Replication P&L for Multiple Orders

| Derivative Strategy | State 1 U < −425 | State 2 −425 <= U < −375 | State 3 −375 <= U < −325 | State 4 −325 <= U < −275 | State 5 −275 <= U < −225 | State 6 −225 <= U < −175 | State 7 −175 <= U | Replication Variance |
|---|---|---|---|---|---|---|---|---|
| Buy a call spread strikes at −375 and −225 | 0 | 0 | 1 | 1 | 1 | 0 | 0 | 149.95 |
| Buy a put spread strikes at −425 and −275 | 0 | −1 | −1 | −1 | 0 | 0 | 0 | 124.66 |

Appendix 10A: Notation Used in Section 10
$a_s$: a scalar representing the replicating digital for strategy d for s=1, 2, . . . , S;
$a_{ij}$: a scalar representing the replicating quantity of digitals for state (i,j) for i=1, 2, . . . , $S_1$ and j=1, 2, . . . , $S_2$ when U is two-dimensional;
$a_{j,s}$: a scalar representing the replicating digital for order j in state s for j=1, 2, . . . , J and s=1, 2, . . . , S;
C: a one-dimensional random variable representing the replication P&L to the auction sponsor;
d: a function representing the payout on a derivatives strategy based on the underlying U, also d(U);
$d_j$: a function representing the payout on a derivatives strategy for order j;
D: a matrix with J rows and S columns containing 1's, 0's, and −1's;
$\underline{e}$: a scalar representing the minimum conditional expected value of d(U) across states s for s=1, 2, . . . , S
$\overline{e}$: a scalar representing the maximum conditional expected value of d(U) across states s for s=1, 2, . . . , S;
$\underline{e}_j$: a scalar representing the minimum conditional expected value of $d_j$(U) for order j across states s for s=1, 2, . . . , S;
E: the expectation operator;
Exp: the exponential function raising the argument to the power of e;
$f_{\mu,\sigma}$: the density of a normally distribution random variable with mean μ and standard deviation σ;
I: the indicator function;
Inf: the infimum function;
J: a scalar representing the number of customer orders in an auction;
$k_0, k_1, \ldots, k_S$: scalar quantities representing strikes for the case when U is one-dimensional;
$k_0^1, k_1^1, k_2^1, k_3^1, \ldots, k_{s_1}^1$: scalar quantities representing strikes for $U_1$ for the case when U is two-dimensional;
$k_0^2, k_1^2, k_2^2, k_3^2, \ldots, k_{s_2}^2$: scalar quantities representing strikes for $U_2$ for the case when U is two-dimensional;
$k_*$: a scalar representing the target strike for an option order;
N: the cumulative distribution function for the standard normal;
$p_s$: a scalar representing the probability that state s or $\Omega_s$ has occurred for s=1, 2, . . . , S;
$p_*$: a scalar representing the target price for an option order;
$p_{ij}$: a scalar representing the probability that state (i,j) has occurred for i=1, 2, . . . , $S_1$ and j=1, 2, . . . , $S_2$ when U is two-dimensional;

U: a random variable representing the underlying;
u: a possible outcome of U from the sample space Ω
$U_1$ and $U_2$: one-dimensional random variables representing the first and second elements of U when U is two-dimensional;
$U_{new}$: a random vector of length S where the sth element is $I[U\in\Omega_s](E[U|U\in\Omega_s]-U)$ for s=1, 2, . . . , S;
Var: the variance operator;
x: a vector of length J of filled notional amounts $x_j$;
$x_j$: a scalar representing the filled notional amount of order j, j=1, 2, . . . , J;
Ω: a set of points representing the sample space of U;
$\Omega_1, \Omega_2, \ldots, \Omega_S$: subsets of the sample space Ω;
ρ: a scalar representing the rounding parameter;

Appendix 10B: The General Replication Theorem

This appendix derives the formulas for the replicating digitals, the infimum replication P&L, and the variance of replication P&L for buys and sells of derivatives strategies.

As a review of notation from section 10.1, recall that U denotes the underlying. Let Ω denote the sample space of U and let $\Omega_1, \Omega_2, \ldots, \Omega_S$ represent the different sets of outcomes of U. Let d represent the derivatives strategy and define $$\underline{e} \equiv \min_{s=1,2,\ldots,S} E[d(U)\,|\,U\in\Omega_s] \quad \text{10B.A}$$

$$\overline{e} \equiv \min_{s=1,2,\ldots,S} E[d(U)\,|\,U\in\Omega_s] \quad \text{10B.B}$$

The derivation below requires d to satisfy the following restriction $$0\leqq\underline{e}<\overline{e}<\infty \quad \text{10B.C}$$

Let $(a_1, a_2, \ldots, a_{S-1}, a_S)$ represent the positions in the replicating digitals, and let C denote the replication P&L, which is given by the formula $$C=\sum_{s=1}^{S} I[U\in\Omega_s][a_s-d(U)+\underline{e}] \quad \text{10B.D}$$

General Replication Theorem. If $(a_1, a_2, \ldots, a_{S-1}, a_S)$ are selected to minimize Var[C] subject to E[C]=0, then for a buy of d $$a_s = E[d(U)|U\in\Omega_s] - \underline{e} \text{ for } s=1, 2, \ldots, S \quad \text{10B.E}$$

where d satisfies condition 10B.C. The infimum replication P&L for a buy of d is $$\inf C = \min_{s=1,2,\ldots,S}\left[\inf_{U\in\Omega_s}(E[d(U)\mid U\in\Omega_s]-d(U))\right] \quad \text{10B.F}$$

Further, for a sale of the derivatives strategy d, the replicating digitals are given by the formula $$a_s = \bar{e} - E[d(U)|U\in\Omega_s] \text{ for } s=1, 2, \ldots, S \quad \text{10B.G}$$

The infimum replication P&L for a sell of d is given by $$\inf C = \min_{s=1,2,\ldots,S}\left[\inf_{U\in\Omega_s}(d(U)-E[d(U)\mid U\in\Omega_s])\right] \quad \text{10B.H}$$

The variance of replication P&L for both buys and sells of d is $$Var[C] = \sum_{s=1}^{S} p_s Var[d(U)\mid U\in\Omega_s] \quad \text{10B.I}$$

Proof. First, begin with the derivation of the result for a buy of d. In this case $$\begin{aligned} Var[C] &\equiv E[(C-E[C])^2] \\ &= E[C^2] \end{aligned} \quad \text{10B.J}$$

where the first equality is the definition of variance and the second equality follows from the constraint E[C]=0. Since $$C = \sum_{s=1}^{S} I[U\in\Omega_s][a_s - d(U) + \underline{e}] \quad \text{10B.K}$$

Therefore, $$\begin{aligned} C^2 = \sum_{t=1}^{S}\sum_{s=1}^{S} I[U\in\Omega_s]I[U\in\Omega_t](a_s-d(U)+\underline{e})(a_t-d(U)+\underline{e}) = \\ \left(\sum_{s=1}^{S} I[U\in\Omega_s]^2(a_s-d(U)+\underline{e})^2\right) + \\ \left(\sum_{t=1,t\neq s}^{S}\sum_{s=1}^{S} I[U\in\Omega_s]I[U\in\Omega_t](a_s-d(U)+\underline{e})(a_t-d(U)+\underline{e})\right) \end{aligned} \quad \text{10B.L}$$

Note that in the second term on the RHS of equation 10B.L, the cross product terms contain the quantity $$I[U\in\Omega_s]I[U\in\Omega_t] \text{ for } t\neq s \quad \text{10B.M}$$

Since $\Omega_s$ and $\Omega_t$ are mutually exclusive for t≠s, then $$I[U\in\Omega_s]I[U\in\Omega_t]=0 \text{ for } t\neq s \quad \text{10B.N}$$

Therefore, $$\begin{aligned} C^2 &= \sum_{s=1}^{S} I[U\in\Omega_s]^2(a_s-d(U)+\underline{e})^2 \\ &= \sum_{s=1}^{S} I[U\in\Omega_s](a_s-d(U)+\underline{e})^2 \end{aligned} \quad \text{10B.O}$$

where the last equation follows from the fact that squaring an indicator function leaves it unchanged, i.e. $I^2=I$. Therefore, taking expectations of both sides of equation 10B.O gives $$\text{Var}[C] = \sum_{s=1}^{S} E[\,I[U\in\Omega_s](a_s-d(U)+\underline{e})^2] \quad \text{10B.P}$$

Taking the derivative with respect to $a_s$ for s=1, 2, . . . , S and setting to zero gives the first order condition $$E[I[U\in\Omega_s](a_s-d(U)+\underline{e})]=0 \text{ for } s\ 1, 2, \ldots, S \quad \text{10B.Q}$$

or $$E[I[U\in\Omega_s]a_s]-E[I[U\in\Omega_s]d(U)]+E[I[U\in\Omega_s]\underline{e}]=0 \text{ for } s=1, 2, \ldots, S \quad \text{10B.R}$$

which implies that $$p_s a_s - p_s E[d(U)|U\in\Omega_s] + p_s\underline{e} = 0 \text{ for } s=1, 2, \ldots, S \quad \text{10B.S}$$

Factoring out $p_s$ and solving for $a_s$ implies that $$a_s = E[d(U)|U\in\Omega_s] - \underline{e} \text{ for } s=1, 2, \ldots, S \quad \text{10B.T}$$

Next, one needs to check that E[C]=0 because that assumption was used in the derivation above. Now, $$C = \sum_{s=1}^{S} I[U\in\Omega_s][a_s-d(U)+\underline{e}] \quad \text{10B.U}$$

Substituting equation 10B.T for $a_s$ into the equation 10B.U gives $$C = \sum_{s=1}^{S} I[U\in\Omega_s](E[d(U)|U\in\Omega_s]-d(U)) \quad \text{10B.V}$$

Taking the expectations of both sides $$\begin{aligned} E(C) &= E\left[\sum_{s=1}^{S} I[U\varepsilon\Omega_s][E[d(U)|U\varepsilon\Omega_s]-d(U)]\right] \\ &= \sum_{s=1}^{S} E\left[\,I[U\varepsilon\Omega_s][E[d(U)|U\varepsilon\Omega_s]-d(U)]\right] \end{aligned} \quad \text{10B.W}$$

-continued $$= \sum_{s=1}^{S} (p_s E[d(U)|U \in \Omega_s] - p_s E[d(U)|U \in \Omega_s]) = 0$$

To compute the variance of the replication P&L, recall equation 10B.P $$\mathrm{Var}[C] = \sum_{s=1}^{S} E[\,I[U \in \Omega_s](a_s - d(U) + \underline{e})^2] \tag{10B.X}$$

Now, $$E[I[U \in \Omega_s][a_s - d(U) + \underline{e}]^2] = p_s E[(a_s - d(U) + \underline{e})^2 | U \in \Omega_s] \tag{10B.Y}$$

Note that by definition of $a_s$ in equation 10B.T $$E[a_s - d(U) + \underline{e} | U \in \Omega_s] = 0 \tag{10B.Z}$$

Therefore, $$p_s E[(a_s - d(U) + \underline{e})^2 | U \in \Omega_s] = p_s \mathrm{Var}[a_s - d(U) + \underline{e} | U \in \Omega_s] = p_s \mathrm{Var}[d(U)|U \in \Omega_s] \tag{10B.AA}$$

where the final equality follows from the fact that a, and e are constants and don't impact the variance. Thus, $$\mathrm{Var}[C] = \sum_{s=1}^{S} p_s \mathrm{Var}[d(U)|U \in \Omega_s] \tag{10B.AB}$$

Furthermore, the infimum replication P&L can be computed as follows $$\inf C = \min_{s=1,2,\ldots,S} \left[ \inf_{U \in \Omega_s} (E[d(U)|U \in \Omega_s] - d(U)) \right] \tag{10B.AC}$$

To distinguish replicating digitals for a buy of strategy d and replicating digitals for a sell of strategy d, it is useful to temporarily use $a_s$ to denote the replicating digitals for a buy of strategy d and $\tilde{a}_s$ to denote the replicating digital for a sell of strategy d. Outside of this discussion here, $a_s$ denotes the replicating digitals for both buys or sells of the derivatives strategy d.

A sell of strategy d can be handled by converting this sell into a complementary buy order such that the combined replicating portfolio pays out the same amount regardless of what state occurs. In this case, denote the replicating digitals for the complementary buy as $\tilde{a}_s$ and thus $$\tilde{a}_s + a_s = \text{constant for } s = 1, 2, \ldots, S \tag{10B.AD}$$

The minimum such constant satisfying this equation and keeping $\tilde{a}_s$ non-negative is $\overline{e} - e$. Therefore, $$\tilde{a}_s + a_s = \overline{e} - \underline{e} \text{ for } s = 1, 2, \ldots, S \tag{10B.AE}$$

which implies that $$\tilde{a}_s = \overline{e} - \underline{e} - a_s \text{ for } s = 1, 2, \ldots, S \tag{10B.AF}$$

Since $$a_s = E[d(U)|U \in \Omega_s] - \underline{e} \text{ for } s = 1, 2, \ldots, S \tag{10B.AG}$$

Therefore, $$\tilde{a}_s = \overline{e} - E[d(U)|U \in \Omega_s] \text{ for } s = 1, 2, \ldots, S \tag{10B.AH}$$

The formulas for the variance of replication P&L and the infimum replication P&L for sells of d follow from equation 10B.AH.

Appendix 10C: Derivations from Section 10.3

This appendix derives results cited in section 10.3.1 and section 10.3.2.

Derivation of Equation 10.3.1B from Section 10.3.1

This section derives equation 10.3.1B from the global normal model in Section 10.3.1. If U is normally distributed, then, the conditional expectation for s=2, 3, . . . , S−1 is given by $$E[U|k_{s-1} \le U < k_s] = \frac{\int_{k_{s-1}}^{k_s} u f_{\mu,\sigma}(u)\,du}{Pr[k_{s-1} \le U < k_s]} \tag{10C.A}$$

where $f_{\mu,\sigma}$ denotes the normal density with mean μ and standard deviation σ. Now, $$Pr[k_{s-1} \le U < k_s] = N\left[\frac{k_s - \mu}{\sigma}\right] - N\left[\frac{k_{s-1} - \mu}{\sigma}\right] \tag{10C.B}$$

where N denotes the cumulative distribution function for the standard normal. Further, $$\int_{k_{s-1}}^{k_s} u f_{\mu,\sigma}(u)\,du = \int_{\frac{k_{s-1}-\mu}{\sigma}}^{\frac{k_s-\mu}{\sigma}} (\mu + \sigma z) f_{0,1}(z)\,dz \tag{10C.C}$$

where Z=(U−μ)/σ. Therefore, $$E[U|k_{s-1} \le U < k_s] = \frac{\int_{k_{s-1}}^{k_s} u f_{\mu,\sigma}(u)\,du}{N\left[\frac{k_s - \mu}{\sigma}\right] - N\left[\frac{k_{s-1} - \mu}{\sigma}\right]} = \frac{\int_{\frac{k_{s-1}-\mu}{\sigma}}^{\frac{k_s-\mu}{\sigma}} (\mu + \sigma z) f_{0,1}(z)\,dz}{N\left[\frac{k_s - \mu}{\sigma}\right] - N\left[\frac{k_{s-1} - \mu}{\sigma}\right]} \tag{10C.D}$$

-continued $$= \frac{\mu\int_{\frac{k_{s-1}-\mu}{\sigma}}^{\frac{k_s-\mu}{\sigma}} f_{0,1}(z)dz}{N\left[\frac{k_s-\mu}{\sigma}\right]-N\left[\frac{k_{s-1}-\mu}{\sigma}\right]} + \frac{\sigma\int_{\frac{k_{s-1}-\mu}{\sigma}}^{\frac{k_s-\mu}{\sigma}} zf_{0,1}(z)dz}{N\left[\frac{k_s-\mu}{\sigma}\right]-N\left[\frac{k_{s-1}-\mu}{\sigma}\right]}$$

$$= \mu + \frac{\sigma\int_{\frac{k_{s-1}-\mu}{\sigma}}^{\frac{k_s-\mu}{\sigma}} zf_{0,1}(z)dz}{N\left[\frac{k_s-\mu}{\sigma}\right]-N\left[\frac{k_{s-1}-\mu}{\sigma}\right]}$$

$$= \mu + \frac{\sigma\int_{\frac{k_{s-1}-\mu}{\sigma}}^{\frac{k_s-\mu}{\sigma}} \frac{z}{\sqrt{2\pi}}\exp\left(-\frac{z^2}{2}\right)}{N\left[\frac{k_s-\mu}{\sigma}\right]-N\left[\frac{k_{s-1}-\mu}{\sigma}\right]}$$

$$= \mu - \frac{\frac{\sigma}{\sqrt{2\pi}}\exp\left(-\frac{z^2}{2}\right)\Big|_{\frac{k_{s-1}-\mu}{\sigma}}^{\frac{k_s-\mu}{\sigma}}}{N\left[\frac{k_s-\mu}{\sigma}\right]-N\left[\frac{k_{s-1}-\mu}{\sigma}\right]}$$

$$= \mu + \frac{\frac{\sigma}{\sqrt{2\pi}}\left[\exp\left(-\frac{(k_{s-1}-\mu)^2}{2\sigma^2}\right)-\exp\left(-\frac{(k_s-\mu)^2}{2\sigma^2}\right)\right]}{N\left[\frac{k_s-\mu}{\sigma}\right]-N\left[\frac{k_{s-1}-\mu}{\sigma}\right]}$$

Equation 10C.D matches equation 10.3.1B and so this concludes the derivation.

Derivation of Equation 10.3.2D from Section 10.3.2

This section derives equation 10.3.2D, the variance for the intrastate uniform model. The derivation for the expected value is straightforward and not presented.

Let the variable $Z_s$ be defined as $$Z_s = \frac{[U|k_{s-1} \le U < k_s] - k_{s-1}}{\rho} \quad \text{10C.E}$$

The random variable $[U|k_{s-1} \leqq U < k_s]$ takes on the values $$k_{s-1}, k_{s-1}+\rho, k_{s-1}+2\rho, \ldots, k_s-\rho \quad \text{10C.F}$$

all with equal probability, since U is assumed to be uniformly distributed intrastate. Therefore, $Z_s$ takes on the values $$0, 1, 2, \ldots, (k_s-k_{s-1}-\rho)/\rho \quad \text{10C.G}$$

all with equal probability. An example of a random variable X taking on the values 0, 1, 2, . . . , n−1 and n (all outcomes equally probable), described on page 141 in Evans, Hastings, and Peacock, Statistical Distributions (Second Edition, Wiley Interscience, New York), has a variance $$\mathrm{Var}[X] = \frac{n(n+2)}{12} \quad \text{10C.H}$$

Thus, using this result with $n=(k_s-k_{s-1}-\rho)/\rho$ implies that $$\mathrm{Var}[Z_s] = \frac{(k_s-k_{s-1}-\rho)(k_s-k_{s-1}-\rho+2\rho)}{12\rho^2} = \frac{(k_s-k_{s-1}-\rho)(k_s-k_{s-1}+\rho)}{12\rho^2} \quad \text{10C.I}$$

Therefore, $$\mathrm{Var}[U|k_{s-1} \le U < k_s] = \rho^2\mathrm{Var}[Z_s] = \frac{(k_s-k_{s-1}-\rho)(k_s-k_{s-1}+\rho)}{12} \quad \text{10C.J}$$

Equation 10C.J matches equation 10.3.2D and so this concludes the derivation.

11. REPLICATING AND PRICING DERIVATIVES STRATEGIES USING VANILLA OPTIONS

Financial market participants express market views and construct hedges using a number of contingent claims, such as derivatives strategies, including vanilla derivatives strategies (e.g. vanilla calls, vanilla puts, vanilla spreads, and vanilla straddles) and digital derivatives strategies (e.g. digital calls, digital puts, and digital ranges). Using the techniques described in section 10, an auction sponsor can use digital options to approximate or replicate these derivatives strategies.

Replicating contingent claims, such as derivatives strategies using digital options exposes the auction sponsor to replication risk, the risk derived from synthesizing derivatives strategies for customers using only digital options. To keep replication risk low, the auction sponsor may only be able to offer customers the ability to trade derivatives strategies with low replication risk, which may include vanilla strategies with strikes that are close together. In fact, customers may demand vanilla strategies with a wider range of strikes, requiring the auction sponsor to take on higher replication risk. To offer the full range of strikes demanded by customers, the auction sponsor may be exposed to a significant amount of replication risk when using digital options to replicate customer orders.

This section shows how an auction sponsor can eliminate replication risk by using vanilla options either alone, or together with digital options, instead of digital options alone, as the replicating claims established in the demand-based auction, to replicate digital and vanilla derivatives strategies in an example embodiment. This approach allows the auction sponsor to offer a wider range of strikes, which may increase customer demand in the auctions and better aggregate liquidity. This increased customer demand and liquidity will likely result in higher fee income for the auction sponsor.

In an example embodiment, this replicating approximation may be a mapping from parameters of, for example, vanilla options to the vanilla replicating basis. This mapping could be an automatic function built into a computer system accepting and processing orders in the demand-based market or auction. The replicating approximation enables auction participants or customers to interface with the demand-based market or auction, side by side with customers who trade digital options, notes and swaps, as well as other DBAR-enabled products without exposing the auction sponsor to replication risk. FIG. 29 shows this visually. All customer orders, including orders for both digital and vanilla options, are aggregated together into a single pool. This approach can help increase the overall liquidity and risk pricing efficiency of the demand-based auction by increasing the variety and number of participants in the market or auction.

The remainder of section 11 proceeds as follows. Section 10.1 provides a brief review from Section 10, on how an auction sponsor can replicate derivatives strategies using digital replication claims (also referred to as replicating digital options) as the replicating claims for the auction (also referred to as replication claims). Next, section 11.2 shows how an auction sponsor can replicate derivatives strategies using vanilla replication claims (also referred to as replicating vanilla options). Section 11.3 extends the results from section 11.2 to consider more general cases. Section 11.4 develops the mathematical principles for computing the DBAR equilibrium. Section 11.5 discusses two examples, and section 11.6 concludes with a discussion of an augmented vanilla replicating basis.

11.1 Replicating Derivatives Strategies Using Digital Options

This section briefly reviews how an auction sponsor can replicate derivatives strategies using digital options (for a more detailed discussion, see section 10). Section 11.1.1 introduces the notation and set-up. Section 11.1.2 discusses the digital replicating claims, also referred to as replicating digitals or replicating digital options. Section 11.1.3 shows how an auction sponsor can replicate digital and vanilla derivatives strategies based on these digital replicating claims. Section 11.1.4 computes the auction sponsor's replication P&L.

11.1.1 Notation and Set-Up

For simplicity, assume that the underlying U (also referred to as the event or the underlying event) is one-dimensional. As in section 10, let ρ denote the smallest measurable unit of U, or the level of precision to which the underlying U is reported. For example, ρ equals 0.1 if the underlying U is US CPI. In certain cases, ρ may be referred to as the tick size of the underlying.

Assume that the auction sponsor allows customers to trade derivatives strategies with strikes $k_1, k_2, \ldots, k_{S-1}$, corresponding to measurements of the event U that are possible outcomes of U, such that $$k_1<k_2<k_3<\ldots<k_{S-2}<k_{S-1} \quad 11.1.1A$$

Assume that the strikes $k_1, k_2, \ldots, k_{S-1}$ are all multiples of ρ.

Define $k_0$ as the lower bound of U, i.e. U is the largest value that satisfies $$Pr[U<k_0]=0 \quad 11.1.1B$$

In the event that there is no such finite $k_0$ satisfying equation 11.1.1B, let $k_0=-\infty$. Define $k_S$ as the upper bound, i.e. $k_S$ is the smallest value such that $$Pr[U>k_S]=0 \quad 11.1.1C$$

In the event that there is no such finite $k_S$ satisfying equation 11.1.1C, set $k_S=\infty$. Here, $k_0$ and $k_S$ are not strikes that customers can trade, but they will be useful mathematically in representing certain equations below.

For derivatives strategies with a single strike, that strike will typically be denoted by $k_v$ where $1\leqq v\leqq S-1$. For derivatives strategies with two strikes, the lower strike will typically be denoted by $k_v$ and the upper strike will typically be denoted by $k_w$ where $1\leqq v<w\leqq S-1$.

11.1.2 The Digital Replicating Claims

In an example embodiment, the auction sponsor may replicate derivatives strategies using digital options. For example, the auction sponsor may use S such digital options (one more option than the number of strikes) for replication. For notation, let $d^s$ denote the payout function, also referred to as the payout profile, on the sth such digital replicating claim for s=1, 2, . . . , S. The first digital replicating claim will be the digital put struck at $k_1$ which has a payout function of $$d^1(U)=\begin{cases}1 & U<k_1\\ 0 & k_1\leq U\end{cases} \quad 11.1.2A$$

The sth digital replicating claim for s=2, 3, . . . , S−1 is a digital range or range binary with strikes of $k_{s-1}$ and $k_s$, which has a payout function of $$d^s(U)=\begin{cases}0 & U<k_{s-1}\\ 1 & k_{s-1}\leq U<k_s\\ 0 & k_s\leq U\end{cases} \quad 11.1.2B$$

The Sth digital replicating claim is a digital call struck at $k_{S-1}$ with payout function $$d^s(U)=\begin{cases}1 & U<k_{S-1}\\ 0 & k_{S-1}\leq U\end{cases} \quad 11.1.2C$$

FIG. 30 and table 11.1.2 display these digital replication claims. This set of claims is referred to as the digital replicating basis. Here, regardless of the outcome of the underlying, exactly one digital replicating claim expires in-the-money.

TABLE 11.1.2

The digital replicating claims in a DBAR auction.

| Claim Number | Range for Non-Zero Payout | Replicating Claim |
|---|---|---|
| 1 | $U<k_1$ | Digital put struck at $k_1$ |
| 2 | $k_1\leqq U<k_2$ | Digital range with strikes of $k_1$ and $k_2$ |
| . . . | . . . | . . . |
| s − 1 | $k_{s-2}\leqq U<k_{s-1}$ | Digital range with strikes of $k_{s-2}$ and $k_{s-1}$ |
| s | $k_{s-1}\leqq U<k_s$ | Digital range with strikes of $k_{s-1}$ and $k_s$ |
| s + 1 | $k_s\leqq U<k_{s+1}$ | Digital range with strikes of $k_s$ and $k_{s+1}$ |
| . . . | . . . | . . . |
| S − 1 | $k_{S-2}\leqq U<k_{S-1}$ | Digital range with strikes of $k_{S-2}$ and $k_{S-1}$ |
| S | $k_{S-1}\leqq U$ | Digital call struck at $k_{S-1}$ |

11.1.3 Replicating Derivatives Strategies with Digital Replication Claims

Let d denote the payout function or payout profile for a derivatives strategy which is European style, i.e. its payout is based solely on the value of the underlying on expiration. Additionally, "derivatives strategy d" in this specification refers to the payout function or payout profile of the derivatives strategy, since a derivatives strategy is often identified by its payout function. Let $a_s$ denote the amount or number of the sth digital replicating claim, also referred to as the replication weight for this derivatives strategy d. The number or amount of each replicating claim is determined as a function of the payout profile or payout function d of the derivatives strategy, and the full set of all the replicating claims that replicate or approximate the derivatives strategy can be referred to as the replication set for the derivatives strategy. In an example embodiment, the replicating weights for a buy of this derivatives strategy d are $$a_s=E[d(U)|k_{s-1}\leqq U<k_s]\ s=1, 2, \ldots, S \qquad 11.1.3A$$

Here, the amount of the sth digital claim is the conditional expected value of the payout of the derivatives strategy d, given that the underlying U is greater than or equal to $k_{s-1}$ and strictly less than $k_s$. To compute this conditional expected value, the auction sponsor might assume for piecewise linear functions d that $$E[d(U)\,|\,k_{s-1}\le U<k_s]=d\left(\frac{k_{s-1}+k_s-\rho}{2}\right) \qquad 11.1.3B$$

Section 10.3.2 refers to equation 11.1.3B as the intrastate uniform model.

As now shown, the auction sponsor can use equations 11.1.3A and 11.1.3B to compute the digital replicating weights ($a_1, a_2, \ldots, a_{S-1}, a_S$) for a digital range, a vanilla call spread, and a vanilla put spread to form replication sets for each of these derivatives strategies. For the replication weights of additional derivatives strategies using the digital replication basis, see section 10.2.

A digital range or range binary pays out a specified amount if, upon expiration, the underlying U is greater than or equal to a lower strike, denoted by $k_v$, and strictly less than a higher strike, denoted by $k_w$. The payout function d for this digital range is $$d(U)=\begin{cases}0 & U<k_v\\ 1 & k_v\le U<k_w\\ 0 & k_w\le U\end{cases} \qquad 11.1.3C$$

For a buy order of a digital range with strike prices of $k_v$ and $k_w$ the replicating weights are $$a_s=\begin{cases}0 & s=1, 2, \ldots, v\\ 1 & s=v+1, v+2, \ldots, w\\ 0 & s=w+1, w+2, \ldots, S\end{cases} \qquad 11.1.3D$$

A buy of a vanilla call spread is the simultaneous buy of a vanilla call with a lower strike $k_v$ and the sell of a vanilla call with a higher strike $k_w$. The payout function d for this vanilla call spread is $$d(U)=\begin{cases}0 & U<k_v\\ U-k_v & k_v\le U<k_w\\ k_w-k_v & k_w\le U\end{cases} \qquad 11.1.3E$$

For a buy order for a vanilla call spread with strikes of $k_v$ and $k_w$ the replicating weights are $$a_s=\begin{cases}0 & s=1, 2, \ldots, v\\ \dfrac{k_{s-1}+k_s-\rho}{2}-k_v & s=v+1, v+2, \ldots, w\\ k_w-k_v & s=w+1, w+2, \ldots, S\end{cases} \qquad 11.1.3F$$

based on the intrastate uniform model of equation 11.1.3B.

A buy of a vanilla put spread is the simultaneous buy of a vanilla put with a higher strike $k_w$ and the sell of a vanilla put with a lower strike $k_v$. The payout function d for this vanilla put spread is $$d(U)=\begin{cases}k_w-k_v & U<k_v\\ k_w-U & k_v\le U<k_w\\ 0 & k_w\le U\end{cases} \qquad 11.1.3G$$

For a buy order of a vanilla put spread with strikes of $k_w$ and $k_v$ the replicating weights are $$a_s=\begin{cases}k_w-k_v & s=1, 2, \ldots, v\\ k_w-\dfrac{k_{s-1}+k_s-\rho}{2} & s=v+1, v+2, \ldots, w\\ 0 & s=w+1, w+2, \ldots, S\end{cases} \qquad 11.1.3H$$

based on the intrastate uniform model of equation 11.1.3B.

11.1.4 Replication P&L

Let e(U) denote the payout on the replicating portfolio based on the replication weights ($a_1, a_2, \ldots, a_{S-1}, a_S$) for strategy d. Note that e(U) can be written as $$\begin{aligned} e(U) &\equiv \sum_{s=1}^{S} a_s d^s(U) \\ &= \sum_{s=1}^{S} I[k_{s-1}\le U<k_s]a_s \end{aligned} \qquad 11.1.4A$$

where I denotes the indicator function, equaling one when its argument is true and zero otherwise. Let $C^R(U)$ denote the replication P&L to the auction sponsor (note that section 10 uses the variable C to denote replication P&L). If $C^R(U)$ is positive (negative), then the auction sponsor receives a profit (a loss) from the replication of the strategy. The replication P&L $C^R(U)$ is given by the following formula for a buy order of the strategy d with a minimum payout of 0

$$C^R(U)\equiv e(U)-d(U) \qquad 11.1.4B$$

-continued $$= \sum_{s=1}^{S} I[k_{s-1} \le U < k_s][a_s - d(U)]$$

Note that for a digital range, equations 11.1.3C and 11.1.3D imply that replication P&L $C^R(U)$ is zero regardless of the outcome of U. However, for each of a vanilla call spread and a vanilla put spread the replication P&L $C^R(U)$ will generally be non-zero. The replication P&L for a vanilla call spread is $$C^R(U) = \sum_{s=1}^{S} I[k_{s-1} \le U < k_s][a_s - d(U)] \quad 11.1.4C$$

$$= \sum_{s=v+1}^{w} I[k_{s-1} \le U < k_s]\left[\frac{k_{s-1} + k_s - \rho}{2} - k_v - (U - k_v)\right]$$

$$= \sum_{s=v+1}^{w} I[k_{s-1} \le U < k_s]\left[\frac{k_{s-1} + k_s - \rho}{2} - U\right]$$

These results hold more generally. When using the digital replication basis, the auction sponsor replicates digital strategies with zero replication P&L, whereas the auction sponsor replicates vanilla options with non-zero replication P&L.

11.2 Replicating claims Using a Vanilla Replicating Basis

This section discusses how to replicate derivatives strategies using a vanilla replicating basis. Section 11.2.1 discusses the assumptions behind this framework. Section 11.2.2 defines the vanilla replicating basis. Section 11.2.3 presents the general replication theorem, in order to form replication sets for any type of derivatives strategy as a function of the payout profile or payout function d of the derivatives strategy, the replication sets including one or more of the replicating vanilla options, and sometimes a replicating digital option, as well. Using this theorem, section 11.2.4 shows how an auction sponsor can replicate digital derivatives, and section 11.2.5 shows how an auction sponsor can replicate vanilla derivatives.

11.2.1 Assumptions

This section discusses the five assumptions that will be used to derive the general replication theorem. These assumptions will later be relaxed in section 11.3.

The first assumption regards the spacing of the strikes $k_1$, $k_2$, . . . , $k_{S-1}$ of the different derivatives strategies Assumption 1: $k_s - k_{s-1} \geqq 2\rho$ s=2, 3, . . . , S−1

Assumption 1 requires the strikes to be set far enough apart such that at least two outcomes are between adjacent strikes.

Assumptions 2 and 3 relate to the distribution of the underlying U.

Assumption 2: $E[U^2] < \infty$

Assumption 3: There do not exist a finite $k_0$ and $k_S$ such that $Pr[U<k_0]=0$ and $Pr[U>k_S]=0$.

Assumption 2 requires the second moment of U or equivalently the variance of U to be finite. Assumption 3 requires that the underlying U has only unbounded support.

Assumptions 4 and 5 regard the payout on the derivatives strategy d. Assume that d takes on the following form Assumption 4:

$$d(U) = \sum_{s=1}^{S} I[k_{s-1} \le U < k_s](\alpha_s + \beta_s U)$$

This assumption restricts d to be a piecewise linear function.

For notation, let $\bar{d}$ and $\underline{d}$ denote functions of the derivatives strategy d computed as follows $$\bar{d} = \max\left[\underset{k_1 \le U < k_{S-1}}{d(u)}, E[d(U) \mid U \ge k_{S-1}], E[d(U) \mid U < k_1]\right] \quad 11.2.1A$$

$$\underline{d} = \min\left[\underset{k_1 \le U < k_{S-1}}{d(U)}, E[d(U) \mid U \ge k_{S-1}], E[d(U) \mid U < k_1]\right] \quad 11.2.1B$$

In many cases as shown below, $\bar{d}$ will be the maximum payout of the derivatives strategy d and $\underline{d}$ will be the minimum payout of the derivatives strategy d.

Assumption 5 is as follows

Assumption 5: $\underline{d} \leqq \alpha_s + \beta_s k_s \leqq \bar{d}$ s=2, 3, . . . , S−1

This assumption ensures that the replication weights defined in section 11.2.3 are non-negative. Strategies that satisfy assumptions 4 and 5 include digital calls, digital puts, range binaries, vanilla calls, vanilla puts, vanilla call spreads, vanilla put spreads, vanilla straddles, collared vanilla straddles, forwards, and collared forwards.

11.2.2 The Vanilla Replicating Basis

This section introduces the vanilla replicating basis based on the assumptions in section 11.2.1. The vanilla replicating basis has a total of 2S−2 replication claims, compared to S replicating claims for the digital replicating basis. Note that the quantity 2S−2 is twice the number of defined strikes in a DBAR auction. The term "vanilla replicating basis" is something of a misnomer because two of these replicating claims are digital options.

Several of the replicating claims described below have a knockout or barrier. All of these knockouts are European style, i.e. they are only in effect on expiration of the option, and thus do not depend on the path of the underlying over the life of the option.

Let $d^s$ denote the payout function for the vanilla replication claims for s=1, 2, . . . , 2S−2. The first vanilla replicating claim is a digital put with strike $k_1$ with payout function $$d^{\prime}(U) = \begin{cases} 1 & U < k_1 \\ 0 & k_1 \le U \end{cases} \quad 11.2.2A$$

The second replicating claim has the following payout function $$d^2(U) = \begin{cases} 0 & U < k_1 \\ \frac{k_2 - U}{k_2 - k_1} & k_1 \le U < k_2 \\ 0 & k_2 \le U \end{cases} \quad 11.2.2B$$

The payout of the second replicating claim is proportional to that of a vanilla put struck at $k_2$ which has a European knockout below $k_1$. Note that the second replicating claim has a payout of 1 at $U=k_1$. The third replicating claim has a payout that is proportional to a vanilla call struck at $k_1$ which has a European knock out at $k_2$. Mathematically, $$d^3(U)=\begin{cases}0 & U<k_1\\ \dfrac{U-k_1}{k_2-k_1} & k_1\le U<k_2\\ 0 & k_2\le U\end{cases} \quad 11.2.2C$$

In the general case for s=2, 3, . . . , S−1

$$d^{2s-2}(U)=\begin{cases}0 & U<k_{s-1}\\ \dfrac{k_s-U}{k_s-k_{s-1}} & k_{s-1}\le U<k_s\\ 0 & k_s\le U\end{cases} \quad 11.2.2D$$

$$d^{2s-1}(U)=\begin{cases}0 & U<k_{s-1}\\ \dfrac{U-k_{s-1}}{k_s-k_{s-1}} & k_{s-1}\le U<k_s\\ 0 & k_s\le U\end{cases} \quad 11.2.2E$$

For the s=2S−4 and s=2S−3 the replication claims are $$d^{2S-4}(U)=\begin{cases}0 & U<k_{S-2}\\ \dfrac{k_{S-1}-U}{k_{S-1}-k_{S-2}} & k_{S-2}\le U<k_{S-1}\\ 0 & k_{S-1}\le U\end{cases} \quad 11.2.2F$$

$$d^{2S-3}(U)=\begin{cases}0 & U<k_{S-2}\\ \dfrac{U-k_{S-2}}{k_{S-1}-k_{S-2}} & k_{S-2}\le U<k_{S-1}\\ 0 & k_{S-1}\le U\end{cases} \quad 11.2.2G$$

Note that the even-numbered replicating claims have a negatively sloped payout between the strikes, similar to standard vanilla puts. The odd-numbered replicating claims have a positively sloped payout between the strikes similar to standard vanilla calls. The $2S-2^{nd}$ replicating claim is a digital call struck at $k_{S-1}$.

$$d^{2S-2}(U)=\begin{cases}0 & U<k_{S-1}\\ 1 & k_{S-1}\le U\end{cases} \quad 11.2.2H$$

FIG. 31 and table 11.2.2 shows the vanilla replicating claims.

It is worth noting that the vanilla replicating claims are rescaled in such a way that for all U $$\sum_{s=1}^{2S-2} d^s(U)=1 \quad 11.2.2I$$

This feature will be used later in section 11.4.3, where the sum of the prices of the replicating claims are required to sum to one.

TABLE 11.2.2

The payout ranges and replicating claims for the vanilla replicating basis.

| Claim Number | Payout Range | Vanilla Replicating Claim | European Knockout? |
|---|---|---|---|
| 1 | $U<k_1$ | Digital put struck at $k_1$ | None |
| 2 | $k_1\leqq U<k_2$ | Rescaled vanilla put struck at $k_2$ | Knockout at $k_1-\rho$ |
| 3 | $k_1\leqq U<k_2$ | Rescaled vanilla call struck at $k_1$ | Knockout at $k_2$ |
| 4 | $k_2\leqq U<k_3$ | Rescaled vanilla put struck at $k_3$ | Knockout at $k_2-\rho$ |
| 5 | $k_2\leqq U<k_3$ | Rescaled vanilla call struck at $k_2$ | Knockout at $k_3$ |
| . . . | . . . | . . . | . . . |
| 2s − 2 | $k_{s-1}\leqq U<k_s$ | Rescaled vanilla put struck at $k_s$ | Knockout at $k_{s-1}-\rho$ |
| 2s − 1 | $k_{s-1}\leqq U<k_s$ | Rescaled vanilla call struck at $k_{s-1}$ | Knockout at $k_s$ |
| 2s | $k_s\leqq U<k_{s+1}$ | Rescaled vanilla put struck at $k_{s+1}$ | Knockout at $k_s-\rho$ |
| 2s + 1 | $k_s\leqq U<k_{s+1}$ | Rescaled vanilla call struck at $k_s$ | Knockout at $k_{s+1}$ |
| . . . | . . . | . . . | . . . |
| 2S − 4 | $k_{S-2}\leqq U<k_{S-1}$ | Rescaled vanilla put struck at $k_{S-1}$ | Knockout at $k_{S-2}-\rho$ |
| 2S − 3 | $k_{S-2}\leqq U<k_{S-1}$ | Rescaled vanilla call struck at $k_{S-2}$ | Knockout at $k_{S-1}$ |
| 2S − 2 | $k_{S-1}\leqq U$ | Digital call struck at $k_{S-1}$ | None |

As seen in the table above, it is worth noting that with the vanilla replication basis, two such claims often payout if the underlying is in a specific range. This distinguishes this basis from the digital replicating basis discussed in section 11.1 where only one replicating claim pays out regardless of the outcome of U.

11.2.3 General Replication Theorem for Buys and Sells of Digital and Vanilla Derivatives The following theorem shows how to construct the weights on the vanilla replicating portfolio denoted as ($a_1$, $a_2$, . . . , $a_{2S-3}$, $a_{2S-2}$) of strategies d that satisfy the assumptions above.

General Replication Theorem. Under assumptions 1, 2, 3, 4, and 5, the variance minimizing replicating weights for a buy of strategy d are $$a_1=\alpha_1+\beta_1 E[U|U<k_1]-\underline{d} \quad 11.2.3A$$

$$a_{2s-2}=\alpha_s+\beta_s k_{s-1}-\underline{d}\ s=2,3,\ldots,S-1 \quad 11.2.3B$$

$$a_{2S-1}=\alpha_s+\beta_s k_s-\underline{d}\ s=2, 3, \ldots, S-1 \quad 11.2.3C$$

$$a_{2S-2}=\alpha_S\beta_S E[U|U\geqq k_{S-1}]-\underline{d} \quad 11.2.3D$$

For a sell of strategy d, the variance minimizing weights are $$a_1=\overline{d}-\alpha_1-\beta_1 E[U|U<k_1] \quad 11.2.3E$$

$$a_{2s-2}=\overline{d}-\alpha_s-\beta_s k_{s-1}\ s=2, 3, \ldots, S-1 \quad 11.2.3F$$

$$a_{2s-1}=\overline{d}-\alpha_s-\beta_s k_s\ s=2, 3, \ldots, S-1 \quad 11.2.3G$$

$$a_{2S-2}=\overline{d}-\alpha_S-\beta_S E[U|U\geqq k_{S-1}] \quad 11.2.3H$$

The replication P&L $C^R(U)$ for a buy of d is $$C^R(U)=\beta_1(U-E[U|U<k_1])I[U<k_1]+\beta_S(E[U|U\geqq k_{S-1}]-U)I[U\geqq k_{S-1}] \quad 11.2.3I$$

The replication P&L $C^R(U)$ for a sell of d is $$C^R(U)=\beta_1(E[U|U<k_1]-U)I[U<k_1]+\beta_S(U-E[U|U\geqq k_{S-1}])I[U\geqq k_{S-1}] \quad 11.2.3J$$

Proof of General Replication Theorem: See Appendix 11A.

Appendix 11A shows that the replication weights for a buy of d or a sell of d satisfy $$\min(a_1, a_2, \ldots, a_{2S-3}, a_{2S-2})=0 \quad 11.2.3K$$

Since the a's are non-negative, this ensures that aggregated customer payouts (the y's defined in section 11.4.5) are also non-negative.

Note that the payout on the replicating portfolio for a buy of d plus the payout on the replicating portfolio for a sell of d equals $\overline{d}-\underline{d}$ for all values of U. Thus the payout on the replicating portfolio with a buy of d and a sell of d is constant and so, as expected, the portfolio is risk free.

Consider the special case where as defined in assumption 4, d satisfies $$\beta_1=\beta_S=0 \quad 11.2.3L$$

In this case, the payout of the derivatives strategy is constant and equal to $\alpha_1$ if the underlying U is less than $k_1$. Similarly, the payout of the derivatives strategy is constant and equal to as if the underlying U is greater than or equal to $k_{S-1}$. Under 11.2.3L, the replicating portfolio is not only minimum variance but also has replication P&L $C^R(U)=0$ for every outcome U. This result applies to digital calls, digital puts, range binaries, vanilla call spreads, vanilla put spreads, collared vanilla straddles, and collared forwards. The vanilla replicating basis replicates these instruments with zero replication P&L.

The next section applies the general replication theorem to compute the vanilla replicating weights for different digital derivatives strategies d.

11.2.4 Using the General Replication Theorem to Compute Replication Weights for Digital Options To apply the general replication theorem above for digital derivatives strategies, note that for the digital options discussed below $\overline{d}=1$ and $\underline{d}=0$. Further, digital options have the following parameters restrictions $$\beta_1=\beta_2=\ldots=\beta_S=0 \quad 11.2.4A$$

In addition, $\alpha_s$ will equal zero or one for s=1, 2, . . . , S.

The payout function d for a digital call with a strike price of $k_v$ is $$d(U)=\begin{cases}0 & U<k_v\\ 1 & k_v\leq U\end{cases} \quad 11.2.4B$$

For a buy order of a digital call with a strike price of $k_v$ the replicating weights are $$a_s=\begin{cases}0 & s=1, 2, \ldots, 2v-1\\ 1 & s=2v, 2v+1, \ldots, 2S-2\end{cases} \quad 11.2.4C$$

For a sell order of a digital call with a strike price of $k_v$ the replicating weights are $$a_s=\begin{cases}1 & s=1, 2, \ldots, 2v-1\\ 0 & s=2v, 2v+1, \ldots, 2S-2\end{cases} \quad 11.2.4D$$

A digital put pays out a specific quantity if the underlying is strictly below the strike, denoted $k_v$, on expiration, and therefore its payout function d is $$d(U)=\begin{cases}1 & U<k_v\\ 0 & k_v\leq U\end{cases} \quad 11.2.4E$$

For a buy order of a digital put with a strike price of $k_v$ the replicating weights are $$a_s=\begin{cases}1 & s=1, 2, \ldots, 2v-1\\ 0 & s=2v, 2v+1, \ldots, 2S-2\end{cases} \quad 11.2.4F$$

For a sell order of a digital put with a strike price of $k_v$ the replicating weights are $$a_s=\begin{cases}0 & s=1, 2, \ldots, 2v-1\\ 1 & s=2v, 2v+1, \ldots, 2S-2\end{cases} \quad 11.2.4G$$

As defined in section 11.1.13, the payout function for a digital range with strikes $k_v$ and $k_w$ can be represented as $$d(U)=\begin{cases}0 & U<k_v\\ 1 & k_v\leq U<k_w\\ 0 & k_w\leq U\end{cases} \quad 11.2.4H$$

For a buy order of a digital range with strikes $k_v$ and $k_w$ the replicating weights are $$a_s=\begin{cases}0 & s=1, 2, \ldots, 2v-1\\ 1 & s=2v, 2v+1, \ldots, 2w-1\\ 0 & s=2w, 2w+1, \ldots, 2S-2\end{cases} \quad 11.2.4I$$

One can contrast equation 11.2.4I to equation 11.1.3D, which shows the replicating weights for a digital range with the digital replicating basis. For a sell order of a digital range with strikes $k_v$ and $k_w$ the replicating weights are $$a_s = \begin{cases} 1 & s = 1, 2, \ldots, 2v-1 \\ 0 & s = 2v, 2v+1, \ldots, 2w-1 \\ 1 & s = 2w, 2w+1, \ldots, 2S-2 \end{cases} \tag{11.2.4J}$$

11.2.5 Using the General Replication Theorem to Compute Replication Weights for Vanilla Derivatives This section uses the general replication theorem to compute vanilla replication weights for vanilla derivatives. Note that for vanilla derivatives, $\beta_s$ equals 0 or 1 for s=1, 2, . . . , S. In addition, for all the vanilla derivatives strategies described below, excluding forwards and collared forwards, $\underline{d}=0$. For notation, let the function int[x] denote the greatest integer less than or equal to x.

Replicating Vanilla Call Options and Vanilla Put Options

The payout function d for a vanilla call with strike $k_v$ is $$d(U) = \begin{cases} 0 & U < k_v \\ U - k_v & k_v \le U \end{cases} \tag{11.2.5A}$$

Note that in this case, $\underline{d}=0$ and $\overline{d}=E[U|U \geqq k_{S-1}]-k_v$. For a buy order for a vanilla call with strike $k_v$ the replication weights are $$a_s = \begin{cases} 0 & s = 1, 2, \ldots, 2v-1 \\ k_{int[(s+1)/2]} - k_v & s = 2v, 2v+1, \ldots, 2S-3 \\ E[U \mid U \ge k_{S-1}] - k_v & s = 2S-2 \end{cases} \tag{11.2.5B}$$

For a sell order for a vanilla call with strike $k_v$ the replication weights are $$a_s = \begin{cases} E[U \mid U \ge k_{S-1}] - k_v & s = 1, 2, \ldots, 2v-1 \\ E[U \mid U \ge k_{S-1}] - k_{int[(s+1)/2]} & s = 2v, 2v+1, \ldots, 2S-3 \\ 0 & s = 2S-2 \end{cases} \tag{11.2.5C}$$

The payout function d for a vanilla put with strike $k_v$ is $$d(U) = \begin{cases} k_v - U & U < k_v \\ 0 & k_v \le U \end{cases} \tag{11.2.5D}$$

Note that in this case, $\underline{d}=0$ and $\overline{d}=k_v-E[U|U<k_1]$. For a buy order for a vanilla put with strike $k_v$ the replication weights are $$a_s = \begin{cases} k_v - E[U \mid U < k_1] & s = 1 \\ k_v - k_{int[(s+1)/2]} & s = 2, 3, \ldots, 2v-1 \\ 0 & s = 2v, 2v+1, \ldots, 2S-2 \end{cases} \tag{11.2.5E}$$

For a sell order for a vanilla put with strike $k_v$ the replication weights are $$a_s = \begin{cases} 0 & s = 1 \\ k_{int[(s+1)/2]} - E[U \mid U < k_1] & s = 2, 3, \ldots, 2v-1 \\ k_v - E[U \mid U < k_1] & s = 2v, 2v+1, \ldots, 2S-2 \end{cases} \tag{11.2.5F}$$

Replicating Vanilla Call Spreads and Vanilla Put Spreads

As discussed in section 11.1.3, the payout function d for a vanilla call spread with strikes $k_v$ and $k_w$ is $$d(U) = \begin{cases} 0 & U < k_v \\ U - k_v & k_v \le U < k_w \\ k_w - k_v & k_w \le U \end{cases} \tag{11.2.5G}$$

For this strategy, note that $\underline{d}=0$ and $\overline{d}=k_w-k_v$. For a buy order for a vanilla call spread with strikes of $k_v$ and $k_w$ the replicating weights are $$a_s = \begin{cases} 0 & s = 1, 2, \ldots, 2v-1 \\ k_{int[(s+1)/2]} - k_v & s = 2v, 2v+1, \ldots, 2w-1 \\ k_w - k_v & s = 2w, 2w+1, \ldots, 2S-2 \end{cases} \tag{11.2.5H}$$

One can contrast equation 11.2.5H to equation 11.1.3F, which shows the replicating weights for a vanilla call spread with the digital replicating basis. For a sell order for a vanilla call spread with strikes of $k_v$ and $k_w$ the replicating weights are $$a_s = \begin{cases} k_w - k_v & s = 1, 2, \ldots, 2v-1 \\ k_w - k_{int[(s+1)/2]} & s = 2v, 2v+1, \ldots, 2w-1 \\ 0 & s = 2w, 2w+1, \ldots, 2S-2 \end{cases} \tag{11.2.5I}$$

Again, as discussed in section 11.1.3, the payout function d for a buy of a vanilla put spread with strikes $k_w$ and $k_v$ is $$d(U) = \begin{cases} k_w - k_v & U < k_v \\ k_w - U & k_v \le U < k_w \\ 0 & k_w \le U \end{cases} \tag{11.2.5J}$$

For a vanilla put spread, note that $\underline{d}=0$ and $\overline{d}=k_w-k_v$, which are identical values for $\underline{d}$ to $\overline{d}$ for a vanilla call spread. For a buy order for a vanilla put spread with strikes of $k_w$ and $k_v$ the replicating weights are $$a_s = \begin{cases} k_w - k_v & s = 1, 2, \ldots, 2v-1 \\ k_w - k_{int[(s+1)/2]} & s = 2v, 2v+1, \ldots, 2w-1 \\ 0 & s = 2w, 2w+1, \ldots, 2S-2 \end{cases} \tag{11.2.5K}$$

One can contrast equation 11.2.5K to equation 11.1.3H, which shows the replicating weights for a vanilla put spread with the digital replicating basis. For a sell order for a vanilla put spread with strikes of $k_w$ and $k_v$ the replicating weights are $$a_s = \begin{cases} 0 & s = 1, 2, \ldots, 2v-1 \\ k_{int[(s+1)/2]} - k_v & s = 2v, 2v+1, \ldots, 2w-1 \\ k_w - k_v & s = 2w, 2w+1, \ldots, 2S-2 \end{cases} \quad 11.2.5L$$

Replicating Vanilla Straddles and Collared Vanilla Straddles

A buy of a vanilla straddle is the simultaneous buy of a vanilla call and a vanilla put both with identical strike prices. A buy of a vanilla straddle is a bullish volatility strategy, in that the purchaser profits if the outcome is very low or very high.

For a vanilla straddle with a strike of $k_v$, the payout function d is $$d(U) = \begin{cases} k_v - U & U < k_v \\ U - k_v & k_v \le U \end{cases} \quad 11.2.5M$$

Note that for this strategy $\bar{d}$=max(E[U|U≧$k_{S-1}$]−$k_v$, $k_v$−E[U|U<$k_1$]) and $\underline{d}$=0. Therefore, for a buy of a vanilla straddle $$a_s = \begin{cases} k_v - E[U \mid U < k_1] & s = 1 \\ k_v - k_{int[(s+1)/2]} & s = 2, 3, \ldots, 2v-1 \\ k_{int[(s+1)/2]} - k_v & s = 2v, 2v+1, \ldots, 2S-3 \\ E[U \mid U \ge k_{S-1}] - k_v & s = 2S-2 \end{cases} \quad 11.2.5N$$

For a sell of a vanilla straddle the replicating weights are $$a_s = \begin{cases} \bar{d} - k_v + E[U \mid U < k_1] & s = 1 \\ \bar{d} - k_v + k_{int[(s+1)/2]} & s = 2, 3, \ldots, 2v-1 \\ \bar{d} - k_{int[(s+1)/2]} + k_v & s = 2v, 2v+1, \ldots, 2S-3 \\ \bar{d} - E[U \mid U \ge k_{S-1}] + k_v & s = 2S-2 \end{cases} \quad 11.2.5O$$

To avoid taking on replication risk, the auction sponsor may offer participants the ability to instead trade a collared vanilla straddle whose payout can be written as $$d(U) = \begin{cases} k_v - k_1 & U < k_1 \\ k_v - U & k_1 \le U < k_v \\ U - k_v & k_v \le U < k_{S-1} \\ k_{S-1} - k_v & k_{S-1} \le U \end{cases} \quad 11.2.5P$$

Note that $\bar{d}$=max[$k_{S-1}$−$k_v$, $k_v$−$k_1$] for a collared vanilla straddle and $\underline{d}$=0.

For a buy order of a collared vanilla straddle with strike $k_v$, the replicating weights are $$a_s = \begin{cases} k_v - k_1 & s = 1 \\ k_v - k_{int[(s+1)/2]} & s = 2, 3, \ldots, 2v-1 \\ k_{int[(s+1)/2]} - k_v & s = 2v, 2v+1, \ldots, 2S-3 \\ k_{S-1} - k_v & s = 2S-2 \end{cases} \quad 11.2.5Q$$

Therefore, for a sell order of a vanilla straddle with strike $k_v$ the replicating weights are $$a_s = \begin{cases} \max[k_{S-1} - k_v, k_v - k_1] - k_v + k_1 & s = 1 \\ \max[k_{S-1} - k_v, k_v - k_1] - k_v + k_{int[(s+1)/2]} & s = 2, 3, \ldots, 2v-1 \\ \max[k_{S-1} - k_v, k_v - k_1] - k_{int[(s+1)/2]} + k_v & s = 2v, 2v+1, \ldots, 2S-3 \\ \max[k_{S-1} - k_v, k_v - k_1] - k_{S-1} + k_v & s = 2S-2 \end{cases} \quad 11.2.5R$$

Replicating Forwards and Collared Forwards

A forward pays out based on the underlying as follows $$d(U)=U-\pi^f \quad 11.2.5S$$

where $\pi^f$ denotes the forward price. Note that for a forward, $\bar{d}$=E[U|U≧$k_{S-1}$]−$\pi^f$ and $\underline{d}$=E[U|U<$k_1$]−$\pi^f$. In this case, for a buy of a forward $$a_s = \begin{cases} 0 & s = 1 \\ k_{int[(s+1)/2]} - E[U \mid U < k_1] & s = 2, 3, \ldots, 2S-3 \\ E[U \mid U \ge k_{S-1}] - E[U \mid U < k_1] & s = 2S-2 \end{cases} \quad 11.2.5T$$

For a sell of a forward $$a_s = \begin{cases} E[U \mid U \ge k_{S-1}] - E[U \mid U < k_1] & s = 1 \\ E[U \mid U \ge k_{S-1}] - k_{int[(s+1)/2]} & s = 2, 3, \ldots, 2S-3 \\ 0 & s = 2S-2 \end{cases} \quad 11.2.5U$$

To avoid taking on replication P&L, the auction sponsor may offer a collared forward strategy with maximum and minimum payouts. Let $\pi^{cf}$ denote the price on the collared forward. For a buy order of a collared forward, the payout function d is $$d(U) = \begin{cases} k_1 - \pi^{cf} & U < k_1 \\ U - \pi^{cf} & k_1 \le U < k_{S-1} \\ k_{S-1} - \pi^{cf} & k_{S-1} \le U \end{cases} \quad 11.2.5V$$

In this case, note that $\bar{d}=k_{S-1}-\pi^{cf}$ and $d=k_1-\pi^{cf}$. For a buy of a collared forward the replicating weights are $$a_s = \begin{cases} 0 & s=1 \\ k_{int[(s+1)/2]} - k_1 & s=2, 3, \ldots, 2S-3 \\ k_{S-1} - k_1 & s=2S-2 \end{cases} \quad 11.2.5W$$

For a sell of a collared forward the replicating weights are $$a_s = \begin{cases} k_{S-1} - k_1 & s=1 \\ k_{S-1} - k_{int[(s+1)/2]} & s=2, 3, \ldots, 2S-3 \\ 0 & s=2S-2 \end{cases} \quad 11.2.5X$$

It is worth noting that there is possibly infinite replication risk for vanilla calls and vanilla puts, vanilla straddles, and forwards.

Estimating the Conditional Expectation of the Underlying

Note that for buys and sells of vanilla calls, vanilla puts, vanilla straddles, and forwards, some of the replicating weights depend upon $E[U|U<k_1]$ and $E[U|U\geqq k_{S-1}]$. These two quantities could be estimated, for example, using a non-parametric approach based on a historical data sample on the underlying as follows. The auction sponsor could use the average of the observations below $k_1$ to estimate $E[U|U<k_1]$, and the auction sponsor could use the average of the observations greater than or equal to $k_{S-1}$ to estimate $E[U|U\geqq k_{S-1}]$. Alternatively, the auction sponsor could estimate these quantities parametrically assuming that U follows a certain distribution. To select the appropriate distribution for U, the auction sponsor might employ techniques from Section 10.3.1 in the subsections "Classes of Distributions for the Underlying," and "Selecting the Appropriate Distribution."

For the case that U is normally distributed, recall equation 10.3.1B from section 10

$$E[U \mid k_{s-1} \le U < k_s] = \mu + \frac{\frac{\sigma}{\sqrt{2\pi}}\left[\exp\left(-\frac{(k_{s-1}-\mu)^2}{2\sigma^2}\right) - \exp\left(-\frac{(k_s-\mu)^2}{2\sigma^2}\right)\right]}{N\left[\frac{k_s-\mu}{\sigma}\right] - N\left[\frac{k_{s-1}-\mu}{\sigma}\right]} \quad 11.2.5Y$$

where π denotes the constant 3.14159 . . . , where N denotes the cumulative normal distribution, and where "exp" denotes the exponential function or raising the argument to the power of e. Letting $k_{s-1}\to-\infty$ and setting $k_s$ equal to $k_1$, then equation 11.2.5Y simplifies to $$E[U \mid U < k_1] = \mu - \frac{\frac{\sigma}{\sqrt{2\pi}}\left[\exp\left(-\frac{(k_1-\mu)^2}{2\sigma^2}\right)\right]}{N\left[\frac{k_1-\mu}{\sigma}\right]} \quad 11.2.5Z$$

Letting $k_s\to\infty$ and setting $k_{s-1}$ equal to $k_{S-1}$, then equation 11.2.5Y simplifies to $$E[U \mid k_{s-1} \le U] = \mu + \frac{\frac{\sigma}{\sqrt{2\pi}}\left[\exp\left(-\frac{(k_{S-1}-\mu)^2}{2\sigma^2}\right)\right]}{1 - N\left[\frac{k_{S-1}-\mu}{\sigma}\right]} \quad 11.2.5AA$$

To estimate the parameters of the distribution of U such as μ and σ above, the auction sponsor might employ techniques discussed in Section 10.3.1 in the subsection "Estimating the Parameters of the Distribution."

11.3 Extensions to the General Replication Theorem

Section 11.2.1 discusses the five assumptions used to derive the general replication theorem. This section discusses how relaxing these assumptions impacts the theorem.

11.3.1 Relaxing Assumption 1 on Strike Spacing

Assumption 1 is $$k_s - k_{s-1} \geqq 2\rho \quad s=2, 3, \ldots, S-1 \quad 11.3.1A$$

What happens when strikes are closer together and this assumption is violated while assumptions 2, 3, 4, and 5 still hold?

Remember that an example embodiment may assume that the strikes are multiples of the tick size ρ. Consider the special case where 11.3.1A holds for all values of s except s=2 and $$k_2 = k_1 + \rho \quad 11.3.1B$$

In this case, the first vanilla replicating claim is the digital put struck at $k_1$, which is the first replicating claim from section 11.2.2. The second vanilla replicating claim is the resealed European vanilla put struck at $k_2$ that knocks out at $k_1-\rho$. Note that since $k_1$ and $k_2$ are spaced ρ apart as dictated by 11.3.1B, this replicating claim pays out 1 at $k_1$ and zero otherwise.

Therefore, the second vanilla replicating claim is equivalent to a digital range with strikes of $k_1$ and $k_2$. The third vanilla replicating claim from section 11.2.2 is a rescaled European vanilla call struck at $k_1$ that knocks out at $k_2$. Note that, under 11.3.1B, this instrument pays out zero for all outcomes of U and so can be eliminated from the replication basis in this case. Thus, under 11.3.1B, vanilla replicating claims two and three from section 11.2.2 combine into a single digital range. Under 11.3.1B, the third replicating claim for this setup corresponds to the fourth replicating claim from section 11.2.2. Under 11.3.1B, the fourth replicating claim corresponds to the fifth replicating claim from section 11.2.2. And so on. Except for the second and third replication claims, all other replication claims under 11.3.1B are the same as those listed in table 11.2.2. Under 11.3.1B, the number of replicating claims decreases from 2S−2 to 2S−3. Table 11.3.1 shows the replicating claims for this case.

TABLE 11.3.1

The payout ranges, replicating claims in a DBAR auction for the vanilla replicating basis with strikes satisfying equation 11.3.1B.

| Claim Number | Payout Range | Vanilla Replicating Claim | European Knockout? |
|---|---|---|---|
| 1 | $U < k_1$ | Digital put struck at $k_1$ | None |
| 2 | $k_1 \leqq U < k_2$ | Digital range with strikes at $k_1$ and $k_2$ | None |
| 3 | $k_2 \leqq U < k_3$ | Rescaled vanilla put struck at $k_3$ | Knockout at $k_2 - \rho$ |
| 4 | $k_2 \leqq U < k_3$ | Rescaled vanilla call struck at $k_2$ | Knockout at $k_3$ |
| . . . | . . . | . . . | . . . |
| 2s − 3 | $k_{s-1} \leqq U < k_s$ | Rescaled vanilla put struck at $k_s$ | Knockout at $k_{s-1} - \rho$ |
| 2s − 2 | $k_{s-1} \leqq U < k_s$ | Rescaled vanilla call struck at $k_{s-1}$ | Knockout at $k_s$ |
| 2s − 1 | $k_s \leqq U < k_{s+1}$ | Rescaled vanilla put struck at $k_{s+1}$ | Knockout at $k_s - \rho$ |
| 2s | $k_s \leqq U < k_{s+1}$ | Rescaled vanilla call struck at $k_s$ | Knockout at $k_{s+1}$ |
| . . . | . . . | . . . | . . . |
| 2S − 5 | $k_{S-2} \leqq U < k_{S-1}$ | Rescaled vanilla put struck at $k_{S-1}$ | Knockout at $k_{S-2} - \rho$ |
| 2S − 4 | $k_{S-2} \leqq U < k_{S-1}$ | Rescaled vanilla call struck at $k_{S-2}$ | Knockout at $k_{S-1}$ |
| 2S − 3 | $k_{S-1} \leqq U$ | Digital call struck at $k_{S-1}$ | None |

Next consider the case $$k_s=k_{s-1}+\rho \quad s=2, 3, \ldots, S-1 \qquad 11.3.1C$$

Here, all the strikes in the auction are spaced ρ apart. Once again, the second and third vanilla replicating claims of table 11.2.2 combine into a single digital range. Similarly, the fourth and fifth replicating claims of table 11.2.2 also combine into a single digital range. And so on. For case 11.3.1C, there are S replicating claims and all the replicating claims are digital options. These replicating claims are the digital replicating claims listed in table 11.1.2.

Consider the more general case where $$k_s=k_{s-1}+\rho \qquad 11.3.1D$$

for at least one value of s, $2 \leqq s \leqq S-1$. Here, the resealed European vanilla put struck at $k_s$ that knocks out at $k_{s-1}-\rho$ and the resealed vanilla call struck at $k_{s-1}$ that knocks out at $k_s$ combine to form one replicating instrument, a digital range with strikes of $k_{s-1}$ and $k_s$. In this case, the total number of replicating claims is equal to $$2+\sum_{s=2}^{S-1}\min\left[\frac{k_s-k_{s-1}}{\rho}, 2\right] \qquad 11.3.1E$$

The two replicating claims that payout across strikes spaced ρ apart reduce to a single digital range.

11.3.2 Relaxing Assumption 2, the Finite Second Moment Assumption

Assumption 2 is $$E[U^2]<\infty \qquad 11.3.2A$$

This assumption is required for computing the replication weights $a_1$ and $a_{2S-2}$ for buys of d and for sells of d. Without this assumption, there is no minimum variance estimator over the range $U<k_1$ or $U \geqq k_{S-1}$.

To relax assumption 2 with assumptions 1, 3, 4, and 5 still satisfied, consider first the case that $$E[|U|]=\infty \qquad 11.3.2B$$

Here, the expected value of the absolute value of U is infinite. In this case, the auction sponsor might choose replication weights $a_1$ and $a_{2S-2}$ such that $$Pr[a_1-(d(U)-\underline{d})<0]=Pr[a_1-(d(U)-\underline{d})>0] \qquad 11.3.2C$$

$$Pr[a_{2S-2}-(d(U)-\underline{d})<0]=Pr[a_{2S-2}-(d(U)-\underline{d})>0] \qquad 11.3.2D$$

In using these replication weights, the auction sponsor has an equal chance of a replication profit or a replication loss for a buy of strategy d. The auction sponsor can construct the replication weights for a sell of strategy d in a similar manner.

Next consider the case where $$E[|U|]<\infty \text{ and } E[U^2]=\infty \qquad 11.3.2E$$

In this case the auction sponsor may use the replication weights from the general replication theorem as specified in 11.2.3A, 11.2.3D, 11.2.3E, and 11.2.3H, though these replication weights are not minimum variance weights since the variance is infinite. As an alternative, the auction sponsor may choose to use replication weights that satisfy equations 11.3.2C and 11.3.2D.

11.3.3 Relaxing Assumption 3, the Unbounded Assumption

Recall that the general replication theorem was derived under the assumption that underlying U is unbounded, i.e. there do not exist finite $k_0$ and $k_S$ such that $Pr[U<k_0]=0$ and $Pr[U>k_S]=0$. This assumption is now relaxed in case 1 and case 2 below. The analysis below requires assumptions 1, 2, 4, and 5 to hold Case 1: The Underlying U is Bounded on One Side Consider the case where the underlying U is bounded below, and where the lower bound is computed in equation 11.1.1B and denoted as $k_0$. Several financial underlyings are bounded below with $k_0=0$, including

- the prices of currencies in units of another currency;
- the prices of commodities;
- the prices of fixed income instruments;
- the prices of equities; and
- weather derivatives based on heating degree days and cooling degree days over a set period.

In addition, several economic variables are measured in percentage change terms (including the monthly percentage change in retail sales, the monthly change in average hourly earnings, or the quarterly change in GDP), and these variables are bounded below at $k_0=-100\%$.

It is worth dividing case 1 into three sub-cases, case 1A, case 1B, and case 1C.

Case 1A: $k_1 \leqq k_0$. The auction sponsor may find it unnecessary to set the lowest (or first) strike $k_1$ at or below $k_0$, since in this case the probability of the underlying U being at or below $k_1$ is zero. Consider, for example, the price of an equity where the lower bound $k_0$ equals 0. Financial exchanges generally do not offer customers put or call options on a stock with a strike price of $k_1=-1$.

Case 1B: $k_1=k_0+\rho$. In this case, the replicating instruments are the same 2S−2 replicating instruments as described in section 11.2.2. Further, note the replication formulas 11.2.3A-11.2.3H apply. For $a_1$, equation 11.2.3A simplifies to $$a_1 = E[d(U) \mid U < k_1] - \underline{d} = d(k_0) - \underline{d} \qquad 11.3.3A$$

Note that the value of $a_1$ does not depend on any parameters of the distribution of U. In this case, a strategy d that satisfies assumption 4 with $\beta_S=0$, for example a vanilla put, can be replicated using the 2S−2 instruments with zero replication error.

Case 1C. $k_1>k_0+\rho$. In this case, there are a total of 2S−1 replicating claims. The first two replicating instruments are a resealed European vanilla put struck at $k_1$ with a European knockout out below $k_0$ and a resealed European vanilla call struck at $k_0$ with a European knockout at $k_1$. The third through $2S-1^{st}$ replication claims correspond to the second through $2S-2^{nd}$ replication claims from table 11.2.2, respectively. These replication instruments, also referred to as replication claims or replicating claims for the demand-based or DBAR auction, are displayed in table 11.3.3A.

TABLE 11.3.3A

The payout ranges, replicating claims in a DBAR auction for the vanilla replicating basis under case 1C.

| Claim Number | Payout Range | Vanilla Replicating Claim | European Knockout? |
|---|---|---|---|
| 1 | $k_0 \leqq U < k_1$ | Rescaled vanilla put struck at $k_1$ | Knockout at $k_0 - \rho$ |
| 2 | $k_0 \leqq U < k_1$ | Rescaled vanilla call struck at $k_0$ | Knockout at $k_1$ |
| 3 | $k_1 \leqq U < k_2$ | Rescaled vanilla put struck at $k_2$ | Knockout at $k_1 - \rho$ |
| 4 | $k_1 \leqq U < k_2$ | Rescaled vanilla call struck at $k_1$ | Knockout at $k_2$ |
| 5 | $k_2 \leqq U < k_3$ | Rescaled vanilla put struck at $k_3$ | Knockout at $k_2 - \rho$ |
| 6 | $k_2 \leqq U < k_3$ | Rescaled vanilla call struck at $k_2$ | Knockout at $k_3$ |
| ... | ... | ... | ... |
| 2s − 1 | $k_{s-1} \leqq U < k_s$ | Rescaled vanilla put struck at $k_s$ | Knockout at $k_{s-1} - \rho$ |
| 2s | $k_{s-1} \leqq U < k_s$ | Rescaled vanilla call struck at $k_{s-1}$ | Knockout at $k_s$ |
| 2s + 1 | $k_s \leqq U < k_{s+1}$ | Rescaled vanilla put struck at $k_{s+1}$ | Knockout at $k_s - \rho$ |
| 2s + 2 | $k_s \leqq U < k_{s+1}$ | Rescaled vanilla call struck at $k_s$ | Knockout at $k_{s+1}$ |
| ... | ... | ... | ... |
| 2S − 3 | $k_{S-2} \leqq U < k_{S-1}$ | Rescaled vanilla put struck at $k_{S-1}$ | Knockout at $k_{S-2} - \rho$ |
| 2S − 2 | $k_{S-2} \leqq U < k_{S-1}$ | Rescaled vanilla call struck at $k_{S-2}$ | Knockout at $k_{S-1}$ |
| 2S − 1 | $k_{S-1} \leqq U$ | Digital call struck at $k_{S-1}$ | None |

In this case, the replicating weights for the first and second claims are given by $$a_1=\alpha_1+\beta_1 k_0-\underline{d} \qquad 11.3.3B$$

$$a_2=\alpha_1+\beta_1 k_1-\underline{d} \qquad 11.3.3C$$

Replication weights for the other replication claims follow the general replication theorem of section 11.2.3.

This discussion has focused on the case when U is bounded below and unbounded above. The case when U is bounded above and unbounded below follows a similar approach.

Case 2: The Underlying U is Bounded Both Below and Above

Several events of economic significance are bounded both below and above including

- the change in a futures contract over a pre-specified time period, where the futures contract can move a maximum number of points (or ticks) up or down per day;
- mortgage CPR rates, which are bounded between 0 and 1200;
- diffusion indices such as German IFO and US ISM, which are bounded between 0 and 100; and
- economic variables that measure a percentage (not a percentage change) such as the percentage of the work force unemployed, which are bounded between 0% and 100%.

In this case, let $k_0$ be the lower bound as defined in equation 11.1.1B and assume that $k_1=k_0+\rho$ (case 1B).

Case 2A: $k_S \leqq k_{S-1}$. In this case, the maximum value of U is less than or equal to the maximum strike or equivalently, there is no probability mass above the highest (or last) strike established in the auction. This may be an unlikely scenario as the auction sponsor may set strikes over only the range of likely outcomes of U.

Case 2B: $k_S>k_{S-1}$. In this case, there are 2S replicating claims. The first 2S−2 replicating claims are the first 2S−2 claims as listed in table 11.3.3A. The final two replicating claims are the rescaled vanilla put struck at $k_S$ with a knockout at $k_{S-1}-\rho$, and a rescaled vanilla call struck at $k_{S-1}$ with a knockout at $k_S$. These replication claims are displayed in table 11.3.3B. In this case, all instruments can be replicated with zero replication P&L.

TABLE 11.3.3B

The payout ranges, replicating claims in a DBAR auction for the vanilla replicating basis for case 2B.

| Claim Number | Payout Range | Vanilla Replicating Claim | European Knockout? |
|---|---|---|---|
| 1 | $k_0 \leqq U < k_1$ | Rescaled vanilla put struck at $k_1$ | Knockout at $k_0 - \rho$ |
| 2 | $k_0 \leqq U < k_1$ | Rescaled vanilla call struck at $k_0$ | Knockout at $k_1$ |
| 3 | $k_1 \leqq U < k_2$ | Rescaled vanilla put struck at $k_2$ | Knockout at $k_1 - \rho$ |

TABLE 11.3.3B-continued

The payout ranges, replicating claims in a DBAR auction for the vanilla replicating basis for case 2B.

| Claim Number | Payout Range | Vanilla Replicating Claim | European Knockout? |
|---|---|---|---|
| 4 | $k_1 \leqq U < k_2$ | Rescaled vanilla call struck at $k_1$ | Knockout at $k_2$ |
| 5 | $k_2 \leqq U < k_3$ | Rescaled vanilla put struck at $k_3$ | Knockout at $k_2 - \rho$ |
| 6 | $k_2 \leqq U < k_3$ | Rescaled vanilla call struck at $k_2$ | Knockout at $k_3$ |
| ... | ... | ... | ... |
| 2s − 1 | $k_{s-1} \leqq U < k_s$ | Rescaled vanilla put struck at $k_s$ | Knockout at $k_{s-1} - \rho$ |
| 2s | $k_{s-1} \leqq U < k_s$ | Rescaled vanilla call struck at $k_{s-1}$ | Knockout at $k_s$ |
| 2s + 1 | $k_s \leqq U < k_{s+1}$ | Rescaled vanilla put struck at $k_{s+1}$ | Knockout at $k_s - \rho$ |
| 2s + 2 | $k_s \leqq U < k_{s+1}$ | Rescaled vanilla call struck at $k_s$ | Knockout at $k_{s+1}$ |
| ... | ... | ... | ... |
| 2S − 3 | $k_{S-2} \leqq U < k_{S-1}$ | Rescaled vanilla put struck at $k_{S-1}$ | Knockout at $k_{S-2} - \rho$ |
| 2S − 2 | $k_{S-2} \leqq U < k_{S-1}$ | Rescaled vanilla call struck at $k_{S-2}$ | Knockout at $k_{S-1}$ |
| 2S − 1 | $k_{S-1} \leqq U$ | Rescaled vanilla put struck at $k_S$ | Knockout at $k_{S-1} - \rho$ |
| 2S | $k_{S-1} \leqq U$ | Rescaled vanilla call struck at $k_{S-1}$ | Knockout at $k_S$ |

11.3.4 Relaxing Assumption 4, the Piecewise Linear Assumption

Note that the general replication theorem is derived using Assumption 4, the piecewise linear assumption $$d(U) = \sum_{s=1}^{S} I[k_{s-1} \le U < k_s](\alpha_s + \beta_s U) \qquad 11.3.4A$$

In fact, some derivatives strategies d may not satisfy this equation. Instead, d may be, for example, a quadratic function of the underlying or piecewise linear over more than S such pieces.

If assumption 4 is violated but assumptions 1, 2, 3, and 5 hold, then the auction sponsor might determine the replication weights $(a_1, a_2, \ldots, a_{2S-3}, a_{2S-2})$ for a buy of the strategy d using an ordinary least squares regression or OLS as follows. Select G possible outcomes of the underlying U denoted as $(u_1, u_2, \ldots, u_G)$, where G may be large relative to S. Define the variables $$y_g^{OLS}=d(u_g)-\underline{d} \quad g=1, 2, \ldots, G \qquad 11.3.4B$$

$$x_{g,s}^{OLS}=d^s(u_g) \quad g=1, 2, \ldots, G \text{ and } s=1, 2, \ldots, 2S-2 \qquad 11.3.4C$$

Then, use the model $$y_g^{OLS} = \left(\sum_{s=1}^{2S-2} a_s x_{g,s}^{OLS}\right) + \varepsilon_g \quad g = 1, 2, \ldots, G \qquad 11.3.4D$$

In equation 11.3.4D, they variable of the regression (the dependent variable) is the value of $d(U)-\underline{d}$ over the specified range, and the x variables of the regression (the independent variables) are the payouts of the vanilla replication instruments (also referred to as the replicating vanilla options). The regression slope coefficients are the values of $(a_1, a_2, \ldots, a_{2S-3}, a_{2S-2})$, which the auction sponsor can estimate by OLS. Once the replication weights are constructed for a buy of strategy d, then the auction sponsor can set as for a sell of strategy d equal to $(\overline{d}-\underline{d})$ minus the replication weight $a_s$ for a buy of strategy d.

Instead of using OLS to construct the replication weights, the auction sponsor might construct $(a_1, a_2, \ldots, a_{2S-3}, a_{2S-2})$ using weighted least squares, where the weight on the residual $\epsilon_g$ is proportional to the probability that $U=u_g$. Alternatively, the auction sponsor may run a regression constraining the coefficients to be non-negative.

11.3.5 Relaxing Assumption 5, the Regularity Condition on d

Assumption 5 is as follows $$\underline{d} \leqq \alpha_s+\beta_s k_s \leqq \overline{d} \quad s=2, 3, \ldots, S-1 \qquad 11.3.5A$$

What happens when Assumption 5 is violated, while assumptions 1, 2, 3, and 4 hold?

Define the variables $\overline{d}'$ and $\underline{d}'$ as follows $$\overline{d}'=\max(\overline{d},\alpha_2+\beta_2k_2,\alpha_3+\beta_3k_3, \ldots, \alpha_{S-1}k_{S-1}) \qquad 11.3.5B$$

$$\underline{d}'=\min(\underline{d},\alpha_2+\beta_2k_2,\alpha_3+\beta_3k_3, \ldots, \alpha_{S-1}+\beta_{S-1}k_{S-1}) \qquad 11.3.5C$$

In this case, the general replication theorem holds with equations 11.2.3A-11.2.3H modified by replacing $\overline{d}$ with $\overline{d}'$ and by replacing $\underline{d}$ with $\underline{d}'$.

11.4 Mathematical Restrictions for the Equilibrium

The previous sections show how to replicate derivatives strategies using the vanilla replicating basis. This section discusses the mathematical restrictions for pricing and filling orders in a DBAR equilibrium. Section 11.4 in some cases draws from material in section 7. Thus, table 11.4 shows some changes in notation between this section and the notation in section 7.

TABLE 11.4

Notation differences between section 7 and section 11.

| Variable in Section 7 | Variable in Section 11 | Meaning of Variable |
|---|---|---|
| T | M | Total cleared premium |
| m | S | Number of strikes plus one |
| $k_i$ | $\theta_s$ | Opening order amount |
| n | J | Number of customer orders |

11.4.1 Opening Orders

In an example embodiment, the auction sponsor may enter initial investment amounts for each of the 2S−2 vanilla replicating claims, referred to as opening orders. Let the opening order premium be denoted as $\theta_s$ for replicating claims s=1, 2, . . . , 2S−2. An example embodiment may require $$\theta_s>0 \quad s=1, 2, \ldots, 2S-2 \qquad 11.4.1A$$

Opening orders ensure that the DBAR equilibrium prices are unique. See, for example, the unique price equilibrium proof in section 7.11.

Let Θ be the total amount of opening orders computed as $$\Theta = \sum_{s=1}^{2S-2} \theta_s \quad 11.4.1B$$

The auction sponsor may determine the total amount of opening orders Θ based on a desired level of initial liquidity for the DBAR auction or based on the desired level of computational efficiency for the equilibrium.

Once Θ is determined, the auction sponsor can use a variety of ways to determine the individual opening order amounts $\theta_1, \theta_2, \ldots, \theta_{2S-2}$ based on the auction sponsor's objective.

Maximize Expected Profit. The auction sponsor may wish to maximize the expected profit from the opening orders. In this case, the auction sponsor may make $\theta_s$ proportional to the auction sponsor's estimate of the fair value of the sth replicating claim. Here, the auction sponsor sets $$\theta_s = \Theta \times E[d^s(U)] \; s=1, 2, \ldots, 2S-2 \quad 11.4.1C$$

The auction sponsor may compute this expected value using a non-parametric approach or by assuming a specific distribution for U. To select the appropriate distribution for U, the auction sponsor might employ techniques from Section 10.3.1 in the subsections "Classes of Distributions for the Underlying," and "Selecting the Appropriate Distribution."

Minimize Standard Deviation. The auction sponsor may wish to minimize the standard deviation of opening order P&L. In this case, the auction sponsor may enter the opening orders proportional to the auction sponsor's estimate of the likely final equilibrium price of the replicating claim. In this case, let $p_s$ denote the equilibrium price of the sth replicating claim for s=1, 2, . . . , 2S−2. Then the auction sponsor sets $$\theta_s = \Theta \times E[p_s] \; s=1, 2, \ldots, 2S-2 \quad 11.4.1D$$

In this case, the expectation is taken over the auction sponsor's estimate of the likely values of the final equilibrium prices of the replicating claims.

Maximize the Minimum P&L. Alternatively, the auction sponsor may choose to maximize the minimum P&L from the opening orders. In this case, the auction sponsor sets $$\theta_s = \frac{\Theta}{2S-2} \; s = 1, 2, \ldots, 2S-2 \quad 11.4.1E$$

Here, opening orders are equal for all replicating claims.

11.4.2 Customer Orders

Customers can submit orders to buy or sell derivatives strategies following standard derivative market protocols in a DBAR auction. For notation, assume that customers submit a total of J orders in the auction, indexed by j=1, 2, . . . , J. When submitting an order, the customer requests a specific number of contracts, denoted by $r_j$. For digital options, the auction sponsor may adopt the convention that one contract pays out $1 if the digital option expires in-the-money. For vanilla derivatives, the auction sponsor may adopt the convention that one contract pays out $1 per point that the option expires in-the-money.

Let $d_j$ denote the payout function for the jth customer order. Similar to equation 11.2.1A and equation 11.2.1B, let $$\overline{d_j} = \max_{k_1 \le U < k_{S-1}} [d_j(U),\; E[d_j(U) | U > k_{S-1}],\; E[d_j(U) \mid U < k_1]] \quad 11.4.2A$$

$$\underline{d_j} = \min_{k_1 \le U < k_{S-1}} [d_j(U),\; E[d_j(U) | U > k_{S-1}],\; E[d_j(U) \mid U < k_1]] \quad 11.4.2B$$

for the jth customer order, j=1, 2, . . . , J.

In a DBAR auction, customers may specify a limit price for each order. The limit price for a buy of a derivatives strategy represents the maximum price the customer is willing to pay for the derivatives strategy specified. The limit price for a sell of a derivatives strategy represents the minimum price at which the customer is willing to sell the derivatives strategy. For notation, let $w_j$ denote the limit price for customer order j, 11.4.3 Pricing Derivative Strategies Based on the Prices of the Replicating Claims Mathematically, the auction sponsor may require that $$p_s > 0 \; s=1, 2, \ldots, 2S-2 \quad 11.4.3A$$

$$\sum_{s=1}^{2S-2} p_s = 1 \quad 11.4.3B$$

Here, the auction sponsor requires that the prices of the vanilla replicating claims are positive and sum to one.

Based on these prices, the auction sponsor may determine the equilibrium price of each derivatives strategy using the prices of the replicating claims as follows. Let $\pi_j$ denote the equilibrium mid-price for the derivatives strategy requested in order j. For simplicity of exposition, assume here that the auction sponsor does not charge fees (see section 7.8 for a discussion of fees). Let $a_{j,s}$ denote the replication weight for the sth replicating claim for a customer order computed using the general replication theorem of section 1.12.3. Then, for a derivatives strategy with payout function $d_j$ $$\pi_j \equiv \sum_{s=1}^{2S-2} a_{j,s} p_s \quad 11.4.3C$$

Each strategy is priced as the sum of the product of the strategy's replicating weights and the prices of the respective vanilla replicating claims.

11.4.4 Adjusted Limit Prices and Determining Fills in a DBAR Auction

Following the discussion in section 7.8, let $w_j^a$ denoted the adjusted limit price for customer order j as follows. If order j is a buy of strategy $d_j$, then $$w_j^a = w_j - \underline{d_j} \quad 11.4.4A$$

Similar to the replication weights $a_{j,s}$ for a buy (see equations 11.2.3A, 11.2.3B, 11.2.3C, and 11.2.3D), the adjusted limit price $w_j^a$ is a function of $\underline{d_j}$. For a sell of strategy $d_j$, $$w_j^a = \overline{d_j} - w_j \quad 11.4.4B$$

Similar to the replication weights $a_{j,s}$ for a sell (see equations 11.2.3E, 11.2.3F, 11.2.3G, and 11.2.3H), the adjusted limit price $w_j^a$ is a function of $\overline{d_j}$.

In an example embodiment, the auction sponsor may determine fills in the auction based on the adjusted limit price as follows. Let $x_j$ denote the equilibrium number of filled contracts for order j for j=1, 2, . . . , J. When customer order j is a buy order, if the customer's adjusted limit price $w_j^a$ is below the DBAR equilibrium price $\pi_j$, then the customer's bid is below the market, and the customer's order receives no fill, so $x_j=0$. If the customer's adjusted limit price $w_j^a$ is exactly equal to the DBAR equilibrium price $\pi_j$, then the customer's bid is at the market, and the customer's order may receive a fill, so $0 \leqq x_j \leqq r_j$. If the customer's adjusted limit price $w_j^a$ is above the DBAR equilibrium price $\pi_j$, then the customer's bid is above the market, and the customer's order is fully filled, so $x_j=r_j$. Mathematically, the logic for a buy order or a sell order is as follows $$w_j^a \pi_j \rightarrow x_j=0$$

$$w_j^a=\pi_j \rightarrow 0 \leqq x_j \leqq r_j$$

$$w_j^a>\pi_j \rightarrow x_j=r_j \quad \text{11.4.4C}$$

Note that in an example embodiment $\pi_j$, the equilibrium price of order j, is not necessarily equal to $w_j^a$, the customer's adjusted limit price. In an example embodiment, every buy order with an adjusted limit price at or above the equilibrium price may be filled at that equilibrium price. In an example embodiment, every sell order with an adjusted limit price at or below the equilibrium price may be filled at that equilibrium price.

11.4.5 Equilibrium Pricing Conditions and Self-Hedging

Let M denote the total replicated premium paid in the auction computed as follows $$M \equiv \left(\sum_{j=1}^{J} x_j \pi_j\right) + \sum_{s=1}^{2S-2} \theta_s \quad \text{11.4.5A}$$

Next, note that $a_{j,s}x_j$ is the amount of replicating claim s used to replicate order j. Define $y_s$ as $$y_s \equiv \sum_{j=1}^{J} a_{j,s} x_j \quad \text{11.4.5B}$$

for s=1, 2, . . . , 2S−2. Here, $y_s$ is the aggregate filled amount across all customer orders of the sth replicating claim. Note that since the $a_{j,s}$'s are non-negative (equation 11.2.3K), and the $x_j$'s are non-negative (fills are always non-negative), $y_s$ will also be non-negative.

To keep auction sponsor risk low, the DBAR embodiment may require that the total premium collected is exactly sufficient to payout the in-the-money filled orders, or the self-hedging condition. Note that, in equilibrium, the sth replicating claim has a filled amount of $$y_s + \frac{\theta_s}{p_s} \quad \text{11.4.5C}$$

for s=1, 2, . . . , 2S−2. Therefore, the self-hedging condition can be mathematically stated as $$\sum_{s=1}^{2S-2} d^s(U)\left(y_s + \frac{\theta_s}{p_s}\right) = M \quad \text{11.4.5D}$$

for all values of U.

As described in Appendix 11B, the self-hedging condition is equivalent to $$y_s + \frac{\theta_s}{p_s} = M \quad s = 1, 2, \ldots, 2S-2 \quad \text{11.4.5E}$$

Note that the auction sponsor takes on risk to the underlying only through P&L in the opening orders.

Equation 11.4.5E relates $y_s$, the aggregated filled amount of the sth replicating claim, and $p_s$, the price of the sth replicating claim. For M and $\theta_s$ fixed, the greater $y_s$, then the higher $p_s$ and the higher the prices of strategies that pay out if the sth replicating claim expires in-the-money. Similarly, the lower the customer payouts $y_s$, then the lower $p_s$ and the lower the prices of derivatives that pay out if the sth replicating claim expires in-the-money. Thus, in this pricing framework, the demand by customers for a particular replicating claim is closely related to the price for that replicating claim.

Let $m_s$ denote the total filled premium associated with replicating claim s. Then $$m_s \equiv p_s y_s + \theta_s \; s=1, 2, \ldots, 2S-2 \quad \text{11.4.5F}$$

Substituting this definition into Equation 11.4.5E gives that $$m_s = M p_s \; s=1, 2, \ldots, 2S-2 \quad \text{11.4.5G}$$

For the vth replication claim, one can also write $$m_v = M p_v \; v=1, 2, \ldots, 2S-2 \quad \text{11.4.5H}$$

Note that all quantities in equation 11.4.5H are strictly positive. Therefore, dividing 11.4.5G by 11.4.5H gives that $$\frac{m_s}{m_v} = \frac{p_s}{p_v} \quad s, v = 1, 2, \ldots, 2S-2 \quad \text{11.4.5I}$$

Thus, in the DBAR equilibrium, the relative amounts of premium invested in any two replicating claims equal the relative prices of the corresponding replicating claims.

11.4.6 Maximizing Premium to Determine the DBAR Equilibrium

In determining the equilibrium, the auction sponsor may seek to maximize the total filled premium M subject to the constraints described above. Combining all of the above equations to express the DBAR equilibrium mathematically gives the following $$\begin{aligned}
&\text{maximize } M \text{ subject to} \\
&0 < p_s && s = 1, 2, \ldots, 2S-2 \\
&\sum_{s=1}^{2S-2} p_s = 1 \\
&\pi_j \equiv \sum_{s=1}^{2S-2} a_{j,s} p_s && j = 1, 2, \ldots, J \\
&\left.\begin{array}{l} w_j^a < \pi_j \to x_j = 0 \\ w_j^a = \pi_j \to 0 \le x_j \le r_j \\ w_j^a > \pi_j \to x_j = r_j \end{array}\right\} && j = 1, 2, \ldots, J \\
&y_s \equiv \sum_{j=1}^{J} a_{j,s} x_j && s = 1, 2, \ldots, 2S-2 \\
&M \equiv \left(\sum_{j=1}^{J} x_j \pi_j\right) + \sum_{s=1}^{2S-2} \theta_s \\
&y_s + \frac{\theta_s}{p_s} = M && s = 1, 2, \ldots, 2S-2
\end{aligned} \quad 11.4.6A$$

This maximization of M can be solved using mathematical programming methods of section 7.9, with changes in the number of replicating claims (2S−2) and changes in the formula for the adjusted limit price (section 11.4.4).

11.5 Examples of DBAR Equilibria with the Digital Replicating Basis and the Vanilla Replicating Basis This section illustrates the techniques discussed above with two examples. Section 11.5.1 describes the underlying and the customer orders. Section 11.5.2 discusses the equilibrium using the digital replicating basis of section 11.1. Section 11.5.3 analyzes the equilibrium with the vanilla replicating basis of section 11.2.

For notation, let $C^{\Theta}(U)$ denote the opening order P&L for the auction sponsor. The opening order P&L $C^{\Theta}(U)$ is written as a function of U to explicitly express its dependence on the outcome of the underlying. In an example embodiment, the auction sponsor may be exposed to both opening order P&L $C^{\Theta}(U)$ and replication P&L $C^{R}(U)$ simultaneously. Let this combined quantity be called the outcome dependent P&L, denoted as $C^{T}(U)$, and computed as follows $$C^T(U)=C^{\Theta}(U)+C^R(U) \quad 11.5A$$

Once again, $C^T$ takes on the argument U to show that it is outcome dependent.

11.5.1 Auction Set-Up

The auction set-up is as follows. The underlying U for the DBAR auction is the equity price of a US company. Consistent with the recent decimalization of the NYSE, the minimum change in the underlying equity price is 0.01, denoted by ρ. The auction sponsor initially invests Θ=$800. Customers trade derivatives strategies based on the following three strikes: $k_1$=40, $k_2$=50, and $k_3$=60. Customers pay premium for filled orders on the same date as the auction sponsor pays out in-the-money claims. For this example, it is assumed that there is no finite lower bound $k_0$ for this underlying.

Customers submit a total of J=3 orders in this DBAR auction, described in table 11.5.1. Column two of table 11.5.1 shows the derivatives strategy for each customer order. Note that there is one customer order for a digital strategy and two customer orders for vanilla strategies. Column three contains the payout function $d_j$ for each derivatives strategy, and column four shows the requested number of contracts $r_j$ by each customer. For the digital order, one contract pays out $1 if the option expires in-the-money. For both vanilla orders, assume that one contract pays out $1 per 1 unit that the strategy expires in-the-money. Column five shows the customer's limit price $w_j$ per contract. The limit price represents the maximum price the customer is willing to pay per contract for the requested derivatives strategy.

TABLE 11.5.1

Details of the customer orders.

| Strategy j | Derivatives Strategy | Payout Per Contract $d_j(U)$ | Requested Number of Contracts $r_j$ | Limit Price Per Contract $w_j$ |
|---|---|---|---|---|
| 1 | 50-60 Digital Range | $d_1(U) = \begin{cases} 0 & U < 50 \\ 1 & 50 \leqq U < 60 \\ 0 & 50 \leqq U \end{cases}$ | 1,000,000 | 0.3 |
| 2 | 50-40 Vanilla Put Spread | $d_2(U) = \begin{cases} 10 & U < 40 \\ 50 - U & 40 \leqq U < 50 \\ 0 & 50 \leqq U \end{cases}$ | 200,000 | 6 |
| 3 | 50-60 Vanilla Call Spread | $d_3(U) = \begin{cases} 0 & U < 50 \\ U - 50 & 50 \leqq U < 60 \\ 10 & 60 \leqq U \end{cases}$ | 200,000 | 4 |

11.5.2 The DBAR Equilibrium Based on the Digital Replicating Basis

This section analyzes the DBAR equilibrium with three customer orders using the digital replicating basis discussed in section 11.1.

Table 11.5.2A shows the opening orders for this DBAR auction. As described above, the auction sponsor initially invests $800. As displayed in the fourth column, $200 of opening orders is invested equally in each of the four digital replicating claims.

TABLE 11.5.2A

Opening orders for the digital replicating basis.

| Digital Replicating Claim s | Outcome Range | Digital Replicating Claim | Opening Order Premium Amount $\theta_s$ |
|---|---|---|---|
| 1 | U < 40 | Digital put struck at 40 | $200 |
| 2 | 40 ≦ U < 50 | Digital range with strikes of 40 and 50 | $200 |
| 3 | 50 ≦ U < 60 | Digital range with strikes of 50 and 60 | $200 |
| 4 | 60 < U | Digital call struck at 60 | $200 |

The auction sponsor can calculate the replication weights for the digital range, the vanilla put spread, and the vanilla call spread using equations 11.1.3D, 11.1.3H, and 11.1.3F, respectively. These replication weights are displayed in table 11.5.2B.

TABLE 11.5.2B

Replication weights for the customer orders using the digital replicating basis.

| Strategy j | Derivatives Strategy | $a_{j,1}$ | $a_{j,2}$ | $a_{j,3}$ | $a_{j,4}$ |
|---|---|---|---|---|---|
| 1 | 50-60 Digital Range | 0 | 0 | 1 | 0 |
| 2 | 50-40 Vanilla Put Spread | 10 | 5.005 | 0 | 0 |
| 3 | 50-60 Vanilla Call Spread | 0 | 0 | 4.995 | 10 |

Based on the three customer orders, the opening orders, and the replicating weights, the auction sponsor can solve for the DBAR equilibrium. Table 11.5.2C shows the DBAR equilibrium prices, fills, and premiums paid for the customer orders and table 11.5.2D displays equilibrium information for the opening orders.

TABLE 11.5.2C

Equilibrium information for the customer orders using the digital replicating basis.

| Strategy j | Derivatives Strategy | Equilibrium Price $\pi_j$ | Equilibrium Fill Amount $\pi_j$ | Equilibrium Premium Paid $x_j\pi_j$ |
|---|---|---|---|---|
| 1 | 50-60 Digital Range | 0.134401 | 1,000,000 | $134,401 |
| 2 | 50-40 Vanilla Put Spread | 5.326330 | 200,000 | $1,065,266 |
| 3 | 50-60 Vanilla Call Spread | 4.000000 | 199,978 | $799,910 |

TABLE 11.5.2D

Equilibrium information for the opening orders using the digital replicating basis.

| Digital Replicating Claim s | Equilibrium Price Per $1 USD Payout $p_s$ | Equilibrium Fill Amount $\theta_s/p_s$ |
|---|---|---|
| 1 | 0.532532449 | 376 |
| 2 | 0.000200125 | 999,376 |
| 3 | 0.134400500 | 1,488 |
| 4 | 0.332866926 | 601 |

Based on this equilibrium information, the auction sponsor can compute the opening order P&L $C^{\Theta}(U)$. Since the payout for the sth digital replication claim is $\theta_s/p_s$ if that claim expires in-the-money, $C^{\Theta}(U)$ can be computed as follows for s=1, 2, . . . , S $$C^{\theta}(U)=\frac{\theta_s}{p_s}-\Theta \quad k_{s-1}\le U<k_s \tag{11.5.2A}$$

To illustrate, assume that the outcome of the underlying is 59, which occurs in state s=3. The opening order P&L if outcome 59 occurs is denoted as $C^{\Theta}(59)$. Using equation 11.5.2A, one can determine that $$\begin{aligned}C^{\theta}(59)&=\frac{\theta_3}{p_3}-\Theta\\&=\frac{\$200}{0.134400500}-\$800\\&=\$688\end{aligned} \tag{11.5.2B}$$

The replication P&L $C^R(59)$ can be computed based on equation 11.1.4B as $$\begin{aligned}C^R(59)&=\sum_{s=1}^{S}\sum_{j=1}^{J}I[k_{s-1}\le 59<k_s][a_{j,s}-d_j(59)]x_j\\&=\sum_{j=1}^{J}[a_{j,3}-d_j(59)]x_j\\&=[a_{3,3}-d_3(59)]x_3\\&=(\$4.995-\$9)(199,978)\\&=(\$800,912)\end{aligned} \tag{11.5.2C}$$

Therefore, the total outcome dependent P&L is $$\begin{aligned}C^T(59)&=C^{\theta}(59)+C^R(59)\\&=\$688-\$800,912\\&=(\$800,224)\end{aligned} \tag{11.5.2D}$$

Based on this approach, the auction sponsor can compute summary statistics for the opening order P&L, the replication P&L, and the outcome dependent P&L for this auction equilibrium.

Table 11.5.2E shows several such summary statistics. Row one and row two display the minimum and maximum values, respectively, while the remaining rows show various probability weighted measures. To compute the probability of a specific outcome with the digital replicating basis, the auction sponsor might apply the intrastate uniform model, which assumes the probability of state s occurring equals $p_s$ and every outcome is equally likely to occur within a state. In this case, the probability of a specific outcome is $$Pr[U=u]=\frac{p_s\rho}{k_s-k_{s-1}} \quad k_{s-1}\le u<k_s \tag{11.5.2E}$$

These probability weighted computations are discussed in Appendix 11C. Note that the minimum outcome dependent P&L is ($998,199), and further note that the probability that the outcome dependent P&L is less than zero is 93.26%.

Examining table 11.5.2E, it is worth observing the following. Although outcome dependent P&L is the sum of opening order P&L and replication P&L (equation 11.5A), the summary statistic for outcome dependent P&L (in column four of table 11.5.2E) will not necessarily be the sum of the corresponding summary statistic for opening order P&L (column two of table 11.5.2E) and replication P&L (column three of table 11.5.2E). For example, the standard deviation of the outcome dependent P&L ($212,265) does not equal the standard deviation of the opening order P&L ($14,133) plus the standard deviation of the replication P&L ($211,794). This is true for many of the summary statistics in table 11.5.2E and table 11.5.3E.

TABLE 11.5.2E

Summary statistics for opening order P&L $C^{\Theta}(U)$, replication P&L $C^{R}(U)$, and outcome dependent P&L $C^{T}(U)$ for DBAR auction using the digital replicating basis.

| Summary Statistic | Opening Order P&L $C^{\Theta(U)}$ | Replication P&L $C^{R}(U)$ | Total Outcome Dependent P&L $C^{T}(U)$ |
|---|---|---|---|
| Minimum | ($424) | ($999,000) | ($998,199) |
| Maximum | $998,576 | $999,000 | $1,997,576 |
| Probability < 0 | 86.54% | 6.73% | 93.26% |
| Probability = 0 | 0.00% | 86.54% | 0.00% |
| Probability > 0 | 13.46% | 6.73% | 6.74% |
| Average | $0 | $0 | $0 |
| Standard Deviation | $14,133 | $211,794 | $212,265 |
| Semi-Standard Deviation | $381 | $299,522 | $160,300 |
| Skewness | 70.6 | 0.0 | 0.1 |

11.5.3 The DBAR Equilibrium Based on the Vanilla Replicating Basis

This section examines the equilibrium based on the vanilla replicating basis discussed in section 11.2. Table 11.5.3A shows the opening orders for these replicating claims. As before, the auction sponsor allocates a total of $\Theta$=800 in opening orders.

TABLE 11.5.3A

Opening orders for the vanilla replicating basis.

| Vanilla Replicating Claim s | Outcome Range | Vanilla Replicating Claim | Opening Order Premium Amount $\theta_s$ |
|---|---|---|---|
| 1 | U < 40 | Digital put struck at 40 | $200 |
| 2 | 40 ≦ U < 50 | Rescaled vanilla put struck at 50 knockout at 39.99 | $100 |
| 3 | 40 ≦ U < 50 | Rescaled vanilla call struck at 40 knockout at 50 | $100 |
| 4 | 50 ≦ U < 60 | Rescaled vanilla put struck at 60 knockout at 49.99 | $100 |
| 5 | 50 ≦ U < 60 | Rescaled vanilla call struck at 50 knockout at 60 | $100 |
| 6 | 60 ≦ U | Digital call struck at 60 | $200 |

The auction sponsor can calculate the replication weights for the digital range, the vanilla put spread, and the vanilla call spread using equations 11.2.41, 11.2.5K, and 11.2.5H, respectively. These replication weights are displayed in table 11.5.3B.

TABLE 11.5.3B

Replicating weights for the customer orders using the vanilla replicating basis.

| Strategy j | Derivatives Strategy | $a_{j,1}$ | $a_{j,2}$ | $a_{j,3}$ | $a_{j,4}$ | $a_{j,5}$ | $a_{j,6}$ |
|---|---|---|---|---|---|---|---|
| 1 | 50-60 Digital Range | 0 | 0 | 0 | 1 | 1 | 0 |
| 2 | 50-40 Vanilla Put Spread | 10 | 10 | 0 | 0 | 0 | 0 |
| 3 | 50-60 Vanilla Call Spread | 0 | 0 | 0 | 0 | 10 | 10 |

Based on the customer orders, the opening orders, and the replicating weights, the auction sponsor can solve for the DBAR equilibrium. Table 11.5.3C displays the DBAR equilibrium prices, fills, and premiums paid for the customer orders and table 11.5.3D shows, equilibrium information for the opening orders.

In comparing tables 11.5.3C and 11.5.3D with tables 11.5.2C and 11.5.2D, respectively, note that the equilibrium prices and fills using the vanilla replicating basis are different than those from the digital replicating basis even though the customer orders are identical for both cases.

TABLE 11.5.3C

Equilibrium information for the customer orders using the vanilla replicating basis.

| Strategy j | Derivatives Strategy | Equilibrium Price $\pi_j$ | Equilibrium Fill Amount $x_j$ | Equilibrium Premium Paid $x_j\pi_j$ |
|---|---|---|---|---|
| 1 | 50 -60 Digital Range | 0.30 | 1,666 | $500 |
| 2 | 50 -40 Vanilla Put Spread | 5.999 | 200,000 | $1,199,800 |
| 3 | 50 -60 Vanilla Call Spread | 4.00 | 199,850 | $799,400 |

TABLE 11.5.3D

Equilibrium information for the opening orders using the vanilla replicating basis.

| Vanilla Replicating Claim s | Equilibrium Price Per $1 USD Payout $p_s$ | Equilibrium Fill Amount $\theta_{s/ps}$ |
|---|---|---|
| 1 | 0.399933460 | 500 |
| 2 | 0.199966730 | 500 |
| 3 | 0.000049988 | 2,000,500 |
| 4 | 0.000050029 | 1,998,834 |
| 5 | 0.299950032 | 333 |
| 6 | 0.100049761 | 1,999 |

As before, let $C^{\Theta}(U)$ denote the opening order P&L for the auction sponsor. For the vanilla replicating basis, $C^{\Theta}(U)$ can be computed as $$\begin{aligned} C^{\theta}(U) &= \left(\sum_{s=1}^{2S-2} d^{s}(U)\frac{\theta_s}{p_s}\right) - \Theta \\ &= \frac{I[U < k_1]\theta_1}{p_1} + \sum_{s=2}^{S-1} I[k_{s-1} \le U < k_s] \\ &\quad \left(d^{2s-2}(U)\frac{\theta_{2s-2}}{p_{2s-2}} + d^{2s-1}(U)\frac{\theta_{2s-1}}{p_{2s-1}}\right) + \\ &\quad I[U \ge k_{S-1}]\frac{\theta_{2S-2}}{p_{2S-2}} - \Theta \end{aligned} \tag{11.5.3A}$$

$C^{\Theta}(U)$ is the difference between the opening order payouts and the total invested amount in the opening orders.

To illustrate, assume again that the outcome of the underlying is 59. Therefore, $$\begin{aligned} C^{\theta}(59) &= \left(\sum_{s=1}^{2S-2} d^{s}(59)\frac{\theta_s}{p_s}\right) - \Theta \\ &= \frac{d^4(59)\theta_4}{p_4} + \frac{d^5(59)\theta_5}{p_5} - \$800 \\ &= \frac{(0.1)\times(\$100)}{0.000050029} + \frac{(0.9)\times(\$100)}{0.299950032} - \$800 \\ &= \$199,884 + \$300 - \$800 \\ &= \$199,384 \end{aligned} \tag{11.5.3B}$$

As shown by the general replication theorem in section 11.2.3, the replication P&L $C^R(59)$ equals zero. Therefore, by 11.5A, the outcome dependent P&L $C^T(59)$ is $$C^T(59) = C^\theta(59) + C^R(59) = \$199,384 \quad 11.5.3C$$

Similar to table 11.5.2E, table 11.5.3E shows several summary statistics for the opening order P&L, the replication P&L, and the outcome dependent P&L. Here, the probability weighted statistics are computed using the assumption that $$Pr[U = u] = \frac{(p_{2s-2} + p_{2s-1})\rho}{k_s - k_{s-1}} \quad k_{s-1} \le u < k_s \quad 11.5.3D$$

for s=2, 3, . . . , S−1. This is discussed in further detail in Appendix 11C. Note that the minimum outcome dependent P&L is ($300), which compares favorably to ($998,199), the minimum outcome dependent P&L using the digital replicating basis. Further note that the probability that outcome dependent P&L is less than zero has dropped to 40.01% from 93.26% using the digital replicating basis.

TABLE 11.5.3E

Summary statistics for opening order P & L $C^\theta$ (U), replication P & L $C^R$ (U), and outcome dependent P & L $C^T$ (U) using the vanilla replicating basis.

| Summary Statistic | Opening Order P & L $C^\theta(U)$ | Replication P & L $C^R$ (U) | Total Outcome Dependent P & L $C^T$ (U) |
|---|---|---|---|
| Minimum | ($300) | 0 | ($300) |
| Maximum | $1,998,034 | 0 | $1,998,034 |
| Probability < 0 | 40.01% | 0 | 40.01% |
| Probability = 0 | 0.00% | 0 | 0.00% |
| Probability > 0 | 59.99% | 0 | 59.99% |
| Average | $499,692 | 0 | $499,692 |
| Standard Deviation | $625,568 | 0 | $625,568 |
| Semi-Standard Deviation | $531,623 | 0 | $531,623 |
| Skewness | 0.5 | 0 | 0.5 |

11.6 Replication Using the Augmented Vanilla Replicating Basis

As shown in equation 11.2.3I, the replication P&L for a buy of strategy d is $$C^R(U)=\beta_1(U-E[U|U<k_1])I[U<k_1]+\beta_S(E[U|U\geqq k_{S-1}]-U)I[U\geqq k_{S-1}] \quad 11.6A$$

If $\beta_1$ or $\beta_S$ is non-zero, then the auction sponsor's replication P&L may be unbounded. For example, a vanilla call has $\beta_1$=0 and $\beta_S$=1, and therefore $$C^R(U)=(E[U|U\geqq k_{S-1}]-U)I[U\geqq k_{S-1}] \quad 11.6B$$

If U is very large, then the auction sponsor can lose an unbounded amount of money on a customer purchase of a vanilla call. To eliminate replication P&L in this case, this section describes the augmented vanilla replicating basis.

Section 11.6.1 introduces the augmented vanilla replicating basis. Section 11.6.2 describes the general replication theorem using this augmented basis. Section 11.6.3 uses this theorem to compute replicating weights for digital and vanilla options, and section 11.6.4 discusses the mathematical restrictions based on this equilibrium.

11.6.1 The Augmented Vanilla Replicating Basis

The augmented vanilla replicating basis includes the 2S−2 replicating claims from the vanilla replicating basis of section 11.2.2 plus two additional replicating claims. For notation, the additional replicating claims will be the $1^{st}$ replicating claim and the 2Sth replicating claim.

The $1^{st}$ augmented vanilla replicating claim is the vanilla put struck at $k_1-\rho$. This claim has the payout function $$d^1(U) = \begin{cases} k_1 - \rho - U & U < k_1 - \rho \\ 0 & k_{S-1} \le U \end{cases} \quad 11.6.1A$$

The $2^{nd}$, $3^{rd}$, . . . , $2S-1^{st}$ augmented vanilla replicating claims are identical to the $1^{st}$, $2^{nd}$, . . . , $2S-2^{nd}$ vanilla replicating claims, respectively, from section 11.2.2. The 2Sth augmented vanilla replicating claim is the vanilla call struck at $k_{S-1}$, which has a payout of $$d^{2S}(U) = \begin{cases} 0 & U < k_{S-1} \\ U - k_{S-1} & k_{S-1} \le U \end{cases} \quad 11.6.1B$$

Table 11.6.1 shows the 2S claims for the augmented vanilla replicating basis.

TABLE 11.6.1

The payout ranges and replicating claims for the augmented vanilla replicating basis.

| Claim Number | Payout Range | Augmented Vanilla Replicating Claim | European Knockout? |
|---|---|---|---|
| 1 | $U < k_1-\rho$ | Vanilla put struck at $k_1-\rho$ | None |
| 2 | $U < k_1$ | Digital put struck at $k_1$ | None |
| 3 | $k_1 \leqq U < k_2$ | Rescaled vanilla put struck at $k_2$ | Knockout at $k_1-\rho$ |
| 4 | $k_1 \leqq U < k_2$ | Rescaled vanilla call struck at $k_1$ | Knockout at $k_2$ |
| 5 | $k_2 \leqq U < k_3$ | Rescaled vanilla put struck at $k_3$ | Knockout at $k_2-\rho$ |
| 6 | $k_2 \leqq U < k_3$ | Rescaled vanilla call struck at $k_2$ | Knockout at $k_3$ |
| ... | ... | ... | ... |
| 2s−1 | $k_{s-1} \leqq U < k_s$ | Rescaled vanilla put struck at $k_s$ | Knockout at $k_{s-1}-\rho$ |
| 2s | $k_{s-1} \leqq U < k_s$ | Rescaled vanilla call struck at $k_{s-1}$ | Knockout at $k_s$ |
| 2s+1 | $k_s \leqq U < k_{s+1}$ | Rescaled vanilla put struck at $k_{s+1}$ | Knockout at $k_s-\rho$ |
| 2s+2 | $k_s \leqq U < k_{s+1}$ | Rescaled vanilla call struck at $k_s$ | Knockout at $k_{s+1}$ |
| ... | ... | ... | ... |
| 2S−3 | $k_{S-2} \leqq U < k_{S-1}$ | Rescaled vanilla put struck at $k_{S-1}$ | Knockout at $k_{S-2}-\rho$ |
| 2S−2 | $k_{S-2} \leqq U < k_{S-1}$ | Rescaled vanilla call struck at $k_{S-2}$ | Knockout at $k_{S-1}$ |

TABLE 11.6.1-continued

| The payout ranges and replicating claims for the augmented vanilla replicating basis. | | | |
|---|---|---|---|
| Claim Number | Payout Range | Augmented Vanilla Replicating Claim | European Knockout? |
| 2S−1 | $k_{S-1} \leqq U$ | Digital call struck at $k_{S-1}$ | None |
| 2S | $k_{S-1} \leqq U$ | Vanilla call struck at $k_{S-1}$ | None |

11.6.2 The General Replicating Theorem for the Augmented Vanilla Replicating Basis For notation, let $\overline{d}''$ and $\underline{d}''$ denote functions of the derivatives strategy d computed as follows $$\overline{d}'' = \max_{(k_1-\rho) \le U \le k_{S-1}} d(U) \tag{11.6.2A}$$

$$\underline{d}'' = \min_{(k_1-\rho) \le U \le k_{S-1}} d(U) \tag{11.6.2B}$$

The following theorem shows how to construct the replicating weights $(a_1, a_2, \ldots, a_{2S-1}, a_{2S})$ of strategy d.

General Replication Theorem. Under assumptions 1, 3, 4, and 5 of section 11.2.1, the replicating weights for a buy of strategy d are $$a_1=-\beta_1 \tag{11.6.2C}$$

$$a_2=\alpha_1+\beta_1(k_1-\rho)-\underline{d}'' \tag{11.6.2D}$$

$$a_{2s-1}=\alpha_s+\beta_s k_{s-1}-\underline{d}''\ s=2, 3, \ldots, S-1 \tag{11.6.2E}$$

$$a_{2s}=\alpha_s+\beta_s k_s-\underline{d}''\ s=2, 3, \ldots, S-1 \tag{11.6.2F}$$

$$a_{2S-1}=\alpha_S-\underline{d}'' \tag{11.6.2G}$$

$$a_{2S}=\beta_S \tag{11.6.2H}$$

For a sell of strategy d, the replicating weights are $$a_1=\beta_1 \tag{11.6.2I}$$

$$a_2=\overline{d}''-\alpha_1-\beta_1(k_1-\rho) \tag{11.6.2J}$$

$$a_{2s-1}=\overline{d}''-\alpha_s-\beta_s k_{s-1}\ s=2, 3, \ldots, S-1 \tag{11.6.2K}$$

$$a_{2s}=\overline{d}''-\alpha_s-\beta_s k_s\ s=2, 3, \ldots, S-1 \tag{11.6.2L}$$

$$a_{2S-1}=\overline{d}''-\alpha_S \tag{11.6.2M}$$

$$a_{2S}=-\beta_S \tag{11.6.2N}$$

The proof of this theorem follows closely the proof in appendix 11A. Note that this theorem does not require assumption 2 to hold.

Using the augmented vanilla replicating basis, the replication P&L $C^R(U)$ for a buy or sell of d is 0, regardless of the outcome of U.

Note that for any s=2, 3, . . . 2S−1, the replicating weight for a buy of d plus the replicating weight for a sell of d equals $\overline{d}''-\underline{d}''$. Note that for s=1 or s=2S, the replicating weight for a buy of d plus the replicating weight for a sell of d equals zero.

The replication weights for a buy of d or a sell of d satisfy $$\min(a_2, a_3, \ldots, a_{2S-2}, a_{2S-1})=0 \tag{11.6.2O}$$

ensuring that $y_2, y_3, \ldots, y_{2S-2}, y_{2S-1}$ (as defined in section 11.6.4) are also non-negative. However, $a_1$ and $a_{2S}$ can be negative and section 11.6.4 shows how $y_1$ and $y_{2S}$ are restricted to be non-negative.

11.6.3 Computing Replicating Weights for Digital and Vanilla Derivatives

Consider the special case where as defined in assumption 4, d satisfies $$\beta_1=\beta_S=0 \tag{11.6.3A}$$

In this case, the payout of the derivatives strategy is constant and equal to $\alpha_1$ if the underlying U is less than $k_1$. Similarly, the payout of the derivatives strategy is constant and equal to as if the underlying U is greater than or equal to $k_{S-1}$. Strategies that satisfy 11.6.3A include digital calls, digital puts, range binaries, vanilla call spreads, vanilla put spreads, collared vanilla straddles, and collared forwards. Applying the theorem above, then, equation 11.6.3A implies that $$a_1=a_{2S}=0 \tag{11.6.3B}$$

For these instruments, the remaining replicating weights $(a_2, a_3, \ldots, a_{2S-2}, a_{2S-1})$ correspond to the replicating weights $(a_1, a_2, \ldots, a_{2S-3}, a_{2S-2})$ defined for these instruments in sections 11.2.4 and 11.2.5.

To compute the replication weights for a vanilla call, recall that the payout function d for a vanilla call with strike $k_v$ is $$d(U)=\begin{cases} 0 & U<k_v \\ U-k_v & k_v \le U \end{cases} \tag{11.6.3C}$$

Note that $\underline{d}''=0$ and $\overline{d}''=k_{S-1}-k_v$. For a buy order, the replication weights are $$a_s=\begin{cases} 0 & s=1,\ 2,\ \ldots,\ 2v \\ k_{int[(s+1)/2]}-k_v & s=2v+1,\ 2v+2,\ \ldots,\ 2S-2 \\ k_{S-1}-k_v & s=2S-1 \\ 1 & s=2S-1 \end{cases} \tag{11.6.3D}$$

For a sell order for a vanilla call with strike $k_v$ the replication weights are $$a_s=\begin{cases} 0 & s=1 \\ k_{S-1}-k_v & s=2,\ 3,\ \ldots,\ 2v \\ k_{S-1}-k_{int[(s+1)/2]} & s=2v+1,\ 2v+2,\ \ldots,\ 2S-2 \\ 0 & s=2S-1 \\ -1 & s=2S \end{cases} \tag{11.6.3E}$$

The payout function d for a vanilla put with strike $k_v$ is $$d(U)=\begin{cases} k_v-U & U<k_v \\ 0 & k_v\le U \end{cases} \quad 11.6.3F$$

Note that in this case, $\underline{d}''=0$ and $\overline{d}''=k_v-k_1+\rho$. For a buy order for a vanilla put with strike $k_v$ the replication weights are $$a_s=\begin{cases} -1 & s=1 \\ k_v-k_1+\rho & s=2 \\ k_v-k_{int[(s+1)/2]} & s=3,\ 4,\ \ldots,\ 2v \\ 0 & s=2v+1,\ 2v+2,\ \ldots,\ 2S \end{cases} \quad 11.6.3G$$

For a sell order for a vanilla put with strike $k_v$ the replication weights are $$a_s=\begin{cases} 1 & s=1 \\ 0 & s=2 \\ k_{int[(s+1)/2]}-k_1+\rho & s=3,\ 4,\ \ldots,\ 2v \\ k_v-k_1+\rho & s=2v+1,\ 2v+2,\ \ldots,\ 2S-1 \\ 0 & s=2S \end{cases} \quad 11.6.3H$$

The auction sponsor can compute the replication weights for straddles and forwards using the above theorem in a similar manner.

11.6.4 Mathematical Restrictions for the Equilibrium Based on the Augmented Vanilla Replicating Basis This section discusses the mathematical restrictions for pricing and filling customer orders in such a DBAR equilibrium. This section follows closely the discussion in section 11.4.

Opening Orders and Customer Orders

The auction sponsor may enter opening orders $\theta_s$ for each of the 2S augmented vanilla replicating claims whereby $$\theta_s>0\ s=1, 2, \ldots, 2S \quad 11.6.4A$$

Assume that customers submit a total of J orders in the auction, indexed by j=1, 2, . . . , J. For customer order j, let $r_j$ denote the requested number of contracts, let $w_j$ denote the limit price, and let $d_j$ denote the payout function.

Pricing and Filling Derivatives Strategies

Let $p_s$ denote the equilibrium price of the sth augmented vanilla replicating claim s=1, 2, . . . , 2S. Mathematically, the auction sponsor may require that $$p_s>0\ s=1, 2, \ldots, 2S \quad 11.6.4B$$

$$\sum_{s=2}^{2S-1} p_s=1 \quad 11.6.4C$$

Here, the auction sponsor requires that the prices of the augmented vanilla replicating claims are positive and sum to one. Note that $p_1$ and $p_{2S}$ are not part of the summation in equation 11.6.4C.

Based on these prices, the auction sponsor may determine the equilibrium price $\pi_j$ of each derivatives strategy as $$\pi_j\equiv\sum_{s=1}^{2S} a_{j,s}p_s \quad 11.6.4D$$

where $a_{j,s}$ is the replicating weight for customer order j for augmented replicating claim s, computed based on the theorem in section 11.6.2.

Define $\overline{d}_j''$ and $\underline{d}_j''$ as the analogues to $\overline{d}''$ and $\underline{d}''$ for customer order j, respectively. Let $w_j^a$ denote the adjusted limit price for customer order j. If order j is a buy of strategy $d_j$, then $$w_j^a=w_j-\underline{d}_j'' \quad 11.6.4E$$

If order j is a sell of strategy $d_j$, then $$w_j^a=\overline{d}_j''-w_j \quad 11.6.4F$$

The auction sponsor can employ the logic of equation 11.4.4C to fill customer orders.

The DBAR Equilibrium Conditions

Let M denote the total replicated premium paid in the auction $$M\equiv\left(\sum_{j=1}^{j} x_j\pi_j\right)+\sum_{s=1}^{2S}\theta_s \quad 11.6.4G$$

Define $y_s$ as $$y_s\equiv\sum_{j=1}^{j} a_{j,s}x_j \quad 11.6.4H$$

for s=1, 2, . . . , 2S. To keep risk low, the auction sponsor may enforce the condition $$y_s+\frac{\theta_s}{p_s}=M\quad s=2, 3, \ldots, 2S-1 \quad 11.6.4I$$

In addition, to eliminate risk for the $1^{st}$ and 2Sth replicating claim the auction sponsor may require that $$y_1=y_{2S}=0 \quad 11.6.4J$$

In determining the equilibrium, the auction sponsor may seek to maximize the total filled premium M subject to the constraints described above. Combining all of these equations to express the DBAR equilibrium mathematically gives the following $$\begin{aligned} &\text{maximize } M \\ &\text{subject to} \\ &0<p_s \qquad s=1, 2, \ldots, 2S \\ &\sum_{s=2}^{2S-1} p_s=1 \\ &\pi_j\equiv\sum_{s=1}^{2S} a_{j,s}p_s \qquad j=1, 2, \ldots, J \end{aligned} \quad 11.6.4K$$

-continued $$\left.\begin{array}{r} w_j^a < \pi_j \rightarrow x_j = 0 \\ w_j^a = \pi_j \rightarrow 0 \le x_j \le r_j \\ w_j^a > \pi_j \rightarrow x_j = r_j \end{array}\right\} \quad j = 1, 2, \ldots, J$$

$$y_s \equiv \sum_{j=1}^{j} a_{j,s} x_j \qquad s = 1, 2, \ldots, 2S$$

$$M \equiv \left(\sum_{j=1}^{J} x_j \pi_j\right) + \sum_{s=1}^{2S} \theta_s$$

$$y_s + \frac{\theta_s}{p_s} = M \qquad s = 2, 3, \ldots, 2S-1$$

$$y_1 = y_{2S} = 0$$

This maximization of M can be solved using mathematical programming methods based on section 7.9.

Appendix 11A: Proof of General Replication Theorem in Section 11.2.3

The proof of this theorem proceeds in two parts. Section 11A.1 derives the result for a buy of strategy d and then section 11A.2 derives the result for a sell of strategy d. Similar to section 11.1.4, let e(U) denote the payout on the replicating portfolio based on weights $(a_1, a_2, \ldots, a_{2S-3}, a_{2S-2})$ $$e(U) \equiv \sum_{s=1}^{2S-2} a_s d^s(U) \qquad \text{11A.1}$$

The replication P&L $C^R(U)$ versus d(V) minus $\underline{d}$ is $$C^R(U) = e(U) - (d(U) - \underline{d}) \qquad \text{11A.2}$$

Here $\underline{d}$ is subtracted from the payout function d to make the replication weights as small as possible while remaining non-negative (non-negative replication weights are a requirement to construct the DBAR equilibrium). These formulas will be used in the proof below.

11A.1: Proof for a Buy of the Derivatives Strategy d

The derivation below shows that the payout on the replicating portfolio e(U) is the variance minimizing portfolio for the derivatives strategy d(U) minus $\underline{d}$ for every outcome U. To prove this theorem, U's range is divided into three mutually exclusive, collectively exhaustive cases.

Case 1: $U < k_1$. Note that the only replicating claim that pays out over this range is the first replicating claim. In this case, $$\begin{aligned} e(U) &= \sum_{s=1}^{2S-2} a_s d^s(U) \\ &= a_1 d^1(U) \\ &= \alpha_1 + \beta_1 E[U \mid U < k_1] - \underline{d} \end{aligned} \qquad \text{11A.1.1}$$

where the last step follows from the definition of $a_1$ in equation 11.2.3A and the definition of $d^1$ in equation 11.2.2A. The payout on the derivatives strategy d over this range is $$\begin{aligned} d(U) &= \sum_{s=1}^{S} I[k_{s-1} \le U < k_s](\alpha_s + \beta_s U) \\ &= \alpha_1 + \beta_1 U \end{aligned} \qquad \text{11A.1.2}$$

Therefore, the replication P&L versus d(U) minus $\underline{d}$ is $$\begin{aligned} C^R(U) &= e(U) - (d(U) - \underline{d}) \\ &= (\alpha_1 + \beta_1 E[U \mid U < k_1] - \underline{d}) - (\alpha_1 + \beta_1 U - \underline{d}) \\ &= \beta_1 (E[U \mid U < k_1] - U) \end{aligned} \qquad \text{1A.1.3}$$

Since the estimate that minimizes the variance is that random variable's expected value, the replicating portfolio is variance minimizing.

Case 2: $k_{s-1} \leqq U < k$, for s=2, 3, . . . , S−1. When U is in this range, the only vanilla replicating claims that payout are the $2s-2^{nd}$ claim and the $2s-1^{st}$ claim. Therefore, the vanilla replicating portfolio pays out $$\begin{aligned} e(U) &= \sum_{s=1}^{2S-2} a_s d^s(U) \\ &= a_{2s-2} d^{2s-2}(U) + a_{2s-1} d^{2s-1}(U) \\ &= a_{2s-2}\left(\frac{k_s - U}{k_s - k_{s-1}}\right) + a_{2s-1}\left(\frac{U - k_{s-1}}{k_s - k_{s-1}}\right) \end{aligned} \qquad \text{11A.1.4}$$

where the last step follows from the definitions of $d^{2s-2}$ and $d^{2s-1}$ from equations 11.2.2D and 11.2.2E. Substituting the values of $a_{2s-2}$ and $a_{2s-1}$ from equations 11.2.3B and 11.2.3C into equation 11A.1.4 gives $$\begin{aligned} e(U) &= a_{2s-2}\left(\frac{k_s - U}{k_s - k_{s-1}}\right) + a_{2s-1}\left(\frac{U - k_{s-1}}{k_s - k_{s-1}}\right) \\ &= (\alpha_s + \beta_s k_{s-1} - \underline{d})\left(\frac{k_s - U}{k_s - k_{s-1}}\right) + (\alpha_s + \beta_s k_s - \underline{d})\left(\frac{U - k_{s-1}}{k_s - k_{s-1}}\right) \end{aligned} \qquad \text{11A.1.5}$$

Simplifying equation 11A.1.5 leads to $$\begin{aligned} e(U) &= (\alpha_s + \beta_s k_{s-1} - \underline{d})\left(\frac{k_s - U}{k_s - k_{s-1}}\right) + (\alpha_s + \beta_s k_s - \underline{d})\left(\frac{U - k_{s-1}}{k_s - k_{s-1}}\right) \\ &= \alpha_s\left(\frac{k_s - k_{s-1}}{k_s - k_{s-1}}\right) + \left(\frac{\beta_s k_{s-1} k_s - \beta_s k_{s-1} U}{k_s - k_{s-1}}\right) + \left(\frac{\beta_s k_s U - \beta_s k_{s-1} k_s}{k_s - k_{s-1}}\right) - \underline{d}\left(\frac{k_s - k_{s-1}}{k_s - k_{s-1}}\right) \\ &= \alpha_s + \frac{\beta_s k_{s-1} k_s - \beta_s k_{s-1} U + \beta_s k_s U - \beta_s k_{s-1} k_s}{k_s - k_{s-1}} - \underline{d} \end{aligned} \qquad \text{11A.1.6}$$

-continued $$= \alpha_s + \frac{\beta_s k_s U - \beta_s k_{s-1} U}{k_s - k_{s-1}} - \underline{d}$$

$$= \alpha_s + \frac{\beta_s U (k_s - k_{s-1})}{k_s - k_{s-1}} - \underline{d}$$

$$= \alpha_s + \beta_s U - \underline{d}$$

For this case, the payout on the derivatives strategy d over this range is $$d(U) = \sum_{s=1}^{s} I[k_{s-1} \le U < k_s](\alpha_s + \beta_s U) = \alpha_s + \beta_s U \qquad \text{11A.1.7}$$

Therefore, the replication P&L versus d(U) minus $\underline{d}$ is $$C^R(U) = e(U) - (d(U) - \underline{d}) = (\alpha_s + \beta_s U - \underline{d}) - (\alpha_s + \beta_s U - \underline{d}) = 0 \qquad \text{11A.1.8}$$

Thus the theorem holds over this range and the replication P&L $C^R(U)$ is zero.

Case 3: $U \geqq k_{S-1}$. Over this range, only the $2S-2^{nd}$ replicating claim pays out. Therefore, $$e(U) = \sum_{s=1}^{2S-2} a_s d^s(U) = a_{2S-2} d^{2S-2}(U) = \alpha_S + \beta_S E[U \mid U \ge k_{S-1}] - \underline{d} \qquad \text{11A.1.9}$$

where the last step follows from the definition of $d^{2S-2}$ from equation 11.2.2H. The payout on the derivatives strategy d over this range is $$d(U) = \sum_{s=1}^{S} I[k_{s-1} \le U < k_s](\alpha_s + \beta_s U) = \alpha_S + \beta_S U \qquad \text{11A.1.10}$$

Therefore, the replication P&L is $$C^R(U) = e(U) - (d(U) - \underline{d}) = (\alpha_S + \beta_S U[U \mid U \ge k_{S-1}] - \underline{d}) - (\alpha_S + \beta_S U - \underline{d}) = \beta_S(E[U \mid U \ge k_{S-1}] - U) \qquad \text{11A.1.11}$$

Since the estimate that minimizes the variance is that random variable's expected value, the replicating portfolio is variance minimizing. Therefore, the theorem holds over this range.

Since cases 1, 2, and 3 cover the entire range of U, the general replication theorem holds for a buy of d. Using the definition of $\underline{d}$ in equation 11.2.1B and assumption 5, it is not hard to check that all of the a's are non-negative and at least one is zero.

11A.2: Proof for a Sell of the Derivatives Strategy d

To more easily distinguish sells of d from buys of d in this appendix, let $\tilde{a}_s$ denote the weight on the sth replication claim for a sell of d instead of $a_s$ in the text.

Since $(a_1, a_2, \ldots, a_{2S-3}, a_{2S-2})$ is minimum variance for $d-\underline{d}$, then $(\bar{d}-\underline{d}-a_1, \bar{d}-\underline{d}-a_2, \ldots, \bar{d}-\underline{d}-a_{2S-3}, \bar{d}-\underline{d}-a_{2S-2})$ is minimum variance for $\bar{d}-d$. Comparing equation 11.2.3A-11.2.3D with 11.2.3E-11.2.3H respectively $$\tilde{a}_s = \bar{d} - \underline{d} - a_s \quad s = 1, 2, \ldots, 2S-2 \qquad \text{11A.2.1}$$

Therefore, $(\tilde{a}_1, \tilde{a}_2, \ldots, \tilde{a}_{2S-3}, \tilde{a}_{2S-2})$ is minimum variance for $\bar{d}-d$. Using the definition of $\bar{d}$ in equation 11.2.1A and assumption 5, it is not hard to check that all of the ã's are non-negative and at least one is zero. Thus, the replication weights for a sell of d are as small as possible while remaining non-negative (non-negative replication weights are a requirement to construct the DBAR equilibrium).

Appendix 11B: Derivation of the Self-Hedging Theorem of Section 11.4.5

Theorem: The self-hedging condition $$\sum_{s=1}^{2S-2} d^2(U)\left(y_s + \frac{\theta_s}{p_s}\right) = M \qquad \text{11B.1}$$

is equivalent to $$y_s + \frac{\theta_s}{p_s} = M \quad s = 1, 2, \ldots 2S-2 \qquad \text{11B.2}$$

for all values of U.

Proof: The three cases below divide the range of U into mutually exclusive and collectively exhaustive sets.

Case 1: $U < k_1$. The only replicating claim that pays out over this range is the first replicating instrument, the digital put struck at $k_1$. Therefore, the self-hedging condition 11B.1 combined with the definition of $d^1$ from equation 11.2.2A is equivalent to $$y_1 + \frac{\theta_1}{p_1} = M \qquad \text{11B.3}$$

Thus the theorem holds over this range.

Case 2: $k_{s-1} \leqq U < k_s$: $s=2, 3, \ldots, S-1$. Over this range, the only two claims that payout are the $2s-2^{nd}$ replicating claim and the $2s-1^{st}$ replicating claim. In this case, the self-hedging condition 11B.1 is equivalent to $$d^{2s-2}(U)\left(y_{2s-2}+\frac{\theta_{2s-2}}{p_{2s-2}}\right)+d^{2s-1}(U)\left(y_{2s-1}+\frac{\theta_{2s-1}}{p_{2s-1}}\right)=M \quad \text{11B.4}$$

Now, using the definition of $d^{2s-2}$ from equation 11.2.2D and the definition of $d^{2s-1}$ from equation 11.2.2E, equation 11B.4 becomes $$\left(\frac{k_s-U}{k_s-k_{s-1}}\right)\left(y_{2s-2}+\frac{\theta_{2s-2}}{p_{2s-2}}\right)+\left(\frac{U-k_{s-1}}{k_s-k_{s-1}}\right)\left(y_{2s-1}+\frac{\theta_{2s-1}}{p_{2s-1}}\right)=M \quad \text{11B.5}$$

Next, set U equal to $k_{s-1}$. Then, equation 11B.5 becomes $$\left(\frac{k_s-k_{s-1}}{k_s-k_{s-1}}\right)\left(y_{2s-2}+\frac{\theta_{2s-2}}{p_{2s-2}}\right)+\left(\frac{k_{s-1}-k_{s-1}}{k_s-k_{s-1}}\right)\left(y_{2s-1}+\frac{\theta_{2s-1}}{p_{2s-1}}\right)=M \quad \text{11B.6}$$

Simplifying 11B.6 gives $$y_{2s-2}+\frac{\theta_{2s-2}}{p_{2s-2}}=M \quad \text{11B.7}$$

Note that the left hand side of equation 11B.5 is a linear function of U and note that the right hand side of equation 11B.5 is a constant M. The left hand side and the right hand side are equal for all values of U over the range $k_{s-1} \leqq U < k_s$ by the self-hedging condition. There are at least two values of U (since assumption 1 holds, i.e., $k_s - k_{s-1} \geqq 2\rho$) over this range. Since the linear function is equal for at least two different values of U, it must be the case that the linear function has a slope of zero (In symbols, $\alpha+\beta u_1=\alpha+\beta u_2$ implies that $\beta=0$ if $u_1 \neq u_2$). From equation 11B.5, note that the slope of the linear function of U is $$\left(y_{2s-1}+\frac{\theta_{2s-1}}{p_{2s-1}}\right)-\left(y_{2s-2}+\frac{\theta_{2s-2}}{p_{2s-2}}\right) \quad \text{11B.8}$$

Therefore, the slope equally zero means that $$\left(y_{2s-1}+\frac{\theta_{2s-1}}{p_{2s-1}}\right)-\left(y_{2s-2}+\frac{\theta_{2s-2}}{p_{2s-2}}\right)=0 \quad \text{11B.9}$$

Substituting 11B.7 into 11B.9 yields that $$\left(y_{2s-1}+\frac{\theta_{2s-1}}{p_{2s-1}}\right)-M=0 \quad \text{11B.10}$$

which implies that $$y_{2s-1}+\frac{\theta_{2s-1}}{p_{2s-1}}=M \quad \text{11B.11}$$

Thus the theorem holds over this range

Case 3: $k_{S-1} \leqq U$. The only replicating instrument that pays out over this range is the $2S-2^{nd}$ replicating instrument, the digital call struck at $k_{S-1}$. Therefore, the self-hedging condition 11B.1 combined with the definition of $d^{2S-2}$ from equation 11.2.2H is equivalent to $$y_{2S-2}+\frac{\theta_{2s-2}}{p_{2s-2}}=M \quad \text{11B.12}$$

Thus the theorem holds over this range.

Since all three cases cover the entire range of U, this concludes the proof.

Appendix 11C: Probability Weighted Statistics from Sections 11.5.2 and 11.5.3

This appendix discusses how to compute the probability weighted statistics in tables 11.5.2E and 11.5.3E.

For the digital replicating basis in section 11.5.2, note that the outcome of 59 is in state s=3 as shown in table 11.5.2A. In this case, using equation 11.5.2E $$\begin{aligned} Pr[U=59] &= \frac{p_3\rho}{k_3-k_2} \\ &= \frac{(0.134400500)(0.01)}{60-50} \\ &= 0.000134400500 \end{aligned} \quad \text{11C.1}$$

For the vanilla replicating basis in section 11.5.3, using equation 11.5.3D, the probability is given by $$\begin{aligned} Pr[U=59] &= \frac{(p_4+p_5)\rho}{k_3-k_2} \\ &= \frac{(0.000050029+0.299950032)\times(0.01)}{60-50} \\ &= 0.0003000 \end{aligned} \quad \text{11C.2}$$

Based on these probabilities, summary measures of a statistic C can be computed as follows $$\text{Average} = \sum_u Pr[U=u]C(u) \quad \text{11C.3}$$

$$\text{Standard Deviation} = \sqrt{\sum_u Pr[U=u](C(u)-\text{Average})^2} \quad \text{11C.4}$$

$$\text{Semi-Standard Deviation} = \frac{\sqrt{\sum_{C(u)<\text{Average}} Pr[U=u](C(u)-\text{Average})^2}}{Pr[C(u)<\text{Average}]+\frac{Pr[C(u)=\text{Average}]}{2}} \quad \text{11C.5}$$

$$\text{Skewness} = \frac{\sum_u Pr[U=u](C(u)-\text{Average})^3}{(\text{Standard Deviation})^3} \quad \text{11C.6}$$

These formulas are used to compute the quantities in tables 11.5.2E and 11.5.3E.

Appendix 11D: Notation Used in the Body of Text $a_s$: a scalar representing the replication weight for the sth replication claim for strategy d;

$a_{j,s}$: a scalar representing the replication weight for the derivatives strategy dj for replicating claim s for customer order j, j=1, 2, . . . , J;

$C^R(U)$: a function representing the replication P&L for the auction sponsor based on the underlying U;

$C^T(U)$: a function representing the outcome dependent P&L for the auction sponsor based on the underlying U;

$C^\Theta(U)$: a function representing the opening order P&L for the auction sponsor based on the underlying U;

d and d(U): functions representing the payout on a European style derivatives strategy based on the underlying U;

$d_j$ and $d_j(U)$: functions representing the payout on a European style derivatives strategy for customer order j, j=1, 2, . . . , J;

$d^s$ and $d^s(U)$: functions representing the payout on the sth replicating claim;

$\underline{d}$, $\underline{d}'$ and $\underline{d}''$: scalars representing typically the minimum payout of the derivatives strategy d;

$\overline{d}$, $\overline{d}'$, and $\overline{d}''$: scalars representing typically the maximum payout of the derivatives strategy d;

$\underline{d}_j$ and $\underline{d}_j''$: scalars representing typically the minimum payout of the derivatives strategy $d_j$, j=1, 2, . . . , J;

$\overline{d}_j$ and $\overline{d}_j''$: scalars representing typically the maximum payout of the derivatives strategy $d_j$, j=1, 2, . . . , J E: the expectation operator;

e(U): a function representing the payout on the replicating portfolio;

Exp: the exponential function raising the argument to the power of e;

G: a scalar representing the number of observations for an OLS regression;

I: the indicator function;

int: a function representing the greatest integer less than or equal to the function's argument;

j: a scalar used to index the customer orders in an auction j=1, 2, . . . , J;

J: a scalar representing the total number of customer orders in an auction;

$k_1, k_2, \ldots, k_{S-1}$: scalars representing strikes of the derivatives strategies that customers can trade in an auction;

$k_0$: a scalar representing the lower bound of U;

$k_S$: a scalar representing the upper bound of U;

$m_s$: a scalar representing the total filled premium for vanilla replicating claim s, s=1, 2, . . . , 2S−2;

M: a scalar representing the total cleared premium in an auction;

N: the cumulative distribution function for the standard normal;

$p_s$: a scalar representing the equilibrium price of the sth replicating claim;

Pr: the probability operator;

$r_j$: a scalar representing the requested number of contracts for customer order j, j=1, 2, . . . , J;

s: a scalar used to index across strikes or replication claims. For strikes s=1, 2, . . . , S−1. For digital replicating claims s=1, 2, . . . , S. For vanilla replicating claims s=1, 2, . . . 2S−2. For augmented vanilla replicating claims s=1, 2, . . . , 2S;

S: a scalar representing the number of strikes plus one;

U: a random variable representing the outcome of the underlying;

u: a scalar representing a possible outcome of U;

$u_g$: a scalar representing a possible outcome of U, g=1, 2, . . . , G;

v: a scalar representing a specific strike or a specific replication claim;

w: a scalar representing a specific strike;

$w_j$: a scalar representing the limit price for customer order j, j=1, 2, . . . , J;

$w_j^a$: a scalar representing the adjusted limit price for customer order j, j=1, 2, . . . , J;

$x_j^a$: a scalar representing the equilibrium number of filled contracts for customer order j, j=1, 2, . . . , J;

$x_{g,s}^{OLS}$: a scalar representing an independent variable OLS regression for g=1, 2, . . . , G and s=1, 2, . . . , 2S−2;

$y_s$: a scalar representing the aggregate replicated customer payout for vanilla replicating claim s for s=1, 2, . . . , 2S−2;

$y_g^{OLS}$: a scalar representing an explanatory variable in an OLS regression for g=1, 2, . . . , G $\alpha_s$: a scalar representing the intercept of the payout function d between $k_{s-1}$ and $k_s$ for s=1, 2, . . . , S;

$\beta_s$: a scalar representing the slope of the payout function d between $k_{s-1}$ and $k_s$ for s=1, 2, . . . , S;

$\epsilon_g$: a scalar representing the gth residual in a regression for g=1, 2, . . . , G;

$\theta_s$: a scalar representing the initial invested premium amount or the opening order premium amount for replicating claim s;

$\Theta$: a scalar representing the total amount of opening orders in an auction;

$\mu$: a scalar representing the mean of a normally distributed random variable;

$\pi_j$: a scalar representing the equilibrium price of customer order j, j=1, 2, . . . , J;

$\pi^{cf}$: a scalar representing the equilibrium price of a collared forward;

$\pi^f$: a scalar representing the equilibrium price of a forward;

$\rho$: a scalar representing a measurable unit of the underlying U, which can be set at the level of precision to which the underlying U is reported or rounded by the auction sponsor;

$\sigma$: a scalar representing the standard deviation of a normally distributed random variable.

12. DETAILED DESCRIPTION OF THE DRAWINGS IN FIGS. 1 TO 28

Referring now to the drawings, similar components appearing in different drawings are identified by the same reference numbers.

Figure 2:
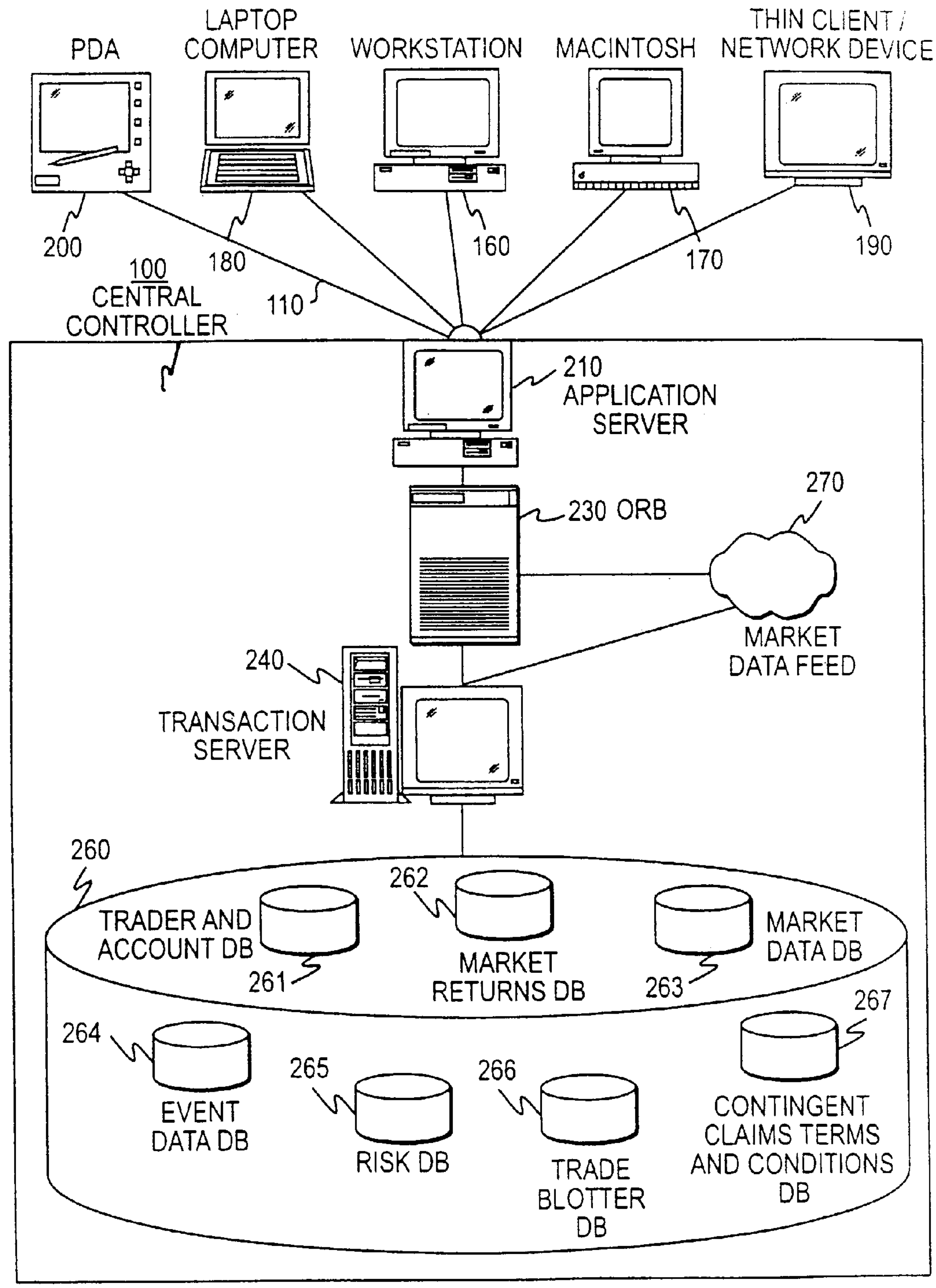
FIG. 2 is a schematic view of a central controller of a preferred embodiment of a DBAR contingent claims exchange network architecture implementing the present invention.

FIGS. 1 and 2 show schematically a preferred embodiment of a network architecture for any of the embodiments of a demand-based market or auction or DBAR contingent claims exchange (including digital options). As depicted in FIG. 1 and FIG. 2, the architecture conforms to a distributed Internet-based architecture using object oriented principles useful in carrying out the methods of the present invention.

In FIG. 1, a central controller 100 has a plurality software and hardware components and is embodied as a mainframe computer or a plurality of workstations. The central controller 100 is preferably located in a facility that has back-up power, disaster-recovery capabilities, and other similar infrastructure, and is connected via telecommunications links 110 with computers and devices 160, 170, 180, 190, and 200 of traders and investors in groups of DBAR contingent claims of the present invention. Signals transmitted using telecommunications links 110, can be encrypted using such algorithms as Blowfish and other forms of public and private key encryption. The telecommunications links 110 can be a dialup connection via a standard modem 120; a dedicated line connection establishing a local area network (LAN) or wide area network (WAN) 130 running, for example, the Ethernet network protocol; a public Internet connection 140; or wireless or cellular connection 150. Any of the computers and devices 160, 170, 180, 190 and 200, depicted in FIG. 1, can be connected using any of the links 120, 130, 140 and 150 as depicted in hub 111. Other telecommunications links, such as radio transmission, are known to those of skill in the art.

As depicted in FIG. 1, to establish telecommunications connections with the central controller 100, a trader or investor can use workstations 160 running, for example, UNIX, Windows NT, Linux, or other operating systems. In preferred embodiments, the computers used by traders or investors include basic input/output capability, can include a hard drive or other mass storage device, a central processor (e.g., an Intel-made Pentium III processor), random-access memory, network interface cards, and telecommunications access. A trader or investor can also use a mobile laptop computer 180, or network computer 190 having, for example, minimal memory and storage capability 190, or personal digital assistant 200 such as a Palm Pilot. Cellular phones or other network devices may also be used to process and display information from and communicate with the central controller 100.

FIG. 2 depicts a preferred embodiment of the central controller 100 comprising a plurality of software and hardware components. Computers comprising the central controller 100 are preferably high-end workstations with resources capable of running business operating systems and applications, such as UNIX, Windows NT, SQL Server, and Transaction Server. In a preferred embodiment, these computers are high-end personal computers with Intel-made (x86 "instruction set") CPUs, at least 128 megabytes of RAM, and several gigabytes of hard drive data storage space. In preferred embodiments, computers depicted in FIG. 2 are equipped with JAVA virtual machines, thereby enabling the processing of JAVA instructions. Other preferred embodiments of the central controller 100 may not require the use of JAVA instruction sets.

In a preferred embodiment of central controller 100 depicted in FIG. 2, a workstation software application server 210, such as the Weblogic Server available from BEA Systems, receives information via telecommunications links 110 from investors' computers and devices 160, 170, 180, 190 and 200. The software application server 210 is responsible for presenting human-readable user interfaces to investors' computers and devices, for processing requests for services from investors' computers and devices, and for routing the requests for services to other hardware and software components in the central controller 100. The user interfaces that can be available on the software application server 210 include hypertext markup language (HTML) pages, JAVA applets and servlets, JAVA or Active Server pages, or other forms of network-based graphical user interfaces known to those of skill in the art. For example, investors or traders connected via an Internet connection for HTML can submit requests to the software application server 210 via the Remote Method Invocation (RMI) and/or the Internet Inter-Orb Protocol (IIOP) running on top of the standard TCP/IP protocol. Other methods are known to those of skill in the art for transmitting investors' requests and instructions and presenting human readable interfaces from the application server 210 to the traders and investors. For example, the software application server 210 may host Active Server Pages and communicate with traders and investors using DCOM.

In a preferred embodiment, the user interfaces deployed by the software application server 210 present login, account management, trading, market data, and other input/output information necessary for the operation of a system for investing in replicated derivatives strategies, financial products and/or groups of DBAR contingent claims according to the present invention. A preferred embodiment uses the HTML and JAVA applet/servlet interface. The HTML pages can be supplemented with embedded applications or "applets" using JAVA based or ActiveX standards or another suitable application, as known to one of skill in the art.

In a preferred embodiment, the software application server 210 relies on network-connected services with other computers within the central controller 100. The computers comprising the central controller 100 preferably reside on the same local area network (e.g., Ethernet LAN) but can be remotely connected over Internet, dedicated, dialup, or other similar connections. In preferred embodiments, network intercommunication among the computers comprising central controller 100 can be implemented using DCOM, CORBA, or TCP/IP or other stack services known to those of skilled in the art.

Representative requests for services from the investors' computers to the software application server 210 include: (1) requests for HTML pages (e.g., navigating and searching a web site); (2) logging onto the system for trading replicated derivatives strategies, replicated financial products, and/or DBAR contingent claims; (3) viewing real-time and historical market data and market news; (4) requesting analytical calculations such as returns, market risk, and credit risk; (5) choosing a derivatives strategy, financial product or group of DBAR contingent claims of interest by navigating HTML pages and activating JAVA applets; (6) making an investment in a derivatives strategy, financial products or one or more defined states of a group of DBAR contingent claims; and (7) monitoring investments in derivatives strategies, financial products and groups of DBAR contingent claims.

In a preferred embodiment depicted in FIG. 2, an Object Request Broker (ORB) 230 can be a workstation computer operating specialized software for receiving, aggregating, and marshalling service requests from the software application server 210. For example, the ORB 230 can operate a software product called Visibroker, available from Inprise, and related software products that provide a number of functions and services according to the Common Object Request Broker Architecture (CORBA) standard. In a preferred embodiment, one function of the ORB 230 is to provide what are commonly known in the object-oriented software industry as directory services, which correlate computer code organized into class modules, known as "objects," with names used to access those objects. When an object is accessed in the form of a request by name, the object is instantiated (i.e., caused to run) by the ORB 230. For example, in a preferred embodiment, computer code organized into a JAVA class module for the purpose of computing returns using a canonical DRF is an object named "DRF_Returns," and the directory services of the ORB 230 would be responsible for invoking this object by this name whenever the application server 210 issues a request that returns be computed. Similarly, in the case of DBAR digital options, computer code organized into a JAVA class module for the purpose of computing investment amounts using a canonical DRF is an object named "OPF_Prices," and the directory services of the ORB 230 would also be responsible for invoking this object by this name whenever the application server 210 issues a request that prices or investment amounts be computed.

In a preferred embodiment, another function of the ORB 230 is to maintain what is commonly known in the object-oriented software industry as an interface repository, which contains a database of object interfaces. The object interfaces contain information regarding which code modules perform which functions. For example, in a preferred embodiment, a part of the interface of the object named "DRF_Returns" is a function which fetches the amount currently invested across the distribution of states for a group of DBAR contingent claims. Similarly, for DBAR digital options, a part of the interface of the object named "OPF_Prices" is a function which fetches the requested payout or returns, the selected outcomes and the limit prices or amounts for each in a group of DBAR digital options.

In a preferred embodiment, as in the other embodiments of the present invention, another function of the ORB 230 is to manage the length of runtime for objects which are instantiated by the ORB 230, and to manage other functions such as whether the objects are shared and how the objects manage memory. For example, in a preferred embodiment, the ORB 230 determines, depending upon the request from the software application server 210, whether an object which processes market data will share such data with other objects, such as objects that allocate returns to investments in defined states.

In a preferred embodiment, as the other embodiments of the present invention, another function of the ORB 230 is to provide the ability for objects to communicate asynchronously by responding to messages or data at varying times and frequencies based upon the activity of other objects. For example, in a preferred embodiment, an object that computes returns for a group of DBAR contingent claims responds asynchronously in real-time to a new investment and recalculates returns automatically without a request by the software application server 210 or any other object. In preferred embodiments, such asynchronous processes are important where computations in real-time are made in response to other activity in the system, such as a trader making a new investment or the fulfillment of the predetermined termination criteria for a group of DBAR contingent claims.

In a preferred embodiment, as the other embodiments of the present invention, another function of the ORB 230 is to provide functions related to what is commonly known in the object-oriented software industry as marshalling. Marshalling in general is the process of obtaining for an object the relevant data it needs to perform its designated function. In preferred embodiments of the present invention, such data includes for example, trader and account information and can itself be manipulated in the form of an object, as is common in the practice of object-oriented programming. Other functions and services may be provided by the ORB 230, such as the functions and services provided by the Visibroker product, according to the standards and practices of the object-oriented software industry or as known to those of skill in the art.

In a preferred embodiment depicted in FIG. 2, which can be applied to the other embodiments of the present invention, transaction server 240 is a computer running specialized software for performing various tasks including: (1) responding to data requests from the ORB 230, e.g., user, account, trade data and market data requests; (2) performing relevant computations concerning groups of DBAR contingent claims, such as intra-trading period and end-of-trading-period returns allocations and credit risk exposures; and (3) updating investor accounts based upon DRF payouts for groups of DBAR contingent claims and applying debits or credits for trader margin and positive outstanding investment balances. The transaction 240 preferably processes all requests from the ORB 230 and, for those requests that require stored data (e.g., investor and account information), queries data storage devices 260. In a preferred embodiment depicted in FIG. 2, a market data feed 270 supplies real-time and historical market data, market news, and corporate action data, for the purpose of ascertaining event outcomes and updating trading period returns. The specialized software running on transaction server 240 preferably incorporates the use of object oriented techniques and principles available with computer languages such as C++ or Java for implementing the above-listed tasks.

As depicted in FIG. 2, in a preferred embodiment the data storage devices 260 can operate relational database software such as Microsoft's SQL Server or Oracle's 8i Enterprise Server. The types of databases within the data storage devices 260 that can be used to support the DBAR contingent claim and exchange preferably comprise: (1) Trader and Account databases 261; (2) Market Returns databases 262; (3) Market Data databases 263; (4) Event Data databases 264; (5) Risk databases 265; (6) Trade Blotter databases 266; and (7) Contingent claims Terms and Conditions databases 267. The kinds of data preferably stored in each database are shown in more detail in FIG. 4. In a preferred embodiment, connectivity between data storage devices 260 and transaction server 240 is accomplished via TCP/IP and standard Database Connectivity Protocols (DBC) such as the JAVA-DBC (JDBC). Other systems and protocols for such connectivity are known to those of skill in the art.

In reference to FIG. 2, application server 210 and ORB 230 may be considered to form an interface processor, while transaction server 240 forms a demand-based transaction processor. Further, the databases hosted on data storage devices 260 may be considered to form a trade status database. Investors, also referred to as traders, communicating via telecommunications links 110 from computers and devices 160, 170, 180, 190, and 200, may be considered to perform a series of demand-based interactions, also referred to as demand-based transactions, with the demand-based transaction processor. A series of demand-based transactions may be used by a trader, for example, to obtain market data, to establish a trade, or to close out a trade.

Figure 3:
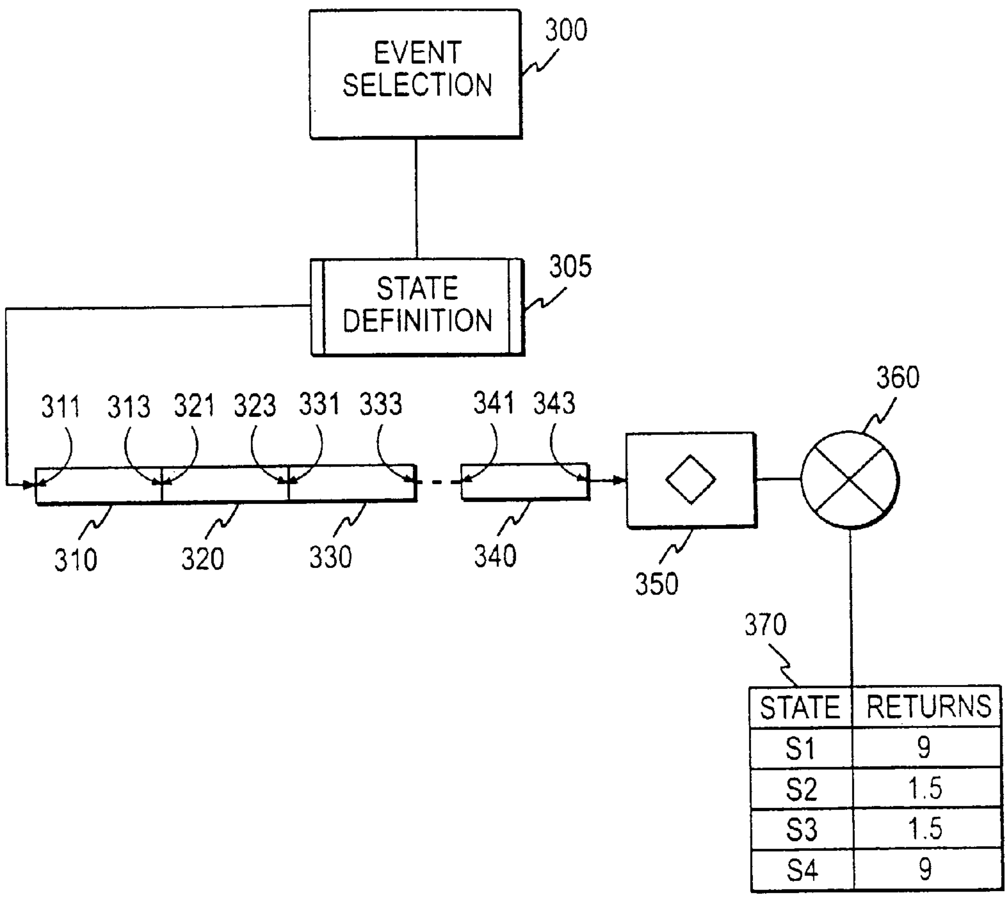
FIG. 3 is a schematic depiction of the trading process on a preferred embodiment of a DBAR contingent claims exchange.

FIG. 3 depicts a preferred embodiment of the implementation of a group of DBAR contingent claims. As depicted in FIG. 3, an exchange first selects an event of economic significance 300. In the preferred embodiment, the exchange then partitions the possible outcomes for the event into mutually exclusive and collectively exhaustive states 305, such that one state among the possible states in the partitioned distribution is guaranteed to occur, and the sum of probabilities of the occurrence of each partitioned state is unity. Trading can then commence with the beginning 311 of the first trading period 310. In the preferred embodiment depicted in FIG. 3, a group of DBAR contingent claims has trading periods 310, 320, 330, and 340, with trading period start date 311, 321, 331, 341 respectively, followed by a predetermined time interval by each trading period's respective trading end dates 313, 323, 333 and 343. The predetermined time interval is preferably of short duration in order to attain continuity. In the preferred embodiment, during each trading period the transaction server 240 running JAVA code implementing the DRF for the group of DBAR contingent claims adjusts returns immediately in response to changes in the amounts invested in each of the defined states. Changes in market conditions during a trading period, such as price and volatility changes, as well as changes in investor risk preferences and liquidity conditions in the underlying market, among other factors, will cause amounts invested in each defined state to change thereby reflecting changes in expectations of traders over the distribution of states defining the group of DBAR contingent claims.

In a preferred embodiment, the adjusted returns calculated during a trading period, i.e., intra-trading period returns, are of informational value only—only the returns which are finalized at the end of each trading period are used to allocate gains and losses for a trader's investments in a group or portfolio of groups of DBAR contingent claims. In a preferred embodiment, at the end of each trading period, for example, at trading end dates 313, 323, 333, and 343, finalized returns are allocated and locked in. The finalized returns are the rates of return to be allocated per unit of amount invested in each defined state should that state occur. In a preferred embodiment, each trading period can therefore have a different set of finalized returns as market conditions change, thereby enabling traders to make investments during later trading periods which hedge investments from earlier trading periods that have since closed.

In another preferred embodiment, not depicted, trading periods overlap so that more than one trading period is open for investment on the same set of predefined states. For example, an earlier trading period can remain open while a subsequent trading period opens and closes. Other permutations of overlapping trading periods are possible and are apparent to one of skill in the art from this specification or practice of the present invention.

The canonical DRF, as previously described, is a preferred embodiment of a DRF which takes investment across the distribution of states and each state, the transaction fee, and the event outcome and allocates a return for each state if it should occur. A canonical DRF of the present invention, as previously described, reallocates all amounts invested in states that did not occur to the state that did occur. Each trader that has made an investment in the state that did occur receives a pro-rata share of the trades from the non-occurring states in addition to the amount he originally invested in the occurring state, less the exchange fee.

In the preferred embodiment depicted in FIG. 3, at the close of the final trading period 343, trading ceases and the outcome for the event underlying the contingent claim is determined at close of observation period 350. In a preferred embodiment, only the outcome of the event underlying the group of contingent claims must be uncertain during the trading periods while returns are being locked in. In other words, the event underlying the contingent claims may actually have occurred before the end of trading so long as the actual outcome remains unknown, for example, due to the time lag in measuring or ascertaining the event's outcome. This could be the case, for instance, with macroeconomic statistics like consumer price inflation.

In the preferred embodiment depicted in FIG. 2, once the outcome is observed at time 350, process 360 operates on the finalized returns from all the trading periods and determines the payouts. In the case of a canonical DRF previously described, the amounts invested in the losing investments finance the payouts to the successful investments, less the exchange fee. In a canonical DRF, successful investments are those made during a trading period in a state which occurred as determined at time 350, and unsuccessful investments are those made in states which did not occur. Examples 3.1.1-3.1.25 above illustrate various preferred embodiments, of a group of DBAR contingent claims using a canonical DRF. In the preferred embodiment depicted in FIG. 3, the results of process 360 are made available to traders by posting the results for all trading periods on display 370. In a preferred embodiment not depicted, trader accounts are subsequently updated to reflect these results.

Figure 4:
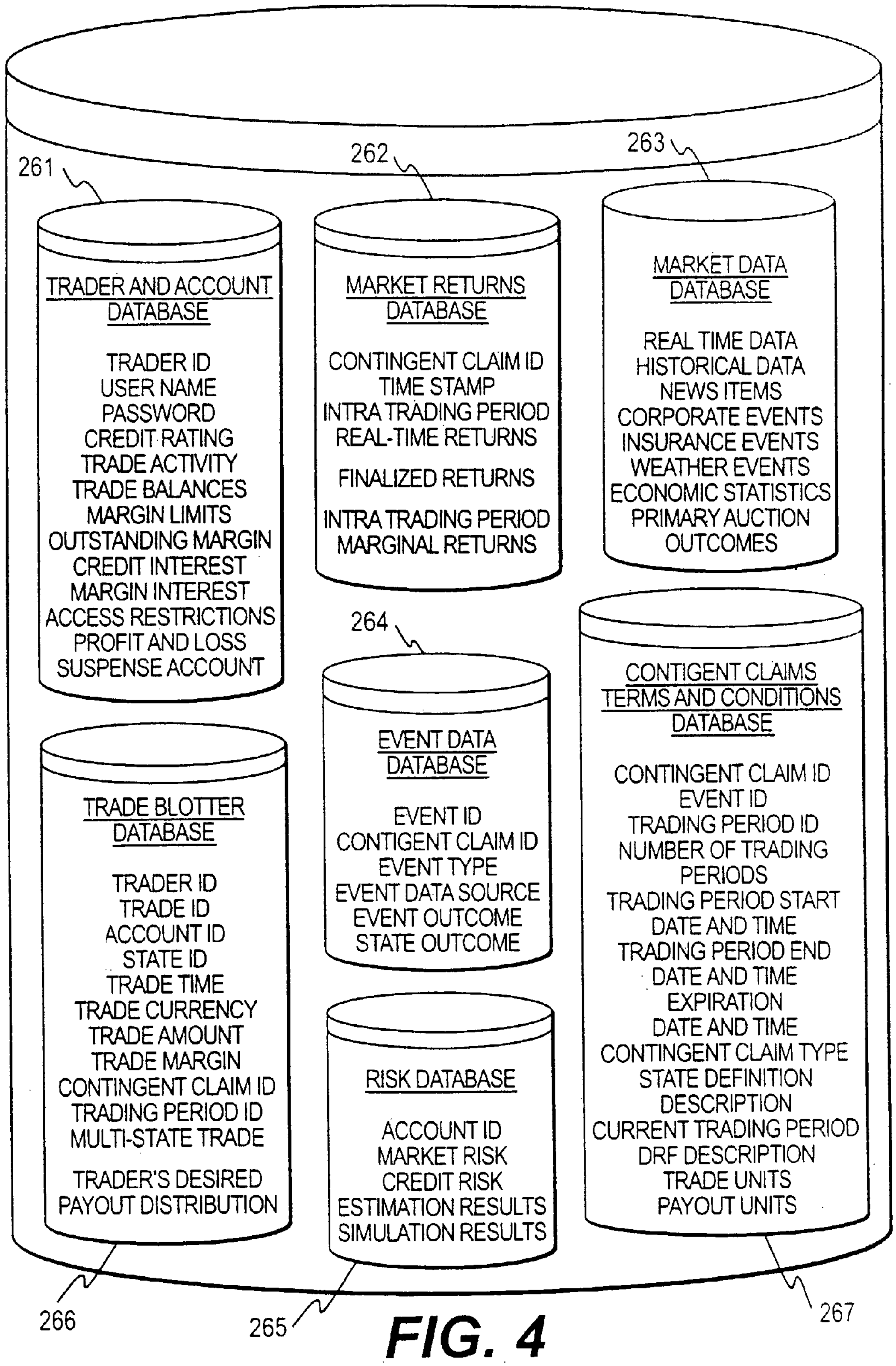
FIG. 4 depicts data storage devices of a preferred embodiment of a DBAR contingent claims exchange.

FIG. 4 provides a more detailed depiction of the data storage devices 260 of a preferred embodiment of a DBAR contingent claims exchange which can be applied to the other embodiments of the present invention. In a preferred embodiment, data storage devices 260, on which relational database software is installed as described above, is a non-volatile hard drive data storage system, which may comprise a single device or medium, or may be distributed across a plurality of physical devices, such as a cluster of workstation computers operating relational database software, as described previously and as known in the art. In a preferred embodiment, the relational database software operating on the data storage devices 260 comprises relational database tables, stored procedures, and other database entities and objects that are commonly contained in relational database software packages. In the preferred embodiment depicted in FIG. 4, databases 261-267 each contain such tables and other relational database entities and objects necessary or desirable to implement an embodiment of the present invention. FIG. 4 identifies the kinds of information that can be stored in such devices. Of course, the kinds of data shown in the drawing are not exhaustive. The storage of other data on the same or additional databases may be useful depending on the nature of the contingent claim being traded. Moreover, in the preferred embodiment depicted in FIG. 4, certain data are shown in FIG. 4 as stored in more than one storage device. In various other preferred embodiments, such data may be stored in only one such device or may be calculated. Other database designs and architectures will be apparent to those of skill in the art from this specification or practice of the present invention.

In the preferred embodiment depicted in FIG. 4, the Trader and Account database 261 stores data related to the identification of a DBAR trader such as name, password, address, trader identification number, etc. Data related to the trader's credit rating can also be stored and updated in response to changes in the trader's credit status. Other information that can be stored in Trader and Account database 261 includes data related to the trader's account, for example, active and inactive investments, the trader's balance, the trader's margin limits, outstanding margin amounts, interest credited on outstanding trade balances and interest paid on outstanding margin balances, any restrictions the trader may have regarding access to his account, and the trader's profit and loss information regarding active and inactive investments. Information related to multi-state investments to be allocated can also be stored in Trader and Account database 261. The data stored in database 261 can be used, for example, to issue account related statements to traders.

In the preferred embodiment depicted in FIG. 4, the Market Returns database 262 contains information related to returns available at various times for active and inactive groups of DBAR contingent claims. In a preferred embodiment, each group of contingent claims in database 262 is identified using a unique identifier previously assigned to that group. Returns for each defined state for each group of contingent claims reflected are stored in database 262. Returns calculated and available for display to traders during a given trading period are stored in database 262 for each state and for each claim. At the end of each trading period, finalized returns are computed and stored in Market Returns database 262. Marginal returns, as previously described, can also be stored in database 262. The data in Market Returns database 262 may also include information relevant to a trader's decisions such as current and past intra-period returns as well as information used to determine payouts by a DRF or investment amounts by an OPF for a group of DBAR contingent claims.

In the preferred embodiment depicted in FIG. 4, Market Data database, 263 stores market data from market data feed 270. In a preferred embodiment, the data in Market Data database 263 include data relevant for the types of contingent claims that can be traded on a particular exchange. In a preferred embodiment, real-time market data include data such as real-time prices, yields, index levels, and other similar information. In a preferred embodiment, such real-time data from Market Data database 263 are presented to traders to aid in making investment decisions can be used by the DRF to allocate returns and by the OPF to determine investment amounts for groups of contingent claims that depend on such information. Historical data relating to relevant groups of DBAR contingent claims can also be stored in Market Data database 263. In preferred embodiments, news items related to underlying groups of DBAR contingent claims (e.g., comments by the Federal Reserve) are also stored in Market Data database 263 and can be retrieved by traders.

In the preferred embodiment depicted in FIG. 4, Event Data database 264 stores data related to events underlying the groups of DBAR contingent claims that can be traded on an exchange. In a preferred embodiment, each event is identified by a previously assigned event identification number. Each event has one or more associated group of DBAR contingent claims based on that event and is so identified with a previously assigned contingent claim group identification number. The type of event can also be stored in Event database 264, for example, whether the event is based on a closing price of a security, a corporate earnings announcement, a previously calculated but yet to be released economic statistic, etc. The source of data used to determine the outcome of the event can also be stored in Event database 264. After an event outcome becomes known, it can also be stored in Event database 264 along with the defined state of the respective group of contingent claims corresponding to that outcome.

In the preferred embodiment depicted in FIG. 4, Risk database 265 stores the data and results and analyses related to the estimation and calculation of market risk and credit risk. In a preferred embodiment, Risk database 265 correlates the derived results with an account identification number. The market and credit risk quantities that can be stored are those related to the calculation of CAR and CCAR, such as the standard deviation of unit returns for each state, the standard deviation of dollar returns for each state, the standard deviation of dollar returns for a given contingent claim, and portfolio CAR. Intermediate estimation and simulation data such as correlation matrices used in VAR-based CAR and CCAR calculations and scenarios used in MCS-based calculations can also be stored in Risk database 265.

In the preferred embodiment depicted in FIG. 4, Trade Blotter database 266 contains data related to the investments, both active and inactive, made by traders for all the groups of DBAR contingent claims (as well as derivatives strategies, financial products) that can be traded on the particular exchange. Such data may include previously assigned trader identification numbers previously assigned investment identification numbers, previously assigned account identification numbers, previously assigned contingent claim identification numbers, state identification numbers previously assigned corresponding to each defined state, the time of each investment, the units of value used to make each investments (e.g., dollars), the investment amounts, the desired or requested payouts or returns, the limits on investment amounts (for DBAR digital options), how much margin is used to make the investments, and previously assigned trading period identification numbers, as well as previously assigned derivatives strategy numbers and/or financial products (not shown). In addition, data related to whether an investment is a multi-state investment can also be stored. The payout distribution that a trader desires to replicate and that the exchange will implement using a multi-state investment allocation, as described above, can also be stored in Trade Blotter database 266.

In the preferred embodiment depicted in FIG. 4, Contingent claims Terms and Conditions database 267 stores data related to the definition and structure of each group of DBAR contingent claims. In a preferred embodiment, such data are called "terms and conditions" to indicate that they relate to the contractual terms and conditions under which traders agree to be bound, and roughly correspond to material found in prospectuses in traditional markets. In a preferred embodiment, as well as other embodiments of the present invention, the terms and conditions provide the fundamental information regarding the nature of the contingent claim to be traded, e.g., the number of trading periods, the trading period(s) start and end times, the type of event underlying the contingent claim, how the DRF finances successful investments from unsuccessful investments, how the OPF determines order prices or investment amounts as a function of the requested payout, selection of outcomes and limits for each order for a DBAR auction or market, the time at which the event is observed for determining the outcome, other predetermined termination criteria, the partition of states in which investments can be made, and the investment and payout value units (e.g., dollars, numbers of shares, ounces of gold, etc.). In a preferred embodiment, contingent claim and event identification numbers are assigned and stored in Contingent claims Terms and Conditions database 267 so that they may be readily referred to in other tables of the data storage devices.

Figure 5:
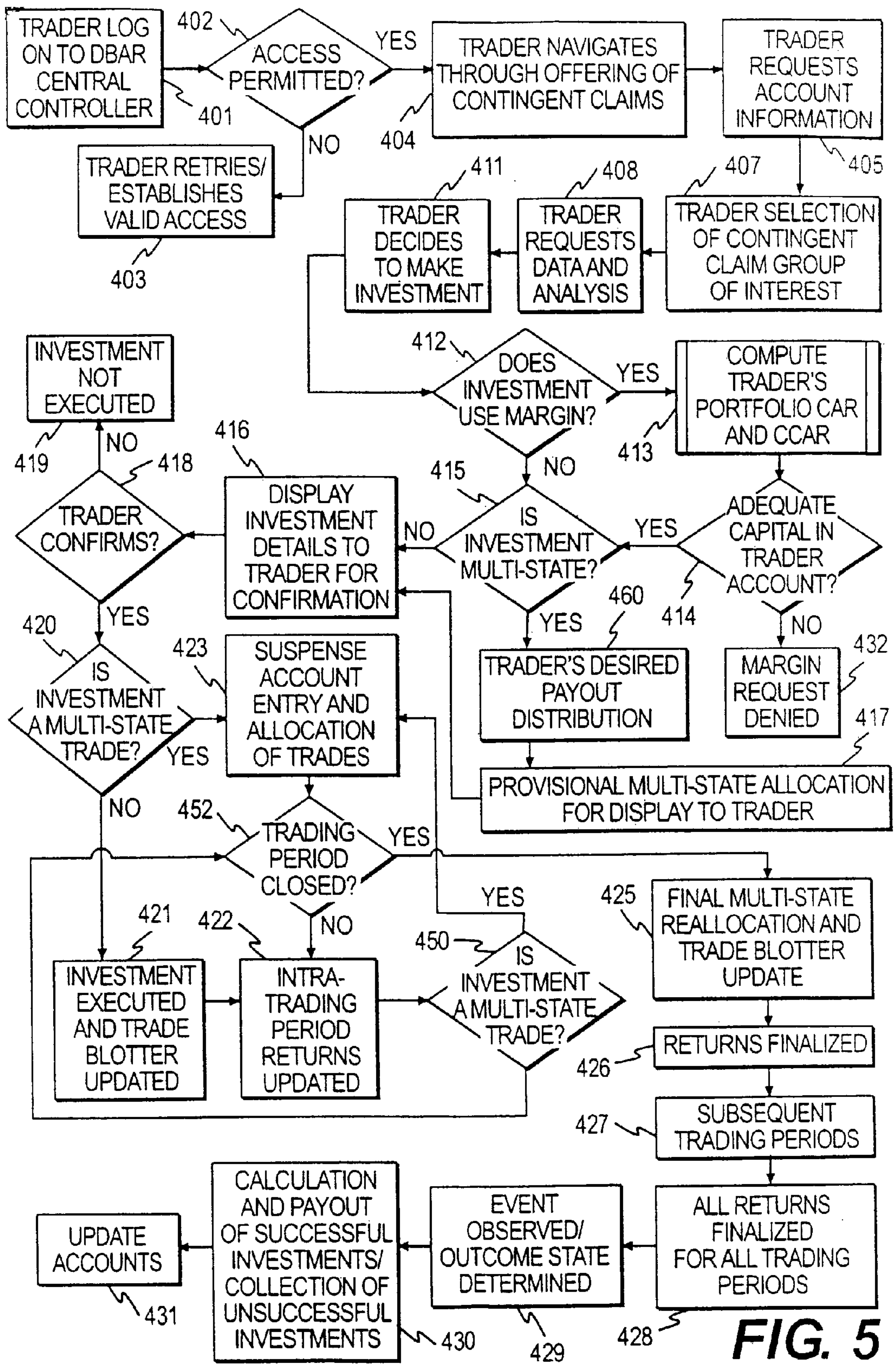
FIG. 5 is a flow diagram illustrating the processes of a preferred embodiment of DBAR contingent claims exchange in executing a DBAR range derivatives investment.

FIG. 5 shows a flow diagram depicting illustrative processes used and illustrative decisions made by a trader using a preferred embodiment of the present invention. For purposes of illustration in FIG. 5, it is assumed that the trader is making an investment in a DBAR range derivative (RD) examples of which are disclosed above. In particular, it is assumed for the purposes of illustration that the DBAR RD investment being made is in a contingent claim based upon the closing price of IBM common stock on Aug. 3, 1999 (as indicated in the display 501 of FIG. 6).

In process 401, depicted in FIG. 5, the trader requests access to the DBAR contingent claim exchange. As previously described in a preferred embodiment, the software application server 210 (depicted in FIG. 2) processes this request and routes it to the ORB 230, which instantiates an object responsible for the authentication of traders on the exchange on transaction server 240. The authentication object on transaction server 240, for example, queries the Trader and Account database 261 (depicted in FIG. 4) for the trader's username, password, and other identifying information supplied. The authentication object responds by either allowing or denying access as indicated in process 402 depicted in FIG. 5. If authentication fails in this illustration, process 403 prompts the trader to retry a logon or establish valid credentials for logging onto the system. If the trader has been granted access, the software application server 210 (depicted in FIG. 2) will display to the trader many user interfaces that may be of interest. For example, in a preferred embodiment, the trader can navigate through a sample of groups of DBAR contingent claims currently being traded, as represented in process 404. The trader may also check current market conditions by requesting those interfaces in process 404 that contain current market data as obtained from market data feed 270 (depicted in FIG. 2) and stored in Market Data database 263 (as depicted in FIG. 4). Process 405 of FIG. 5 represents the trader requesting the application server 210 for relevant information regarding the trader's account, such as the trader's current portfolio of trades, trade amounts, current amount of margin outstanding, and account balances. In a preferred embodiment, this information is obtained by objects running on transaction server 240 (FIG. 2) that query Trader and Account database 261 and Trade Blotter database 266 (FIG. 4).

As depicted in FIG. 5, process 407 represents the selection of a group of DBAR contingent claims by a trader for the purpose of making an investment. The application server 210 (depicted in FIG. 2) can present user interfaces to the trader such as the interface shown in FIG. 6 as is known in the art. Process 408 represents the trader requesting data and analysis which may include calculations as to the effect the trader's proposed investment would have on the current returns. The calculations can be made using the implied "bid" and "offer" demand response equations described above. The processes that perform these data requests and manipulation of such data are, in a preferred embodiment, objects running on transaction server 240 (as depicted in FIG. 2). These objects, for example, obtain data from database 262 (FIG. 4) by issuing a query that requests investment amounts across the distribution of states for a given trading period for a given group of contingent claims. With the investment amount data, other objects running on transaction server 240 (FIG. 2) can perform marginal returns calculations using the DRF of the group of contingent claims as described above. Such processes are objects managed by the ORB 230 (as depicted in FIG. 2).

Returning to the illustration depicted in FIG. 5, process 411 represents a trader's decision to make an investment for a given amount in one or more defined states of the group of DBAR contingent claims of interest. In a preferred embodiment, the trader's request to make an investment identifies the particular group of claims, the state or states in which investments are to be made, the amount to be invested in the state or states, and the amount of margin to be used, if any, for the investments.

Process 412 responds to any requests to make an investment on margin. The use of margin presents the risk that the exchange may not be able to collect the entire amount of a losing investment. Therefore, in preferred embodiments, an analysis is performed to determine the amount of risk to which a current trader is exposed in relation to the amount of margin loans the trader currently has outstanding. In process 413 such an analysis is carried out in response to a margin request by the trader.

The proposed trade or trades under consideration may have the effect of hedging or reducing the total amount of risk associated with the trader's active portfolio of investments in replicated derivatives strategies, financial products, and groups of DBAR contingent claims. Accordingly, in a preferred embodiment, the proposed trades and margin amounts should be included in a CAR analysis of the trader's portfolio.

In a preferred embodiment, the CAR analysis performed by process 413, depicted in FIG. 5, can be conducted according to the VAR, MCS, or HS methodologies previously discussed, using data stored in Risk database 265 (FIG. 2), such as correlation of state returns, correlation of underlying events, etc. In a preferred embodiment, the results of the CAR calculation are also stored in Risk database 265. As depicted in FIG. 5, process 414 determines whether the trader has sufficient equity capital in his account by comparing the computed CAR value and the trader's equity in accordance with the exchange's margin rules. In preferred embodiments, the exchange requires that all traders maintain a level of equity capital equal to some portion or multiple of the CAR value for their portfolios. For example, assuming CAR is computed with a 95% statistical confidence as described above, the exchange may require that traders have 10 times CAR as equity in their accounts. Such a requirement would mean that traders would suffer drawdowns to equity of 10% approximately 5% of the time, which might be regarded as a reasonable tradeoff between the benefits of extending margin to traders to increase liquidity and the risks and costs associated with trader default. In addition, in preferred embodiments, the exchange can also perform CCAR calculations to determine the amount of credit risk in the group of DBAR contingent claims due to each trader. In a preferred embodiment, if a trader does not have adequate equity in his account or the amount of credit risk posed by the trader is too great, the request for margin is denied, as depicted in process 432 (FIG. 5).

As further depicted in FIG. 5, if the trader has requested no margin or the trader has passed the margin tests applied in process 414, process 415 determines whether the investment is one to be made over multiple states simultaneously in order to replicate a trader's desired payout distribution over such states. If the investment is multi-state, process 460 requests trader to enter a desired payout distribution. Such communication will comprise, for example, a list of constituent states and desired payouts in the event that each constituent state occurs. For example, for a four-state group of DBAR contingent claims, the trader might submit the four dimensional vector (10, 0, 5, 2) indicating that the trader would like to replicate a payout of 10 value units (e.g., dollars) should state 1 occur, no payout should state 2 occur, 5 units should state 0.3 occur, and 2 units should state 4 occur. In a preferred embodiment, this information is stored in Trade Blotter database 266 (FIG. 4) where it will be available for the purposes of determining the investment amounts to be allocated among the constituent states for the purposed of replicating the desired payouts. As depicted in FIG. 5, if the investment is a multi-state investment, process 417 makes a provisional allocation of the proposed investment amount to each of the constituent states.

As further depicted in FIG. 5, the investment details and information (e.g., contingent claim, investment amount, selected state, amount of margin, provisional allocation, etc.) are then displayed to the trader for confirmation by process 416. Process 418 represents, the trader's decision whether to make the investment as displayed. If the trader decides against making the investment, it is not executed as represented by process 419. If the trader decides to make the investment and process 420 determines that it is not a multi-state investment, the investment is executed, and the trader's investment amount is recorded in the relevant defined state of the group of DBAR contingent claims according to the investment details previously accepted. In a preferred embodiment, the Trade Blotter database 266 (FIG. 4) is then updated by process 421 with the new investment information such as the trader ID, trade ID, account identification, the state or states in which investments were made, the investment time, the amount invested, the contingent claim identification, etc.

In the illustration depicted in FIG. 5, if the trader decides to make the investment, and process 420 determines that it is a multi-state investment, process 423 allocates the invested amount to the constituent states comprising the multi-state investment in amounts that generate the trader's desired payout distribution previously communicated to the exchange in process 460 and stored in Trader Blotter database 266 (FIG. 4). For example, in a preferred embodiment, if the desired payouts are identical payouts no matter which state occurs among the constituent states, process 423 will update a suspense account entry and allocate the multi-state trade in proportion to the amounts previously invested in the constituent states. Given the payout distribution previously stored, the total amount to be invested, and the constituent states in which the "new" investment is to be made, then the amount to be invested in each constituent state can be calculated using the matrix formula provided in Example 3.1.21, for example.

Since these calculations depend on the existing distributions of amounts invested both during and at the end Of trading, in a preferred embodiment reallocations are performed whenever the distribution of amounts invested (and hence returns) change.

As further depicted in FIG. 5, in response to a new investment, Process 422 updates the returns for each state to reflect the new distribution of amounts invested across the defined states for the relevant group of DBAR contingent claims. In particular, process 422 receives the new trade information from Trade Blotter database 266 as updated by process 421, if the investment is not multi-state, or from Trader and Account database 261 as updated by suspense account process 423, if the investment is a multi-state investment. Process 422 involves the ORB 230 (FIG. 2) instantiating an object on transaction server 240 for calculating returns in response to new trades. In this illustration, the object queries the new trade data from the Trade Blotter database 266 or the suspense account in Trader and Account database 261 (FIG. 4), computes the new returns using the DRF for the group of contingent claims, and updates the intra-trading period returns stored in Market Returns database 262.

As depicted in FIG. 5, if the investment is a multi-state investment as determined by process 450, the exchange continues to update the suspense account to reflects the trader's desired payout distribution in response to subsequent investments entering the exchange. Any updated intra-trading period returns obtained from process 422 and stored in Market Returns database 262 are used by process 423 to perform a reallocation of multi-state investments to reflect the updated returns. If the trading period has not closed, as determined by process 452, the reallocated amounts obtained from the process 423 are used, along with information then simultaneously stored in Trade Blotter database 266 (FIG. 4), to perform further intra-trading period update of returns, per process 422 shown in FIG. 5. However, if the trading period has closed, as determined in this illustration by process 452, then the multi-state reallocation is performed by process 425 so that the returns for the trading period can be finalized per process 426.

In a preferred embodiment, the closing of the trading period is an important point since at that point the DRF object running on Transaction server 240 (FIG. 2) calculates the finalized returns and then updates Market Returns database 262 with those finalized returns, as represented by process 426 depicted in FIG. 5. The finalized returns are those which are used to compute payouts once the outcome of the event and, therefore, the state which occurred are known and all other predetermined termination criteria are fulfilled. Even though a multi-state reallocation process 425 is shown in FIG. 5 between process 452 and process 426, multi-state reallocation process 425 is not carried out if the investment is not a multi-state investment.

Continuing with the illustration depicted in FIG. 5 process 427 represents the possible existence of subsequent trading periods for the same event on which the given group of DBAR contingent claims is based. If such periods exist, traders may make investments during them, and each subsequent trading period would have its own distinct set of finalized returns. For example, the trader in a group of contingent claims may place a hedging investment in one or more of the subsequent trading periods in response to changes in returns across the trading periods' in accordance with the method discussed in Example 3.1.19 above. The ability to place hedging trades in successive trading periods, each period having its own set of finalized returns, allows the trader to lock-in or realize profits and losses in virtually continuous time as returns change across the trading periods. In a preferred embodiment, the plurality of steps represented by process 427 are performed as previously described for the earlier portions of FIG. 5.

As further depicted in FIG. 5, process 428 marks the end of all the trading periods for a group of contingent claims. In a preferred embodiment, at the end of the last trading period, the Market Returns database 262 (FIG. 4) contains a set of finalized returns for each trading period of the group of contingent claims, and Trade Blotter database 266 contains data on every investment made by every trader on the illustrative group of DBAR contingent claims.

In FIG. 5, process 429 represents the observation period during which the outcome of the event underlying the contingent claim is observed, the occurring state of the DBAR contingent claim determined and any other predetermined termination criteria are fulfilled. In a preferred embodiment, the event outcome is determined by query of the Market Data database 263 (FIG. 4), which has been kept current by Market Data Feed 270. For example, for a group of contingent claims on the event of the closing price of IBM on Aug. 3, 1999, the Market Data database 263 will contain the closing price, 119 ⅜, as obtained from the specified event data source in Event Data database 264. The event data source might be Bloomberg, in which case an object residing on transaction server 240 previously instantiated by ORB 230 will have updated the Market Returns database 262 with the closing price from Bloomberg. Another similarly instantiated object on transaction server 240 will query the Market Returns database 262 for the event outcome (119 ⅜), will query the Contingent claims Terms and Conditions database 267 for the purpose of determining the state identification corresponding to the event outcome (e.g., Contingent claim #1458, state #8) and update the event and state outcomes into the Event Data database 264.

As further depicted in FIG. 5, process 430 shows an object instantiated on transaction server 240 by ORB 230 performing payout calculations in accordance with the DRF and other terms and conditions as contained in Contingent claims Terms and Conditions database 267 for the given group of contingent claims. In a preferred embodiment, the object is responsible for calculating amounts to be paid to successful investments and amounts to be collected from unsuccessful investments, i.e., investments in the occurring and non-occurring states, respectively.

As further depicted in FIG. 5 process 431 shows trader account data stored in Trader and Account database 261 (FIG. 4) being updated by the object which determines the payouts in process 430. Additionally, in process 431 in this illustration and preferred embodiments, outstanding credit and debit interest corresponding to positive and margin balances are applied to the relevant accounts in Trader and Account database 261.

Figure 6:
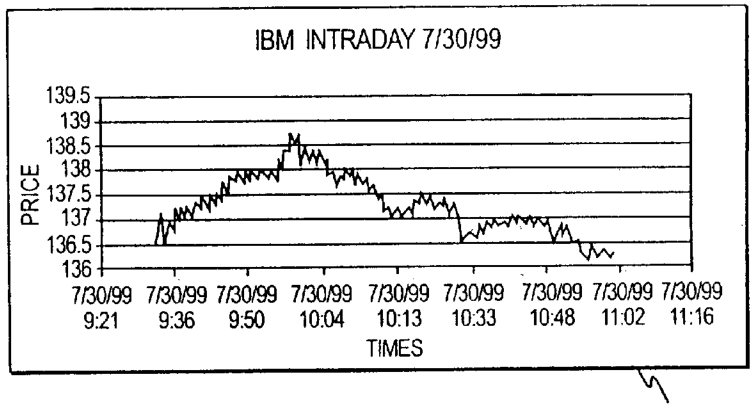
FIG. 6 is an illustrative HTML interface page of a preferred embodiment of a DBAR contingent claims exchange.

FIG. 6 depicts as preferred embodiment of a sample HTML page used by traders in an exchange for groups of DBAR contingent claims which illustrates sample display 500 with associated input/output devices, such as display buttons 504-507 and can be used with other embodiments of the present invention. As depicted in FIG. 6, descriptive data 501 illustrate the basic investment and market information relevant to an investment. In the investment illustrated in FIG. 6, the event is the closing price of IBM common stock at 4:00 p.m. on Aug. 3, 1999. As depicted in FIG. 6, the sample HTML page displays amount invested in each defined state, and returns available from Market Returns database 262 depicted in FIG. 4. In this illustration and in preferred embodiments, returns are calculated on transaction server 240 (FIG. 2) using, for example, a canonical DRF. As also depicted in FIG.

Figure 7:
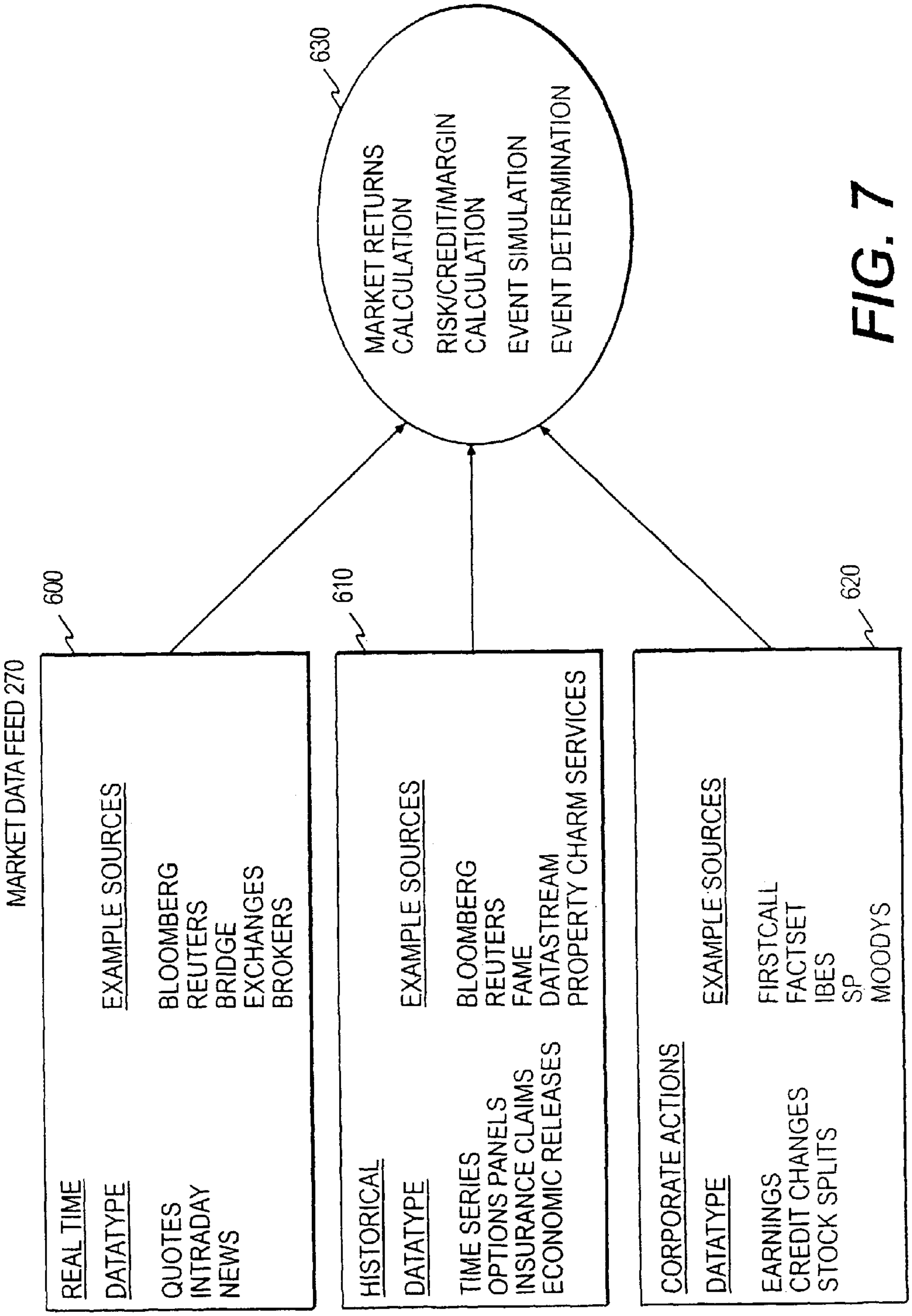
FIG. 7 is a schematic view of market data flow to a preferred embodiment of a DBAR contingent claims exchange.

6, real-time market data is displayed in an intraday "tick chart", represented by display 503, using data obtained from Market Data Feed 270, as depicted in FIG. 7, and processed by transaction server 240, depicted in FIG. 2. Market data may also be stored contemporaneously in Market Data database 263.

In the preferred embodiment depicted in FIG. 6, traders may make an investment by selecting Trade button 504. Historical returns and time series data, from Market Data database 263 may be viewed by selecting Display button 505. Analytical tools for calculating opening or indicative returns or simulating market events are available by request from Software Application Server 210 via ORB 230 and Transaction Server 240 (depicted in FIG. 2) by selecting Analyze button 506 in FIG. 6. As returns change throughout the trading period, a trader may want to display how these returns have changed. As depicted in FIG. 6, these intraday or intra-period returns are available from Market Returns database 262 by selecting Intraday Returns button 507. In addition, marginal intra-period returns, as discussed previously, can be displayed using the same data in Market Returns database 262 (FIG. 2). In a preferred embodiment, it is also possible for each trader to view finalized returns from Market Returns database 262.

In preferred embodiments that are not depicted, display 500 also includes information identifying the group of contingent claims (such as the claim type and event) available from the Contingent claims Terms and Conditions database 267 or current returns available from Market Returns database 262 (FIG. 2). In other preferred embodiments (e.g., any embodiments of the present invention), display 500 includes means for requesting other services which may be of interest to the trader, such as the calculation of marginal returns, for example by selecting Intraday Returns button 507, or the viewing of historical data, for example by selecting Historical Data button 505.

FIG. 7 depicts a preferred embodiment of the Market Data Feed 270 of FIG. 2 in greater detail. In a preferred embodiment depicted in FIG. 7, which can be applied to other embodiments of the present invention, real-time data feed 600 comprises quotes of prices, yields, intraday tick graphs, and relevant market news and example sources. Historical data feed 610, which is used to supply market data database 263 with historical data, illustrates example sources for market time series data, derived returns calculations from options pricing data, and insurance claim data. Corporate action data feed 620 depicted in FIG. 7 illustrates the types of discrete corporate-related data (e.g., earnings announcements, credit downgrades) and their example sources which can form the basis for trading in groups of DBAR contingent claims of the present invention. In preferred embodiments, functions listed in process 630 are implemented on transaction server 240 (FIG. 2) which takes information from data feeds 600, 610, and 620 for the purposes of allocating returns, simulating outcomes, calculating risk, and determining event outcomes (as well as for the purpose of determining investment amounts).

Figure 8:
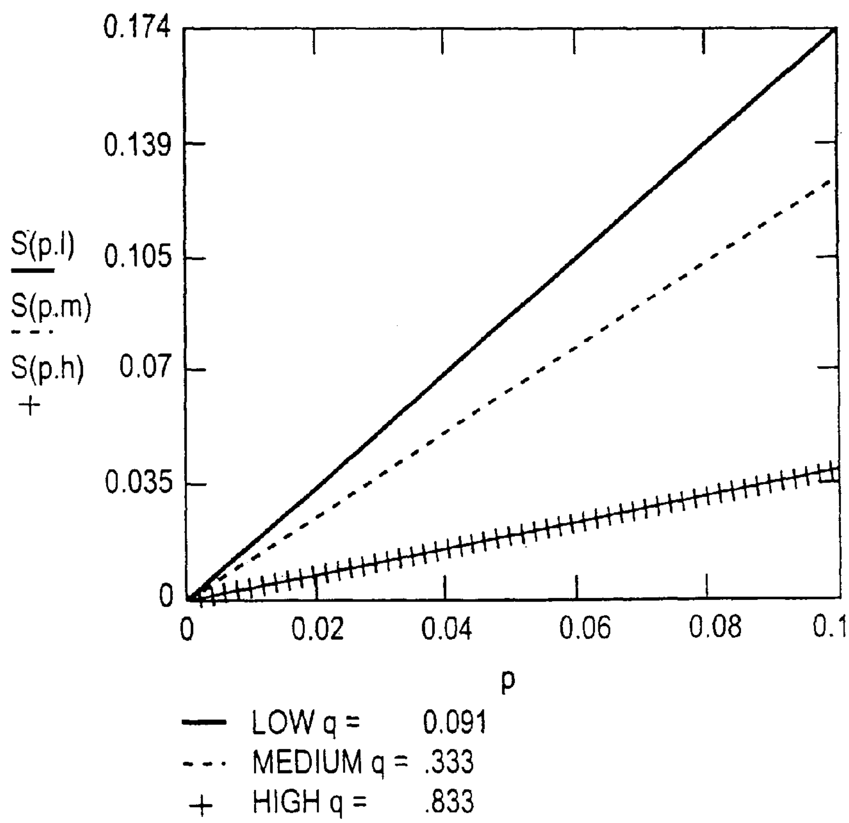
FIG. 8 is an illustrative graph of the implied liquidity effects for a group of DBAR contingent claims.

FIG. 8 depicts a preferred embodiment of an illustrative graph of implied liquidity effects of investments in a group of DBAR contingent claims. As discussed above, in preferred embodiments of the present invention, liquidity variations within a group of DBAR contingent claim impose few if any costs on traders since only the finalized or closing returns for a trading period matter to a trader's return. This contrasts with traditional financial markets, in which local liquidity variations may result in execution of trades at prices that do not fairly represent fair fundamental value, and may therefore impose permanent costs on traders.

Liquidity effects from investments in groups of DBAR contingent claims, as illustrated in FIG. 8, include those that occur when an investment materially and permanently affects the distribution of returns across the states. Returns would be materially and perhaps permanently affected by a trader's investment if, for example, very close to the trading period end time, a trader invested an amount in a state that represented a substantial percentage of aggregate amount previously invested in that state. The curves depicted FIG. 8 show in preferred embodiments the maximum effect a trader's investment can have on the distribution of returns to the various states in the group of DBAR contingent claims.

As depicted in FIG. 8, the horizontal axis, p, is the amount of the trader's investment expressed as a percentage of the total amount previously invested in the state (the trade could be a multi-state investment, but a single state is assumed in this illustration). The range of values on the horizontal axis depicted in FIG. 8 has a minimum of 0 (no amount invested) to 10% of the total amount invested in a particular state. For example, assuming the total amount invested in a given state is $100 million, the horizontal axis of FIG. 8 ranges from a new investment amount of 0 to $10 million.

The vertical axis of FIG. 8 represents the ratio of the implied bid-offer spread to the implied probability of the state in which a new investment is to be made. In a preferred embodiment, the implied bid-offer spread is computed as the difference between the implied "offer" demand response, $q_i^O(\Delta T_i)$, and the implied "bid" demand response, $q_i^B(\Delta T_i)$, as defined above. In other words, values along the vertical axis depicted in FIG. 8 are defined by the following ratio:

$$\frac{q_i^O(\Delta T_i) - q_i^B(\Delta T_i)}{q_i}$$

As displayed in FIG. 8, this ratio is computed using three different levels of $q_i$, and the three corresponding lines for each level are drawn over the range of values of p: the ratio is computed assuming a low implied $q_i$ ($q_i$=0.091, denoted by the line marked S(p,l)), a middle-valued $q_i$ ($q_i$=0.333, denoted by the line marked S(p,m)), and a high value for $q_i$ ($q_i$=0.833 denoted by the line marked S(p,h)), as shown.

If a trader makes an investment in a group of DBAR contingent claims of the present invention and there is not enough time remaining in the trading period for returns to adjust to a fair value, then FIG. 8 provides a graphical depiction, in terms of the percentage of the implied state probability, of the maximum 'effect a trader's own investment can have on the distribution of implied state probabilities. The three separate curves drawn correspond to a high demand and high implied probability (S(p,h)), medium demand and medium implied probability (S(p,m)), and low demand and low implied probability (S(p,l)). As used in this context, the term "demand" means the amount previously invested in the particular state.

The graph depicted in FIG. 8 illustrates that the degree to which the amount of a trader's investment affects the existing distribution of implied probabilities (and hence returns) varies with the amount of demand for the existing state as well as the amount of the trader's investment. If the distribution of implied probabilities is greatly affected, this corresponds to a larger implied bid-offer spread, as graphed on the vertical axis of the graph of FIG. 8. For example, for any given investment amount p, expressed as a percentage of the existing demand for a particular state, the effect of the new investment amount is largest when existing state demand is smallest (line S(p,l), corresponding to a low demand/low implied probability state). By contrast, the effect of the amount of the new investment is smallest when the existing state demand is greatest (S(p,h), corresponding to a high demand/high implied probability state). FIG. 8 also confirms that, in preferred embodiments, for all levels of existing state demand, the effect of the amount invested on the existing distribution of implied probabilities increases as the amount to be invested increases.

FIG. 8 also illustrates two liquidity-related aspects of groups of DBAR contingent claims of the present invention. First, in contrast to the traditional markets, in preferred embodiments of the present invention the effect of a trader's investment on the existing market can be mathematically determined and calculated and displayed to all traders. Second, as indicated by FIG. 8, the magnitude of such effects are quite reasonable. For example, in preferred embodiments as depicted by FIG. 8, over a wide range of investment amounts ranging up to several percent of the existing demand for a given state, the effects on the market of such investments amounts are relatively small. If the market has time to adjust after such investments are added to demand for a state, the effects on the market will be only transitory and there may be no effect on the implied distribution of probabilities owing to the trader's investment. FIG. 8 illustrates a "worst case" scenario by implicitly assuming that the market does not adjust after the investment is added to the demand for the state.

FIGS. 9*a* to 9*c* illustrate, for a preferred embodiment of a group of DBAR contingent claims, the trader and credit relationships and how credit risk can be quantified, for example in process 413 of FIG. 5. FIG. 9*a* depicts a counterparty relationship for a traditional swap transaction, in which two counterparties have previously entered into a 10-year swap which pays a semi-annual fixed swap rate of 7.50%. The receiving counterparty 701 of the swap transaction receives the fixed rate and pays a floating rate, while the paying counterparty 702 pays the fixed rate and receives the floating rate. Assuming a $100 million swap trade and a current market fixed swap rate of 7.40%, based upon well-known swap valuation principles implemented in software packages such as are available from Sungard Data Systems, the receiving counterparty 701 would receive a profit of $700,000 while the paying swap counterparty 702 would have a loss of $700,000. The receiving swap counterparty 701 therefore has a credit risk exposure to the paying swap counterparty 702 as a function of $700,000, because the arrangement depends on the paying swap party 702 meeting its obligation.

FIG. 9*b* depicts illustrative trader relationships in which a preferred embodiment of a group of the DBAR contingent claims and exchange effects, as a practical matter, relationships among all the traders. As depicted in FIG. 9*b*, traders C1, C2, C3, C4, and C5 each have invested in one or more states of a group of DBAR contingent claims, with defined states S1 to S8 respectively corresponding to ranges of possible outcomes for the 10 year swap rate, one year forward. In this illustration, each of the traders has a credit risk exposure to all the others in relation to the amount of each trader's investment, how much of each investment is on margin, the probability of success of each investment at any point in time, the credit quality of each trader, and the correlation between and among the credit ratings of the traders. This information is readily available in preferred embodiments of DBAR contingent claim exchanges, for example in Trader and Account database 261 depicted in FIG. 2, and can be displayed to traders in a form similar to tabulation 720 shown in FIG. 9*c*, where the amount of investment margin in each state is displayed for each trader, juxtaposed with that trader's credit rating. For example, as depicted in FIG. 9*c*, trader C1 who has a AAA credit rating has invested $50,000 on margin in state 7 and $100,000 on margin in state 8. In a preferred embodiment, the amount of credit risk borne by each trader can be ascertained, for example using data from Market Data database 263 on the probability of changes in credit ratings (including probability of default), amounts recoverable in case of default, correlations of credit rating changes among the traders and the information displayed in tabulation 720.

To illustrate such determinations in the context of a group of DBAR contingent claims depicted in FIG. 9*c*, the following assumptions are made: (i) all the traders C1, C2, C3, C4 and C5 investing in the group of contingent claims have a credit rating correlation of 0.9; (ii) the probabilities of total default for the traders C1 to C5 are (0.001, 0.003, 0.007, 0.01, 0.02) respectively; (iii) the implied probabilities of states S1 to S8 (depicted in FIG. 9*c*) are (0.075, 0.05, 0.1, 0.25, 0.2, 0.15, 0.075, 0.1), respectively. A calculation can be made with these assumptions which approximates the total credit risk for all of the traders in the group of the DBAR contingent claims of FIG. 9*c*, following Steps (i)-(vi) previously described for using VAR methodology to determine Credit-Capital-at-Risk.

Step (i) involves obtaining for each trader the amount of margin used to make each trade. For this illustration, these data are assumed and are displayed in FIG. 9*c*, and in a preferred embodiment, are available from Trader and Account database 261 and Trade Blotter database 266.

Step (ii) involves obtaining data related to the probability of default and the percentage of outstanding margin loans that are recoverable in the event of default. In preferred embodiments, this information is available from such sources as the JP Morgan CreditMetrics database. For this illustration a recovery percentage of zero is assumed for each trader, so that if a trader defaults, no amount of the margin loan is recoverable.

Step (iii) involves scaling the standard deviation of returns (in units of the amounts invested) by the percentage of margin used for each investment, the probability of default for each trader, and the percentage not recoverable in the event of default. For this illustration, these steps involve computing the standard deviations of unit returns for each state, multiplying by the margin percentage in each state, and then multiplying this result by the probability of default for each trader. In this illustration, using the assumed implied probabilities for states 1 through 8, the standard deviations of unit returns are: (3.5118, 4.359, 3, 1.732, 2, 2.3805, 3.5118, 3). In this illustration these unit returns are then scaled by multiplying each by (a) the amount of investment on margin in each state for each trader, and (b) the probability of default for each trader, yielding the following table:

| | S1 | S2 | S3 | S4 | S5 | S6 | S7 | S8 |
|---|---|---|---|---|---|---|---|---|
| C1, AAA | | | | | | | 175.59 | 300 |
| C2, AA | | | | | | 285.66 | 263.385 | |
| C3, AA | | | | | 1400 | 999.81 | | |
| C4, A+ | | | | 2598 | 2000 | | | |
| C5, A | 7023.6 | 4359 | 4800 | | | | | |

Step (iv) involves using the scaled amounts, as shown in the above table and a correlation matrix $C_s$ containing a correlation of returns between each pair of defined states, in order to compute a Credit-Capital-At-Risk. As previously discussed, this Step (iv) is performed by first arranging the scaled amounts for each trader for each state into a vector U as previously defined, which has dimension equal to the number of states (e.g., 8 in this example). For each trader, the correlation matrix $C_s$ is pre-multiplied by the transpose of U and post-multiplied by U. The square root of the result is a correlation-adjusted CCAR value for each trader, which represents the amount of credit risk contributed by each trader. To perform these calculations in this illustration, the matrix $C_s$ having 8 rows and 8 columns and 1's along the diagonal is constructed using the methods previously described:

$$C_s = \begin{matrix} 1 & -.065 & -.095 & -.164 & -.142 & -.12 & -.081 & -.095 \\ -.065 & 1 & -.076 & -.132 & -.115 & -.096 & -.065 & -.076 \\ -.095 & -.076 & 1 & -.192 & -.167 & -.14 & -.095 & -.111 \\ -.164 & -.132 & -.192 & 1 & -.289 & -.243 & -.164 & -.192 \\ -.142 & -.115 & -.167 & -.289 & 1 & -.21 & -.142 & -.167 \\ -.12 & -.096 & -.14 & -.243 & -.21 & 1 & -.12 & -.14 \\ -.081 & -.065 & -.095 & -.164 & -.142 & -.12 & 1 & -.095 \\ -.095 & -.076 & -.111 & -.192 & -.167 & -.14 & -.095 & 1 \end{matrix}$$

The vectors $U_1$, $U_2$, $U_3$, $U_4$, and $U_5$ for each of the 5 traders in this illustration, respectively, are as follows:

$$U_1 = \begin{matrix} 0 \\ 0 \\ 0 \\ 0 \\ 0 \\ 0 \\ 175.59 \\ 300 \end{matrix} \quad U_2 = \begin{matrix} 0 \\ 0 \\ 0 \\ 0 \\ 0 \\ 285.66 \\ 263.385 \\ 0 \end{matrix} \quad U_3 = \begin{matrix} 0 \\ 0 \\ 0 \\ 0 \\ 1400 \\ 999.81 \\ 0 \\ 0 \end{matrix} \quad U_4 = \begin{matrix} 0 \\ 0 \\ 0 \\ 2598 \\ 2000 \\ 0 \\ 0 \\ 0 \end{matrix} \quad U_5 = \begin{matrix} 7023.6 \\ 4359 \\ 4800 \\ 0 \\ 0 \\ 0 \\ 0 \\ 0 \end{matrix}$$

Continuing with the methodology of Step (iv) for this illustration, five matrix computations are performed as follows:

$$CCAR_i = \sqrt{U_i^T * C_s * U_i}$$

for i=1 . . . 5. The left hand side of the above equation is the credit capital at risk corresponding to each of the five traders.

Pursuant to Step (v) of the CCAR methodology as applied to this example, the five CCAR values are arranged into a column vector of dimension five, as follows:

$$w_{CCAR} = \begin{matrix} 332.9 \\ 364.58 \\ 1540.04 \\ 2783.22 \\ 8820.77 \end{matrix}$$

Continuing with this step, a correlation matrix (CCAR) with a number of rows and columns equal to the number of traders is constructed which contains the statistical correlation of changes in credit ratings between every pair of traders on the off-diagonals and 1's along the diagonal. For the present example, the final Step (vi) involves the pre-multiplication of CCAR by the transpose of $w_{CCAR}$ and the post multiplication of $C_{CCAR}$ by $w_{CCAR}$, and taking the square root of that product, as follows:

$$CCAR_{TOTAL} = \sqrt{w_{CCAR}^T * C_{CCAR} * w_{CCAR}}$$

In this illustration, the result of this calculation is:

$$CCAR_{TOTAL} = \sqrt{\begin{matrix} 332.9 & 364.58 & 1540.04 & 2783.22 & 8820.77 \end{matrix} * \begin{matrix} 1 & .9 & .9 & .9 & .9 \\ .9 & 1 & .9 & .9 & .9 \\ .9 & .9 & 1 & .9 & .9 \\ .9 & .9 & .9 & 1 & .9 \\ .9 & .9 & .9 & .9 & 1 \end{matrix} * \begin{matrix} 332.9 \\ 364.58 \\ 1540.04 \\ 2783.22 \\ 8820.77 \end{matrix}} = 13462.74$$

In other words, in this illustration, the margin total and distribution showing in FIG. 9*c* has a single standard deviation Credit-Capital-At-Risk of $13,462.74. As described previously in the discussion of Credit-Capital-At-Risk using VAR methodology, this amount may be multiplied by a number derived using methods known to those of skill in the art in order to obtain a predetermined percentile of credit loss which a trader could believe would not be exceeded with a predetermined level of statistical confidence. For example, in this illustration, if a trader is interested in knowing, with a 95% statistical confidence, what loss amount would not be exceeded, the single deviation Credit-Capital-At-Risk figure of $13,462.74 would be multiplied by 1.645, to yield a figure of $22,146.21.

A trader may also be interested in knowing how much credit risk the other traders represent among themselves. In a preferred embodiment, the preceding steps (i)-(vi) can be performed excluding one or more of the traders. For example, in this illustration, the most risky trader, measured by the amount of CCAR associated with it, is trader C5. The amount of credit risk due to C1 through C4 can be determined by performing the matrix calculation of Step (v) above, by entering 0 for the CCAR amount of trader C5. This yields, for example, a CCAR for traders C1 through C4 of $4,870.65.

Figure 10:
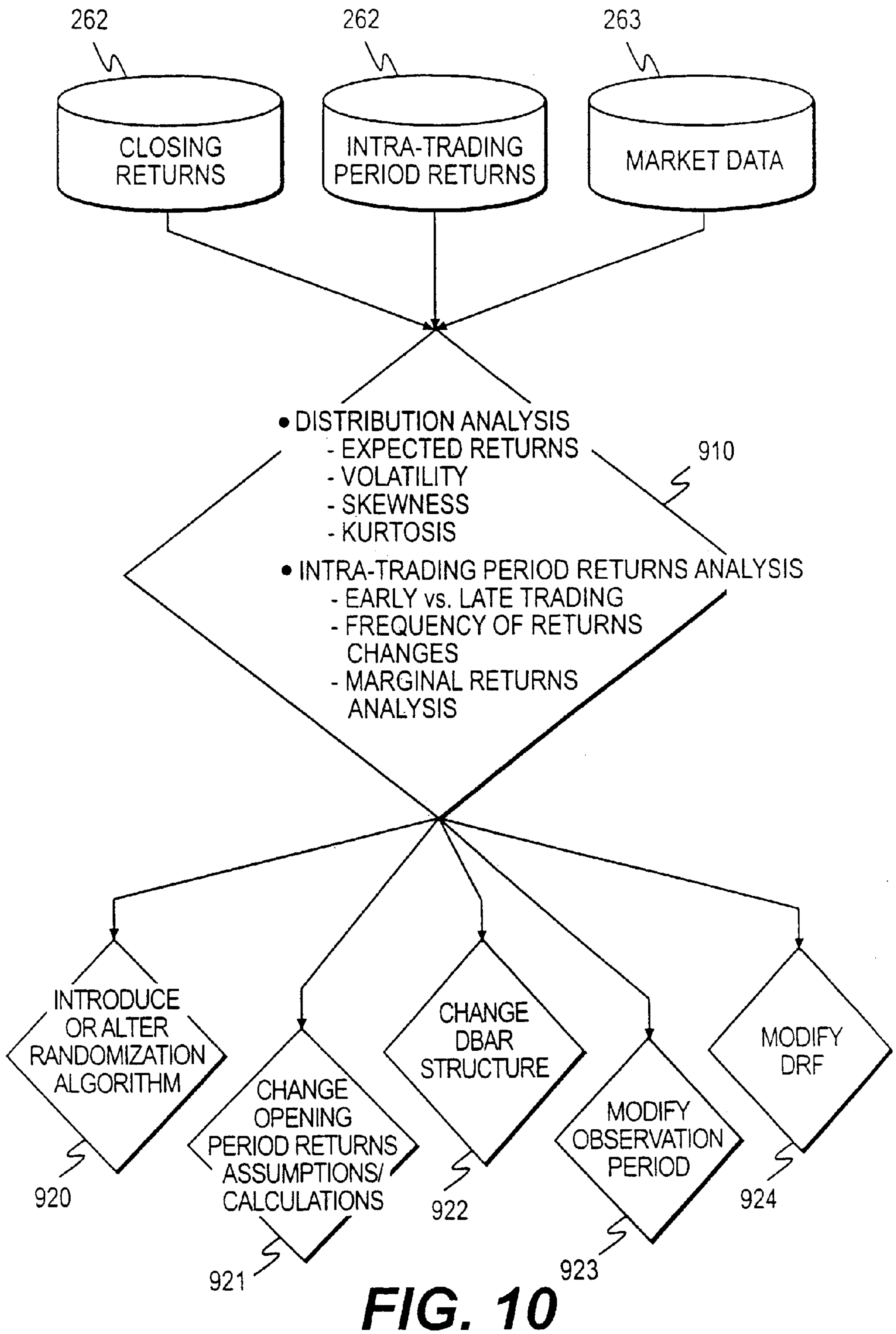
FIG. 10 is a schematic view of a feedback process for a preferred embodiment of DBAR contingent claims exchange.

FIG. 10 depicts a preferred embodiment of a feedback process for improving of a system or exchange for implementing the present invention which can be used with other embodiments of the present invention. As depicted in FIG. 10, in a preferred embodiment, closing and intraperiod returns from Market Returns database 262 and market data from Market Data database 263 (depicted in FIG. 2) are used by process 910 for the purpose of evaluating the efficiency and fairness of the DBAR exchange. One preferred measure of efficiency is whether a distribution of actual outcomes corresponds to the distribution as reflected in the finalized returns. Distribution testing routines, such as Kolmogorov-Smirnoff tests, preferably are performed in process 910 to determine whether the distributions implied by trading activity in the form of returns across the defined states for a group of DBAR contingent claims are significantly different from the actual distributions of outcomes for the underlying events, experienced over time. Additionally, in preferred embodiments, marginal returns are also analyzed in process 910 in order to determine whether traders who make investments late in the trading period earn returns statistically different from other traders. These "late traders," for example, might be capturing informational advantages not available to early traders. In response to findings from analyses in process 910, a system according to the present invention for trading and investing in groups of the DBAR contingent claims can be modified to improve its efficiency and fairness. For example, if "late traders" earn unusually large profits, it could mean that such a system is being unfairly manipulated, perhaps in conjunction with trading in traditional security markets. Process 920 depicted in FIG. 10 represents a preferred embodiment of a counter-measure which randomizes the exact time at which a trading period ends for the purposes of preventing manipulation of closing returns. For example, in a preferred embodiment, an exchange announces a trading closing end time falling randomly between 2:00 p.m. and 4:00 p.m. on a given date.

As depicted in FIG. 10, process 923 is a preferred embodiment of another process to reduce risk of market manipulation. Process 923 represents the step of changing the observation period or time for the outcome. For example, rather than observing the outcome at a discrete time, the exchange may specify that a range of times for observation will used, perhaps spanning many hours, day, or weeks (or any arbitrary time frame), and then using the average of the observed outcomes to determine the occurrence of a state.

As further depicted in FIG. 10, in response to process 910, steps could be taken in process 924 to modify DRFs in order, for example, to encourage traders to invest earlier in a trading period. For example, a DRF could be modified to provide somewhat increased returns to these "early" traders and proportionately decreased returns to "late" traders. Similarly for digital options, an OPF could be modified to provide somewhat discounted prices for "early" traders and proportionately marked-up prices for "late" traders. Such incentives, and others apparent to those skilled in the art, could be reflected in more sophisticated DRFs.

In a preferred embodiment depicted in FIG. 10, process 921 represents, responsive to process 910, steps to change the assumptions under which opening returns are computed for the purpose of providing better opening returns at the opening of the trading period. For example, the results of process 910 might indicate that traders have excessively traded the extremes of a distribution in relation to actual outcomes. There is nothing inherently problematic about this, since trader expectations for future possible outcomes might reflect risk preferences that cannot be extracted or analyzed with actual data. However, as apparent to one of skill in the art, it is possible to adjust the initial returns to provide better estimates of the future distribution of states, by, for example, adjusting the skew, kurtosis, or other statistical moments of the distribution.

As depicted in FIG. 10, process 922 illustrates changing entirely the structure of one or more groups of DBAR contingent claims. Such a countermeasure can be used on an ad hoc basis in response to grave inefficiencies or unfair market manipulation. For example, process 922 can include changes in the number of trading periods, the timing of trading periods, the duration of a group of DBAR contingent claims, the number of and nature of the defined state partitions in order to achieve better liquidity and less unfair market manipulation for groups of DBAR contingent claims of the present invention.

As discussed above (Section 6), in a preferred embodiment of a DBAR Digital Options Exchange ("DBAR DOE"), traders may buy and "sell" digital options, spreads, and strips by either placing market orders or limit orders. A market order typically is an order that is unconditional, i.e., it is executed and is viable regardless of DBAR contingent claim "prices" or implied probabilities. A limit order, by contrast, typically is a conditional investment in a DBAR DOE in which the trader specifies a condition upon which the viability or execution (i.e., finality) of the order depends. In a preferred embodiment, such conditions typically stipulate that an order is conditional upon the "price" for a given contingent claim after the trading period has been completed upon fulfillment of the trading period termination criteria. At this point, all of the orders are processed and a distribution of DBAR contingent claim "prices"—which for DBAR digital options is the implied probability that the option is "in the money"—are determined.

In a preferred embodiment of a DBAR DOE of the present invention, limit orders may be the only order type that is processed. In a preferred embodiment, limit orders are executed and are part of the equilibrium for a group of DBAR contingent claims if their stipulated "price" conditions (i.e., probability of being in the money) are satisfied. For example, a trader may have placed limit buy order at 0.42 for MSFT digital call options with a strike price of 50. With a the limit condition at 0.42, the trader's order will be filled only if the final DBAR contingent claim distribution results in the 50 calls having a "price" which is 0.42 or "better," which, for a buyer of the call, means 0.42 or lower.

Whether a limit order is included in the final DBAR equilibrium affects the final probability distribution or "prices." Since those "prices" determine whether such limit orders are to be executed and therefore included in the final equilibrium, in a preferred embodiment an iterative procedure, as described in detail below, may be carried out until an equilibrium is achieved.

As described above, in a preferred embodiment, A DBAR DOE equilibrium results for a contract, or group of DBAR contingent claims including limit orders, when at least the following conditions have been met:

(1) At least some buy ("sell") orders with a limit "price" greater (less) than or equal to the equilibrium "price" for the given option, spread or strip are executed or "filled."

(2) No buy ("sell") orders with limit "prices" less (greater) than the equilibrium "price" for the given option, spread or strip are executed.

(3) The total amount of executed lots equals the total amount invested across the distribution of defined states.

(4) The ratio of payouts should each constituent state of a given option, spread, or strike occur is as specified by the trader, (including equal payouts in the case of digital options), within a tolerable degree of deviation.

(5) Conversion of filled limit orders to market orders for the respective filled quantities and recalculating the equilibrium does not materially change the equilibrium.

(6) Adding one or more lots to any of the filled limit orders converted to market orders in step (5) and recalculating of the equilibrium "prices" results in "prices" which violate the limit "price" of the order to which the lot was added (i.e., no more lots can be "squeaked in" without forcing market prices to go above the limit "prices" of buy orders or below the limit "prices" of sell orders).

In a preferred embodiment, the DBAR DOE equilibrium is computed through the application of limit and market order processing steps, multistate composite equilibrium calculation steps, steps which convert "sell" orders so that they may be processed as buy orders, and steps which provide for the accurate processing of limit orders in the presence of transaction costs. The descriptions of FIGS. 11-18 which follow explain these steps in detail. Generally speaking, in a preferred embodiment, as described in Section 6, the DBAR DOE equilibrium including limit orders is arrived at by:

(i) converting any "sell" orders to buy orders;

(ii) aggregating the buy orders (including the converted "sell" orders) into groups for which the contingent claims specified in the orders share the same range of defined states;

(iii) adjusting the limit orders for the effect of transaction costs by subtracting the order fee from the order's limit "price;"

(iv) sorting the orders upon the basis of the (adjusted) limit order "prices" from best (highest) to worst (lowest);

(v) searching for an order with a limit "price" better (i.e., higher) than the market or current equilibrium "price" for the contingent claim specified in the order;

(vi) if such a better order can be found, adding as many incremental value units or "lots" of that order for inclusion into the equilibrium calculation as possible without newly calculated market or equilibrium "price" exceeding the specified limit "price" of the order (this is known as the "add" step);

(vii) searching for an order with previously included lots which now has a limit "price" worse than the market "price" for the contingent claim specified in the order (i.e., lower than the market "price");

(viii) removing the smallest number of lots from the order with the worse limit "price" so that the newly calculated equilibrium "price," after such iterative removal of lots, is just below the order's limit "price" (this is known as the "prune" step, in the sense that lots previously added are removed or "pruned" away);

(ix) repeating the "add" and "prune" steps until no further orders remain which are either better than the market which have lots to add, or worse than the market which have lots to remove;

(x) taking the "prices" resulting from the final equilibrium resulting from step (ix) and adding any applicable transaction fee to obtain the offer "price" for each respective contingent claim ordered and subtracting any applicable transaction fee to obtain the bid "price" for each respective contingent claim ordered; and (xi) upon fulfillment of all of the termination criteria related to the event of economic significance or state of a selected financial product, allocating payouts to those orders which have investments on the realized state, where such payouts are responsive to the final equilibrium "prices" of the orders' contingent claims and the transaction fees for such orders.

Referring to FIG. 11, illustrative data structures are depicted which may be used in a preferred embodiment to store and manipulate the data relevant to the DBAR DOE embodiment and other embodiments of the present invention. The data structure for a "contract" or group of DBAR contingent claims, shown in 1101, contains data members which store data which are relevant to the construction of the DBAR DOE contract or group of claims. Specifically, the contract data structure contains (i) the number of defined states (contract.numStates); (ii) the total amount invested in the contract at any given time (contract.totalInvested); (iii) the aggregate profile trade investments required to satisfy the aggregate profile trade requests for profile trades (a type of trade which is described in detail below) (iv) the aggregate payout requests made by profile trades; (v) the total amount invested or allocated in each defined state at any given time (contract.stateTotal); (vi) the number of orders submitted at any given time (contract.numOrders); and (vii) a list of the orders, which is itself a structure containing data relevant to the orders (contract.orders[ ]).

A preferred embodiment of "order" data structures, shown in 1102 of FIG. 11, illustrates the data which are typically needed to process a trader's order using the methods of the DBAR DOE of the present invention. Specifically, the order data structure contains the following relevant members for order processing:

(i) the amount of the order which the trader desires to transact. For orders which request the purchase ("buys") of a digital option, strip, or spread, the amount is interpreted as the amount to invest in the desired contingent claim. Thus, for buys, the order amount is analogous to the option premium for conventional options. For orders which request "sales" of a DBAR contingent claim, the order amount is to be interpreted as the amount of net payout that the trader desires to "sell." Selling a net payout in the context of a DBAR DOE of the present invention means that the loss that a trader suffers should the digital option, strip or spread "sold" expire in the money is equal to the payout "sold." In other words, by selling a net payout, the trader is able to specify the amount of net loss that would occur should the option "sold" expire in the money. If the contingent claim "sold" expires out of the money, the trader would receive a profit equal to the net payout multiplied by the ratio of (a) the final implied probability of the option expiring in the money and (b) the implied probability of the option expiring out of the money. In other words, in a preferred embodiment of a DBAR DOE, "buys are for premium, and sells are for net payout" which means that buy orders and sell orders in terms of the order amount are interpreted somewhat differently. For a buy order, the premium is specified and the payout, should the option expire in the money, is not known until all of the predetermined termination criteria have been met at the end of trading. For a "sell" order, in contrast, the payout to be "sold" is specified (and is equal to the net loss should the option "sold" expire in the money), while the premium, which is 'equal to the trader's profit should the option "sold" expire out of the money, is not known until all of the predetermined termination criteria have been met (e.g., at the end of trading);

(ii) the amount which must be invested in each defined state to generate the desired digital option, spread or strip specified in the order is contained in data member order.invest[ ];

(iii) the data members order.buySell indicates whether the order is a buy or a "sell";

(iv) the data members order.marketLimit indicates whether the order is a limit order whose viability for execution is conditional upon the final equilibrium "price" after all predetermined termination criteria have been met, or a market order, which is unconditional;

(v) the current equilibrium "price" of the digital option, spread or strip specified in the order;

(vi) a vector which specifies the type of contingent claim to be traded (order.ratio[ ]). For example, in a preferred embodiment involving a contract with seven defined states, an order for a digital call option which would expire in the money should any of the last four states occur would be rendered in the data member order ratio[ ] as order.ratio[0,0,0,1,1,1,1] where the 1's indicate that the same payout should be generated by the multistate allocation process when the digital option is in the money, and the 0's indicate that the option is out of the money, or expires on one of the respective out of the money states. As another example in a preferred embodiment, a spread which is in the money should states either states 1,2, 6, or 7 occur would be rendered as order.ratio[1,1,0,0,0,1,1]. As another example in a preferred embodiment, a digital option strip, which allows a trader to specify the relative ratios of the final payouts owing to an investment in such a contingent claim would be rendered using the ratios over which the strip is in the money. For example, if a trader desires a strip which pays out three times much as state 3 should state 1 occur, and twice as much as state 3 if state 2 occurs, the strip would be rendered as order.ratio[3,2, 1,0,0,0,0];

(vii) the amount of the order than can be executed or filled at equilibrium. For market orders, the entire order amount will be filled, since such orders are unconditional. For limit orders, none, all, or part of the order amount may be filled depending upon the equilibrium "prices" prevailing when the termination criteria are fulfilled;

(viii) the transaction fee applicable to the order;

(ix) the payout for the order, net of fees, after all predetermined termination criteria have been met; and (x) a data structure which, for trades of the profile type (described below in detail), contains the desired amount of payout requested by the order should each state occur.

FIG. 12 depicts a logical diagram of the basic steps for limit and market order processing in a preferred embodiment of a DBAR DOE of the present invention. Step 1201 of FIG. 12 loads the relevant data into the contract and order data structures of FIG. 11. Step 1202 initializes the set of DBAR contingent claims, or the "contract," by placing initial amounts of value units (i.e., initial liquidity) in each state of the set of defined states. The placement of initial liquidity avoids a singularity in any of the defined states (e.g., an invested amount in a given defined state equal to zero) which may tend to impede multistate allocation calculations. The initialization of step 1202 may be done in a variety of different ways. In a preferred embodiment, a small quantity of value units is placed in each of the defined states. For example, a single value unit ("lot") may be placed in each defined state where the single value unit is expected to be small in relation to the total amount of volume to be transacted. In step 1202 of FIG. 12, the initial value units are represented in the vector init [contract.numStates].

In a preferred embodiment, step 1203 of FIG. 12 invokes the function convertSales( ), which converts all of the "sell" orders to complementary buy orders. The function convertSales( ) is described in detail in FIG. 15, below. After the completion of step 1203, all of the orders for contingent claims—whether buy or "sell" orders, can be processed as buy orders.

In a preferred embodiment, step 1204 groups these buy orders based upon the distinct ranges of states spanned by the contingent claims specified in the orders. The range of states comprising the order are contained in the data member order.ratio[ ] of the order data structure 1102 depicted in FIG. 11.

In a preferred embodiment, for each order[j] there is associated a vector of length equal to the number of defined states in the contract or group of DBAR contingent claims (contract.numStates). This vector, which is stored in order[j].ratio[ ], contains integers which indicate the range of states in which an investment is to be made in order to generate the expected payout profile of the contingent claim desired by the trader placing the order.

In a preferred embodiment depicted in FIG. 12, a separate grouping in step 1204 is required for each distinct order[j] .ratio[ ] vector. Two order[j].ratio[ ] vectors are distinct for different orders when their difference yields a vector that does not contain zero in every element. For example, for a contract which contains seven defined states, a digital put option which spans that first three states has an order[1].ratio[ ] vector equal to (1,1,1,0,0,0,0). A digital call option which spans the last five states has an order[2].ratio[ ] vector equal to (0,0,1,1,1,1,1). Because the difference of these two vectors is equal to (1,1,0,−1,−1,−1,−1), these two orders should be placed into distinct groups, as indicated in step 1204.

In a preferred embodiment depicted in FIG. 12, step 1204 aggregates orders into relevant groups for processing. For the purposes of processing limit orders: (i) all orders may be treated as limit orders since orders without limit "price" conditions, e.g., "market orders," can be rendered as limit buy orders (including "sale" orders converted to buy orders in step 1203) with limit "prices" of 1, and (ii) all order sizes are processed by treating them as multiple orders of the smallest value unit or "lot."

The relevant groups of step 1204 of FIG. 12 are termed "composite" since they may span, or comprise, more than one of the defined states. For example, the MSFT Digital Option contract depicted above in Table 6.2.1, for example, has defined states (0,30], (30,40], (40,50], (50,60], (60, 70], (70, 80], and (80,00]. The 40 strike call options therefore span the five states (40,50], (50,60], (60, 70], (70, 80], and (80,00]. A "sale" of a 40 strike put, for example, would be converted at step 1203 into a complementary buy of a 40 strike call (with a limit "price" equal to one minus the limit "price" of the sold put), so both the "sale" of the 40 strike put and the buy of a 40 strike call would be aggregated into the same group for the purposes of step 1204 of FIG. 12.

In the preferred embodiment depicted in FIG. 12, step, 1205 invokes the function feeAdjustOrders( ). This function is required so as to incorporate the effect of transaction or exchange fees for limit orders. The function feeAdjustOrders( ) shown in FIG. 12, described in detail with reference to FIG. 16, basically subtracts from the limit "price" of each order the fee for that order's contingent claim. The limit "price" is then set to this adjusted, lower limit "price" for the purposes of the ensuing equilibrium calculations.

At the point of step 1206 of the preferred embodiment depicted in FIG. 12, all of the orders may be processed as buy orders (because any "sell" orders have been converted to buy orders in step 1203 of FIG. 12) and all limit "prices" have been adjusted (with the exception of market orders which, in a preferred embodiment of the DBAR DOE of the present invention, have a limit "price" equal to one) to reflect transaction costs equal to the fee specified for the order's contingent claim (as contained in the data member order[j].fee). For example, consider the steps depicted in FIG. 12 leading up to step 1206 on three hypothetical orders: (1) a buy order for a digital call with strike price of 50 with a limit "price" of 0.42 for 100,000 value units (lots) (on the illustrative MSFT example described above); (2) a "sale" order for a digital put with a strike price of 40 with a limit price of 0.26 for 200,000 value units (lots); and (3) a market buy order for a digital spread which is in the money should MSFT stock expire greater than or equal to 40 and less than or equal to 70. In a preferred embodiment, the representations of the range of states for the contingent claims specified in the three orders are as follows: (1) buy order for 50-strike digital call: order [1].ratio[ ]=(0,0,0,1,1,1,1); (2) "sell" order for 40-strike digital put: order[2].ratio[ ]=(0,0,1,1,1,1,1); and (3) market buy order for a digital spread in the money on the interval [40,70): order[3].ratio[ ]=(0,0,1,1,1,1,0). Also in this preferred embodiment, the "sell" order of the put covers the states as a "converted" buy order which are complementary to the states being sold (sold states=order.ratio[ ]=(1,1,0,0,0,0,0)), and the limit "price" of the converted order is equal to one minus the limit "price" of the original order (i.e., 1.26=0.74). Then in a preferred embodiment, all of the orders' limit "prices" are adjusted for the effect of transaction fees so that, assuming a fee for all of the orders equal to 0.0005 (i.e., 5 basis points of notional payout), the fee-adjusted limit prices of the orders are equal to (1) for the 50-strike call: 0.4195 (0.42-0.0005); (2) for the converted sale of 40-strike put: 0.7395 (1-0.26-0.0005); and (3) for the market order for digital spread: 1 (limit "price" is set to unity). In a preferred embodiment depicted in FIG. 12, step 1204 then would aggregate these hypothetical orders into distinct groups, where orders in each group share the same range of defined states which comprise the orders' contingent claim. In other words, as a result of step 1204, each group contains orders which have identical vectors in order.ratio[ ]. For the illustrative three hypothetical orders, the orders would be placed as a result of step 1204 into three separate groups, since each order ranges over distinct sets of defined states as indicated in their respective order[j].ratio[ ] vectors (i.e., (0,0,0,1,1,1,1), (0,0,1,1,1,1,1), and (0,0,1,1,1,1,0), respectively).

For the purposes of step 1206 of the preferred embodiment depicted in FIG. 12, all of the order have been converted to buy orders and have had their limit "prices" adjusted to reflect transaction fees, if any. In addition, such orders have been placed into groups which share the same range of defined states which comprise the contingent claim specified in the orders (i.e., have the same order[j].ratio[ ] vector). In this preferred embodiment depicted in FIG. 12, step 1206 sorts each group's orders based upon their fee-adjusted limit "prices," from best (highest "prices") to worst (lowest "prices"). For example, consider a set of orders in which only digital calls and puts have been ordered, both to buy and to "sell," for the MSFT example of Table 6.2.1 in which strike prices of 30, 40, 50, 60, 70, and 80 are available. A "sale" of a call is converted to a buy of a put, and a "sale" of a put is converted into a purchase of a call by step 1204 of the preferred embodiment depicted in FIG. 12. Thus, in this embodiment all of the grouped orders preferably are grouped in terms of calls and puts at the indicated strike prices of the orders.

The grouped orders, after conversion and adjustment for fees, can be illustrated in the following Diagram 1, which depicts the results of a grouping process for a set of illustrative and assumed digital puts and calls.

Referring to Diagram 1 the call and put limit orders have been grouped by strike price (distinct order[j].ratio[ ] vectors) and then ordered from "best price" to "worst," moving away from the horizontal axis. As shown in the table, "best price" for buy orders are those with higher prices (i.e., buyers with a higher willingness to pay). Diagram 1 includes "sales" of puts which have been converted to complementary purchases of calls and "sales" of calls which have been converted to complementary purchases of puts, i.e., all orders for the purposes of Diagram 1 may be treated as buy orders.

For example, as depicted in Diagram 1 the grouping which includes the purchase of the 40 calls (labeled "C40") would also include any converted "sales" of the 40 puts (i.e., "sale" of the 40 puts has an order.ratio[ ] vector which originally is equal to (1,1,0,0,0,0,0) and is then converted to the complementary order.ratio[ ] vector (0,0,1,1,1,1,1) which corresponds to the purchase of a 40-strike call).

Diagram 1 illustrates the groupings that span distinct sets of defined states with a vertical bar. The labels within each vertical bar in Diagram 1 such as "C50", indicate whether the grouping corresponds to a call ("C") or put ("P") and the relevant strike price, e.g., "C50" indicates a digital call option with strike price of 50.

The horizontal lines within each vertical bar shown on Diagram 1 indicates the sorting by price within each group. Thus, for the vertical bar above the horizontal axis marked "C50" in Diagram 1, there are five distinct rectangular groupings within the vertical bar. Each of these groupings is an order for the digital call options with strike price 50 at a particular limit "price." By using the DBAR methods of the present invention, there is no matching of buyers and "sellers," or buy orders and "sell" orders, which is typically required in the traditional markets in order for transactions to take place. For example, Diagram 1 illustrates a set of orders that contains only buy orders for the digital puts struck at 70 ("P70").

In a preferred embodiment of a DBAR DOE of the present invention, the aggregation of orders into groups referred to by step 1204 of the preferred embodiment depicted in FIG. 12 corresponds to DBAR digital options, spread, and strip trades which span distinct ranges of the defined states. For example, the 40 puts and the 40 calls are represented as distinct state sets since they span or comprise different ranges of defined states.

Proceeding with the next step of the preferred embodiment depicted in FIG. 12, step 1207 queries whether there is at least a single order which has a limit "price" which is "better" than the current equilibrium "price" for the ordered option. In a preferred embodiment for the first iteration of step 1207 for a trading period for a group of DBAR contingent claims, the current equilibrium "prices" reflect the placement of the initial liquidity from step 1202. For example, with the seven defined states of the MSFT example described above, one value unit may have been initialized in each of the seven defined states. The "prices" of the 30, 40, 50, 60, 70, and 80 digital call options, are therefore 6/7, 5/7, 4/7, 3/7, 2/7, and 1/7, respectively. The initial "prices" of the 30, 40, 50, 60, 70, and 80 digital puts are 1/7, 2/7, 3/7, 4/7, 5/7, 6/7, respectively. Thus, step 1207 may identify a buy order for a 60 digital call option with limit "price" greater than 3/7 (0.42857) or a "sell" order, for example, for the 40 digital put option with limit "price" less than 2/7 (0.28571) (which would be converted into a buy order of the 40 calls with limit "price" of 5/7 (i.e., 1-2/7)). In a preferred embodiment an order's limit "price" or implied probability would take into account transaction or exchange fees, since the limit "prices" of the original orders would have been already adjusted by the amount of the transaction fee (as contained in order[j].fee) from step 1205 of FIG. 12, where the function fee Adjust Orders( ) is invoked.

As discussed above, transaction or exchange fees, and consequently bid/offer "prices" or implied probability, can be computed in a variety of ways. In a preferred embodiment, such fees are computed as a fixed percentage of the total amount invested over all of the defined states. The offer (bid) side of the market for a given digital option (or strip or spread) is computed in this embodiment by taking the total amount invested less (plus) this fixed percentage, and dividing it by the total amount invested over the range of states comprising the given option (or strip or spread). This reciprocal of this quantity then equals the offer (bid) "price" in this embodiment. In another preferred embodiment, transaction fees are computed as a fixed percentage of the payout of a given digital option, strip or spread. In this embodiment, if the transaction fee is f basis points of the payout, then the offer (bid) price is equal to the total amount invested over the range of state comprising the digital option (strip or spread) plus (minus) f basis points. For example, assume that f is equal to 5 basis points or 0.0005. Thus, the offer "price" of an in-the-money option whose equilibrium "price" is 0.50 might be equal to 0.50+0.0005 or 0.5005 and the bid "price" equal to 0.50−

0.0005 or 0.4995. An out-of-the-money option having an equilibrium "price" equal to 0.05 might therefore have an offer "price" equal to 0.05+0.0005 or 0.0505 and a bid "price" equal to 0.05−0.0005 or 0.0495. Thus, the embodiment in which transaction fees are a fixed percentage of the payout yields bid/offer spreads that are a higher percentage of the out-of-the-money option "prices" than of the in-the-money option prices.

The bid/offer "prices" affect not only the costs to the trader of using a DBAR digital options exchange, but also the nature of the limit order process. Buy limit orders (including those buy orders which are converted "sells") must be compared to the offer "prices" for the option, strip or spread contained in the order. Thus a buy order has a limit "price" which is "better" than the market if the limit "price" condition is greater than or equal to the offer side of the market for the option specified in the order. Conversely, a "sell" order has a limit "price" which is better than the market if the limit "price" condition is less than or equal to the bid side of the market for the option specified in the order. In the preferred embodiment depicted in FIG. 12, the effect of transaction fees is captured by the adjustment of the limit "prices" in step 1205, in that in equilibrium an order should be filled only if its limit "price" is better than the offer "price", which includes the transaction fee.

In the preferred embodiment depicted in FIG. 12, if step 1207 identifies at least one order which has a limit "price" better than the current set of equilibrium "prices" (whether the initial set of "prices" upon the first iteration or the "prices" resulting from subsequent iterations) then step 1208 invokes the function fillRemoveLots. The function fillRemoveLots, when called with the first parameter equal to one as in step 1208, will attempt to add lots from the order identified in step 1207 which has limit "price" better than the current set of equilibrium prices. The fillRemoveLots function is described in detail in FIG. 17, below. Basically, the function finds the number of lots of the order than can be added for a buy order (including all "sale" order converted to buy orders) such that when a new equilibrium set of "prices" is calculated for the group of DBAR contingent claims with the added lots (by invoking the function compEq( ) of FIG. 13), no further lots can be added without causing the new equilibrium "price" with those added lots to exceed the limit "price" of the buy order being filled.

In preferred embodiments, finding the maximum amount of lots to add so that the limit "price" is just better than the new equilibrium is accomplished using the method of binary search, as described in detail with reference to FIG. 17, below. Also in preferred embodiments the step of "filling" lots refers to the execution, incrementally and iteratively, using the method of binary search, of that part of the order quantity that can be executed or "filled." In a preferred embodiment, the filling of a buy order therefore requires the testing, via the method of binary search, to determine whether additional unit lots can be added over the relevant range of defined states spanning the particular option for the purposes of equilibrium calculation, without causing the resulting equilibrium "price" for the order to exceed the limit "price."

Figure 13:
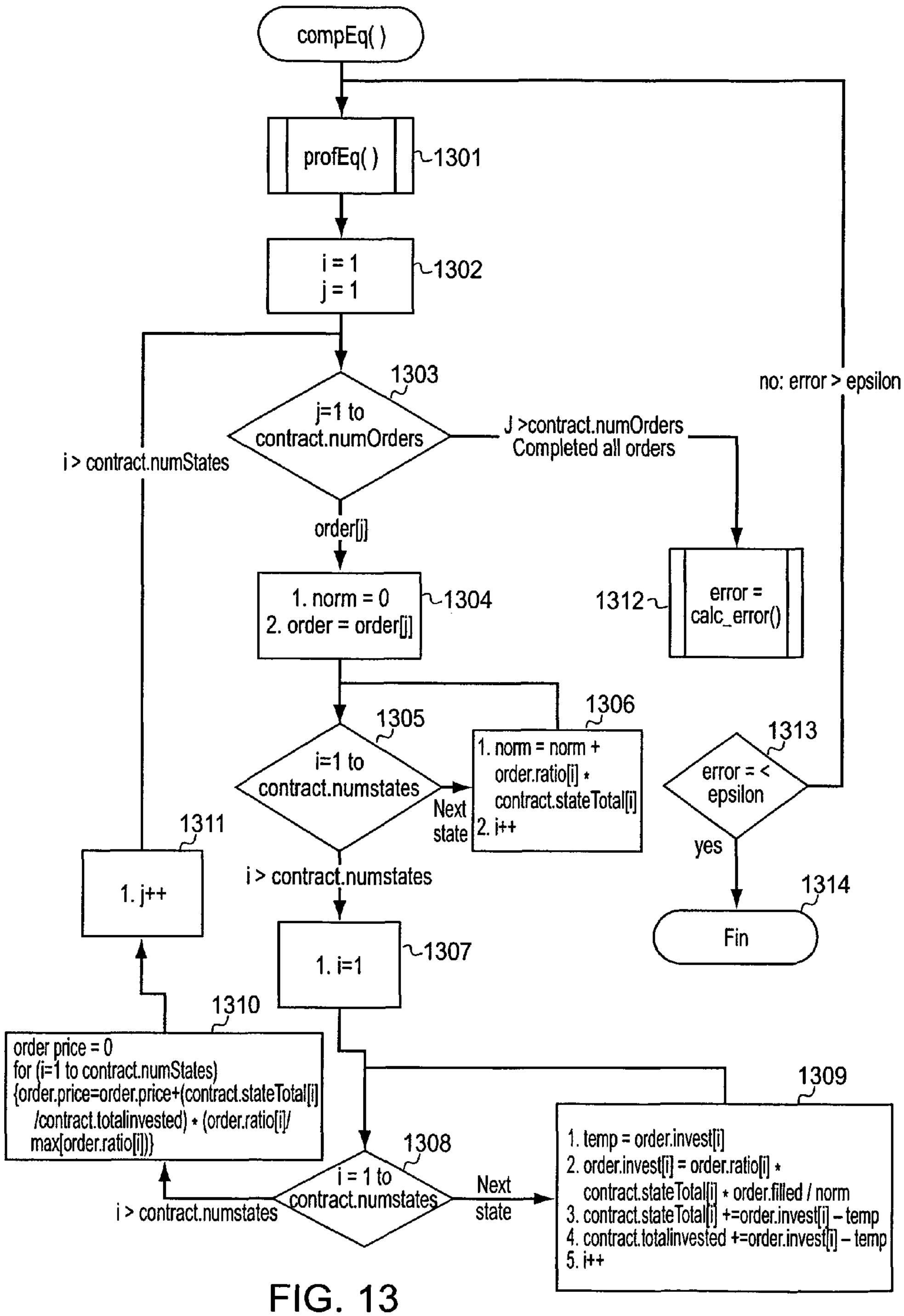
FIG. 13 depicts a preferred embodiment of a method for calculating a multistate composite equilibrium in a Demand-Based Adjustable Return Digital Options Exchange of the present invention.

In the preferred embodiment depicted in FIG. 12, step 1209 is executed following step 1208 if lots are filled, or following step 1207 if no orders were identified with limit "prices" which are better than the current equilibrium "prices." Step 1209 of FIG. 12 identifies orders filled at least partially at limit "prices" which are worse (i.e., less) than the current equilibrium "prices." In preferred embodiments, the filling of lots in step 1208, if performed prior to step 1209, involves the iterative recalculation of the equilibrium "prices" by invoking the function compEq( ), which is described in detail with reference to FIG. 13.

In the preferred embodiment depicted in FIG. 12, the equilibrium computations in step 1208 performed in the process of filling lots may cause a change in the equilibrium "prices" which in turn may cause previously filled orders to have limit "prices" which are now worse (i.e., lower) than the new equilibrium. Step 1209 identifies these orders. In order for the order to comply with the equilibrium, its limit "price" may not be worse (i.e., less) than the current equilibrium. Thus, in a preferred embodiment of the DBAR DOE of the present invention, lots for such an order are removed. This is performed in step 1210 with the invocation of function fillRemoveLots. Similar to step 1208, in a preferred embodiment the processing step 1210 uses the method of binary search to find the minimum amount of lots to be removed from the quantity of the order that has already been filled such that the order's limit "price" is no longer worse (i.e., less) than the equilibrium "price," which is recomputed iteratively. For buy orders and all buy orders converted from "sell" orders processed in step 1210, a new filled quantity is found which is smaller than the original filled quantity so that the buy order's new equilibrium "price" does not exceed the buy order's specified limit "price."

The logic of steps 1207-1210 of FIG. 12 may be summarized as follows. An order is identified which can be filled (step 1207), i.e., an order which has a limit "price" better than the current equilibrium "price" for the option specified in the order. If such an order is identified, it is filled to the maximum extent possible without violating the limit "price" condition of the order itself (step 1208). A buy order's limit "price" condition is violated if an incremental lot is filled which causes the equilibrium "price," taking account of this additional lot, to exceed the buy order's limit "price." Any previously filled orders may now have limit order conditions that are violated as a result of lots being filled in step 1208. These orders are identified, one order at a time, in step 1209. The filled amounts of such orders with violated limit order "price" conditions are reduced or "pruned" so that the limit order "price" conditions are no longer violated. This "pruning" is performed in step 1210. The steps 1207 to 1210 constitute an "add and prune" cycle in which an order with a limit "price" better than the equilibrium of the current iteration has its filled amount increased, followed by the reduction or pruning of any filled amounts for orders with a limit "price" condition which is worse than the equilibrium "price" of the current iteration. In preferred embodiment, the "add and prune" cycle continues until there remain no further orders with limit "price" conditions which are either better or worse than the equilibrium, i.e., no further adding or pruning can be performed.

When no further adding or pruning can be performed, an equilibrium has been achieved, i.e., all of the orders with limit "prices" worse than the equilibrium are not executed and at least some part of all of the orders with limit "prices" better or equal to the equilibrium are executed. In the preferred embodiment of FIG. 12, completion, of the "add and prune" cycle terminates limit and market order processing as indicated in step 1211. The final "prices" of the equilibrium calculation resulting from the "add and prune" cycle of steps 1207-1210 can be designated as the mid-market "prices." The bid "prices" for each contingent claim are computed by subtracting a fee from the mid-market "prices," and the offer "prices" are computed by adding a fee to the mid-market "prices." Thus, equilibrium mid-market, bid, and offer "prices" may then be published to traders in a preferred embodiment of a DBAR DOE.

Referring now to the preferred embodiment of a method of composite multistate equilibrium calculation depicted FIG. 13, the function compEq( ), which is a multistate allocation algorithm, is described. In a preferred embodiment of a DBAR DOE, digital options span or comprise more than one defined state, with each of the defined states corresponding to at least one possible outcome of an event of economic significance or a financial instrument. As depicted in Table 6.2.1 above, for example, the MSFT digital call option with strike price of 40 spans the five states above 40 or (40,50], (50,60], (60, 70], (70, 80], and (80,00]. To achieve a profit and loss scenario that traders conventionally expect from a digital option, in a preferred embodiment of the present invention a digital option investment of value units designates a set of defined states and a desired return-on-investment from the designated set of defined states, and the allocation of investments across these states is responsive to the desired return-on-investment from the designated set of defined states. For a digital option, the desired return on investment is often expressed as a desire to receive the same payout regardless of the state that occurs among the set of defined states that comprise the digital option. For instance, in the illustrative example of the MSFT stock prices shown in FIG. 6.2.1, a digital call option with strike price of 40 would be, in a preferred embodiment, allocated the same payout irrespective of which state of the five states above 40 occurs.

In preferred embodiments of the DBAR DOE of the present invention, traders who invest in digital call options (or strips or spreads) specify a total amount of investment to be made (if the amount is for a buy order) or notional payout to be "sold" (if the amount is for a "sell" order). In a preferred embodiment, the total investment is then allocated using the compEq( ) multistate allocation method depicted in FIG. 13. In another preferred embodiment, the total amount of the payout to be received, should the digital option expire in the money, is specified by the investor, and in a preferred embodiment the investment amount required to produce such payouts are computed by the multistate allocation method depicted in FIG. 14.

Figure 14:
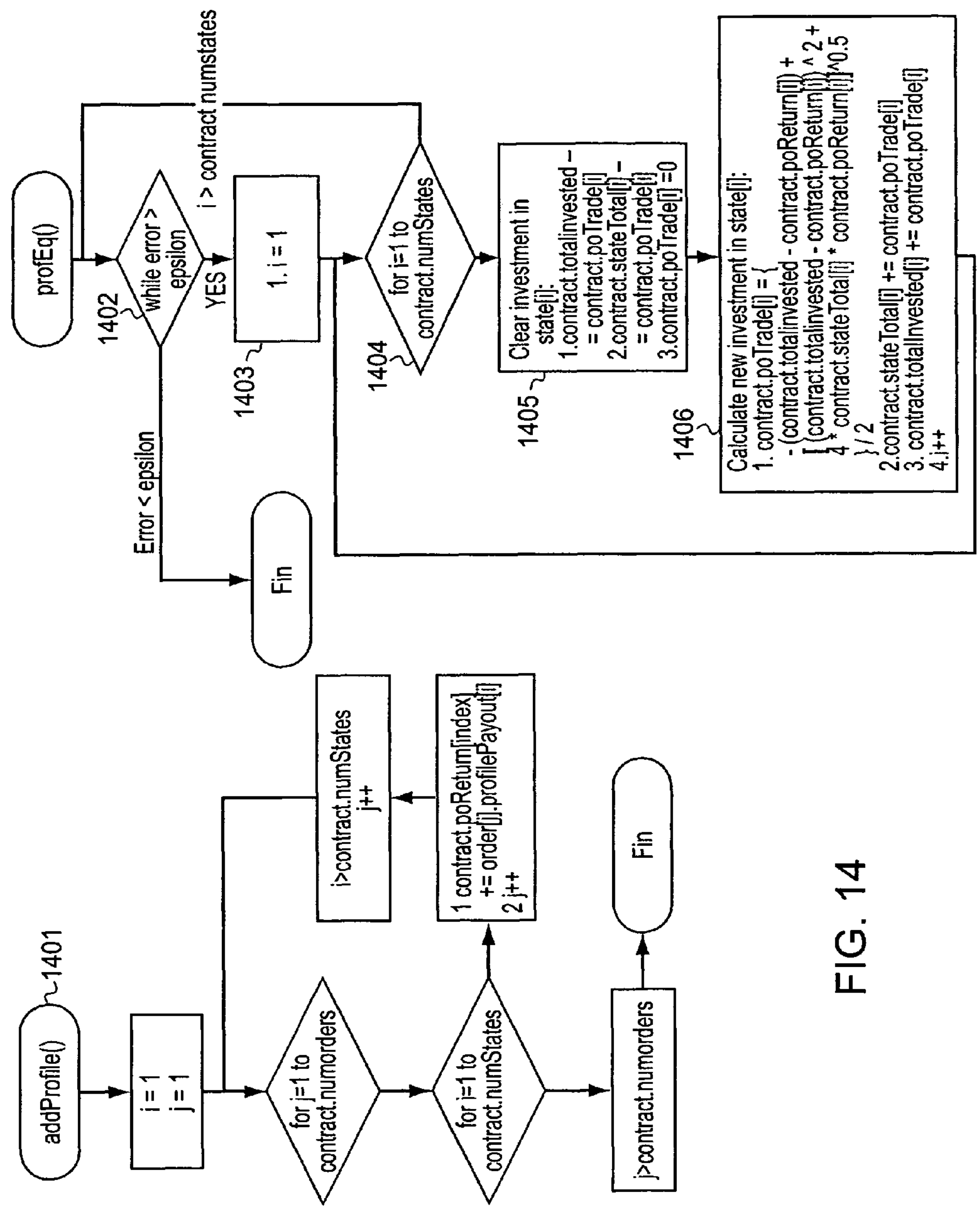
FIG. 14 depicts a preferred embodiment of a method for calculating a multistate profile equilibrium in a Demand-Based Adjustable Return Digital Options Exchange of the present invention.

In either embodiment, the investor specifies a desired return on investment from a designated set of defined states. A return on investment is the amount of value units received from the investment less the amount of value units invested, divided by the amount invested. In the embodiment depicted in FIG. 13, the amount of value units invested is specified and the amount of value units received, or the payout from the investment, is unknown until the termination criteria are fulfilled and the payouts are calculated. In the embodiment depicted in FIG. 14, the amount of value units to be paid out is specified but the investment amount to achieve that payout it is unknown until the termination criteria are fulfilled. The embodiment depicted in FIG. 13 is known, for example, as a composite trade, and the embodiment depicted in FIG. 14 is known, for example, as a profile trade.

Referring back to FIG. 13, step 1301 invokes a function call to the function profEq( ). This function handles those types of trades in which a desired return-on-investment for a designated set of defined states is specified by the trader indicating the payout amount to be received should any of the designated set of defined states occur. For example, a trader may indicate that a payout of $10,000 should be received should the MSFT digital calls struck at 40 finish in the money. Thus, if MSFT stock is observed at the expiration date to have a price of 45, the investor receives $10,000. If the stock price were to be below 40, the investor would lose the amount invested, which is calculated using the function profEq( ). This type of desired return-on-investment trade is referred to as a multistate profile trade, and FIG. 14 depicts the detailed logical steps for a preferred embodiment of the profEq( ) function. In preferred embodiments of a DBAR DOE of the present invention, there need not be any profile trades.

Referring back to FIG. 13, step 1302 initializes control loop counter variables. Step 1303 indicates a control loop that executes for each order. Step 1304 initializes the variable "norm" to zero and assigns the order being processed, order [j], to the order data structure. Step 1305 begins a control loop that executes for each of defined states that comprise a given order. For example, the MSFT digital call option with strike of 40 illustrated in Table 6.2.1 spans the five states that range from 40 and higher.

In the preferred embodiment depicted in FIG. 13, step 1306 executes while the number of states in the order are being processed to calculate of the variable norm, which is the weighted sum of the total investments for each state of the range of defined states which comprise the order. The weights are contained in order.ratio[i], which is a vector type member of the order data structure illustrated in FIG. 11 as previously described. For digital call options, whose payout is the same regardless of the defined state which occurs over the range of states for which the digital option is in the money, all of the elements of order.ratio[ ] are equal over the range. For trades involving digital strips, the ratios in order.ratio[ ] need not be equal. For example, a trader may desire a payout which is twice as great should a range of states occur compared to another range of states. The data member order.ratio[ ] would therefore contain information about this desired payout ratio.

In the preferred embodiment depicted in FIG. 13, after all of the states in the range of states spanning the order have been processed, the control loop counter variable is re-initialized in step 1307, step 1308 begins another control loop the defined states spanning the order. In preferred embodiments, step 1309 calculates the amount of the investment specified by the order that must be invested in each defined state spanning the range of states for the order. Sub-step 2 of step 1309 contains the allocation which is assigned to order.invest[i], for each of these states. This sub-step allocates the amount to be invested in an in-the-money state in proportion to the existing total investment in that state divided by the sum of all of the investment in the in-the-money states. Sub-steps 3 and 4 of step 1309 add this allocation to the investment totals for each state (contract.stateTotal[state]) and for all of the states (contract.totalInvested) after subtracting out the allocation from the previous iteration (temp). In this manner, the allocation steps proceed iteratively until a tolerable level of error convergence is achieved.

After all of the states in the order have been allocated in 1309, step 1310 of the preferred embodiment depicted in FIG. 13 calculates the "price" or implied probability of the order. The "price" of the order is equal to the vector product of the order ratio (a vector quantity contained in order.ratio[ ]) and the total invested in each state (a vector quantity contained in contract.stateTotal[ ]) divided by the total amount invested over all of the defined states (contained in contract.totalInvested), after normalization by the maximum value in the vector order.ratio[ ]. As further depicted in step 1310 the resulting "price" for the digital option; strip, or spread is stored in the price member of the order data structure (order-.price).

In the preferred embodiment of the method of multistate composite equilibrium calculation for a DBAR DOE of the present invention. Step 1311 moves the order processing step to the next order. After all of the orders have been processed, step 1312 of the preferred embodiment depicted in FIG. 13 calculates the level of error, which is based upon the percentage deviations of the payouts resulting from the previous iteration to the payouts expected by the trader. If the error is tolerably low (e.g., epsilon=$10^{-8}$), the compEq( ) function terminates (step 1314). If the error is not tolerably low, then compEq( ) is iterated again, as shown in step 1313.

FIG. 14 depicts a preferred embodiment of a method of multistate profile equilibrium calculation in a DBAR DOE of the present invention. As shown in FIG. 14, when a new multistate profile trade is added, the function addProfile( ) of step 1401 adds information about the trade to the data structure members of the contract data structure, as described above in FIG. 11. The first step of the profEq( ) function, step 1402, shows that the profEq( ) function proceeds iteratively until a tolerable level of convergence is achieved, i.e., an error below some error parameter epsilon (e.g., $10^{-8}$). If the error objective has not been met, in a preferred embodiment all of the previous allocations from any prior invocations of profEq( ) are subtracted from the total investments in each state and from the total investment for all of the states, as indicated in step 1405. This is done for each of the states, as indicated in control loop 1404 after initialization of the loop counter (step 1403).

In a preferred embodiment, the next step, step 1406, computes the investment amount necessary to generate the desired return-on-investment with a fixed payout profile substep 1 of 1406 shows that the investment amount required to achieve this payout profile for a state is a positive solution to the quadratic equation CDRF 3 set forth in Section 2.4 above. In the preferred embodiment depicted in FIG. 14, the solution, contract.poTrade[i], is then added to the total investment amount in that state as indicated in sub-step 2 of step 1406. The total investment amount for all of the states is also increased by contract.poTrade[i], and sub-step 4 of 1406 increments the control loop counter for the number of states. In the preferred embodiment depicted in FIG. 14, the calculation of the quadratic equation of sub-step 3 of step 1406 is completed for each of the states, and then repeated iteratively until a tolerable level of error is achieved.

Figure 15:
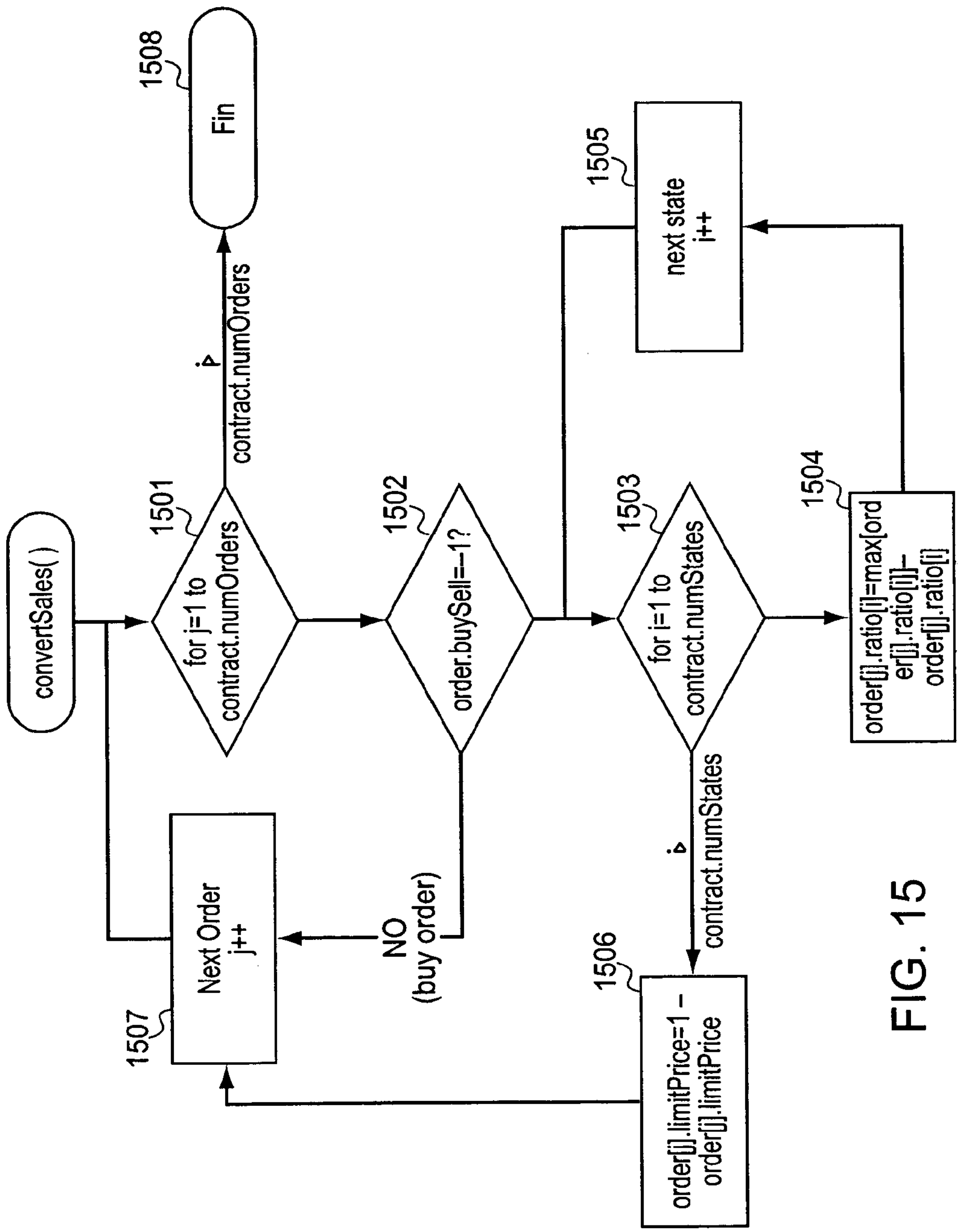
FIG. 15 depicts a preferred embodiment of a method for converting "sale" orders to buy orders in a Demand-Based Adjustable Return Digital Options Exchange of the present invention.

FIG. 15 depicts a preferred embodiment of a method for converting "sell" orders to buy orders in a DBAR DOE of the present invention. The method is contained in the function convertSales( ), called within the limit and market order processing steps, previously discussed with reference to FIG. 11.

As discussed above in a preferred embodiment of a DBAR DOE, buy orders and "sell" order are interpreted somewhat differently. The amount of a buy order (as contained in the data structure member order.orderAmount) is interpreted as the amount of the investment to be allocated over the range of states spanning the contingent claim specified in the order. For example, a buy order for 100,000 value units for an MSFT digital call with strike price of 60 (order.ratio[ ]=(0,0,0,0,1,1,1) in the MSFT stock example depicted in Table 6.2.1) will be allocated among the states comprising the order so that, in the case of a digital option, the same payout is received regardless of which constituent state of the range of states is realized. For a "sell" order the order amount (as also contained in the member data structure order.orderAmount) is interpreted to be the amount which the trader making the sale stands to lose if the contingent claim (i.e., digital option, spread, or strip) being "sold" expires in the money (i.e., any of the constituent states comprising the sale order is realized). Thus, the "sale" order amount is interpreted as a payout (or "notional" or "notional payout") less the option premium "sold," which is the amount that may be lost should the contingent claim "sold" expire in the money (assuming, that is, the entire order amount can be executed if the order is a limit order). A buy order, by contrast, has an order amount which is interpreted as an investment amount which will generate a payout whose magnitude is known only after the termination of trading and the final equilibrium prices finalized, should the option expire in the money. Thus, a buy order has a trade amount which is interpreted as in investment amount or option "premium" (using the language of the conventional options markets) whereas a DBAR DOE "sell" order has an order amount which is interpreted to be a net payout equal to the gross payout lost, should the option sold expire in the money, less the premium received from the "sale." Thus, in a preferred embodiment of a DBAR DOE, buy orders have order amounts corresponding to premium amounts, while "sell" orders have order amounts corresponding to net payouts.

One advantage of interpreting the order amount of the buy and "sell" orders differently is to facilitate the subsequent "sale" of a buy order which has been executed (in all or part) in a previous trading period. In the case where a subsequent trading period on the same underlying event of economic significance or state of a financial product is available, a "sale" may be made of a previously executed buy order from a previous and already terminated and finalized trading period, even though the observation period may not be over so that it is not known whether the option finished in the money. The previously executed buy order, from the earlier and finalized trading period, has a known payout amount, should the option expire in the money. This payout amount is known since the earlier trading period has ended and the final equilibrium "prices" have been calculated. Once a subsequent trading period on the same underlying event of economic significance is open for trading (if such a trading period is made available), a trader who has executed the buy order may then sell it by entering a "sell" order with an order. The amount of the "sell" order can be a function of the finalized payout amount of the buy order (which is now known with certainty, should the previously bought contingent claim expire in the money), and the current market price of the contingent claim being "sold." Setting this order amount of the "sale" equal to y, the trader may enter a "sale" such that y is equal to:

$$y=P*(1-q)$$

where P is the known payout from the previously finalized buy order from a preceding trading period, and q is the "price" of the contingent claim being "sold" during the subsequent trading period. In preferred embodiments, the "seller" of the contingent claim in the second period may enter in a "sale" order with order amount equal to y and a limit "price" equal to q. In this manner the trader is assured of "selling" his claim at a "price" no worse than the limit "price" equal to q.

Turning now to the preferred embodiment of a method for converting "sale" orders to buy orders depicted in FIG. 15, in step 1501 a control loop is initiated of orders (contract.numOrders). Step 1502 queries whether the order under consideration in the loop is a buy (order.buySell=1) or a "sell" order (order.buySell=−1). If the order is a buy order then no conversion is necessary, and the loop is incremented to the next order as indicated in step 1507.

If, on the other hand, the order is a "sell" order, then in preferred embodiments of the DBAR DOE of the present invention conversion is necessary. First, the range of states comprising the contingent claim must be changed to the complement range of states, since a "sale" of a given range of states is treated as equivalent to a buy order for the complementary range of states. In the preferred embodiment of FIG. 15, step 1503 initiates a control loop to execute for each of the defined states in the contract (contract.numStates), step 1504 does the switching of the range of states sold to the complementary states to be bought. This is achieved by overwriting the original range of states contained in order[j].ratio[ ] to a complement range of states. In this preferred embodiment, the complement is equal to the maximum entry for any state in the original order[j].ratio[ ] vector (for each order) minus the entry for each state in order[j].ratio[ ]. For example, if a trader has entered an order to sell 50-strike puts in MSFT example depicted in Table 6.2.1, then originally order.ratio[ ] is the vector (1,1,1,0,0,0,0), i.e., 1's are entered which span the states (0,30], (30,40], (40,50] and zeroes are entered elsewhere. To obtain the complement states to be bought, the maximum entry in the original order.ratio[ ] vector for the order is obtained. For the put option to be "sold," the maximum of (1,1,1,0,0,0,0) is clearly 1. Each element of the original order.ratio[ ] vector is then subtracted from the maximum to produce the complementary states to be bought. For this example, the result of this calculation is (0,0,0,1,1,1,1), i.e., a purchase of a 50-strike call is complementary to the "sale" of the 50-strike put. If for example, the original order was for a strip in which the entries in order.ratio[ ] are not equal, in a preferred embodiment the same calculation method would be applied. For example, a trader may desire to "sell" a payout should any of the same three states which span the 50-strike put occur, but desires to sell a payout of three times the amount of state (40,50] should state (0,30] occur and sell twice the payout of (40,50] should state (30,40] occur. In this example, the original order.ratio for the "sale" of a strip is equal to (3,2,1,0,0,0,0). The maximum value for any state of this vector is equal to 3. The complementary buy vector is then equal to each element of the original vector subtracted from the maximum, or (0,1,2,3,3,3,3,). Thus, a "sale" of the strip (3,2,1,0,0,0,0) is revised to a purchase of a strip with order.ratio[ ] equal to (0,1,2,3,3,3,3).

In the preferred embodiment depicted in FIG. 15, after the loop has iterated through all of the states (the state counter is incremented in step 1505) the loop terminates. After looping through all of the states, the limit order "price" of the "sale" must be revised so that it may be converted into a complementary buy. This step is depicted in step 1506, where the revised limit order "price" for the complementary buy is equal to one minus the original limit order "price" for the "sell". After finishing the switching of each state in order.ratio[ ] and setting the limit order "price" for each order, the loop which increments over the orders goes to the next order, as indicated in step 1507. The conversion of "sell" orders to buy orders terminates when all orders have been processed as indicated in step 1508.

Figure 16:
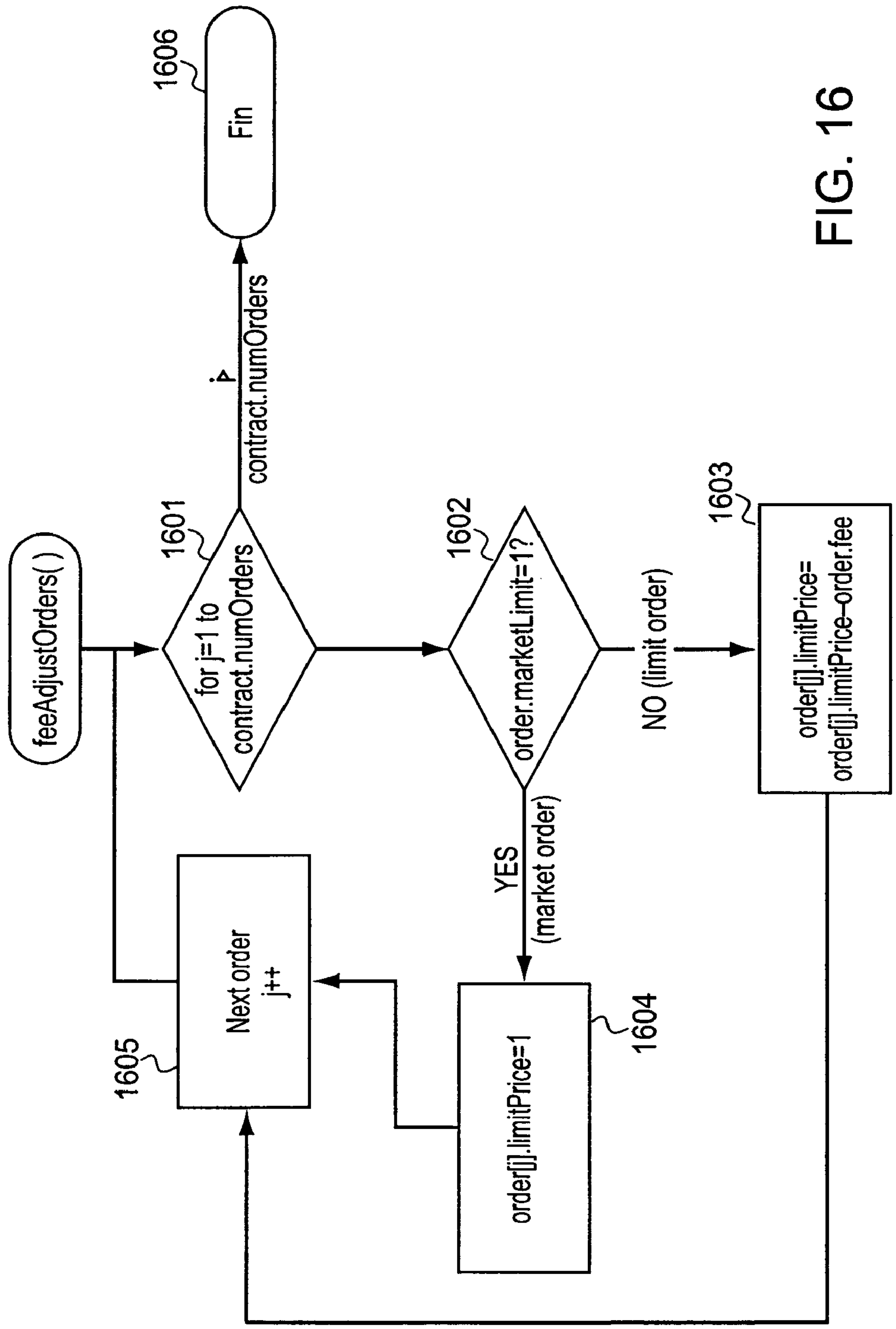
FIG. 16: depicts a preferred embodiment of a method for adjusting implied probabilities for demand-based adjustable return contingent claims to account for transaction or exchange fees in a Demand-Based Adjustable Return Digital Options Exchange of the present invention.

FIG. 16 depicts a preferred embodiment of a method for adjusting limit orders in the presence of transaction fees in a DBAR DOE of the present invention. The function which implements this embodiment is feeAdjustOrders( ), and is invoked in the method for processing limit and market orders depicted and discussed with reference to FIG. 11. Limit order are adjusted for transaction fees to reflect the preference that orders (after all "sell" orders have been converted to buy orders) should only be executed when the trader specifies that he is willing to pay the equilibrium "price," inclusive of transaction fees. The inclusion of fees in the "price" produces the "offer" price. Therefore, in a preferred embodiment, all or part of an order with a limit "price" which is greater than or equal to the "offer" price should be executed in the final equilibrium, and an order with a limit "price" lower than the "offer" price of the final equilibrium should not be executed at all. To ensure that this equilibrium condition obtains, in a preferred embodiment the limit order "prices" specified by the traders are adjusted for the transaction fee assessed for each order before they are processed by the equilibrium calculation, specifically the "add and prune" cycle discussed in Section 6 above and with reference to FIG. 17 below, which involves the recomputation of equilibrium "prices." Thus, the "add and prune" cycle is performed with the adjusted limit order "prices."

Referring back to FIG. 16, which discloses the steps of the function feeAdjustOrders( ), step 1601 initiates a control loop for each order in the contract (contract.numOrders). The next step 1602 queries whether the order being considered is a market order (order.marketLimit=1) or a limit order (order-.marketLimit=0). A market order is unconditional and in a preferred embodiment need not be adjusted for the presence of transaction fee, i.e., it is executed in full regardless of the "offer" side of the market. Thus, if the order is market order, its "limit" price or implied probability is set equal to one as shown in step 1604 (order[j].limitPrice=1). If the order being processed in the control loop of step 1601 is a limit order, then step 1603 revises the initial limit order by setting the new limit order "price" equal to the initial limit order "price" less the transaction fee (order.fee). In a preferred embodiment, this function is called after all "sell" orders have been converted to buy orders, so that the adjustment for all orders may involve only making the buy orders less likely to be executed by adjusting their respective limit "prices" down by the amount of the fee. After each adjustment is made, the loop over the orders is incremented, as shown in step 1605. After all of the orders have been processed, the function feeAdjustOrders( ) terminates as shown in step 1606.

FIG. 17 discloses a preferred embodiment of a method for filling or addition and removal of lots in a DBAR DOE of the present invention. The function fillRemoveLots( ), which is invoked in the central "add and prune" cycle of FIG. 1, is depicted in detail in FIG. 17. The function fillRemoveLots( ) implements the method of binary search to determine the appropriate number of lots to add (or "fill") or remove in the preferred embodiment depicted in FIG. 17, lots are filled or added when the function is called with the first parameter equal to 1 and lots are removed when the function is called with the first parameter equal to zero. The first step of function fillRemoveLots( ), is indicated in step 1701. If lots are to be removed, then the method of binary search will try to find the minimum number of lots to be removed such that the limit "price" of the order (order.limitPrice) is greater than or equal to the recalculated equilibrium "price" (order.price). Thus, if orders are to be removed, step 1701 sets the maxPremium variable to the number of lots which are currently filled in the order, and sets the minPremium variable to zero. In other words, in preferred embodiments in a first iteration the method of binary search will try to find a new number of lots somewhere on the interval between the currently filled number of lots and zero, so that the number of lots to be filled after the step is completed is the same or lower than the number of lots currently filled. If lots are to be filled or added, then the method of binary search sets the maxPremium variable to the order amount (order.amount) since this is the maximum amount that can be filled for any given order, and the minimum amount equal to the currently filled amount (minPremium=order.filled). That is, if lots are to be filled or added, the method of binary search will try to find the maximum number of lots that can be filled or added so that the new number of filled between the current number of lots filled and the number of lots requested in the order.

In the preferred embodiment depicted in FIG. 17, step 1702 bisects the intervals for binary search created in step 1701 by setting the variable midPremium equal to the mid point of the interval created in step 1701. A calculation of equilibrium "prices" or implied probabilities for the group of DBAR contingent claims equilibrium calculation will then be attempted with the number of lots for the relevant orders reflected by this midpoint, which will be greater than the current amount filled if lots are to be added and less than the current amount filled if lots are to be removed.

Step 1703 queries whether any change (to within a tolerance) in the mid-point of the interval has occurred between the last and current iteration of the process. If no change has occurred, a new order amount that can be filled has been found and is revised in step 1708, and the function fillRemoveLots( ) terminates in step 1709. If the is different from the midpoint of last iteration, then the new equilibrium is calculated with the greater (in the case of addition) or lower (in the case of removal) number of lots as specified in step 1702 of the binary search. In a preferred embodiment the equilibrium "prices" are calculated with these new fill amounts by the multistate allocation function, compEq( ), which is described in detail with reference to FIG. 13. After the invocation of the function compEq( ), each order will have a current equilibrium "price" as reflected in the data structure member order.price. The limit "price" of the order under consideration (order[j])) is then compared to the new equilibrium "price" of the order under consideration (order[j].price), as shown in step 1705. If the limit "price" is worse, i.e., less than the new equilibrium or market "price," then the binary search has attempted to add too many lots and tries again with fewer lots. The lesser number of lots with which to attempt the next iteration is obtained by setting the new top end of the interval being bisected to the number of lots just attempted (which turned out to be too large). This step is depicted in step 1706 of the preferred embodiment of FIG. 17. With the interval thus redefined and shifted lower, a new midpoint is obtained in step 1702, and a new iteration is performed. If, in step 1705, the newly calculated equilibrium "price" is less than or equal to the order's limit price, then the binary search will attempt to add or fill additional lots. In the preferred embodiment depicted in FIG. 17, the higher number of lots to add is obtained in step 1707 by setting the lower end of the search interval equal to the number of lots for which an equilibrium calculation was performed in the previous iteration. A new midpoint of the newly shifted higher interval is then obtained in step 1702, so that the another iteration of the search may be performed with a higher number of lots. As previously indicated, once further iterations no longer change the number of lots that are filled, as indicated in step 1703, the number of lots of the current iteration is stored, as indicated in step 1708, and the function fillRemoveLots( ) terminates, as indicated in step 1709.

Figure 18:
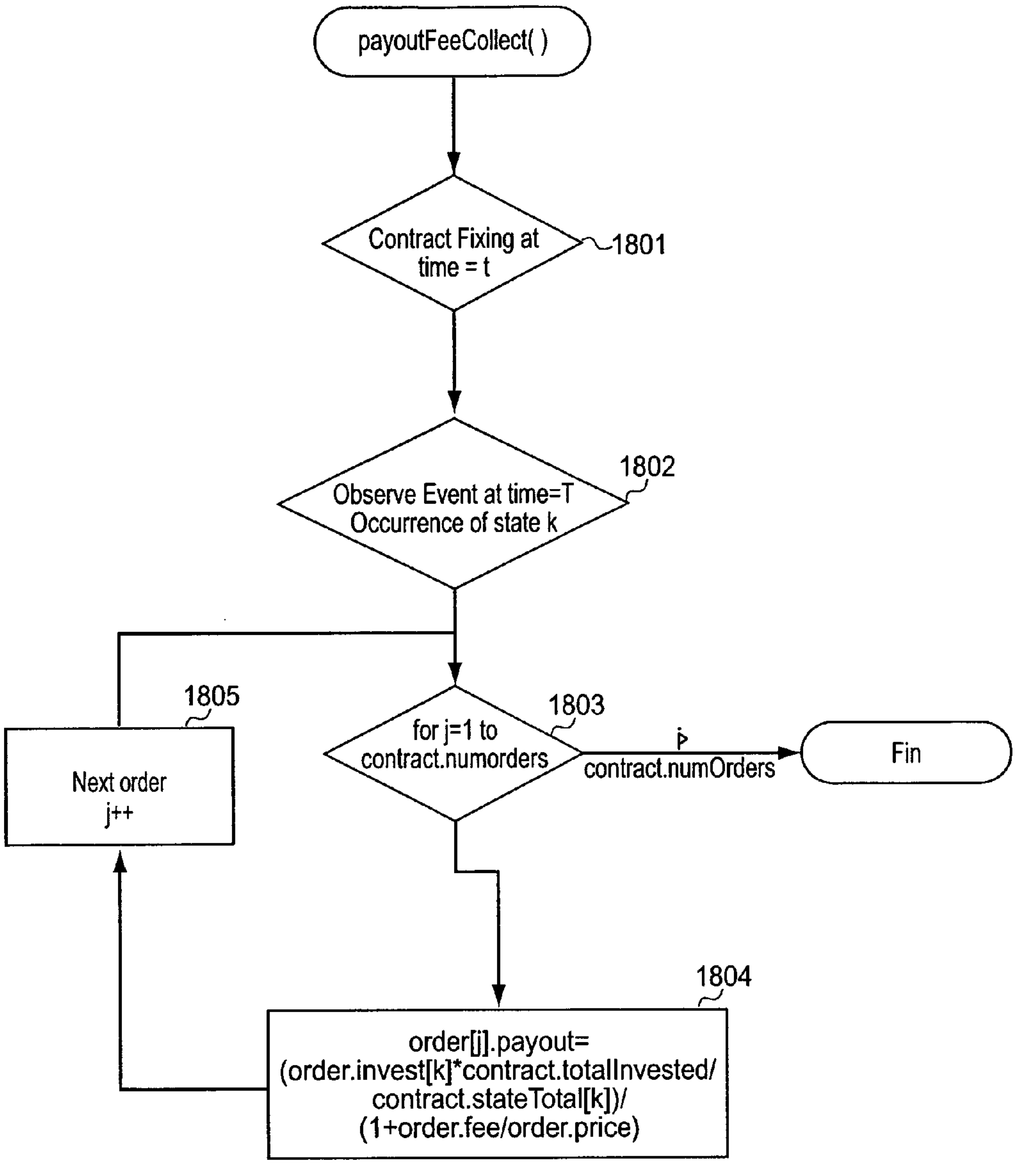
FIG. 18 depicts a preferred embodiment of a method of payout distribution and fee collection in a Demand-Based Adjustable Return Digital Options Exchange of the present invention.

FIG. 18 depicts a preferred embodiment of a method of calculating payouts to traders in a DBAR DOE of the present invention, once the realized state corresponding to the event of economic significance or state of a selected financial product is known. Step 1801 of FIG. 18 shows that the predetermined termination criteria with respect to the submission of orders by traders have been fulfilled, for example, the trading period has ended at a previous time (time=t) and the final contingent claim prices have been computed and finalized. Step 1802 confirms that the event of economic significance or state of a financial product has occurred (at a later time=T, where T≧t) and that the realized state is determined to be equal to state k. Thus, according to step 1802, state k is the realized state. In the preferred embodiment depicted in FIG. 18, step 1803 initializes a control loop for each order in the contract (contract.numOrders). For each order, the payout to the trader is calculated. In preferred embodiments, the payout is a function of the amount allocated to the realized state (order.invest[k]), the unit payout of the realized state (contract.totalInvested/contract.stateTotal[k]), and the transaction fee of the order as a percentage of the order price (order.fee/order.price). Other methods of allocating payouts net of transaction fees are possible and would be apparent to one of ordinary skill in the art.

The foregoing detailed description of the figures, and the figures themselves, are designed to provide and explain specific illustrations and examples of the embodiments of methods and systems of the present invention. The purpose is to facilitate increased understanding and appreciation of the present invention. The detailed description and figures are not meant to limit either the scope of the invention, its embodiments, or the ways in which it may be implemented or practiced.

In the embodiment described in Section 7, the DBAR DOE equilibrium is computed through a nonlinear optimization to determine the equilibrium executed amount for each order, $x_j$, in terms of the notional payout received should any state of the set of constituent states of a DBAR digital option occur (defined by B), such that limit orders can be accepted and processed which are expressed in terms of each trader's desired payout ($r_j$). The descriptions of FIGS. 19 and 20 that follow explain this process in detail. Other aspects of this and other embodiments of the present invention are depicted in FIGS. 21 to 25, referenced in Sections 3, 8 and 9 of this specification.

Generally speaking, in this embodiments as described in Section 7, the DBAR DOE equilibrium executed amount for the orders is arrived at by:

(i) inputting into the system how many orders (n) and how many states (in) are present in the contract;

(ii) for each order j, accepting specifications for order or trade including: (1) if the order is a buy order or a "sell" order; (2) requested notional payout size ($r_j$); (3) if the order is market order or limit order; (4) limit order price ($w_j$) (or if order is market order, then $w_j$=1); (5) the payout profile or set of defined states for which desired digital option is in-the money (row j in matrix B); and (6) the transaction fee ($f_j$).

(iii) loading contract and order data structures;

(iv) placing opening orders (initial invested premium for each state, $k_i$);

(v) converting "sell" orders to complementary buy orders simply by identifying the range of complementary states being "sold" and, for each "sell" order j, adjusting the limit "price" ($w_j$) to one minus the original limit "price" ($1-w_j$);

(vi) adjusting the limit "price" to incorporate the transaction fee to produce an adjusted limit price $w_j^a$ for each order j;

(vii) grouping the limit orders by placing all of the limit orders which span or comprise the same range of defined states into the same group;

(viii) sorting the orders upon the basis of the limit order "prices" from the best (highest "price" buy) to the worst (lowest "price" buy);

(ix) establishing an initial iteration step size, $\alpha_j(1)$, the current step size, $\alpha_j(\kappa)$, will equal the initial iteration step size, $\alpha_j(1)$, until and unless adjusted in step (xii);

(x) calculating the equilibrium to obtain the total investment amount T and the state probabilities, p's, using Newton-Raphson solution of Equation 7.4.1(b);

(xi) computing equilibrium order prices ($\pi_j$'s) using the p's obtained in step (viii);

(xii) incrementing the orders ($x_j$) which have adjusted limit prices ($w_j^a$) greater than or equal to the current equilibrium price for that order ($\pi_j$) from step (ix) by the current step size $\alpha_j(\kappa)$ (xiii) decrementing the orders ($x_j$) which have limit prices ($w_j$) less than the current equilibrium price for that order ($\pi_j$) from step (ix) by the current step size: $\alpha_j(\kappa)$;

(xiv) repeating steps (ix) to (xii) in subsequent iterations until the values obtained for the executed order notional payouts achieve a desired convergence, adjusting the current step size $\alpha_j(\kappa)$ and/or the iteration process after the initial iteration to further progress towards the desired convergence;

(xv) achieving a desired convergence (along with a final equilibrium of the prices p's and the total premium invested T) of the maximum executed notional payout orders $x_j$ when predetermined convergence criteria are met;

(xvi) taking the "prices" resulting from the solution final equilibrium resulting from step (xiii) and adding any applicable transaction fee to obtain the offer "price" for each respective contingent claim ordered and subtracting any applicable transaction fee to obtain the bid "price" for each respective contingent claim ordered; and (xvii) upon fulfillment of all of the termination criteria related to the event of economic significance or state of a selected financial product, allocating payouts to those orders which have investments on the realized state, where such payouts are responsive to the final equilibrium "prices" of the orders' contingent claims and the transaction fees for such orders.

Referring to FIG. 19, illustrative data structures are depicted which may be used to store and manipulate the data relevant to the DBAR DOE embodiment described in Section 7 (as well as other embodiments of the present invention): data structures for a "contract" (1901), for a "state" (1902) and for an "order" (1903). Each data structure is described below, however it is understood that depending on the actual implementation of the stepping iterative algorithm, different data members or additional data members may be used to solve the optimization problem in 7.7.1.

The data structure for a "contract" or group of DBAR contingent claims, shown in 1901, includes data members which store data which are relevant to the construction of the DBAR DOE contract or group of claims under the embodiment described in Section 7 (as well under other embodiments of the present invention). Specifically, the contract data structure includes the following members (also listing the variables denoted by such members as described above, if any, and proposed member names for later programming the stepping iterative algorithm):

(i) the number of defined states i (m, contract.numStates);

(ii) the total premium invested in the contract (T, contract-.totalInvested);

(iii) the number of orders j (n, contract.numOrders);

(iv) a list of the orders and each order's data (contract.orders[ ]); and (v) a list of the states and each state's data (contract.states[ ]).

The data structure for a "state", shown in 1902, includes data members which store data which are relevant to the construction of each DBAR DOE state (or spread or strip) under the embodiment described in Section 7, as well as under other embodiments of the present invention. Specifically, each state data structure includes the following members (also listing the variables denoted by such members as described above, if any, and proposed member names for later programming the stepping iterative algorithm):

(i) the total premium invested in each state i ($T_i$, state.stateTotal);

(ii) the executed notional payout per defined state i ($y_i$, state.poReturn[ ]);

(iii) the price/probability for each state i ($p_i$, state.statePrice); and (iv) the initial invested premium for each state i to initialize the contract ($k_i$, state.initialState).

The data structure for an "order", shown in 1903, includes data members which store data which are relevant to the construction of each DBAR DOE order under the embodiment described in Section 7, as well as under other embodiments of the present invention. Specifically, each order data structure includes the following members (also listing the variables denoted by such members as described above, if any, and proposed member names for later programming the stepping iterative algorithm):

(i) the limit price for each order j ($w_j$, order.limitPrice);

(ii) the executed notional payout per order j, net of fees, after all predetermined termination criteria have been met (x, order.executedPayout);

(iii) the equilibrium price/probability for each order j ($\pi_j$, order.orderPrice);

(iv) the payout profile for each order j (row j of B, order-.ratio[ ]), specifically it is a vector which specifies the type of contingent claim to be traded (order.ratio[ ]). For example, in an embodiment involving a contract with seven defined states, an order for a digital call option which would expire in the money should any of the last four states occur would be rendered in the data member order ratio[ ] as order.ratio[0,0,0,1,1,1,1] where the 1's indicate that the same payout should be generated by the multistate allocation process when the digital option is in the money, and the 0's indicate that the option is out of the money, or expires on one of the respective out of the money states. As another example, a spread which is in the money should states either states 1,2, 6, or 7 occur would be rendered as order.ratio[1,1,0,0,0,1,1]. As another example, a digital option strip, which allows a trader to specify the relative ratios of the final payouts owing to an investment in such a contingent claim would be rendered using the ratios over which the strip is in the money. For example, if a trader desires a strip which pays out three times much as state 3 should state 1 occur, and twice as much as state 3 if state 2 occurs, the strip would be rendered as order.ratio[3,2,1,0,0,0,0]. In other words, the vector stores integers which indicate the range of states in which an investment is to be made in order to generate the payout profile of the contingent claim desired by the trader placing the order.

(v) the transaction fee for each order j ($f_j$, order.fee);

(vi) the requested notional payout per order j ($r_j$, order.requestedPayout);

(vii) whether order j is a limit order whose viability for execution is conditional upon the final equilibrium "price" being below the limit price after all predetermined termination criteria have been met, or whether order j is a market order, which is unconditional (order-.marketLimit=0 for a limit order, =1 for a market order);

(viii) whether order j is a buy order or a "sell" order (order-.buySell=1 for a buy, and 1 for a "sell"); and (ix) the difference between market price and limit price per order j ($g_j$, order.priceGap).

Figure 20:
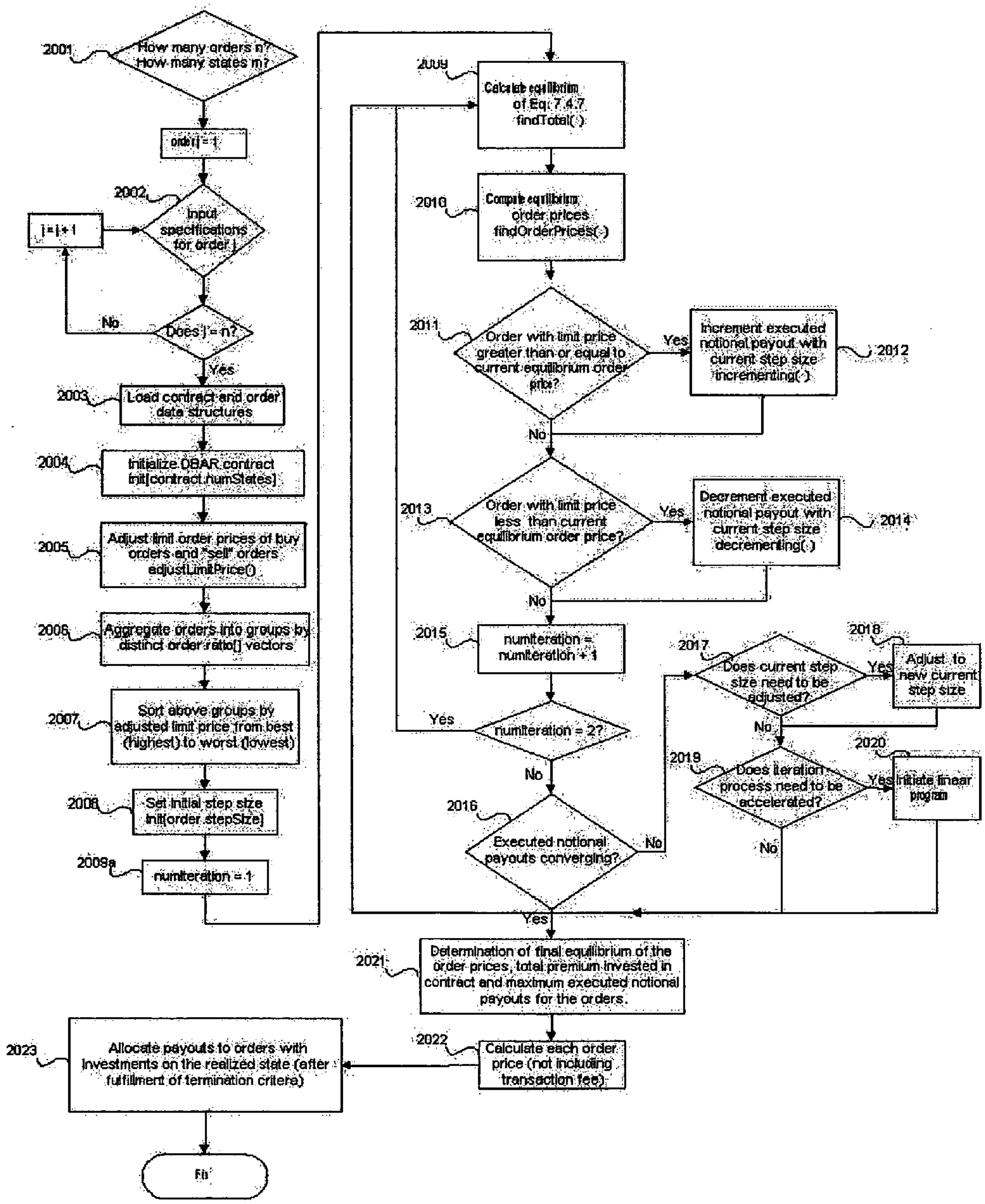
FIG. 20 depicts another embodiment of a method for processing limit and market orders in another embodiment of a Demand-Based Adjustable Return Digital Options Exchange of the present invention.

FIG. 20 depicts a logical diagram of the basic steps for limit and market order processing in the embodiment of a DBAR DOE described in Section 7, which can be applied to other embodiments of the present invention. Step 2001 of FIG. 20 inputs into the system how many orders (contract.numOrders) and how many states (contract.numStates) are present in the contract. Then, in step 2002, the computer system accepts specifications from the trader or user for each order, including: (1) if order is a buy order or a "sell" order (order.buySell); (2) requested notional payout size (order.requestedPayout); (3) if order is market order or limit order (order.marketLimit); (4) limit order price (order.limitPrice) (or if order is market order, then order.limitprice=1); (5) the payout profile or set of defined states for which desired digital option is in-the money (order.ratio[ ]); and (6) transaction fee (order.fee).

Step 2003 of FIG. 20 loads the relevant data into the contract, state and order data structures of FIG. 19. The initial value of order.executedPayout and state.poReturn are set at zero.

Step 2004 initializes the set of DBAR contingent claims, or the "contract," by placing initial amounts of value units (i.e., initial liquidity) in each state of the set of defined states. The placement of initial liquidity avoids a singularity in any of the defined states (e.g., an invested amount in a given defined state equal to zero) which may tend to impede multistate allocation calculations. The initialization of step 2004 may be done in a variety of different ways. In this embodiment, a small quantity of value units is placed in each of the defined states. For example, a single value unit ("lot") may be placed in each defined state where the single value unit is expected to be small in relation to the total amount of volume to be transacted. In step 2004 of FIG. 20, the initial value units are represented in the vector init[contract.numStates].

In this embodiment, step 2005 of FIG. 20 invokes the function adjustLimitPrice( ), which converts the limit order price of the "sell" orders to the limit order price of complementary buy orders, and adjusts the limit order prices to account for the transaction fee charged for the order (subtracting the fee from the limit order price for a buy order and subtracting the fee from the converted limit order price for a "sell" order). After the completion of step 2005, all of the limit order prices for contingent claims—whether buy or "sell" orders, can be processed; as buy orders together, and the limit order prices are adjusted with fees for the purpose of the ensuing equilibrium calculations.

In this embodiment, step 2006 groups these buy orders based upon the distinct ranges of states spanned by the contingent claims specified in the orders. The range of states comprising the order are contained in the data member order.ratio[ ] of the order data structure 1903 depicted in FIG. 19. As with the DBAR DOE embodiment discussed in section 6 and FIG. 12 above and other embodiments of the present invention, each distinct order[j].ration[ ] vector in step 2006 in FIG. 20 is grouped separately from the others in step 2006. Two order[j].ratio[ ] vectors are distinct for different orders when their difference yields a vector that does not contain zero in every element. For example, for a contract which contains seven defined states, a digital put option which spans that first three states has an order[1].ratio[ ] vector equal to (1,1,1,0,0,0,0). A digital call option which spans the last five states has an order[2].ratio[ ] vector equal to (0,0,1,1,1,1,1). Because the difference of these two vectors is equal to (1,1, 0,−1,−1,−1,−1), these two orders should be placed into distinct groups, as indicated in step 2006.

In this embodiment, step 2006 aggregates orders into relevant groups for processing. For the purposes of processing limit orders: (i) all orders may be treated as limit orders since orders without limit "price" conditions, e.g., "market orders," can be rendered as limit buy orders (including "sale" orders converted to buy orders in step 2005) with limit "prices" of 1, and (ii) all order sizes are processed by treating them as multiple orders of the smallest value unit or "lot."

The relevant groups of step 2006 of FIG. 20 are termed "composite" since they may span, or comprise, more than one of the defined states. For example, the MSFT Digital Option contract depicted above in Table 6.2.1 has defined states (0,30], (30,40], (40,50], (50,60], (60, 70], (70, 80], and (80, 00]. The 40 strike call options therefore span the five states (40,50], (50,60], (60, 70], (70, 80], and (80,00]. A "sale" of a 40 strike put, for example, would be aggregated into the same group for the purposes of step 2004 of FIG. 20, because the "sell" limit order of a 40 strike put has been converted at step 2005 into a complementary buy order of a 40 strike call simply by converting the limit order price for the put order into the complementary limit order price of the call order.

Similar to step 1206 of DBAR DOE embodiment described with reference to FIG. 12, at the point of step 2007 of this embodiment shown in FIG. 20, all of the orders may be processed as buy orders (because any "sell" orders have been converted to buy orders in step 2005 of FIG. 20) and all limit "prices" have been adjusted (with the exception of market orders which, in an embodiment of the DBAR DOE or other embodiments of the present invention, have a limit "price" equal to one) to reflect transaction costs equal to the fee specified for the order's contingent claim (as contained in the data member order[j].fee).

In this embodiment, step 2007 sorts each group's orders based upon their fee-adjusted limit "prices," from best (highest "prices") to worst (lowest "prices"). The grouped orders follow the same aggregation as illustrated in Diagram 1 above, and in Section 6. Step 2008 establishes an initial iteration step size, init[order.stepSize], the current step size, order.stepSize, will equal the initial iteration step size until and unless adjusted in step 2018.

Initially as part of a first iteration (numIteration=1) (2009*a*), and later as part of subsequent iterations, step 2009 invokes the function findTotal( ) which calculates the equilibrium of Equation 7.4.7 to obtain the total investment amount (contract.totalInvested) and the state probabilities (state.statePrice). Step 2010 invokes the function findOrderPrices( ) which computes the equilibrium order prices (order.orderPrice) using the state probabilities (state.statePrice) obtained in step 2009. The equilibrium order price for each order (order.orderPrice) is equal to the payout profile for the order (order.ratio[ ]) multiplied with a vector made up of the probabilities for all states i (state.statePrice[contract.numStates]).

Proceeding with the next step of this embodiment depicted in FIG. 20, step 2011 queries whether there is at least a single order which has a limit "price" which is "better" than the current equilibrium "price" for the ordered option. In this embodiment, for the first iteration of step 2011 for a trading period for a group of DBAR contingent claims, the current equilibrium "prices" reflect the placement of the initial liquidity from step 2004. Step 2012 invokes the incrementing( ) function, which increments the executed notional payout (order.executedPayout) with the current step size (order.stepSize) for each order which has a limit price (order.limitPrice) greater than or equal to the current equilibrium price for that order (order.orderPrice) obtained from step 2010 (however, in this embodiment, such incrementing should not exceed the order's requested payout $r_j$).

Similarly, step 2013 queries whether there is at least a single order which has a limit "price" which is "worse" than the current equilibrium "price" for the ordered option. Step 2014 invokes the decrementing( ), function, which decrements the executed notional payout (order.executedPayout) with the current step size (order.stepSize) for each order which has a limit price (order.limitPrice) less than the current equilibrium price for that order (order.orderPrice) obtained from step 2010 (but, in this embodiment, such decrementing should not produce an executed order payout below zero).

This embodiment of the DBAR DOE (described in Section 7) simplifies the complex comparison and removes the necessity of the "add" and "prune" method for buy and "sell" orders in the DBAR DOE embodiment described in Section 6. In this embodiment (depicted in FIG. 20), once the limit order price for "sell" orders has been converted to a complementary limit order price for a buy order, with both types of orders already being expressed in terms of payout, the notional payout executed for either a buy or a "sell" order (order.executedPayout) is simply incremented by the current step size (order.stepSize) if the limit order price (order.limitPrice) is greater than or equal to the current equilibrium price (order.orderPrice), and decremented by the current step size (order.stepSize) if the limit order price (order.limitPrice) is less than the current equilibrium price (order.orderPrice).

In step 2015, the counter for the iteration (numIteration) is incremented by 1. Repeat steps 2009 to 2014 for a second iteration (until numIteration=3). Step 2016 queries whether the quantities calculated for the executed notional payouts for the orders (order.executedPayout) are converging, and whether the convergence needs to be accelerated. If the executed notional payouts calculated in 2014 are not converging or the convergence needs to be accelerated, step 2017 queries if the step size (order.stepSize) needs to be adjusted. If the step size needs to be adjusted, step 2018 adjusts the step size (order.stepSize). Step 2019 queries if the iteration process needs to accelerated. Step 2020 initiates a linear program if the iteration process needs to be accelerated. Then, the iteration process (steps 2009 to 2014) is repeated, again.

However, if after step 2016, the quantities calculated for the executed notional payouts for the orders (order.executedPayout) have converged (according to some possibly predetermined or dynamically determined convergence criteria), then the iteration process is complete, and the desired convergence has been achieved in step 2021, along with a final equilibrium of the order prices (order.orderPrice) and total premium invested in the contract (contract.totalInvested), and determination of the maximum executed notional payouts for the orders (order.executedPayout).

In step 2022, the order price, not including transaction fees, is calculated by adding any applicable transaction fee (order.fee) to the equilibrium order price (order.orderPrice) to produce the equilibrium offer price, and subtracting any applicable transaction fee (order.fee) to the equilibrium order price (order.orderPrice) to produce the equilibrium bid price.

In step 2023, upon fulfillment of all of the termination criteria related to the event of economic significance or state of a selected financial product, allocating payouts to those orders which have investments on the realized state, where such payouts are responsive to the final equilibrium "prices" of the orders' contingent claims (order.orderPrice) and the transaction fees for such orders (order.fee).

The steps and data structures described above and shown in FIGS. 11 to 25 for embodiments of DBAR digital options (discussed, for example, in Sections 6 and 7 herein) and an embodiment of a demand-based market or auction for structured financial products (discussed, for example, in Section 9 herein), can be implemented within the computer system described above in reference to FIGS. 1 to 10, as well as in other embodiments of the present invention. The computer system can include one or more parallel processors to run, for example, the linear program for the optimization solution (Section 7), and/or to run one or more functions in the DRF or OPF in parallel with a main processor in the acceptance and processing of any DBAR contingent claims, including digital options. For DBAR digital options, in addition to determining and allocating a payout at the end of the trading period, the trader or user or investor specifies and inputs a desired payout, a selected outcome and a limit order price (if any) into the system during the trading period, and the system determines the investment amount for the order at the end of the trading period along with an allocation of payouts. In other words, the processor and other components (including computer usable medium having computer readable program code, and computer usable information storage medium encoded with a computer-readable data structure) causes the computer system to accept inputs of information related to a DBAR digital option or to other DBAR contingent claims, perhaps by way of a propagated signal or from a remote terminal by way of the Internet or a private network with dedicated circuits, including each trader's identity, and the desired payout, payout profile, and limit price for each order, then throughout the trading period the computer system updates the allocation of payouts per order and the investment amounts per order, and communicates these updated amounts to the trader (and, in the case of other DBAR contingent claims, inputted information may include the investment amount so that the computer system can allocate payouts per defined state). At the end of the trading period, the computer system determines a finalized investment amount per order (for DBAR digital options) and allocation of payouts per order if the states selected in the order become the states corresponding to the observed outcome of the event of economic significance. In the above DBAR digital option embodiments, the orders are executed after the end of the trading period at these finalized amounts. The determination of the investment amount and payout allocation can be accomplished using any of the embodiments disclosed herein, alone or in combination with each other.

Additionally, the implementations in a computer system (or with a network implementation) of the methods described herein to determine the investment amount and payout allocation as a function of the desired payout, selected outcomes, and limit order prices for each order placed in a DBAR digital options market or auction (or to determine the payout as a function of the selected outcomes, and investment amounts for each order in other embodiments of DBAR contingent claims), can be used by a broker to provide financial advice to his/her customers by helping them determine when they should invest in a DBAR digital options market or auction based on the type of return they would like to receive, the outcomes they would like to select, and the limit order price (if any) that they would like to pay or if they should invest in another DBAR contingent claim market or auction based on the amount they would like to invest, their selected outcomes and other information as described herein.

Similarly, the implementations and methods described herein can be used by an investor as a method of hedging for any of the types of economic events (including any underlying economic events or measured parameters of an underlying economic event as discussed above, including Section 3). Hedging involves determining an investment risk in an existing portfolio (even if it includes only one investment) or determining a risk in an asset portfolio (a risk in a lower farm output due to bad weather, for example), and offsetting that risk by taking a position in a DBAR digital option or other DBAR contingent claim that has an opposing risk. On the flip side, if a trader is interested in increasing the risk in an existing portfolio of investments or assets, the DBAR digital option or other DBAR contingent claim is a good tool for speculation. Again, the trader determines the investment risk in their asset or investment portfolio, but then takes a position in DBAR digital option or other DBAR contingent claim with a similar risk.

The DBAR digital option described above is one type of instrument for trading in a demand-based market or auction. The digital option sets forth designations of information which are the parameters of the option (like a coupon rate for a Treasury bill), such as the payout profile (corresponding to the selected outcomes for the option to be in-the-money), the desired payout of the option, and the limit order price of the option (if any). Other DBAR contingent claims described above are other types of instruments for trading in a demand-based market or auction. They set forth parameters including the investment amount and the payout profile. All instruments are investment vehicles providing investment capital into a demand-based market or auction in the manner described herein.

The replication of derivatives strategies and financial products, and the enablement of trading derivatives strategies and financial products in demand-based markets or auctions shown in FIGS. 26, 27A-27C and 28A-28C (discussed, for example, in Section 10 herein), can also be implemented within the computer system described above in reference to FIGS. 1 to 25, as well as in other embodiments of the present invention. The computer system can include one or more parallel processors to run, for example, a replication solution for derivatives strategies or financial products, and/or to run one or more functions in the DRF or OPF in parallel with a main processor in the acceptance and processing of any replicated derivatives strategies, financial products and DBAR contingent claims, including digital options. The processor and other components (including computer usable medium having computer readable program code, and computer usable information storage medium encoded with a computer-readable data structure) causes the computer system to accept inputs of information related to a replicated derivatives strategy and/or to DBAR contingent claims, perhaps by way of a propagated signal or from a remote terminal by way of the Internet or a private network with dedicated circuits, including each trader's identity, one or more parameters of a derivatives strategy and/or financial product in each order, then throughout the trading period the computer system updates the allocation of payouts and prices or investment amounts per order, and communicates these updated amounts to the trader. At the end of the trading period, the computer system determines a finalized investment amount per order (for replicated derivatives strategies and/or financial products) and allocation of payouts per order if the states selected in the order become the states corresponding to the observed outcome of the event of economic significance. In the above replicated derivatives strategy and/or financial product embodiments, the orders are executed after the end of the trading period at these finalized amounts. The determination of the investment amount and payout allocation for each contingent claim in the replication set for the derivatives strategy and/or financial product can be accomplished using any of the embodiments disclosed herein, alone or in combination with each other.

The implementations in a computer system (or with a network implementation) of the methods described herein to determine the investment amounts and payout allocation for replicated derivatives strategies and/or financial products, can also be used by a broker to provide financial advice to his/her customers by helping them determine when they should invest in a derivatives strategy and/or financial product in a demand-based market or other type of market based on the type of return they would like to receive, the outcomes they would like to select, and the limit order price (if any) that they would like to pay or the amount they would like to invest for the derivatives strategy and/or financial product, and other information as described herein.

The implementations and methods described herein can also be used by an investor as a method of hedging for any of event (including any underlying event or measured parameters of an underlying event as discussed above, including Section 10). Hedging involves determining an investment risk in an existing portfolio (even if it includes only one investment) or determining a risk in an asset portfolio, and offsetting that risk by taking a position in a replicated derivatives strategy and/or financial product that has an opposing risk. On the flip side, if a trader is interested in increasing the risk in an existing portfolio of investments or assets, the replicated derivatives strategy and/or financial product is a good tool for speculation. Again, the trader determines the investment risk in their asset or investment portfolio, but then takes a position in a replicated derivatives strategy and/or financial product with a similar risk.

13. DBAR SYSTEM ARCHITECTURE (AND THE DETAILED DESCRIPTION OF THE DRAWINGS IN FIGS. 32 TO 68)

13.1 Terminology and Notation

The following terms shall have the meanings set forth below:

- Auction—DBAR auction.
- Event—Underlying event for a DBAR auction.
- User—Someone who accesses the system using a web browser.
- Group—All customer and administrator users must belong to a group; members of a group are allowed to view and modify each other's orders.
- Desk—the system configuration.
- State—the term "state" as used in this section means the condition of being or phase for a given auction and is different from the meaning of "state" in previous sections.
- Transaction—there can be four types of transactions in the system: auction, event, user and group. Generally when a transaction is not qualified with one of these, it is assumed to be an auction transaction. Each are defined in more detail below:
  - Auction transaction—these, are of the type: auction configuration (add, replace), order (add/modify/cancel), state change (open, close, cancel, finalize) or final report. All events for an auction are kept together in a directory and are numbered sequentially.
  - Event transaction—create event. They are deleted very carefully when the system is offline to prevent referential integrity issues.
  - User transactions—create/modify user.
  - Group transactions—create/modify group.

The notation used for flowcharts and pseudo-code is defined in the legend in section 13.12.1

13.2 Overview

This document describes an example embodiment of an electronic DBAR (or demand-based) trading system used to provide a system implementation of the embodiment described in Section 11. This example embodiment of an electronic DBAR trading system can also be used with respect to the other embodiments of a DBAR auction described in this specification. In this example embodiment, users access the system over the internet through the https protocol using commonly available web browsers. The system provides for three types of users:

Public—can view auction information, prices and distributions without logging in.

Customers—can login and view auction information, prices, distribution, and order summary, and can place orders.

Administrators—can create users, events, groups and DBAR auctions, control auctions, and request auction reports to be used for order execution at the end of an auction.

The system provides users with real-time pricing and order fill updates as new orders are received. The system is designed to minimize the time between when a new order is accepted and when the pricing and order fills that reflect the effect of that order are available for display to all users. This time is typically less than five seconds. This is achieved through the use of a fast in-memory database and a highly optimized implementation of the core algorithm. A key element in providing this rapid level of response is that the core algorithm must run on the fastest available microprocessor, in particular one that has excellent floating point performance such as the Intel Pentium 4. Since the algorithm is compute-bound, typically an entire processor is dedicated for equilibrium calculations.

The system also guarantees that the prices and order fills do not violate the parimutuel equilibrium by more than a system specified (economically insignificant) amount. This is done by taking the results of an equilibrium calculation and checking it using 'run-time constraints', confirming that the mathematical requirements of the system are met, as summarized in section 11.4. These constraints check that:

the prices of the replication claims are positive (equation 11.4.3A) and sum to one (equation 11.4.3B);

option prices are weighted sums of the replication prices (equation 11.4.3C);

the limit price logic is met for buys and sells (equation 11.4.4C); and the self-hedging condition of equation 11.4.5E is met for all outcomes of the underlying U to within either a 1,000 currency units or 1 basis point of replicated premium M (defined in equation 11.4.5A).

The system will not publish prices and fills that do not meet these constraints, thus assuring that the user will not see prices which are invalid due to a calculation error.

The system also provides a "limit order book" for each option in an auction. This feature is unique to this type of marketplace and implementation in that it provides the user with real-time information on the fill volume that the system would provide in buying or selling an option at a price above or below the current market price. While this seems much like the traditional limit order book in a continuously traded market, it is different in that the system does not require proposed sells to match with existing buys or proposed buys to be matched with existing sells of the same option.

The system runs using a highly redundant network of servers whose access to the internet is controlled by firewalls. Specifically, the system is redundant in the following ways:

Geographically diverse and redundant data centers;

Multiple connections to the internet using multiple carriers;

All network devices are redundant eliminating all single points of failure with automatic failover; and All servers are redundant eliminating all single points of failure with a combination of automatic and manual failover.

13.3 Application Architecture

Figure 32B:
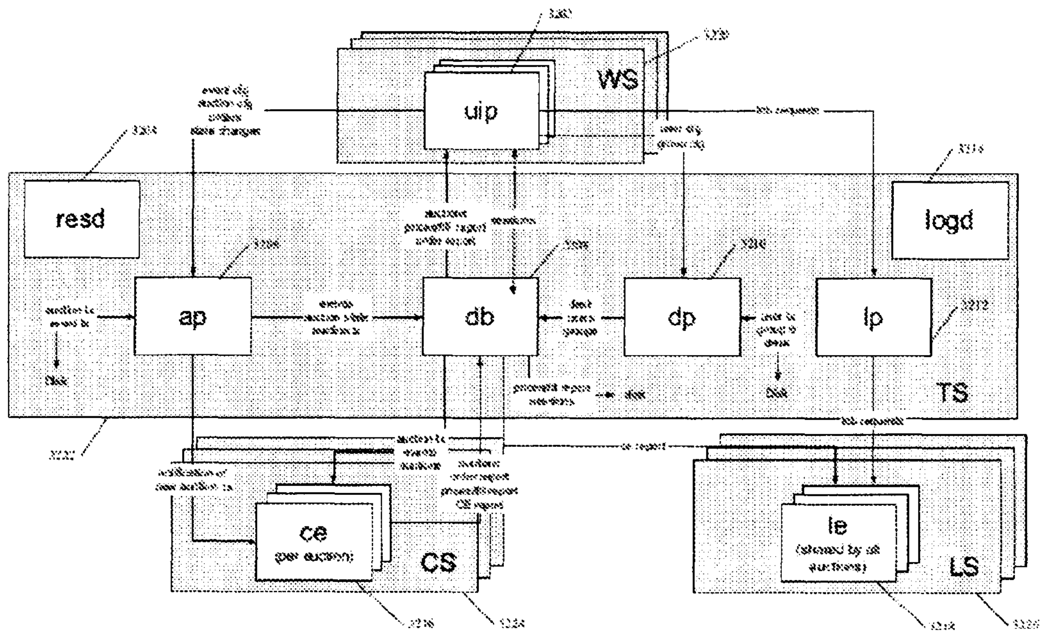
Figure 70:
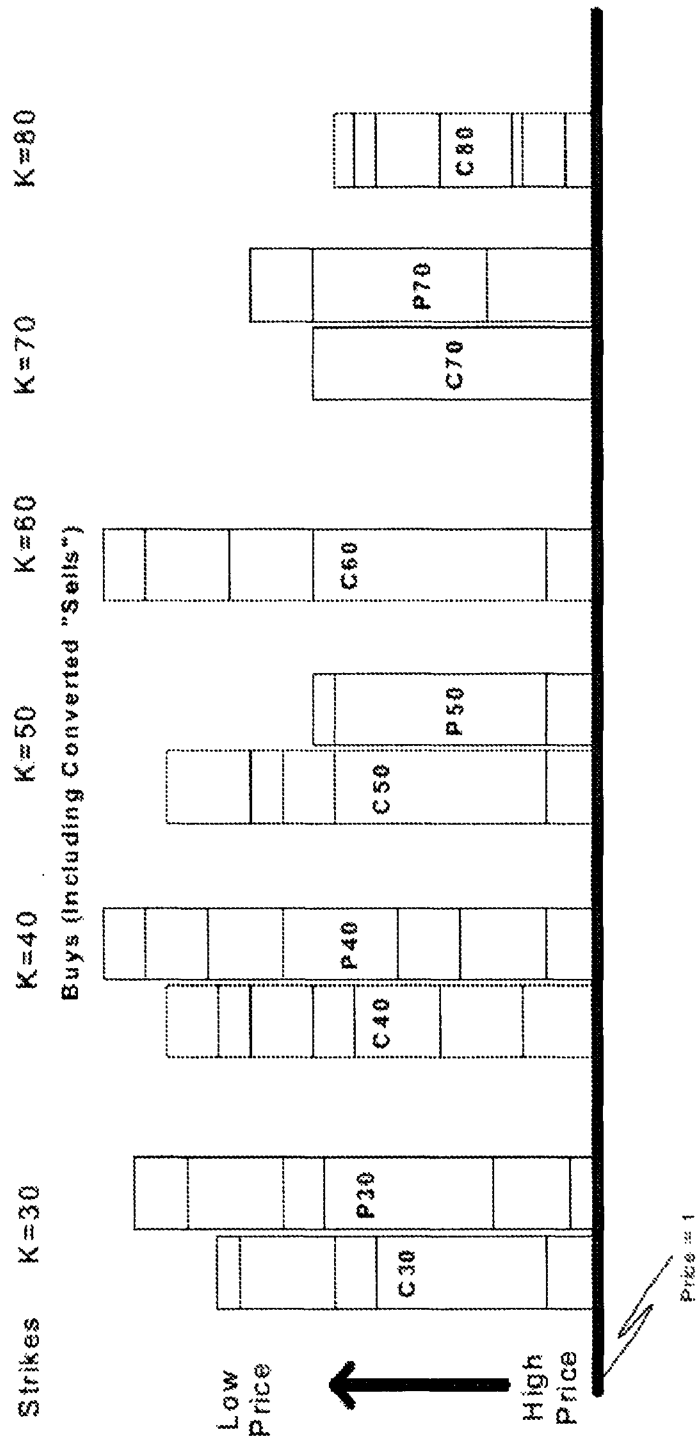
Figure 71:
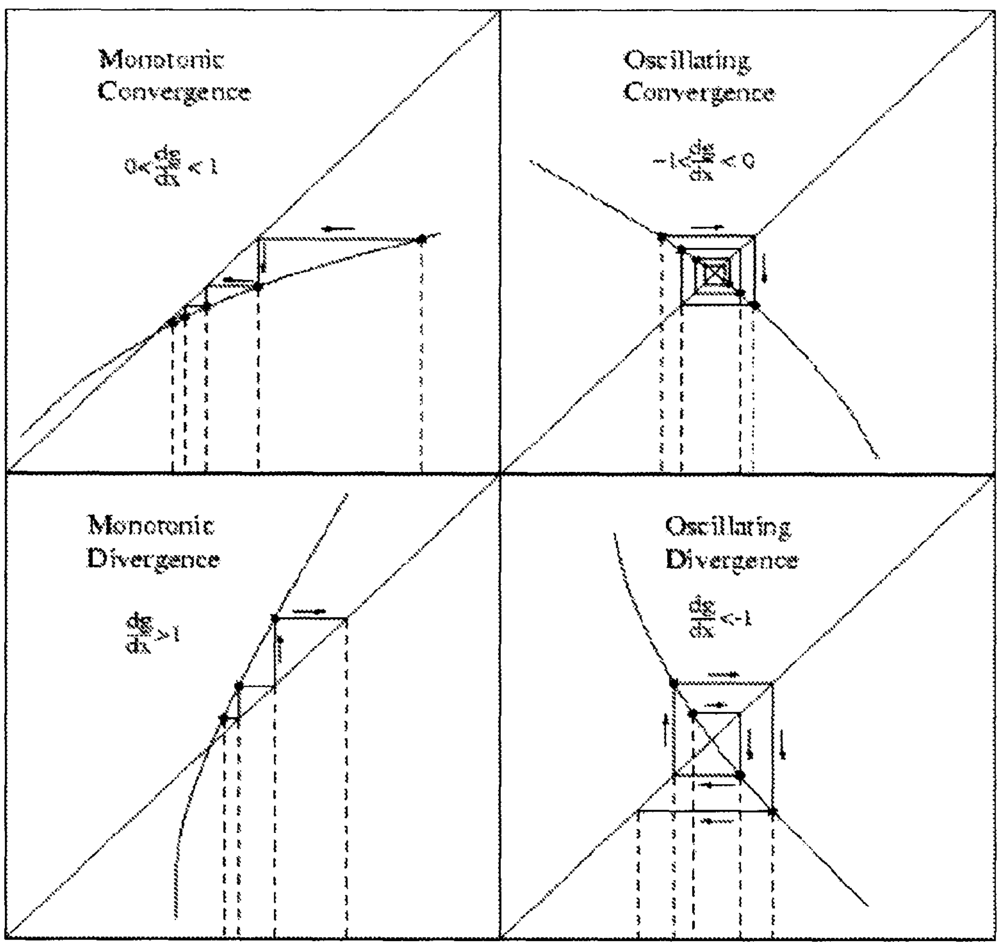

The application is implemented as a collection of processes which are shown in FIG. 32. This figure also details their locations, and the message flow between processes.

The processes communicate via a messaging middleware product such as PVM (open source—http://www.csm.ornl.gov/pvm/pvm_home.html) or Tibco Rendezvous (http://www.tibco.com/solutions/products/active_enterprise/default.jsp).

13.3.1 uip 3202 (User Interface Processor)

The process nip 3202 is responsible for handling all web (https) requests from users' browsers to the system. These processes are spawned by fastcgi running under apache web server (http://www.apache.org/).There are multiple processes per server and multiple servers per system.

13.3.2 ap 3206 (Auction Processor).

The process ap 3206 is responsible for:

Processing or delegating all event configuration, auction configuration, state changes and orders from uip's 3202;

Handling state changes and event configuration itself (see more details below), orders and auction configuration are passed to the appropriate ce 3216;

Writing all valid requests to disk, then putting them in db 3208;

Notifying ce 3216 when auction transactions (orders or configuration changes) have been put into db 3208, by sending the last sequence number down;

On startup, restoring events, loading auction transaction to db 3208; and

Starting cc 3216, if not started for an auction

In order to achieve sufficient throughput to handle many (50-100) simultaneous auctions, ap 3206 is written to perform a minimal amount of work and to not wait on other processes. The system can be scaled by adding multiple ap 3206 processes if it is necessary to run more auctions than a single ap 3206 can handle.

13.3.3 db 3208 (Database)

The process db 3208 is a fast in-memory object database used to store and access all information used by the system.

Specifically it holds the following information:

auctions events users user groups desk orders reports for auctions prices/fills reports for auctions internal reports used by the le 3218 for speeding up the calculation of limit order book points auction transactions (orders, configuration changes and state changes)

13.3.4 dp 3210 (Desk Processor)

The process dp 3210 is responsible for restoring and configuring users, user groups, and the desk.

13.3.5 ce 3216 (Calculation Engine)

The process ce 3216 is responsible for performing the fundamental equilibrium calculations that result in the prices and order fills for an auction at any given point in time.

It does not do any disk I/O and is stateless. If restarted, it gets all the information it needs from db 3208 and recalculates a new equilibrium. This is to minimize the impact if the server it is running on fails or if the calculation itself fails and must be restarted on a different server.

It also checks the semantics on all orders and rejects any that fail. This allows the auction administrator to change the strikes at any time with the caveat that they may be causing orders to be rejected.

13.3.6 lp 3212 (Limit Order Book [LOB] Processor)

The process lp 3212 is responsible for accepting limit order book requests from the nip 3202 and then assigning the request to the next available le 3218 for processing. If no le 3218 is available the request is queued and then processed as soon as an le 3218 becomes available.

This process also watches to make sure that an le 3218 which has been assigned a request always returns, and if it times out, then the request is assigned to a new le 3218.

13.3.7 le 3218 (Limit Order Book [LOB] Engine)

The process le 3218 is responsible for calculating a set of limit order book prices requested by the nip 3202 for a specific option during an auction.

This calculation is similar to what the ce 3216 does, but it is done repetitively at different limit prices for a set of hypothetical "what if" orders. The purpose is to generate a set of fills that could be realized if a user were to buy options above the current market price or sell options below the current market price.

This calculation is sped up significantly by using the results of the last equilibrium calculation (from the ce 3216) as a starting point which is retrieved from the db 3208 at the start of each calculation.

13.3.8 resd 3204 (Resource Daemon)

The process resd 3204 is responsible for starting all other processes and monitoring their behavior and existence.

If resd 3204 determines that a process it is watching has exited or failed, it will restart the process and then notify all other processes that interact with the restarted process of the new process. This allows the system to continue operation with minimal user impact when a process fails to respond or exits abnormally.

13.3.9 logd 3214 (Logging Daemon)

The process logd 3214 is responsible for writing all log messages that it receives from all other processes in the system. It serves as a central point of logging and allows efficient monitoring of application states and errors over a network connection.

13.4 Data

The system acts on a set of fundamental data types (or objects) defined below. Each of these is entered through the user interface with the exception of the desk, which is configured prior to starting the system.

Descriptions of the individual elements are contained in Appendix 13A.

13.4.1 Desk

The desk elements are as follows:

revision
revisionDate
revisionBy
desk
sponsor
sponsorId
limitOffsets 13.4.2 Users Users are created or modified by administrative users. Each user represents a unique entity that can login to the system through the web-based user interface to view auction information and place orders.

The user elements are as follows:

revision
revisionDate
revisionBy
userId
isDeleted
pswChangedDate
lastName
firstName
phone
email
location
description
groupId
canChangePsw
mustChangePsw
pswChangeInterval
accessPrivileges
loginId
password
failedLogins 13.4.3 Groups Groups are created or modified by administrative users. Groups provide a mechanism for administrators to group users who can view each other's orders.

The group elements are as follows:

revision
revisionDate
revisionBy
groupName
groupId
isDeleted 13.4.4 Events

Events are created by administrative users. They can only be created—never modified—to maintain referential integrity.

The event elements are as follows:

eventId
eventSymbol
eventDescription
currency
strikeUnits
expiration
tickSize
tickValue
floor
cap
payoutSettlementDate 13.4.5 Auctions Auctions are created or modified by administrative users. Auctions have four states, which are described below in the section "Auction State."

The auction elements are as follows:

revision
revisionDate
revisionBy
auctionId
eventId
auctionSymbol
title
abstract
start
end
state
premiumSettlement
digitalFee
vanillaFee
digitalComboFee
vanillaComboFee
forwardFee
marketMakingCapital
strikes
openingPrices
vanillaPricePrecision 13.4.6 Orders The order elements are as follows:

revision
revisionDate
revisionBy
orderId
groupId
optionType
lowerStrike
upperStrike
revision
revisionDate
revisionBy
isCanceled
side
limitPrice
amount
fill
mktPrice
userId
premiumCustomerReceives
premiumCustomerPays 13.5 Auction and Event Configuration 13.5.1 Auction Configuration Auctions can be created or modified. When an auction is modified any element may be changed except the system assigned auctionId. If an auction element is changed (such as the removal of a strike) which invalidates orders in the system, then those orders will be marked with a status of rejected, which effectively means that the system has canceled the order.

13.5.2 Event Configuration

Events can only be created—they cannot be modified or deleted using the user interface. This is to maintain referential integrity. Events that are no longer needed will be deleted using an offline utility when it has been determined that they have no further references. If an event is incorrect, the administrator must create a new one and modify any auctions to point at it.

13.6 Order Processing 13.6.1 Order Processing (Orders Placed by Customers)

An order is received by the uip 3202 and subjected to a semantic and syntactic check. Assuming it passes, it is then sent via pvm to the ap 3206. It should return quickly with an indication of whether there was an error. Generally the only error seen here would be if the auction were closed while the order was in flight.

ap 3206 first checks to see if the auction is open. If not, the order is not accepted (error back to the uip 3202). Note that orders from administrators have a different type that allows the ap 3206 to easily determine if it can accept them without looking inside them.

The order is written to disk and to db 3208. ap 3206 sends a message to ce notifying it of new orders. This message includes the sequence number of the order (same one used in writing it to disk).

When the ce receives the notification of a new order, it requests the latest orders from db 3208. Note that this request must at least provide orders up to and including the sequence number of the notify and may also include later orders.

ce 3216 checks all new orders for errors, and any that have errors are marked as order status' rejected. It is generally very unlikely that any errors would be found here but if they were, it would probably be due to one of two problems: (1) the system has some sort of bug that allowed the error to get through the uip 3202, but failed here, or the system mangled the order in transit, or (2) (more likely) the auction administrator changed the auction configuration, thereby eliminating the strike on which this order was placed.

All orders are now used to produce a new orders report that is stored in db 3208. At this point the new order(s) is available for uip's 3202 and will be visible in the user interface as a pending order.

A new equilibrium is calculated and checked with the constraints. If the constraints fail, then system error messages are logged and operators must correct the problem.

The new prices/fill report and ce 3216 report are stored in db 3208. At this point the order has been included in the current pricing and will be marked as active in the user interface. ce 3216 will reply to the "new transaction" message from the ap 3206 with the last sequence number that was included in this equilibrium, letting it know that the transactions were successfully processed.

13.6.2 Order Processing (Orders Placed by Administrators)

This is identical to customers except that orders are never refused at the ap 3206 since they can place orders while the auction is both open and closed.

13.6.3 Order Processing at Restore or Restart of a ce

A ce 3216 does not know the difference between the first time it is started and when it is restarted due to some sort of error. A ce 3216 also does not know the state of the auction.

When a ce 3216 starts there are two possibilities—either there are current valid reports for the auction or they do not exist yet. In any event, the ce 3216 does not delete any reports for an auction but rather will always overwrite them with newly calculated reports.

The ce 3216 looks for the latest auction configuration transaction and uses it to write (overwrite) the auction to db 3208.

The ce 3216 reads all order transactions and uses them to calculate an equilibrium, and then writes (overwrites) all reports into db 3208.

At this point the auction is fully restored and started in a consistent manner.

13.7 Auction State

All auctions in the system have an attribute "state" which determines:

whether orders are accepted, and from whom;
if LOBs are displayed; and
if the auction has been completed.

Specifically there are four auction states, defined as follows:

Open 3304—accept orders from customers and administrators.
Closed 3302—allow only orders from administrators.
Canceled 3308—do not allow any orders, do not display information on the auction (except that it has been canceled).
Finalized 3306—the auction is complete; do not allow any orders, present the administrators with the ability to download a final report that contains the final pricing and orders, fills, and disposition of all orders.

Auctions begin in the closed 3302 state and follow a specific transition sequence as shown in FIG. 33.

13.7.1 State Changes

Only administrators can request state changes to the auction.

ap 3206 writes state change requests to disk as an auction transaction and then to db 3208. Based on the request, ap 3206 adjusts whether it will allow orders to the ce 3216 for that auction. Only orders that are allowed to the ce 3216 are logged to disk and written to db 3208. However, any orders that are not accepted are logged (logd 3214) to provide an audit trail.

13.7.2 Opening 3304

Opening an auction consists of the following steps:

ap 3206 receives the request to open from a uip 3202.

ap 3206 writes the request as a transaction to disk and to db 3208.

Updates the current state in db 3208.

uip's 3202 begin allowing users to make LOB requests based on the updated state in db 3208.

ap 3206 begins allowing customer order requests from the uip's 3202 on that auction.

ap 3206 replies to the uip 3202 that requested the state change.

13.7.3 Closing 3302

Closing an auction consists of the following steps:

ap 3206 receives the request to close from a uip 3202.

ap 3206 writes the request as a transaction to disk and to db 3208.

ap 3206 updates the current state in db 3208.

uip's 3202 stop allowing users to make LOB requests based on the updated state in db 3208.

ap 3206 stops allowing customer order requests from the uip's 3202 on that auction.

ap 3206 replies to the nip 3202 that requested the state change.

13.7.4 Finalization 3306

Finalizing an auction consists of the following steps:

ap 3206 receives the request to finalize from a nip 3202.

ap 3206 writes the finalization request as a transaction to disk and to db 3208.

ap 3206 updates the current state in db 3208.

ap 3206 stops allowing any orders.

ap 3206 waits for all other transactions against this auction to complete (ce 3216 will reply to the ap's 3206 last notification of new transaction message). ap 3206 does not send a new transaction message to the ce 3216 for the finalization transaction.

ap 3206 reads all reports for this auction from db 3208 and writes them in the last transaction for this auction.

ap 3206 replies to the nip 3202 that requested the state change.

13.7.5 Cancel 3308

Canceling an auction consists of the following steps:

ap 3206 kills the ce 3216 process for that auction.

ap 3206 writes the cancellation request as a transaction to disk and to db 3208.

ap 3206 updates the current state in db 3208.

The auction effectively vanishes from the user interface, since uip's 3202 will no longer accept any requests for that auction.

ap 3206 replies to the nip 3202 that requested the state change.

13.7.6 Opening Orders

Opening orders will be entered on the vanilla replicating claims, which are described in section 11.2.2 and 11.3.1. These orders are constructed by the system using the total market making capital defined in the auction which is proportionately spread across all opening orders using the opening prices.

13.7.7 Customer Fees

Customers may be charged fees based on their total cleared replicated premium. Fees may vary depending on instrument type using the parameters digitalFee, vanillaFee, digitalComboFee, vanillaComboFee, or forwardFee.

Each of these fees specifies the amount that the customer is charged per filled contract on an order. This fee will typically be added to the final premium that the customer either must pay or receive for an order. The fee may also optionally be used to adjust the final price for the order.

13.8 Startup

Tasks must be started (to completion) in roughly the following order:

1. resd 3204/db 3208/logd 3214
2. dp 3210
3. ap 3206/lp 3212
4. uip 3202

Information from disk must be loaded in the following order:

1. desk
2. groups
3. users
4. events
5. auctions 13.8.1 Loading Events at Startup Events are loaded into db 3208 at startup by the ap 3206. Since modifications are not allowed, once they go in they remain constant for the session.

13.8.2 Loading Auctions at Startup

Auctions are loaded at startup from their disk directory into db 3208 by ap 3206. This is done by sequentially reading the transaction files and writing them to db 3208. When complete, a cc 3216 is started and sent a notification of new transactions for the auction.

13.8.3 Loading Desk/Users/Groups at Startup

The desk, users and groups are loaded into db 3208 from their disk directories at startup by dp 3210. This is done by sequentially reading the transaction files and writing them to db 3208.

13.9 CE 3216 Implementation 13.9.1 CE Implementation Performance Optimization and Benefits The performance of the cc 3216 is the major factor which enables, users to interact with the system and receive accurate real-time indications of current prices and fills as well as limit order book calculations. This is accomplished by minimizing the time lag between when an order is received and its effect is reflected in the prices and order fills that are reported to users through the user interface. This capability significantly differentiates this system implementation from auction based systems that do not provide feedback to users on pricing, order fills and "what-if" scenarios (limit order book) in real-time.

There are a number of optimizations contained in this implementation, which contribute to minimizing the amount of time required to calculate an equilibrium. In practice the combination of these optimizations has resulted in performance improvements of up to 3 orders of magnitude over implementations which do not use these techniques, across a wide variety of realistic test cases. The use of these optimization techniques then, makes a fundamental difference in the behavior and usage of the system from the users perspective. Specifically, the following techniques are used to effect this optimization in speed:

ce's 3216 and le's 3218 are run as separate processes on separate processors and do not contend for system CPU resources.

Each ce 3216 utilizes a dedicated processor so there is no contention for CPU resources between ce's 3216 running different simultaneous auctions.

Orders for a ce 3216 are aggregated in internal data structures when orders are at the same limit prices, strike, and option type. This reduces the amount of data elements that the ce 3216 has to loop over when computing fills.

In updatePrices 3506, only the non-zero elements of the replication weight vectors are processed and all orders on the same option are aggregated since they are all executed at the same price regardless of their limit prices.

The accelerate function is used in convergePrices 3510 to accelerate the stepping under certain conditions, greatly increasing the convergence speed.

The opening orders (section 13.8.14) are scaled appropriately greatly increasing the speed of convergence when the amounts of opening orders are large relative to the amount of premium in the system. This condition commonly occurs at the beginning of an auction.

Equilibriums are calculated using hot start method (described in convergePrices in section 13.9.3) coupled with the use of phaseTwo 3516. If hot start is used without this step, it is much faster than cold start, but the prices and fills are inconsistent. If cold start is used, the prices and fills are consistent, but the system is much slower. Hot start combined with phaseTwo 3516 yields much faster computation without any pricing or fill inconsistencies.

Only the orders that have limit prices within priceGran of the respective market price are inputted to the lp in runLp 3518, even though the obvious approach would be to send all of the orders. This approach significantly reduces the size of the lp problem and reduces the time to compute the results, without affecting the quality.

The memory for the replication weights is allocated on a 16 byte boundary. This is to take advantage of the Pentium 4 SIMD architecture so that the compiler can optimize dot products. This is important in calculating the price for an option (updateprices 3506) and in updating the fill of an option (setFill 4202).

The approach of stepping all order fills at once (see FIG. 35 and section 7.9) or "vector stepping" and then computing the equilibrium provides significant speed improvements over computing an equilibrium after any fill is stepped.

The method for solving rootFind 3504 based on Newton-Raphson provides significant speed improvements over other numerical solution techniques.

13.9.2 EqEngine (Equilibrium Engine) Object

The EqEngine object encapsulates the core equilibrium algorithm and the state (data) associated with running it for a single auction. It is used to implement both the ce 3216 and le 3218. Its methods are:

| Method | Description |
|---|---|
| InitEqEngine 3404 | The InitEqEngine 3404 function shown in FIG. 58 initializes the data in the EqEngine. |
| RunEqEngine 3406 | The RunEqEngine 3406 function, as shown in FIG. 35, is the main executive function for an equilibrium calculation |
| AddTxToEqEngine 3408 | The addTxToEqEngine 3408 function shown in FIG. 54 takes an order and makes adjustments to its limit price and replication weights. The limit price is adjusted by calling the adjustLimitPrice method for the option type of the order. The replication weights are determined by determining if the order is a buy or a sell. If the order is a sell, the sellPayouts are selected which are the replication weights for the complementary buy. |

Its data structures are defined as follows:

13.9.2.1 OptionDef Object

There is an optionDef object for each unique traded instrument within an auction. At the creation of the object, the computePayouts 5900 method shown in FIG. 59 is called, which generates the buyPayouts[ ], sellPayouts[ ] and negA[ ] vectors. These vectors only need to be generated once and stay persistent throughout the lifetime of the auction. A new optionDef object is created when a new unique customer instrument is requested. This object encapsulates the following data:

| Data | Description |
|---|---|
| option Type | The option type, e.g., vanilla call, digital risk reversal. |
| strike | The option's lower strike value. |
| spread | The option's higher strike value. |
| buyPayouts[numRepClaims] | The replication weight vector for a buy of this option. This vector is passed to the EqEngine as part of the trade object for a buy of this option. This vector is computed using equations 11.2.3A-11.2.3D. Each vector element is denoted as $a_s$, $s = 1, 2, \ldots, 2S-2$. |
| sellPayouts[numRepClaims] | The replication weight vector for a sell of this option (sell replicated as a complementary buy). This vector is passed to the EqEngine as part of the trade object for a sell of this option. This vector is computed using equations 11.2.3E-11.2.3H. Each vector element is denoted as $a_s$, $s = 1, 2, \ldots, 2S-2$. |
| negA[numRepClaims] | The weights vector used to calculate the price of the option. |
| price | The price of the option denoted by $\pi_j$ in section 11. |
| priceGran | The tolerance to converge the price for this option |
| priceAdjust | The market price is calculated from the replication price by subtracting priceAdjust. |

This object encapsulates the following methods:

| Method | Description |
|---|---|
| computePayouts | Initializes the buyPayouts[ ], sellPayouts and negA[ ]arrays in the optionDef. |
| adjustLimit | Converts the customer order limit price to the replicated limit price for the EqEngine. Described in section 11.4.4 and denoted by $w_j^{a}$. |
| updatePrice | Computes the market price of the option given the vanilla replication claim prices and denoted by $\pi_j$ in section 11. |

13.9.2.2 Global Variables

The global variables are as follows:

| Global Variables | Description |
|---|---|
| numRepClaims | Number of replicating claims in the vanilla replicating basis. This quantity equals 2S-2 in section 11.2.2. |
| numOptions | The number of options with unique replication weight vectors. This quantity is less than or equal to J based on the notation section 11. |

-continued

| Global Variables | Description |
|---|---|
| optionList[numOptions] | Array of option objects. |
| openPremium[numRepClaims] | Opening order premium for the vanilla replicating claims. This vector has sth element $\theta_s$ in section 11, s = 1, 2, . . . ,2S-2. |
| notional[numRepClaims] | Aggregated filled notional for the vanilla replicating claims. This vector has sth element $y_s$ in section 11, s = 1, 2, . . . , 2S-2. |
| price[numRepClaims] | Price of the vanilla replicating claims. These quantities are denoted by $p_s$ in section 11. |
| totalInvested | Total replicated cleared premium. This quantity denoted by M in section 11. |

13.9.2.3 Constants

The constants are as follows:

| Constant | Description |
|---|---|
| ACCEL_LOOP | The number of iterations before calling accelerate 3604 function. This value was empirically chosen to be 60. |
| STEP_LOOP | The number of iterations before adjusting the step size. This value was empirically chosen to be 6. |
| CON_LOOP | The number of iterations before checking for convergence. This value was empirically chosen to be 96. |
| MIN_K | The minimum average opening premium amount. This value is 1000. Used in scaling function. |
| MAX_ITER | The maximum number of iterations for Newton Raphson convergence. It is set to 30. |
| INIT_STEP | The initial step size for an order. It is set to 0.1. |
| GAMMA_PT | If the ratio of bigNorm to smallNorm is above GAMMA_PT then the step size is increased else decrease step size. It is set to 0.6. |
| ALPHA | This is an averaging constant used in step size selection. It is set to 0.25. |
| MIN_STEP_SIZE | The minimum permitted step size. It is set to 1e-9. |
| ALPHA_FILL | This is an acceleration averaging constant. It is set to 0.8. |
| ACCEL | This constant is used in acceleration. It is set to 7. |
| PRICE_THRES | This constant is the tolerance that the vanilla replication prices may vary by in the lp. It is set to le-9. |
| ROUND_UP | This is used in rounding the vanilla replication prices. It is set to 1e-5. |

13.9.2.4 Trade Object

The trade object encapsulates the following data:

| Data | Description |
|---|---|
| requested | The amount requested for the order denoted as $r_j$ in section 11. |
| limit | The adjusted limit price for the EqEngine denoted as $w_j^a$ in section 11. |
| priceGran | The tolerance to converge the pricing to for this order. |
| A[numRepClaims] | The replication weights for the option. This vector has sth element $a_s$ in section 11 and is computed using equations 11.2.3A–11.2.3H. |

13.9.2.5 Option Object

The option objects encapsulates the following data:

| Data | Description |
|---|---|
| price | The price of the option. This quantity is denoted with the variable $\pi_j$ in section 11. |
| A[numRepClaims] | The replication weights for the option. These quantities denoted by $a_s$ in section 11 and are computed using equations 11.2.3A-11.2.3H. |
| orders | Pointer to the head of the orders linked list |
| numOrders | Length of linked list. |
| priceGran | Tolerance to converge prices within limit price |
| current | Pointer to the current active order in linked list |
| activeHead | Pointer to order with highest limit price for phase 2 convergence |

13.9.2.6 Order Object

The order objects encapsulates the following data:

| Data | Description |
|---|---|
| head | Pointer to the next order with lower limit price. |
| tail | Pointer to the next order with higher limit price. |
| limit | Limit price of order. This quantity is denoted by $w_j$ in section 11. |
| requested | The requested amount before scaling. This quantity is denoted by $r_j$ in section 11. |
| invest | The scaled requested amount. |
| filled | The amount filled. This quantity is denoted by $x_j$ in section 11. |
| smallNorms | Used in step size selection.. |
| bigNorms | Used in step size selection. |
| step | Current step size. |
| gamma | Used in step size selection. |
| runFilled | Used by step size acceleration function. |
| lastFill | Used by step size acceleration function. |
| active | Indicates this order is included by phaseTwo stepping. |

13.9.2.7 ce Report

The ce, report encapsulates the following data:

| Data | Description |
|---|---|
| totalInvested | Total replicated cleared premium. Denoted as M in section 11. |
| numRepClaims | Number of replicating claims in the vanilla replicating basis. Equal to 2S-2 in section 11.2.2. |
| openPremium[numRepClaims] | Opening order premium for the vanilla replicating claims. Vector of length 2S-2 with sth element $0_s$, using the notation in section 11. |
| notional[numRepClaims] | Aggregated filled notional for the vanilla replicating claims. Vector of length 2S-2 with sth element $y_s$ using the notation from section 11. |
| prob[numRepClaims] | Price of the vanilla replicating claims. Vector of length 2S-2 with sth element $p_s$ using the notation from section 11. |
| numOptions | The number of options with unique replication weight vectors. |
| aList[numOptions][numRepClaims] | The replication weights for each option. |
| granList[numOptions] | Tolerance to converge prices within limit price for each option |
| priceList[numOptions] | The price of each option denoted by $\pi_j$ in section 11. |
| numTrades | The number of trades with unique replication weight and limit prices |

-continued

| Data | Description |
|---|---|
| opIdxList[numTrades] | The index into optionList[] corresponding to the option for each trade. |
| limitList[numTrades] | The limit price of each trade denoted by $w_j$ in section 11. |
| amountList[numTrades] | The requested amount for each trade denoted by $r_j$ in section 11. |
| fillList[numTrades] | The amount filled for each trade denoted by $x_j$ in section 11. |

13.9.3 ce 3216 Top Level Processing

The top-level processing of the ce 3216 is shown in FIG. 34. The application architecture shows that the ap 3206 process stores auction transactions (tx) in db 3208. There are three kinds of auction transactions: configuration transactions, state change transactions and order transactions. When cc 3216 is started, it reads all auction transactions from db 3208. State change transactions are ignored, and the last configuration transaction is noted. All order transactions are kept in txList. After reading all available transactions from db 3208 for this auction, the most recent (last) configuration transaction is stored in db 3208 as the current auction definition. Then the order transactions in txList are processed and used to create the updated order/fills report and ce report which are stored in the db 3208. The prices for each order are determined by reading the optionDef.price element for the orders' option type. The prices in all optionDef objects are updated by using the vanilla replicating claims prices in the EqEngine price[ ] array. Each order fill is read from the EqEngine's order objects. If orders have been aggregated in the EqEngine then the fills are split pro-rata among the aggregated orders.

After processing of the initial order set is finished, ce 3216 waits for notification from ap 3206, upon which it reads new transactions out of db 3208. If a configuration transaction is seen, ce 3216 terminates and then is immediately restarted by resd 3204. This allows the configuration transaction to change data such as strikes, which are part of the initialization of the ce.

The following sections describe the implementation of RunEq Engine, the core algorithm.

13.9.4 convergePrices 3510

The convergePrices 3510 function shown in FIG. 36 increases or decreases the fills on orders until the constraints in equation 11.4.6A are met. This equilibrium is calculated using the last equilibrium prices and fills as the initial starting point. This is referred to as "hot starting" the equilibrium calculation, which is significantly faster than resetting all the order fills to 0 and recalculating the equilibrium each time new orders are processed (cold start). The convergence algorithm is discussed in detail in section 7.

13.9.5 updatePrices 3506

The updatePrices 3506 function shown in FIG. 37 iterates through all the options defined in the optionList[ ] and calculates the price for each option. The price of an option is the dot product of the replicating vanilla claims prices vector (price[ ]) and the option replication weight vector (option.A[ ]), as described in equation 11.4.3C. Since all orders on the same option have the same price there is no need to calculate the price for every order. The replication weight vectors also have many that are equal to zero. The code is optimized by looping over the start and end indices of the non-zero elements.

13.9.6 rootFind 3504

The rootFind 3504 function shown in FIG. 38 computes the total investment amount (totalInvested, denoted as M in section 11 and as Tin section 7) and the prices of the vanilla replication claims. This function uses the Newton-Raphson algorithm to solve Equation 7.4.1(b). The input to this function is the aggregated filled notional amounts (denoted as the $y_s$'s in section 7 and 11) for the replicating vanilla claims (notional[ ]).

13.9.7 initialStep 3508

The initialStep 3508 function shown in FIG. 39 initializes the variables used to control order stepping for all orders. This function initializes the variables used in section 7.9.

13.9.8 stepOrders 3602

The stepOrders 3602 function shown in FIG. 40 iterates through all options in the optionList[ ]. The option.current pointer identifies the order in the orders linked list that is partially filled. All orders above this order in the list have higher limit prices and are fully filled; and all orders below this order have lower limit prices and have 0 fill. If the price is above order.limit then remove order.step from order.filled else add order.step to order.filled. If an order becomes fully filled or zero filled then the next current order is selected by searching the list in the appropriate direction. This function implements the logic from section 7.9, specifically in step 8.

13.9.9 selectStep 3608

The selectStep 3608 function shown in FIG. 41 is called at every STEP_LOOP iteration to adjust each order's step size. The step size is adjusted based on the absolute change in fill versus the absolute sum of the steps made. This ratio is between 0 and 1. If the ratio is above GAMMA_PT (0.6), the step size is increased; if it is below the step size is reduced. This function implements the dynamic step size approach from section 7.9, specifically in step 8(*b*).

13.9.10 Accelerate 3604

The accelerate 3604 function shown in FIG. 42 integrates the progress made by each order in the previous ACCEL_LOOP iterations and adjusts the fill on the order. This function greatly improves convergence speed.

13.9.11 setFill 4202

The setFill 4202 function shown in FIG. 43 takes the fill and the order as an input and updates the vanilla replication notional. It implements the dot product of replication weights with the fill as described in equation 11.4.5B.

13.9.12 checkConverge 3606

The checkConverge 3606 function shown in FIG. 44 checks if the algorithm has converged using the approach from section 7.9, specifically in step 8(*a*). This function verifies that the following conditions are met for all orders.

1. If order.price>(order.limitPrice+order.priceGran) then order.filled=order.requested
2. If order.price<(order.limitprice−order.priceGran) then order.filled=0
3. If neither of the above conditions is met then 0≦order.filled≦order.requested 13.9.13 addFill 4002

The addFill 4002 function shown in FIG. 45 increases the fill on an order by step size and updates step size variables.

13.9.14 decreaseFill 4004

The decreaseFill 4004 function shown in FIG. 46 decreases the fill on an order by step size and updates the step size variables.

13.9.15 scaleOrders 3502

If the average opening order premium amount (denoted by $$\sum_{s=1}^{2S-2} \theta_s / (2S-2)$$

in section 11) is greater than MIN_K then all order requested amounts and opening order premium are scaled down. The $$\text{scale factor} = \sum_{s=1}^{2S-2} \theta_s / ((2S-2) * \text{MIN\_K}).$$

If the scale factor is <1 then it is set to 1. This technique, scaleOrders 3502 shown in FIG. 47, reduces the maximum range that the stepping algorithm has to cover to fill an order. This approach speeds up convergence for auctions with large opening order amounts.

13.9.16 phaseTwo 3516

The prices and fills may be slightly different between a hot started and a cold started equilibrium calculation. The second convergence phase, phaseTwo 3516 shown in FIG. 48 rectifies the problem of fills and prices changing when orders worse than the market are added. The approach is as follows:

1. Calculate an equilibrium using hot start.
2. Round the vanilla replicating claim prices to eliminate noise.
3. Identify orders within the tolerance 2 * priceGran of their limit prices.
4. Set the fills for these orders to 0 and reset the stepping variables to their initial values.
5. Recalculate the equilibrium by only stepping the orders identified in step 3.

The initial conditions for phase two convergence will be the same for hot started equilibriums even if orders worse than the market are added. The tolerance 2*priceGran is chosen because hot starting the algorithm may result in prices being off by priceGran tolerance.

13.9.17 runLp 3518 runLp 3518 shown in FIG. 49 uses a linear program code to maximize the cleared premium in the auction. After an equilibrium has been reached there are three scenarios for an order:

1. Order is fully filled and its limit price is greater than priceGran above price.
2. Order has 0 fill and its limit price is less than priceGran below price.
3. Order price is within +/−priceGran of its limit price.

Only the orders from case 2 are inputted to the lp 3212 as variables which reduce the size of the lp 3212 problem. This function implements the linear program discussed in step 8(*c*) of section 7.9. This function uses the third party IMSL linear program subroutine "imsl_d_lin_prog" produced by Visual Numerics Inc.

13.9.18 roundPrices 3512 roundPrices 3512 shown in FIG. 50 rounds and normalizes the vanilla replication prices.

13.9.19 findActiveOrders 3514

The function findActiveOrders 3514 shown in FIG. 51 marks orders whose price is within a tolerance of their limit price as active. These orders will be stepped in phase two convergence.

13.9.20 activeSelectStep 4804

The activeSelectStep 4804 function shown in FIG. 52 only adjusts the step size on the active orders for phase two convergence.

13.9.21 stepActiveOrders 4802

The stepActiveOrders 4802 function shown in FIG. 53 only steps the active orders for phase two convergence.

13.10 LE 3218 Implementation

As shown in FIGS. 62-66, LOB requests are made by a uip 3202 to lp 3212, that forwards the request to an available le 3218. The le 3218 computes how much volume is available at a series of limit prices above (for buys) and below (for sells) the current indicative mid-market price for a particular option. It works by placing a very large order at a series of limit prices above the current price. The amount of this order, indicated by LOB_PROBE_AMOUNT in the figure, should be much larger than the orders in the equilibrium. This implementation uses 1,000,000,000,000 (one trillion). The le 3218 uses all the data structures and functions of ce 3216, but runs as a completely separate instance of the EqEngine, and has no interaction with cc 3216. When a LOB request comes in, the le 3218 retrieves the latest ce report from the db 3208 and instantiates an EqEngine using this report that is in the exact same state as the EqEngine from the ce 3216 that was used to create the ce report. The LOB-request itself consists of these fields:

- buyPayouts[ ]: Vector of per-state payouts.
- sellPayouts[ ]: Vector of per-state payouts for complementary order.
- offsetList[ ]: Vector of offsets above/below price at which to compute LOB.
- lobGran: LOB granularity (the smallest increment between LOB limit prices).
- priceAdjust: For options that may have a negative price (risk-reversals, forwards), this is used to scale limit prices when entering orders into the EqEngine and to scale them back when reporting results.

The offsets in request.offsetList[ ] are usually interpreted as percentages above/below the mid-market price. If 1% of the mid-market price is smaller than lobGran, the offsets are interpreted as multiples of lobGran.

If two orders are placed on the same option, the order with the higher limit price takes precedence. Therefore, to compute the LOB at a series of points above the market, we do not have to cancel each order in between calculations; it suffices to add each order one at a time, run the equilibrium and read the volume out of the EqEngine. After computing all of the buy points, we cancel each of the buy orders and then move on to calculate the sell side of the LOB.

13.11 Network Architecture

As shown in FIG. 67, the network architecture provides an efficient and redundant environment for the operation of DBAR auctions.

13.11.1 Architectural Elements

The architectural elements are defined as follows:

| Element | Description |
| --- | --- |
| PDC 6712 | Primary Data center shown in FIG. 67 - the primary location for hosting servers. The data center provides a secure location with reliable/redundant power and internet connections. |
| BDC 6714 | Backup Data center shown in FIG. 67 - the backup location for hosting servers. It is to be located sufficiently far from the PDC 6712 so as not to be affected by the same power outages, natural disasters, or other failures. The data center |

-continued

| Element | Description |
| --- | --- |
| | provides a secure location with reliable/redundant power and internet connections. |
| NOC 6708 | Network Operations center shown in FIG. 67 - the location used to host the servers and staff that operate the system. |
| CPOD 6724 | Client pod shown in FIG. 67 - the group of servers and networking devices used to support a client session at a data center. |
| MPOD 6718, 6720 | Management pod shown in FIG. 67 - the group of servers and network devices used to monitor and manage the CPODs 6724 at a data center. The MPOD supports the following functions:<br>snmp monitoring of hardware in the data center<br>collects syslod eents from all devices in the data center<br>runs application monitoring tools<br>hosts an authentication server which provides two factor authentications for system administrators who access any servers or network devices. |
| APOD 6722 | Access Pod shown in FIG. 67 - the group of network devices that provides centralized, firewalled access to the public internet for a group of CPODs 6724 at a data center. |

13.11.2 Devices

The devices are defined as follows:

| Device type | Description | TypicaI Hardware |
| --- | --- | --- |
| ts 3222 | Transaction server shown in FIG. 32 - runs the following processes:<br>db 3208<br>ap 3206<br>dp 3210<br>lp 3212<br>resd 3204<br>logd 3214 | 2 processor pentium-4 class PC server |
| ws 3220 | Web server shown in FIG. 32 - runs the following processes:<br>uip 3202 | 2 processor pentium-4 class PC server |
| cs 3224 | Calculation server shown in FIG. 32 - runs the following processes:<br>ce | 2 processor pentium-4 class PC server |
| Is 3226 | LOB server shown in Fig. 32 - runs the following processes:<br>le 3218 | 2 processor pentium-4 class PC server |
| ms | Management server - runs system management tools. | 2 processor pentium-4 class PC server |
| sw 6702 | Switch shown in FIG. 67 - provides 100B/T switched ethernet connectivity | Cisco 3550 |
| tr 6816 | Terminal server - provide access to console ports on all devices over ethernet | Cisco 2511 |
| gw 6704 | Gateway router shown in FIG. 67 - provides access to the internet. | Cisco 2651 |
| fw 6706 | Firewall shown in FIG. 67 - blocks all inbound and outbound access except for port 80 and 443 (http and https). Performs stateful inspection of all packets. | Cisco PIX |

13.11.3 CPOD 6724 Details

Each CPOD 6724 is used to host the software required to run auctions for a sponsor. A CPOD 6724 typically consists of the following:

| Server Type | Quantity | Comments |
| --- | --- | --- |
| ts 3222 | 2 | Redundant pair. |
| ws 3220 | 4 | Load balanced. |
| cs 3224 | 2 | Pool for active auctions - more servers will be added as the requirement for more simultaneous auctions increases typically allocate 1 processor per active auction. |
| Is 3226 | 4 | Pool for active auctions - more servers may be added to reduce LOB response time under load. |
| ms | 2 | Redundant pair. |

Since there are multiple CPODs 6724 at the PDC 6712, multiple sponsors can run auctions simultaneously. As shown in FIG. 68, each individual CPOD 6724 in the PDC 6712 has a corresponding CPOD 6724 in the BDC 6714 which is available for failover in the event of a major failure at the PDC 6712, such as a loss of power or connectivity.

Appendix 13A

The elements are defined as follows:

| Element Name | Description |
| --- | --- |
| abstract | A short text description of the auction. |
| accessPrivileges | Controls which screens and reports a user is allowed to access. The possible values and their meanings are:<br>B - customers - can view, place, and modify orders<br>C - administrators - same as B, plus can create and modify auction details and state, can create events, can create, modify, and delete users |
| accessStatus | Reflects the current status of a user. The values and their meanings are:<br>enabled - the user is allowed access.<br>expired - the user's account has expired (see accountExpires) and will be denied access until a user administrator changes the accessStatus.<br>locked - the user's account has been locked by the system due to a security violation and will be denied access until a user administrator changes the accessStatus.<br>disabled - the user's account has been disabled by the user administrator and will be denied access until a user administrator changes the accessStatus. |
| accountExpires | The date that the user's account will expire. When this date is reached, the accountStatus will be set to expired. |
| amount | The amount of an order. Depending on the optionType for a given order this may have several meanings such as:<br>For optionType = digitalPut, digitalCall, digitalRange, digitalStrangle, or digitalRiskReversal, the order amount is the notional amount requested by the order.<br>For optionType = vanillaFlooredPut, vanillaCappedCall, vanillaPutSpread, vanilla CallSpread, vanillaStraddle, vanillaStrangle, vanillaRiskReversal, or forward the order amount is the number of options contracts requested by the order.~<br>Order amount is denoted by $r_j$ for customer order j in section 11. |
| auctionId | The unique ID the system assigns to an auction when it is created. |
| auctionSymbol | A unique symbol for the auction. This symbol may be re-used after the deletion of the auction. |
| canChangePsw | Controls if a user is allowed to change his/her own password. |
| cap | The cap (highest) strike used by the system for calculations in all auctions on a particular event. It is not visible to the user and is |

-continued

| Element Name | Description |
|---|---|
| | denoted by $k_{S-1}$ in section 11. |
| currency | The currency in which all auctions on a particular event are denominated. It is a standard 3-letter ISO code. |
| description | optional text field to describe the user. |
| desk | A unique name assigned by Longitude to identify a system configuration used by a sponsor. |
| digitalComboFee | The sponsor fee for digital strangle or risk reversal options in basis points of filled premium. |
| digitalFee | The sponsor fee for digital call, put or range options in basis points of filled premium. |
| email | The email address of a user. |
| end | The date/time the auction ends. |
| eventDescription | A short text description of the event. |
| eventId | The unique ID the system assigns to an event when it is created. |
| eventSymbol | A unique symbol for the event. This symbol may not be reused unless the event has been removed from the system. |
| expiration | The date the options expire for a particular event. |
| fill | The current fill on an order. |
| firstName | The first name of the user. |
| floor | The floor (lowest) strike used by the system for calculations in all auctions on a particular event. It is not visible to the user and is denoted by $k_1$ in section 11. |
| forwardFee | The sponsor fee for forwards in basis points of filled premium. |
| groupId | The unique ID the system assigns to a group when it is created. |
| groupName | The name of the group. At any given point, there is only one active (non-deleted) group for each groupName within a sponsor, but there may be other groups with the same groupName that have been deleted previously. |
| isCanceled | This indicates if an order has been canceled. |
| isDeleted | This indicates if the user or group has been deleted. Note that users and groups are never actually deleted in the system but instead are simply marked as deleted. This is done to preserve referential integrity. |
| lastName | The last name of a user. |
| limitOffsets | The values used to specify the number of and location of the limit order book points for all auctions on a desk. |
| limitPrice | The limit price of an order. The limit price is denoted by $w_j$ for customer order j in section 11. |
| location | the location of a user. |
| lowerStrike | The strike price for an option when optionType is digitalCall, vanillaCappedCall, vanillaCall or vanillaStraddle. It is the lower strike price for an option when optionType is digitalRange, digitalStrangle, digitalRiskReversal, vanillaCallSpread, vanillaPutSpread, vanillaStrangle, or vanillaRiskReversal. |
| marketMakingCapital | The capital supplied by the auction sponsor to initially seed the equilibrium algorithm. |
| mktPrice | The current market price for an option. |
| mustChangePsw | This indicates that the user must change his password at the next login. |
| openingPrices | The initial prices displayed by the system for an auction. |
| optionType | The type of option - the possible values are:<br>digitalPut<br>digitalCall<br>digitalRange<br>digitalStrangle<br>digitalRiskReversal<br>vanillaPut<br>vanillaFlooredPut<br>vanillaCall<br>vanillaCappedCall |

-continued

| Element Name | Description |
|---|---|
| | vanillaPutSpread<br>vanillaCallSpread<br>vanillaStraddle<br>vanillaStrangle<br>vanillaRiskReversal<br>forward<br>A vanilla FlooredPut is a vanilla put spread whose lowest strike is the floor. A vanillCappedCall is a vanilla call spread whose highest strike is the cap. |
| orderId | The unique ID the system assigns to an order when it is created. |
| payoutSettlement | The payout settlement date of an auction. |
| phone | The phone number of a user. |
| premiumCustomerPays | The calculated premium amount that the customer must pay for a particular filled order. |
| premiumCustomerReceives | The calculated premium amount that the customer will receive for a particular filled order. |
| premiumSettlement | The premium settlement date of an auction. |
| price | The pricing information for an option. |
| pswChangedDate | The date and time of the last time a user or administrator changed a user's password. |
| pswChangeInterval | This is how often (in days) a user must change his password. If zero, then the password does not have to be changed at a regular interval. |
| revision | The revision of a desk, user, group, an auction, or an order. This starts at 0, and increments by 1. |
| revisionBy | The userId of the person who made the revision. |
| revisionDate | The date and time of the revision. |
| side | This indicates if the order is a buy or a sell. |
| sponsor | The name of the auction sponsor. |
| sponsorId | The unique ID assigned by Longitude to an auction sponsor. It is used in users, groups and orders to identify their affiliation. |
| start | The starting date/time for an auction. This is captured for informational purposes only and is not enforced by the system. |
| state | The current state of the auction. The possible values are:<br>open 3304<br>closed 3302<br>finalized 3306<br>canceled 3308<br>See the state diagram for more information. The usage in of "state" in this section differs from the usage of the term state in section 11. |
| strikes | The set of strikes for an auction. Strikes are denoted by $k_1, k_2, \ldots, k_{S-1}$ in section 11. |
| strikeUnits | The units of the strikes for all auctions on an event. |
| tickSize | The minimum amount by which the underlying on an event.can change denoted by $\rho$ in section 11. |
| tickValue | The payout value of a tick on an event.for a vanilla option |
| title | A brief text description of an auction. |
| upperStrike | The strike price for an option when optionType is digitalPut, vanillaFlooredPut or vanillaPut. It is the upper strike price for an option when optionType is digitalRange, digitalStrangle, digitalRiskReversal, vanillaCallSpread, vanillaPutSpread, vanillaStrangle, or vanillaRiskReversal. |
| userId | The unique ID the system assigns to a user when it is created. |
| userName | The unique name used by a user to log in to the system. At any given point, there is only one active (non-deleted) user for each userName within a sponsor, but there may be other users with the same userName that have been deleted previously. |

-continued

| Element Name | Description |
|---|---|
| vanillaComboFee | The sponsor fee for vanilla straddle, strangle or risk reversal options in basis points of filled premium. |
| vanillaFee | The sponsor fee for vanilla call, put or spread options in basis points of filled premium. |
| vanillaPricePrecision | Smallest displayed precision for vanilla prices. |

14. ADVANTAGES OF PREFERRED EMBODIMENTS

This specification sets forth principles, methods, and systems that provide trading and investment in groups of DBAR contingent claims, and the establishment and operation of markets and exchanges for such claims. Advantages of the present invention as it applies to the trading and investment in derivatives and other contingent claims include:

(1) Increased liquidity: Groups of DBAR contingent claims and exchanges for investing in them according to the present invention offer increased liquidity for the following reasons:

(a) Reduced dynamic hedging by market makers. In preferred embodiments, an exchange or market maker for contingent claims does not need to hedge in the market. In such embodiments, all that is required for a well-functioning contingent claims market is a set of observable underlying real-world events reflecting sources of financial or economic risk. For example, the quantity of any given financial product available at any given price can be irrelevant in a system of the present invention.

(b) Reduced order crossing. Traditional and electronic exchanges typically employ sophisticated algorithms for market and limit order book bid/offer crossing. In preferred embodiments of the present invention, there are no bids and offers to cross. A trader who desires to "unwind" an investment will instead make a complementary investment, thereby hedging his exposure.

(c) No permanent liquidity charge: In the DBAR market, only the final returns are used to compute payouts. Liquidity variations and the vagaries of execution in the traditional markets do not, in preferred embodiments, impose a permanent tax or toll as they typically do in traditional markets. In any event, in preferred embodiments of the present invention, liquidity effects of amounts invested in groups of DBAR claims are readily calculable and available to all traders. Such information is not readily available in traditional markets.

(2) Reduced credit risk: In preferred embodiments of the present invention, the exchange or dealer has greatly increased assurance of recovering its transaction fee. It therefore has reduced exposure to market risk. In preferred embodiments, the primary function of the exchange is to redistribute returns to successful investments from losses incurred by unsuccessful investments. By implication, traders who use systems of the present invention can enjoy limited liability, even for short positions, and a diversification of counterparty credit risk.

(3) Increased Scalability: The pricing methods in preferred embodiments of systems and methods of the present invention for investing in groups of DBAR contingent claims are not tied to the physical quantity of underlying financial products available for hedging. In preferred embodiments an exchange therefore can accommodate a very large community of users at lower marginal costs.

(4) Improved Information Aggregation: Markets and exchanges according to the present invention provide mechanisms for efficient aggregation of information related to investor demand, implied probabilities of various outcomes, and price.

(5) Increased Price Transparency: Preferred embodiments of systems and methods of the present invention for investing in groups of DBAR contingent claims determine returns as functions of amounts invested. By contrast, prices in traditional derivatives markets are customarily available for fixed quantities only and are typically determined by complex interactions of supply/demand and overall liquidity conditions. For example, in a preferred embodiment of a canonical DRF for a group of DBAR contingent claims of the present invention, returns for a particular defined state are allocated based on a function of the ratio of the total amount invested across the distribution of states to the amount on the particular state.

(6) Reduced settlement or clearing costs: In preferred embodiments of systems and methods for investing in groups of DBAR contingent claims, an exchange need not, and typically will not, have a need to transact in the underlying physical financial products on which a group of DBAR contingent claims may be based. Securities and derivatives in those products need not be transferred, pledged, or otherwise assigned for value by the exchange, so that, in preferred embodiments, it does not need the infrastructure which is typically required for these back office activities.

(7) Reduced hedging costs: In traditional derivatives markets, market makers continually adjust their portfolio of risk exposures in order to mitigate risks of bankruptcy and to maximize expected profit. Portfolio adjustments, or dynamic hedges, however, are usually very costly. In preferred embodiments of systems and methods for investing in groups of DBAR contingent claims, unsuccessful investments hedge the successful investments. As a consequence, in such preferred embodiments, the need for an exchange or market maker to hedge is greatly reduced, if not eliminated.

(8) Reduced model risk: In traditional markets, derivatives dealers often add "model insurance" to the prices they quote to customers to protect against unhedgable deviations from prices otherwise indicated by valuation models. In the present invention, the price of an investment in a defined state derives directly from the expectations of other traders as to the expected distribution of market returns. As a result, in such embodiments, sophisticated derivative valuation models are not essential. Transaction costs are thereby lowered due to the increased price transparency and tractability offered by the systems and methods of the present invention.

(9) Reduced event risk: In preferred embodiments of systems and methods of the present invention for investing in groups of DBAR contingent claims, trader expectations are solicited over an entire distribution of future event outcomes. In such embodiments, expectations of market crashes, for example, are directly observable from indicated returns, which transparently reveal trader expectations for an entire distributions of future event outcomes. Additionally, in such embodiments, a market maker or exchange bears greatly reduced market crash or "gap" risk, and the costs of derivatives need not reflect an insurance premium for discontinuous market events.

(10) Generation of Valuable Data: Traditional financial product exchanges usually attach a proprietary interest in the real-time and historical data that is generated as a by-product from trading activity and market making. These data include, for example, price and volume quotations at the bid and offer side of the market. In traditional markets, price is a "sufficient statistic" for market participants and this is the information that is most desired by data subscribers. In preferred embodiments of systems and methods of the present invention for investing in groups of DBAR contingent claims, the scope of data generation may be greatly expanded to include investor expectations of the entire distribution of possible outcomes for respective future events on which a group of DBAR contingent claims can be based. This type of information (e.g., did the distribution at time t reflect traders' expectations of a market crash which occurred at time t+1?) can be used to improve market operation. Currently, this type of distributional information can be derived only with great difficulty by collecting panels of option price data at different, strike prices for a given financial product, using the methods originated in 1978 by the economists Litzenberger and Breeden and other similar methods known to someone of skill in the art. Investors and others must then perform difficult calculations on these data to extract underlying distributions. In preferred embodiments of the present invention, such distributions are directly available.

(11) Expanded Market for Contingent claims: Another advantage of the present invention is that it enables a well functioning market for contingent claims. Such a market enables traders to hedge directly against events that are not readily hedgable or insurable in traditional markets, such as changes in mortgage payment indices, changes in real estate valuation indices, and corporate earnings announcements. A contingent claims market operating according to the systems and methods of the present invention can in principle cover all events of economic significance for which there exists a demand for insurance or hedging.

(12) Price Discovery: Another advantage of systems and methods of the present invention for investing in groups of DBAR contingent claims is the provision, in preferred embodiments, of a returns adjustment mechanism ("price discovery"). In traditional capital markets, a trader who takes a large position in relation to overall liquidity often creates the risk to the market that price discovery will break down in the event of a shock or liquidity crisis. For example, during the fall of 1998, Long Term Capital Management (LTCM) was unable to liquidate its inordinately large positions in response to an external shock to the credit market, i.e., the pending default of Russia on some of its debt obligations. This risk to the system was externalized to not only the creditors of LTCM, but also to others in the credit markets for whom liquid markets disappeared. By contrast, in a preferred embodiment of a group of DBAR contingent claims according to the present invention, LTCM's own trades in a group of DBAR contingent claims would have lowered the returns to the states invested in dramatically, thereby reducing the incentive to make further large, and possibly destabilizing, investments in those same states. Furthermore, an exchange for a group of DBAR contingent claims according to the present invention could still have operated, albeit at frequently adjusted returns, even during, for example, the most acute phases of the 1998 Russian bond crisis. For example, had a market in a DBAR range derivative existed which elicited trader expectations on the distribution of spreads between high-grade United States Treasury securities and lower-grade debt instruments, LTCM could have "hedged" its own speculative-positions in the lower-grade instruments by making investment in the DBAR range derivatives in which it would profit as credit spreads widened. Of course, its positions by necessity would have been sizable thereby driving the returns on its position dramatically lower (i.e., effectively liquidating its existing position at less favorable prices). Nevertheless, an exchange according to preferred embodiments of the present invention could have provided increased liquidity compared to that of the traditional markets.

(13) Improved Offers of Liquidity to the Market: As explained above, in preferred embodiments of groups of DBAR contingent claims according to the present invention, once an investment has been made it can be offset by making an investment in proportion to the prevailing traded amounts invested in the complement states and the original invested state. By not allowing trades to be removed or cancelled outright, preferred embodiments promote two advantages:

(1) reducing strategic behavior ("returns-jiggling")

(2) increasing liquidity to the market

In other words, preferred embodiments of the present invention reduce the ability of traders to make and withdraw large investments merely to create false-signals to other participants in the hopes of creating last-minute changes in closing returns. Moreover, in preferred embodiments, the liquidity of the market over the entire distribution of states is information readily available to traders and such liquidity, in preferred embodiments, may not be withdrawn during the trading periods. Such preferred embodiments of the present invention thus provide essentially binding commitments of liquidity to the market guaranteed not to disappear.

(14) Increased Liquidity Incentives: In preferred embodiments of the systems and methods of the present invention for trading or investing in groups of DBAR contingent claims, incentives are created to provide liquidity over the distribution of states where it is needed most. On average, in preferred embodiments, the implied probabilities resulting from invested amounts in each defined state should be related to the actual probabilities of the states, so liquidity should be provided in proportion to the actual probabilities of each state across the distribution. The traditional markets do not have such ready self-equilibrating liquidity mechanisms—e.g., far out-of-the-money options might have no liquidity or might be excessively traded. In any event, traditional markets do not generally provide the strong (analytical) relationship between liquidity, prices, and probabilities so readily available in trading in groups of DBAR contingent claims according to the present invention.

(15) Improved Self-Consistency: Traditional markets customarily have "no-arbitrage" relationships such as put-call parity for options and interest-rate parity for interest rates and currencies. These relationships typically must (and do) hold to prevent risk-less arbitrage and to provide consistency checks or benchmarks for no-arbitrage pricing. In preferred embodiments of systems and methods of the present invention for trading or investing in groups of DBAR contingent claims, in addition to such "no-arbitrage" relationships, the sum of the implied probabilities over the distribution of defined states is known to all traders to equal unity. Using the notation developed above, the following relations hold for a group of DBAR contingent claims using a canonical DRF:

$$r_i = \frac{(1-f) * \sum_i T_i}{T_i} - 1 \tag{a}$$

$$q_i = \frac{1-f}{r_i+1} = \frac{T_i}{\sum_i T_i} \tag{b}$$

$$\sum_i q_i = 1 \tag{c}$$

In other words, in a preferred embodiment, the sum across a simple function of all implied probabilities is equal to the sum of the amount traded for each defined state divided by the total amount traded. In such an embodiment, this sum equals 1. This internal consistency check has no salient equivalent in the traditional markets where complex calculations are typically required to be performed on illiquid options price data in order to recover the implied probability distributions.

(16) Facilitated Marginal Returns Calculations: In preferred embodiments of systems and methods of the present invention for trading and investing in groups of DBAR contingent claims, marginal returns may also be calculated readily. Marginal returns $r^m$ are those that prevail in any sub-period of a trading period, and can be calculated as follows:

$$r^m_{i,t-1,t} = \frac{r_{i,t} * T_{i,t} - r_{i,t-1} * T_{i,t-1}}{T_{i,t} - T_{i,t-1}} \tag{1}$$

where the left hand side is the marginal returns for state i between times t−1 and t; $r_{i,t}$ and $r_{i,t-1}$ are the unit returns for state i at times t, and t−1, and $T_{i,t}$ and $T_{i,t-1}$ are the amounts invested in state i at times t and t−1, respectively.

In preferred embodiments, the marginal returns can be displayed to provide important information to traders and others as to the adjustment throughout a trading period. In systems and methods of the present invention, marginal returns may be more variable (depending on the size of the time increment among other factors) than the returns which apply to the entire trading period.

(17) Reduced Influence By Market Makers: In preferred embodiments of the systems and methods of the present invention, because returns are driven by demand, the role of the supply side market maker is reduced if not eliminated. A typical market maker in the traditional markets (such as an NYSE specialist or a swaps book-runner) typically has privileged access to information (e.g., the limit order book) and potential conflicts of interest deriving from dual roles as principal (i.e., proprietary trader) and market maker. In preferred embodiments of the present invention, all traders have greater information (e.g., investment amounts across entire distribution of states) and there is no supply-side conflict of interest.

(18) Increased Ability to Generate and Replicate Arbitrary Payout Distributions: In preferred embodiments of the systems and methods of the present invention for investing and trading in groups of DBAR contingent claims, traders may generate their own desired distributions of payouts, i.e., payouts can be customized very readily by varying amounts invested across the distribution of defined states. This is significant since groups of DBAR contingent claims can be used to readily replicate payout distributions with which traders are familiar from the traditional markets, such as long stock positions, long and short futures positions, long options straddle positions, etc. Importantly, as discussed above, in preferred embodiments of the present invention, the payout distributions corresponding to such positions can be effectively replicated with minimal expense and difficulty by having a DBAR contingent claim exchange perform multi-state allocations. For example, as discussed in detail in Section 6 and with reference to FIGS. 11-18, in preferred embodiments of the system and methods of the present invention, payout distributions of investments in DBAR contingent claims can be comparable to the payout distributions expected by traders for purchases and sales of digital put and call options in conventional derivatives markets. While the payout distributions may be comparable, the systems and methods of the present invention, unlike conventional markets, do not require the presence of sellers of the options or the matching of buy and sell orders.

(19) Rapid implementation: In various embodiments of the systems and methods of the present invention for investing and trading in groups of DBAR contingent claims, the new derivatives and risk management products are processed identically to derivative instruments traded in the over-the-counter (OTC) markets, regulated identically to derivative instruments traded in the OTC markets and conform to credit and compliance standards employed in OTC derivatives markets. The product integrates with the practices, culture and operations of existing capital and asset markets as well as lends itself to customized applications and objectives.

In addition to the above advantages, the demand-based trading system may also provide the following benefits:

(1) Aggregation of liquidity: Fragmentation of liquidity, which occurs when trading is spread, across numerous strike prices, can inhibit the development of an efficient options market. In a demand-based market or auction, no fragmentation occurs because all strikes fund each other. Interest in any strike provides liquidity for all other strikes. Batching orders across time and strike price into a demand-based limit order book is an important feature of demand-based trading technology and is the primary means of fostering additional liquidity.

(2) Limited liability: A unique feature of demand-based trading products is their limited liability nature. Conventional options offer limited liability for purchases only. Demand-based trading digital options and other DBAR contingent claims have the additional benefit of providing a known, finite liability to option sellers, based on the notional amount of the option traded. This will provide additional comfort for short sellers and consequently will attract additional liquidity, especially for out-of-the money options.

(3) Visibility/Transparency: Customers trading in demand-based trading products can gain access to unprecedented transparency when entering and viewing orders. Prices for demand-based trading products (such as digital options) at each strike price can be displayed at all times, along with the volume of orders that would be cleared at the indicated price. A limit order book displaying limit orders by strike can be accessible to all customers. Finally, the probability distribution resulting from all successful orders in the market or auction can be displayed in a familiar histogram form, allowing market participants to see the market's true consensus estimate for possible future outcomes.

Demand-based trading solutions can use digital options, which may have advantages for measuring market expectations: the price of the digital option is simply the consensus probability of the specific event occurring. Since the interpretation of the pricing is direct, no model is required and no ambiguity exists when determining market expectations.

(4) Efficiency: Bid/Ask spreads in demand-based trading products can be a fraction of those for options in traditional markets. The cost-efficient nature of the demand-based trading mechanism translates directly into increased liquidity available for taking positions.

(5) Enhancing returns with superior forecasting: Managers with superior expertise can benefit from insights, generating significant incremental returns without exposure to market volatility. Managers may find access to digital options and other DBAR contingent claims useful for dampening the effect of short-term volatility of their underlying portfolios.

(6) Arbitrage: Many capital market participants engage in macroeconomic-'arbitrage.' Investors with skill in economic and financial analysis can detect imbalances in different sectors of the economy, or between the financial and real economies, and exploit them using DBAR contingent claims, including, for example, digital options, based on economic events, such as changes in values of economic statistics.

15. TECHNICAL APPENDIX

This technical appendix provides the mathematical foundation underlying the computer code listing of Table 1: Illustrative Visual Basic Computer Code for Solving CDRF 2. That computer code listing implements a procedure for solving the Canonical Demand Reallocation Function (CDRF 2) by preferred means which one of ordinary skill in the art will recognize are based upon the application of a mathematical method known as fixed point iteration.

As previously indicated in the specification, the simultaneous system embodied by CDRF 2 does not provide an explicit solution and typically would require the use of numerical methods to solve the simultaneous quadratic equations included in the system. In general, such systems would typically be solved by what are commonly known as "grid search" routines such as the Newton-Raphson method, in which an initial solution or guess at a solution is improved by extracting information from the numerical derivatives of the functions embodied in the simultaneous system.

One of the important advantages of the demand-based trading methods of the present invention is the careful construction of CDRF 2 which allows for the application of fixed point iteration as a means for providing a numerical solution of CDRF 2 Fixed point iteration means are generally more reliable and computationally less burdensome than grid search routines, as the computer code listing in Table 13.1 illustrates.

Fixed Point Iteration

The solution to CDRF 2 requires finding a fixed point to a system of equations. Fixed points represent solutions since they convey the concept of a system at "rest" or equilibrium, i.e., a fixed point of a system of functions or transformations denoted g(a) exists if $$a=g(a)$$

Mathematically, the function g(a) can be said to be a map on the real line over the domain of a. The map, g(x), generates a new point, say, y, on the real line. If x=y, then x is called a fixed point of the function g(a). In terms of numerical solution techniques, if g(a) is a non-linear system of equations and if x is a fixed point of g(a), then a is also the zero of the function. If no fixed points such as x exist for the function g(a), then grid search type routines can be used to solve the system (e.g., the Newton-Raphson Method, the Secant Method, etc.). If a fixed point exists, however, its existence can be exploited in solving for the zero of a simultaneous non-linear system, as follows.

Choose an initial starting point, $x_0$, which is believed to be somewhere in the neighborhood of the fixed point of the function g(a). Then, assuming there does exist a fixed point of the function g(a), employ the following simple iterative scheme:

$$x_{i+1}=g(x_i),\text{ where } x_0 \text{ is chosen as starting point}$$

where i=0, 1, 2, . . . n. The iteration can be continued until a desired precision level, $\epsilon$, is achieved, i.e., $$x_n=g(x_{n-1}),\text{ until } |g(x_{n-1})-x_n|<\epsilon$$

The question whether fixed point iteration will converge, of course, depends crucially on the value of the first derivative of the function g(x) in the neighborhood of the fixed point as shown in the following figure:

TABLE 13.1

Fixed Point Iteration for General Function g(x)

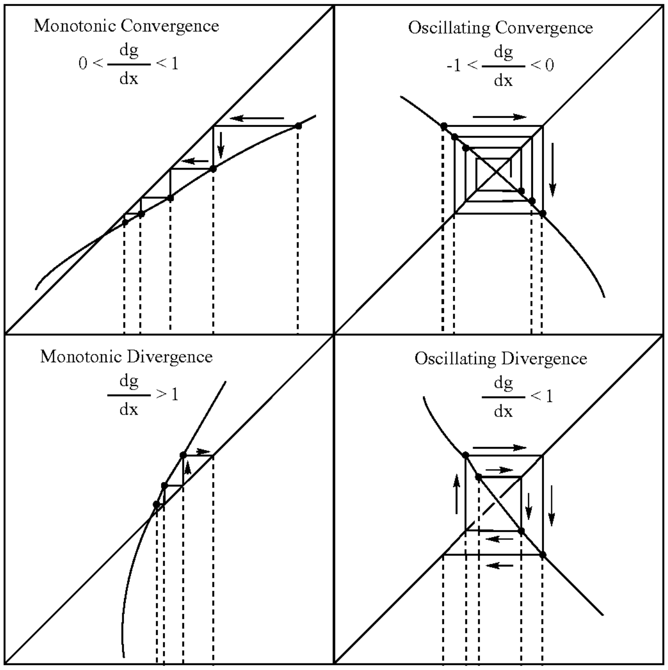

As previously indicated, an advantage of the present invention is the construction of CDRF 2 in such a way so that it may be represented in terms of a multivariate function, g(x), which is continuous and has a derivative whose value is between 0 and 1, as shown below.

Fixed Point Iteration as Applied to CDRF 2

This section will demonstrate that (1) the system of equations embodied in CDRF 2 possesses a fixed point solution and (2) that this fixed point solution can be located using the method of fixed point iteration described in Section A, above.

The well known fixed point theorem provides that, if g: [a, b]-->[a, b] is continuous on [a, b] and differentiable on (a, b) and there is a constant k<1 such that for all x in (a, b), $$|g'(x)| \leq k$$

then g has a unique fixed point x* in [a, b]. Moreover, for any x in [a, b] the sequence defined by $$x_0 = x \text{ and } x_{n+1} = g(x_n)$$

converges to x* and for all n $$|x_n - x^*| \leq \frac{k^n * |x_1 - x_0|}{1 - k}.$$

The theorem can be applied CDRF 2 as follows. First, CDRF 2 in a preferred embodiment relates the amount or amounts to be invested across the distribution of states for the CDRF, given a payout distribution, by inverting the expression for the CDRF and solving for the traded amount matrix A:

$$A = P * \Pi(A,f)^{-1} \quad \text{(CDRF 2)}$$

CDRF 2 may be rewritten, therefore, in the following form:

$$A = g(A)$$

where g is a continuous and differentiable function. By the aforementioned fixed point theorem, CDRF 2 may be solved by means of fixed point iteration if:

$$g'(A) < 1$$

i.e., the multivariate function g(A) has a first derivative less than 1. Whether g(A) has a derivative less than 1 with respect to A can be analyzed as follows. As previously indicated in the specification, for any given trader and any given state i, CDRF2 contains equations of the following form relating the desired payout p (assumed to be greater than 0) to the traded amount α required to generate the desired payout, given a total traded amount already traded for state i of $T_i$ (also assumed to be greater than 0) and the total traded amount for all the states of T:

$$\alpha = \left(\frac{T_i + \alpha}{T + \alpha}\right) * p$$

so that $$g(\alpha) = \left(\frac{T_i + \alpha}{T + \alpha}\right) * p$$

Differentiating g(α) with respect to α yields:

$$g'(\alpha) = \left(\frac{T - T_i}{T + \alpha}\right) * \frac{p}{T + \alpha}$$

Since the DRF Constraint defined previously in the specification requires that payout amount p not exceed the total amount traded for all of the states, the following condition holds:

$$\frac{p}{T+\alpha} \leq 1$$

and therefore since $$\left(\frac{T-T_i}{T+\alpha}\right) < 1$$

it is the case that $$0 < g'(\alpha) < 1$$

so that the solution to CDRF 2 can be obtained by means of fixed point iteration as embodied in the computer code listing of Table 1.

16. CONCLUSION

Preferred embodiments of the invention have been described in detail above, various changes thereto and equivalents thereof will be readily apparent to one of ordinary skill in the art and are encompassed within the scope of this invention and the appended claim. For example, many types of demand reallocation functions (DRFs) can be employed to finance gains to successful investments with losses from unsuccessful investments, thereby achieving different risk and return profiles to traders. Additionally, this disclosure has discussed methods and systems for replicated derivatives strategies and financial products, as well as for groups and portfolios of DBAR contingent claims, and markets and exchanges and auctions for those strategies, products and groups. The methods and systems of the present invention can readily be adapted by financial intermediaries for use within the traditional capital and insurance markets. For example, a group of DBAR contingent claims can be embedded within a traditional security, such as a bond for a given corporate issuer, and underwritten and issued by an underwriter as previously discussed. It is also intended that such embodiments and their equivalents are encompassed by the present invention and the appended claims.

The present invention has been described above in the context of trading derivative securities, specifically the implementation of an electronic derivatives exchange which facilitates the efficient trading of (i) financial-related contingent claims such as stocks, bonds, and derivatives thereon, (ii) non-financial related contingent claims such as energy, commodity, and weather derivatives, and (iii) traditional insurance and reinsurance contracts such as market loss warranties for property-casualty catastrophe risk. The present invention has also been described above in the context of a DBAR digital options exchange, and in the context of offering DBAR-enabled financial products and derivatives strategies. The present invention is not limited to these contexts, however, and can be readily adapted to any contingent claim relating to events which are currently uninsurable or unhedgable, such as corporate earnings announcements, future semiconductor demand, and changes in technology.

In the preceding specification, the present invention has been described with reference to specific exemplary embodiments thereof It will, however, be evident that various modifications and changes may be made thereunto without departing from the broader spirit and scope of the present invention as set forth in the claims that follow. The specification and drawings are accordingly to be regarded in an illustrative rather than restrictive sense.

What is claimed is:

1. A method of a trading machine for trading contingent claims in a demand-based auction, comprising:

recording investments in a plurality of contingent claims;

for each of the plurality of contingent claims, selecting, by a processor of the trading machine and from a plurality of demand-based claims, a respective set of demand-based claims that (a) the processor determines most closely, as compared to others of the plurality of demand-based claims, replicates a return on the respective contingent claim, and (b) includes at least one option, wherein the value of each of the plurality of contingent claims is contingent on the outcome of an observable event with more than one possible outcome; and determining, by a processor of the trading machine, investment amounts in the demand-based claims and returns on the demand-based claims based on input of the total and relative amounts of all investments in the recorded plurality of contingent claims.

2. The method according to claim 1, wherein the demand-based claims also include at least one digital option.

3. The method according to claim 1, wherein the demand-based claims include at least one of a vanilla put and a vanilla call.

4. The method according to claim 1, wherein the demand-based claims include at least one of a resealed vanilla put knock out and a rescaled vanilla call knock out.

5. The method according to claim 1, further including the step of:

defining the contingent claim to be approximated as a derivatives strategy.

6. The method according to claim 1, wherein the investment amounts in the demand-based claims and returns on the demand-based claims are not determined by the amount offered to buy or sell the demand-based claim.

7. A method of a trading machine for trading contingent claims, comprising:

recording investments in a plurality of contingent claims;

for each of the plurality of contingent claims, selecting, by a processor of the trading machine and from a predetermined plurality of claims, a respective set of claims that (a) the processor determines most closely, as compared to others of the predetermined plurality of claims, replicates a return on the respective contingent claim, and (b) includes at least one option, wherein the value of each of the plurality of contingent claims is contingent on the outcome of an observable event with more than one possible outcome; and determining, by a processor of the trading machine, investment amounts in the set of claims and returns on the set of claims based on input of the total and relative amounts of all investments in the recorded plurality of contingent claims.

* * * * *